US007205016B2

(12) United States Patent
Garwood

(10) Patent No.: US 7,205,016 B2
(45) Date of Patent: Apr. 17, 2007

(54) PACKAGES AND METHODS FOR PROCESSING FOOD PRODUCTS

(75) Inventor: Anthony J. M. Garwood, Mercer Island, WA (US)

(73) Assignee: SafeFresh Technologies, LLC, Mercer Island, WA (US)

( * ) Notice: Subject to any disclaimer, the term of this patent is extended or adjusted under 35 U.S.C. 154(b) by 0 days.

(21) Appl. No.: 10/385,158

(22) Filed: Mar. 7, 2003

(65) Prior Publication Data

US 2003/0185948 A1 Oct. 2, 2003

Related U.S. Application Data

(60) Division of application No. PCT/US01/45146, filed on Nov. 28, 2001, which is a continuation-in-part of application No. 09/724,287, filed on Nov. 28, 2000, which is a continuation-in-part of application No. PCT/US00/29038, filed on Oct. 19, 2000, which is a continuation-in-part of application No. 09/550,399, filed on Apr. 14, 2000, now abandoned, which is a continuation-in-part of application No. 09/392,074, filed on Sep. 8, 1999, now abandoned, which is a continuation of application No. 09/039,150, filed on Mar. 13, 1998, now abandoned, said application No. PCT/US01/45146 , said application No. 09/550,399.

(60) Provisional application No. 60/335,760, filed on Oct. 19, 2001, provisional application No. 60/323,629, filed on Sep. 19, 2001, provisional application No. 60/314,109, filed on Aug. 21, 2001, provisional application No. 60/312,176, filed on Aug. 13, 2001, provisional application No. 60/299,240, filed on Jun. 18, 2001, provisional application No. 60/291,872, filed on May 17, 2001, provisional application No. 60/286,688, filed on Apr. 26, 2001, provisional application No. 60/255,684, filed on Dec. 13, 2000, provisional application No. 60/175,372, filed on Jan. 10, 2000, provisional application No. 60/160,445, filed on Oct. 19, 1999, provisional application No. 60/154,068, filed on Sep. 14, 1999, provisional application No. 60/152,677, filed on Sep. 7, 1999, provisional application No. 60/149,938, filed on Aug. 19, 1999, provisional application No. 60/148,227, filed on Jul. 27, 1999, provisional application No. 60/144,400, filed on Jul. 16, 1999, provisional application No. 60/141,569, filed on Jun. 29, 1999, provisional application No. 60/129,595, filed on Apr. 15, 1999, provisional application No. 60/040,556, filed on Mar. 13, 1997.

(51) Int. Cl.
*A23B 4/16* (2006.01)

(52) U.S. Cl. ...................... 426/108; 426/118; 426/129; 426/316; 426/395

(58) Field of Classification Search ................ 426/108, 426/118, 129, 312, 316, 392, 395
See application file for complete search history.

(56) References Cited

U.S. PATENT DOCUMENTS 2,348,509 A * 5/1944 Wheeler ..................... 426/108

(Continued)

FOREIGN PATENT DOCUMENTS

EP 0 284 502 A1 9/1988

(Continued)

OTHER PUBLICATIONS

The Flavaloc System, Garwood Limited advertising brochure, 1986.

(Continued)

*Primary Examiner*—Drew Becker
(74) *Attorney, Agent, or Firm*—Christensen O'Connor Johnson Kindness PLLC

(57) ABSTRACT

A method of stacking packages, wherein an upper package has a configuration to avoid touching the contents of a lower package. The finished packages can be stacked within cartons for distribution and shipped long distances without causing damage to the contents of the trays in the lower position.

18 Claims, 196 Drawing Sheets

U.S. PATENT DOCUMENTS

| | | | | |
|---|---|---|---|---|
| 2,596,514 | A | 5/1952 | Uehlein | |
| 3,067,015 | A | 12/1962 | Lawdermilt | |
| 3,366,309 | A | 1/1968 | Scharre | |
| 3,396,430 | A | 8/1968 | Westcott | |
| 3,481,100 | A | 12/1969 | Bergstrom | |
| 3,681,092 | A * | 8/1972 | Titchenal et al. | 426/412 |
| 3,851,080 | A | 11/1974 | Lugg et al. | |
| 3,930,040 | A | 12/1975 | Woodruff | |
| 4,114,348 | A | 9/1978 | Mahaffy et al. | |
| 4,171,164 | A | 10/1979 | Groves et al. | |
| 4,201,030 | A | 5/1980 | Mahaffy et al. | |
| 4,244,978 | A | 1/1981 | Barta | |
| 4,314,451 | A | 2/1982 | Leeds et al. | |
| 4,363,263 | A | 12/1982 | Williams | |
| 4,399,157 | A * | 8/1983 | Caporaso | 426/108 |
| 4,476,686 | A | 10/1984 | Madsen et al. | |
| 4,552,600 | A | 11/1985 | Laiewski et al. | |
| 4,569,204 | A | 2/1986 | Ott et al. | |
| 4,576,278 | A | 3/1986 | Laiewski et al. | |
| 4,594,253 | A | 6/1986 | Fradlin | |
| 4,642,239 | A | 2/1987 | Ferrar et al. | |
| 4,685,274 | A * | 8/1987 | Garwood | 53/433 |
| 4,744,199 | A | 5/1988 | Gannon | |
| 4,798,324 | A | 1/1989 | Gannon | |
| 4,813,543 | A * | 3/1989 | Goldberg | 206/507 |
| 4,818,548 | A * | 4/1989 | Cheng | 426/265 |
| 4,840,271 | A | 6/1989 | Garwood | |
| 4,987,725 | A | 1/1991 | Gill | |
| 4,992,287 | A | 2/1991 | Dreano | |
| 5,025,611 | A | 6/1991 | Garwood | |
| 5,034,235 | A | 7/1991 | Dunn et al. | |
| 5,042,540 | A | 8/1991 | Gorlich | |
| 5,087,462 | A * | 2/1992 | Bekele et al. | 426/129 |
| 5,103,618 | A | 4/1992 | Garwood | |
| 5,115,624 | A | 5/1992 | Garwood | |
| 5,129,512 | A | 7/1992 | Garwood | |
| 5,155,974 | A | 10/1992 | Garwood | |
| 5,226,531 | A | 7/1993 | Garwood | |
| 5,306,466 | A * | 4/1994 | Goldsmith | 422/58 |
| 5,323,590 | A | 6/1994 | Garwood | |
| 5,334,405 | A | 8/1994 | Gorlich | |
| 5,348,752 | A | 9/1994 | Gorlich | |
| 5,352,467 | A | 10/1994 | Mitchell et al. | |
| 5,393,547 | A | 2/1995 | Balaban et al. | |
| 5,419,101 | A | 5/1995 | Gorlich et al. | |
| 5,433,142 | A | 7/1995 | Roth | |
| 5,447,736 | A | 9/1995 | Gorlich | |
| 5,460,833 | A | 10/1995 | Andrews et al. | |
| 5,478,990 | A * | 12/1995 | Montanari et al. | 235/375 |
| 5,479,759 | A | 1/1996 | Gorlich et al. | |
| 5,481,852 | A | 1/1996 | Mitchell | |
| 5,503,858 | A * | 4/1996 | Reskow | 426/1.19 |
| 5,514,392 | A | 5/1996 | Garwood | |
| 5,520,005 | A | 5/1996 | Appolonia | |
| 5,534,282 | A | 7/1996 | Garwood | |
| 5,547,694 | A | 8/1996 | Perry et al. | |
| 5,560,182 | A | 10/1996 | Garwood | |
| 5,590,602 | A | 1/1997 | Peck et al. | |
| 5,591,496 | A | 1/1997 | Anderson et al. | |
| 5,597,561 | A | 1/1997 | Kross | |
| 5,597,597 | A | 1/1997 | Newman | |
| 5,597,599 | A | 1/1997 | Smith et al. | |
| 5,622,725 | A | 4/1997 | Kross | |
| 5,628,959 | A | 5/1997 | Kross | |
| 5,629,060 | A | 5/1997 | Garwood | |
| 5,651,977 | A | 7/1997 | Kross | |
| 5,655,708 | A | 8/1997 | Gröne | |
| 5,667,817 | A | 9/1997 | Kross | |
| 5,667,827 | A | 9/1997 | Breen et al. | |
| 5,668,634 | A | 9/1997 | Newman | |
| 5,676,736 | A | 10/1997 | Crozel | |
| 5,686,126 | A | 11/1997 | Noel et al. | |
| 5,693,354 | A | 12/1997 | Spencer et al. | |
| 5,698,250 | A | 12/1997 | DelDuca et al. | |
| 5,709,897 | A | 1/1998 | Pearlstein | |
| 5,711,978 | A * | 1/1998 | Breen et al. | 426/129 |
| 5,720,915 | A | 2/1998 | Joppen et al. | |
| 5,730,311 | A | 3/1998 | Curtis | |
| 5,731,023 | A | 3/1998 | Milani | |
| 5,772,985 | A | 6/1998 | Kemp et al. | |
| 5,779,832 | A | 7/1998 | Kocher | |
| 5,811,142 | A * | 9/1998 | DelDuca et al. | 426/124 |
| 5,816,488 | A | 10/1998 | Moeder | |
| 5,823,867 | A | 10/1998 | Roth et al. | |
| 5,833,894 | A | 11/1998 | Lanzani et al. | |
| RE36,064 | E | 1/1999 | Davidson et al. | |
| 5,865,293 | A | 2/1999 | Napadow | |
| 5,871,795 | A | 2/1999 | Roth | |
| 5,882,916 | A | 3/1999 | Wiersma | |
| 5,885,637 | A | 3/1999 | Roth et al. | |
| 5,885,640 | A | 3/1999 | Andersson | |
| 5,944,749 | A | 8/1999 | Fenn | |
| 5,948,457 | A | 9/1999 | DelDuca et al. | |
| 5,950,402 | A | 9/1999 | Hoddinott | |
| 5,994,706 | A | 11/1999 | Allen et al. | |
| 5,996,155 | A | 12/1999 | Chao et al. | |
| 6,010,727 | A | 1/2000 | Rosenthal | |
| 6,036,918 | A | 3/2000 | Kowanko | |
| 6,039,991 | A | 3/2000 | Ruozi | |
| 6,042,859 | A | 3/2000 | Shaklai | |
| 6,046,243 | A | 4/2000 | Wellinghoff et al. | |
| 6,054,161 | A | 4/2000 | Palmer | |
| 6,054,164 | A | 4/2000 | Roth | |
| 6,063,425 | A | 5/2000 | Kross et al. | |
| 6,066,348 | A | 5/2000 | Yuan et al. | |
| 6,085,930 | A | 7/2000 | Curtis | |
| 6,086,833 | A | 7/2000 | Conners et al. | |
| 6,096,350 | A | 8/2000 | Kemp et al. | |
| 6,120,731 | A | 9/2000 | Kross et al. | |
| 6,123,966 | A | 9/2000 | Kross | |
| 6,142,067 | A | 11/2000 | Roth | |
| 6,148,249 | A | 11/2000 | Newman | |
| 6,162,477 | A | 12/2000 | Crisinel et al. | |
| 6,167,709 | B1 | 1/2001 | Caracciolo, Jr. et al. | |
| 6,180,585 | B1 | 1/2001 | Schalitz et al. | |
| 6,183,807 | B1 | 2/2001 | Gutzmann et al. | |
| 6,194,012 | B1 | 2/2001 | Palmer | |
| 6,200,618 | B1 | 3/2001 | Smith et al. | |
| 6,210,730 | B1 | 4/2001 | Mitchell | |
| 6,231,435 | B1 * | 5/2001 | Pilger | 452/157 |
| 6,257,401 | B1 * | 7/2001 | Mangla et al. | 206/204 |
| 6,285,030 | B1 | 9/2001 | Williams et al. | |
| 6,294,791 | B1 | 9/2001 | Williams et al. | |
| 6,328,909 | B1 | 12/2001 | Kross et al. | |
| 6,331,272 | B1 | 12/2001 | Sims | |
| 6,342,261 | B1 | 1/2002 | Spencer | |
| 6,349,526 | B1 | 2/2002 | Newman | |
| 6,379,728 | B1 | 4/2002 | Roth | |
| 6,387,426 | B1 | 5/2002 | Roth | |
| 6,389,838 | B1 | 5/2002 | Roth | |
| 6,406,728 | B1 | 6/2002 | Roth | |
| 6,430,467 | B1 | 8/2002 | D'Amelio et al. | |
| 6,434,950 | B2 | 8/2002 | Newman et al. | |
| 6,546,304 | B2 * | 4/2003 | Thorvaldsson et al. | 700/115 |
| 2001/0042841 | A1 | 11/2001 | Lyons et al. | |
| 2002/0001648 | A1 | 1/2002 | Roth | |
| 2002/0015777 | A1 | 2/2002 | Roth | |
| 2002/0017203 | A1 | 2/2002 | Roth | |
| 2002/0043050 | A1 | 4/2002 | Costello et al. | |
| 2002/0075754 | A1 | 6/2002 | Huber et al. | |
| 2002/0075755 | A1 | 6/2002 | Huber et al. | |
| 2002/0110624 | A1 | 8/2002 | Roth | |
| 2002/0150659 | A1 | 10/2002 | Roth | |
| 2002/0162971 | A1 | 11/2002 | Koenck et al. | |

FOREIGN PATENT DOCUMENTS

| | | | |
|---|---|---|---|
| EP | 0 755 875 A1 | 1/1997 | |
| 2003/0017252 | A1 | 1/2003 | Roth |

FOREIGN PATENT DOCUMENTS

| | | | |
|---|---|---|---|
| EP | 0 820 029 A2 | | 1/1998 |
| EP | 0 649 282 B1 | | 9/1998 |
| EP | 0 820 029 A3 | | 5/1999 |
| EP | 0 649 283 B1 | | 2/2002 |
| FR | 2 290 153 | | 4/1976 |
| FR | 2 744 920 A1 | | 8/1997 |
| GB | 393935 | | 6/1933 |
| GB | 484195 | | 5/1938 |
| GB | 2 247 524 A | | 3/1992 |
| GB | 2 285 126 A | | 6/1995 |
| GB | 2 315 584 A | | 2/1998 |
| JP | 361141863 A | * | 6/1986 |
| WO | WO 91/03400 | | 3/1991 |
| WO | WO 91/03407 | | 3/1991 |
| WO | WO 91/10593 | | 7/1991 |
| WO | WO 92/10939 | | 9/1992 |
| WO | WO 93/17562 | | 9/1993 |
| WO | WO 93/25082 | | 12/1993 |
| WO | WO 94/00997 | | 1/1994 |
| WO | WO 94/06689 | | 3/1994 |
| WO | WO 94/24875 | | 11/1994 |
| WO | WO/94/24875 A1 | | 11/1994 |
| WO | WO 94/27868 | | 12/1994 |
| WO | WO 95/10944 | | 4/1995 |
| WO | WO 96/24470 | | 8/1996 |
| WO | WO 99/12664 A1 | | 3/1999 |
| WO | WO 99/13741 A1 | | 3/1999 |
| WO | WO 01/11993 A1 | | 2/2001 |

OTHER PUBLICATIONS

"Meat Processing's Missing Link," *Food Quality Magazine*, Oct. 1996.

"Measure for Measure," *The National Provisioner*, 1997.

"In-line Composition Analysis Using Guided Microwave Spectrometry," *Processing*, 1998.

1999 Food Processing Award to Guided Microwave Spectrometry, *Food Processing*, Oct. 1999.

Guided Microwave Spectrometry, Epsilon Industrial product information,1994.

Jordan, S.L., et al., "Augmentation of Killing of *Escherichia coli* O157 by Combinations of Lactate, Ethanol, and Low-pH Conditions," *Applied and Environmental Microbiology*, vol. 65, No. 3, Mar. 1999, pp. 1308-1311.

Food Safety and Inspection Service, "Guidance for Beef Grinders and Suppliers of Boneless Beef and Trim Products," Sep. 2002, 28 pages.

Food Safety and Inspection Service, "FSIS DIRECTIVE 6700.1, Retained Water in Raw Meat and Poultry Products," Nov. 27, 2002 (effective date: Jan. 9, 2003), 11 pages.

Rulis, A.M., "Agency Response Letter, GRAS Notice No. GRN 000083," U.S. Food and Drug Administration, Office of Food Additive Safety, Feb. 21, 2002, 3 pages.

* cited by examiner

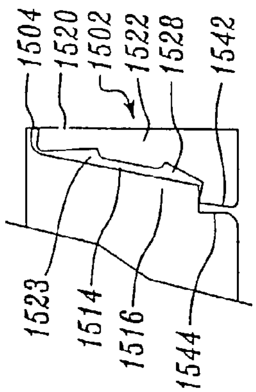
Fig. 57.
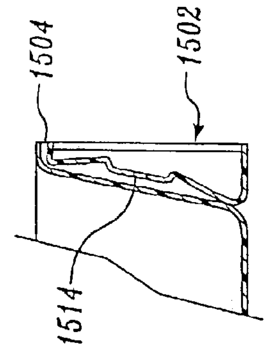
Fig. 58.
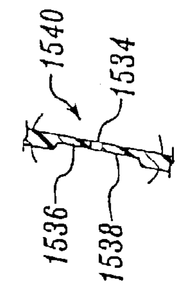
Fig. 60.
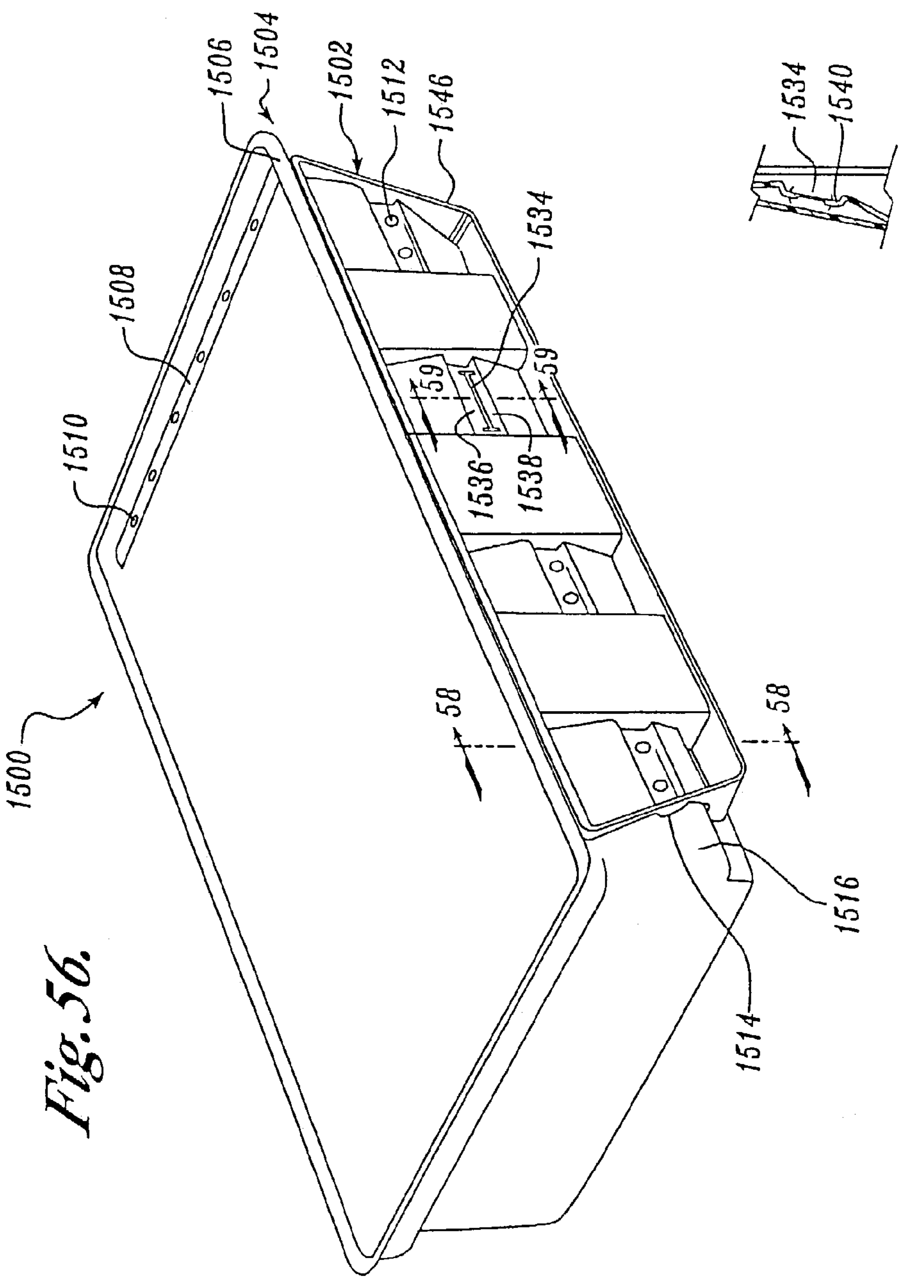
Fig. 56.
Fig. 59.

Fig. 88.
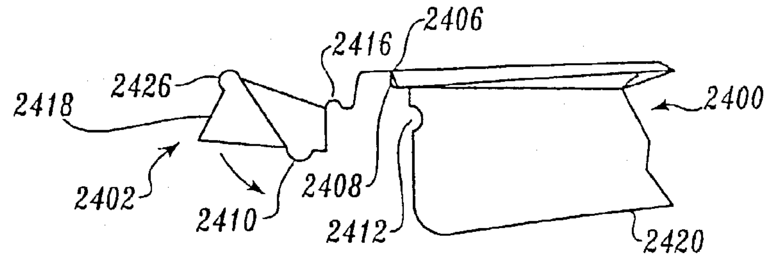
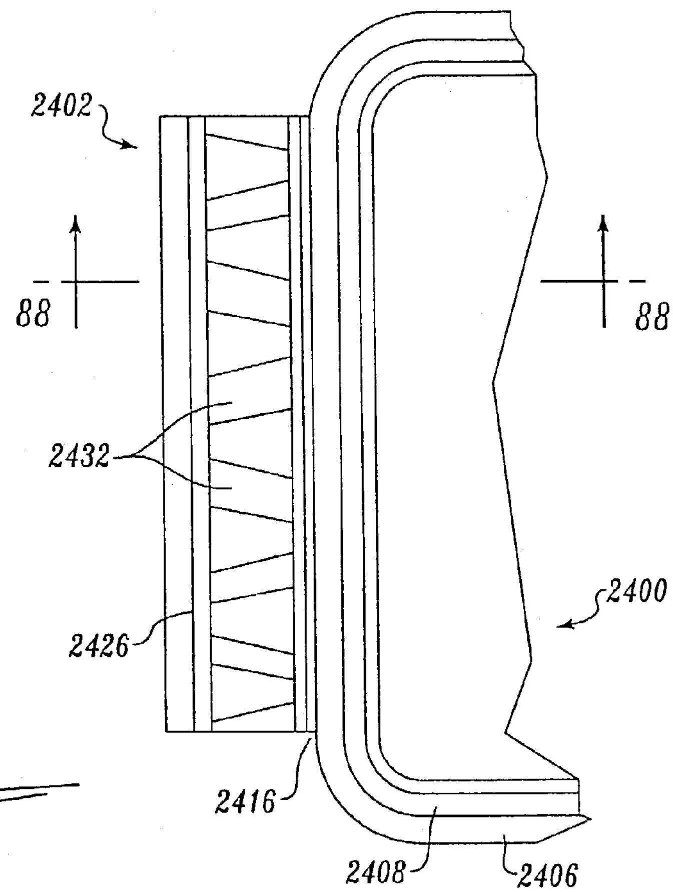
Fig. 89.
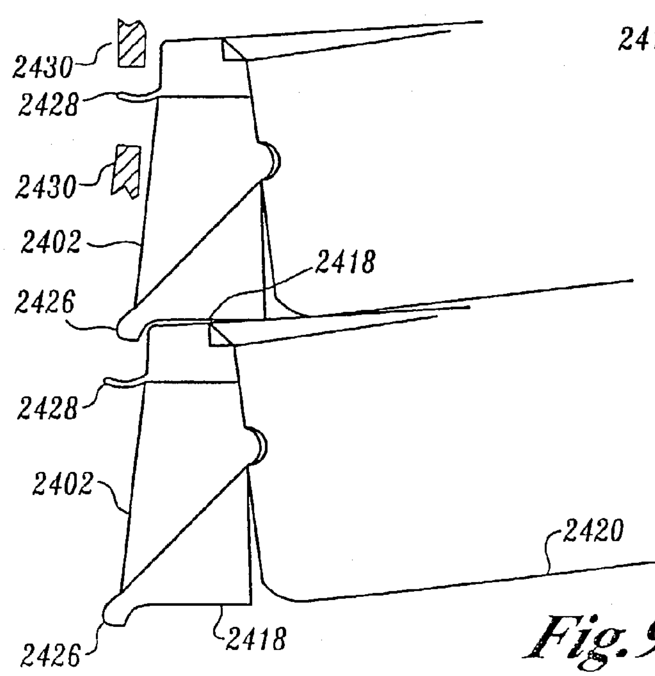
Fig. 90.

*Fig. 94.*
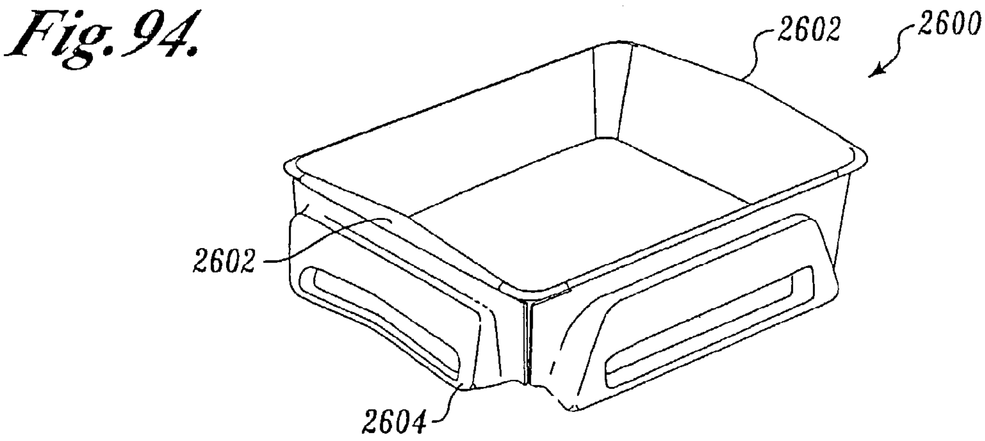
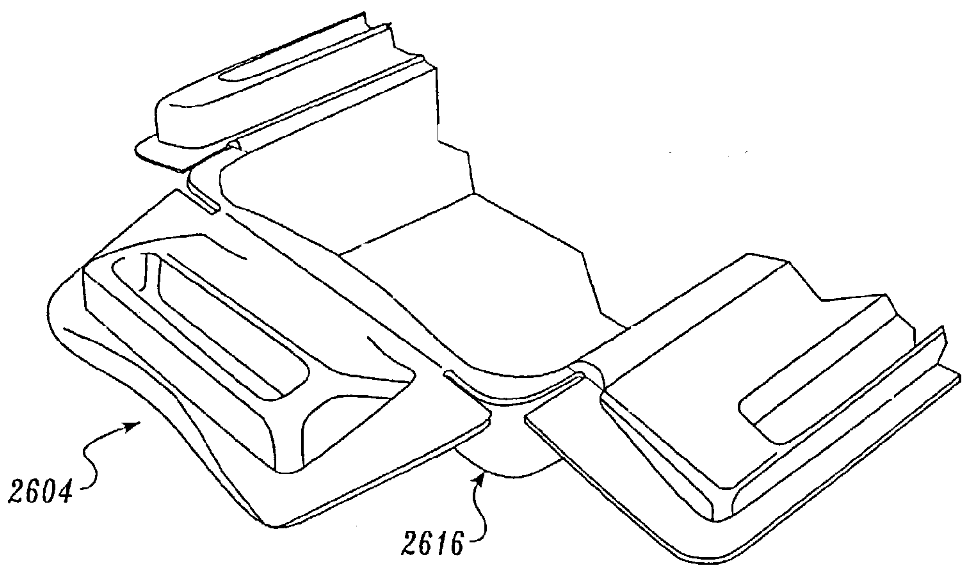
*Fig. 95.*
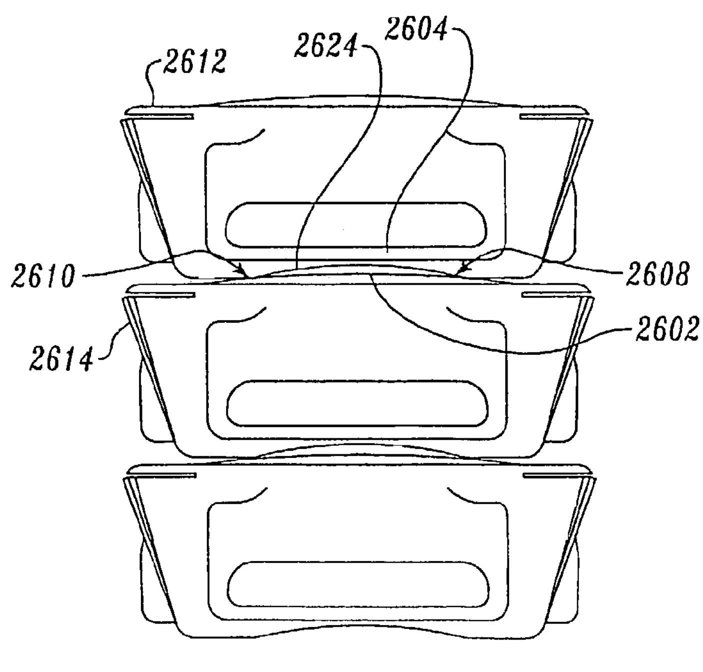
*Fig. 96.*

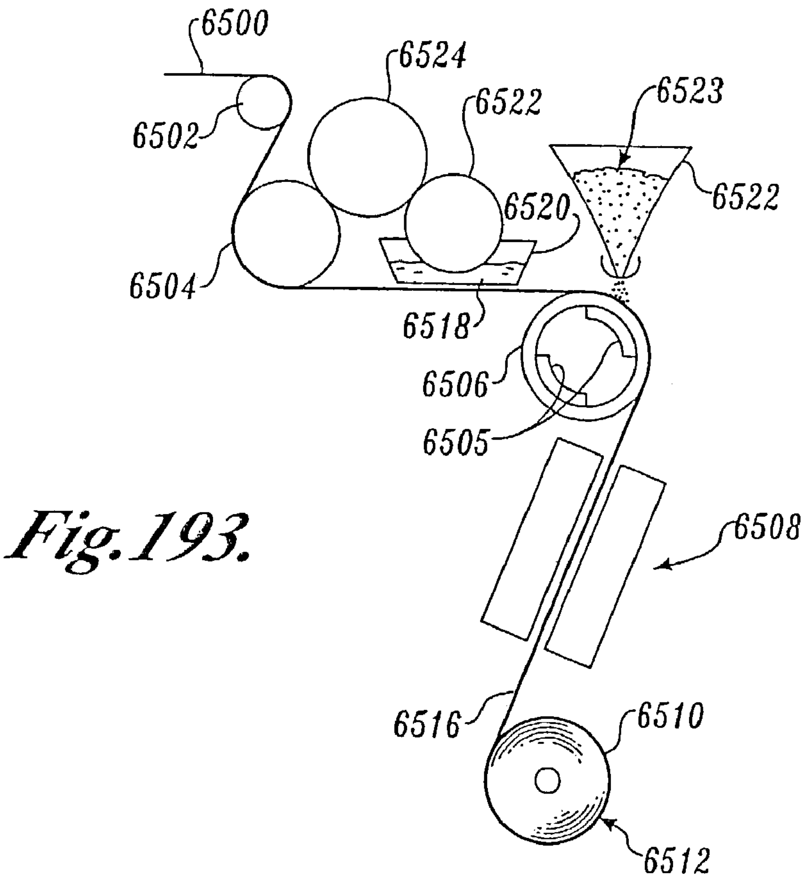
Fig.193.
Fig.194.
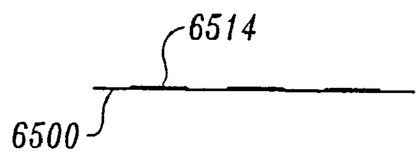
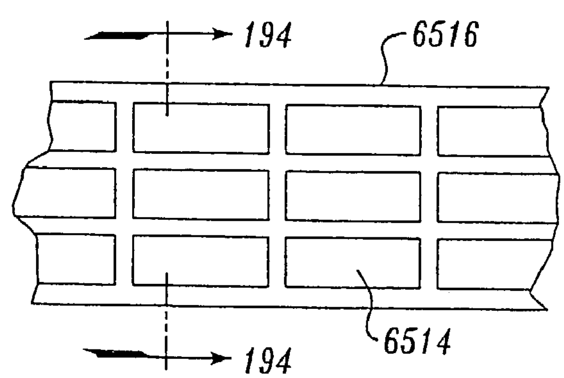
Fig.195.

Fig.222.
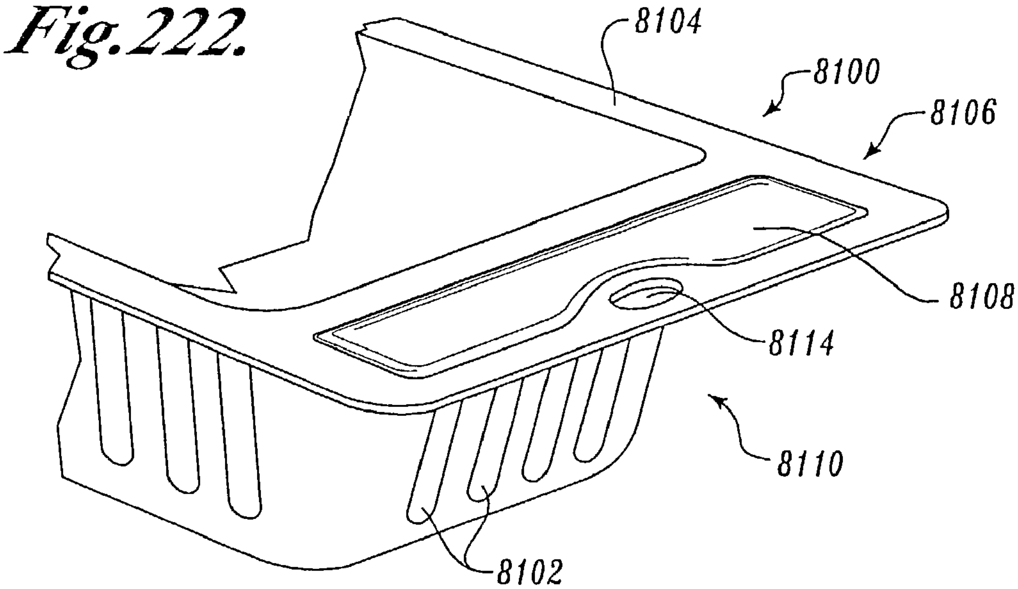
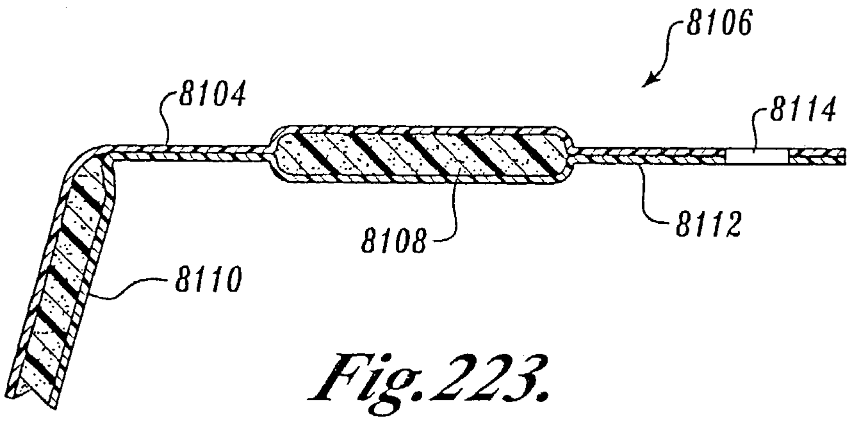
Fig.223.
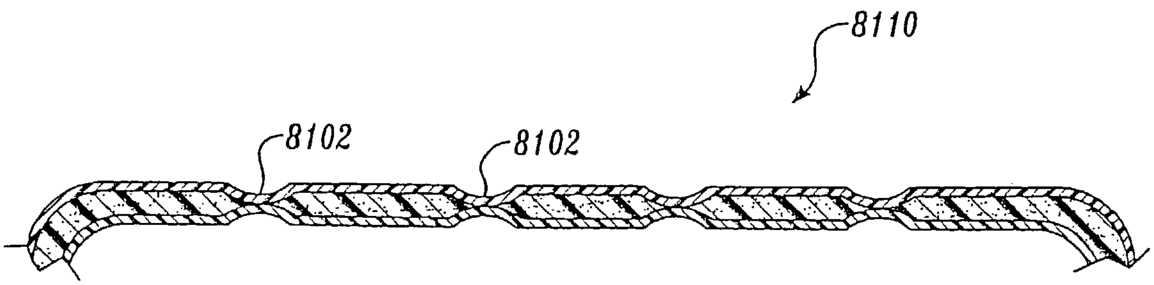
Fig.224.

Fig.241A.
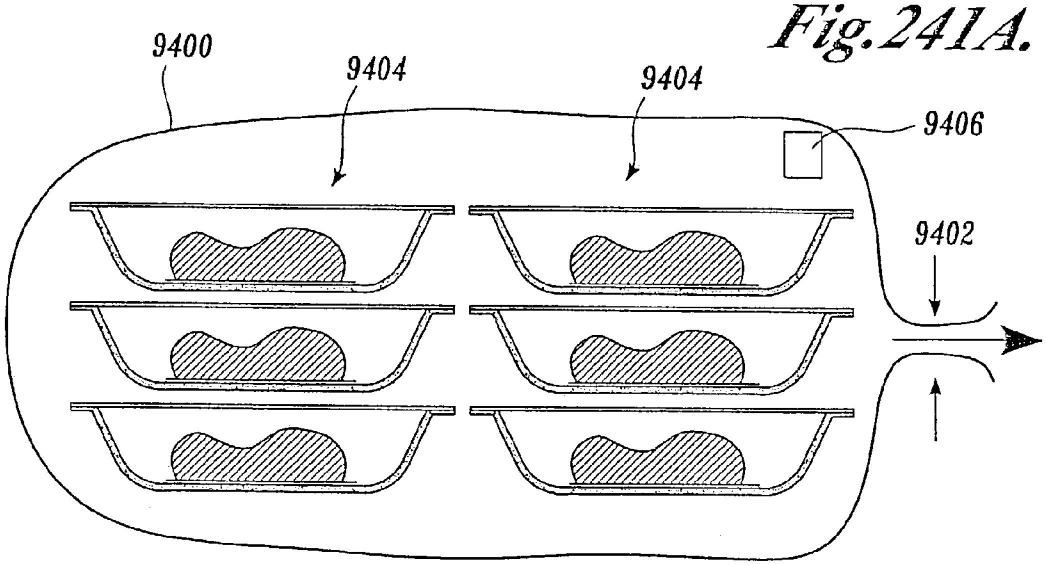
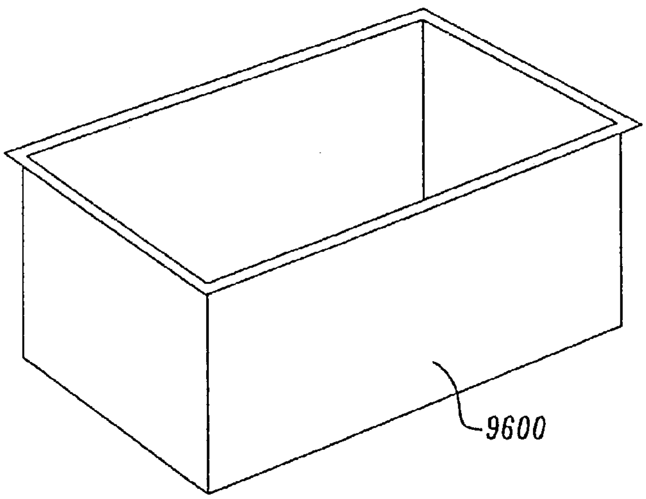
Fig.241B.
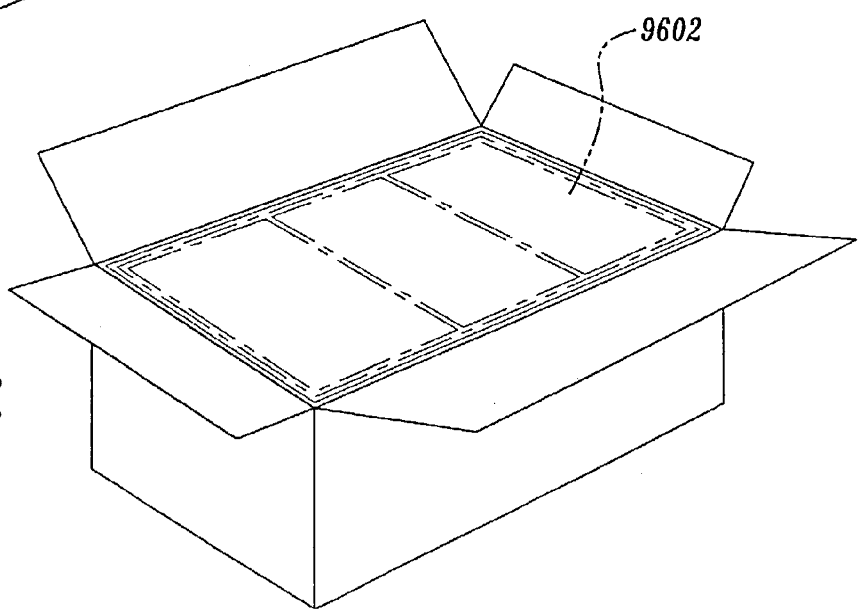
Fig.242.

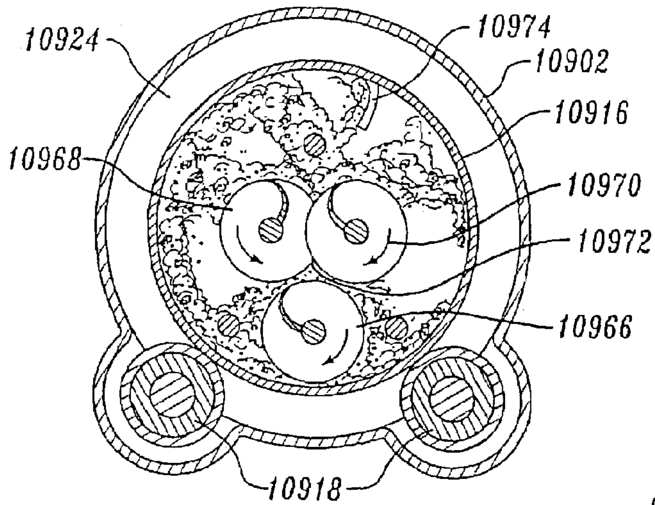
Fig.274.
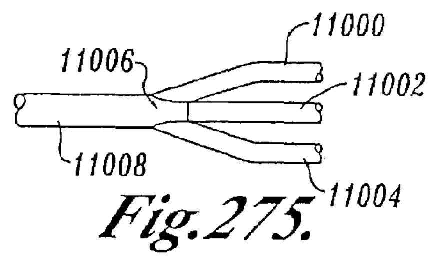
Fig.275.
Fig.276.
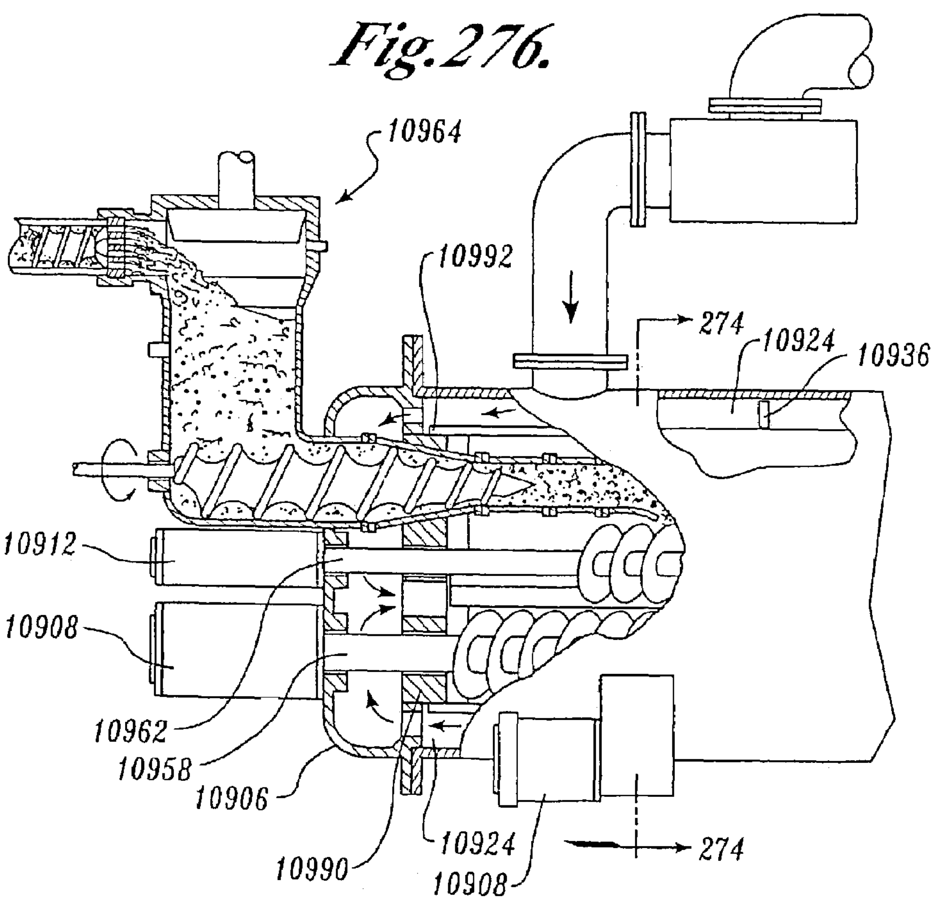

Fig.281.
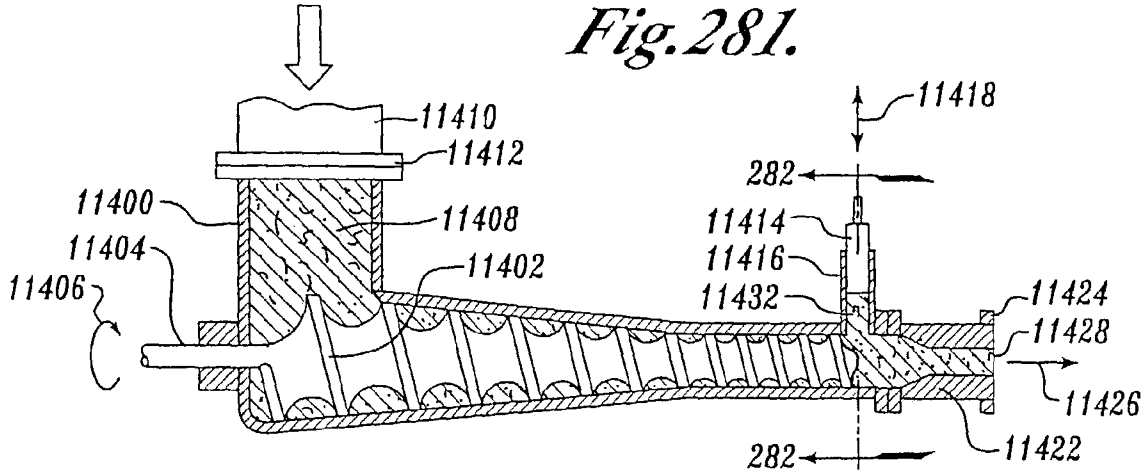
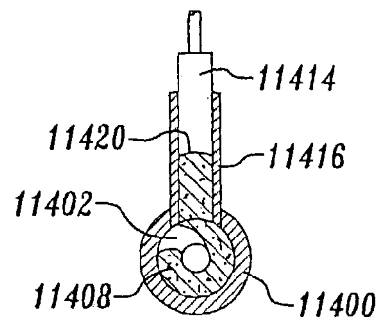
Fig.282.
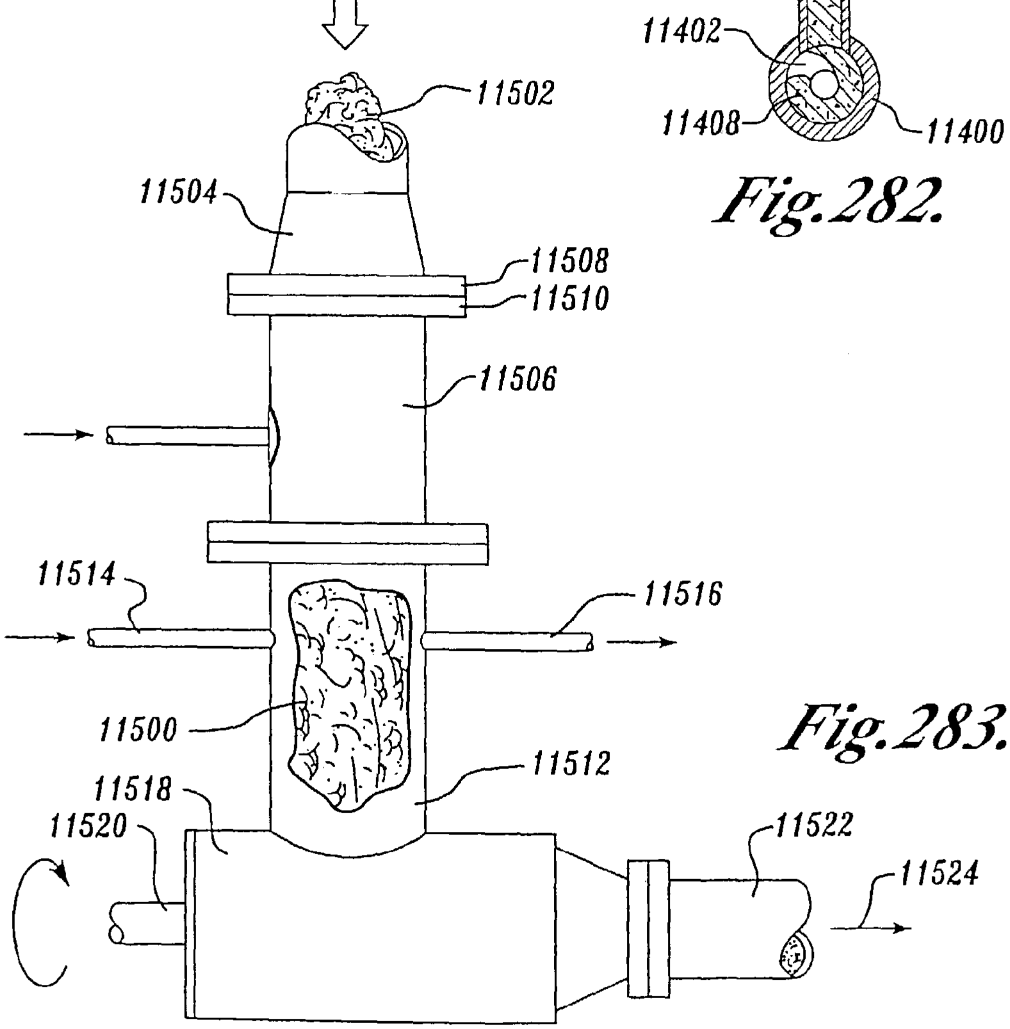
Fig.283.

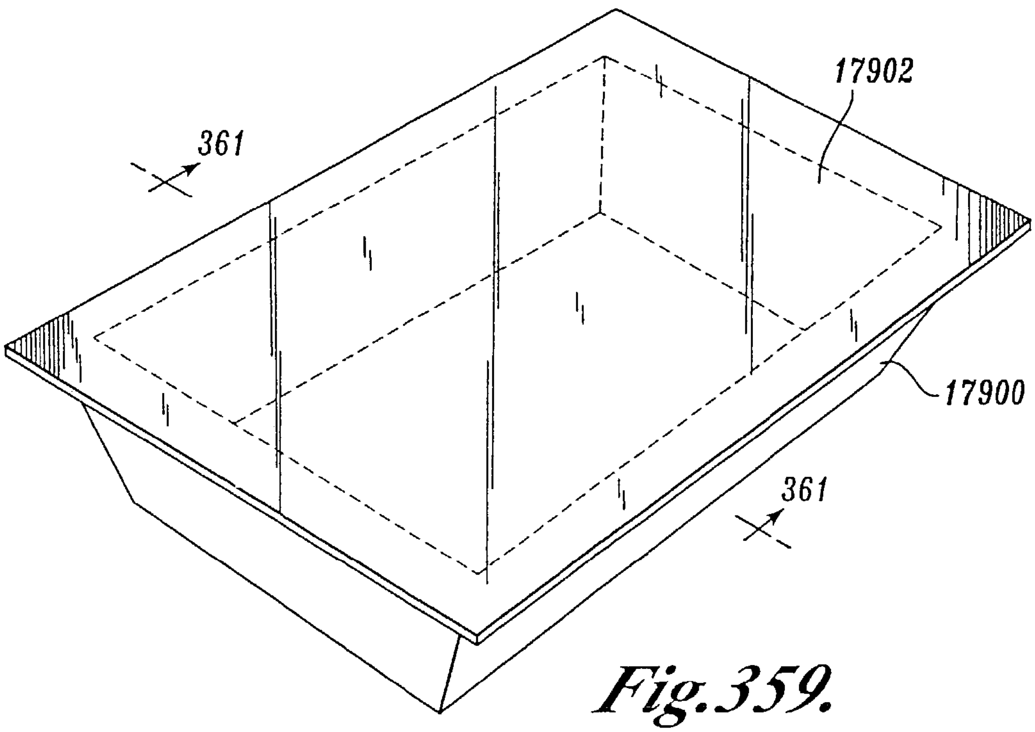
Fig.359.
Fig.360.
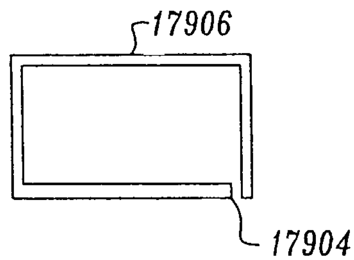
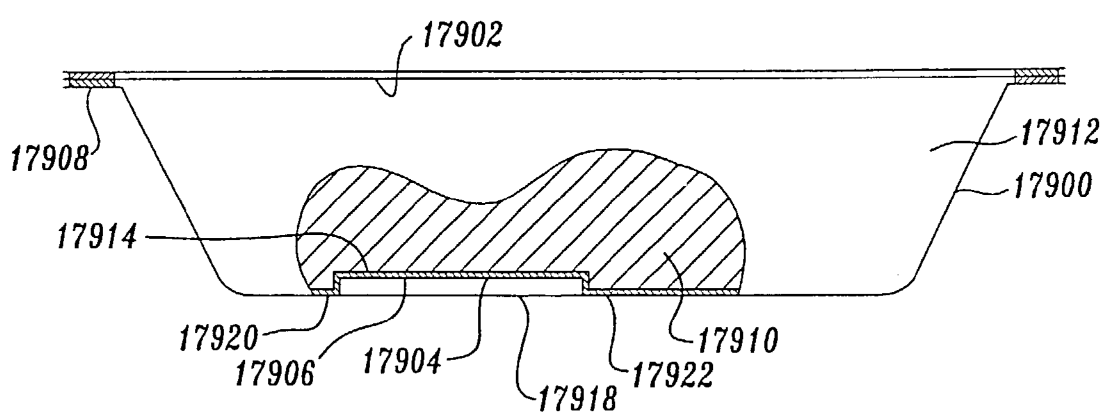
Fig.361.

PACKAGES AND METHODS FOR PROCESSING FOOD PRODUCTS

CROSS-REFERENCE TO RELATED APPLICATIONS

This application is a divisional of application Ser. No. PCT/US01/45146, filed Nov. 28, 2001, which is a continuation-in-part of application Ser. No. 09/724,287, filed Nov. 28, 2000, which is a continuation-in-part of application Ser. No. PCT/US00/29038, filed Oct. 19, 2000, which is a continuation-in-part of application Ser. No. 09/550,399, filed Apr. 14, 2000, now abandoned, which is a continuation-in-part of application Ser. No. 09/392,074, filed Sep. 8, 1999, now abandoned, which is a continuation of application Ser. No. 09/039,150, filed Mar. 13, 1998, now abandoned, which claims the benefit of Provisional Application No. 60/040,556, filed Mar. 13, 1997. application Ser. No. 09/550,399 claims the benefit of Provisional Application Nos. 60/129,595, filed Apr. 15, 1999; 60/141,569, filed Jun. 29, 1999; 60/144,400, filed Jul. 16, 1999; 60/148,227 filed Jul. 27, 1999; 60/149,938, filed Aug. 19, 1999; 60/152,677, filed Sept. 7, 1999; 60/154,068, filed Sep. 14, 1999; 60/160,445, filed Oct. 19, 1999; and 60/175,372, filed Jan. 10, 2000, application Ser. No. PCT/US01/45146 claims the benefit of 60/255,684, filed Dec. 13, 2000; 60/286,688, filed Apr. 26, 2001; 60/291,872, filed May 17, 2001; 60/299,240, filed Jun. 18, 2001; 60/312,176, filed Aug. 13, 2001; 60/314,109, filed Aug. 21, 2001; 60/323,629, filed Sep. 19, 2001; and 60/335,760, filed Oct. 19, 2001.

FIELD OF THE INVENTION

The present invention relates to methods and apparatus, and the products made therefrom from processing and packaging under conditions of reduced oxygen for substantially decontaminating and prolonging the shelf life of perishable goods, such as beef.

BACKGROUND OF THE INVENTION

A problem in the meat packing industry is the formation of metmyoglobin and growth of aerobic bacteria on finished packages of meat, reducing the shelf life of meat and ending in vast amounts of waste. Metmyoglobin is an oxygenated form of myoglobin, a protein in meat. The problem arises when the meat, in either ground or sliced form, is exposed to air for too long. Deoxymyoglobin is a precursor protein which when oxygenated forms oxymyoglobin in a normal atmosphere of oxygen. Oxymyoglobin is responsible for the bright red color of meat which is desirable. When oxymyoglobin is immersed in a substantially oxygen deficient atmosphere, the process reverses itself and the oxymyoglobin will reduce, yielding oxygen in gas form or dissolved in the surface water of the meat. If the free gas space in the package is very small, such as a chubb package, or even a vacuum package, the relative percentage volume of oxygen can become very high. This can lead to metmyoglobin formation, discoloration and growth of aerobic bacteria in the areas of high oxygen concentration.

Previous methods of controlled atmosphere or modified atmosphere packaging have sought to eliminate oxygen in packages, however, not realizing the detrimental effect that oxygen trapped in the form of oxymyoglobin can have, once packaged. Bright red meat, full of oxymyoglobin, packaged in low oxygen will inevitably result in the worst looking meat. Attempts to deal with this included using oversized packages with excess amounts of free space in the package.

Further, methods of processing beef are beset with other inefficiencies and problems.

For example, typically all carcasses are chilled prior to further processing, yet the carcasses contain a great deal of bone and other materials that are not used for human consumption and yet the entire carcass is chilled prior to processing. Furthermore, the shape of meat primals made into food items used for human consumption are of irregular and inconvenient profile. Conversely, packaging trays that have been cost effectively and efficiently manufactured, are invariably rectangular and/or square in profile. By adopting procedures disclosed herein, it will be seen that costs of chilling are reduced since, for example, the skeleton can be removed before chilling thereby saving costs of such chilling process. Fresh red meat tissue is typically quite soft and easy to cut immediately after the animal has been slaughtered and prior to the natural, "hardening" effects of rigor mortis has occurred. It can therefore be easier and quicker to cut primal portions from animal carcasses, during the normal animal "disassembly" process prior to rigor mortis and chilling. Those fresh red meat primal items, that are intended for human consumption, can then be shaped by placing into molds of a specifically designed and desired profile prior to rigor mortis and then chilled during the natural rigor mortis process. This device will provide a method to change and adjust the shape of fresh red meat primal items so that, for example, fresh red meat primal items can be readily and automatically processed during the slicing and cutting process as required prior to packaging. Furthermore, profiles of primal meat portions can be fixed so as to be more convenient when slices of fresh red meat primal items are loaded into improved packaging, such that packaging volume can be efficiently utilized, while still maintaining a space efficient, appealing and attractive appearance for the consumer at the point of retail display and/or food service outlet.

Typical modified atmosphere packages for fresh foods, such as red meats and other perishable foods, have a limited shelf life, and typically include a thermoformed tray or other package composed of EPS/tie/PE (barrier foam trays) plastics material or other suitable substantially gas impermeable material, i.e., tray, overlaid with a single transparent web of plastics material that can be heat sealed to the tray. A typical substantially gas impermeable heat scalable composite web includes a biaxially oriented polyester (PET) layer/tie layer/gas barrier layer (such as PVDC) an adhesive layer/heat sealing layer (such as polyethylene), which in turn is finally adhered by a heat sealer to the tray. The polyethylene layer is a heat sealable layer that is tied to a gas barrier layer such as polyvinylidene chloride which is in turn adhered to polyester. Because of the diverse types of materials that are employed in the foregoing package, it is difficult to reprocess and recycle the post-consumer package. Moreover, the cost associated with post-consumer recycling of multiple layer plastics material renders the process impractical and substantially not economically feasible.

Commonly used modified atmosphere packages for fresh foods such as red meats and other perishable foods having a limited shelf life typically comprise a tray thermoformed from a sheet of EPS (expanded polystyrene) laminated to a web of substantially gas impermeable web material or other suitable substantially gas impermeable material. A lid, such as a single or composite transparent web of plastics material that can be bonded to the flanges of the tray. Both tray and lid materials are typically substantially gas impermeable heat sealable composite structures and cannot be readily recycled. Lid material typically comprises a laminated structure including several layers such as bi-axially oriented polyester bonded to a gas barrier layer (such as PVDC) which is sandwiched between an adhesive or heat sealing layer (such as polyethylene). Because of the diverse types of materials that are employed in the foregoing package, it is difficult to reprocess and recycle the "post-consumer" package. Moreover, the cost associated with post-consumer recycling of multiple layer plastics material, such as the aforementioned, renders the process impractical and substantially not economically feasible.

A further limitation of packaging perishable goods such as fresh red meats in hermetically sealed gas barrier packages results from the need to enclose a relatively large volume of gas, within the package. Clearly, consumers have no interest in purchasing these gasses that accompany the red meat. Minimizing the size and bulky appearance of such packaging is desirable. Additionally, a major proportion of red meat production occurs at locations that are located at a substantial distance from the point of retail sale of red meats to consumers. Most U.S. beef is produced in the central plains around Kansas, Nebraska and Iowa and the major markets are situated on the coastal regions such as New York or California. Costs of shipping these fresh red meat items from the point of production and packaging can be reduced if the packages are reduced in volume. However, reduction in the volume of gases provided within a package can have a deleterious effect on shelf life of the perishable goods and red meat contained therein as explained above.

The packaging industry has therefore felt the need for simplified individual packaging structures that will provide finished package performance including label requirements for a variety of applications. Additionally, if the packaging can be handled economically both in the pre-consumer handling and in post-consumer recycling, significant economic advantages are available.

With conventional packaging of meats and other perishable type goods, the shelf life is limited due to bacterial growth within the package. The growth can be inhibited when the package contains carbon dioxide gas, however, carbon dioxide will dissolve in liquids such as water contained within the goods in the package. After time, carbon dioxide can become substantially dissolved in the water, limiting the shelf life. When carbon dioxide dissolves into liquids and water, this can cause the package to collapse inwardly. Collapsing causes the appearance of the package to be unacceptable to consumers and can also cause the package to rupture.

In order to extend shelf and storage life of the packaged goods several inventions have been disclosed and examples of known packaging for this purpose are given in the following U.S. patents:

| | | |
|---|---|---|
| 5,779,832 | Kocher | Method and Apparatus for making a peelable film |
| 5,629,060 | Garwood | Packaging with Peelable Lid |
| 5,560,182 | Garwood | Packaging Method |
| 5,534,282 | Garwood | Packing Perishable Goods |
| 5,514,392 | Garwood | Packaging for Perishable Goods |
| 5,323,590 | Garwood | Method of producing food packaging with gas between tensioned film and lid |
| 5,226,531 | Garwood | Food Packaging with gas between tensioned film and Lid |
| 5,155,974 | Garwood | Food Packaging with gas between tensioned film and Lid |
| 5,115,624 | Garwood | Thermoplastic skin packing means |
| 5,129,512 | Garwood | Packaging |

The subject matter of the above patents is hereby incorporated by reference.

Prior art as described in U.S. Pat. No. 5,779,832 to Kocher, discloses a method of making a multilayer peelable film. Kocher discloses a method of co-extruding two webs of material simultaneously in the form of a multilayer film that can be delaminated into a third web and a second web and then, after treating the second web to improve gas permeability therethrough, re-laminating the third and second webs together. These two re-laminated webs can be sealed to a first web of gas barrier material and thereby produce a package. The first web may have a depression formed therein into which goods such as red meat can be placed before heat sealing the third and second webs to the first web. Typically, goods will not completely fill the depression and space will remain in the depression in addition to the goods. A blend of gases or a single gas such as $CO_2$ can be provided in the space with the goods and thereby can contact the goods. After storage and prior to retail display at an intended point of sale to consumers, the third web can be peeled from the package allowing atmospheric oxygen to permeate the second web of gas permeable material and to contact the goods. The atmospheric oxygen can then allow generation of a bright red colored substance such as oxymyoglobin thereby providing an appearance attractive to the consumers.

It has been found that when applying the second and third webs extruded in the manner as disclosed in Kocher to packaging as that disclosed in the inventor's own U.S. Pat. No. 5,534,282, a dull appearance of the second web can result with reduced clarity when compared with other webs of material that are produced in a single web such as plasticized PVC (pPVC). Furthermore, after removal of the third web, from the re-laminated co-extrusion, by peeling, as described in U.S. Pat. No. 5,534,282, distortions and ripples can appear in the second web. This occurs, partly, as a result of inadequate lateral tension provided in the second web when limited by the inherent limitations of co-extruding the second and third webs simultaneously. This can, therefore, severely detract from the visual appearance of the package in the eyes of consumers.

Conventional modified atmosphere "case ready" retail packaged fresh red meats and other perishable type goods experience limited shelf life because of bacterial growth, such as aerobic and anaerobic bacteria, on the packaged goods; rancidity "off flavors" caused, in part, by oxidizing fats; and discoloration to visible meat surfaces. The growth can be inhibited when goods are treated by exposure to certain agents prior to packaging and then providing certain gases and/or other agents with the goods within the finished and sealed package. However, some gases such as carbon dioxide gas, for example, can quickly dissolve in substances such as oils and water contained in the goods. After time, carbon dioxide can become substantially dissolved in water which may limit shelf life. Furthermore, when oxygen is present and more particularly when a quantity of approximately 5,000 to 30,000 parts per million of oxygen is present in a gas within a package, discoloration due to formation of metmyoglobin on the visible surface of red meat, reduces consumer appeal of the packaged goods. When carbon dioxide dissolves (into another substance) the combined volume of the residual substances is substantially reduced which can cause the package to collapse inwardly. Collapsing causes the appearance of the package to be unacceptable to consumers and can also cause the package to rupture and render it unfit for use. In compensating for such a deleterious event, several existing packaging systems require large volumes of gas to be packaged with the goods. However, when large volumes of gas are provided, the resultant "bulky" condition does not provide for cost efficient shipping and distribution from the location of packaging to the point of retail sale of the packaged goods.

Conventional packages for red meat are produced in one or more sizes. When packaging red meats or other perishable goods, the package must conform to the goods. Therefore, if a red meat portion is too large for one size of a package, the next larger size must be used. Oftentimes, this will lead to an overly large sized package introducing inefficiency into the process because of the wasted space. In order to maximize efficient use of the internal space available in a typical road, rail or sea, refrigerated shipping container or trailer, it is important to increase the density and unit weight per unit volume of the packaged perishable goods. The maximized efficient use of the space in the shipping containers can be achieved by adjusting the shape of the inconveniently shaped animal fresh red meat primal portions such that slices of the fresh red meat primal portions will fit and substantially fill the available space within trays of the improved packaging.

High oxygen case ready packages are inefficient, in large part, due to the inherent need to include a quantity/volume of gas that is equal to, or greater than the volume of the package meat contents. For example, a high oxygen package comprising a barrier foam tray and clear barrier film lid, hermetically sealed to flanges of the barrier foam tray and with a 2 lb. quantity of meat sealed therein will require approximately 1 liter of gas to be enclosed and sealed within the package to ensure that an approximate 10 day shelf life extension can be provided. Said gas (referred to as modified atmosphere) will typically comprise 80% Oxygen and 20% Carbon Dioxide but other combinations that may include relatively small quantities (say <10%) of residual atmospheric nitrogen are also typical. The relatively high level of $CO_2$ (when compared to ambient atmosphere) is provided to inhibit bacterial growth, and with good storage temperature control, a shelf life for ground, fresh meat can be extended to over 10 days from packaging. The bacterial controlling effect is a consequence, in part, of a characteristic of bacteria entering a "lag phase" when the environment in which it is placed, significantly changes. Eventually, the bacteria will adapt to the atmosphere that is present and commence normal, reproduction and extended infection. The shelf life extension will vary according to several factors including, for example, the following storage temperature, i.e., the less variation from a minimum temperature of approximately 29.5° F. is optimum, (while ensuring that freezing of the meat, which occurs at about 26–27° F., does not occur); the condition and age of the meat at packaging, the conditions at the point of packaging such as hygiene, temperature etc., muscle type and age of animal from which the meat was harvested. Nevertheless, a shelf life extension of 10 days is readily reproducible when conditions are maintained as required. After a relatively short period of time, the $CO_2$ provided within the package will dissolve into the water and oils contained in the meat and the oxygen is present to ensure that a consumer appealing/acceptable "bloom" or "redness" is maintained. The "bloom" is caused by the natural color of oxymyoglobin and oxyhemoglobin that is present in freshly cut meat but when oxygen is present, after approximately 9 to 10 days discoloration such as browning due to increased levels of surface metmyoglobin will occur, rendering the product unsalable or requiring a reduction in price to sell to a consumer. Furthermore, the excessive volume of the finished packages, results in excessive packaging material and shipping costs and display case space at retail outlets and also excessive costs incurred for disposal of additional cardboard, etc., at the supermarket outlets.

Effective packaging materials for existing, extended shelf life, retail packaged, case ready perishable goods are often relatively expensive and the associated packaging processes are typically labor intensive. The use of EPS and FP can provide desirable low cost packaging materials but the inherent cell structure of these materials can retain residual oxygen (from air) within the cell structure, even during and after exposure to very low levels of air pressure (vacuum). When EPS and FP materials are used in low residual oxygen modified atmosphere packaging, such as described in U.S. patent application Ser. No. 09/039,150, residual oxygen can diffuse and exchange from the cell structure, and become present as a free gas within the master container thereby elevating the level of oxygen present therein to a potentially undesirable level. As described in the subject matter of U.S. patent applications in the name of the present inventor, apparatus for minimizing the level of residual oxygen retained in the cell structure and master containers are disclosed. However, such a process of gas exchange is problematic and difficult to reliably maintain. Therefore, packaging fabricated from solid plastics sheet, may be more efficiently employed in this present application.

Conventional "master container" or "master package" modified atmosphere packaging (MAP) systems include loading perishable goods into trays and then a plurality of loaded trays are subsequently placed into a larger "master container" which may be manufactured from a suitable gas barrier material. The "master container" is typically evacuated of air and then filled with a gas blend that may include a mixture of any desirable gases which may include, for example, 40% carbon dioxide and 60% nitrogen for a low oxygen MAP system. The master container is then sealed with loaded trays to provide an airtight, sealed master container, containing loaded trays and a gas blend with a residual quantity of atmospheric oxygen. Most desirably, for low oxygen MAP systems, the residual quantity of atmospheric oxygen will not exceed an amount of 100 to 300 PPM (parts per million) with the balance of the gas blend including nitrogen and carbon dioxide and/or other inert or oxygen free gases. Low cost packaging materials include foamed polystyrene (EPS trays), however, the choice of material for tray manufacture must exclude materials (unless treated in a manner that will substantially remove atmospheric oxygen from the cell structure), such as expanded (foamed) polystyrene (EPS), that have a capacity to "retain" air, even after exposure to a high vacuum as may occur in packaging processes. Therefore, in order to maintain the residual quantity of atmospheric oxygen at not more than 100 PPM, untreated expanded (foamed) polystyrene (EPS) or FP trays cannot be easily and efficiently used. By way of explanation, EPS trays are typically thermoformed from extruded EPS sheets. A typical method of producing an EPS sheet is to "foam" the melted (liquid) polystyrene by injection of a foaming agent, such as nitrogen, carbon dioxide or pentane, into liquid polystyrene thereby causing it to foam (become frothy, with bubbles and/or tiny gas filled cells within the foam) and then extrude the foam through a slot in a flat or annular die. The extruded EPS can then cool and solidify into a sheet that can be slit and wound onto a roll prior to further processing. Immediately after extrusion of the EPS sheet, cells retained within the foam are filled with nitrogen or other gas (foaming agent) used in the foaming process. However, such a foaming agent gas, if not retained by other means in the cell structure, can quickly exchange with the ambient air during storage and the cells can become filled with air. When placed within a vacuum chamber and exposed to a high level of vacuum, as is normal in a "master container "packaging process for low oxygen MAP systems, cells can retain a quantity of air, even during and subsequent to evacuation (unless the exposure to vacuum is significantly extended to the extent required). The retained quantity of air in the cells, can subsequently exchange with gas within the sealed "master container" which can, thereby, elevate the residual oxygen content of the "free" gas contained within the "master container" above a desirable level.

A fundamental need that resulted in the development of thermoformed EPS trays initially arose in the modem supermarket. Fresh meats and poultry were processed and retail packaged at the supermarket immediately prior to retail display and sale. EPS foam trays were developed to meet these supermarket requirements, and have provided a functional and low cost retail package, when "over wrapped" with, a low cost web of plastic material such as plasticized PVC. However, with case ready MAP systems, such EPS trays are now required to be shipped in trucks and other means of transport from the point of packaging, which may be located many hundreds of miles from the point of sale. Abuse and damage can occur to the packaging during this shipping. In an effort to protect against damage, rigid and heavy weight cartons with sheets, cushions' and/or columns, made from suitable materials such as chipboard are manufactured and assembled with EPS trays and goods contained therein. Such protective packaging is expensive, bulky and results in excessive shipping costs. Furthermore, excessive packaging, as required for the sole purpose of protection during shipping, must be discarded at the supermarket thereby creating excessive waste disposal problems with the attendant costs to the environment. It would therefore be desirable to produce rigid packages and containers that can withstand the abuse of long transportation routes.

Typically meat packing companies slaughter cattle and then process the dressed carcass by chilling and then disassembling the carcass into portions of meat which can then be, in part, delivered to the point of sale to consumers, in vacuum packs. However, approximately 40% of the disassembled meat is processed by coarse grinding and then blended to provide ground meat with a selected with a selected fat and lean content as required by the retailer. The fat and muscle content of the ground meat may be, for example, 20% fat and 80% lean. Typical current processing methods require that the boneless meat be firstly coarse ground then blended, vacuum packaged, delivered to a supermarket or packaging facility close to the consumer where the coarse ground meat is fine ground and then retail packaged immediately prior to retail display. This conventional process inherently results in excessive exposure of the ground meat to ambient atmosphere including oxygen during the grinding and blending process at the point of slaughter. Furthermore, this process requires that relatively large quantities of ground beef are blended together in a single batch. Because it is not possible to disassemble a carcass and provide boneless meat therefrom with a precise and selected ratio of fat to muscle tissue, the typical batch blending process often requires several attempts to produce the desired ratio of fat to lean content. The general industry practice is to deposit selected boneless beef with a fat to lean ratio as close to a desired tolerance as possible. The selected boneless beef may have a fat to lean ratio of 15% fat to 85% lean +/−5%. Typically, a sample of the blended boneless beef is then removed from the blender and then can be tested to determine fat and lean content using, for example, a device known as an Analray testing procedure. After determining the fat and muscle content of the coarse ground meat, additional fat or lean meat is added to the batch blender and the full batch is again blended for a period of time and then a second sample is extracted and tested to determine fat and lean content. If the fat and lean content is as required at this point, the batch of coarse ground meat can be vacuum packaged and stored in refrigerated facilities prior to delivery to the point of retail sale. However if the fat and lean content is not as required, then, additional fat or lean meat can be added to the batch and further mixing is then required. This process is often repeated as many as 5 times or more. Each time the coarse ground meat is blended again it is damaged by the blending process. This damage may include "fat smear" or over heating. Heat is generated during this blending process and "fat smear" occurs when the meat has been exposed to excessive blending. This procedure is expensive in terms of energy, labor and equipment time. Furthermore, damage to the ground meat is undesirable and yet damage typically occurs as a matter of normal process with the currently predominant industry procedures. During the process described above the meat is exposed to ambient air and bacteria such as *E. coli* 0157:H7 and other dangerous bacteria can be present in the blended ground meats. Excessive blending can cause the bacteria to spread throughout the batch of meat in the blender.

Ground meat such as ground beef is produced by processing selected portions of boneless meat, including fat and muscle tissues, through a grinding machine. The relative quantities of fat and muscle contained in any batch of the portions of boneless meat is typically arranged to correspond with set industry standards. The batch of boneless meat may include about 93% muscle tissue and therefore the balance of about 7% would be fat. The following TABLE 1 of items 1 to 5, shows the fat and muscle tissue content of some typical industry specifications for boneless meat:

TABLE 1

| Item | Muscle Tissue | Fat Tissue |
|---|---|---|
| 1 | 93% | 7% |
| 2 | 90% | 10% |
| 3 | 75% | 25% |
| 4 | 65% | 35% |
| 5 | 50% | 50% |

Although the industry standards are established, it is difficult to produce large quantity of boneless beef to any specification or ratio of fat and muscle. This difficulty can arise as a result of genetic variation in the animals from which the boneless meat is harvested. Consequently, there is often variations that could be as much as +/−2% to 3%, which corresponds to a possible variation of up to 6% and perhaps even more, in the actual fat or muscle content of the boneless meat.

Typically, consumers can purchase fine ground beef with a fat content that is specified and clearly marked on any retail package. The fat content may be specified to 10%, 25%, or 30% and it is illegal, in several U.S. states, such as California and New York, to sell such retail products to consumers if the fat content is higher than the amount shown on the retail package. Therefore, producing retail packages of ground beef with a fat content of, for example, 25%, may be achieved by grinding a known quantity of Item 2 (listed above) and blending this with a known, measured and corresponding quantity of Item 4 (listed above). The fat content of the resulting ground beef can be measured but it is common for the fat content variation in the initial quantity of the boneless beef items to vary to such an extent that a compensating procedure must be accommodated during production of the product for retail packaging. This compensating procedure can often result in production of ground beef that has a muscle content that is higher than is specified on the retail package. The consumer, however, only pays for the ground beef according to the fat content shown on the retail package. Thus a loss of profit for the ground beef producer can be incurred.

Typically, a quantity of boneless beef, with a specified muscle and fat content, for example, Item 5, is loaded into a hopper which is connected directly to a primary meat grinder. The portions of meat are progressively carried, by augers and compressed into a tubular line with a perforated grinding plate fitted across. The grinding plate is typically manufactured from suitably hardened steal and the perforations may include drilled and reamed holes of a chosen diameter, which may be about 0.5" diameter, and which extend completely through the grinding plate. The primary grinder typically produces coarse grinds with the diameter of the meat pieces corresponding with the diameter of the drilled and reamed holes in the grinding plate.

After primary grinding a quantity of Item 5 may be blended with a selected quantity of coarse ground Item 4. After the blending of Item 5 with Item 4 the resultant mix is processed through a secondary fine grinding machine prior to portioning and retail packaging. The secondary fine grinding machine may be similar to the primary coarse grinding machine except that the grinding plate can be drilled and reamed with holes of less than about 0.25" diameter.

Typical fine ground meat for retail packaging and sale to consumers may be produced with fat and muscle content as shown in the following TABLE 2:

TABLE 2

| Item | Muscle Tissue | Fat Tissue |
|---|---|---|
| 1F | 90% | 10% |
| 2F | 75% | 25% |
| 3F | 65% | 35% |

The existing grinding, blending and processing equipment, such as that made by the Weiler/Beehive Company, has been demonstrated as effective for grinding meats of various types. However, little has been proposed to improve the quality of the ground meats by, for example, arranging equipment in such a manner so as to substantially prevent contact of the ground meats with air and/or atmospheric oxygen during the grinding and blending processes. The conventional equipment does not allow for continuously and automatically grinding, measuring and blending the ground meats in such a manner so as to continuously produce quantities of ground meats to an exact and predetermined muscle and fat content. In particular, nothing has been proposed in the way of automatically controlling the fat content.

The present invention provides methods, systems and apparatus to automatically and continuously grind, condition, blend, treat and package the ground meat products with improved accuracy of muscle tissue to fat tissue ratio, so as to minimize losses to the processor. The ground meat can then be packaged in suitable packaging that will enhance the keeping qualities of the products and provide a safer effective method of delivering the goods to consumers.

Bovine Spongiform Encephalophathy (BSE) is an incurable disease, that can "jump" from cows to humans, and is considered (albeit low) a threat to the US beef industry. It has been, typically, contracted by cattle as a consequence of the animal eating "blood & bone meal" that has been used as a component of the animal's feed where the "blood and Bone" meal has been derived from a cow that has BSE. The practice of feeding "blood & bone" to cattle in their feed is now illegal in the USA and many other countries but there is still a risk of the disease being imported from a country that still allows this practice. Furthermore, a cow can become infected by eating as little as 1 gram of contaminated meal. BSE has been reported in 18 countries and is a threat to the US beef industry. BSE is not believed to be contagious and can only be contracted in humans by consuming of a part of the cow. "Foot and Mouth" or "Hoof and Mouth" is also another threat to the US beef industry and all other cloven foot animals.

Some one billion lbs. of boneless beef is imported from Australia and New Zealand, into the USA annually. US Federal legislation may someday dictate the requirement to display information on the retail pack to consumers and show the country of origin as well as all other details as, among other things, a guard against illegal imports from banned source countries such as China.

Global Animal Management (GAM) is a company owned by Schering Plough that has established a system and large computer data-base that is intended to record all information about a beef animal from birth to slaughter. Unfortunately, the value of this information is lost at all US slaughtering plants because they cannot trace the animal through the packing plant disassembly process.

SUMMARY OF THE INVENTION

One broad aspect of the present invention provides for minimizing discoloration of meat due to the formation of metmyoglobin, which occurs as a result from the oxygen released after packaging due to the reduction of oxymyoglobin into oxygen. Therefore, one aspect of the present invention provides methods and apparatus for minimizing the exposure of freshly portioned beef, either freshly sliced or ground, with oxygen. In this manner, freshly ground or sliced beef is packaged with reduced levels of oxymyoglobin present. To this end, a conduit is provided with any suitable gas, devoid of substantial amounts of oxygen. The conduit comprises any and all equipment used in processing and/or packaging the beef. In this manner, meat is packaged in a state that includes relative high amounts of deoxymyoglobin rather than oxymyoglobin. An example of a suitable gas that may be used to practice the invention includes carbon dioxide. The conduit filled with suitable gas is provided from, in some instances, the point of grinding or blending and continues through the point of packaging. However, it is to be realized that any amount of time spent in a suitable gas will result in some benefit to the beef. In this manner, the amount of oxymyoglobin formed on the beef is maintained at a level that does not result in sufficient quantities of oxygen that after packaging would cause the discoloration or formation of oxymyoglobin of the meat to such an extent that the consumer would reject the item.

A further broad aspect of the invention, concerns improved packaging for food items that are packaged under controlled or modified atmospheres. One such food package, is produced that occupies less volume and is sturdier than conventional packages. Furthermore, trays made in accordance with the invention require less material, yet are rigid to withstand the abuse over long transportation. One such tray material is extruded polypropylene (co-polymer) sheet. Some instances of trays are provided with channeling apertures, however, other trays can be provided without them. Some instances of trays are foamed, including cells with gas that can be exchanged with more suitable gasses. However, other trays are solid, not requiring foam cell gas exchange.

Further broad aspects of the invention relate to a method of storing and communicating all the information that pertains to a particular animal carcass onto a container which contains the beef harvested from the particular animal. To this end, certain of the trays made according to the invention are identified with unique markings and the information from the animal is then keyed to each tray. In this manner, the information in the form of a readable device can be carried along with the particular container as the container makes its way in the distribution chain. The information can also be read and stored in a memory bank, and made accessible to all who desire to know such information, such as by the Internet. In one instance, particular use of this information is made for setting a price for the goods at the point of retail or for determining its shelf life. In this manner of pricing, the information can be verified in two ways by reading the tag on each container and also by accessing the information via the communication system. A method of tracing a good from a harvested animal includes associating information pertaining to the animal on a carrying means for the animal or any of its divisions. This information could be stored on an RFID tag, an include such information as country of origin, place or originating location of the animal. In this way, a label can be prepared by being able to trace the origin of the packaged good through the disassembly process.

In one broad aspect, the methods and apparatus of the present invention are directed at saturating or at least dissolving $CO_2$ into fresh meat prior to packaging. And further still, any exposure of the meat with oxygen is sought to be minimized. Adequate $CO_2$ can be dissolved in the tissue of the meat and to such a level that the meat can become a source of $CO_2$ after packaging. This can be achieved by lowering the temperature of the meat to a minimum (about 29.5° F.) and exposing it to relatively high pressure (ambient to 200 psi or more) $CO_2$ gas. $CO_2$ gas dissolves more readily at lower temperatures and therefore a part of the method is to expose the meat to high pressure $CO_2$ at the lowest temperature above freezing and then retail package the meat in a tray, then over wrapped with a highly gas permeable web of material such as pPVC. If an extended shelf life of say not more than 10 days is adequate, then a barrier pouch master container may not be needed, the $CO_2$ gas "entrained" in the meat tissue prior to packaging will gradually be released immediately after removal from a higher pressure to ambient and as the temperature elevates during delivery to the point of sale and this can be sufficient to inhibit bacterial growth and atmospheric oxygen in unlimited quantities is available to maintain the requisite "bloom". In this way, shipping, packaging and display costs can be reduced substantially, while providing an extended shelf life which may be sufficient for some industry packers and supermarkets., In one broad aspect, the present invention provides methods, systems and apparatus to automatically and continuously process meat products with sanitizing and bacteria count reducing agents that include the measured and controlled quantities of processing aid water. The system can be directly coupled to the aforementioned meat grinding, conditioning, treating and packaging equipment so as to provide a substantially enclosed system thereby providing a safer and effective method of delivering the goods to consumers.

In one broad aspect of the invention, a conduit is provided that minimizes the contact of freshly ground or sliced beef with oxygen. Processing of the beef, such as grinding, measuring, blending, decontaminating, slicing, cooking, packaging, tray forming, etc., therefore, progresses in a substantially oxygen deficient environment. In this manner, a gas is dissolved in the beef that results in less oxymyoglobin at the time of packaging and consequently, less metmyoglobin formation after packaging.

A further broad aspect of the invention concerns the production of pet food made in a manner substantially similar to the food processed for human consumption in accordance with the invention. In this instance, however, much of the left over products, such as entrails, can be used to produce pet food, resulting in a substantial benefit and value increase. In one particular aspect, the pet food can be made aseptic, resulting in a moist pet food that does not require refrigeration. Further aspects of the invention are directed to the manner of packaging, and still further aspects are directed at cleansing entrails, such as intestines, to make into the pet food.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 56 shows an isometric illustration of a tray according to the present invention; FIG. 57 shows a cross section illustration of a tray portion according to the present invention;

FIG. 58 shows a cross section illustration of a tray portion according to the present invention;

FIG. 59 shows a cross section illustration of a tray portion according to the present invention;

FIG. 60 shows a cross section illustration of a tray portion according to the present invention;

FIG. 88 shows a side illustration of a tray portion according to the present invention;

FIG. 89 shows a top illustration of a tray portion according to the, present invention;

FIG. 90 shows a side illustration of tray portions according to the present invention;

FIG. 94 shows an isometric illustration of a tray according to the present invention;

FIG. 95 shows an isometric illustration of a tray portion according to the present invention;

FIG. 96 shows a side illustration of trays according to the present invention;

FIG. 122 shows a cross section illustration of a tray portion according to the present invention;

FIG. 123 shows an isometric illustration of a tray according to the present invention;

FIG. 124 shows a top illustration of a tray according to the present invention;

FIG. 125 shows a side illustration of trays according to the present invention;

FIG. 126 shows a side illustration of trays according to the present invention;

FIG. 127 shows an isometric illustration of a tray according to the present invention;

FIG. 128 shows a cross section illustration of a tray portion according to the present invention;

FIG. 129 shows an isometric illustration of trays according to the present invention;

FIG. 130 shows a cross section illustration of trays according to the present invention;

FIG. 131 shows an isometric illustration of trays according to the present invention;

FIG. 132 shows a side illustration of trays according to the present invention;

FIG. 133 shows a cross section illustration of a tray according to the present invention;

Figure 134:
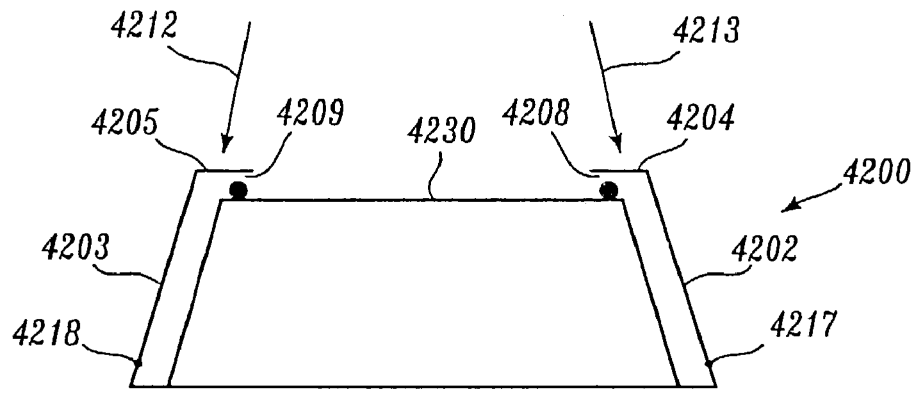
Figure 135:
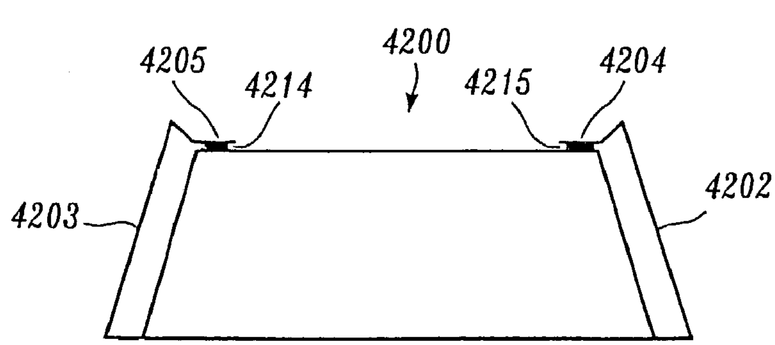
Figure 136:
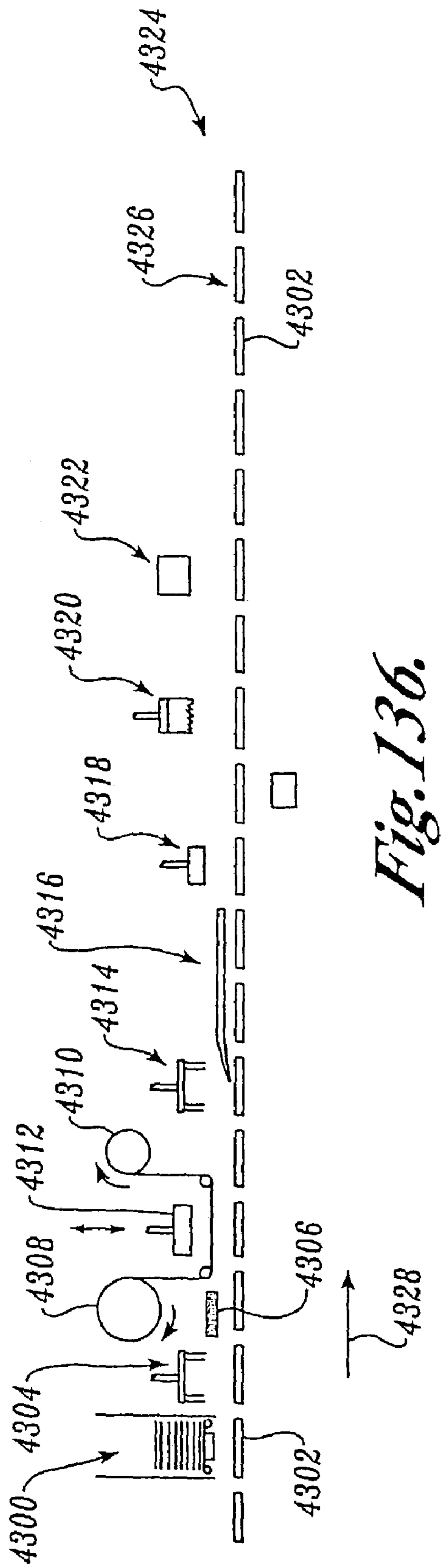
Figure 137:
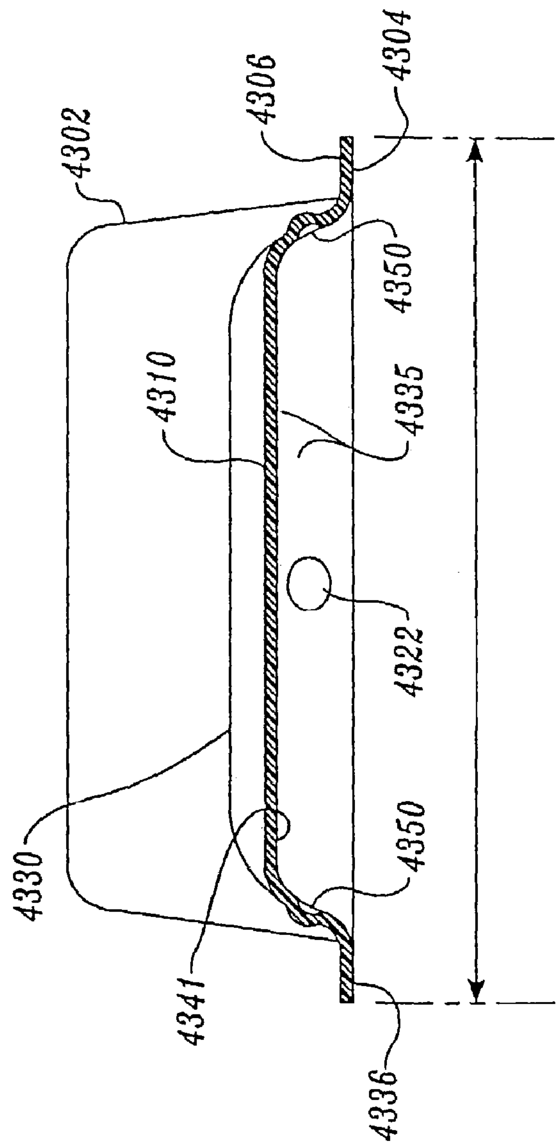
Figure 138:
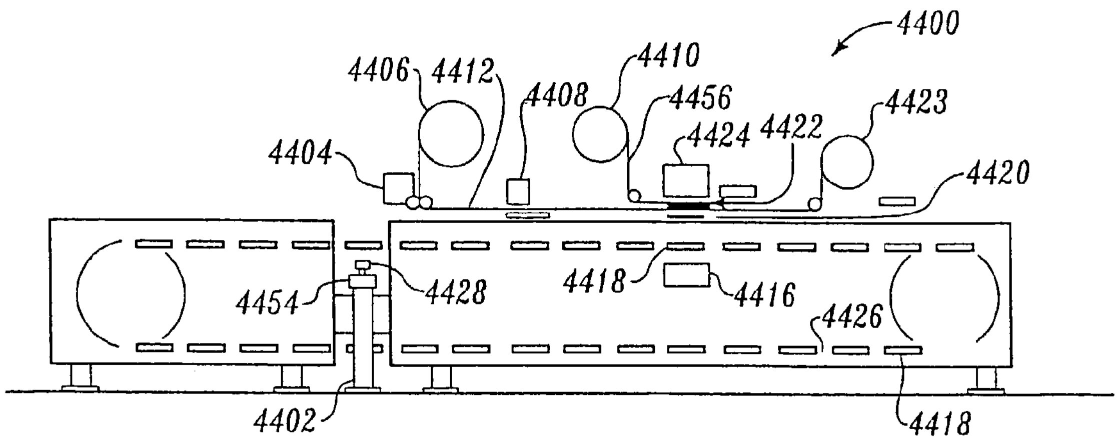
Figure 139:
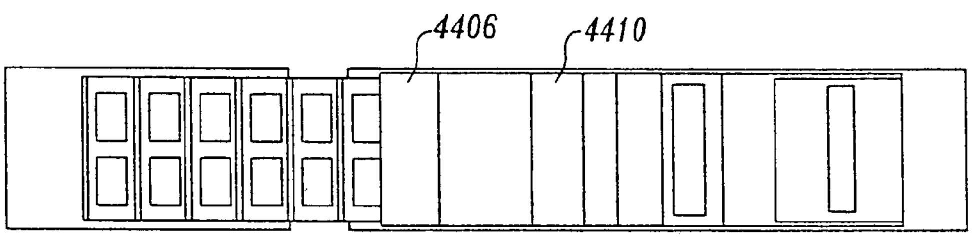
Figure 140:
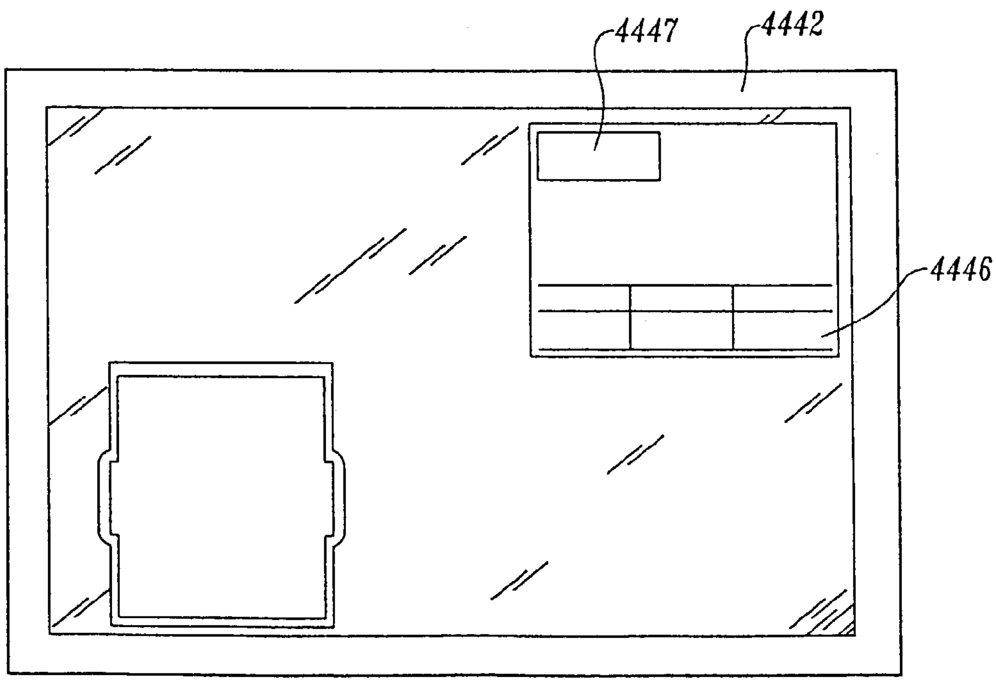
Figure 141:
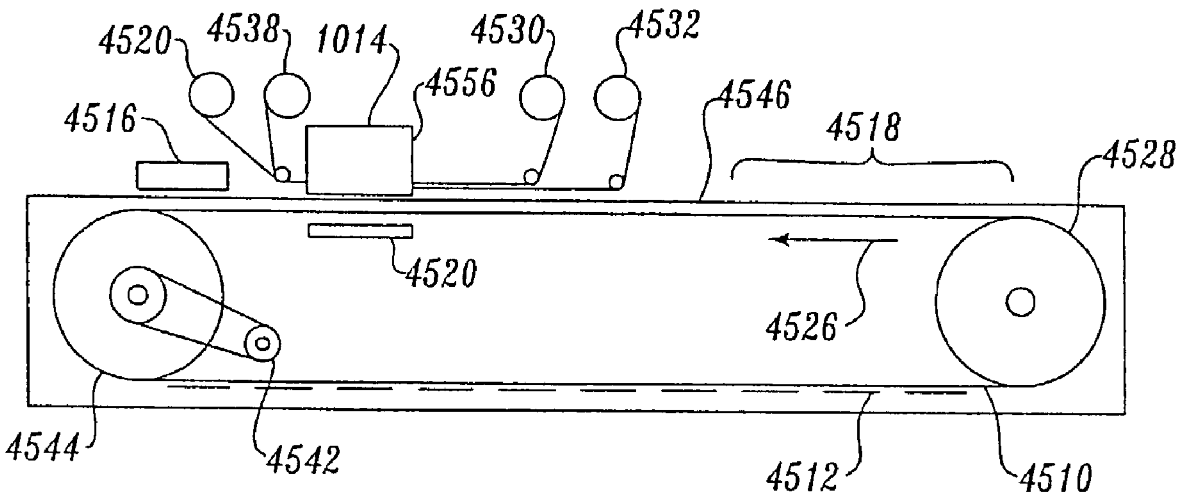
Figure 142:
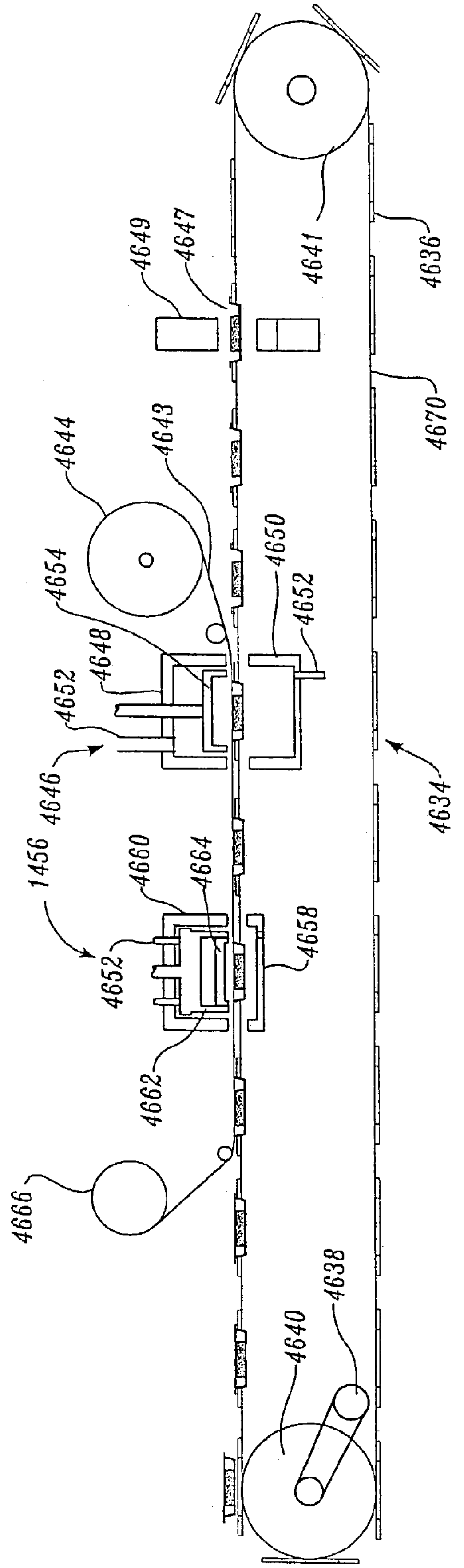
Figure 143:
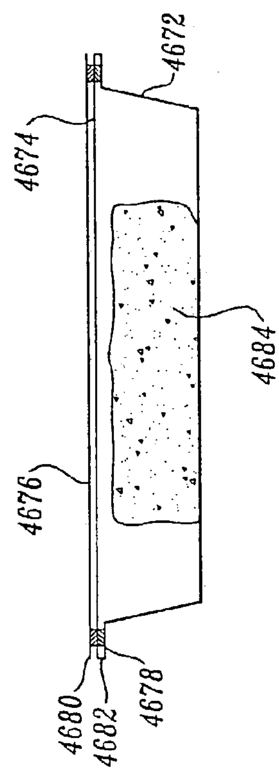
Figure 144:
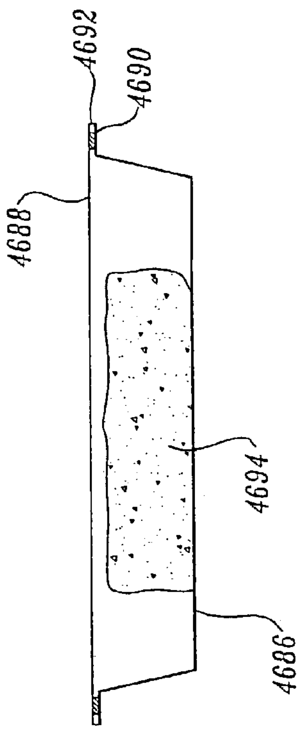
Figure 145:
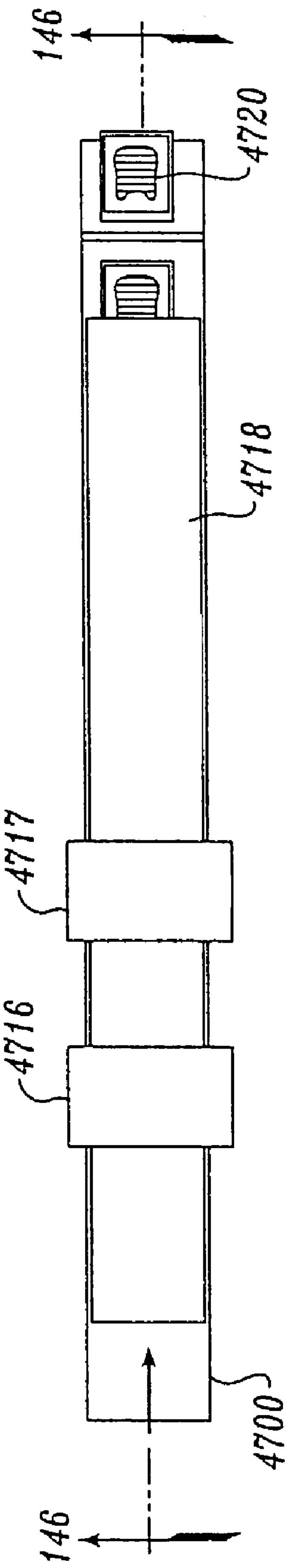
Figure 146:
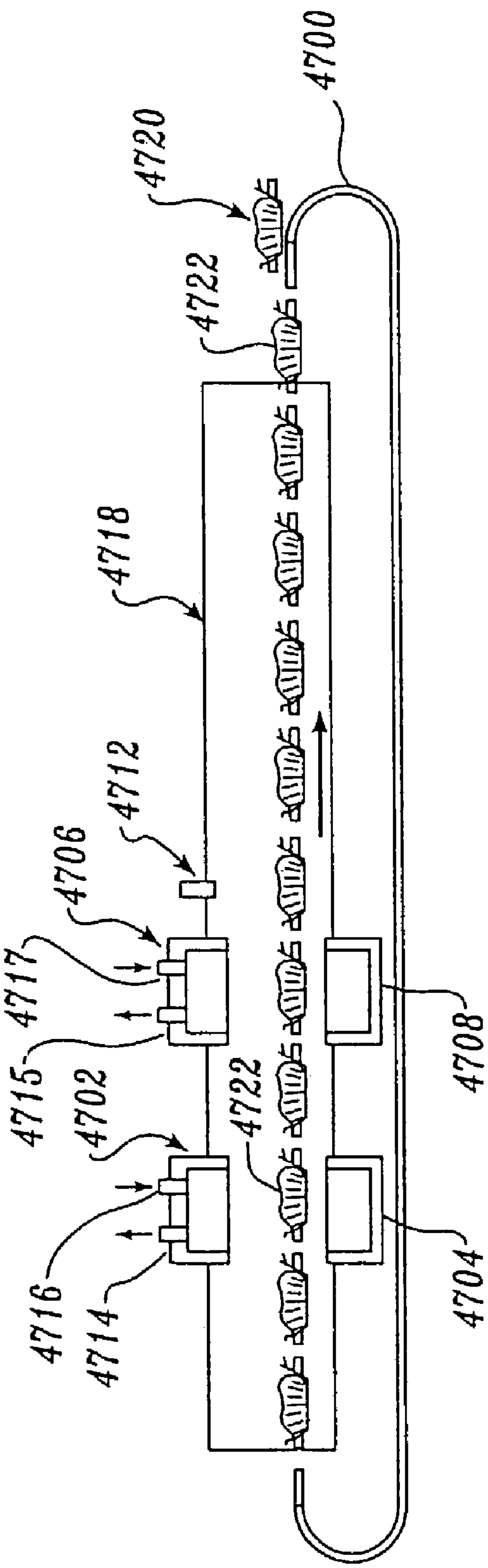
Figure 147:
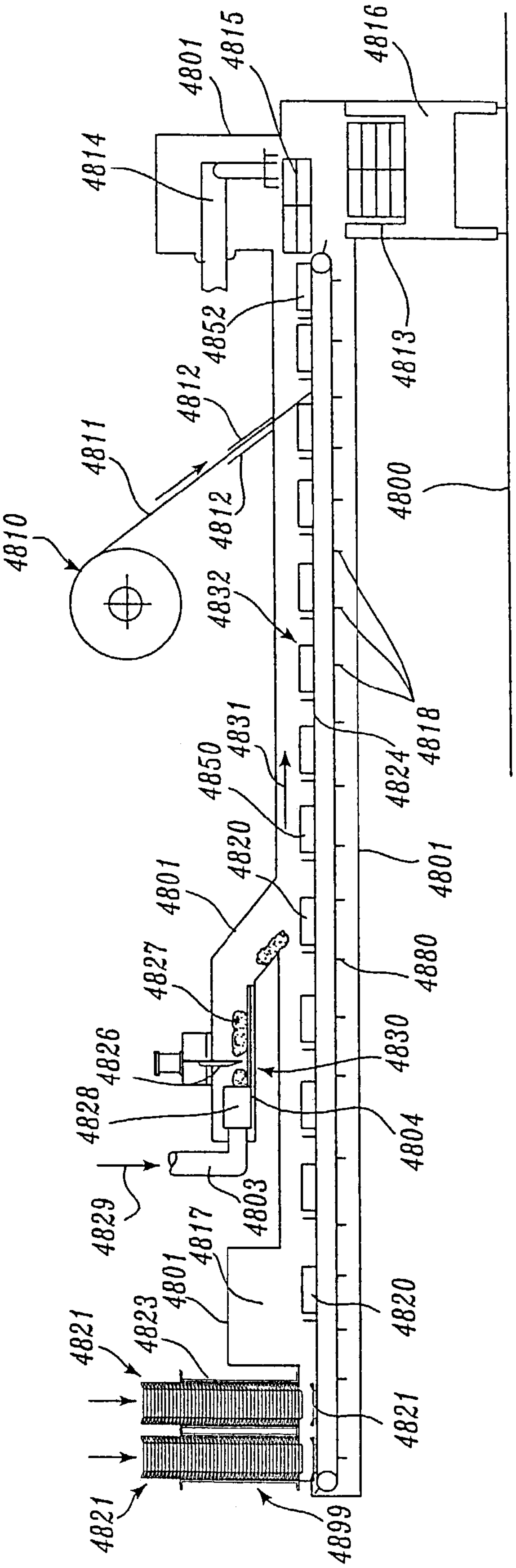
Figure 148:
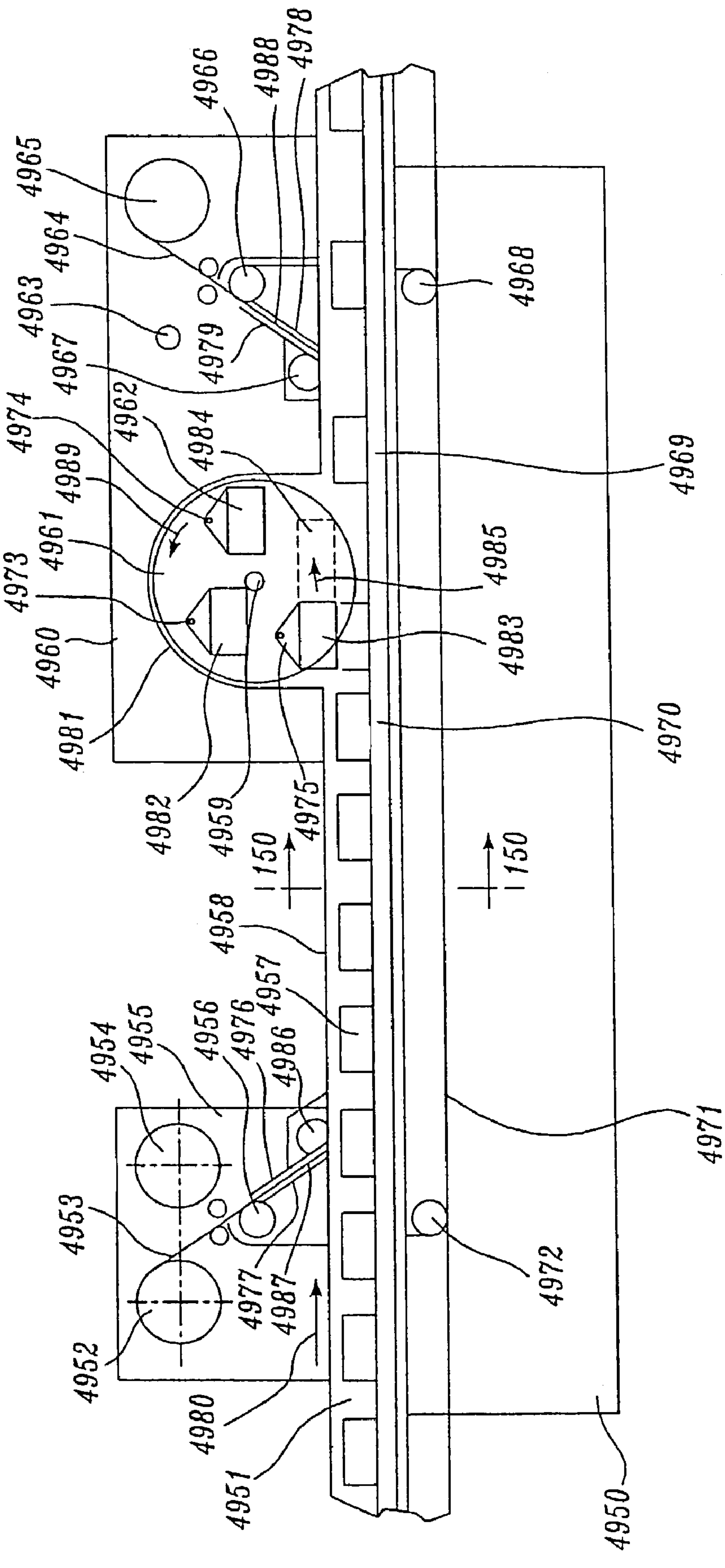
Figure 149:
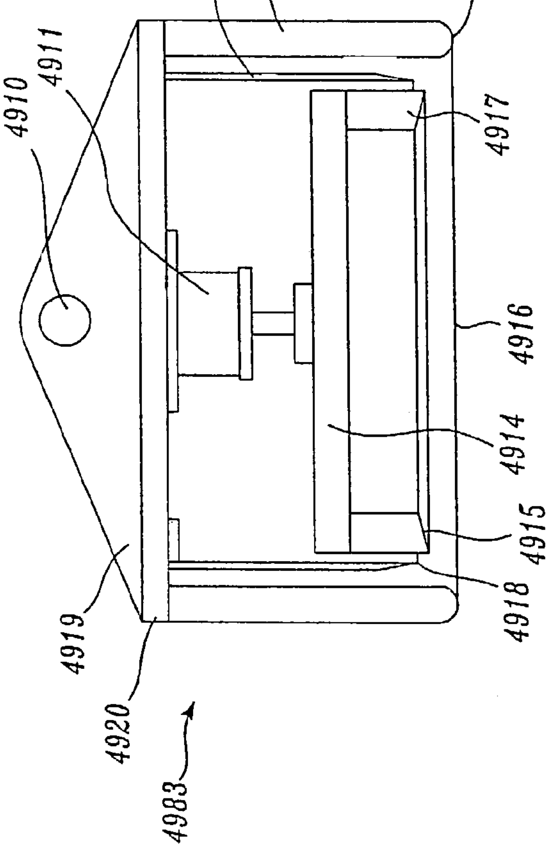
Figure 150:
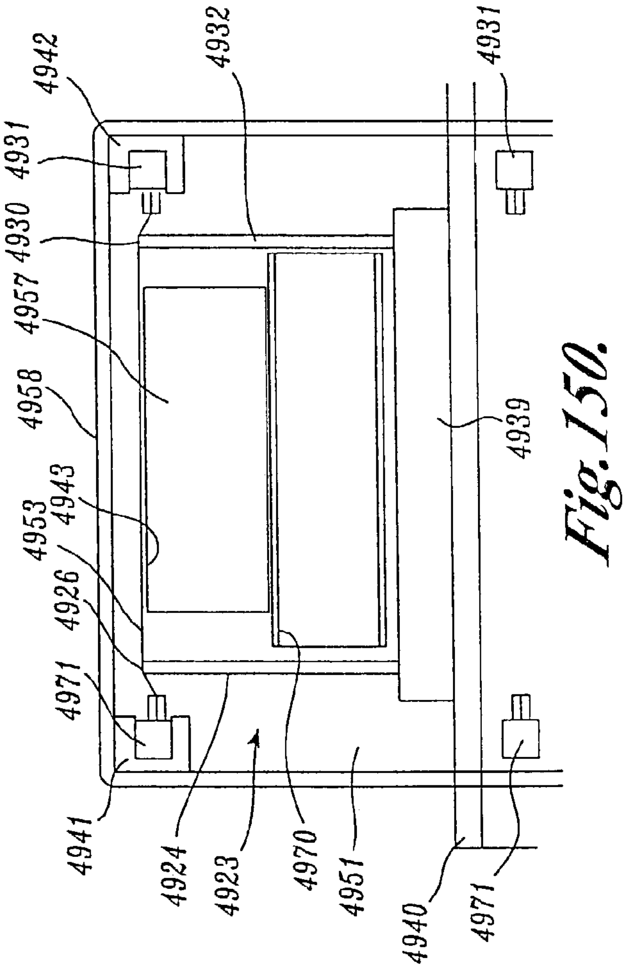
Figure 151:
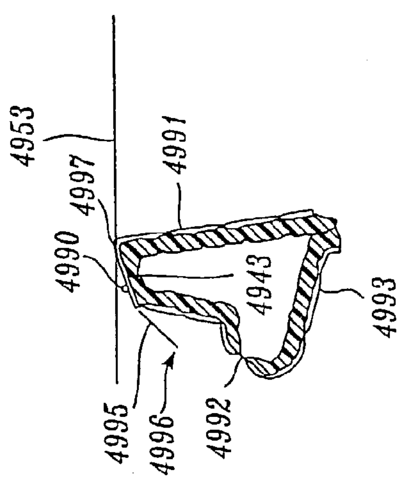
Figure 152:
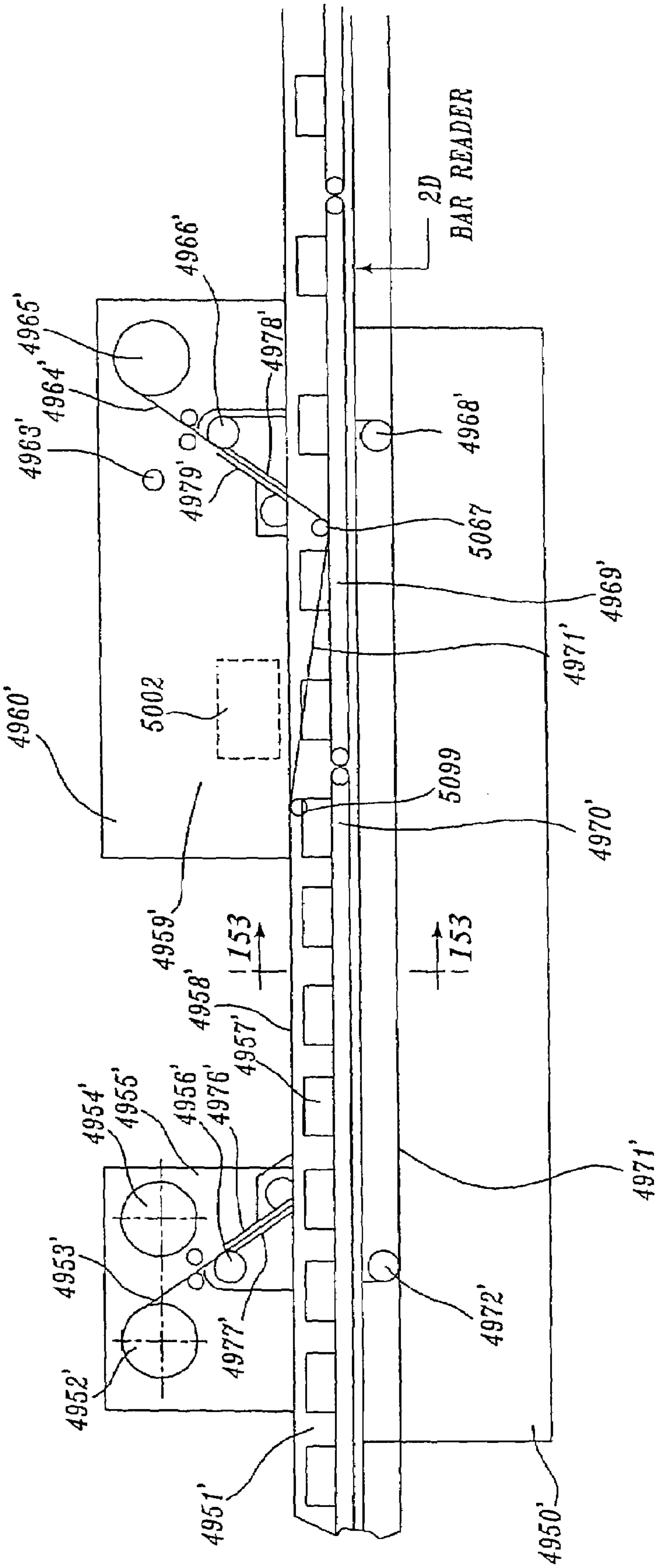
Figure 153:
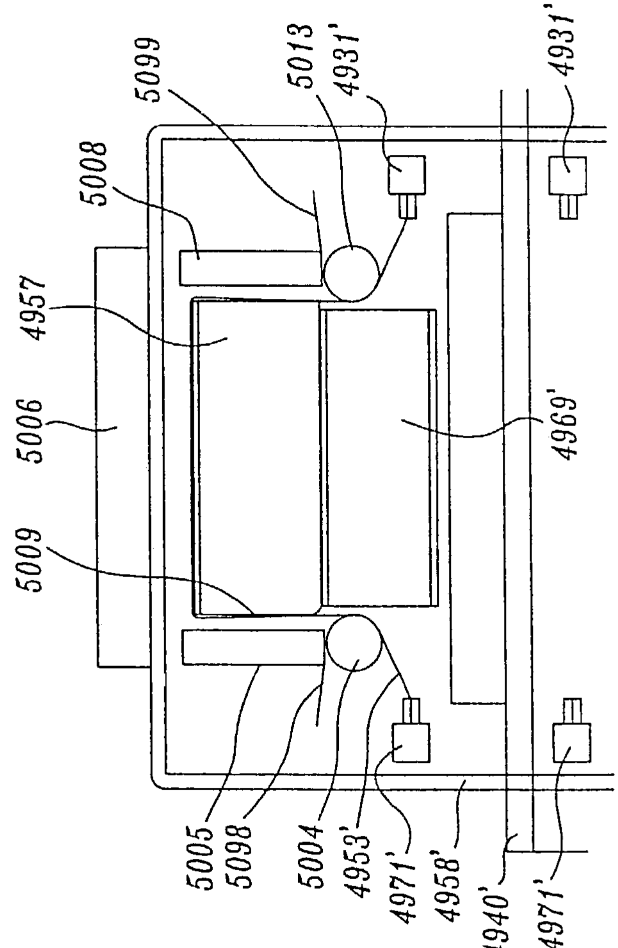
Figure 154:
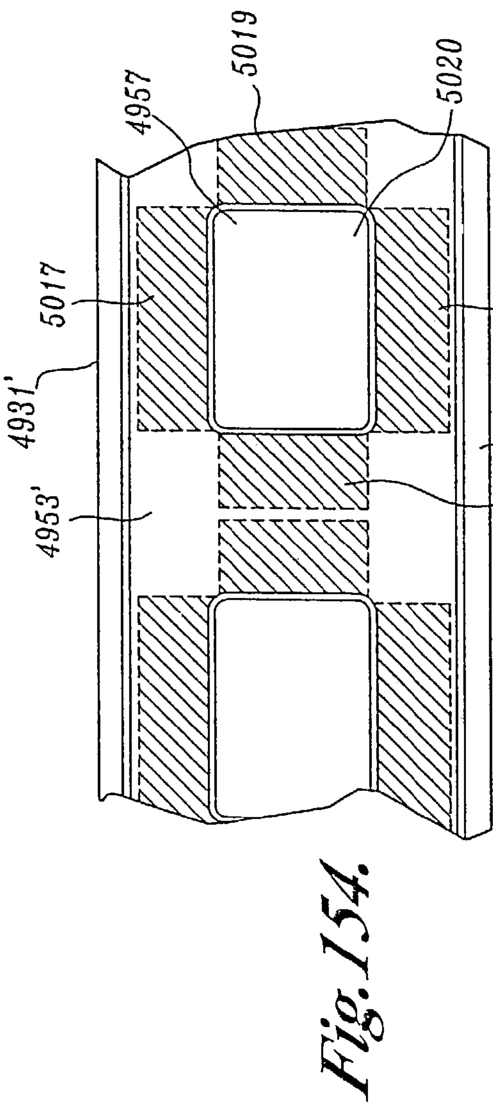
Figure 155:
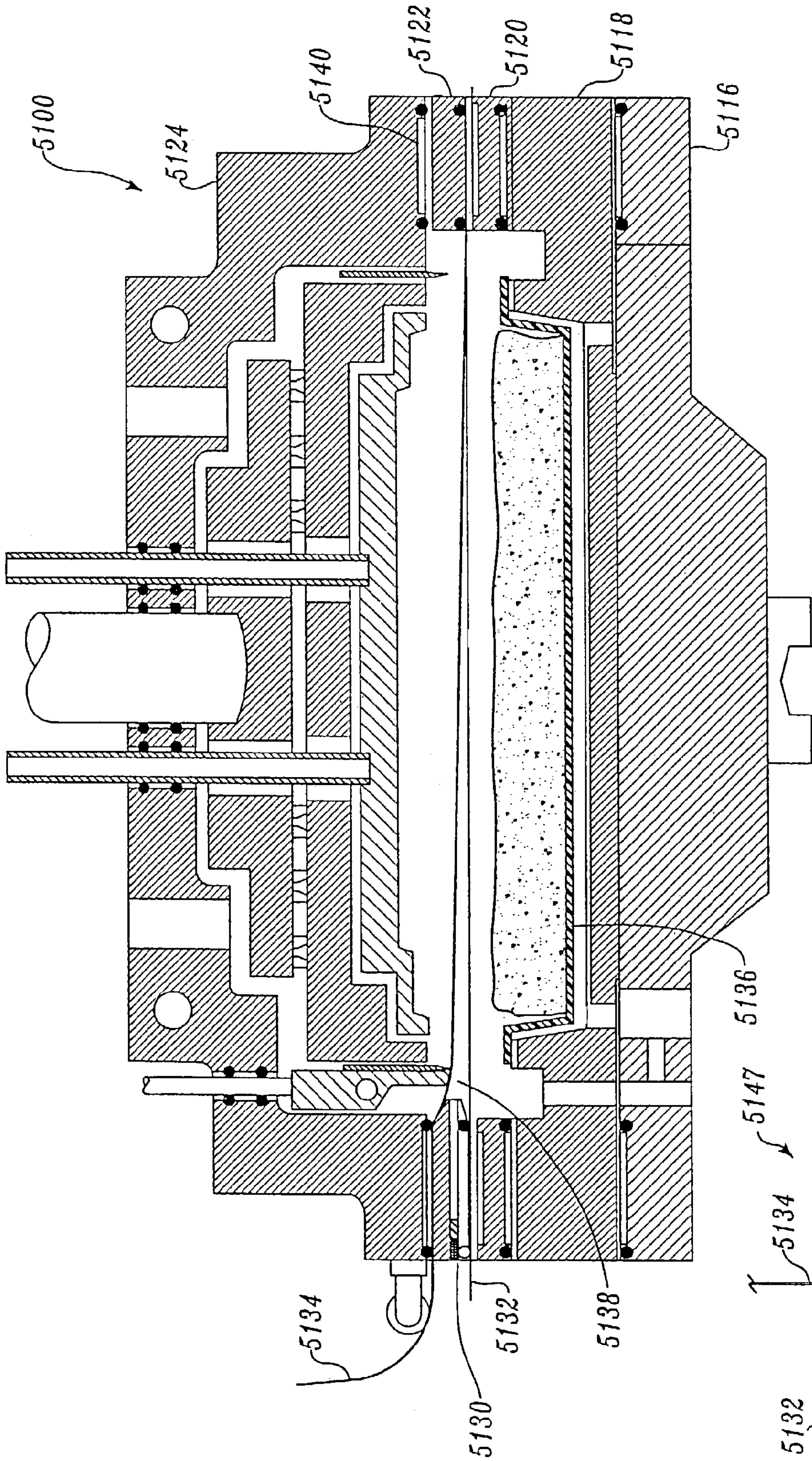
Figure 156:
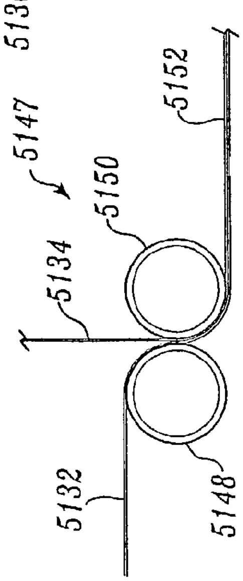
Figure 157:
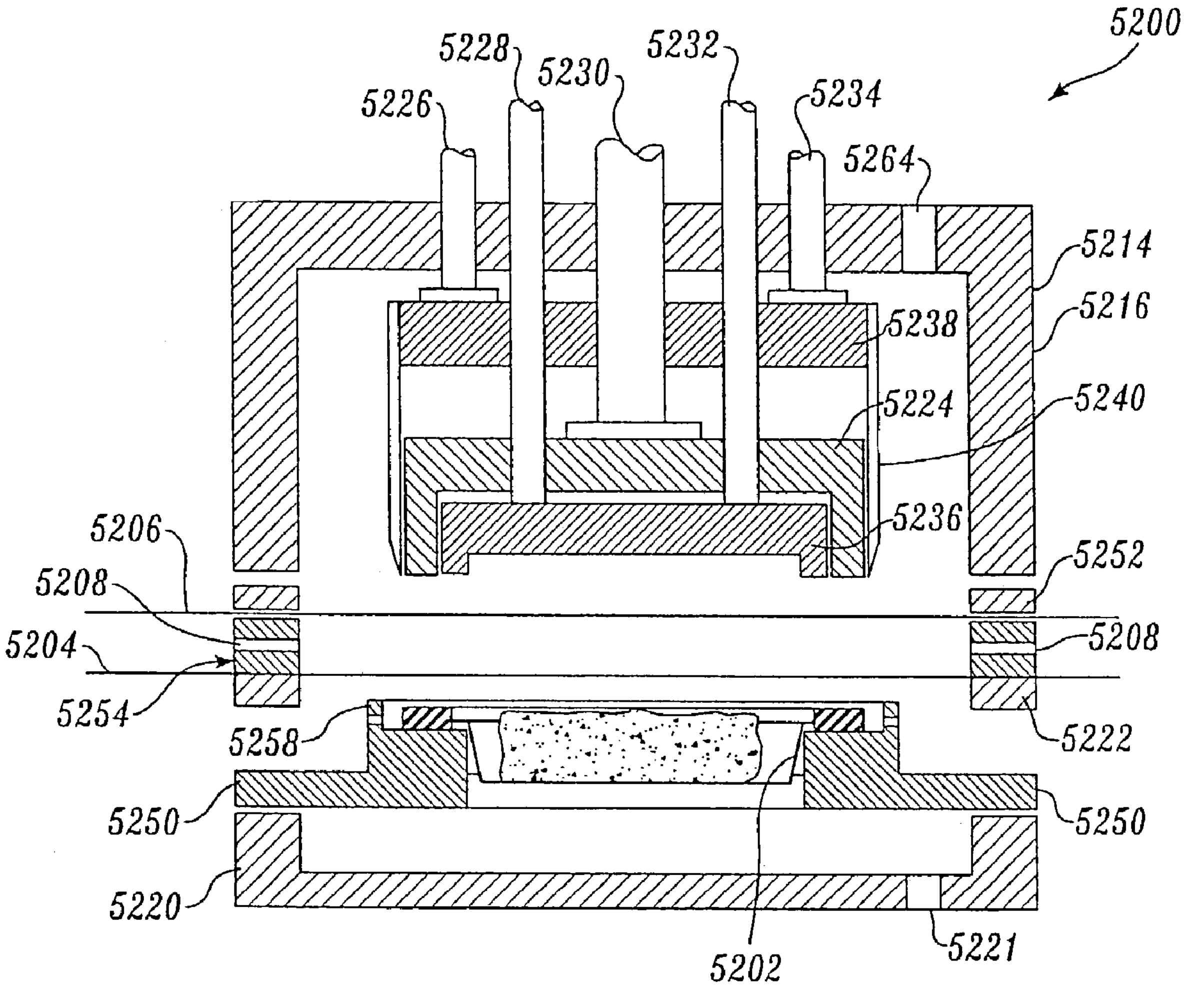
Figure 160:
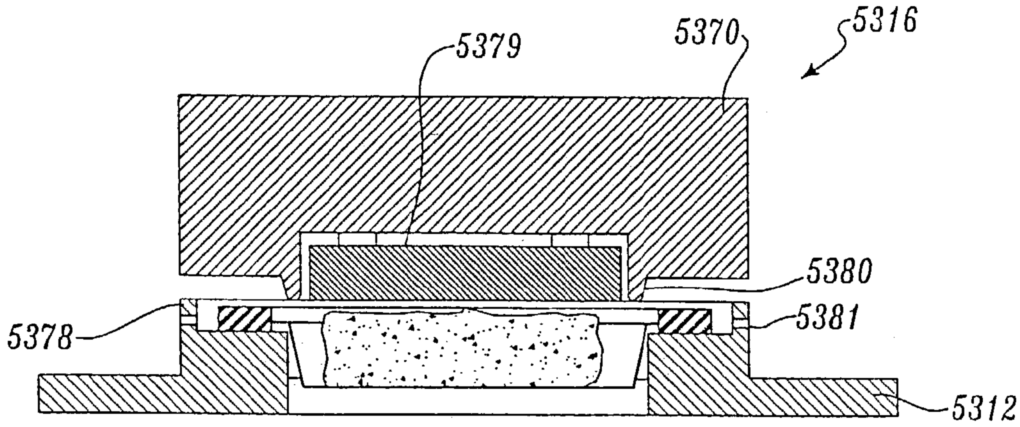
Figure 158:
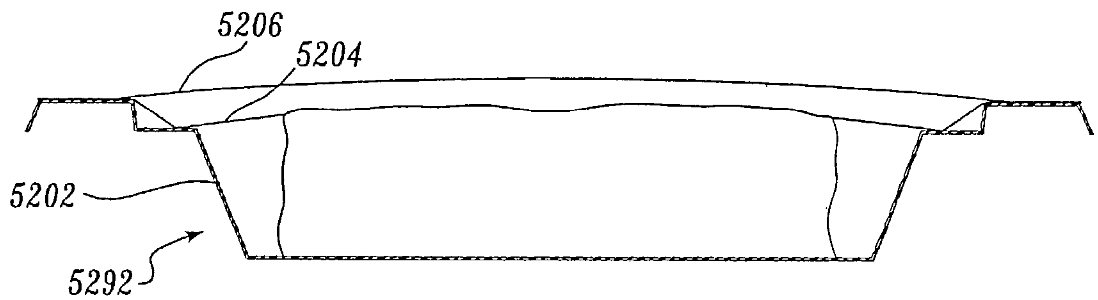
Figure 159:
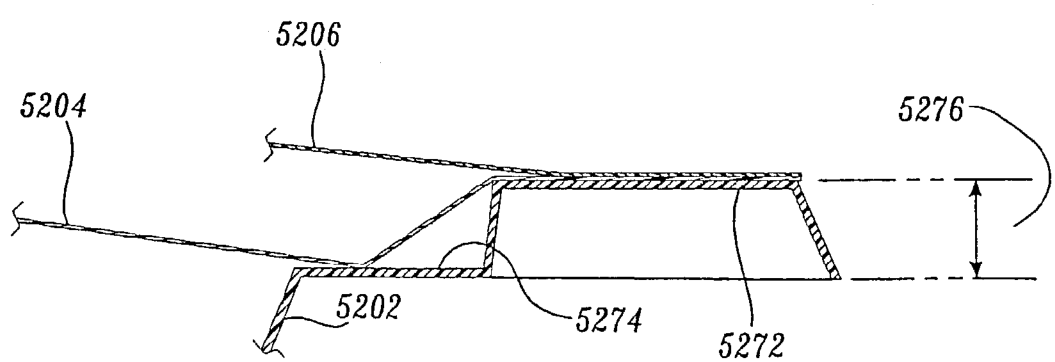
Figure 161:
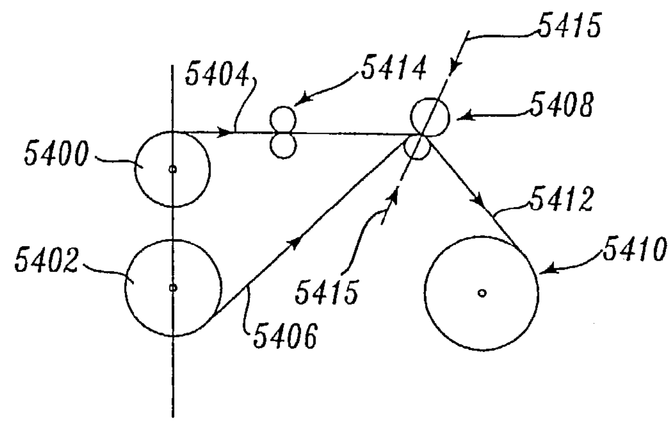
Figure 162:
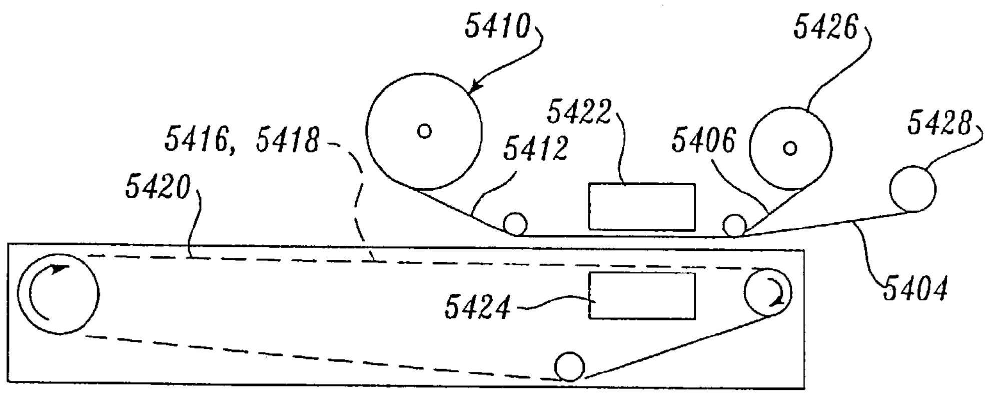
Figure 163:
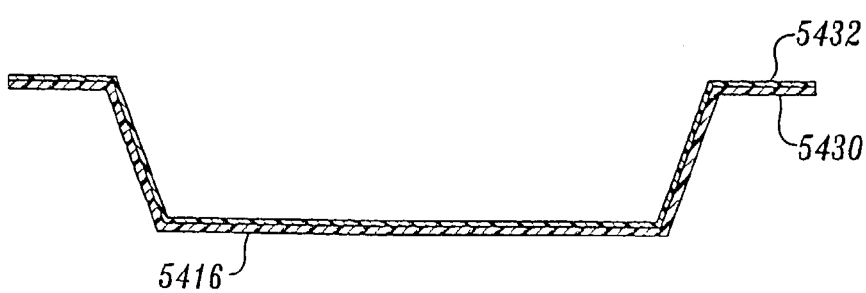
Figure 164:
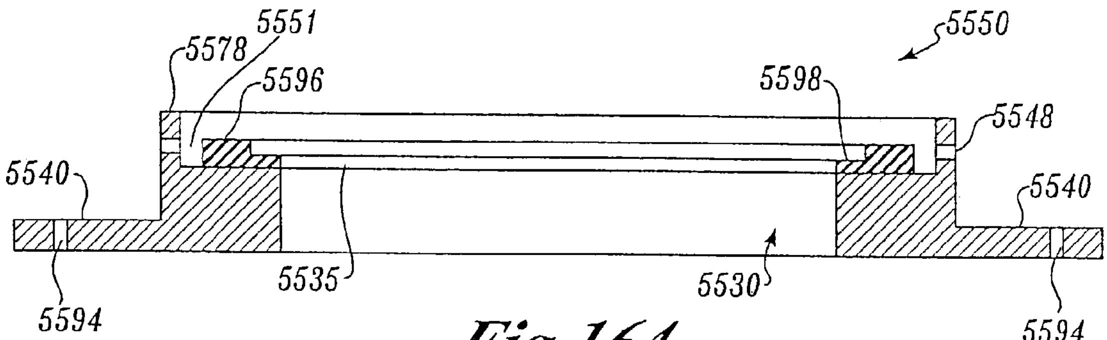
Figure 165:
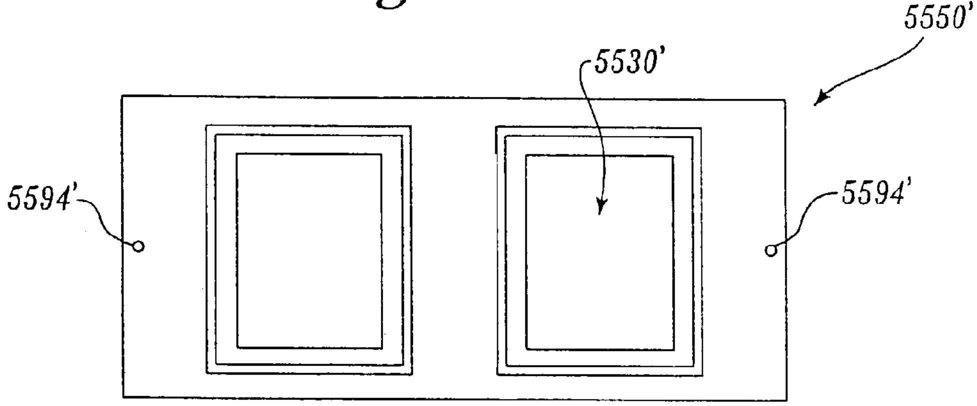
Figure 166:
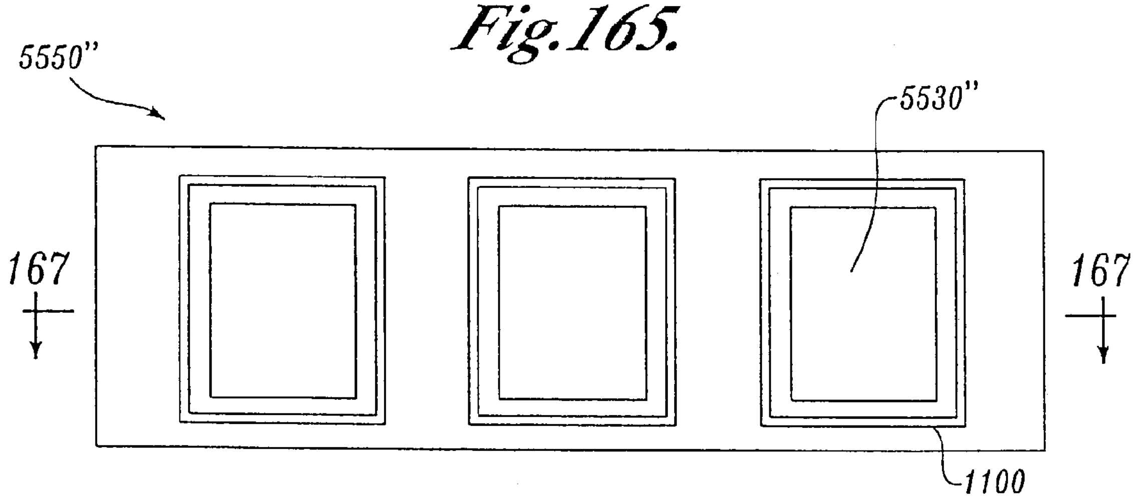
Figure 167:
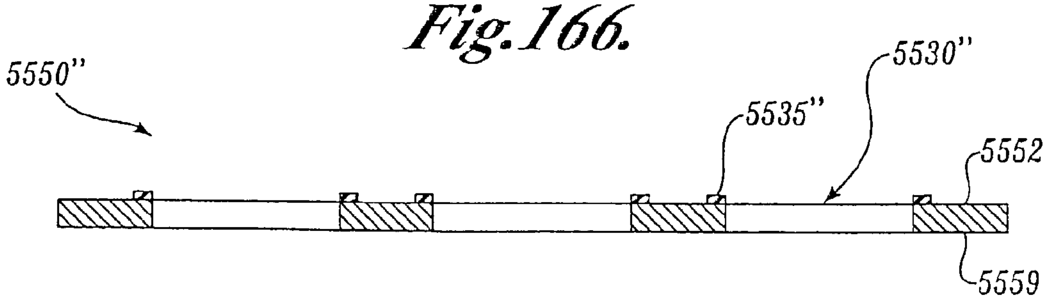
Figure 168:
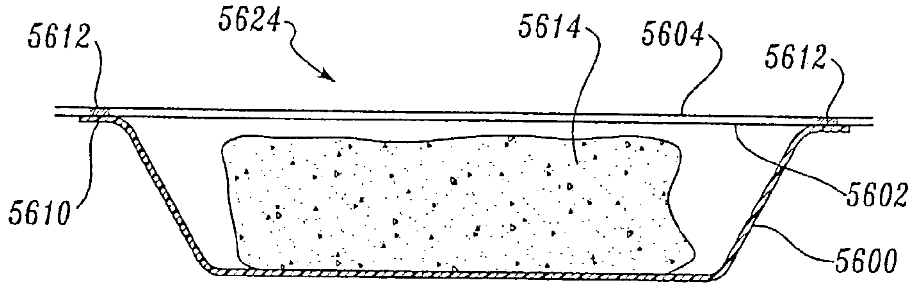
Figure 169:
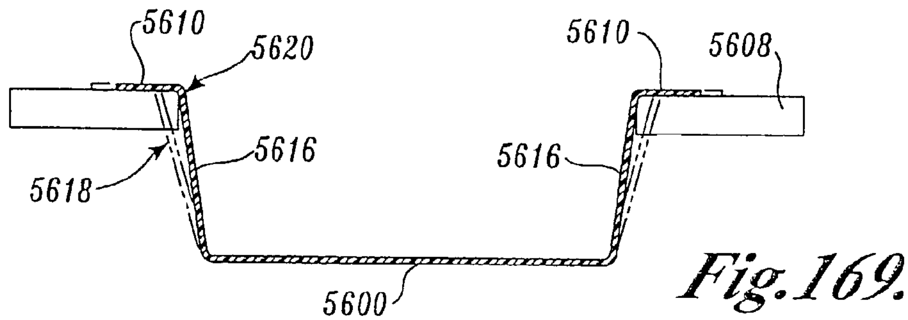
Figure 170:
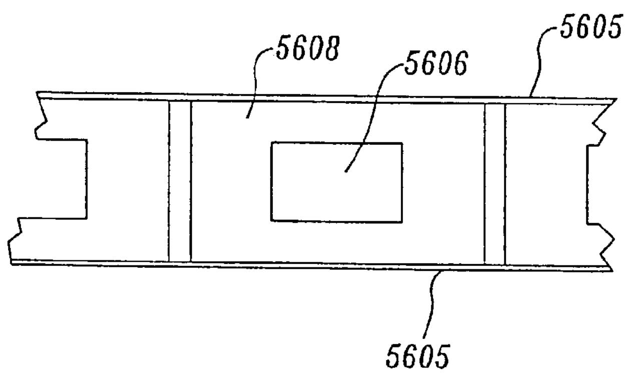
Figure 171:
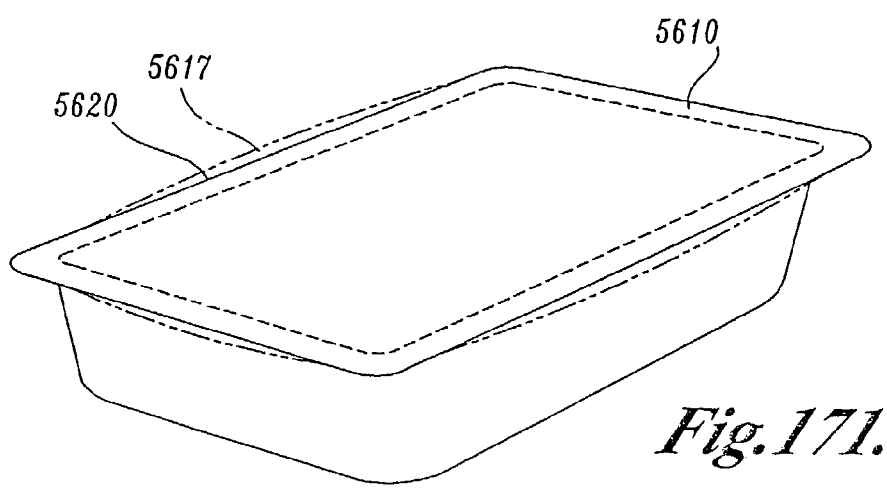
Figure 172:
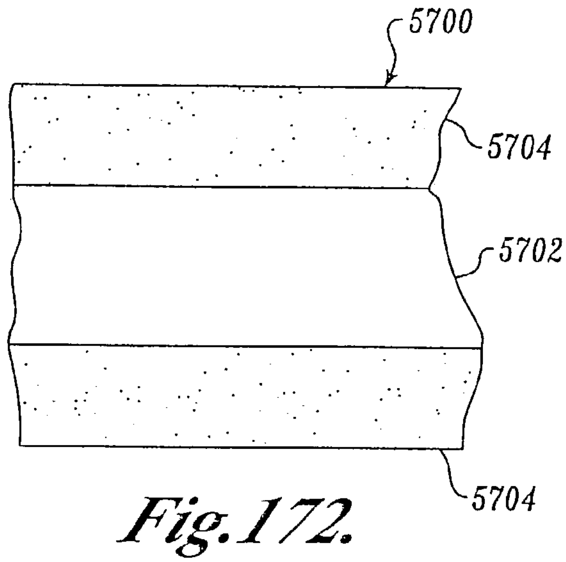
Figure 173:
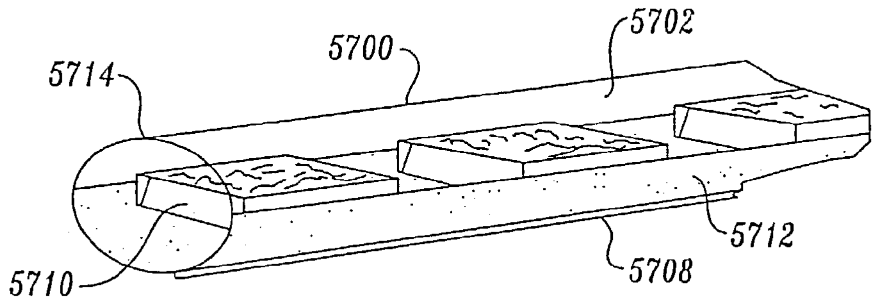
Figure 174:
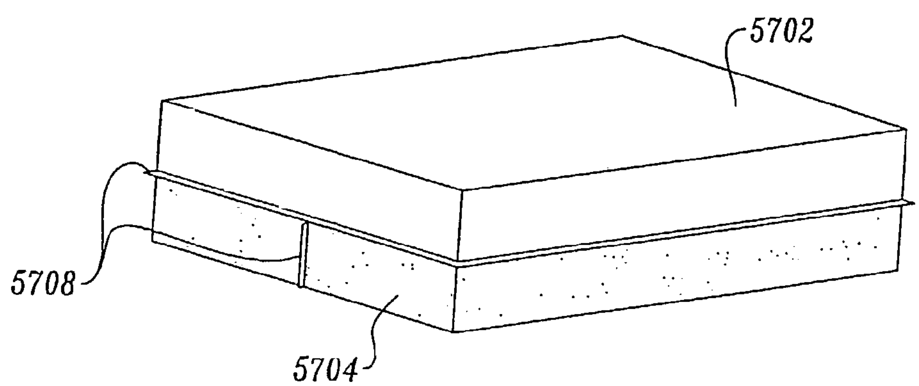
Figure 175:
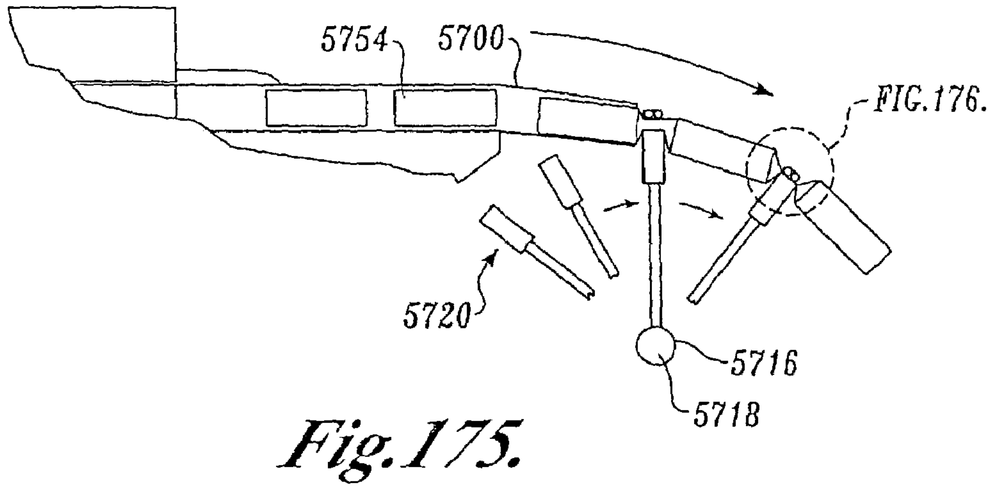
Figure 176:
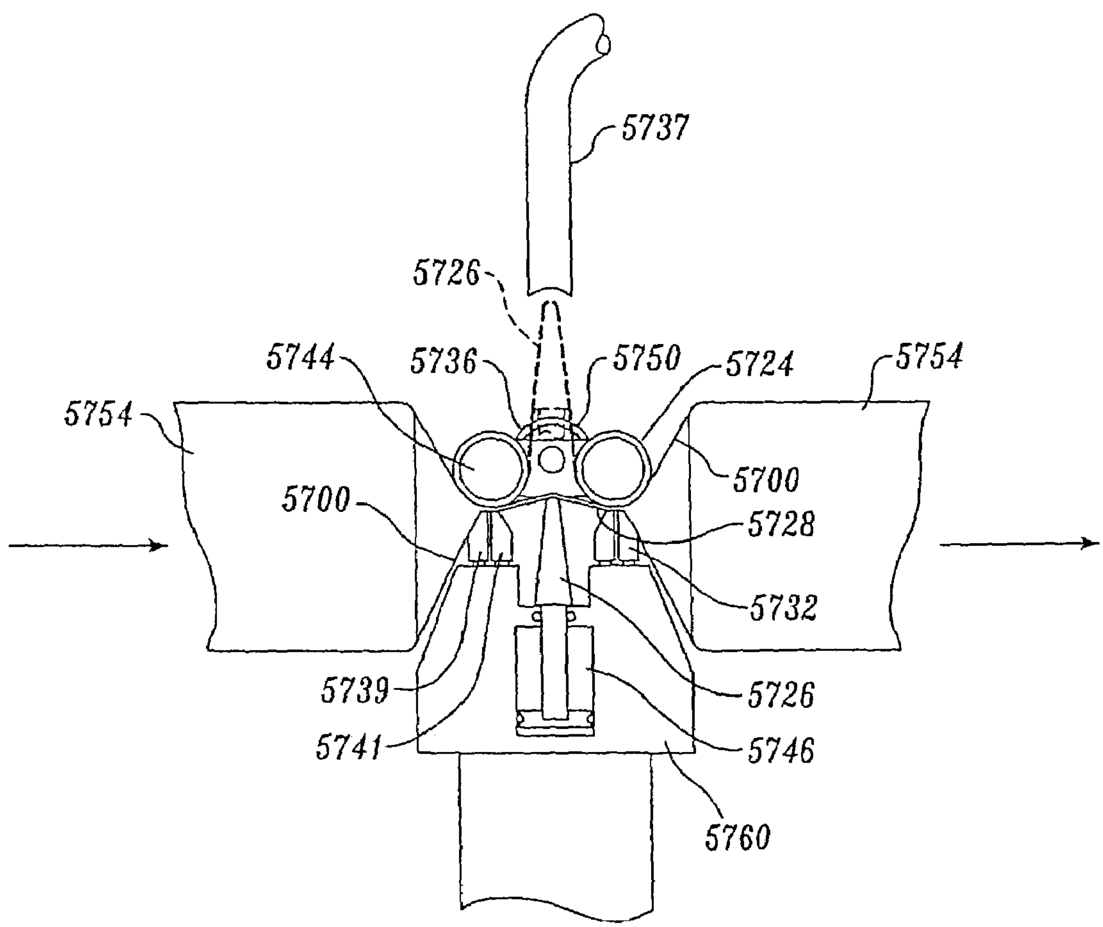
Figure 177:
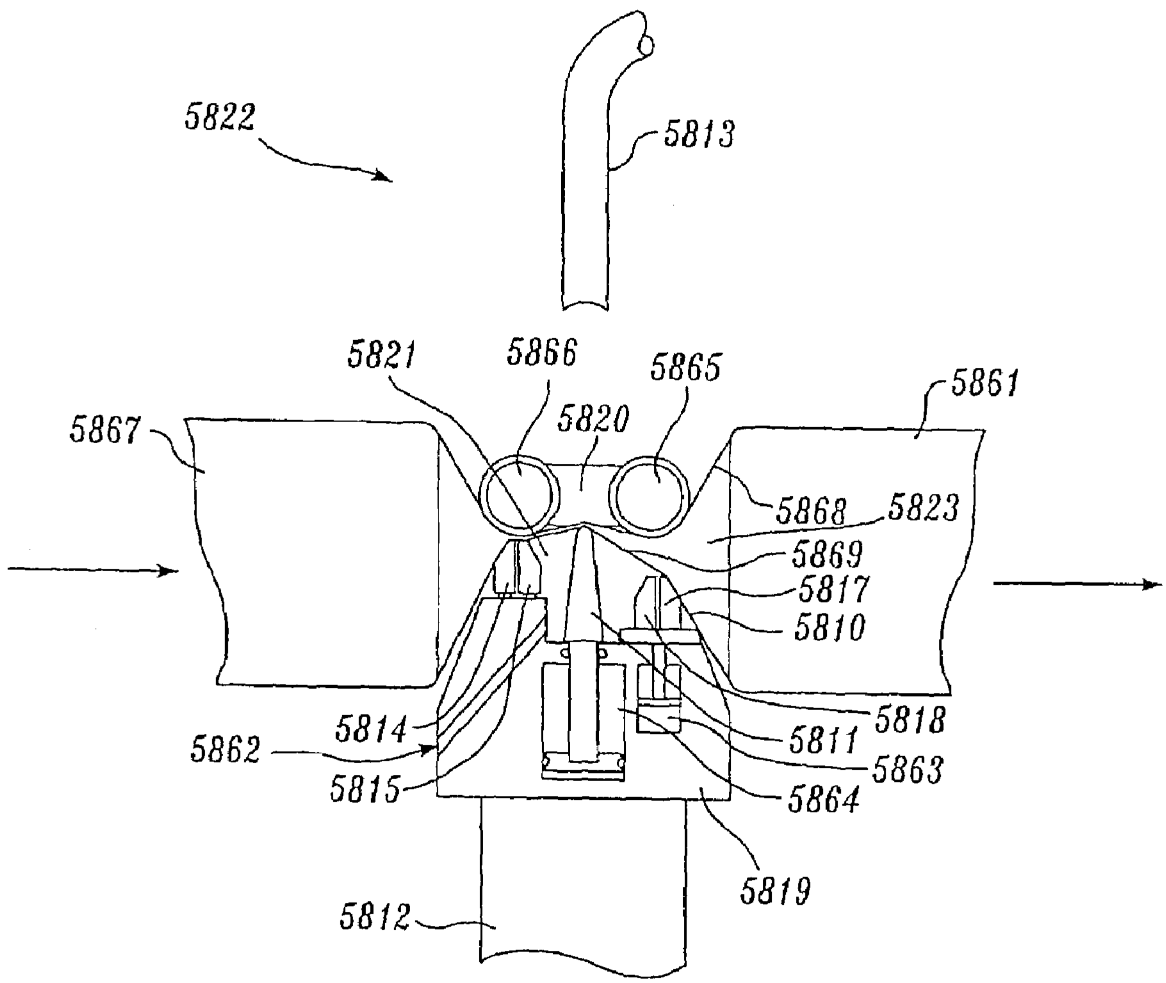
Figure 178:
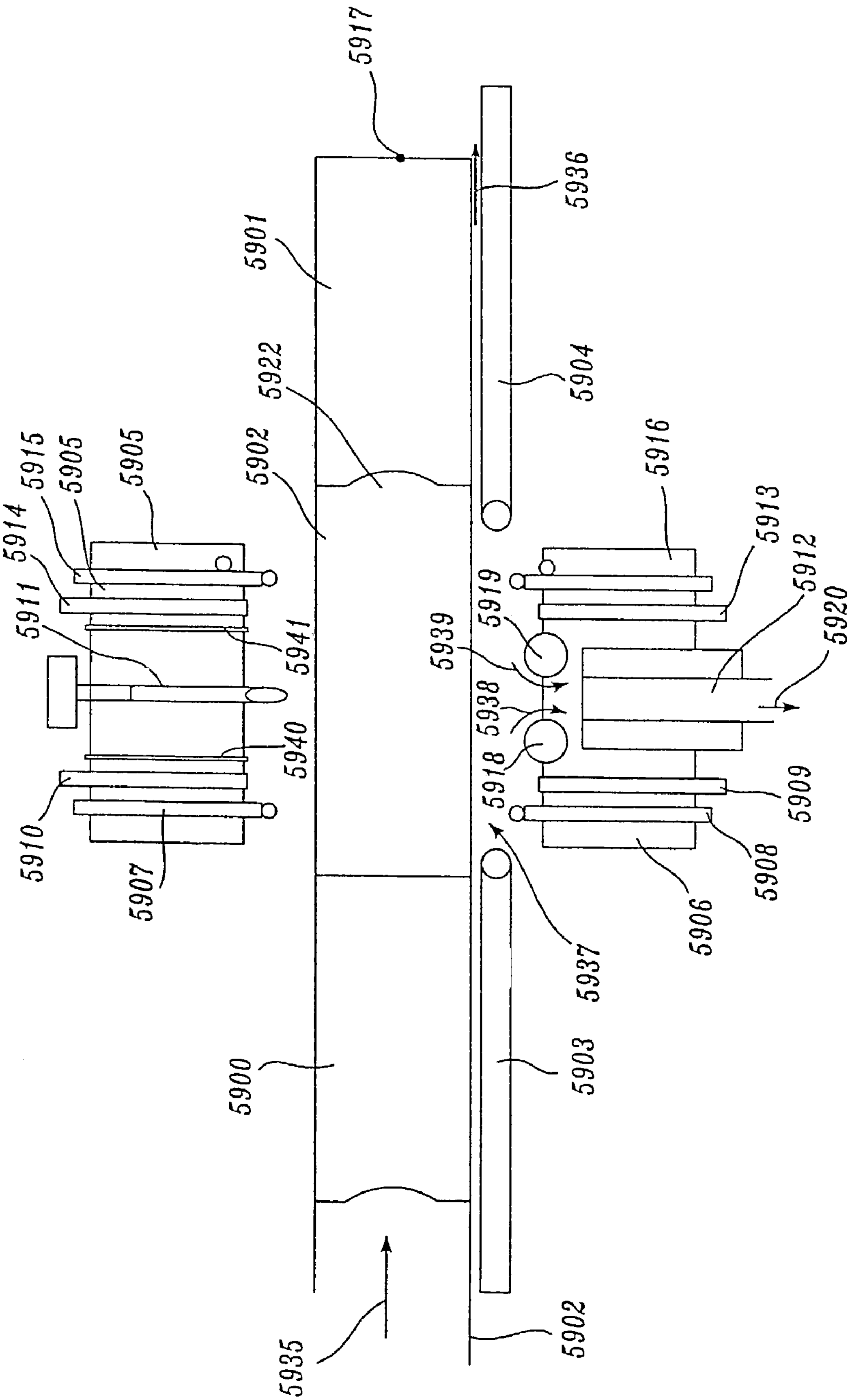
Figure 179:
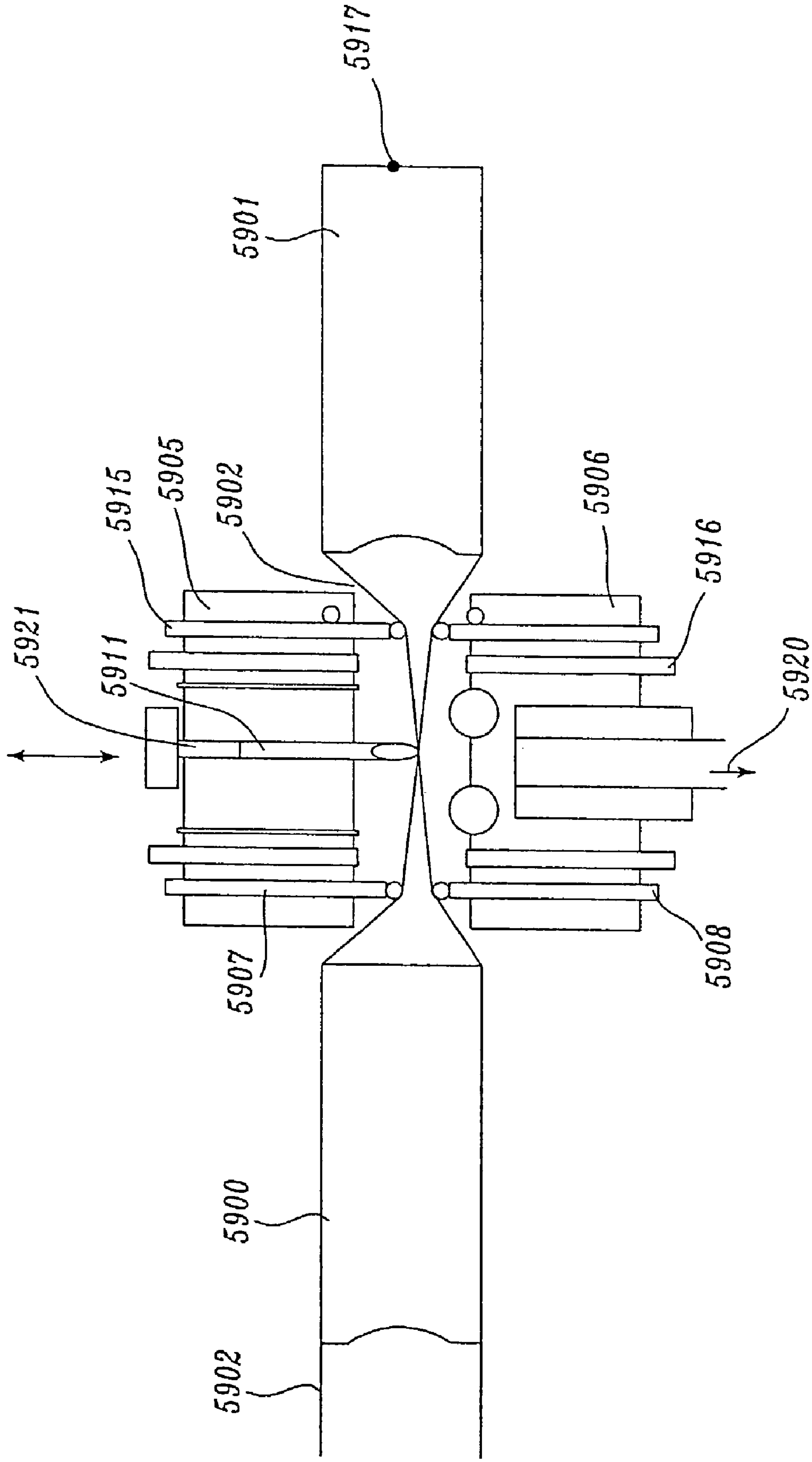
Figure 180:
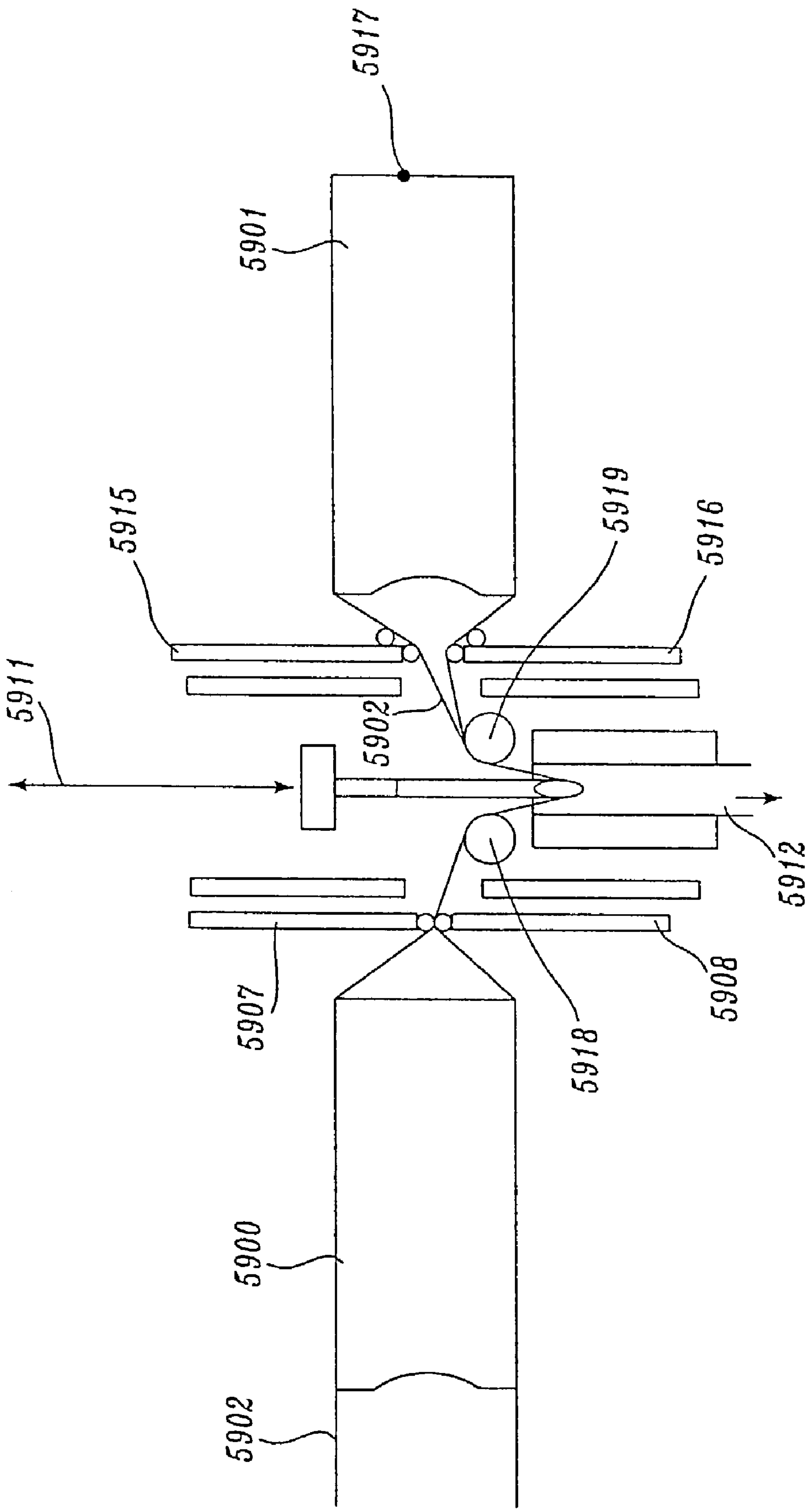
Figure 181:
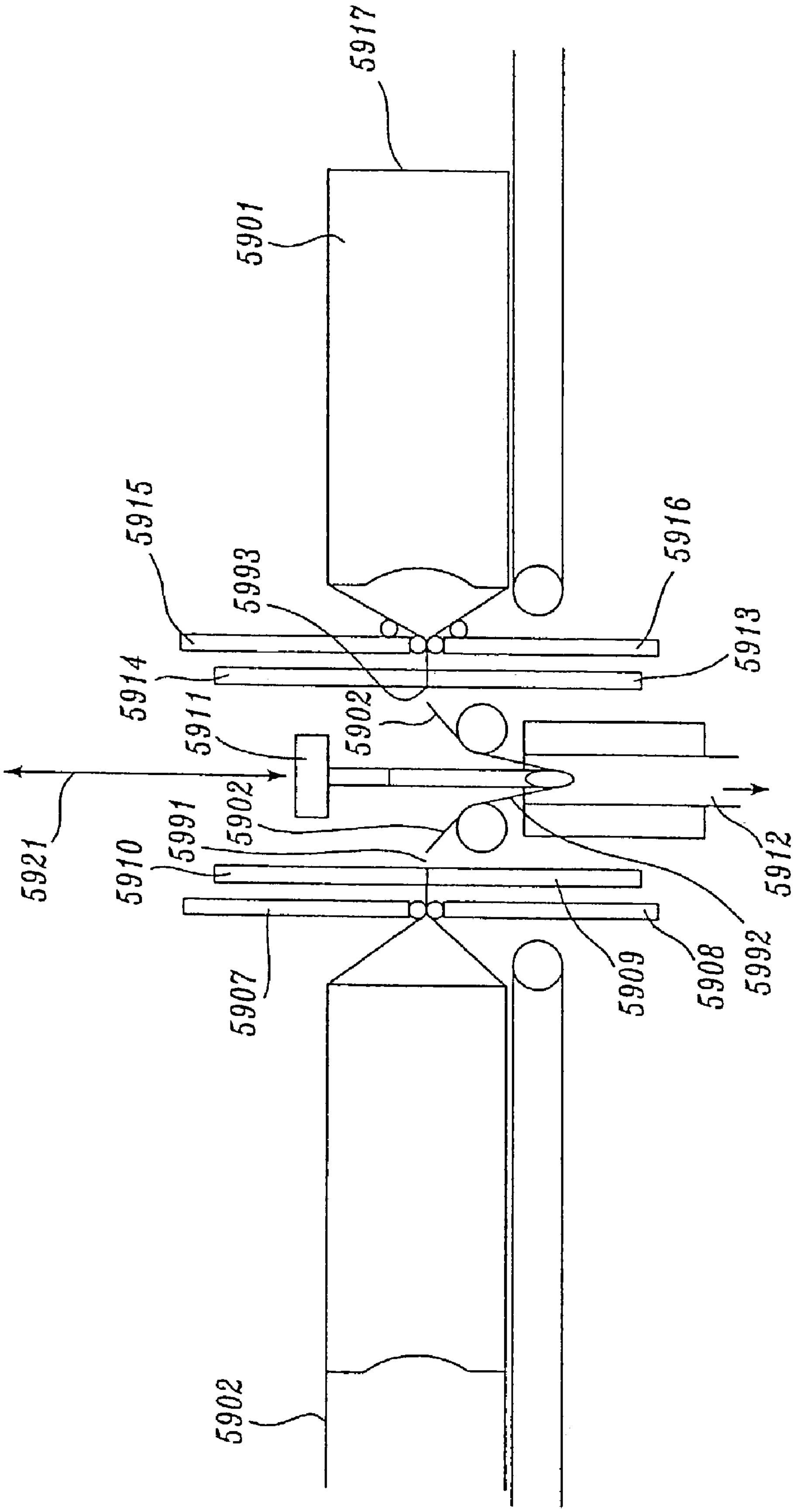
Figure 182:
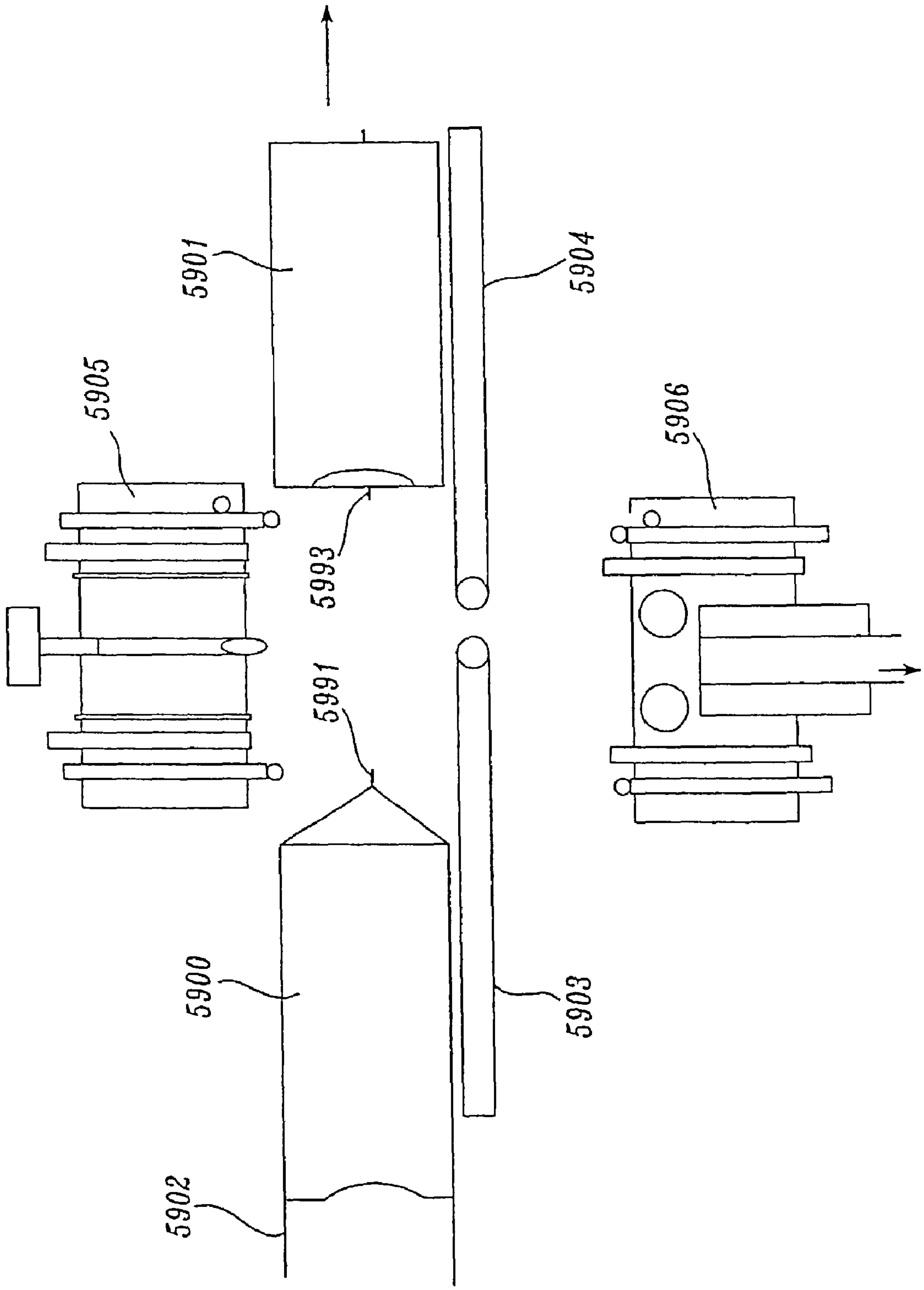
Figure 183:
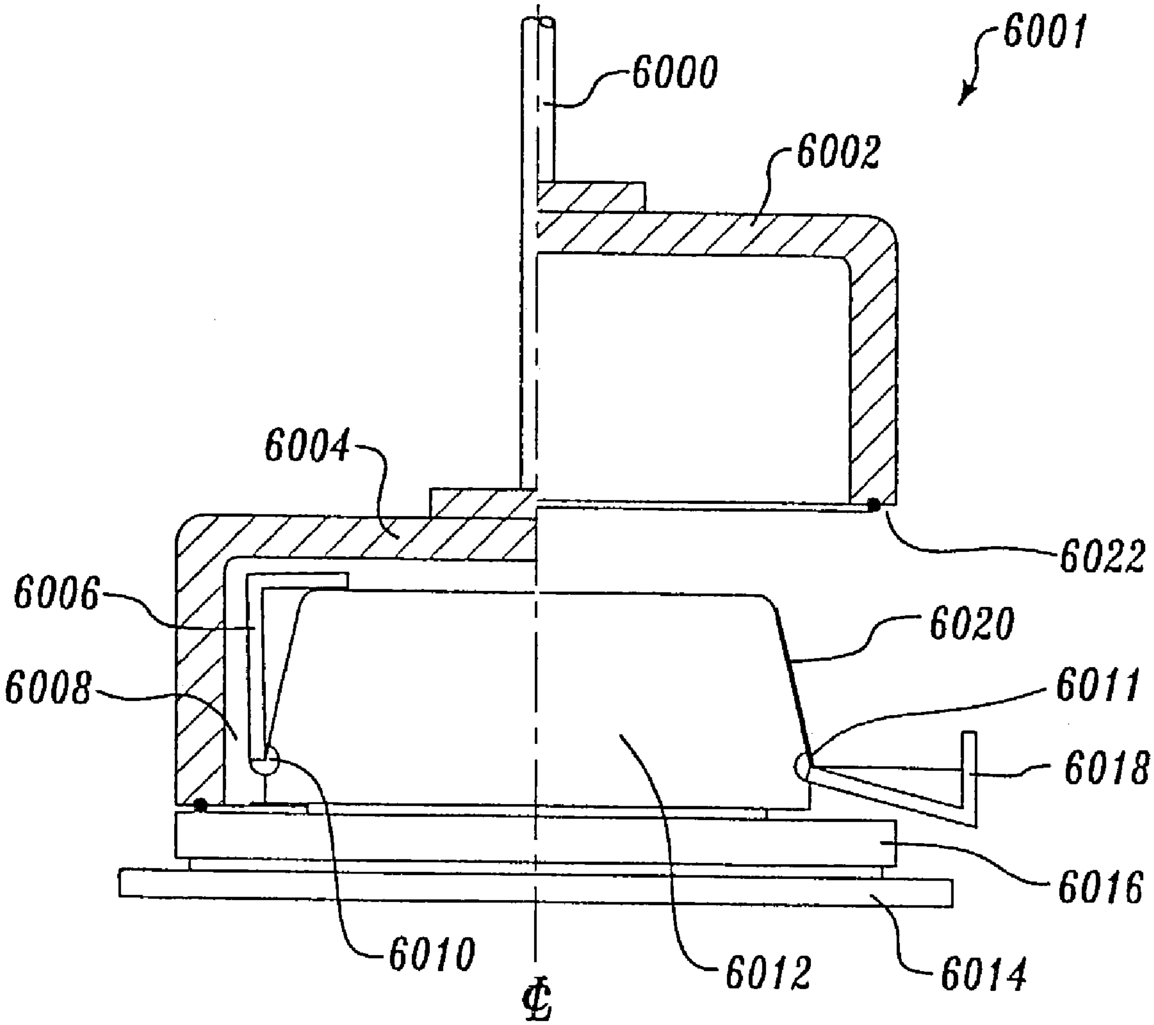
Figure 184:
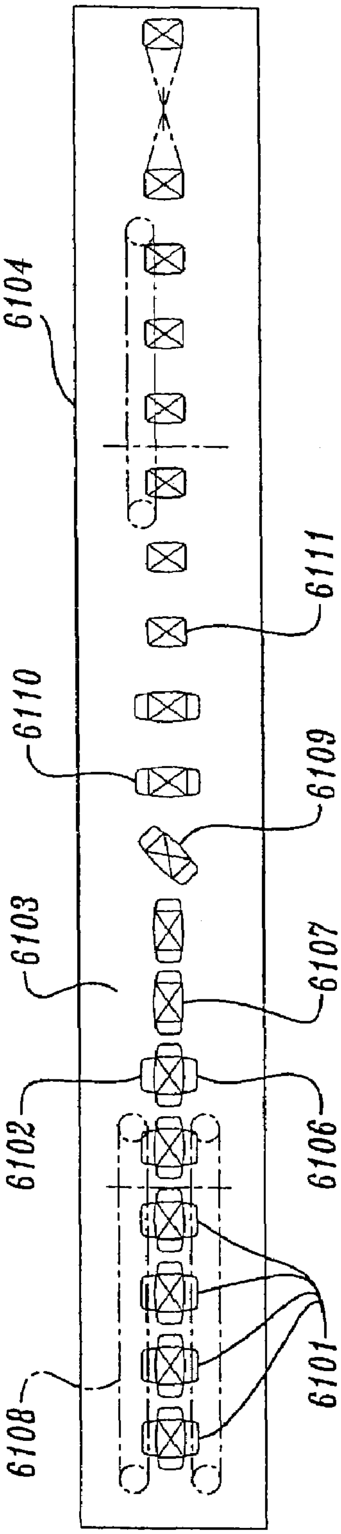
Figure 185:
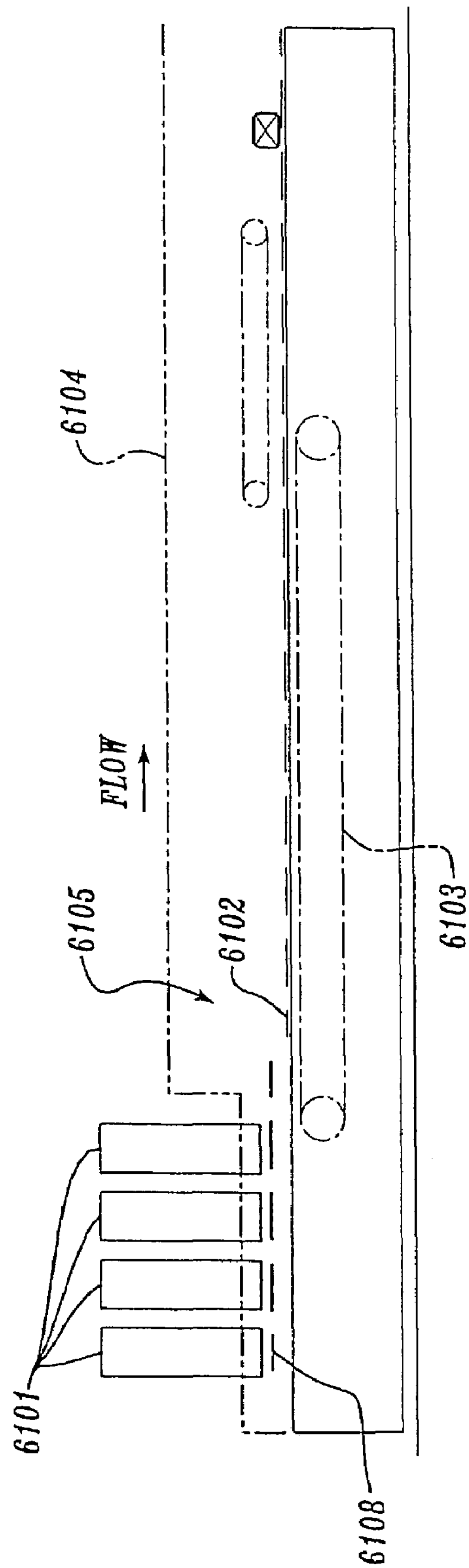
Figure 186:
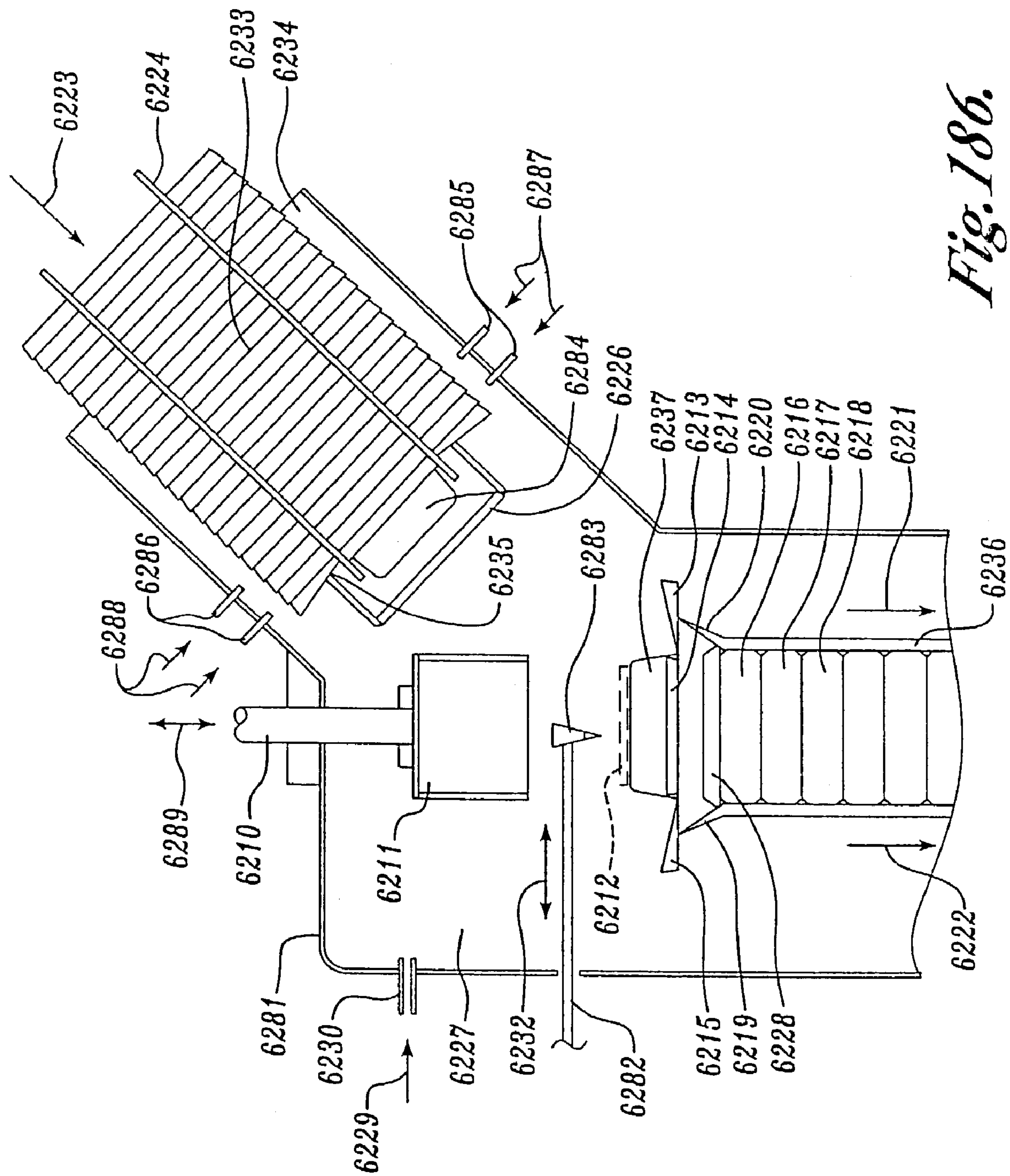
Figure 187:
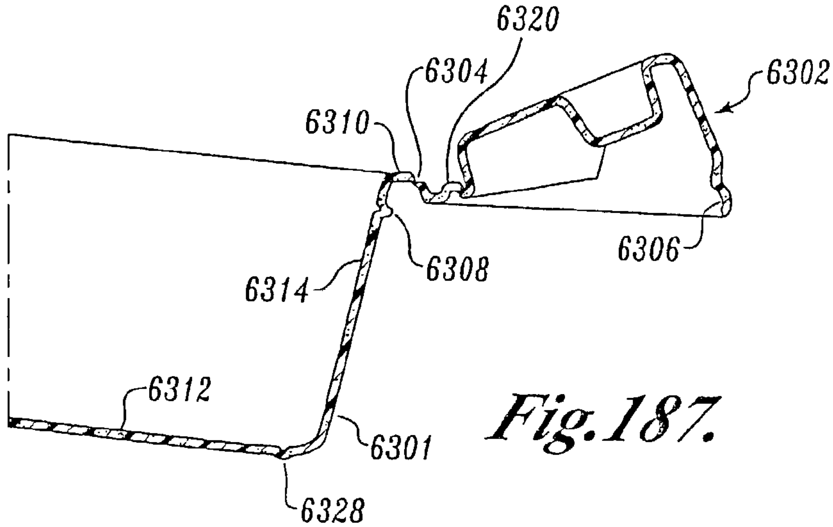
Figure 188:
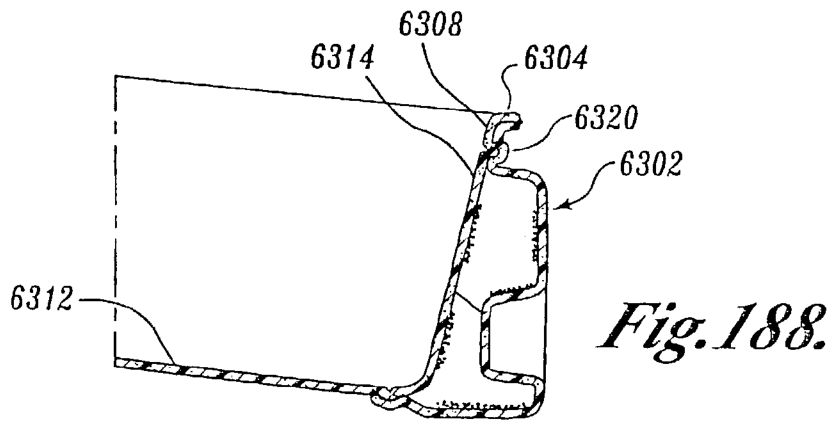
Figure 189:
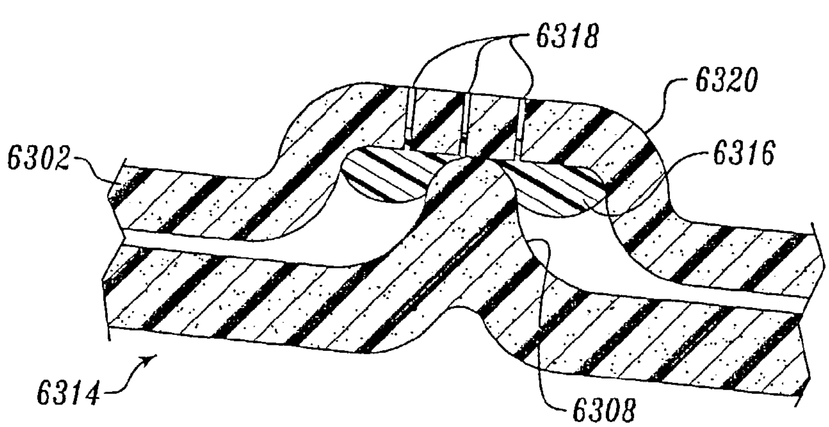
Figure 190:
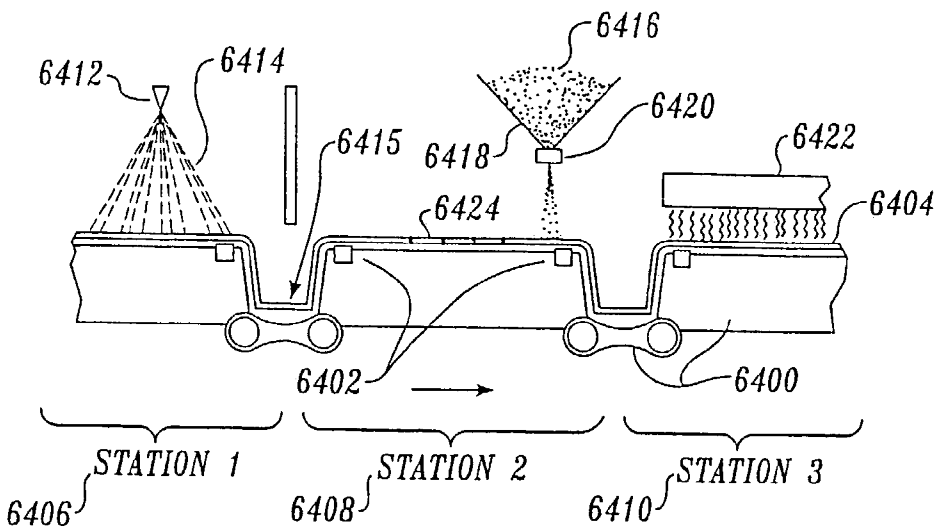
Figure 191:
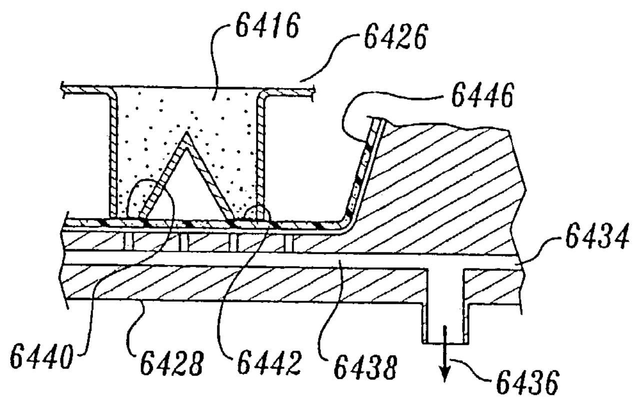
Figure 192:
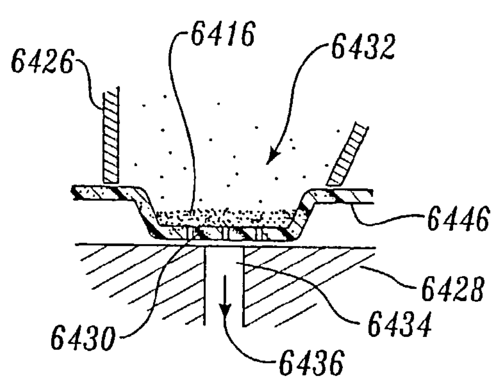
Figure 196:
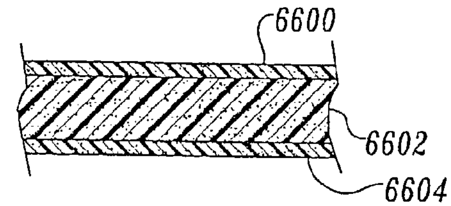
Figure 197:
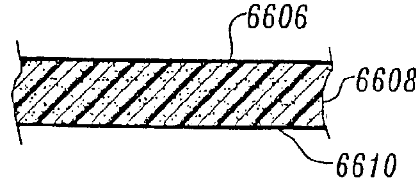
Figure 198:
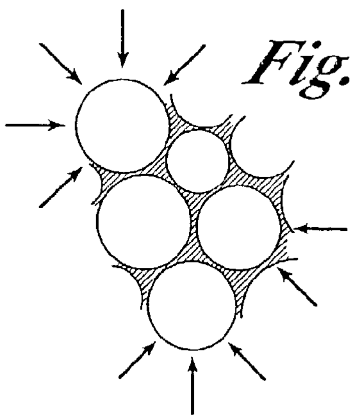
Figure 199:
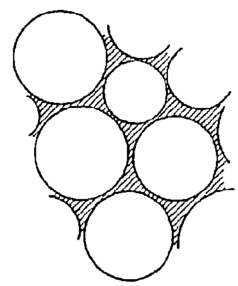
Figure 200:
Figure 201:
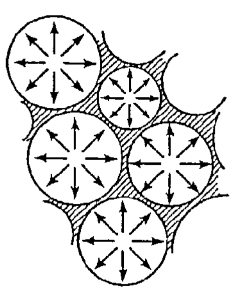
Figure 202:
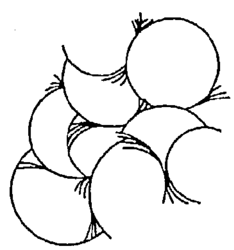
Figure 203:
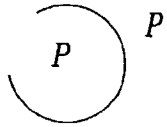
Figure 204:
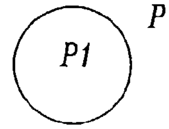
Figure 205:
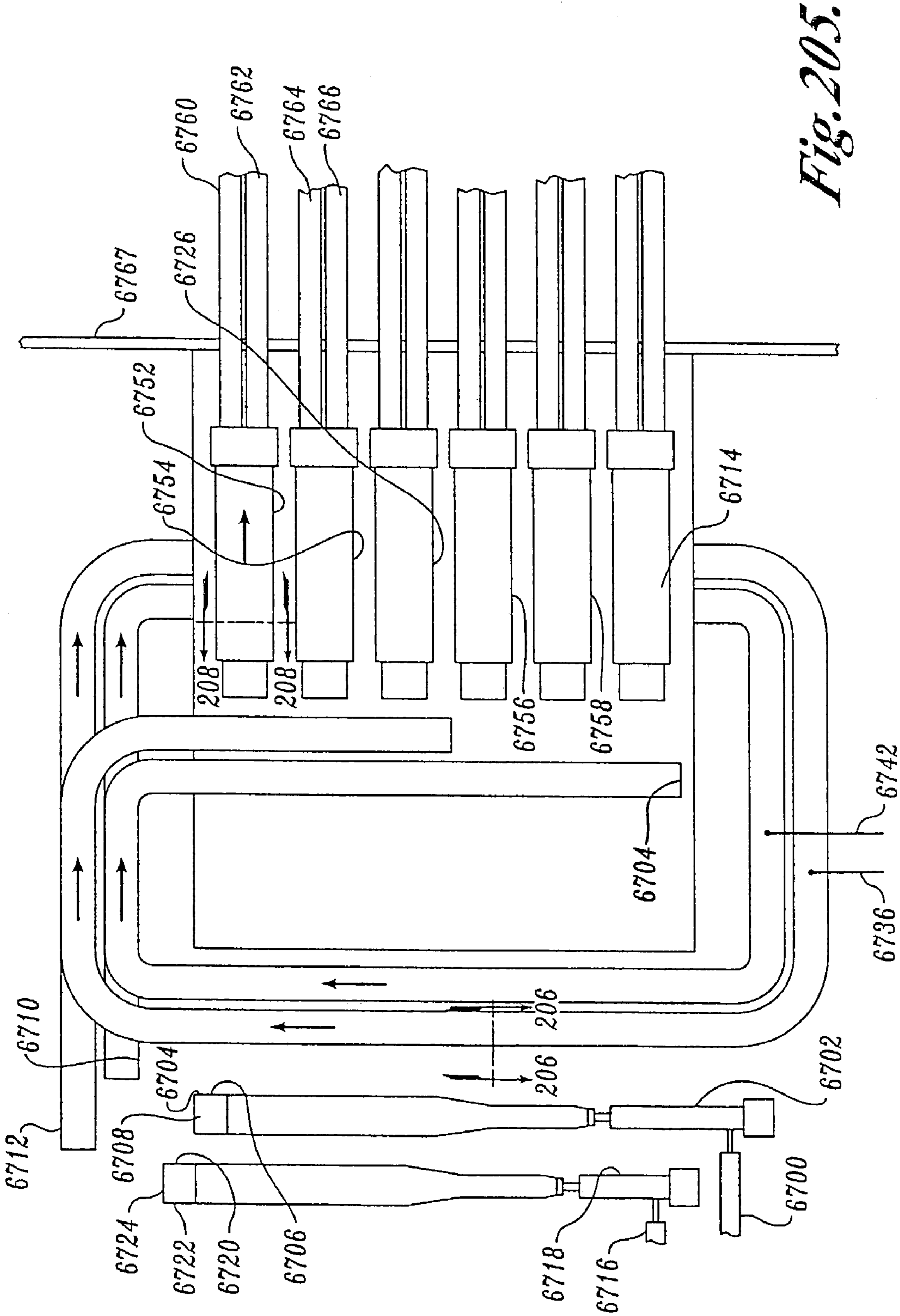
Figure 206:
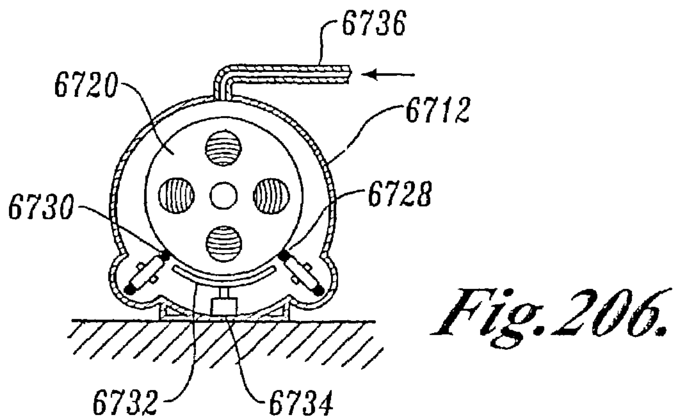
Figure 207:
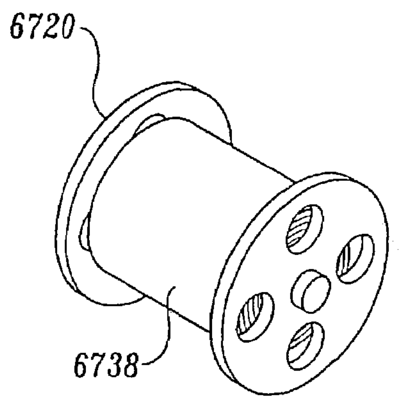
Figure 208:
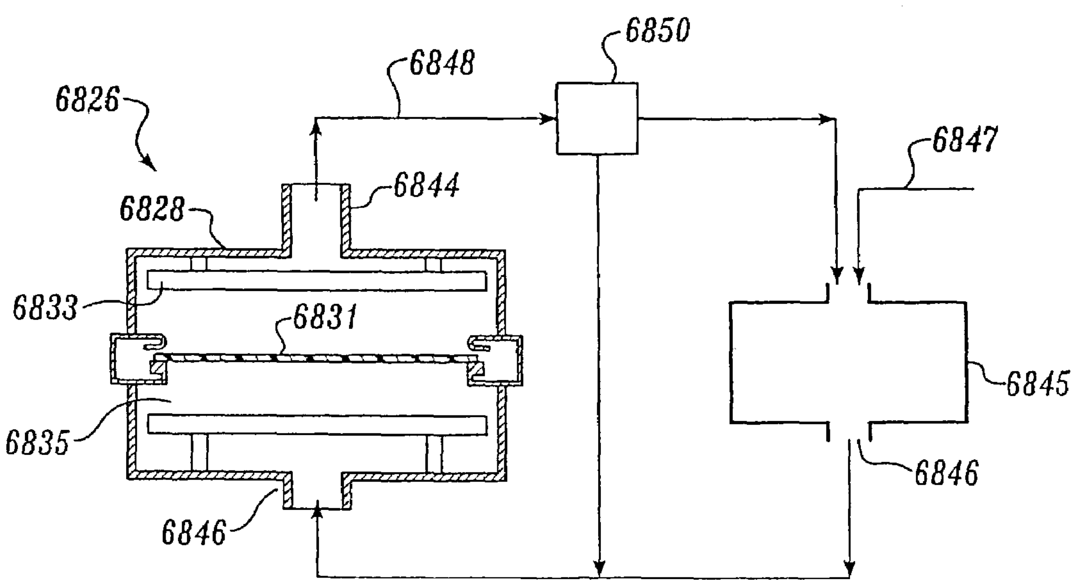
Figure 209:
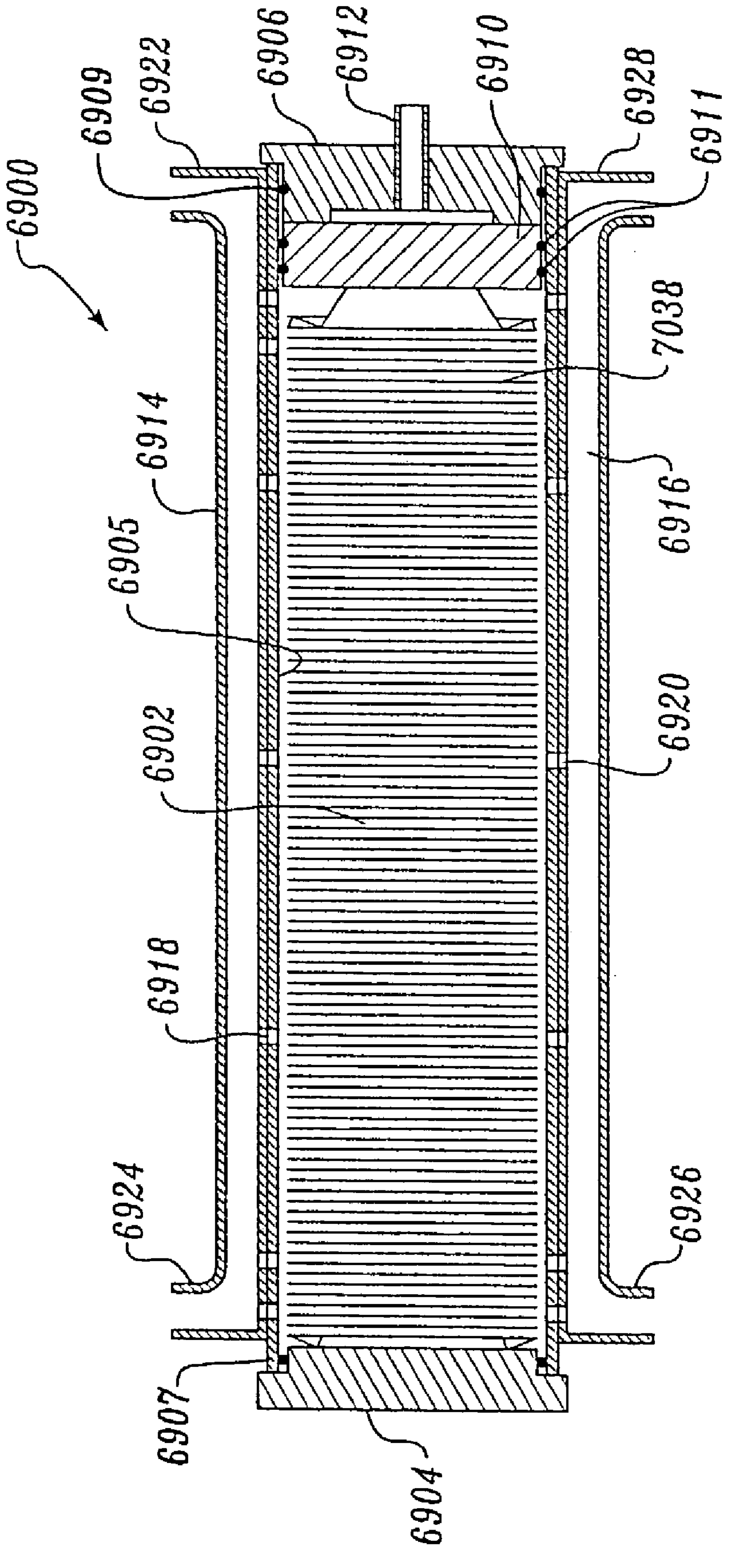
Figure 210:
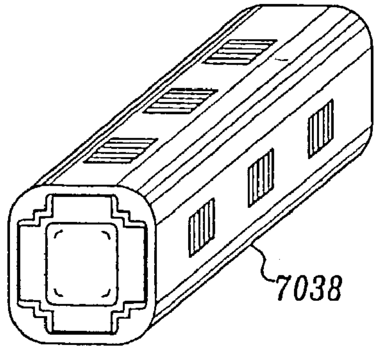
Figure 211:
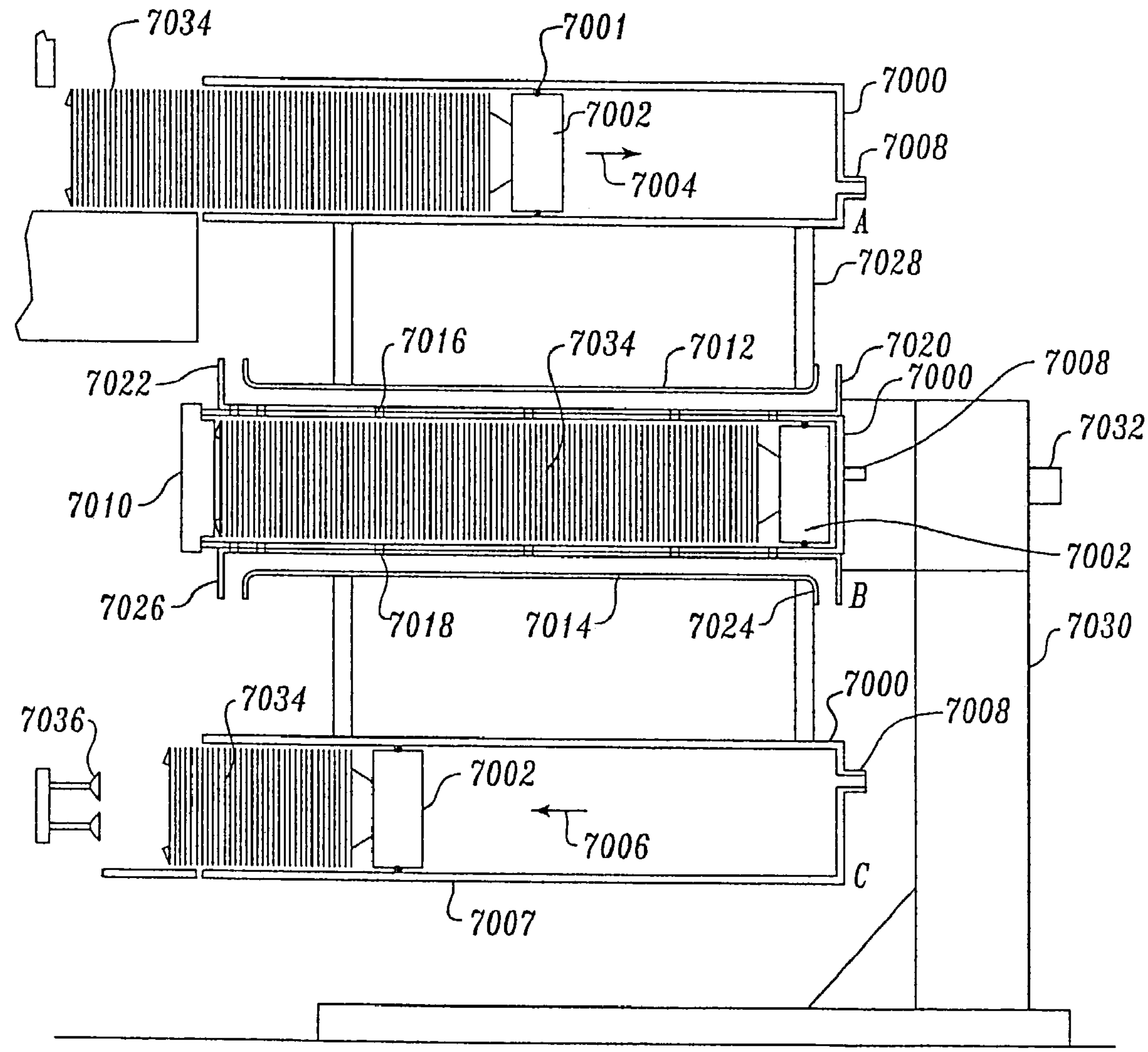
Figure 212:
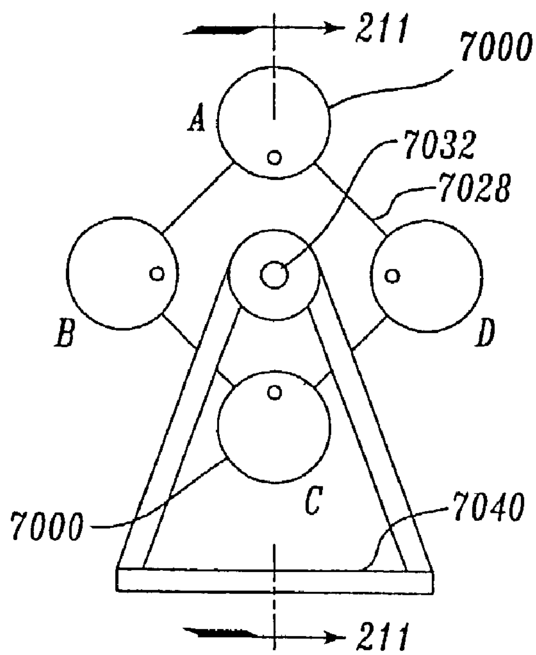
Figure 213:
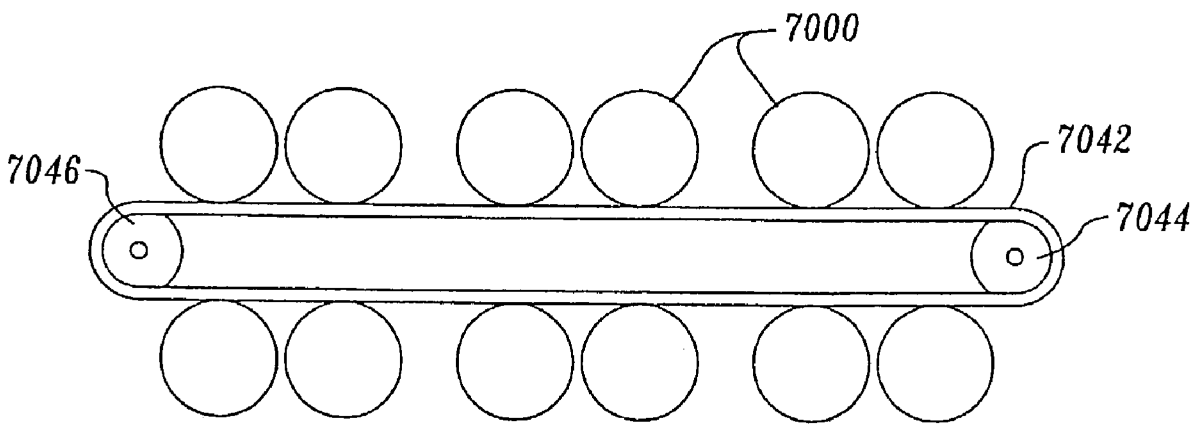
Figure 214:
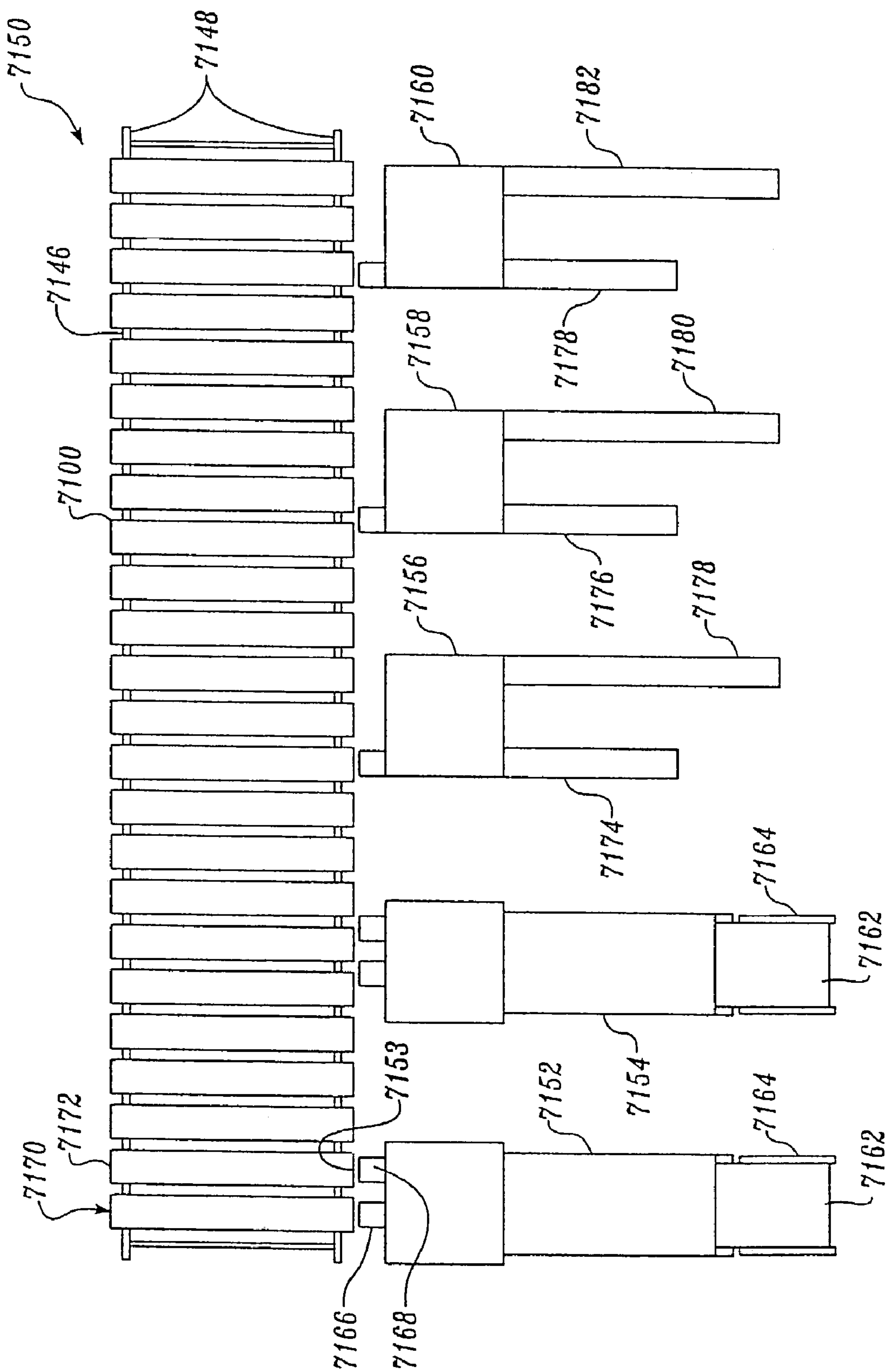
Figure 215:
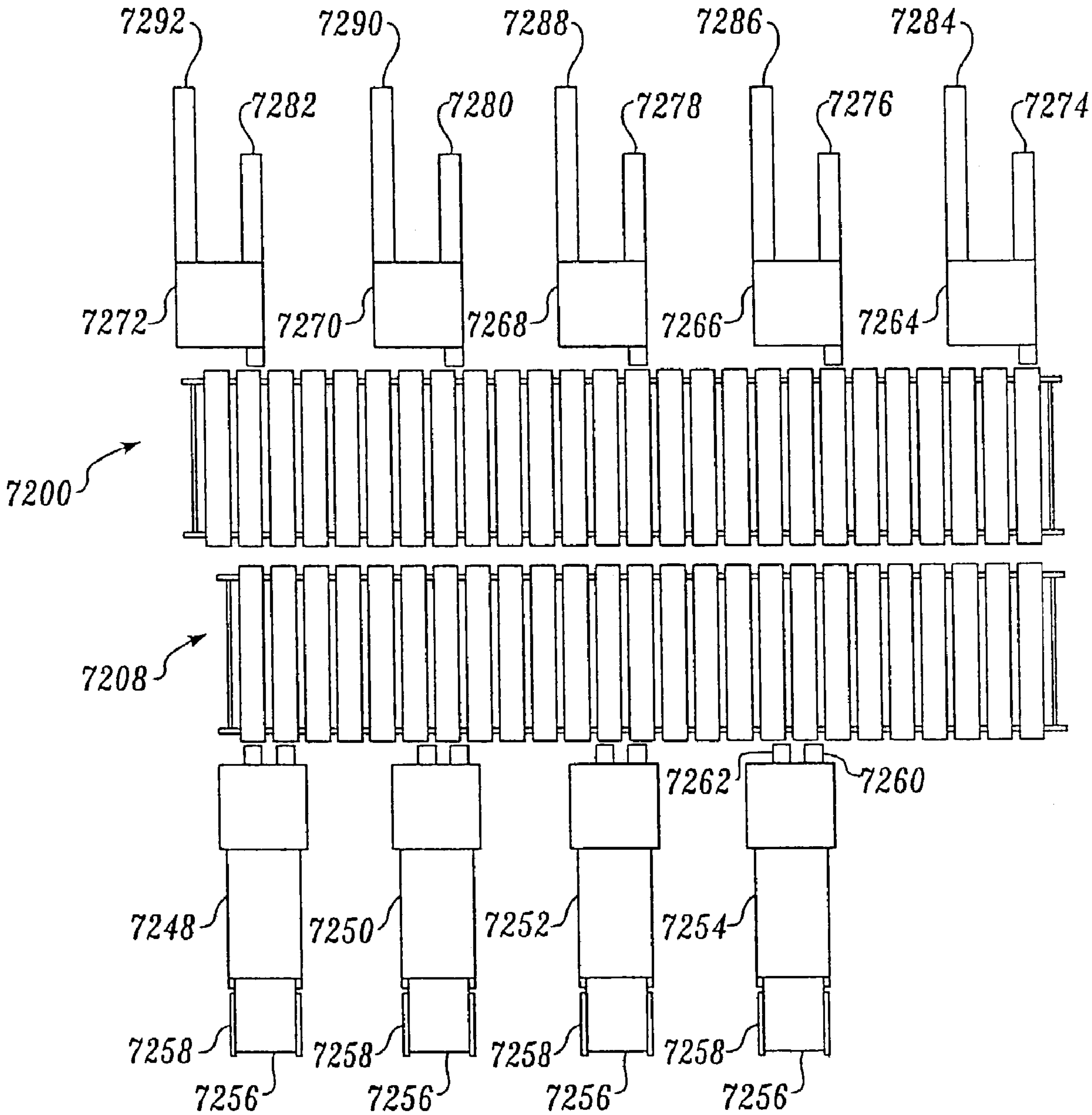
Figure 216:
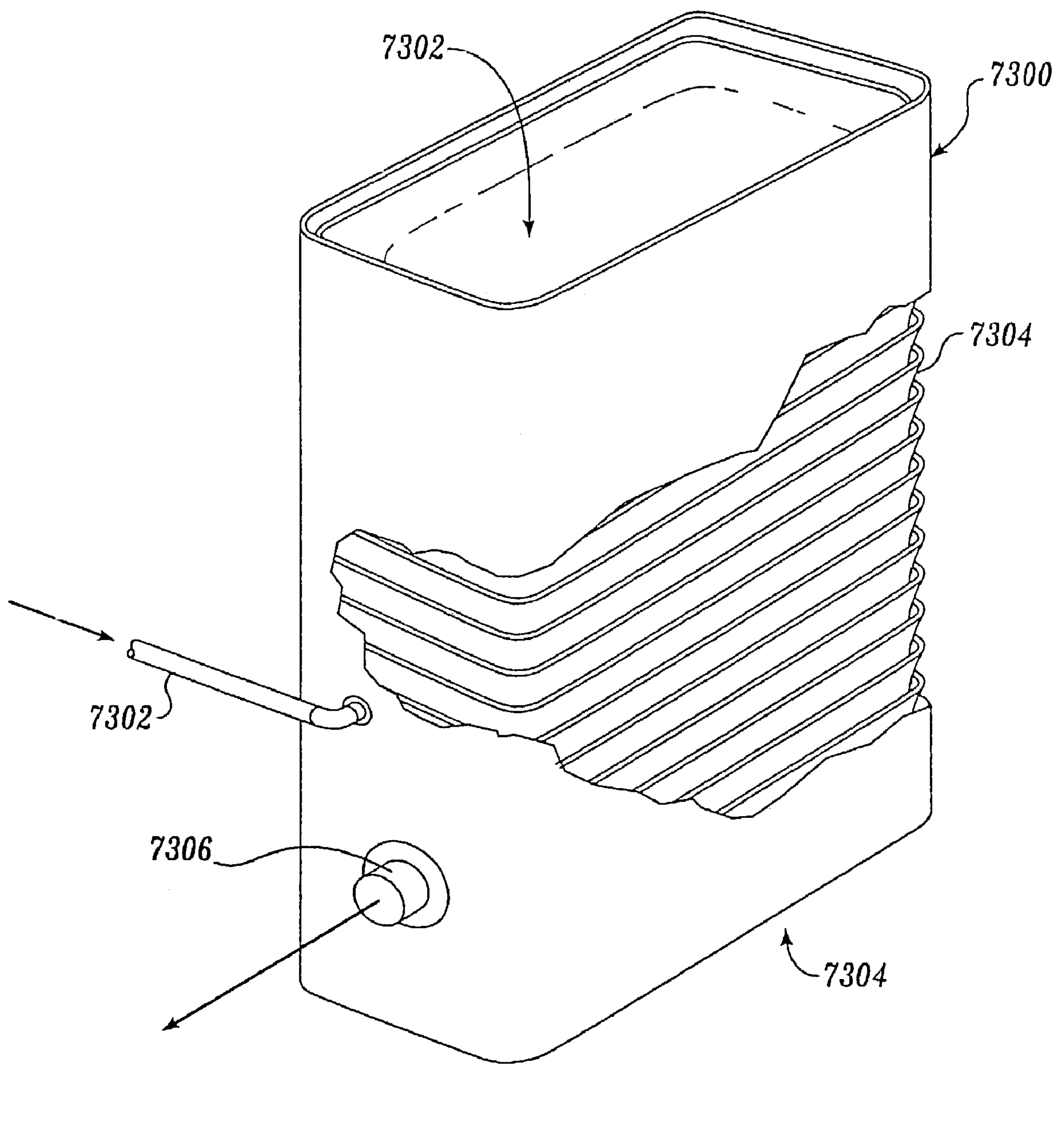
Figure 217:
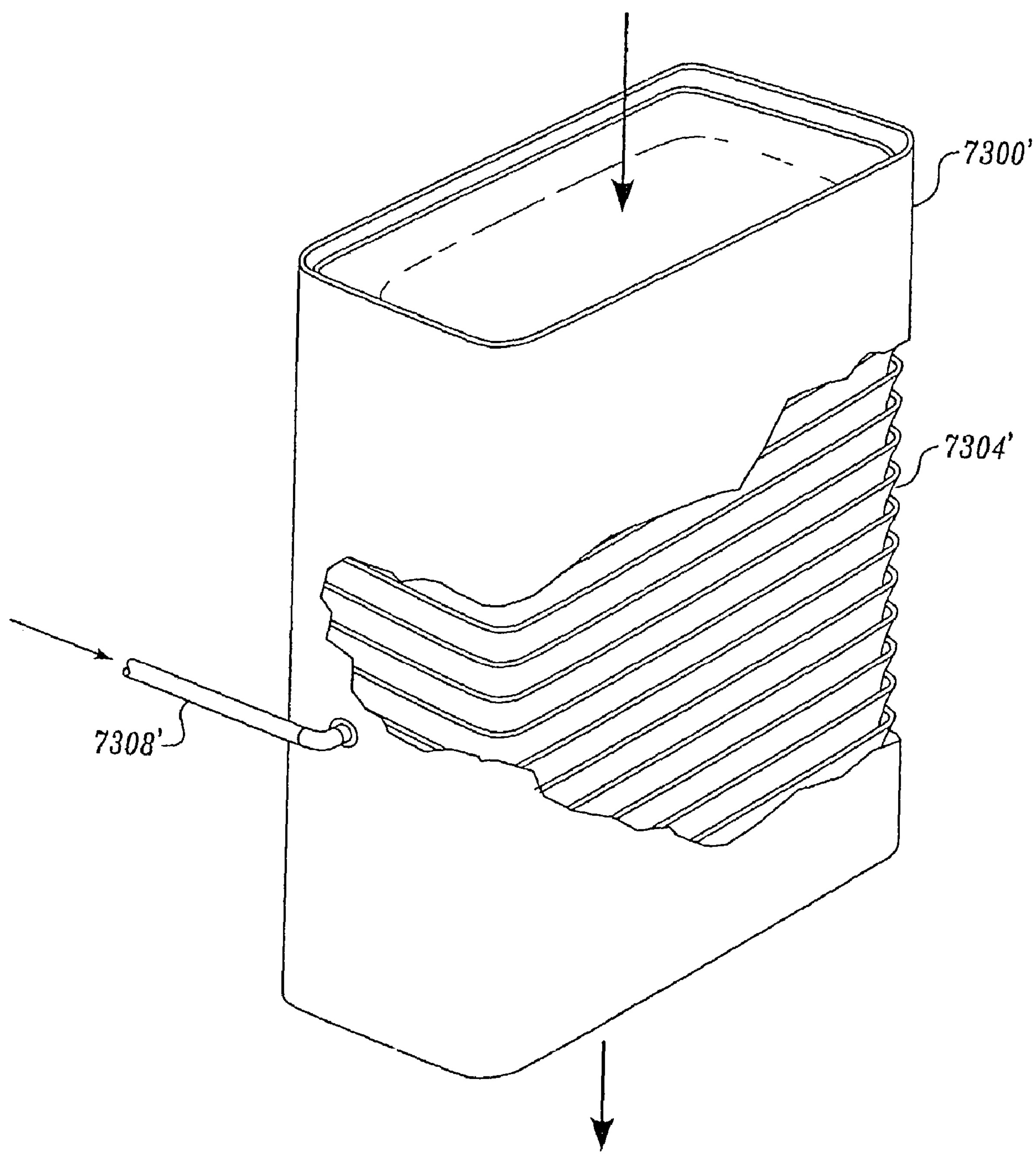
Figure 218:
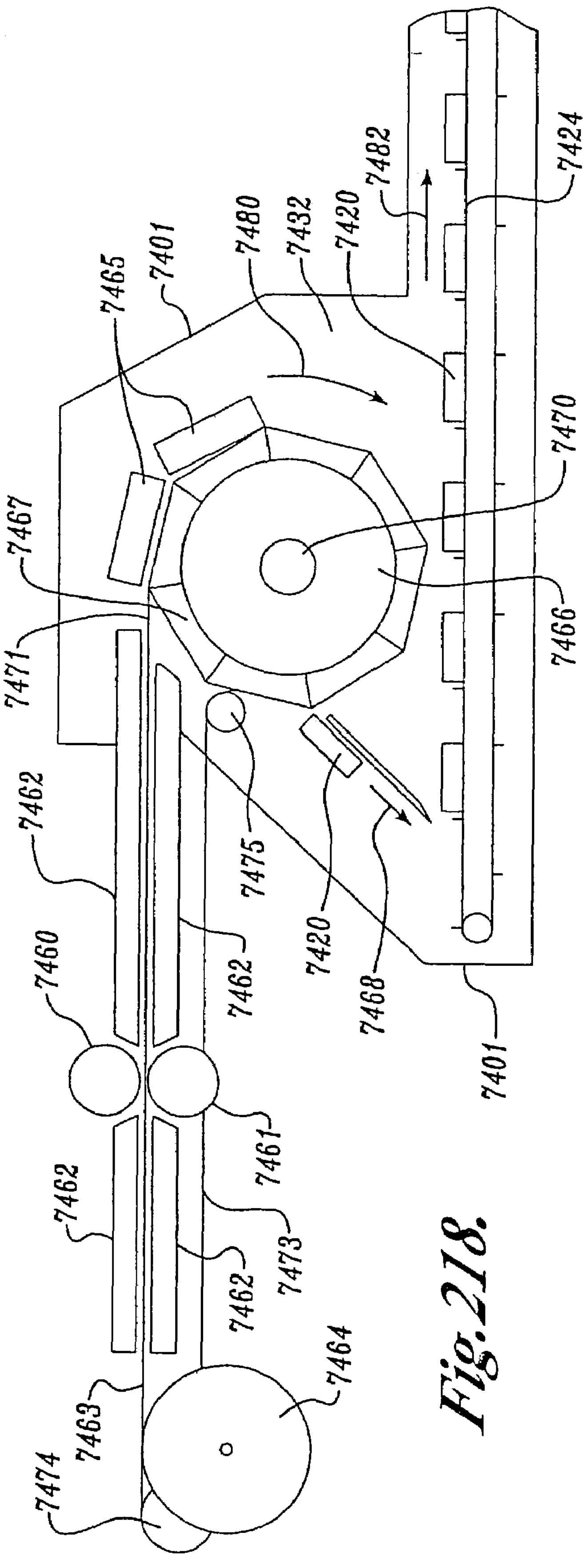
Figure 219:
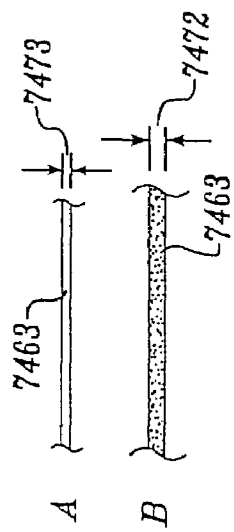
Figure 220:
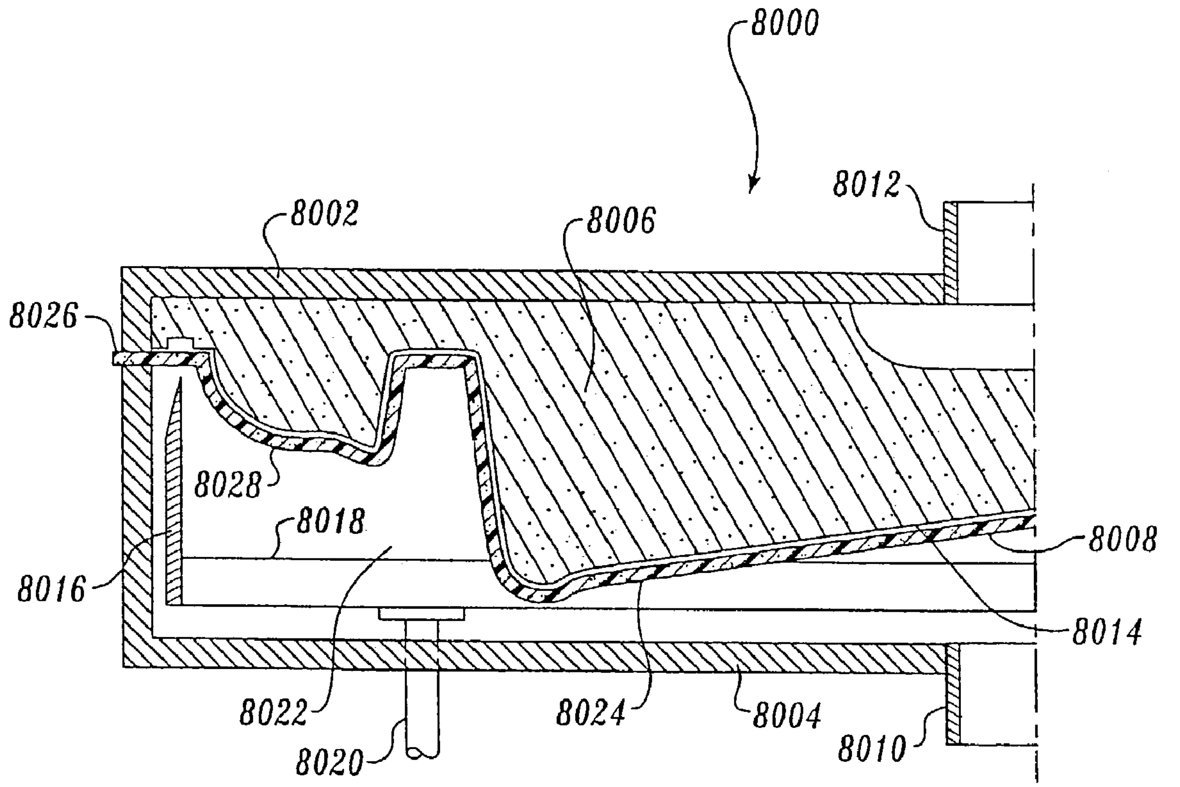
Figure 221:
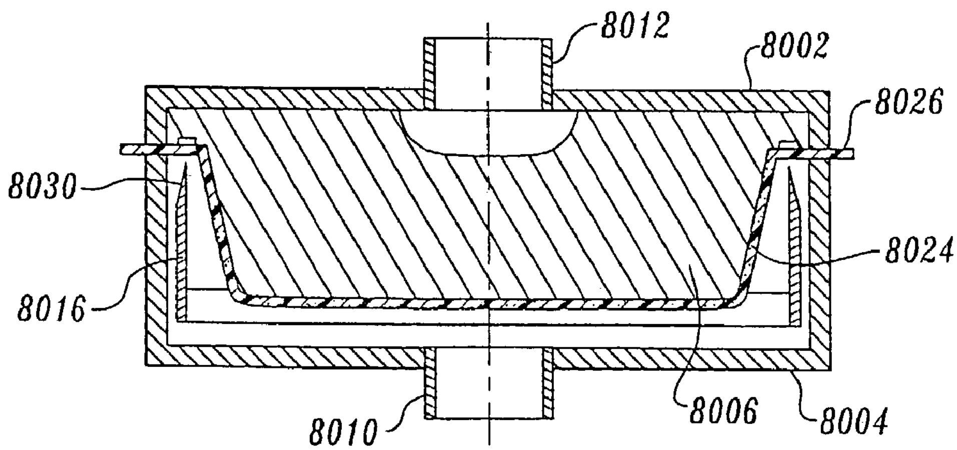
Figure 225:
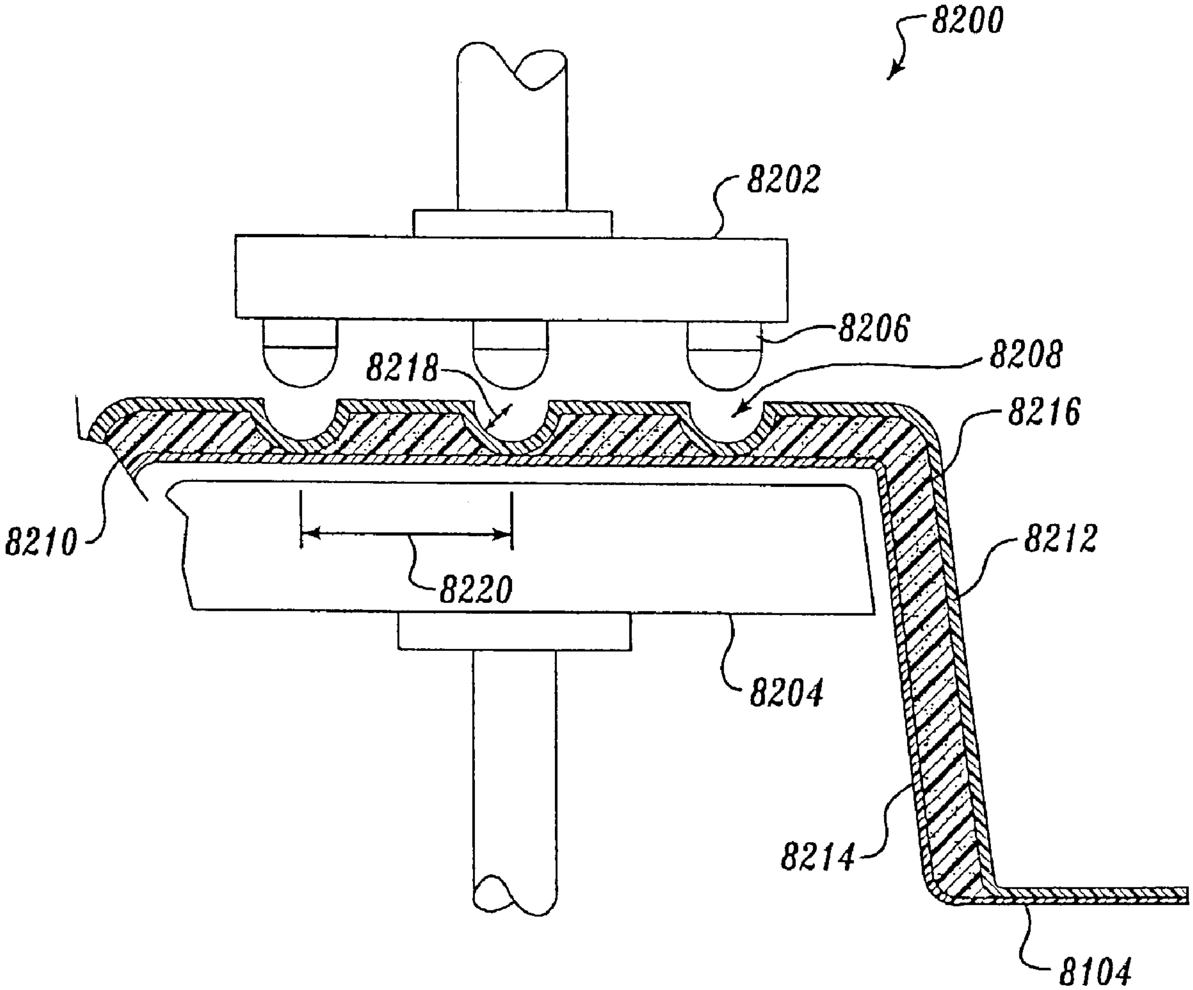
Figure 226:
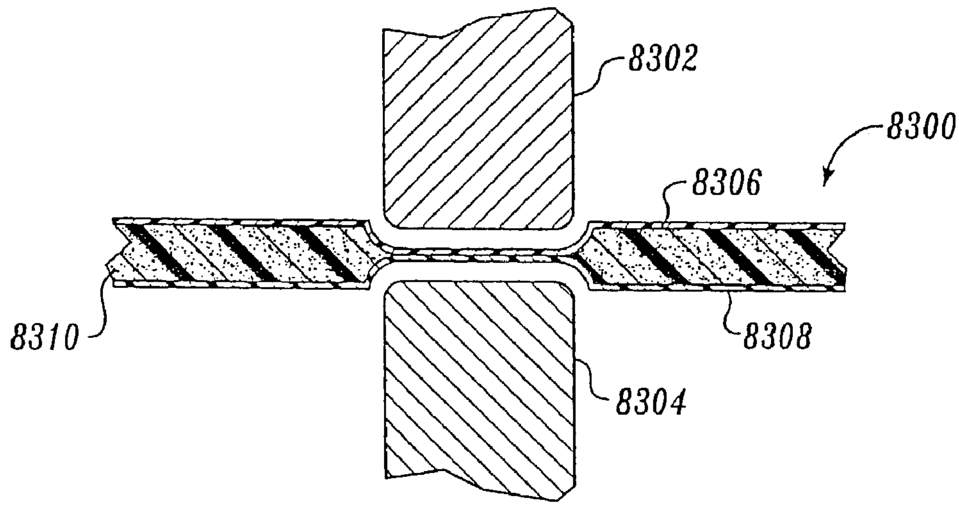
Figure 227:
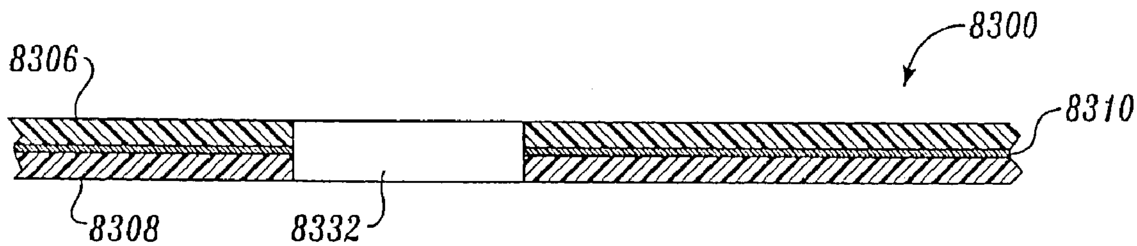
Figure 228:
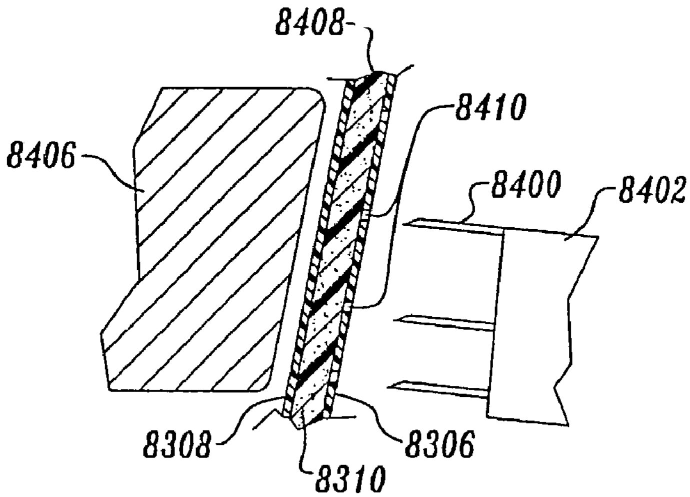
Figure 229:
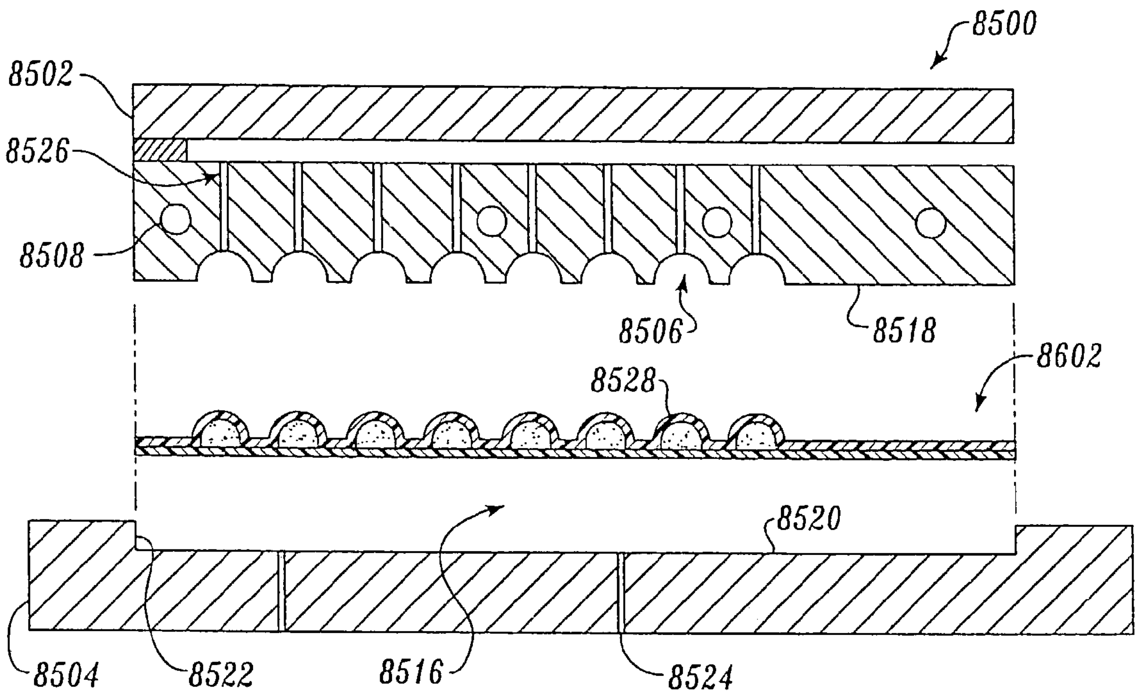
Figure 230:
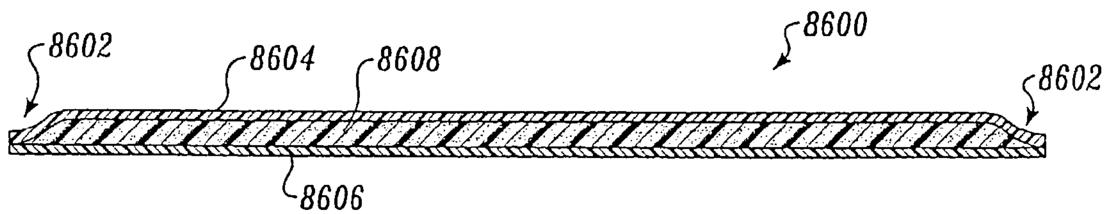
Figure 231:
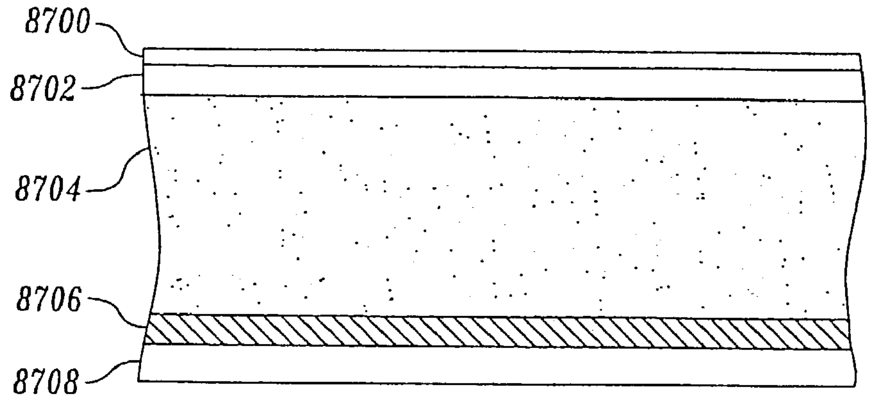
Figure 232:
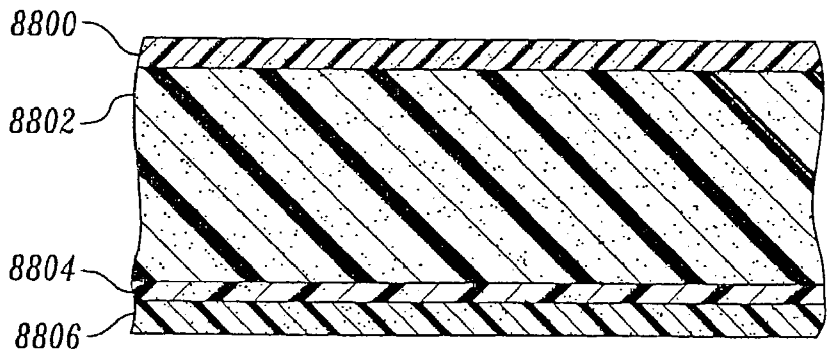
Figure 233:
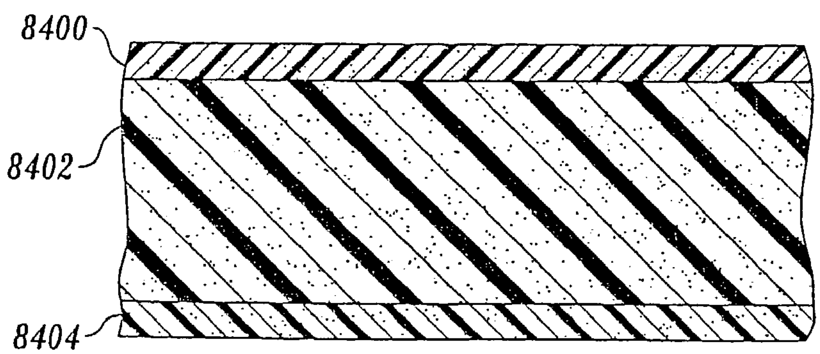
Figure 234:
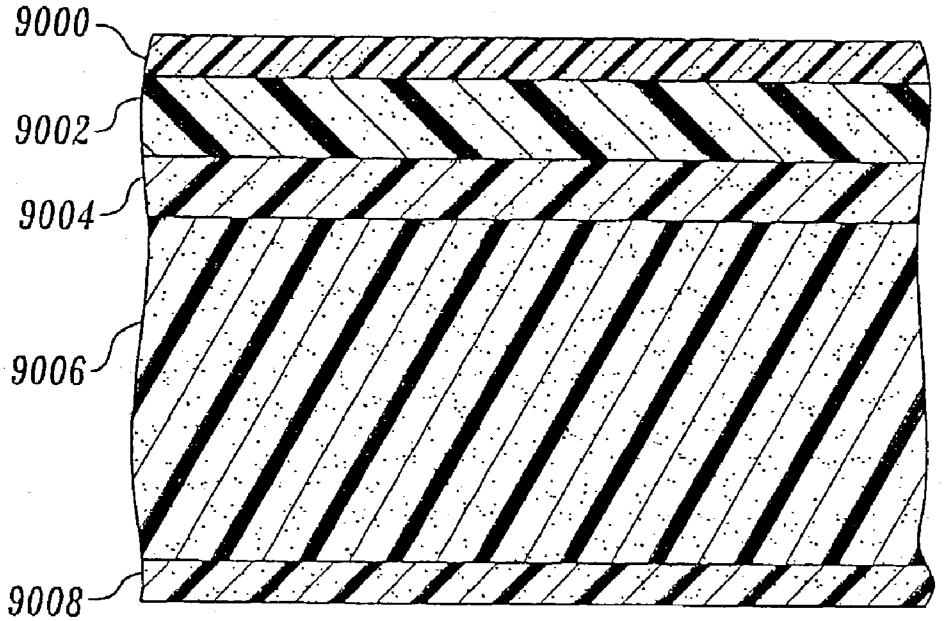
Figure 235:
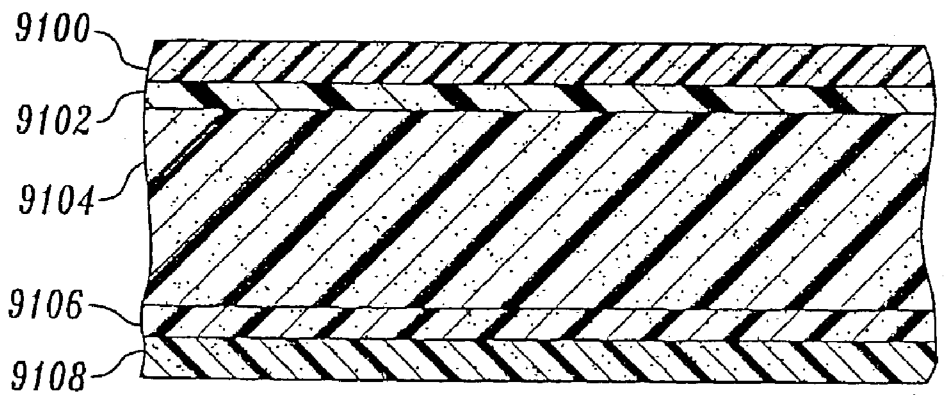
Figure 236:
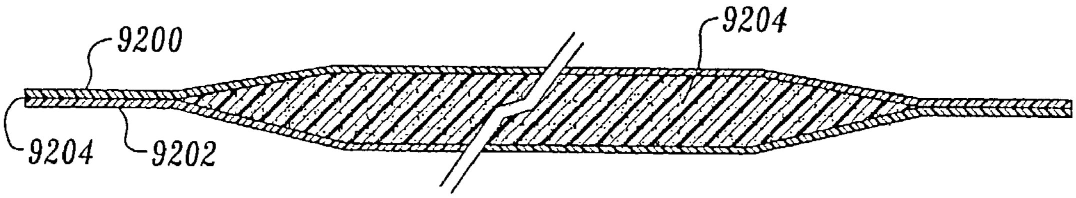
Figure 237:
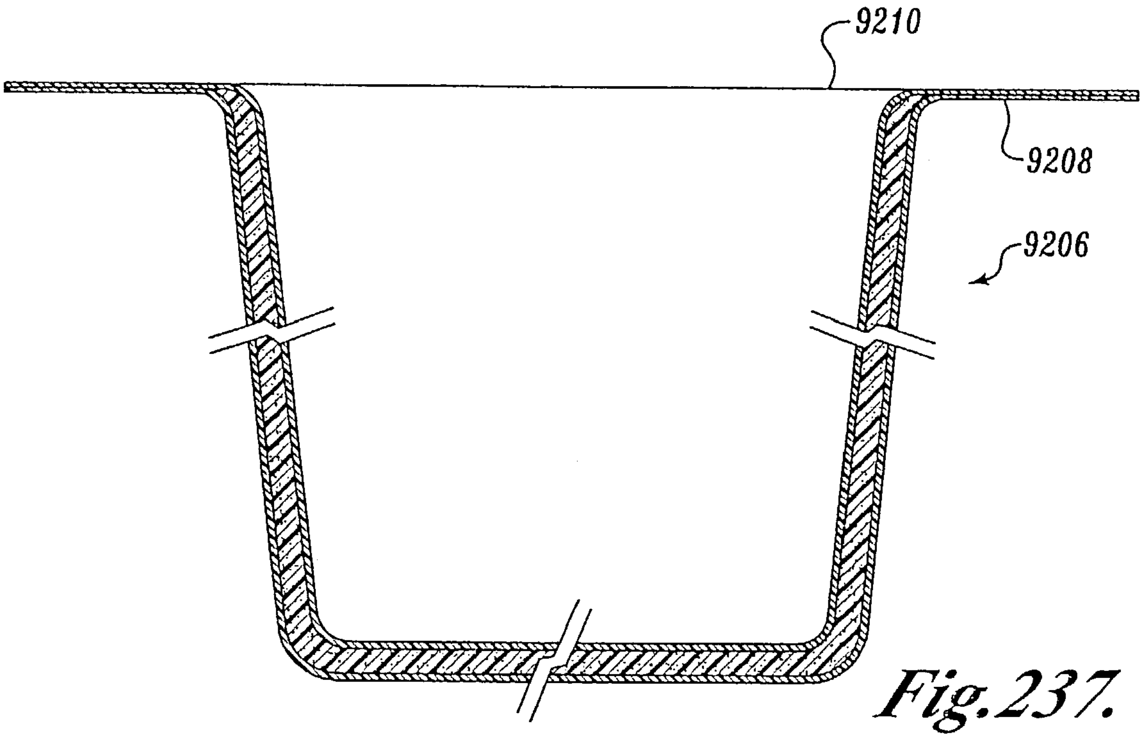
Figure 238:
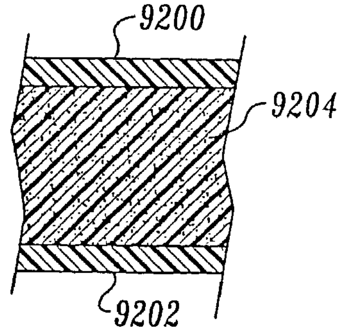
Figure 239:
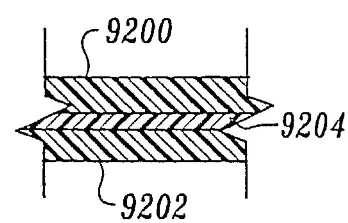
Figure 240:
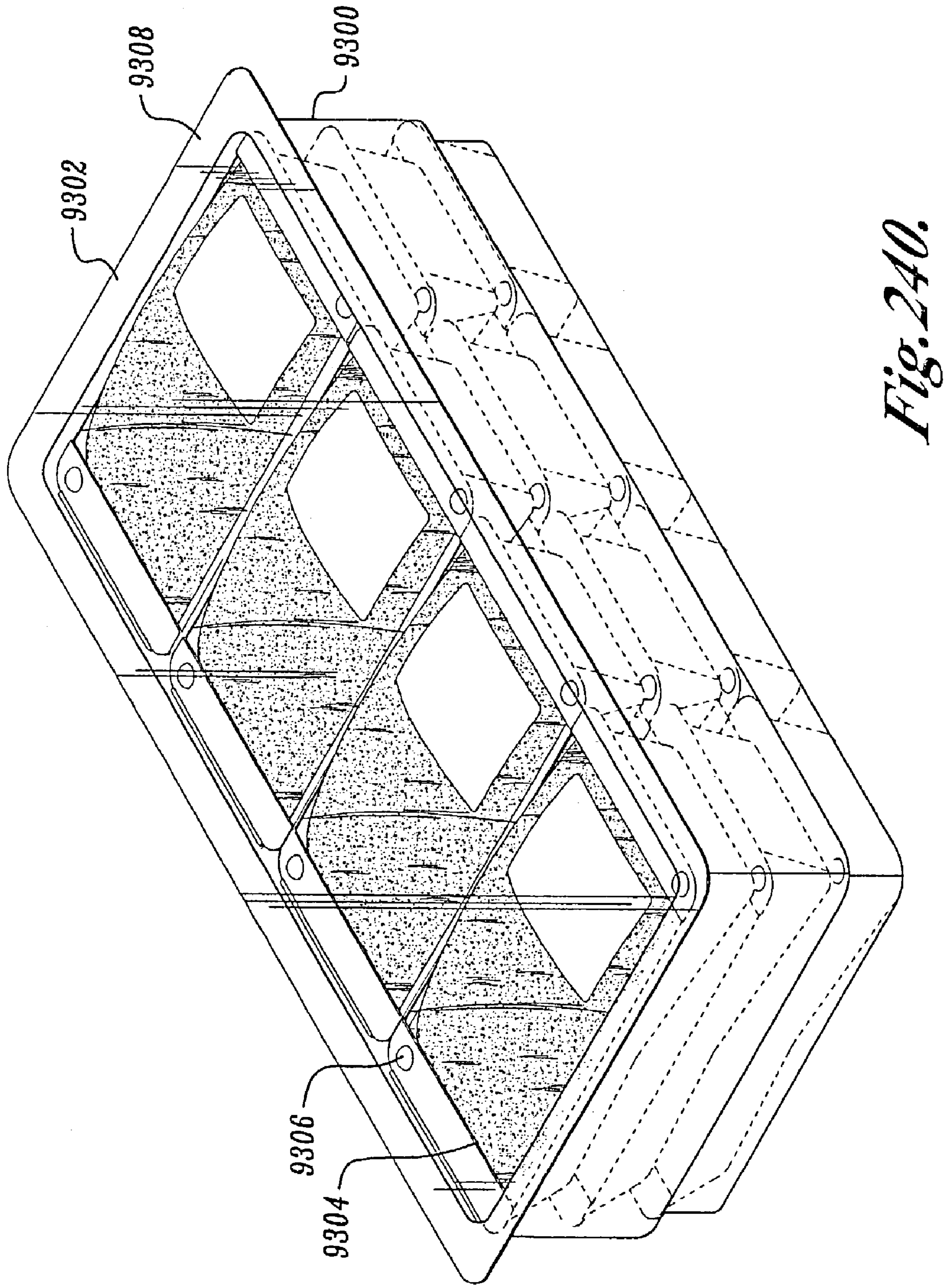
Figure 243:
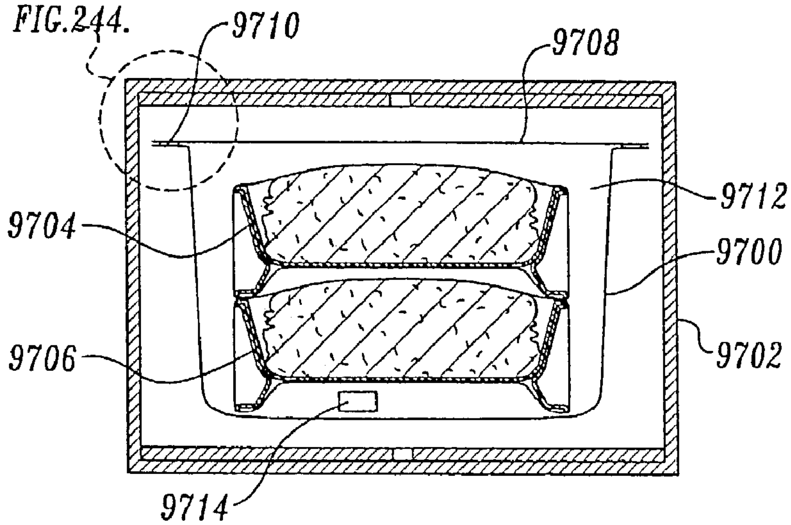
Figure 244:
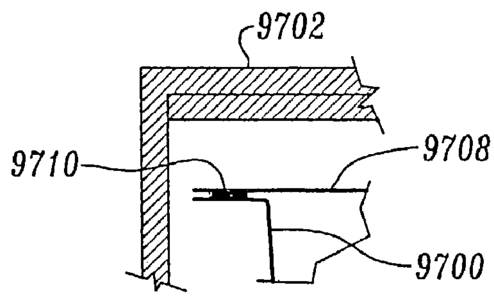
Figure 245:
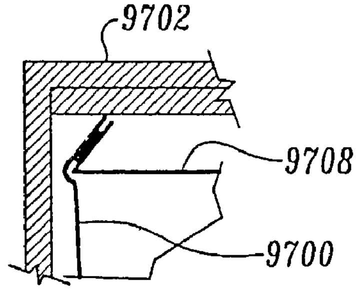
Figure 246:
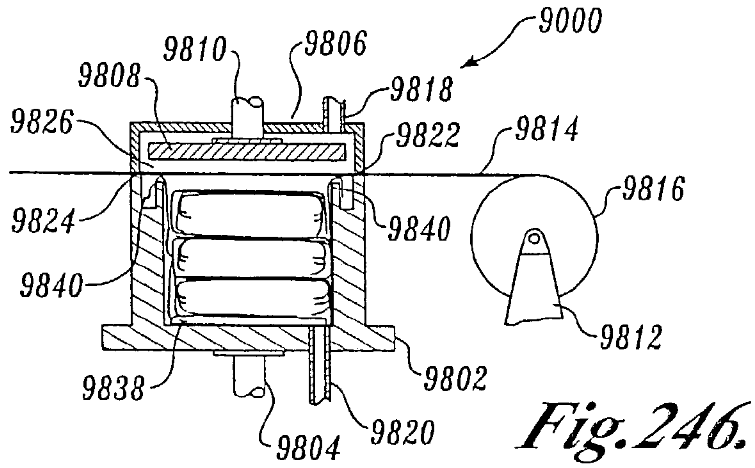
Figure 247:
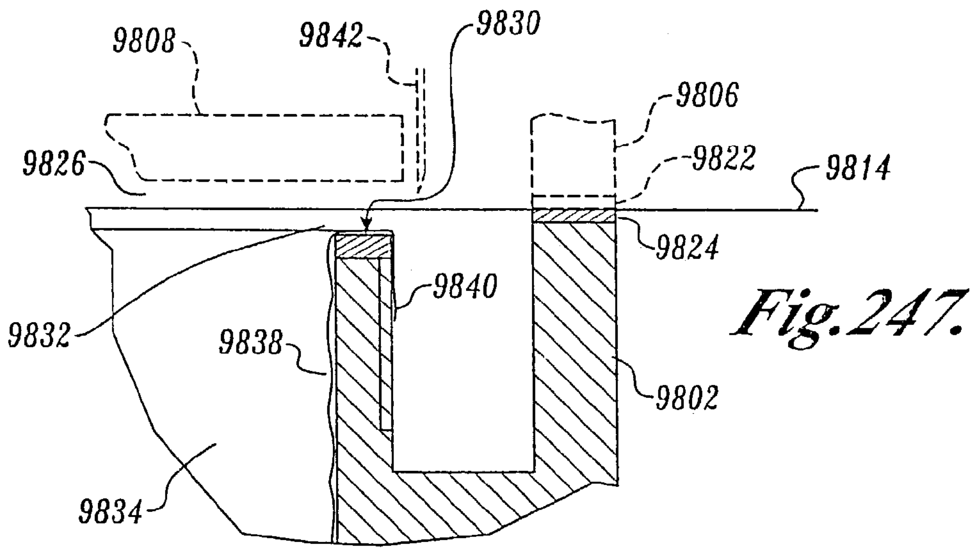
Figure 248:
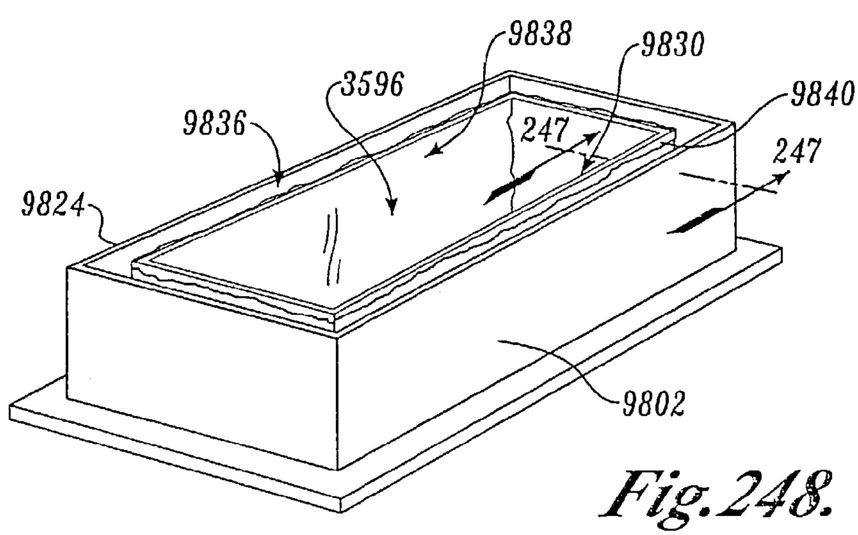
Figure 249:
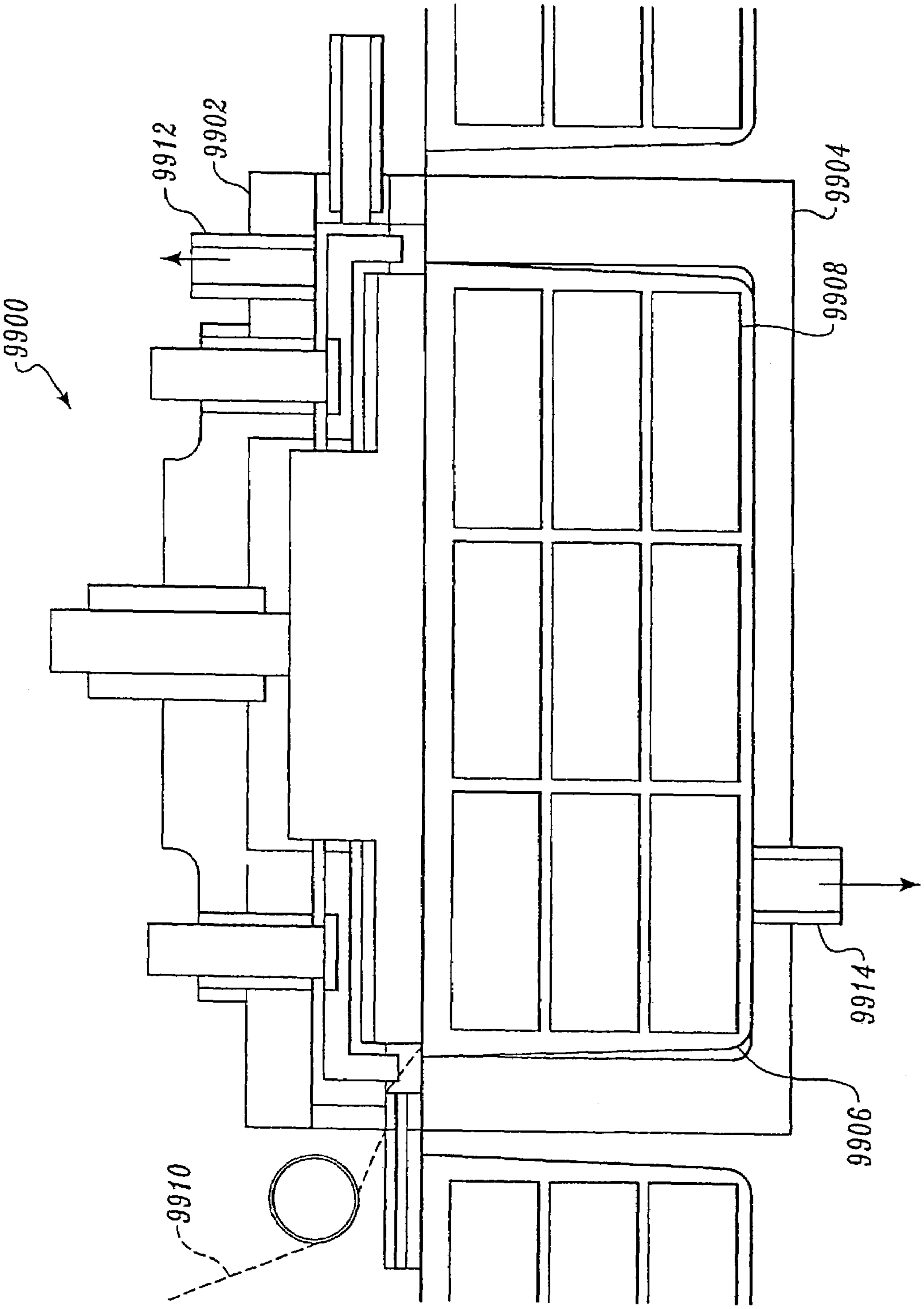
Figure 250:
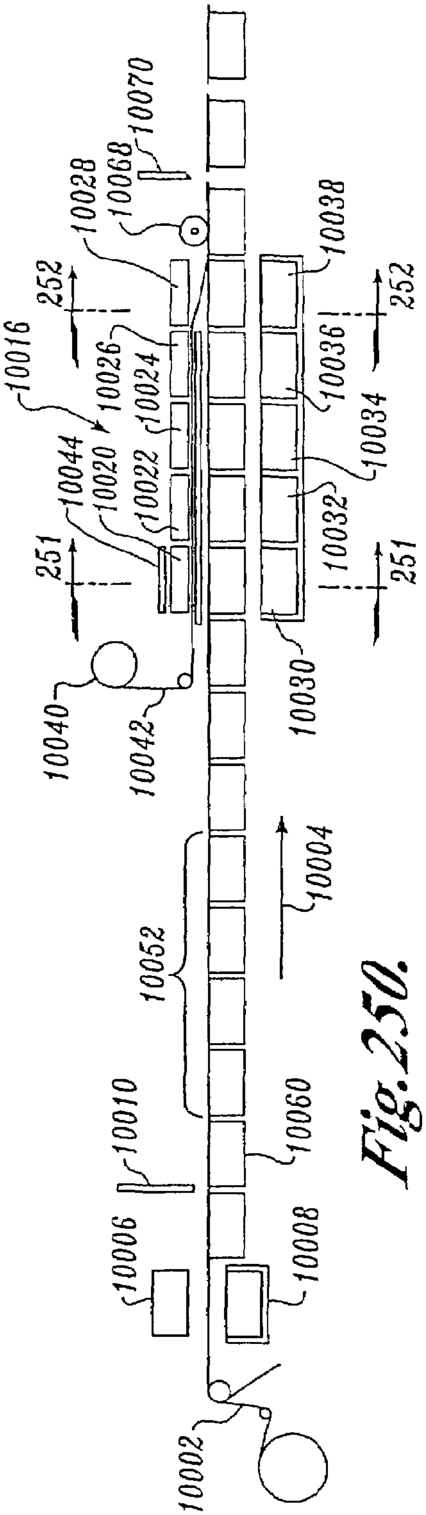
Figure 251:
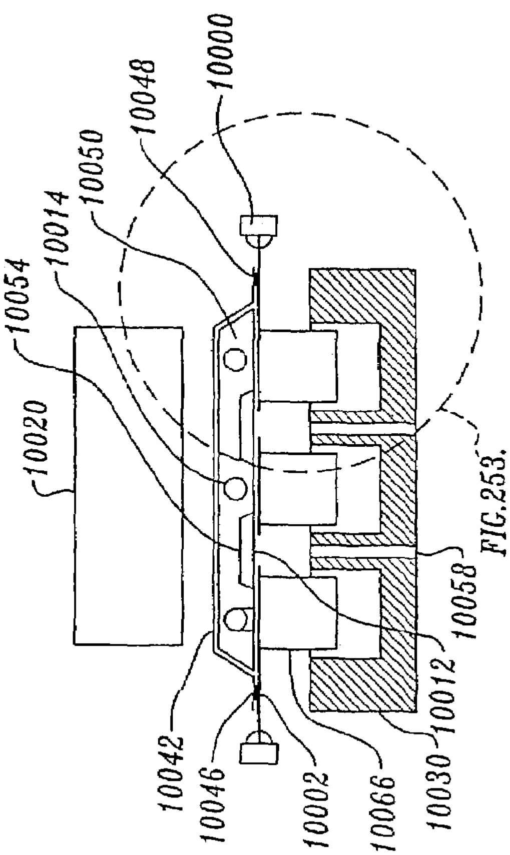
Figure 252:
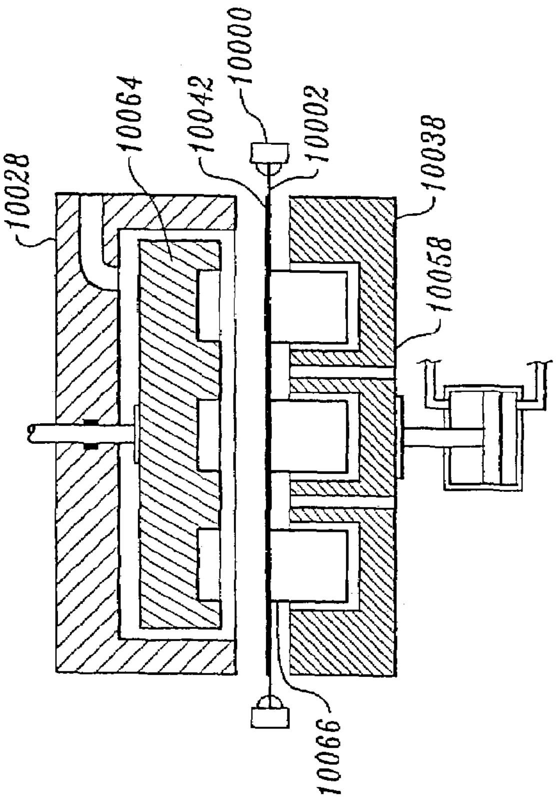
Figure 253:
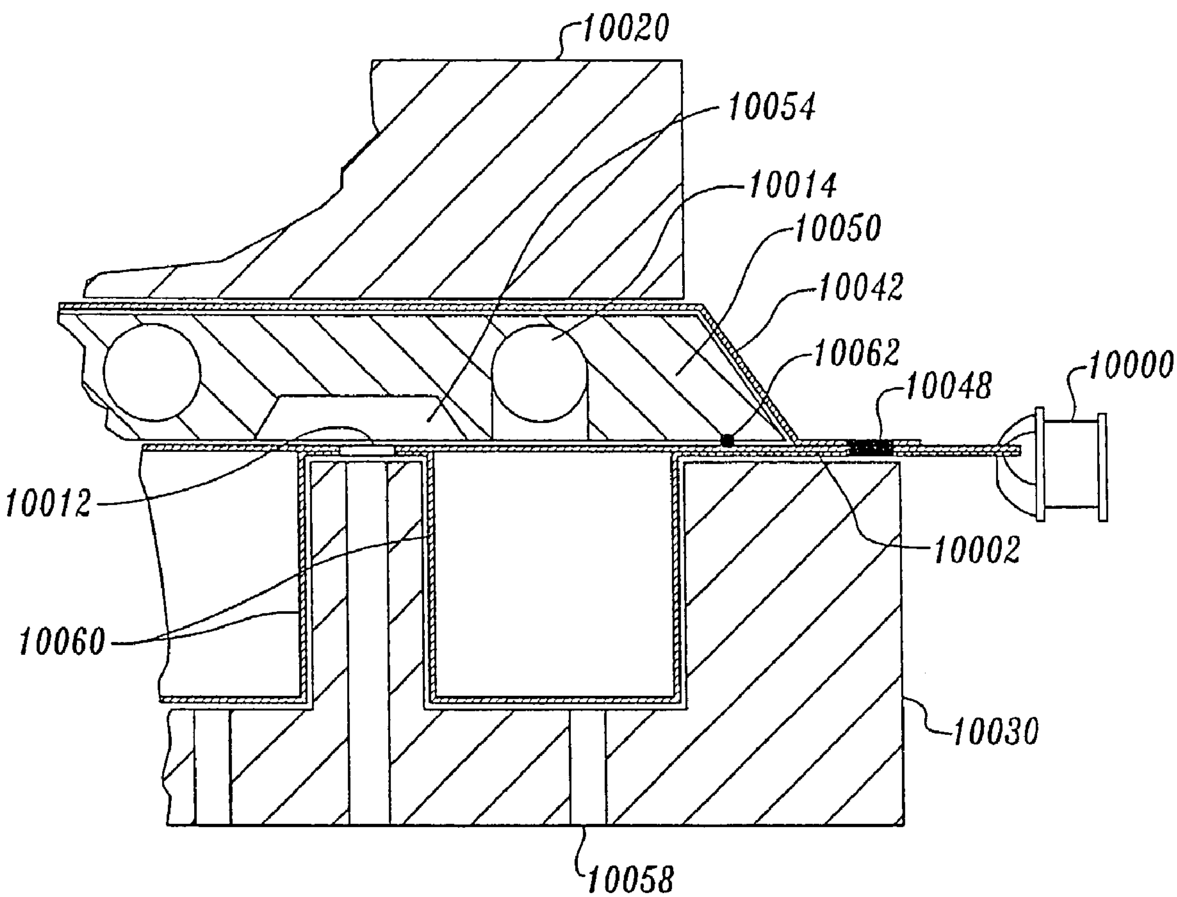
Figure 254:
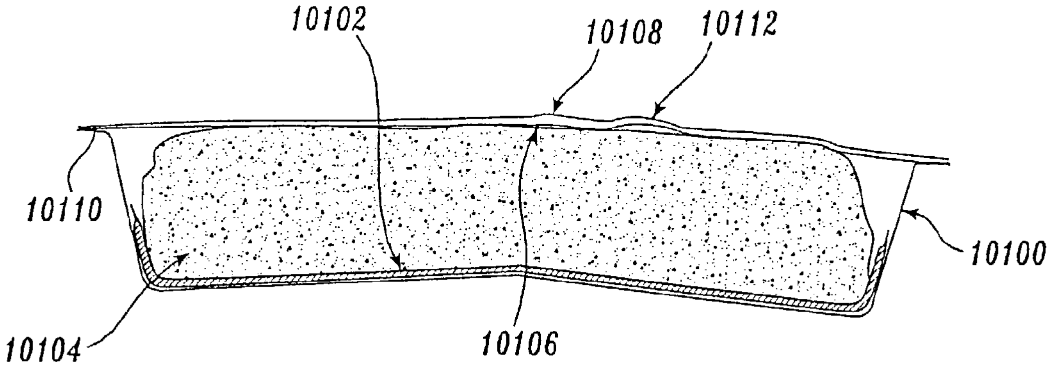
Figure 255:
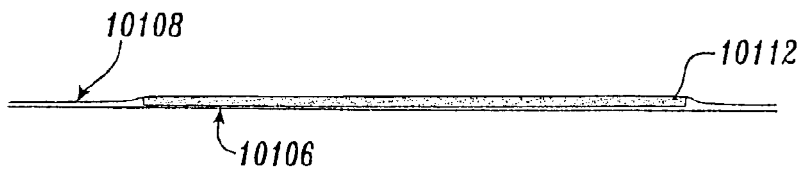
Figure 256:
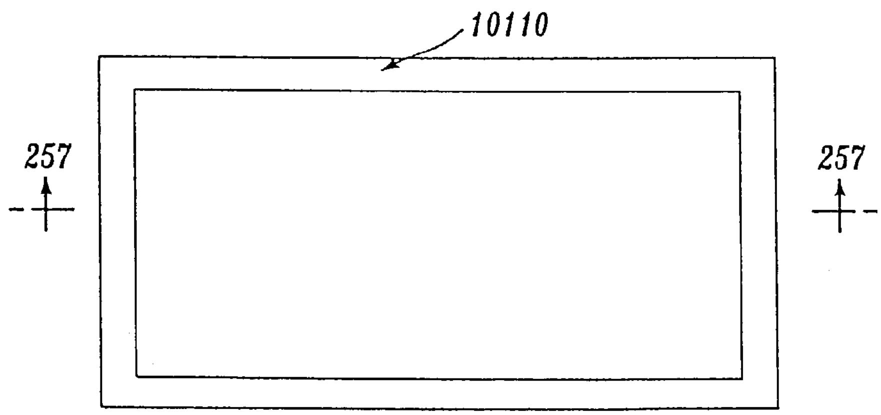
Figure 257:
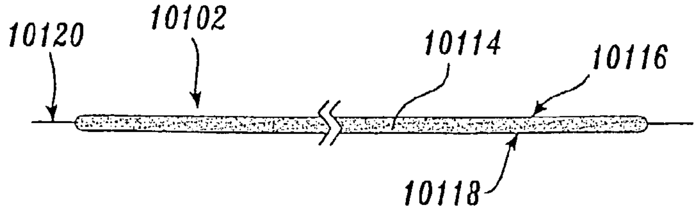
Figure 258:
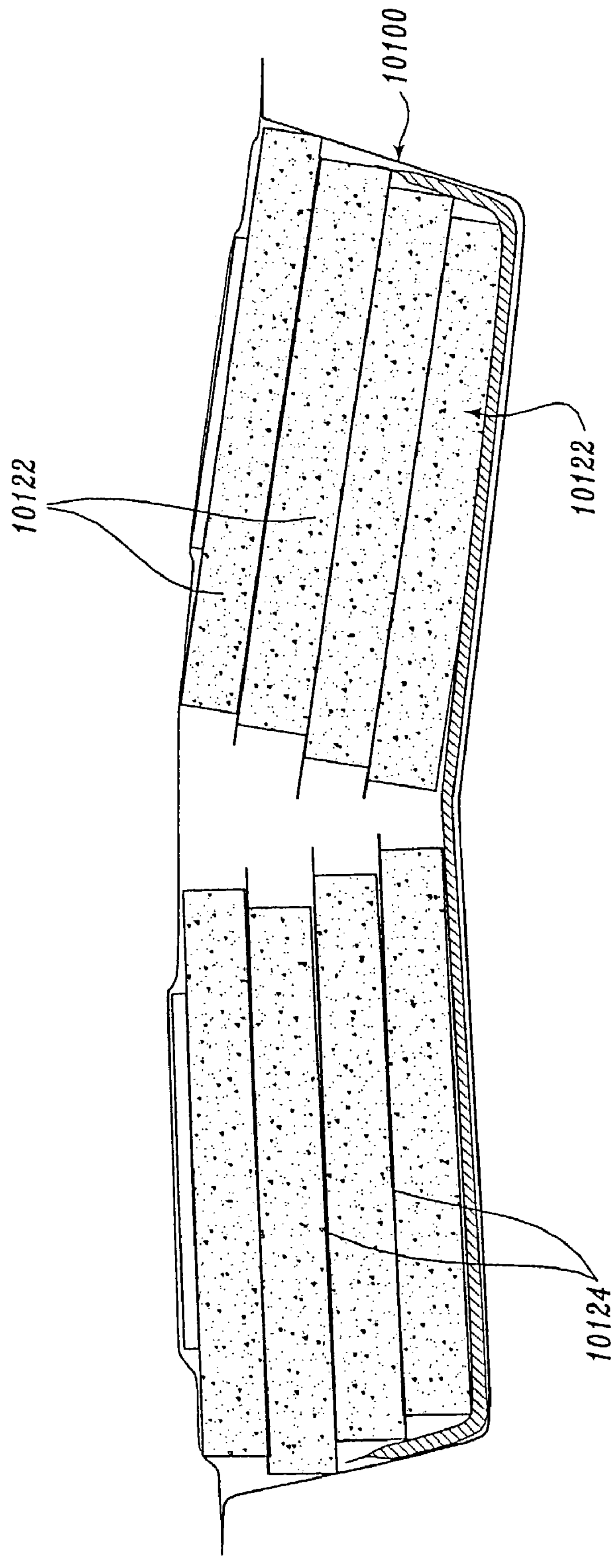
Figure 259:
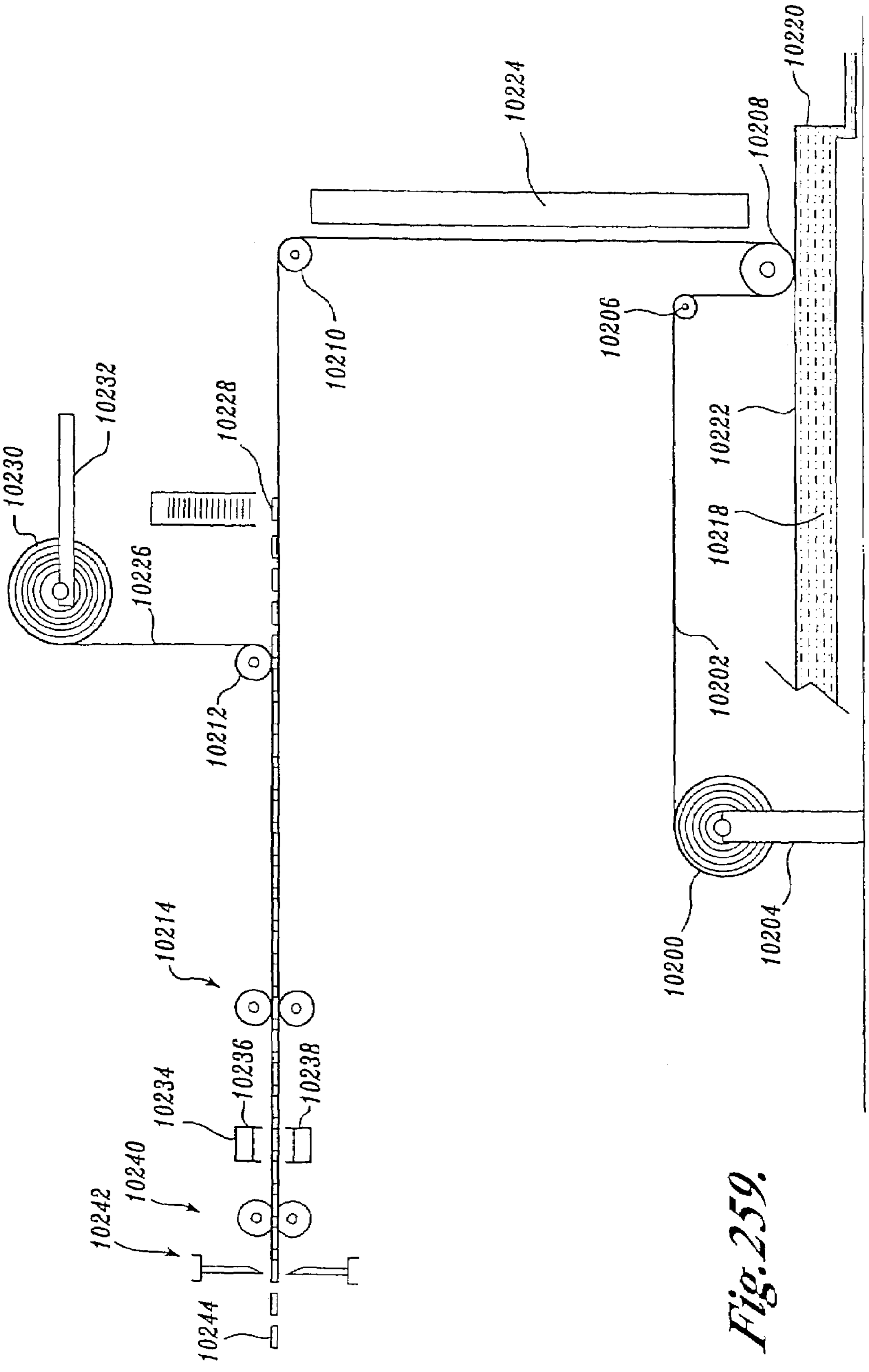
Figure 260:
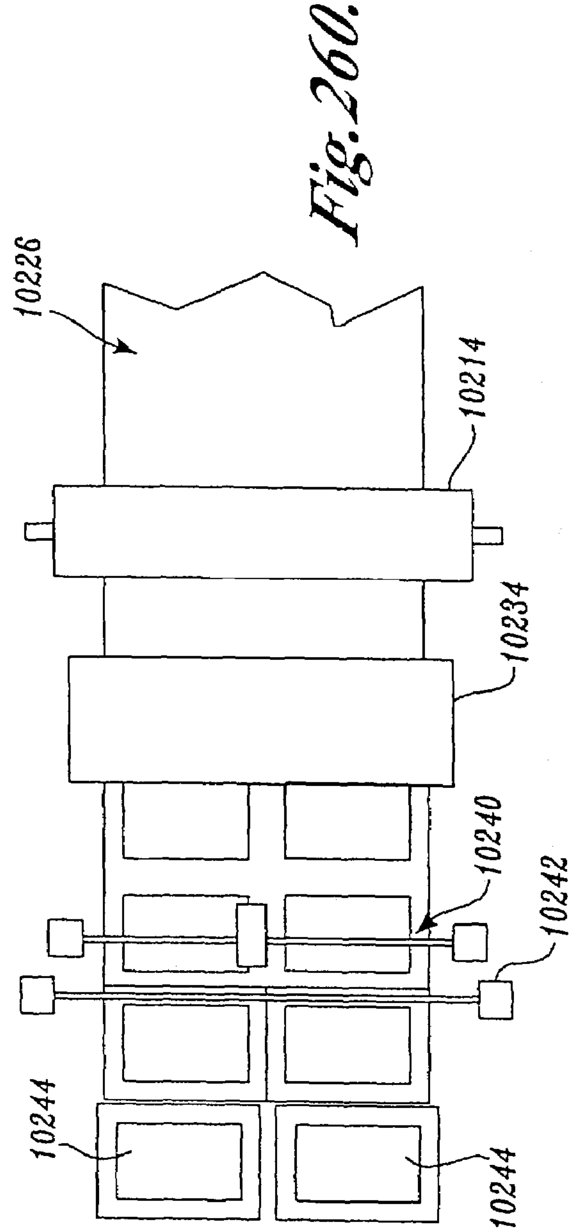
Figure 262:
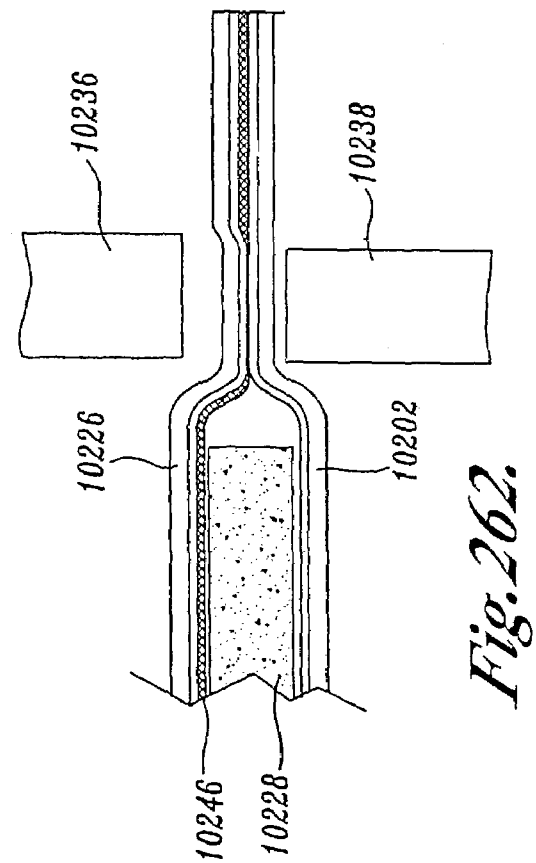
Figure 261:
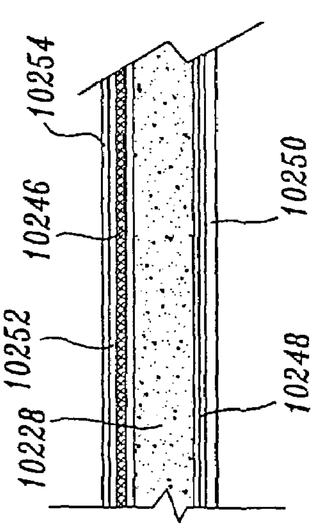
Figure 263:
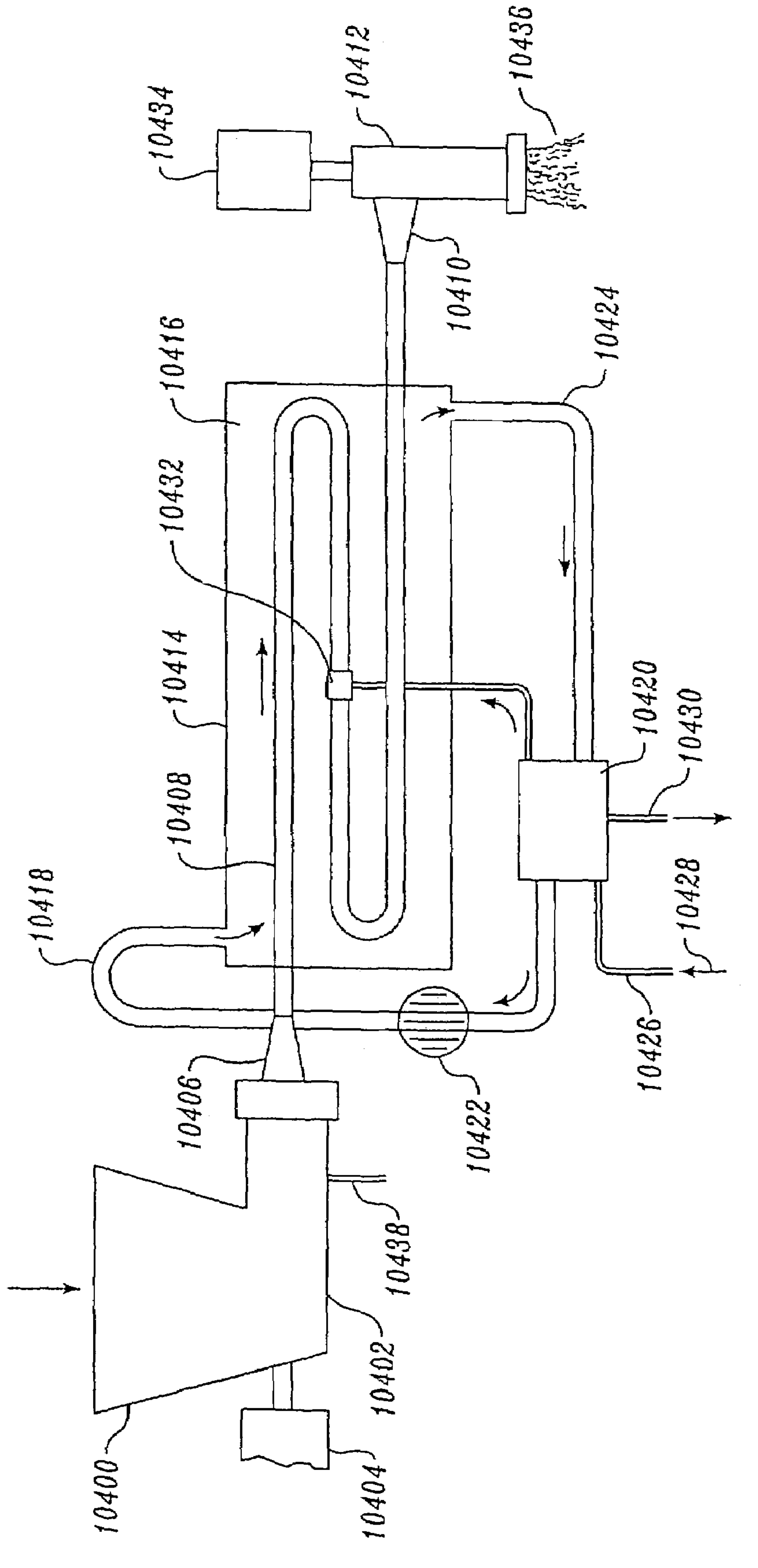
Figure 264:
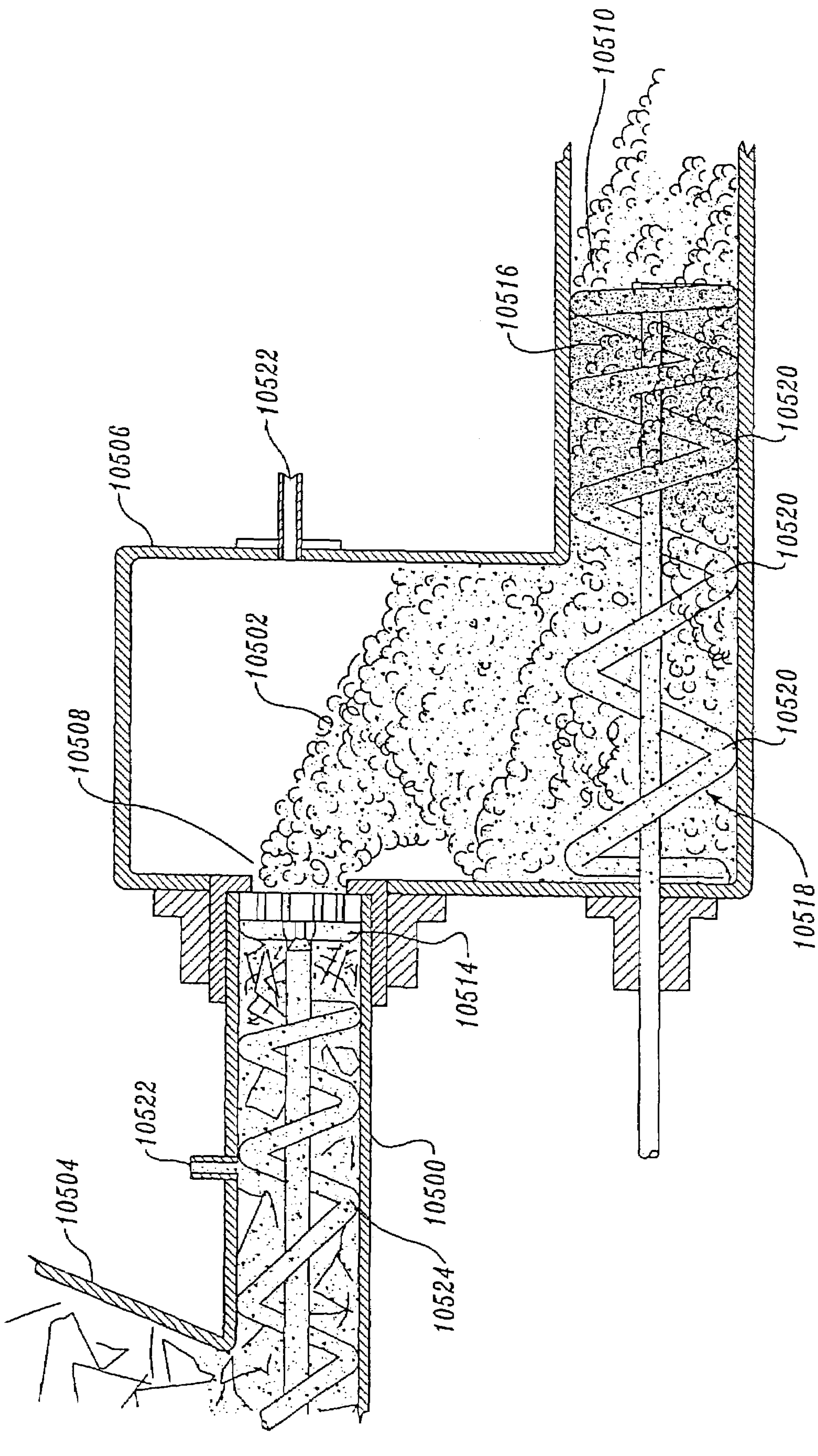
Figures 265, 266, 267, 268, 269:
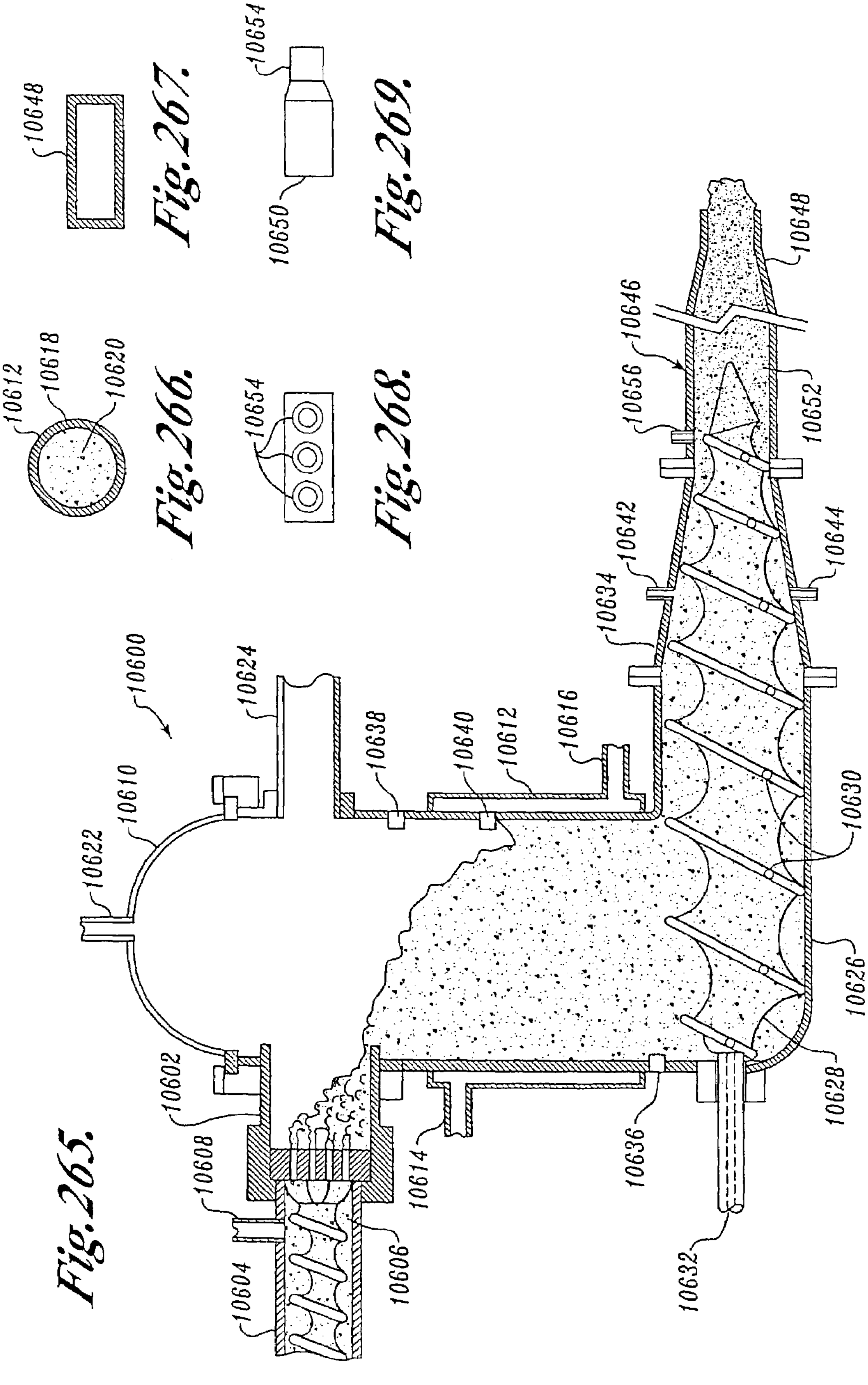
Figure 270:
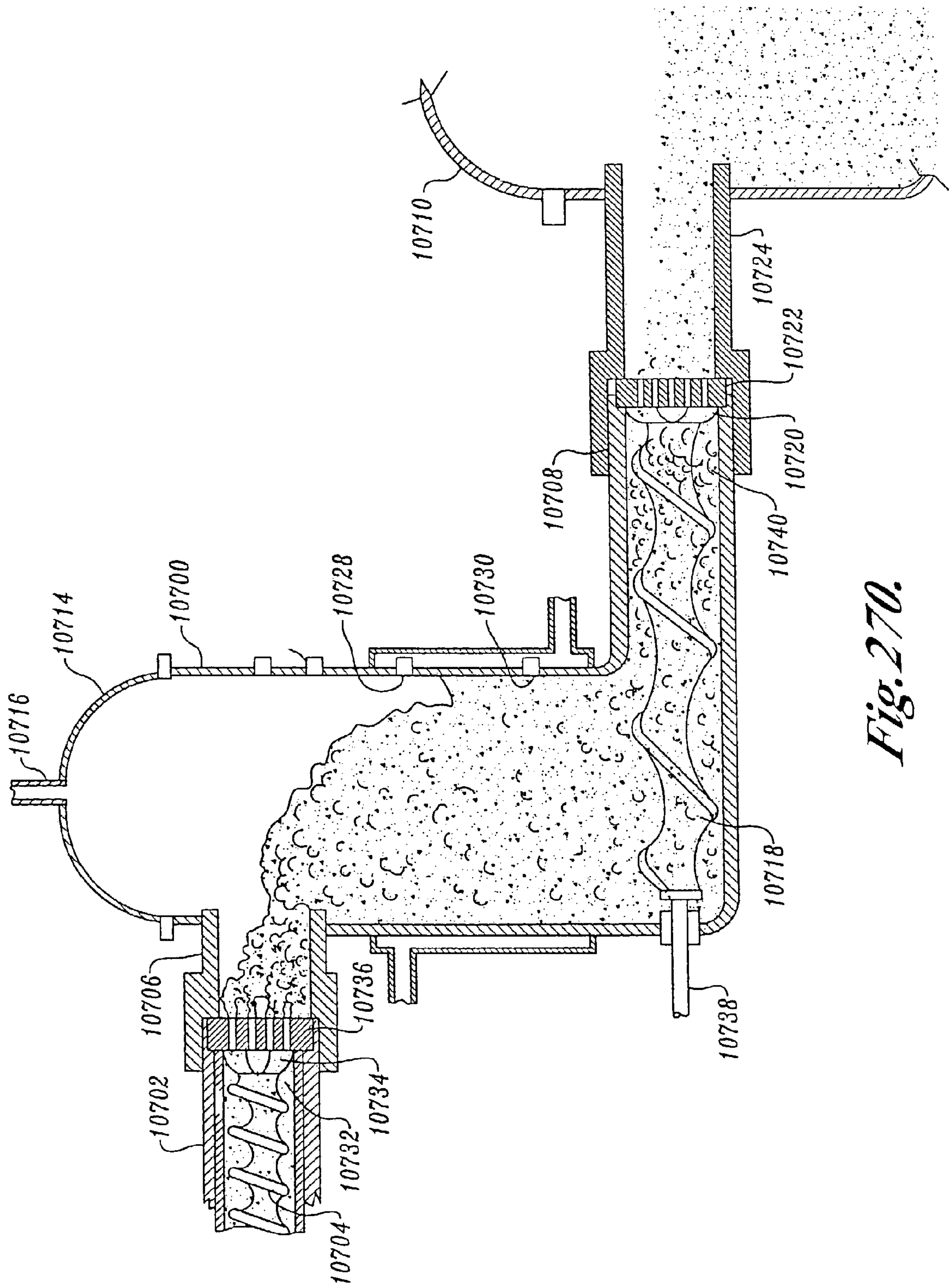
Figure 271:
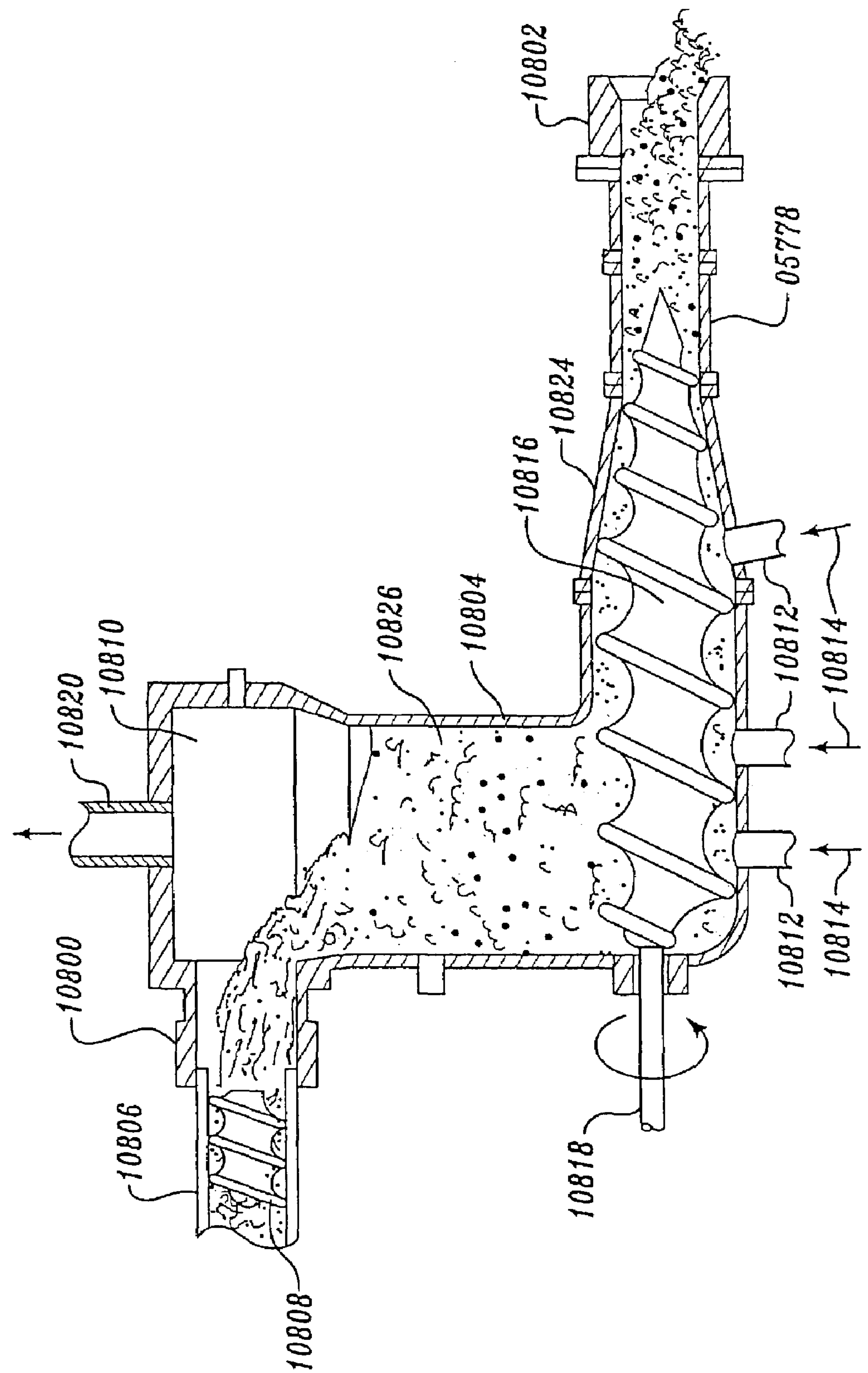
Figure 273:
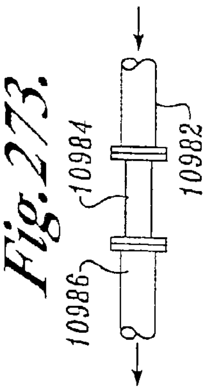
Figure 272:
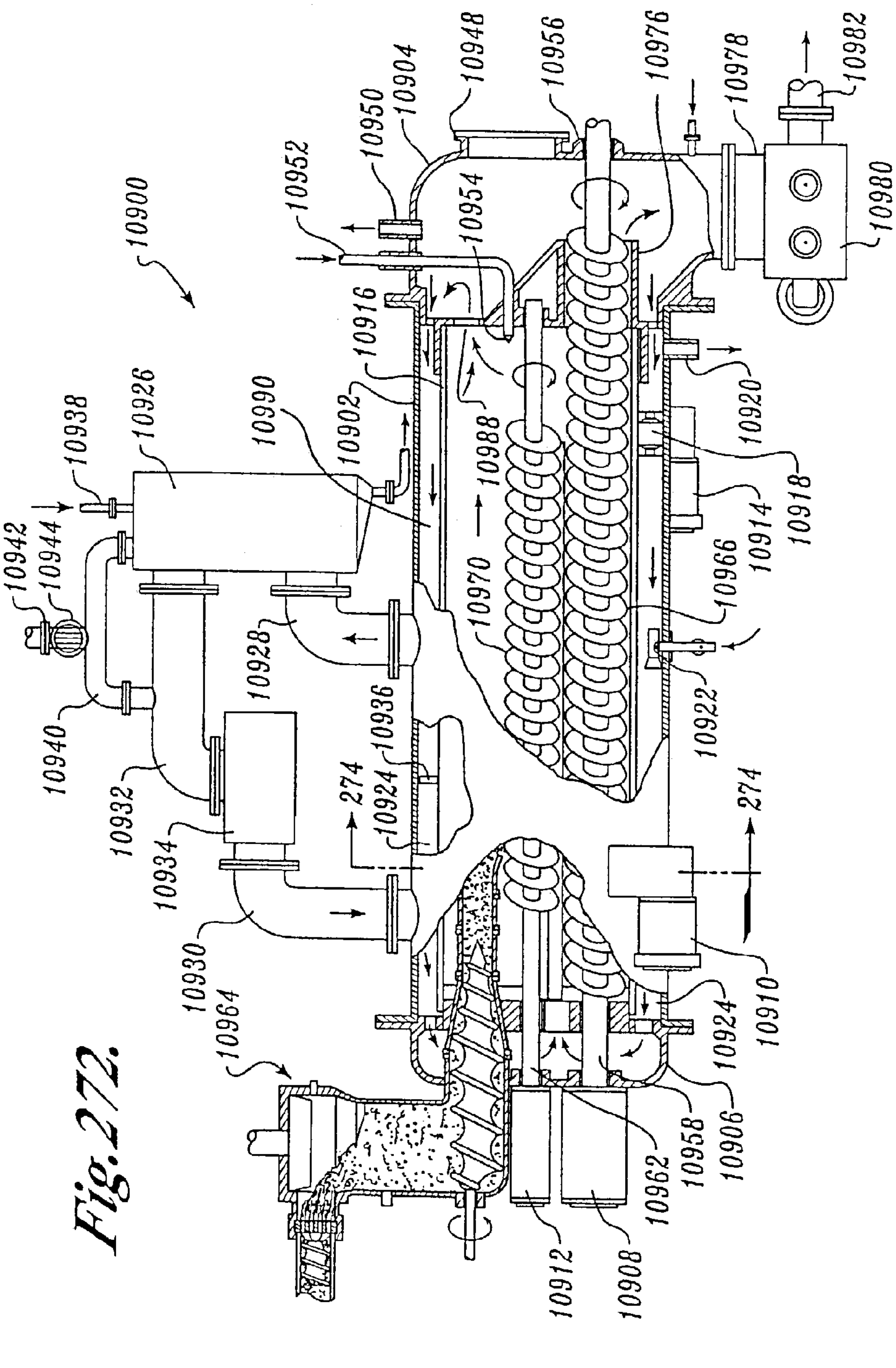
Figure 277:
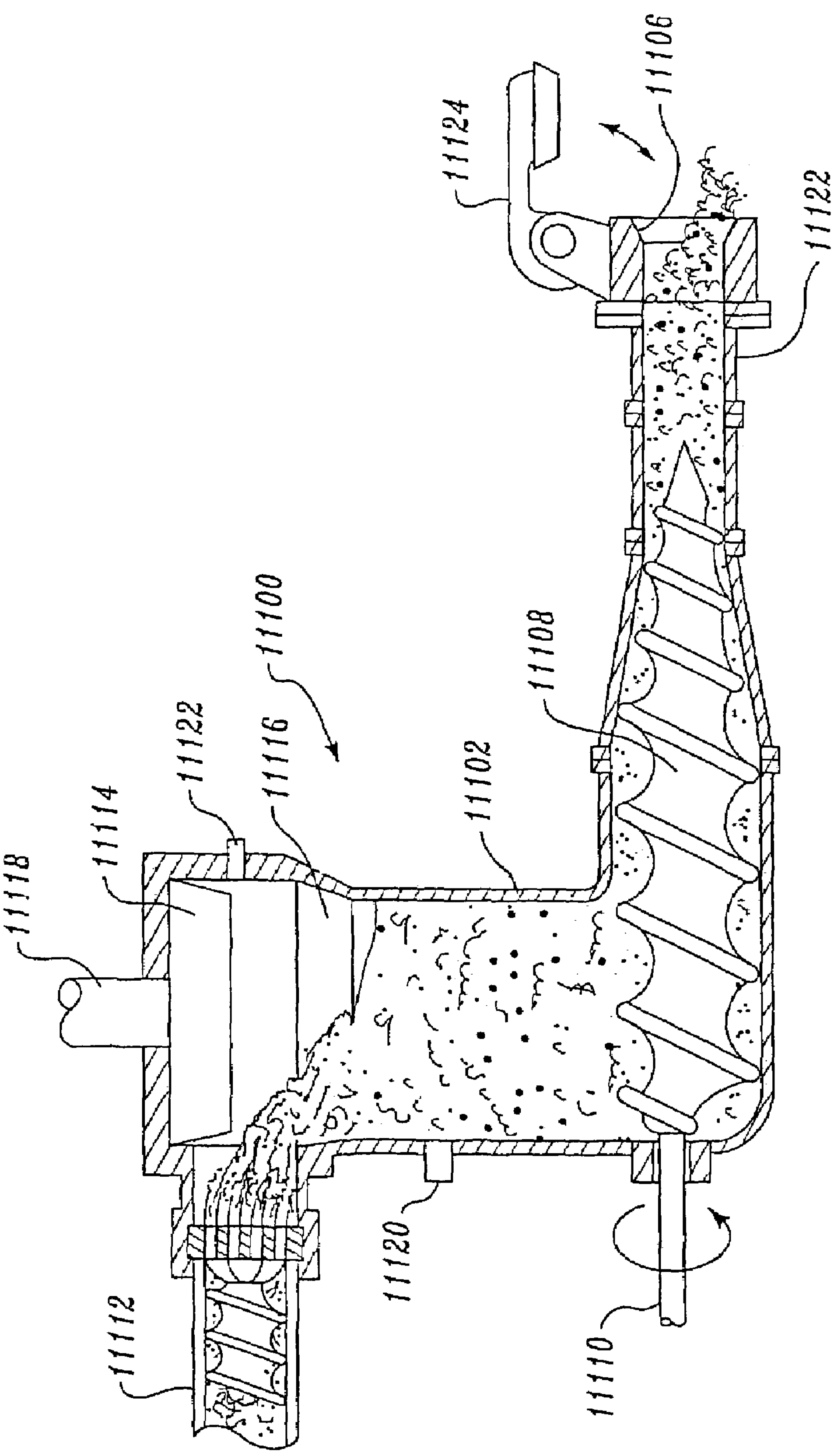
Figure 278:
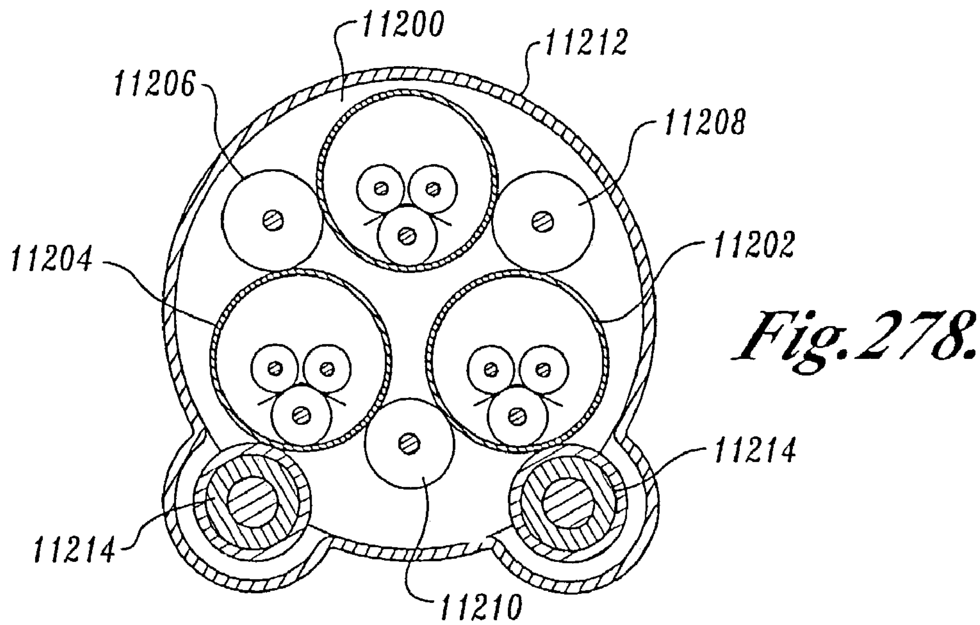
Figure 279:
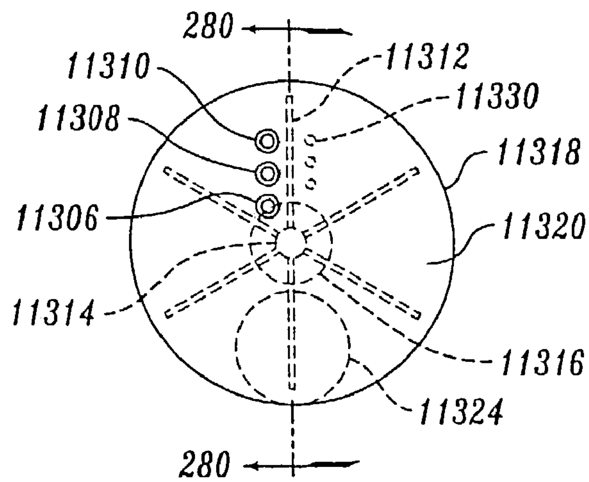
Figure 280:
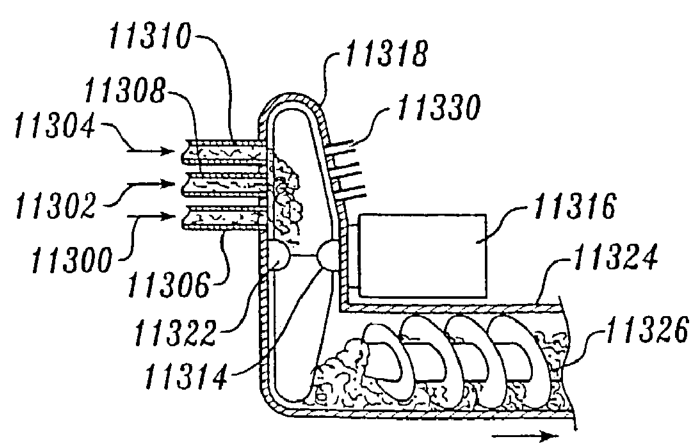
Figure 285:
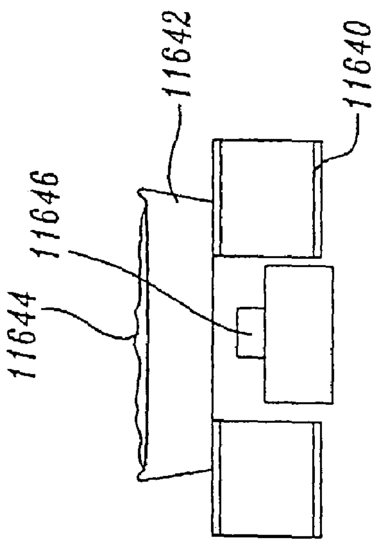
Figure 284:
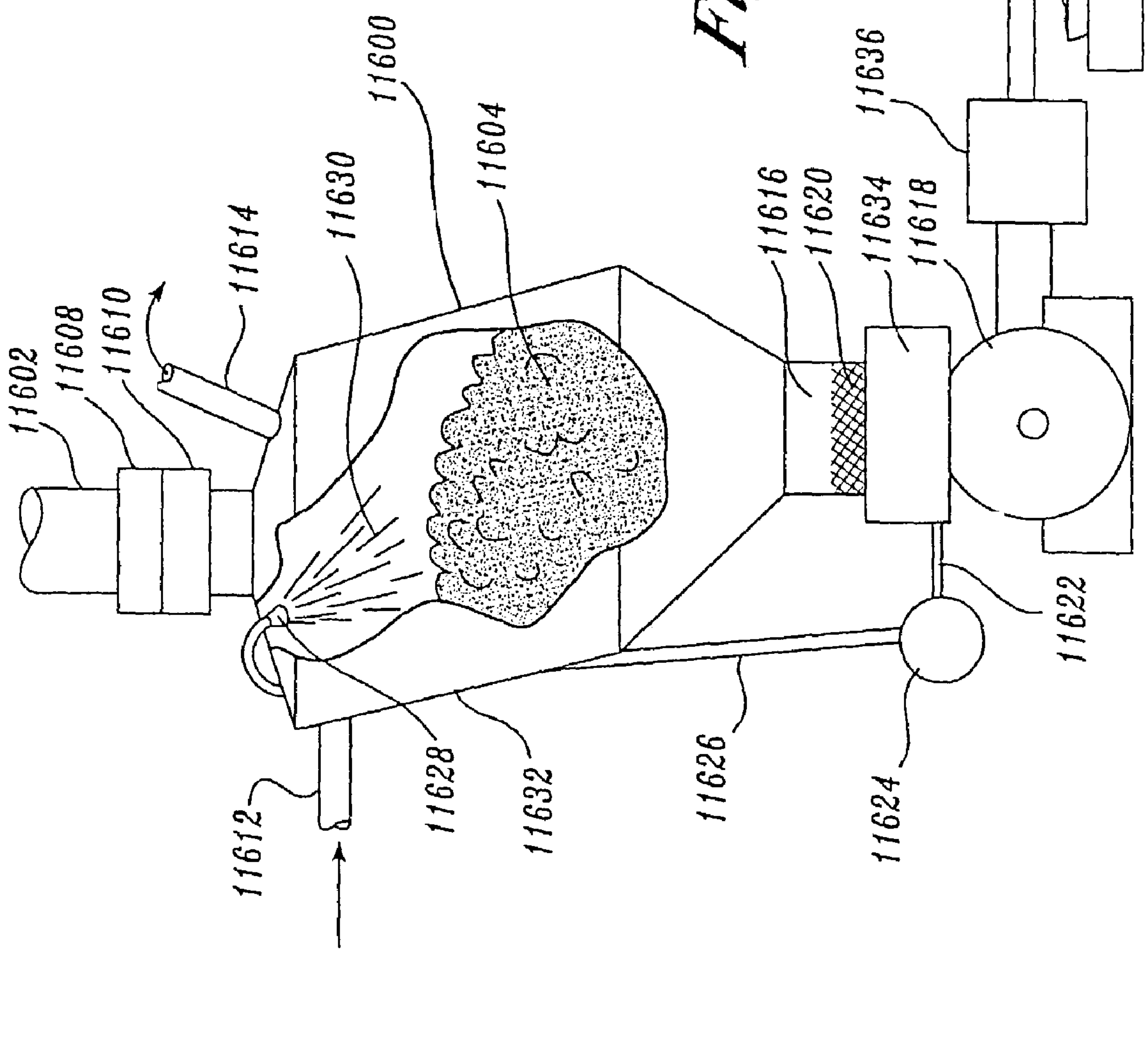
Figure 286:
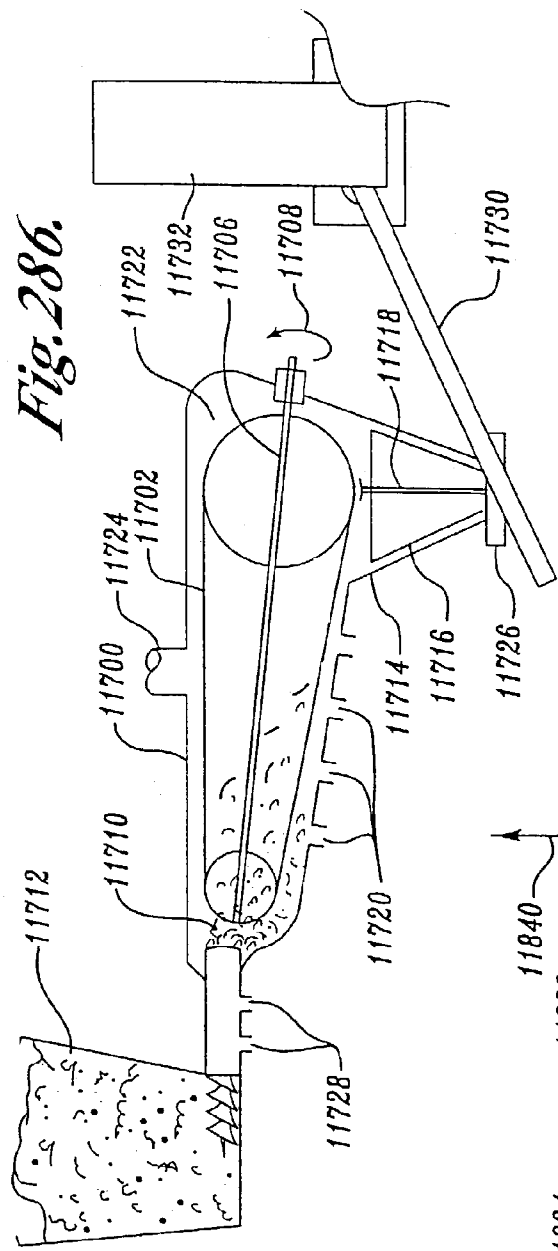
Figure 287:
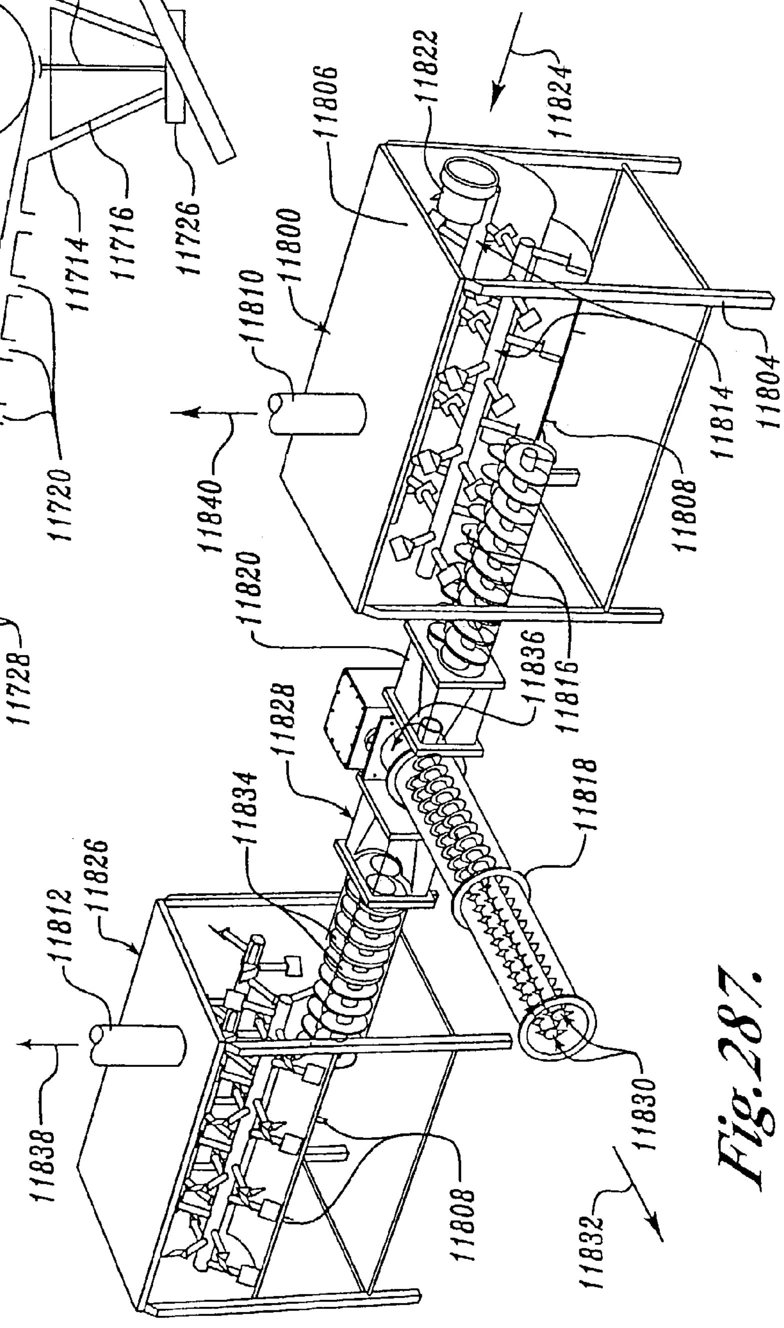
Figure 288:
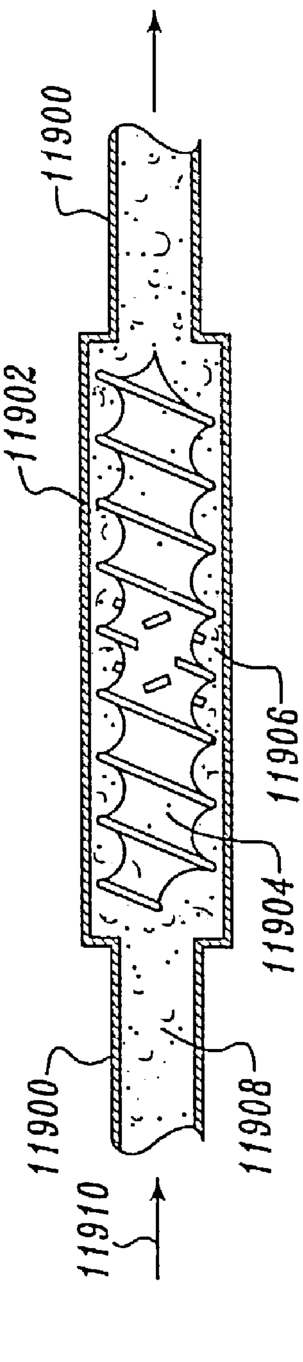
Figure 289:
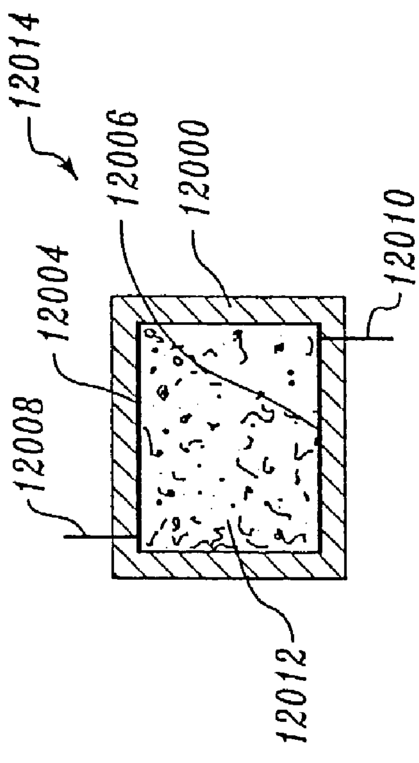
Figure 290:
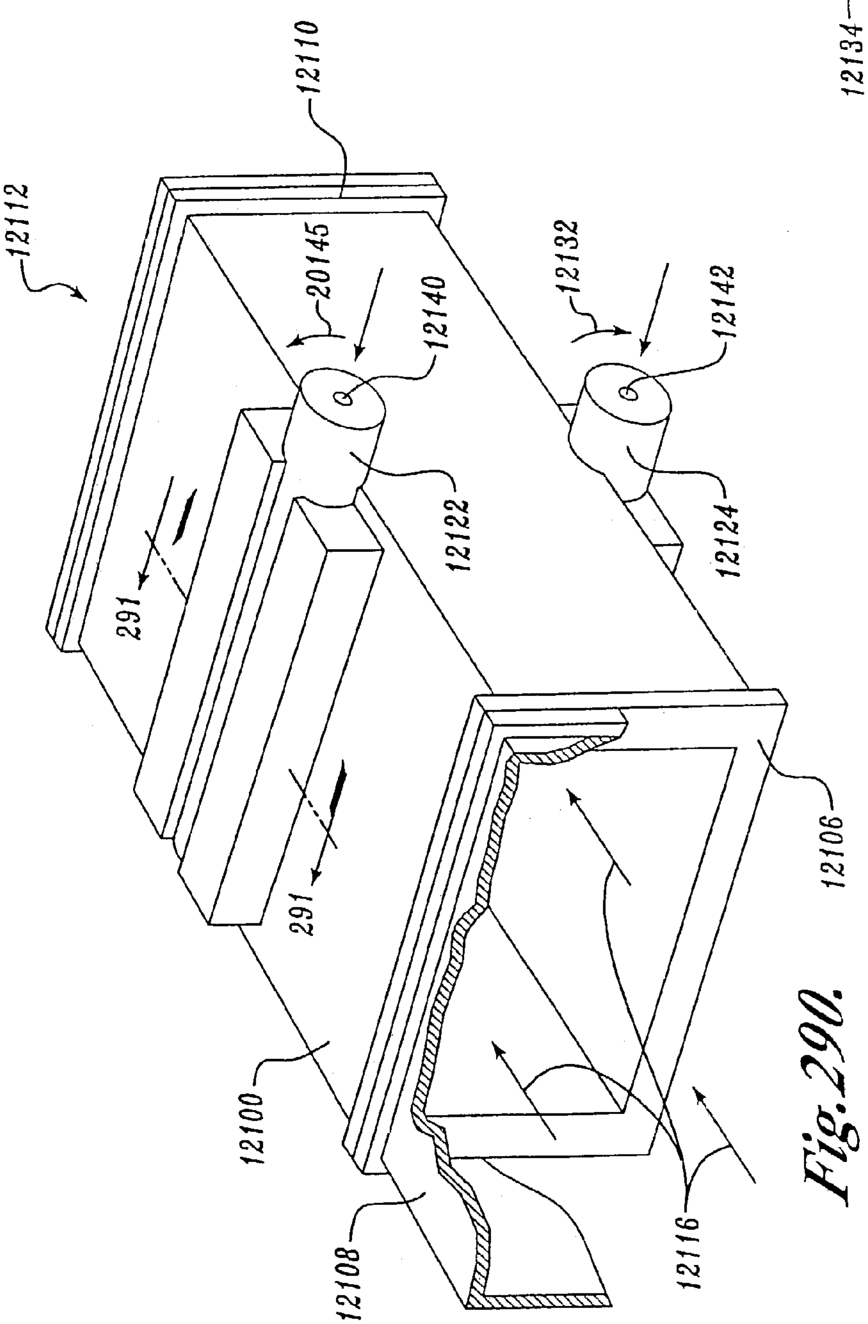
Figure 291:
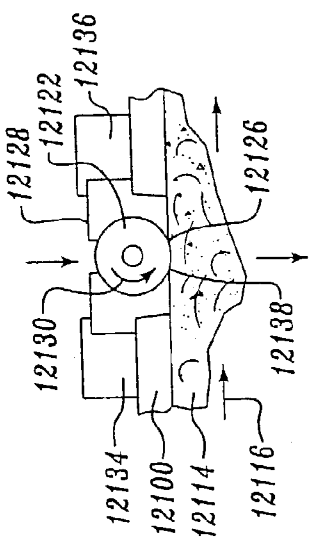
Figure 292:
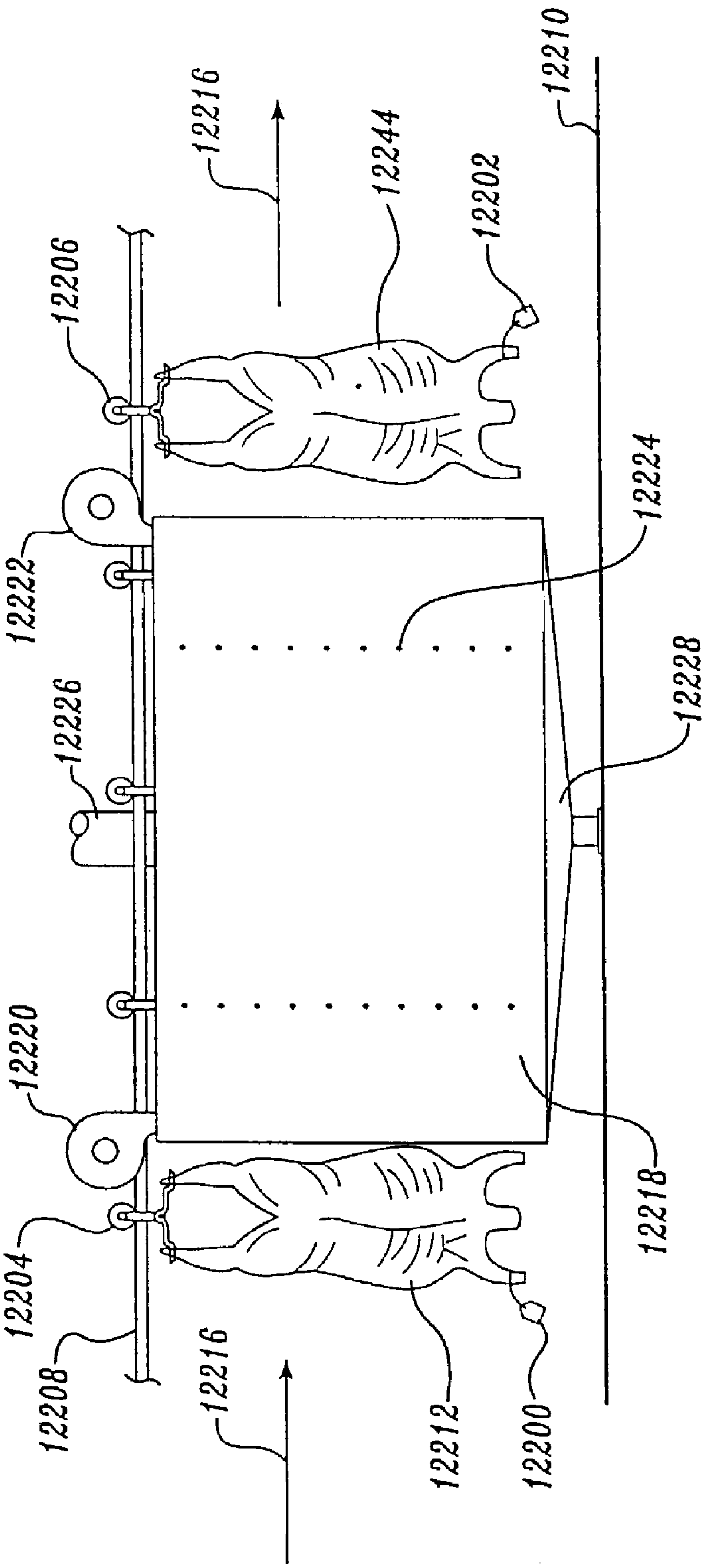
Figure 293:
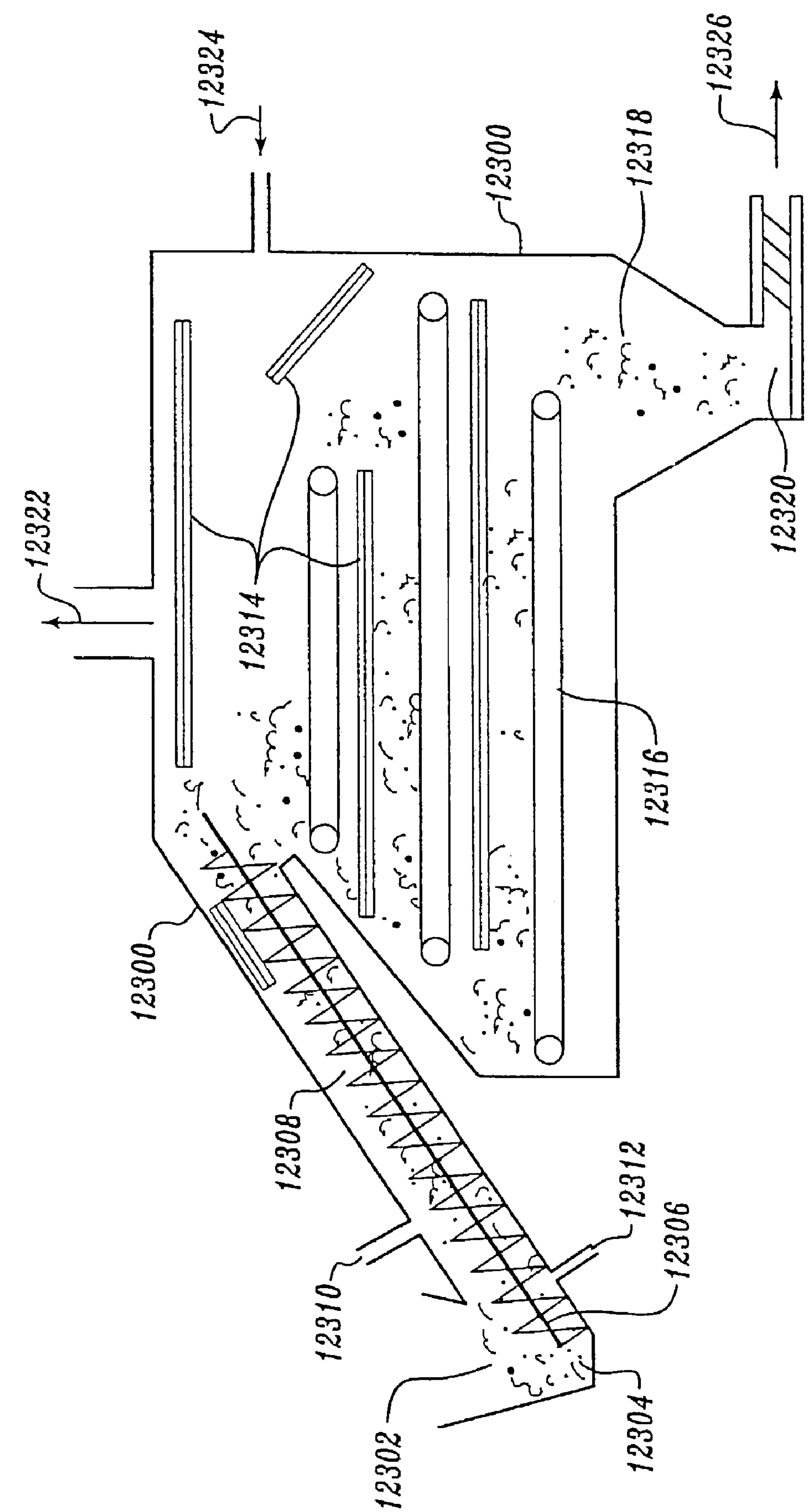
Figure 294:
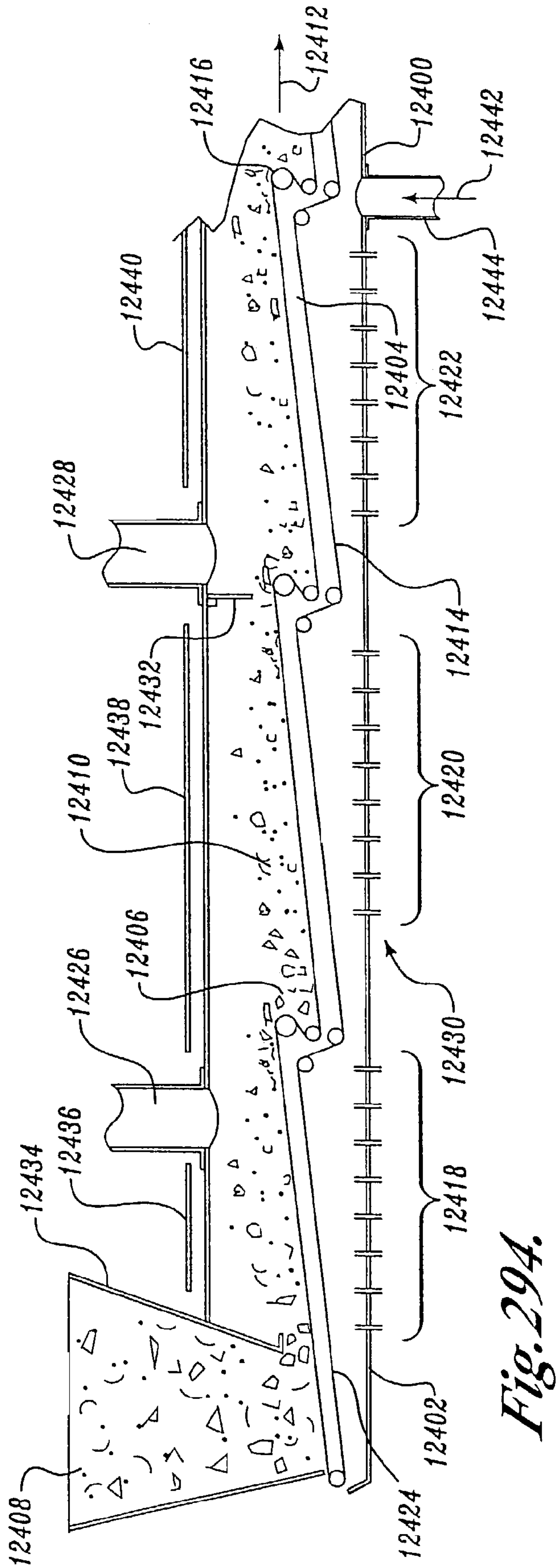
Figure 295:
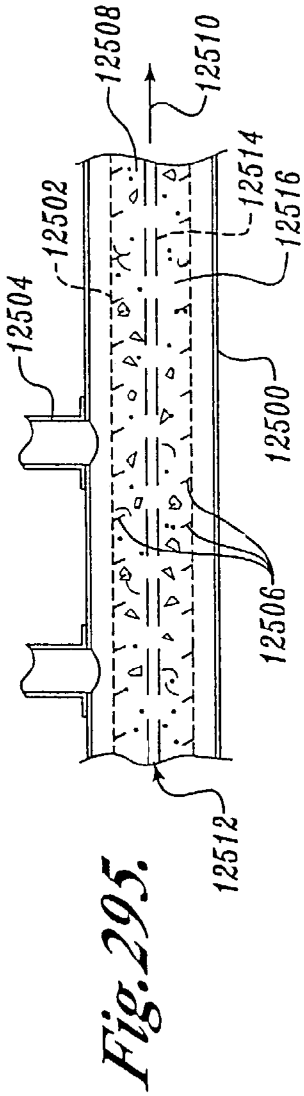
Figure 296:
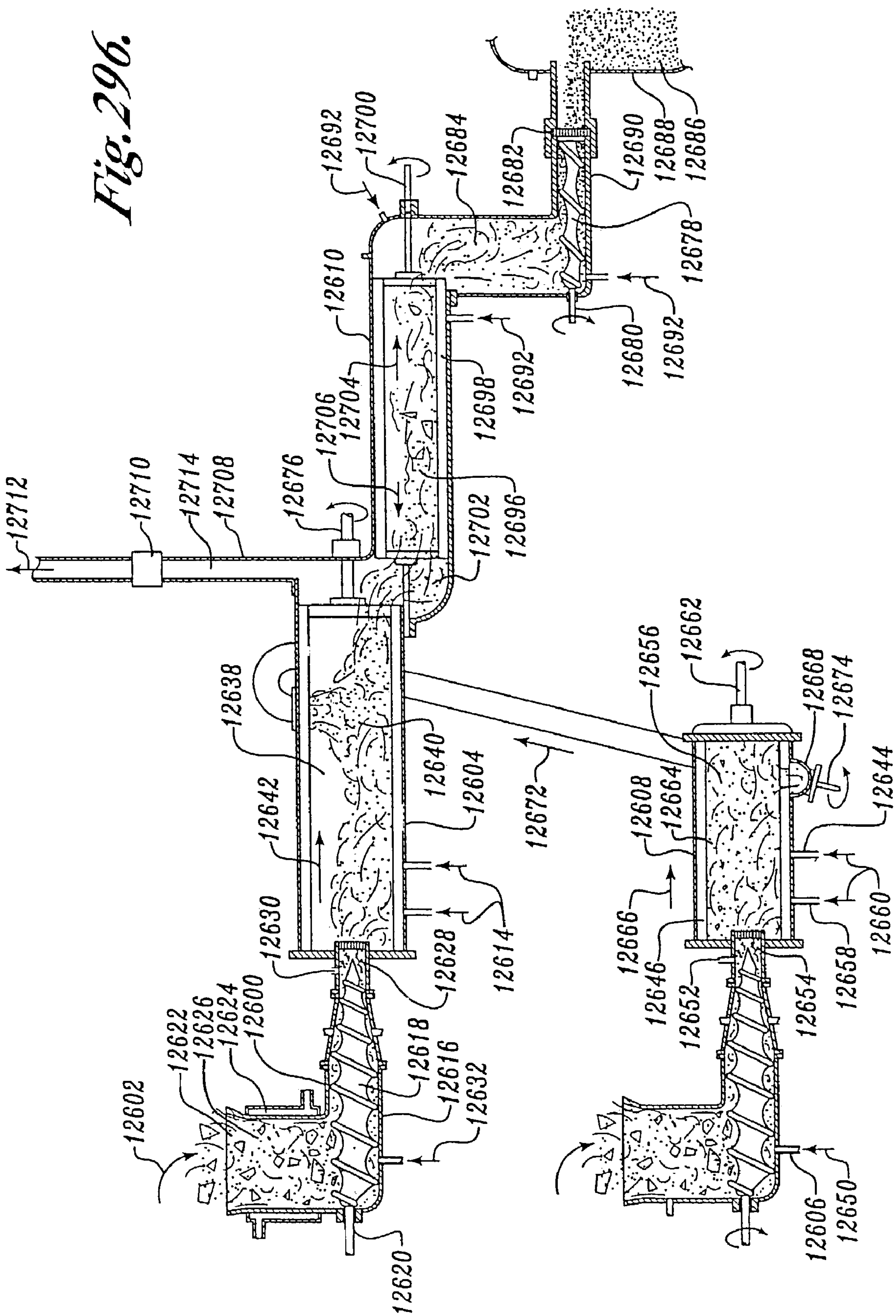
Figure 297:
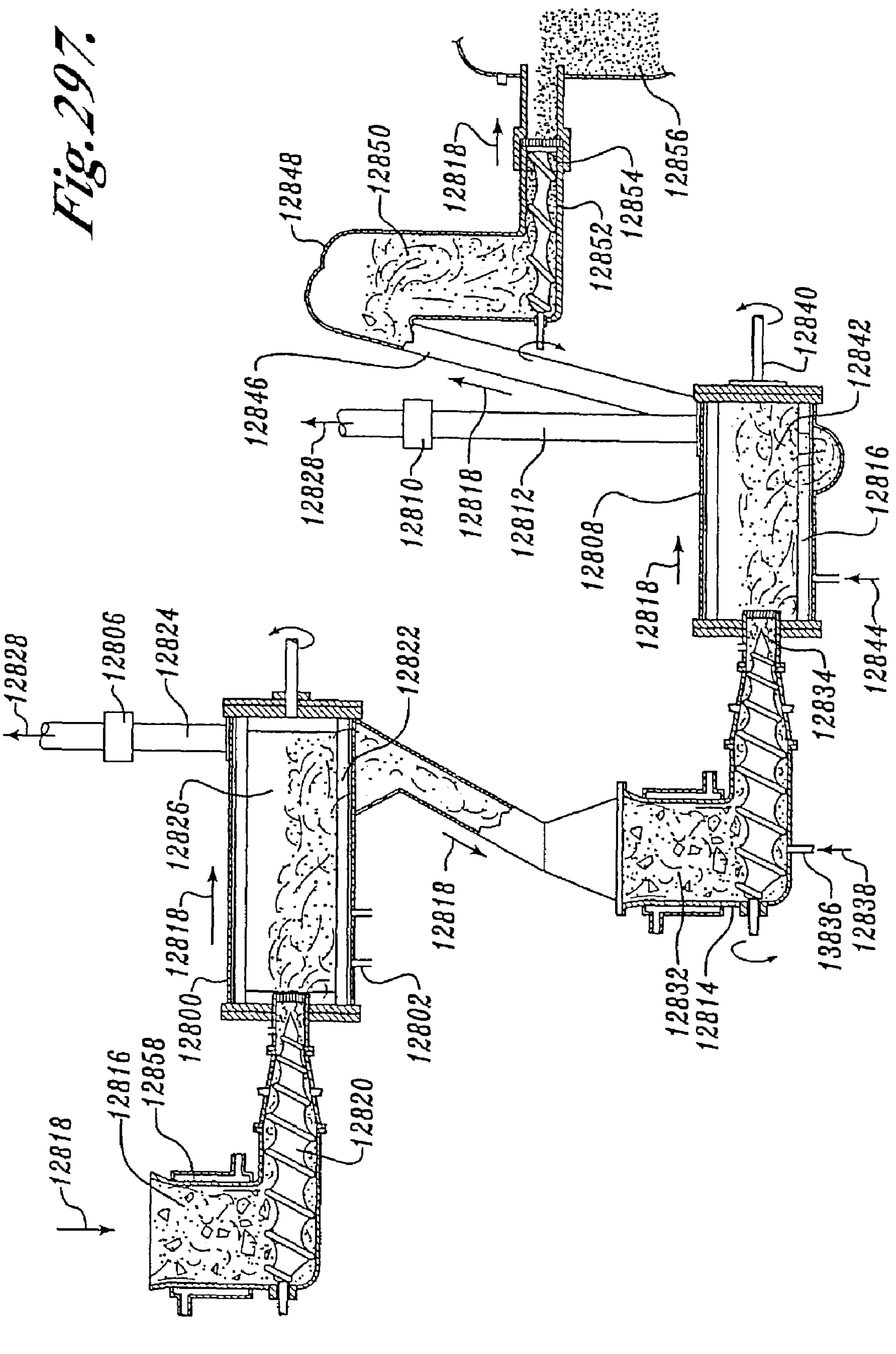
Figure 298:
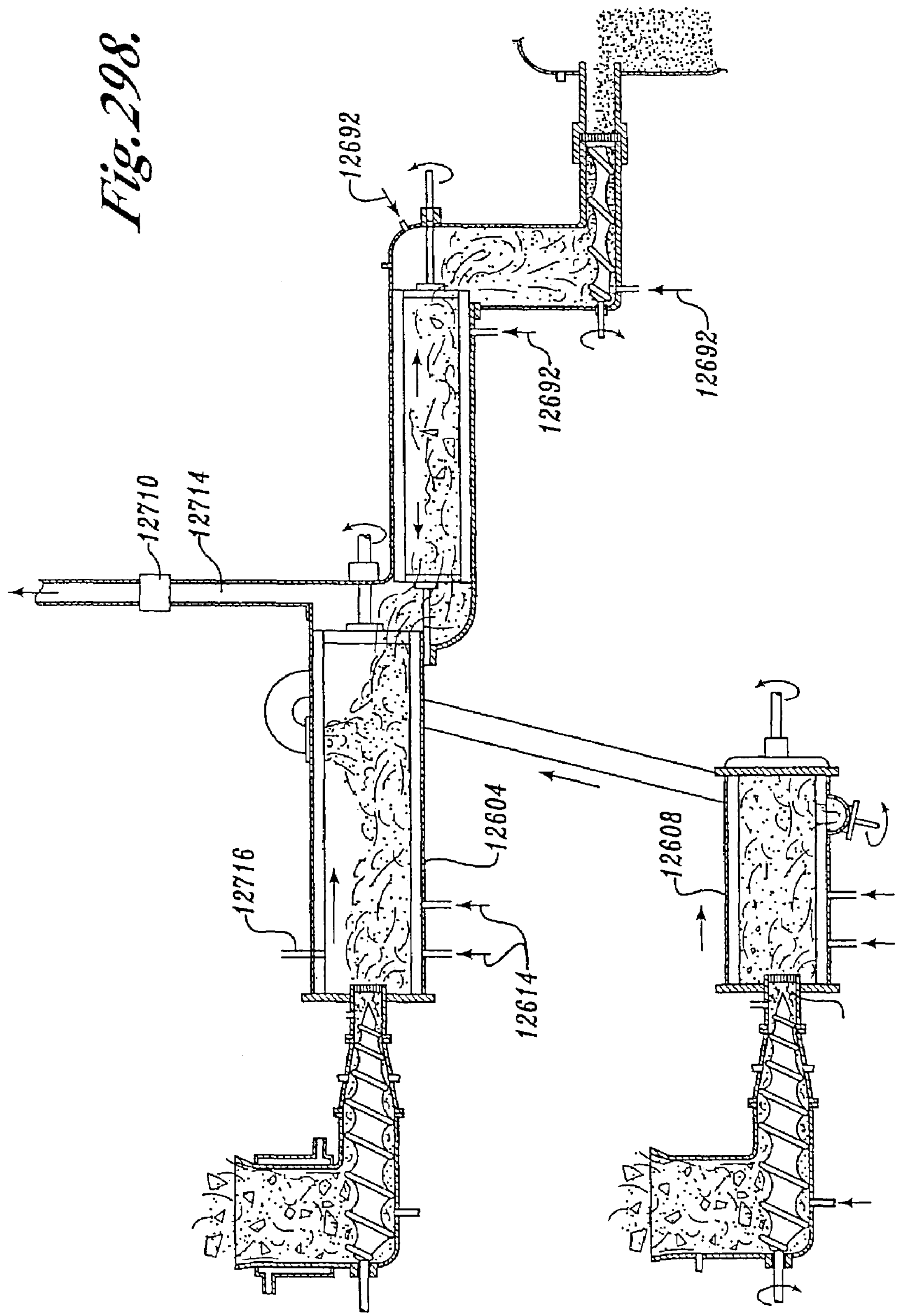
Figure 299:
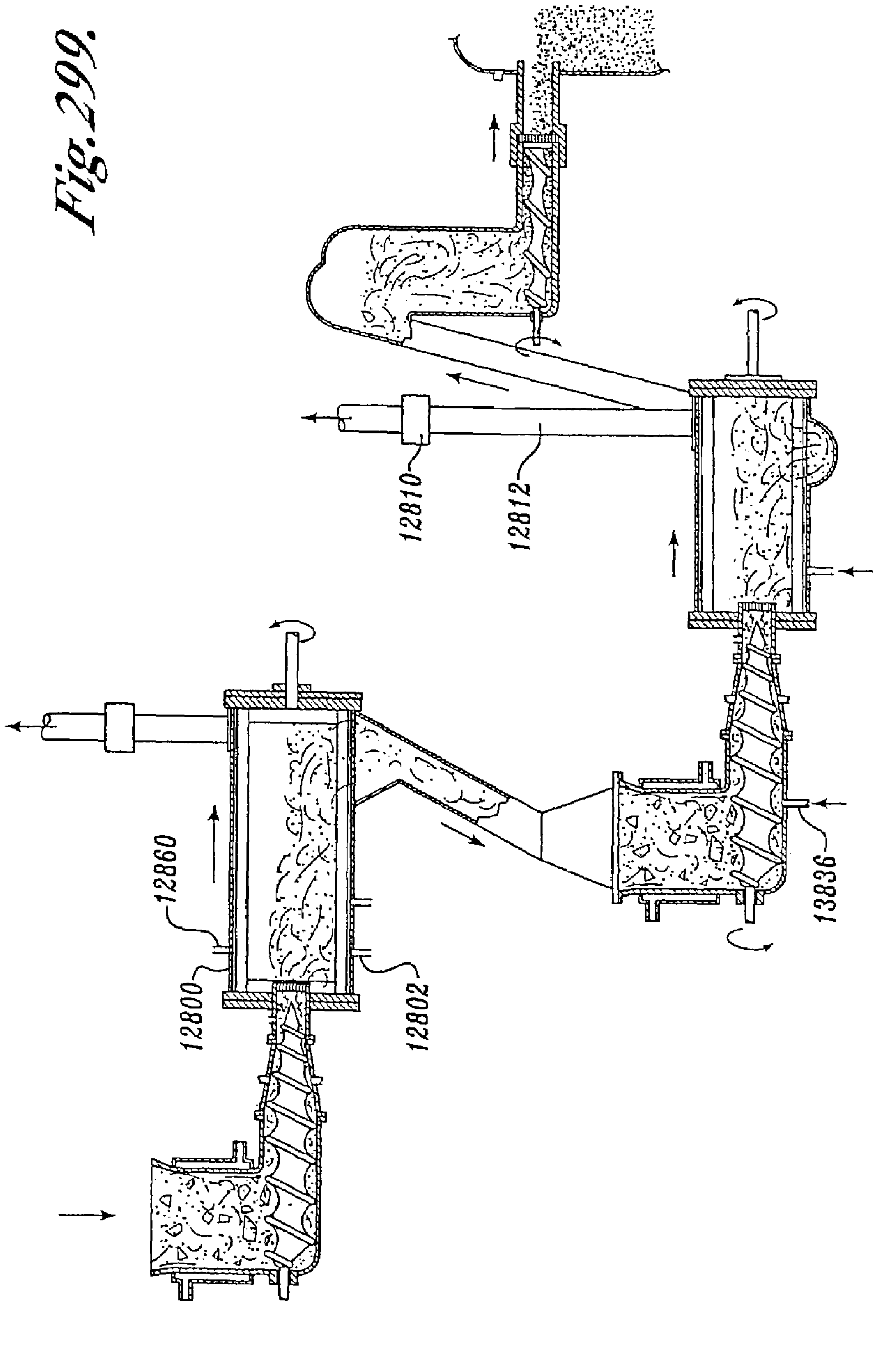
Figure 300:
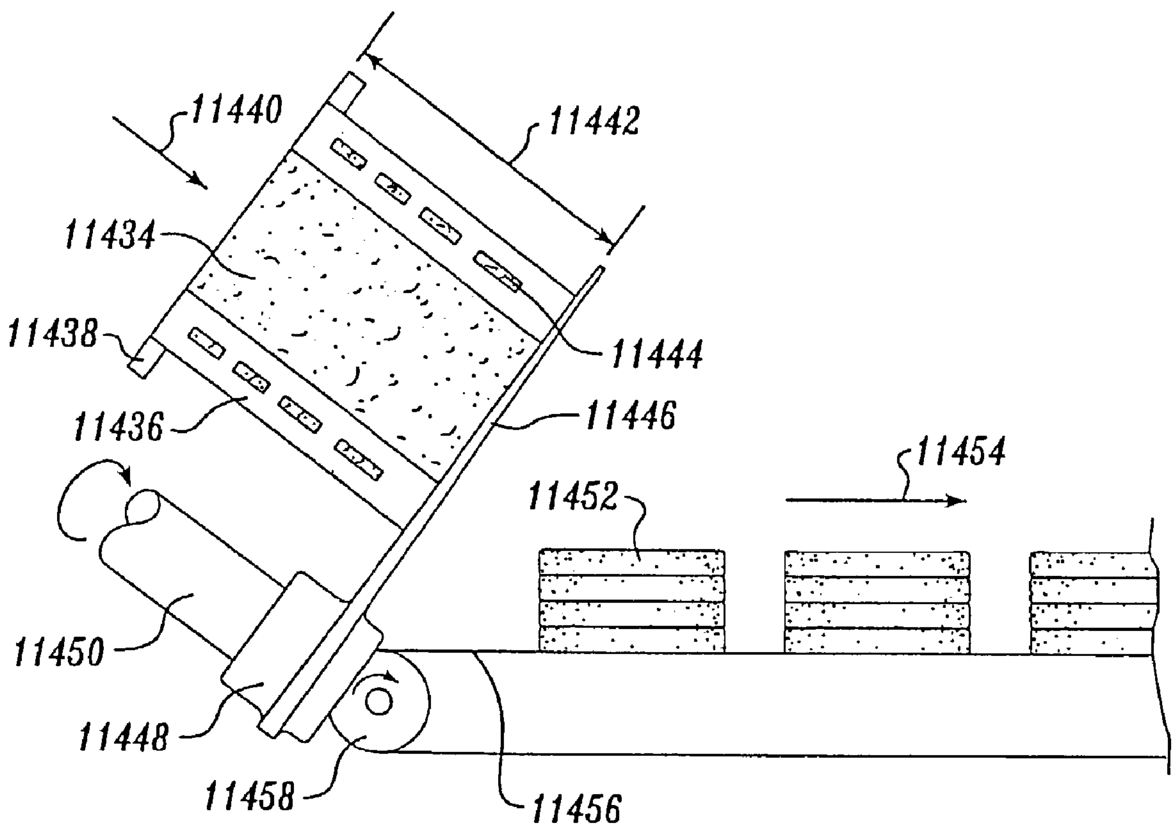
Figure 301:
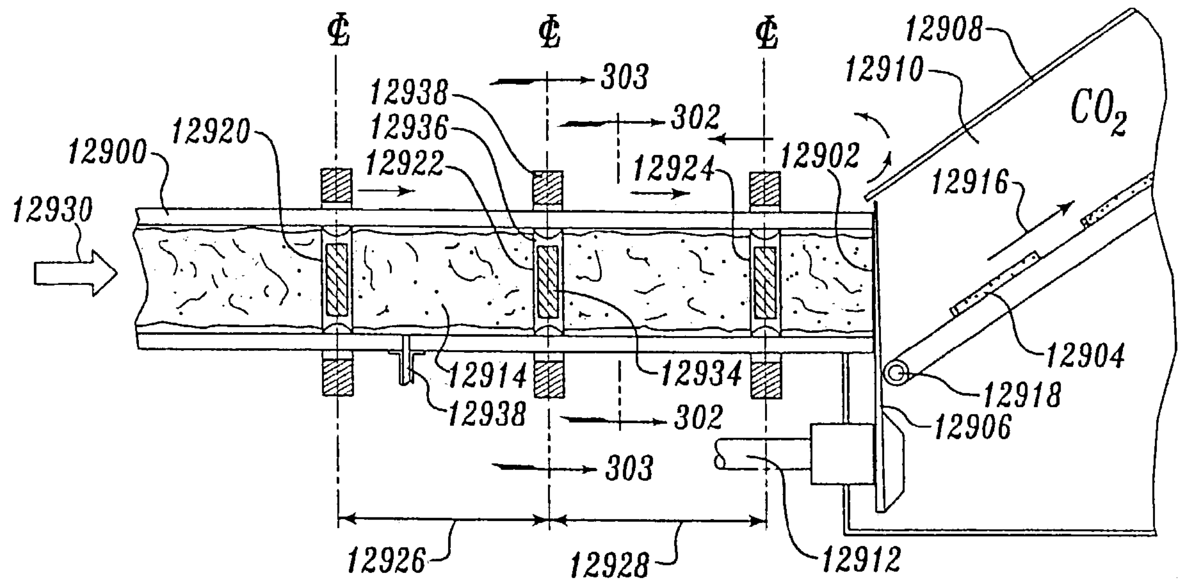
Figure 302:
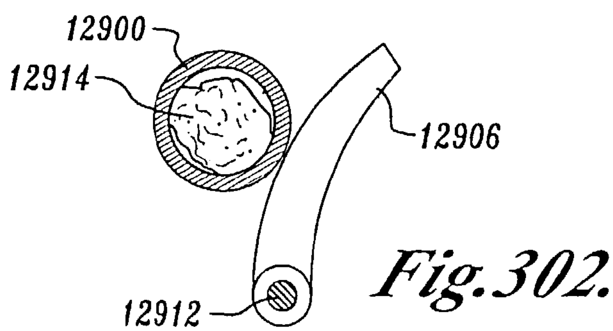
Figure 303:
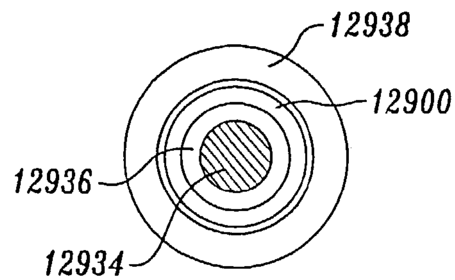
Figure 304:
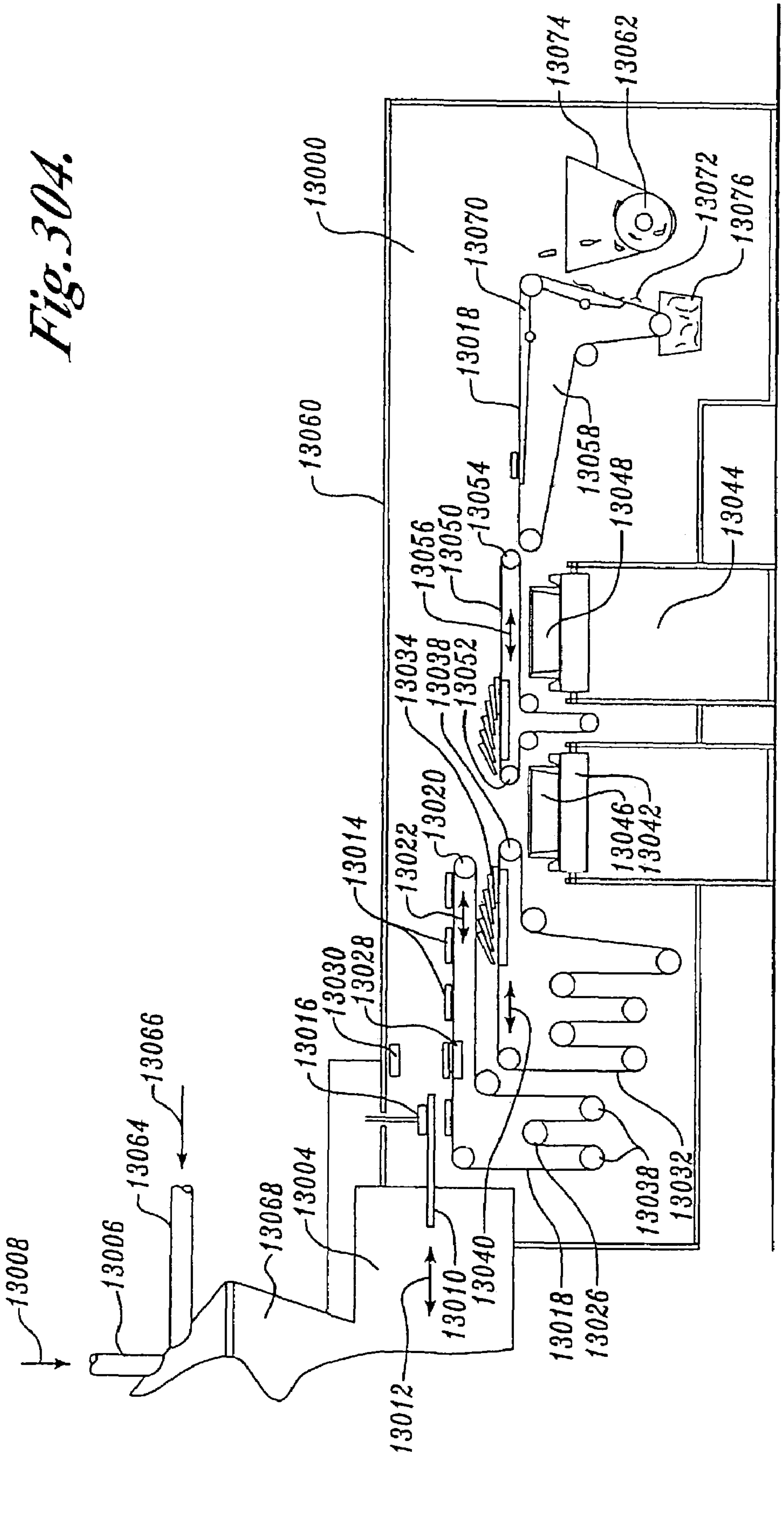
Figure 305:
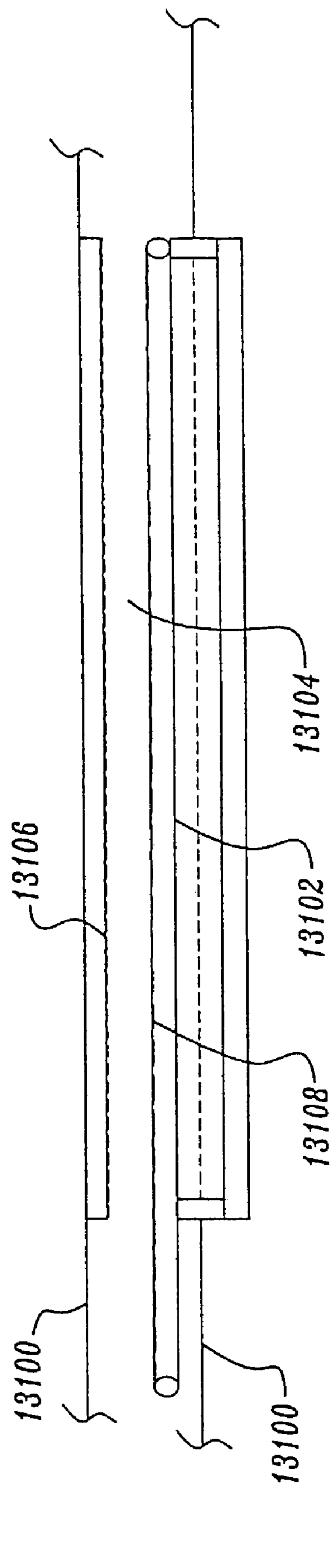
Figure 306:
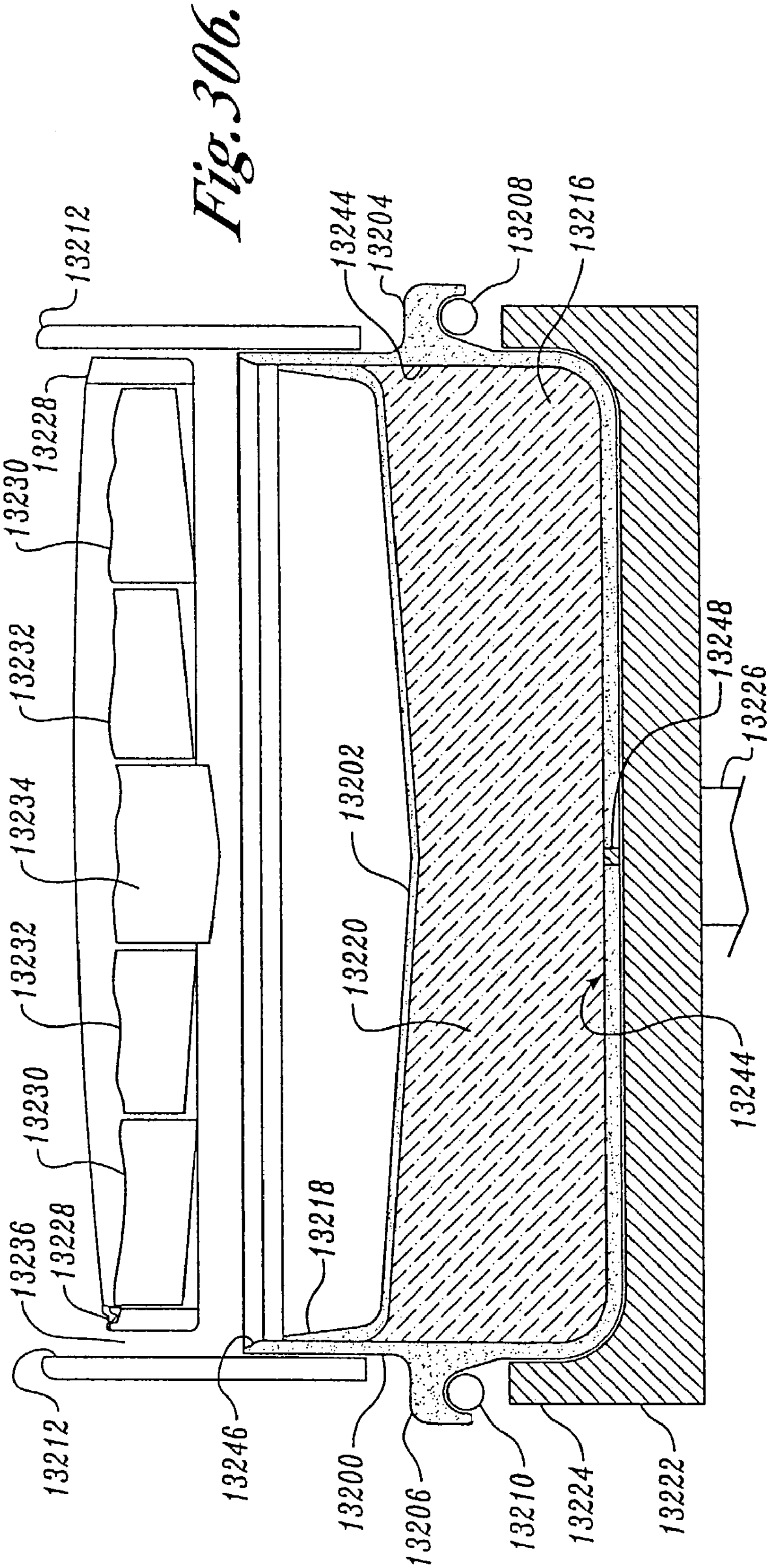
Figure 307:
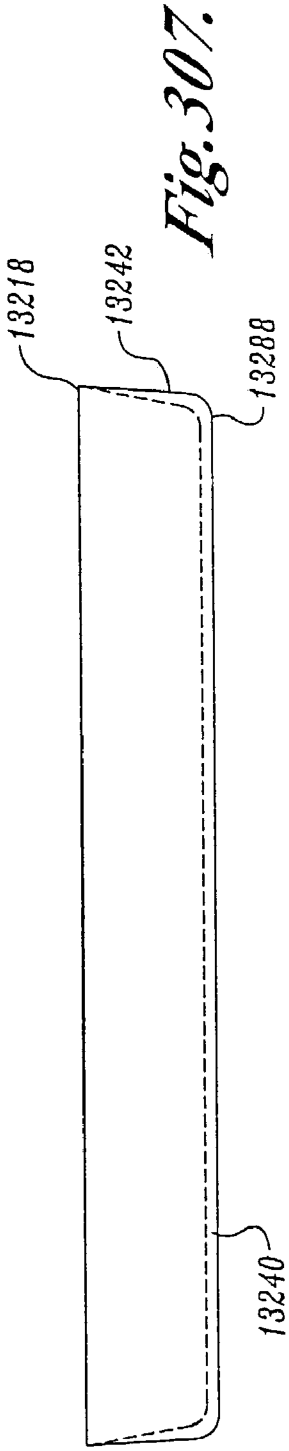
Figure 308:
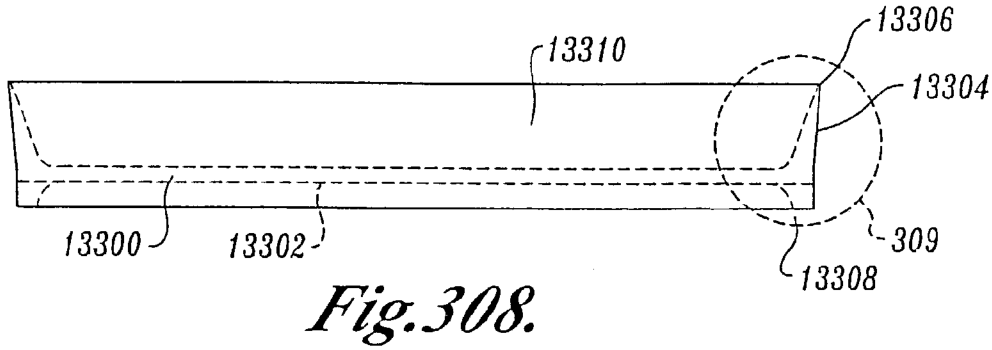
Figure 309:
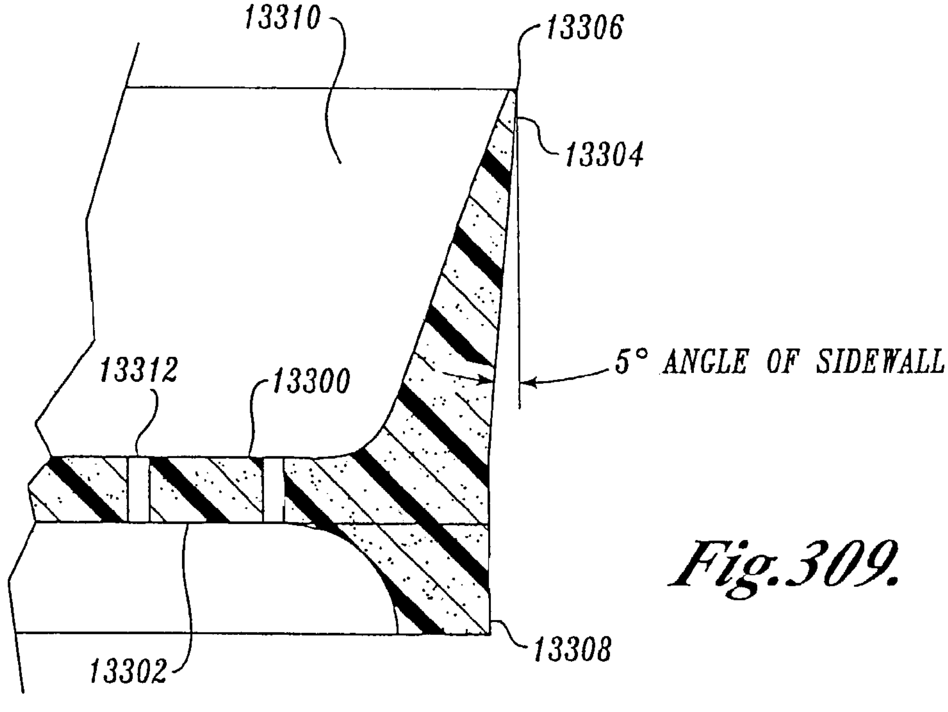
Figure 310:
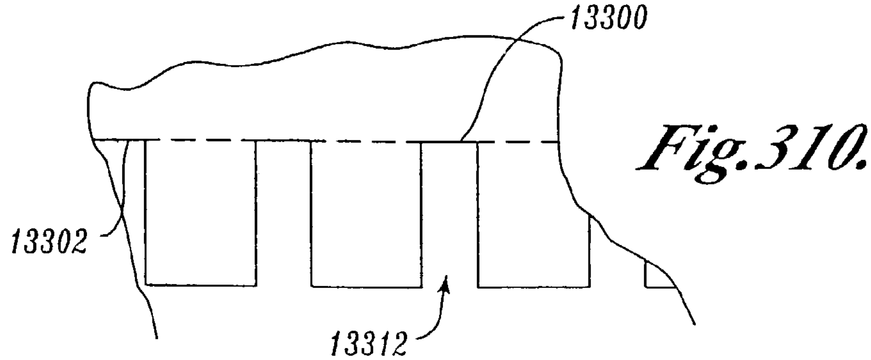
Figure 311:
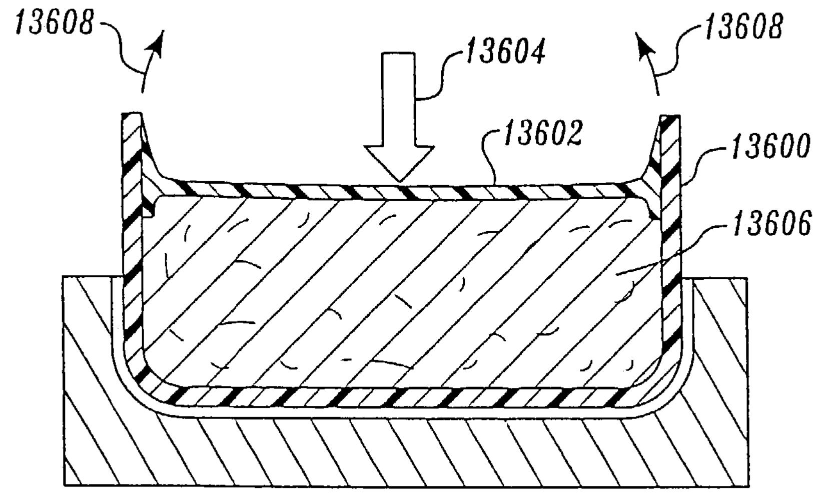
Figure 312:
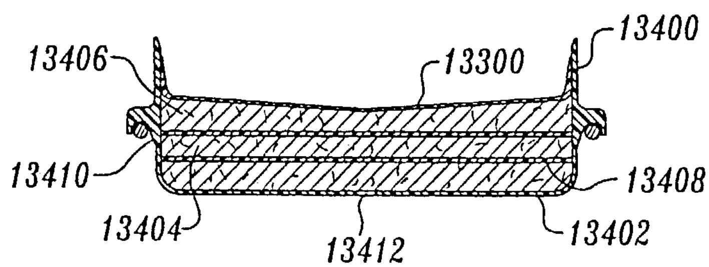
Figure 313:
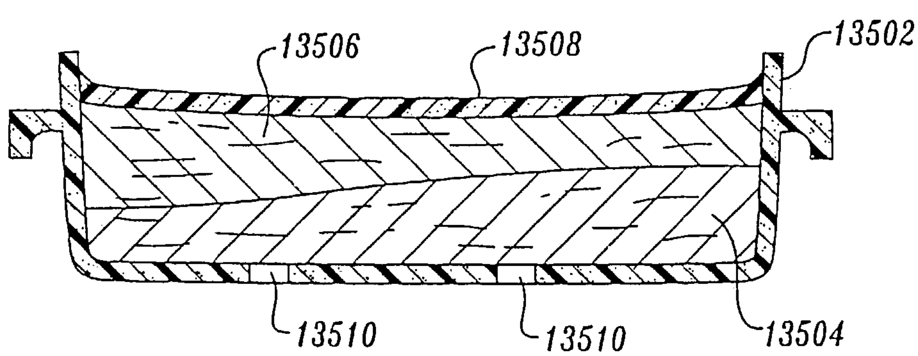
Figure 314:
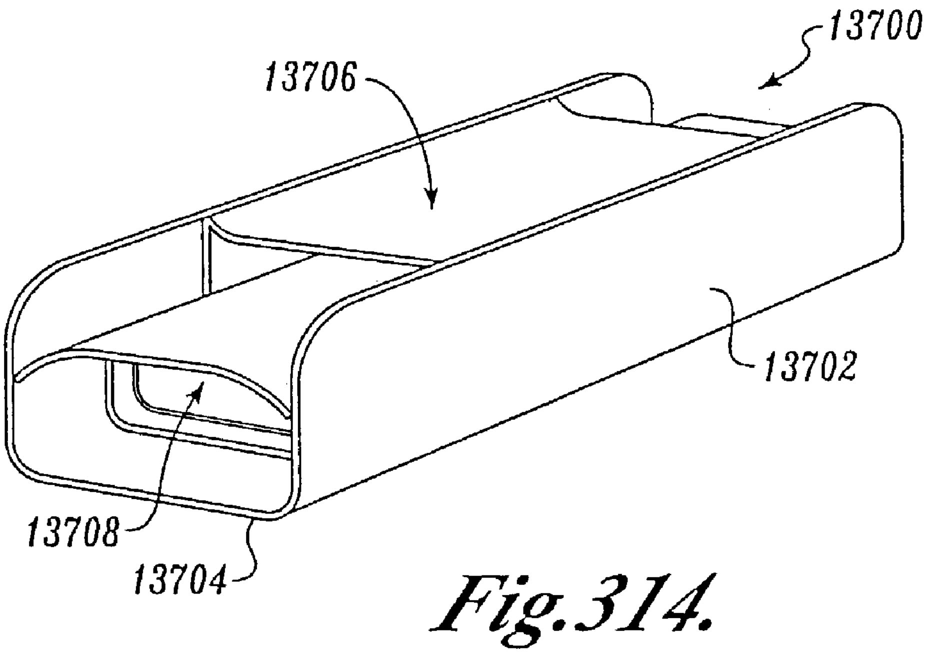
Figure 315:
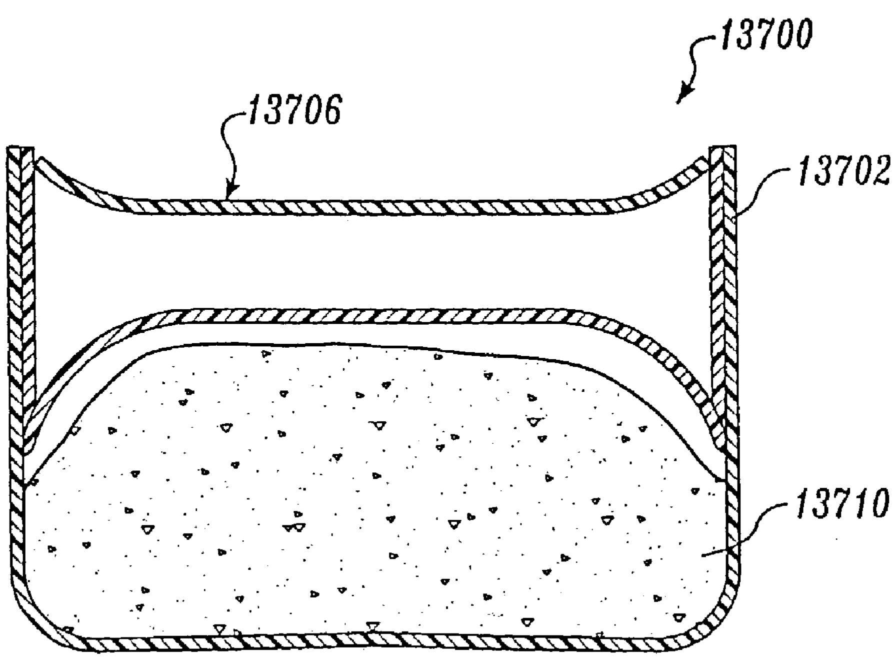
Figure 316:
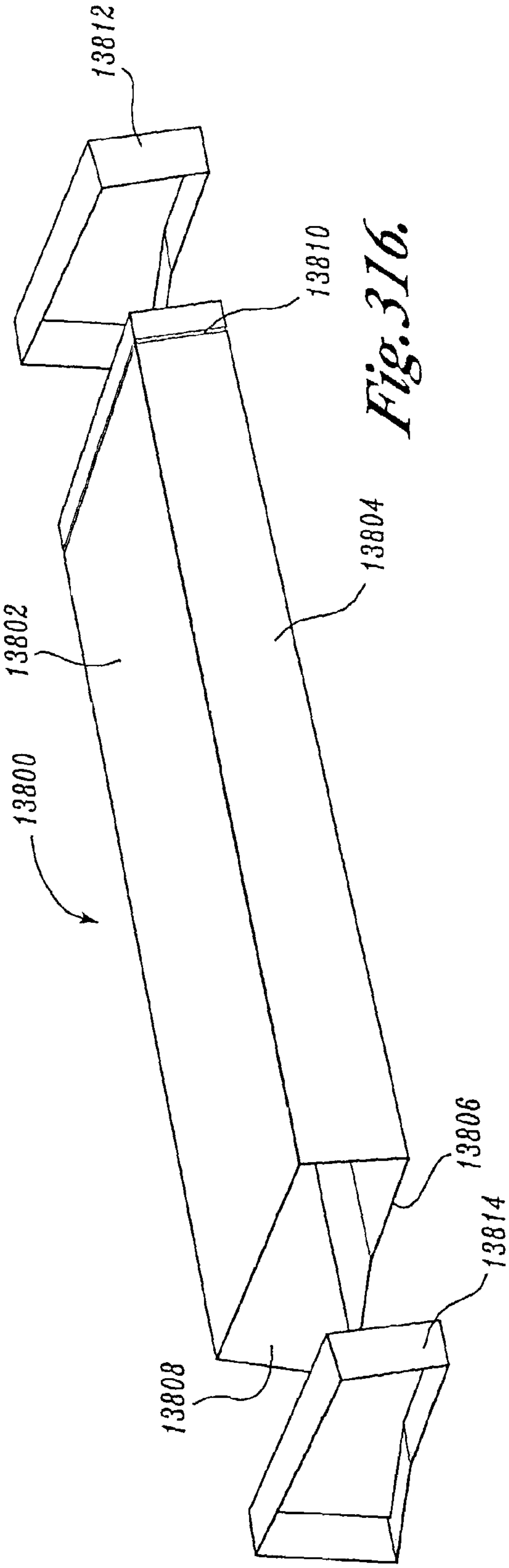
Figure 318:
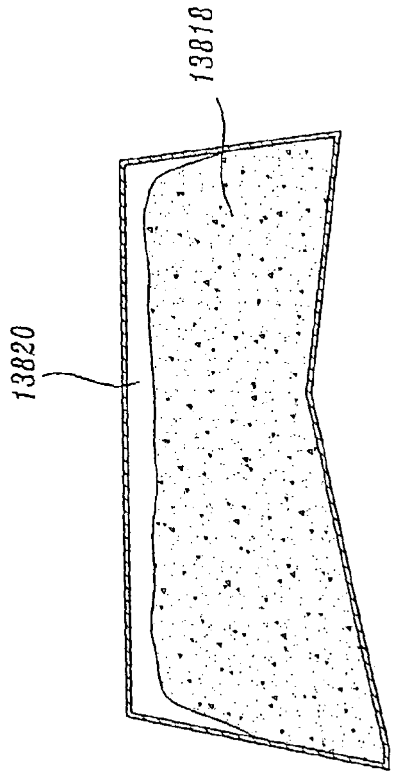
Figure 317:
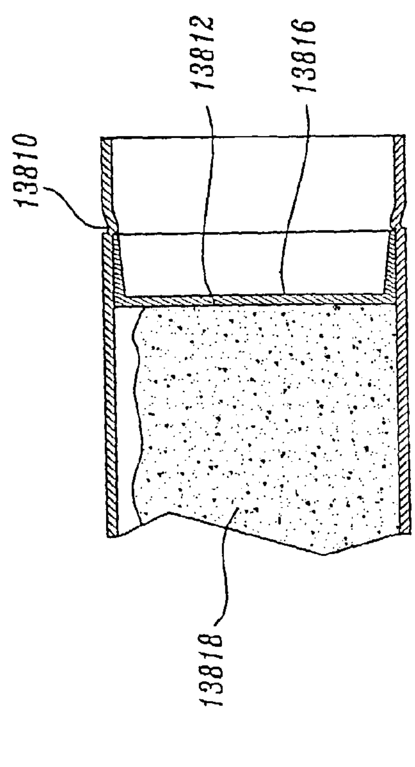
Figure 319:
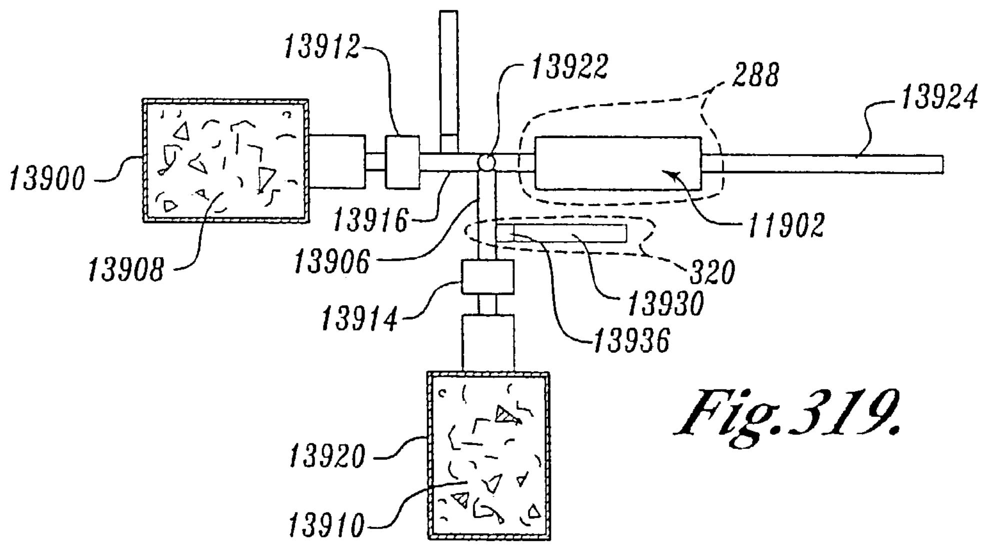
Figure 320:
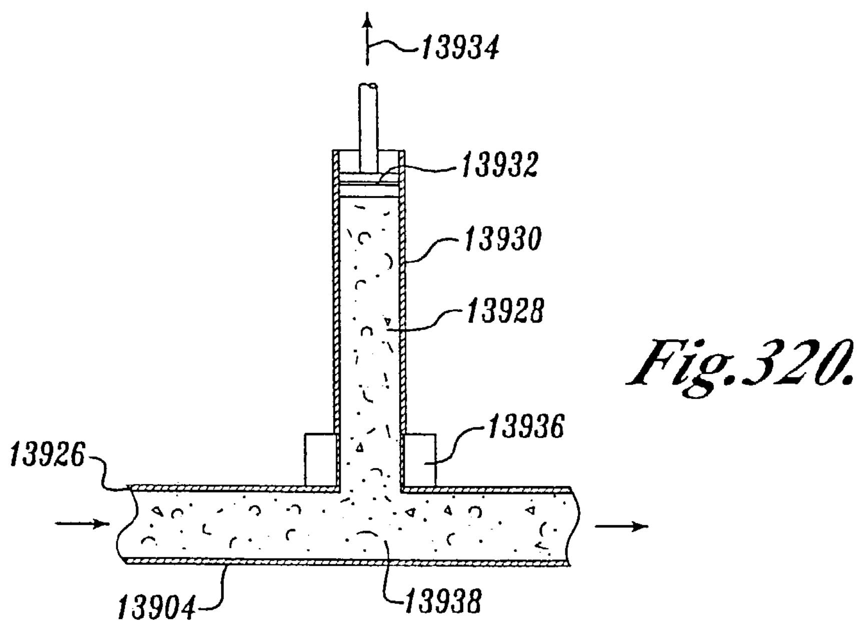
Figure 321:
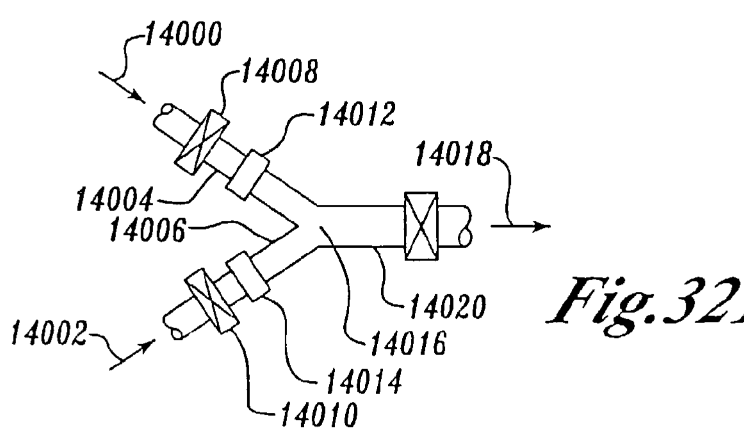
Figure 322:
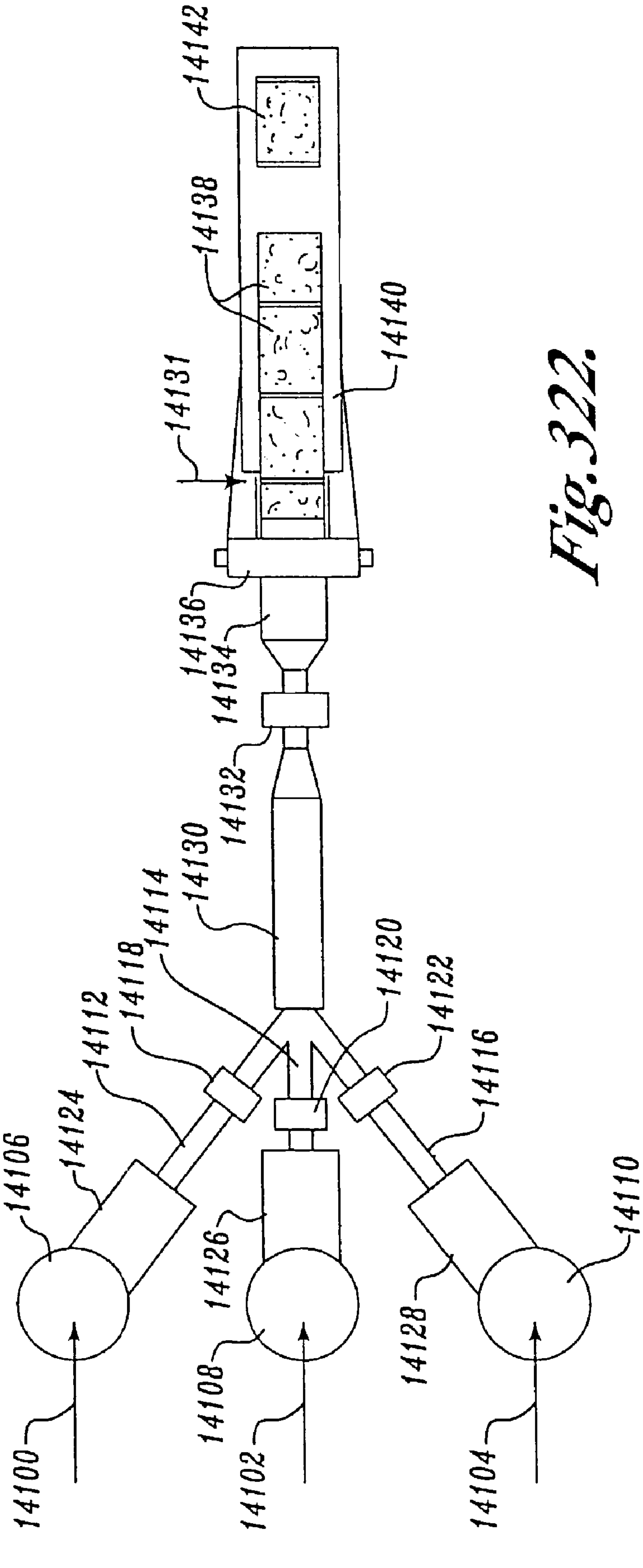
Figure 323:
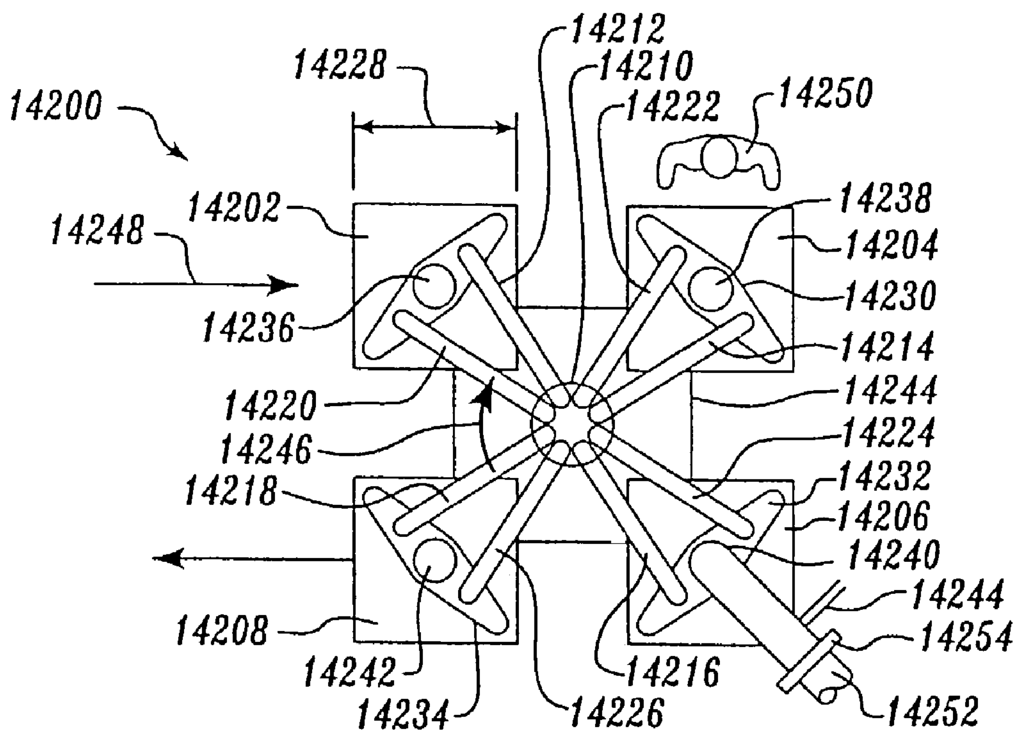
Figure 324:
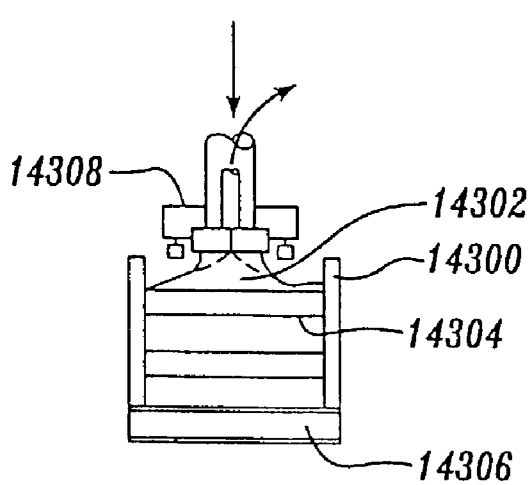
Figure 325:
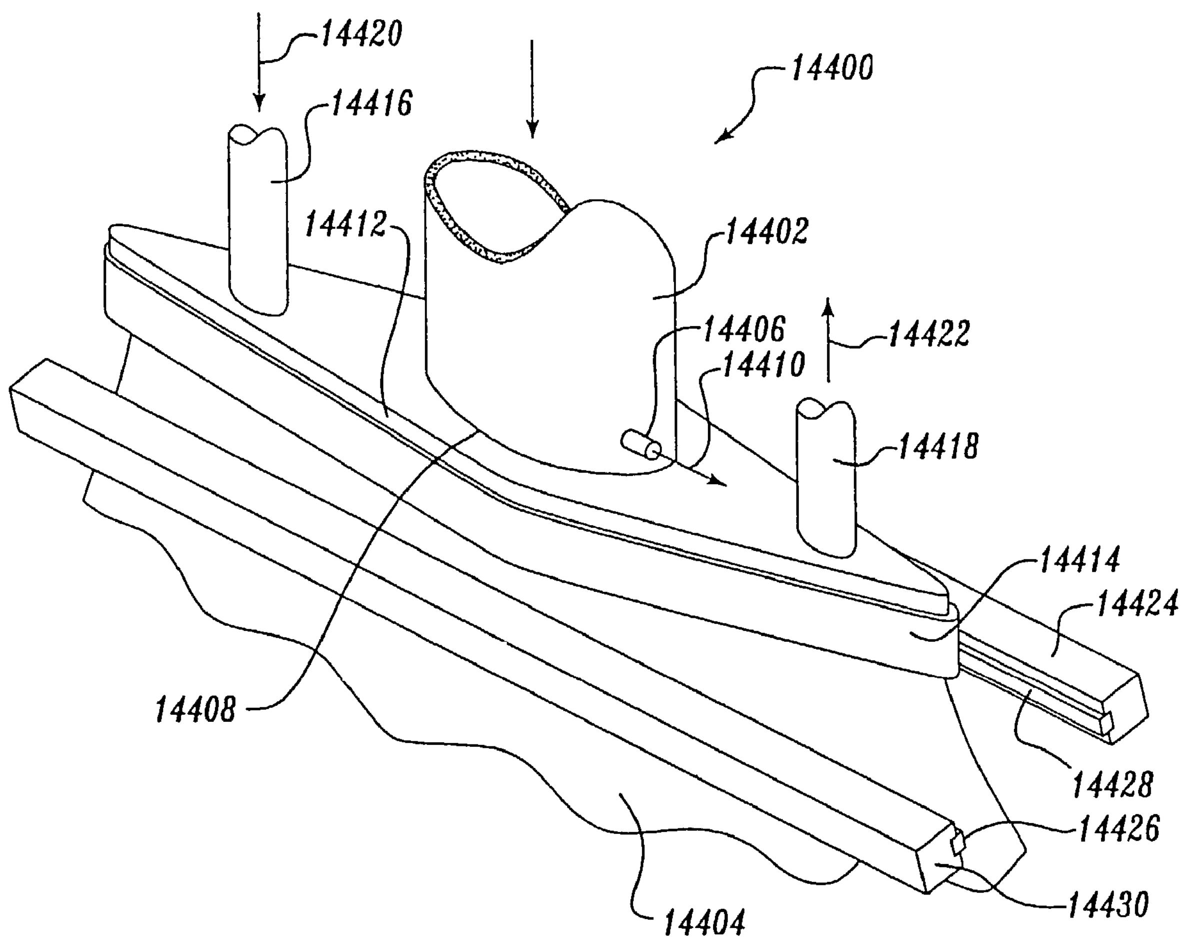
Figure 326:
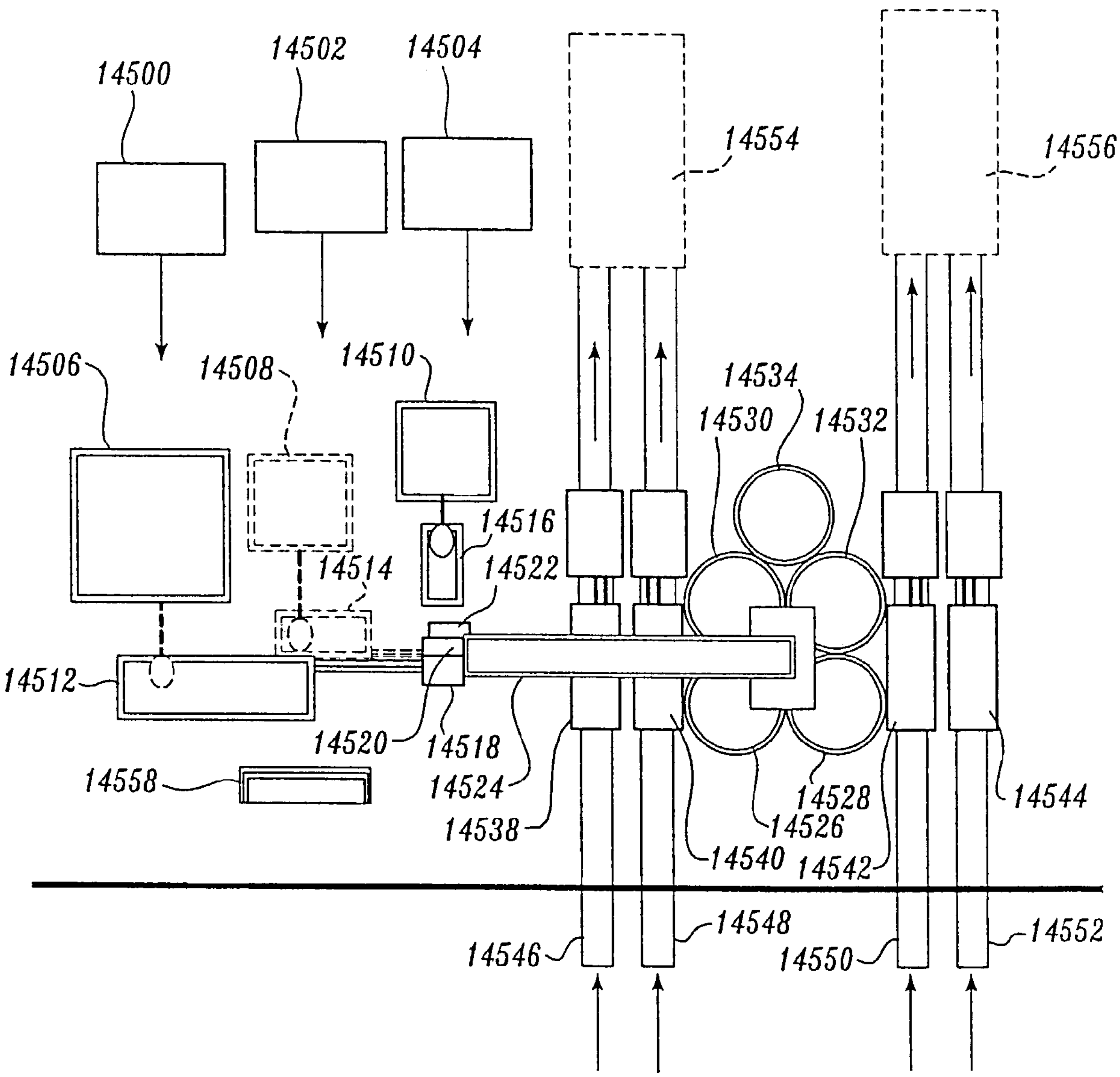
Figure 327:
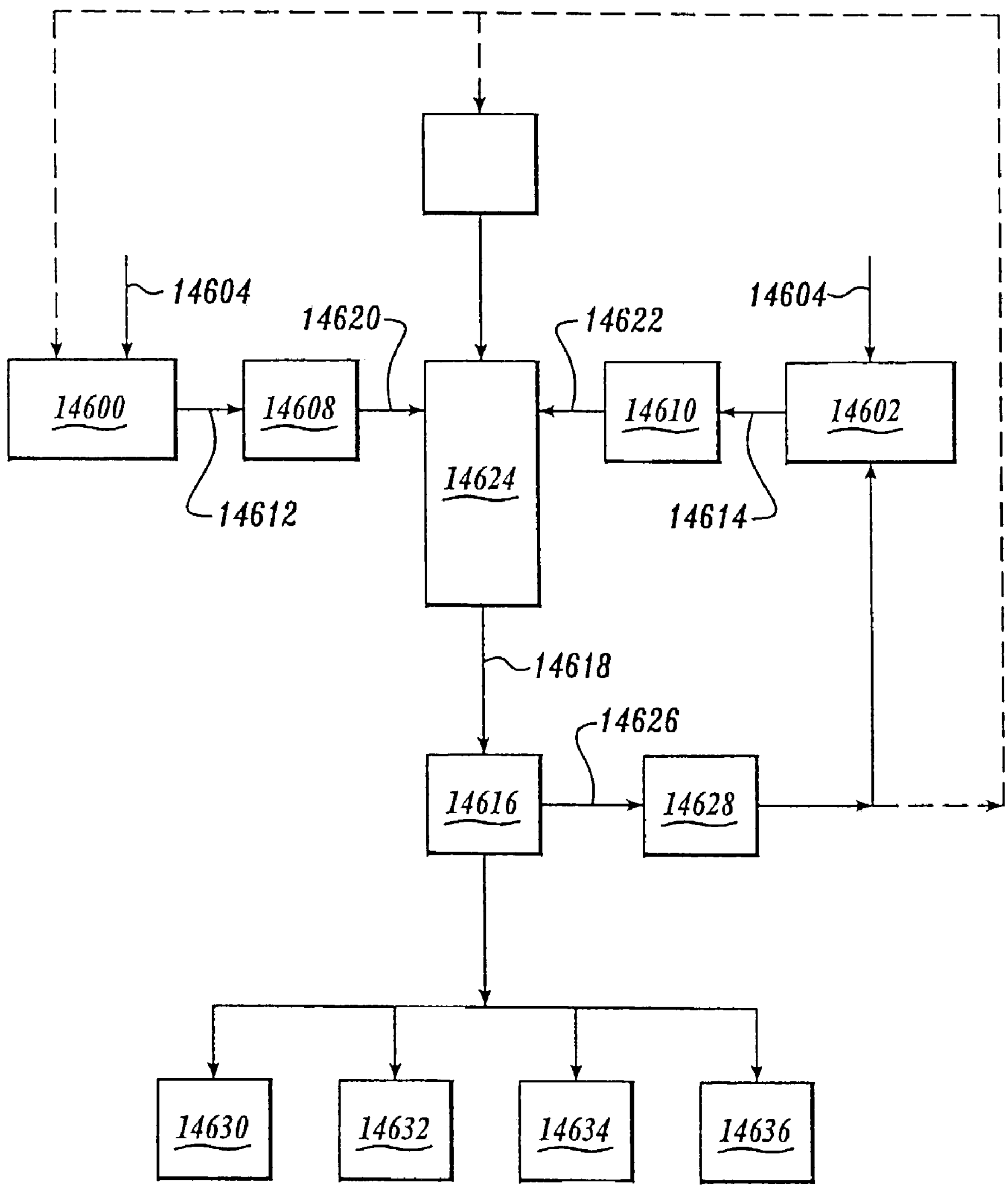
Figure 328:
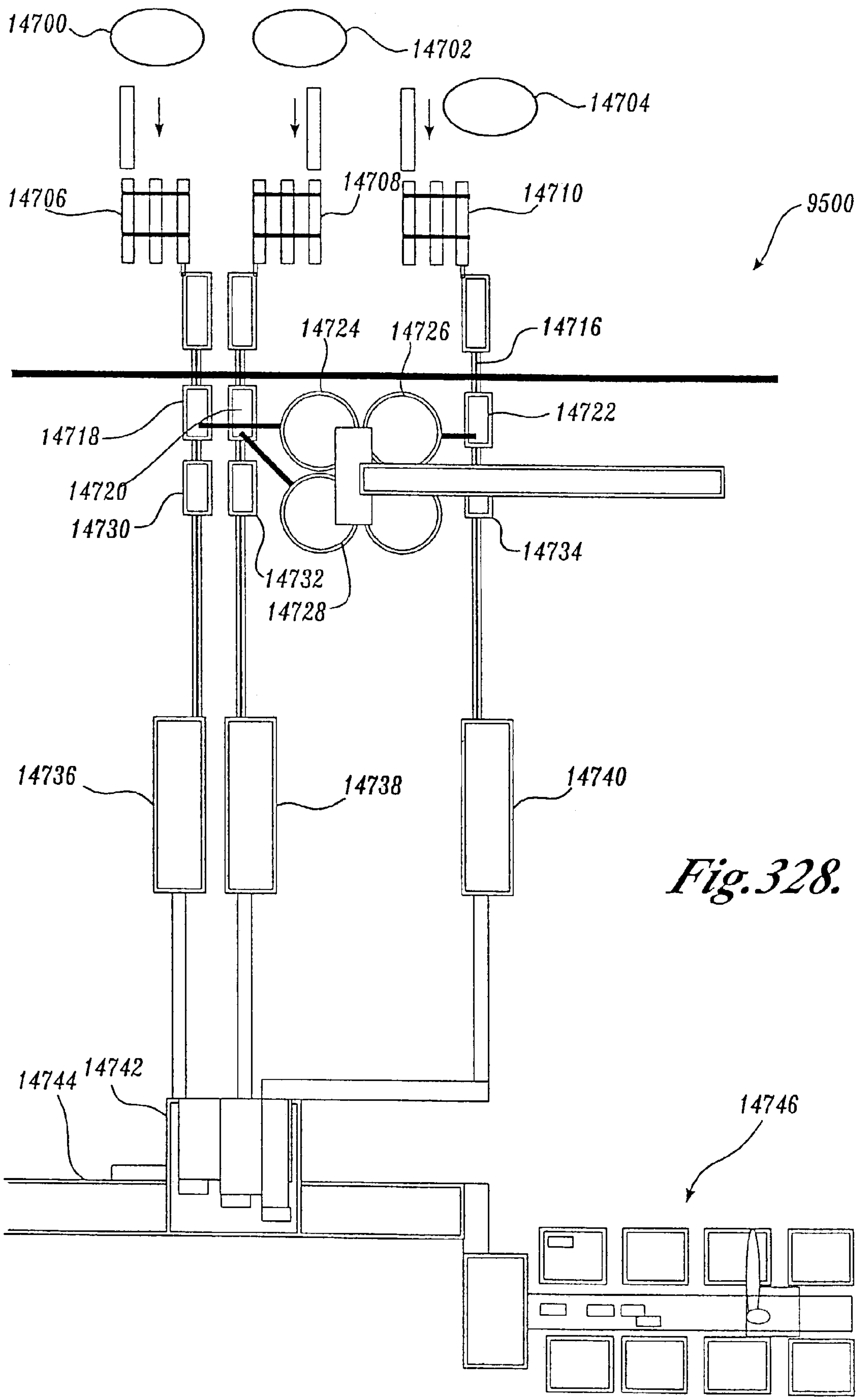
Figure 329:
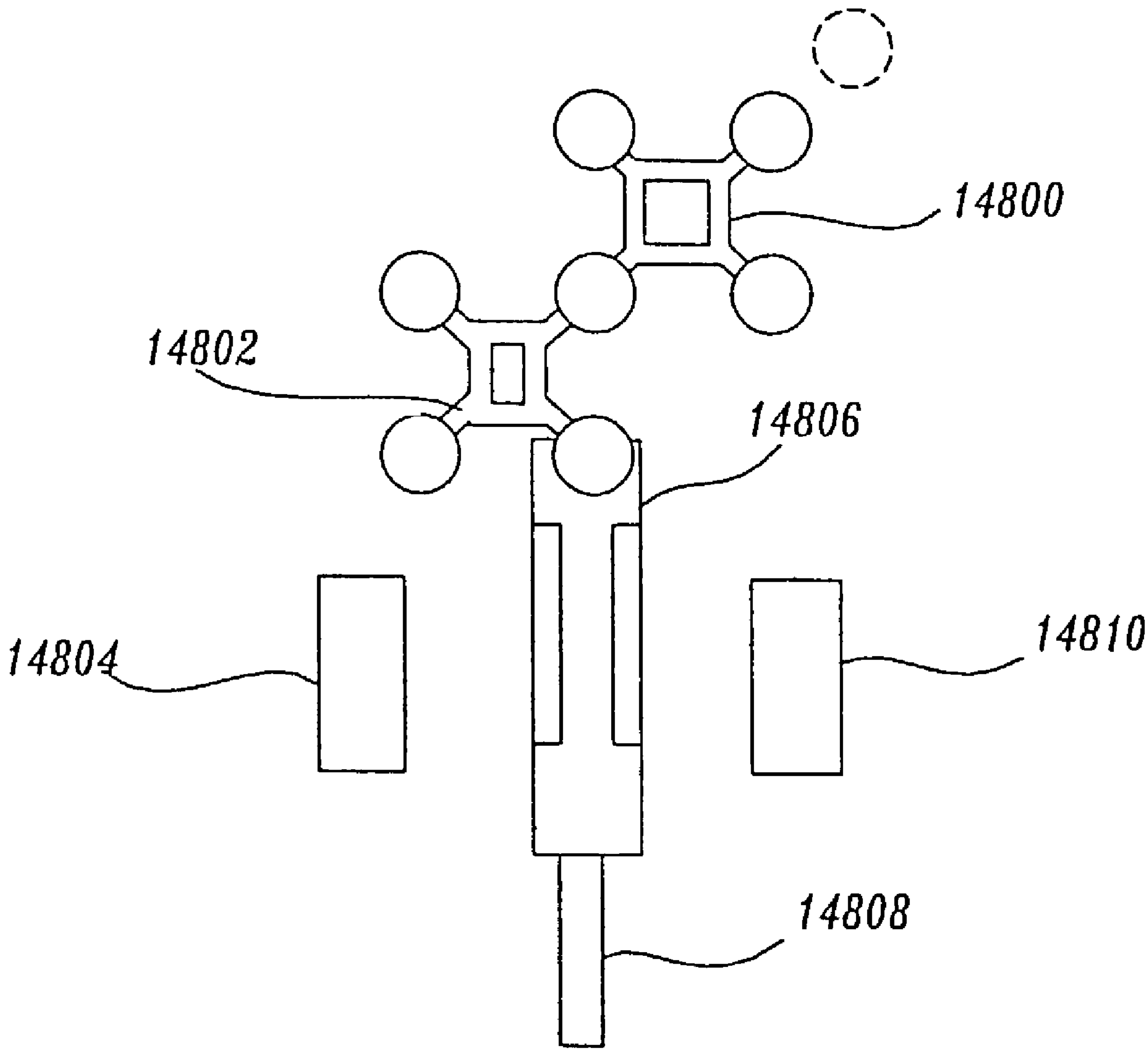
Figure 330:
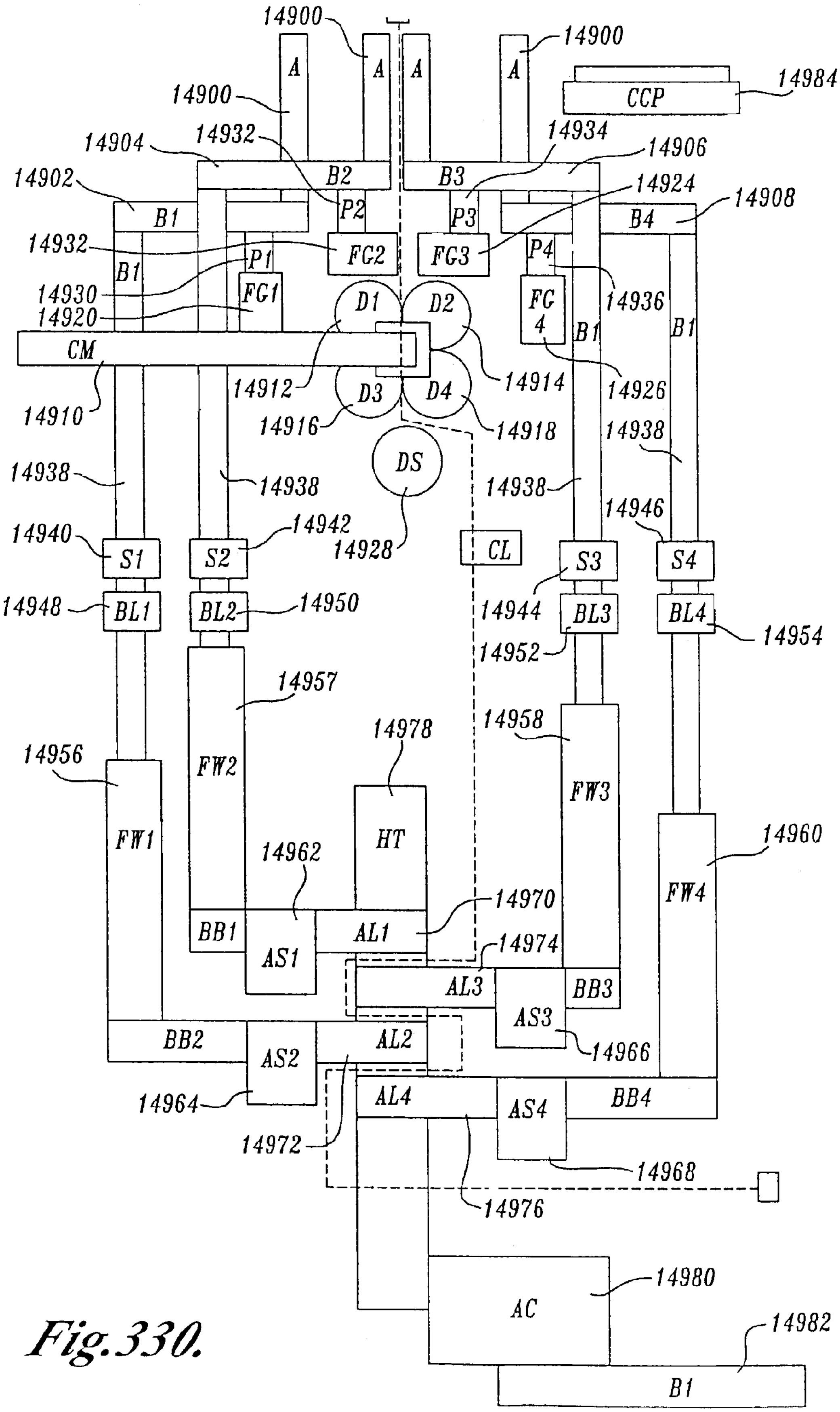
Figure 331:
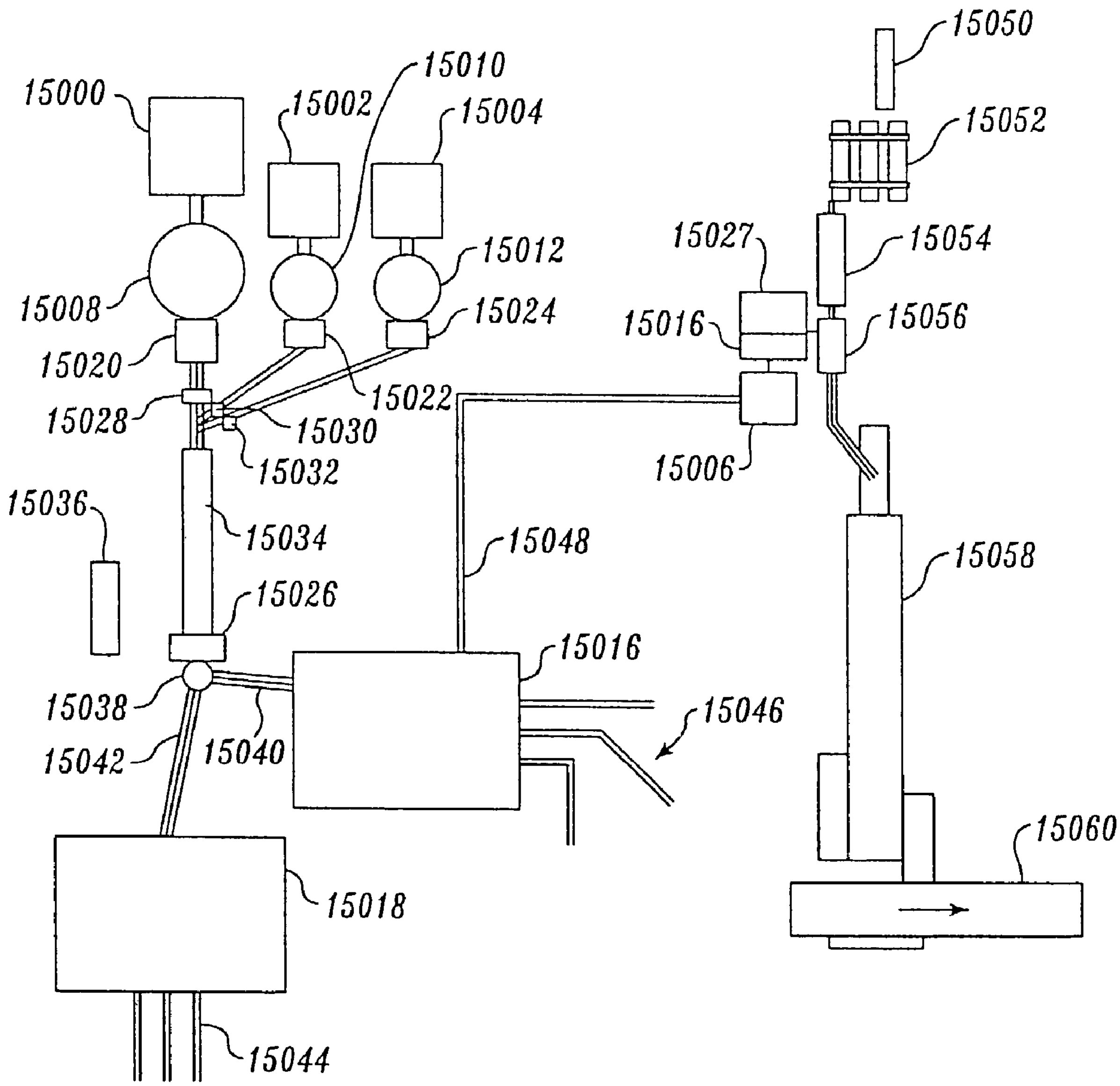
Figure 333:
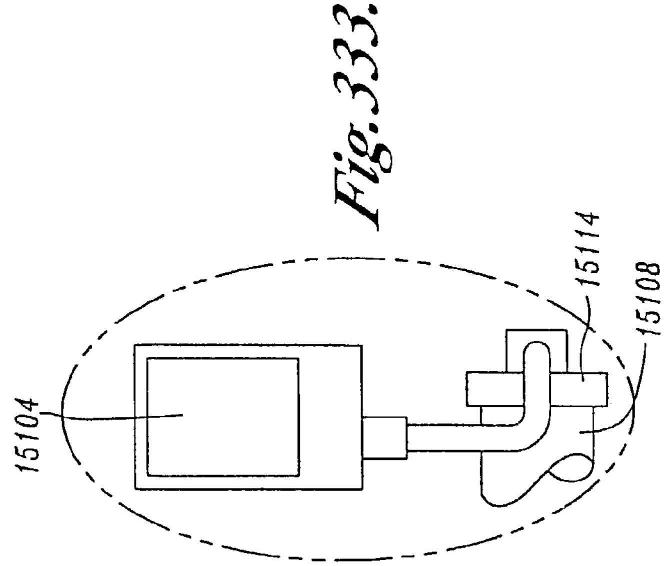
Figure 332:
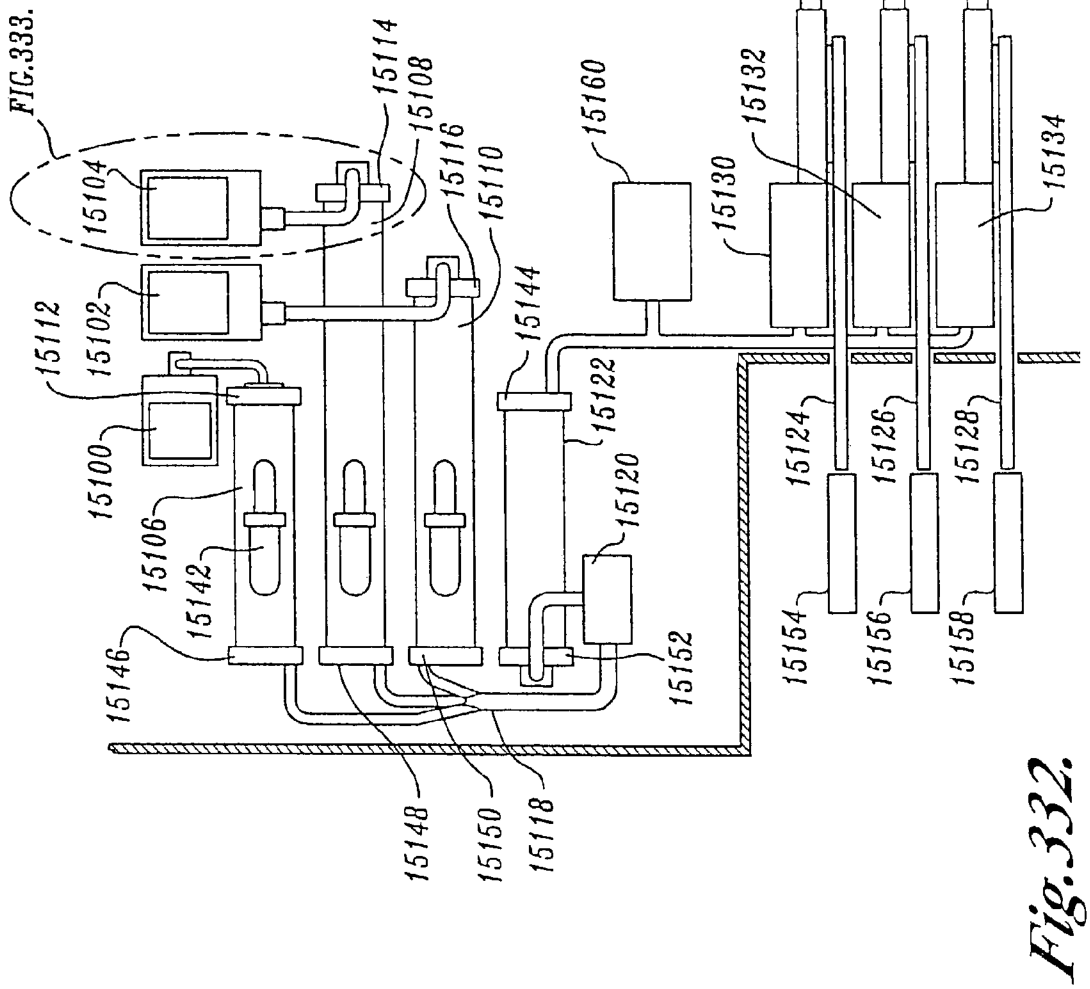
Figure 334:
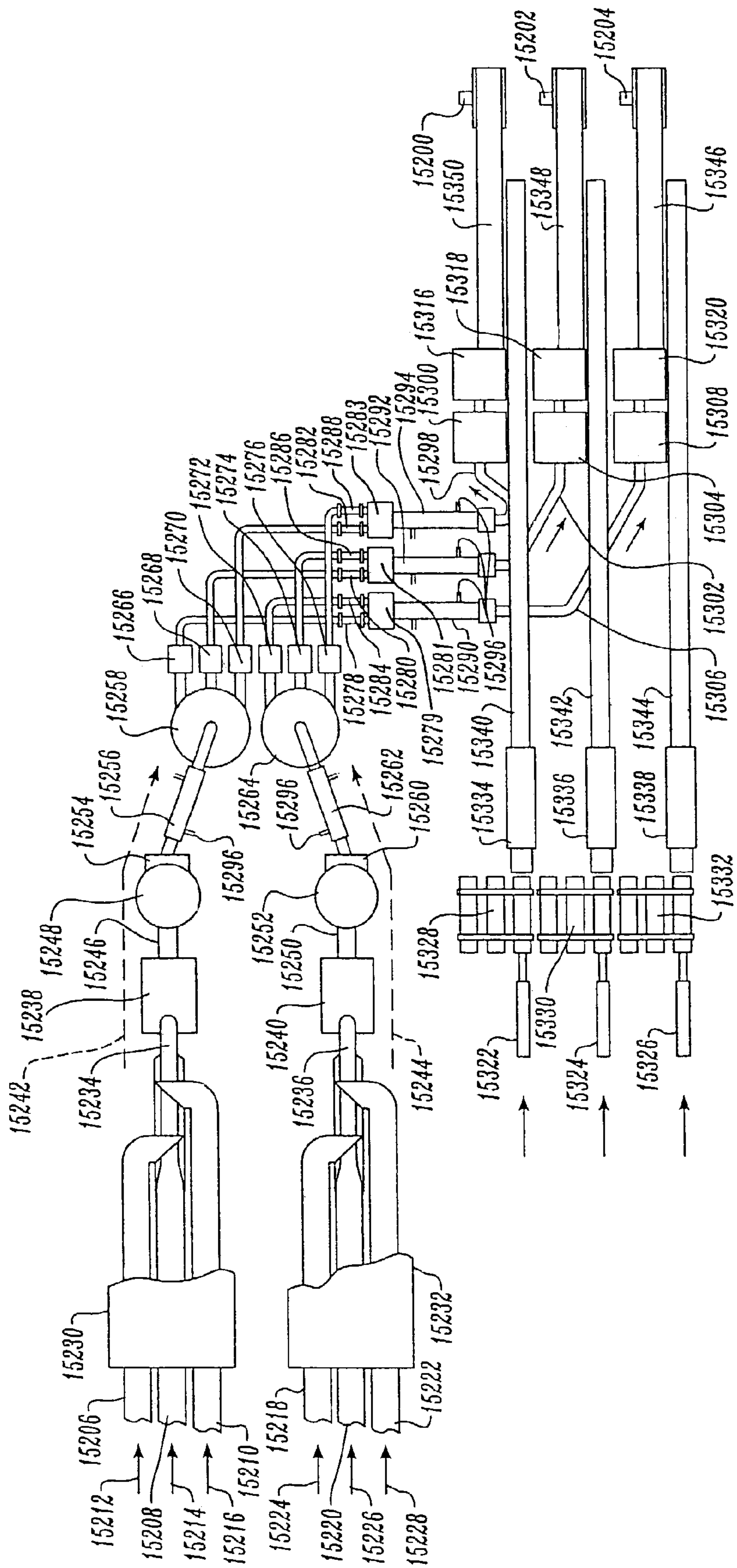
Figure 335:
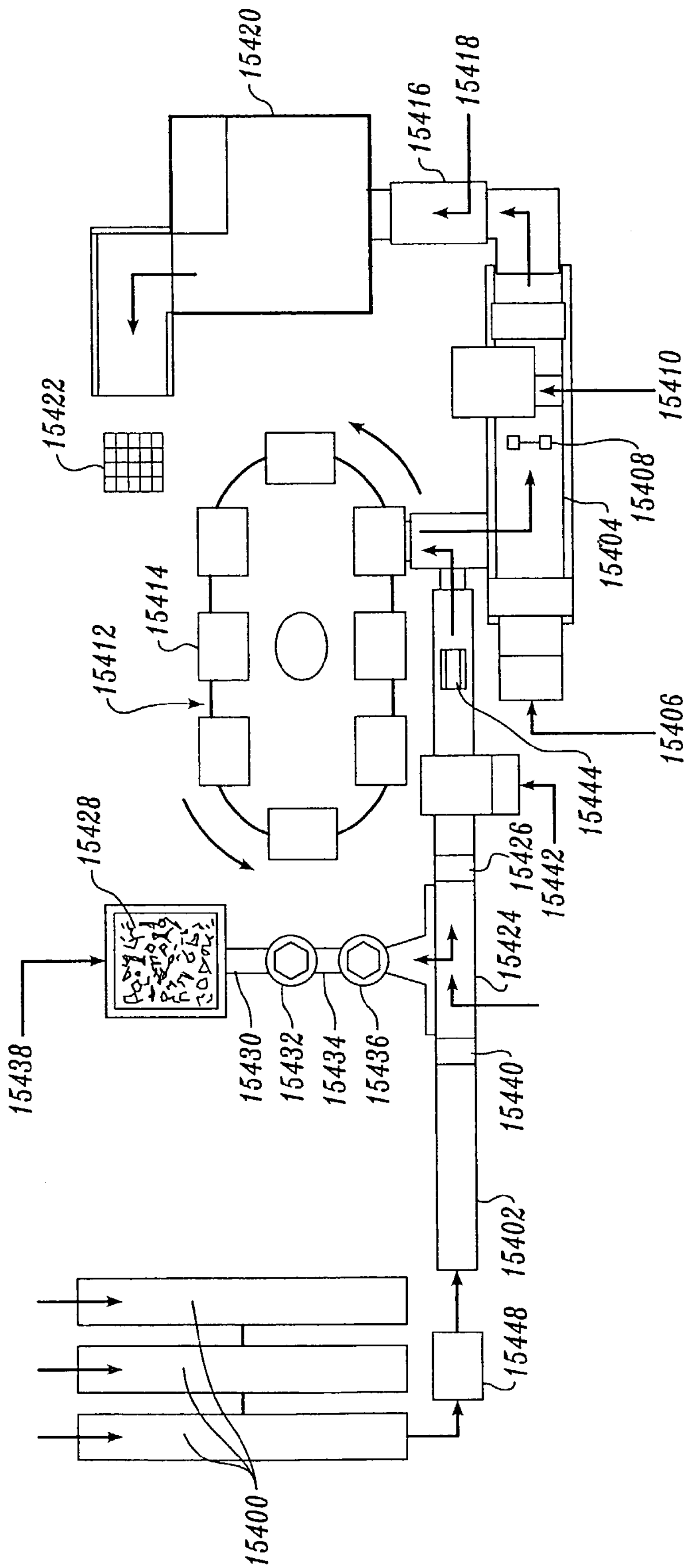
Figure 336:
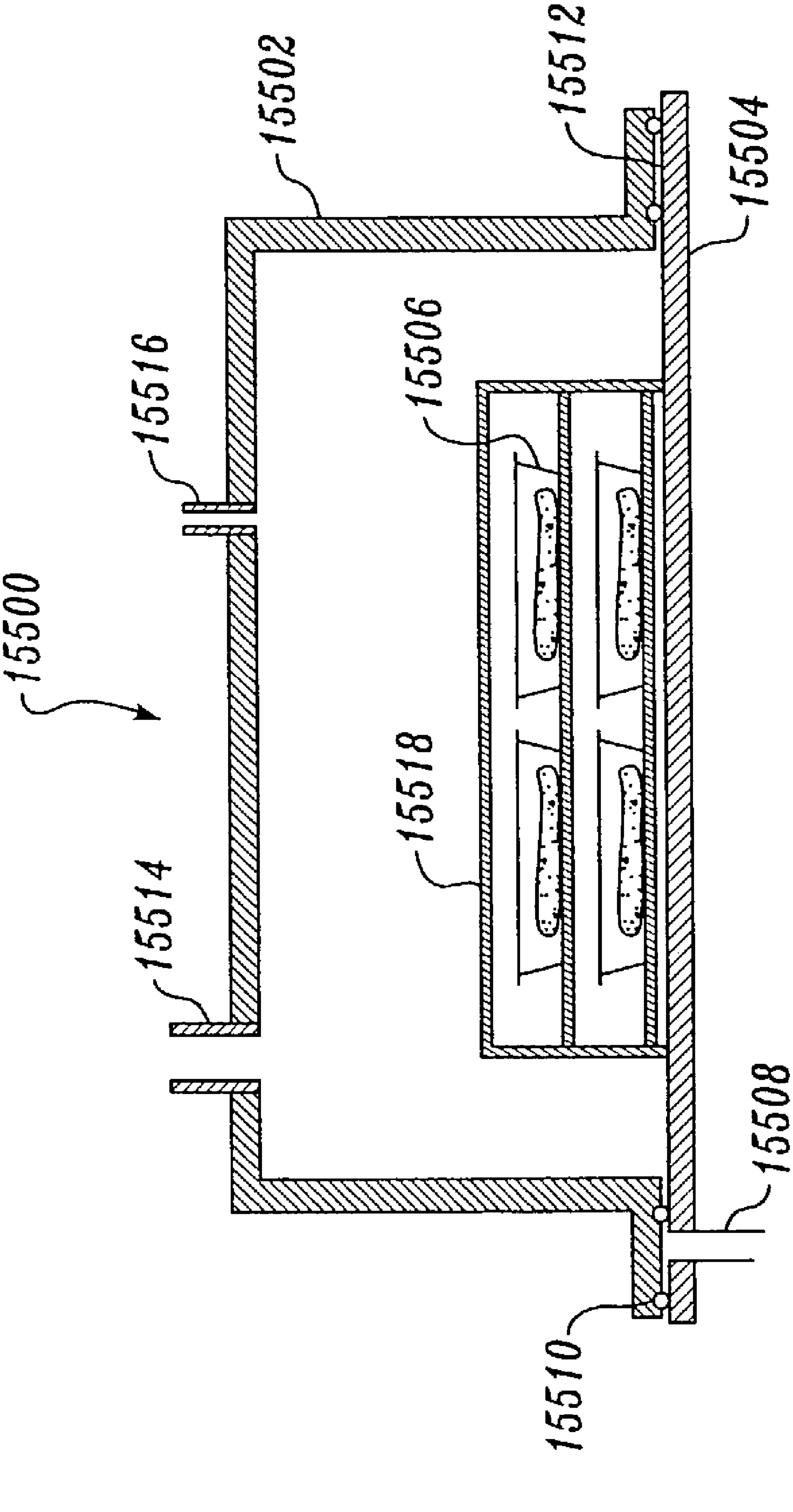
Figure 337:
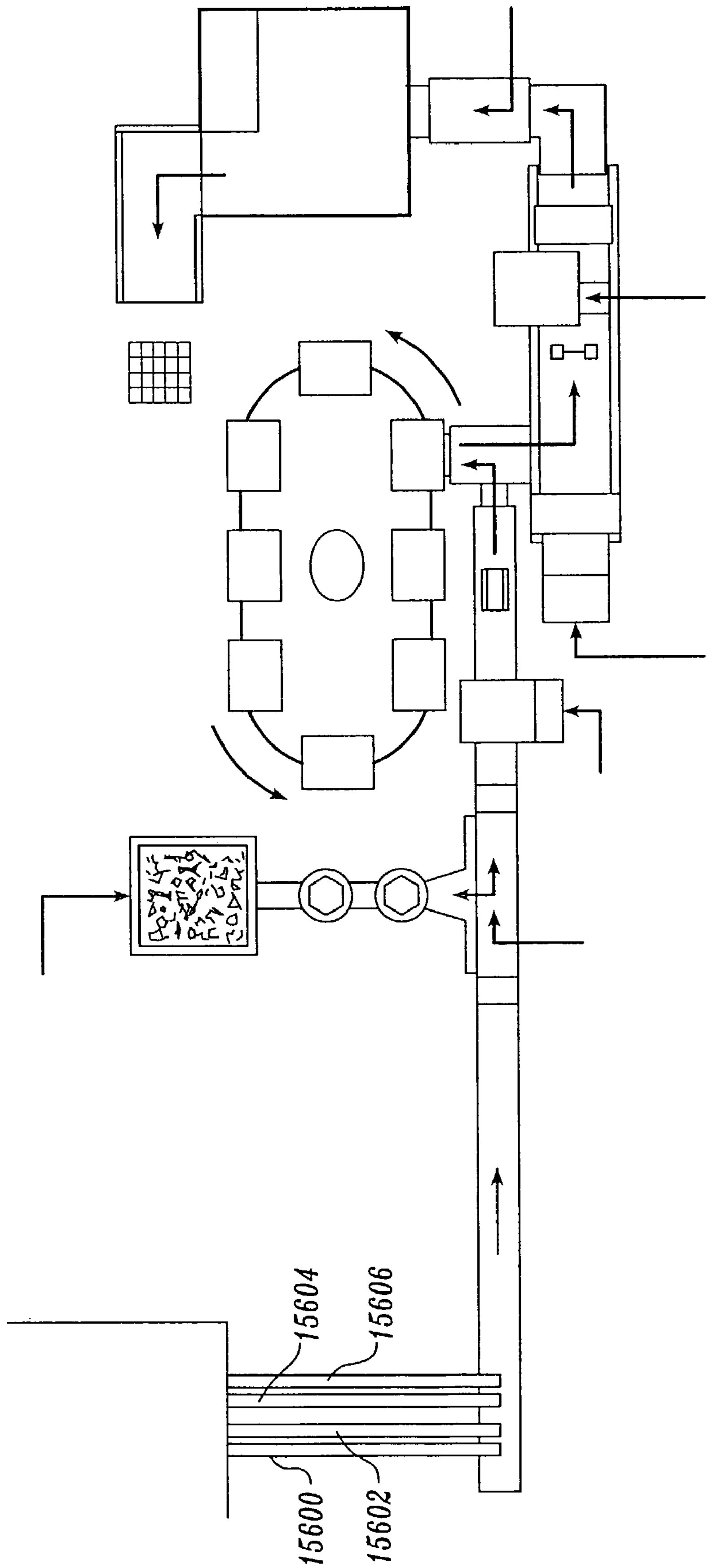
Figure 338:
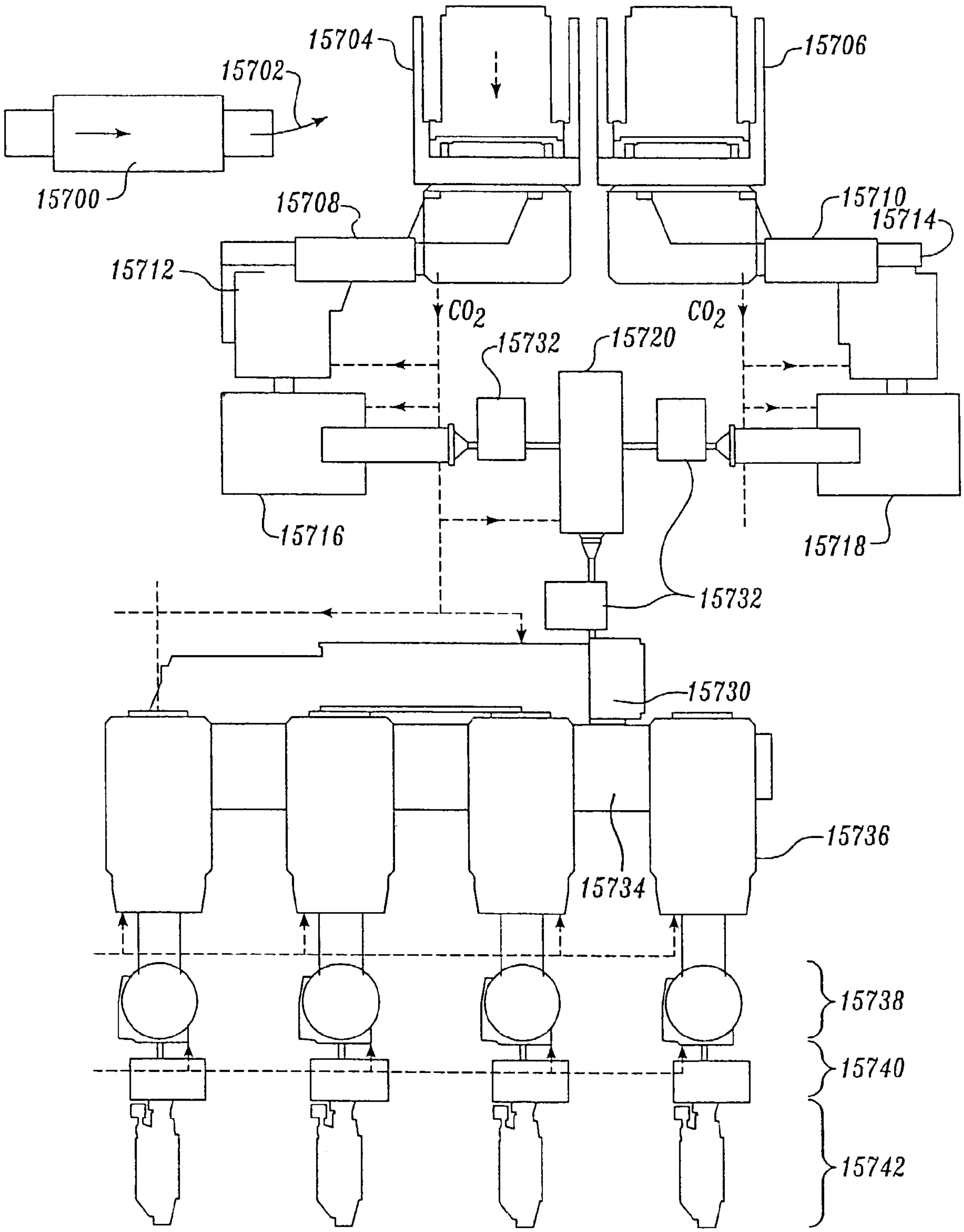
Figure 339:
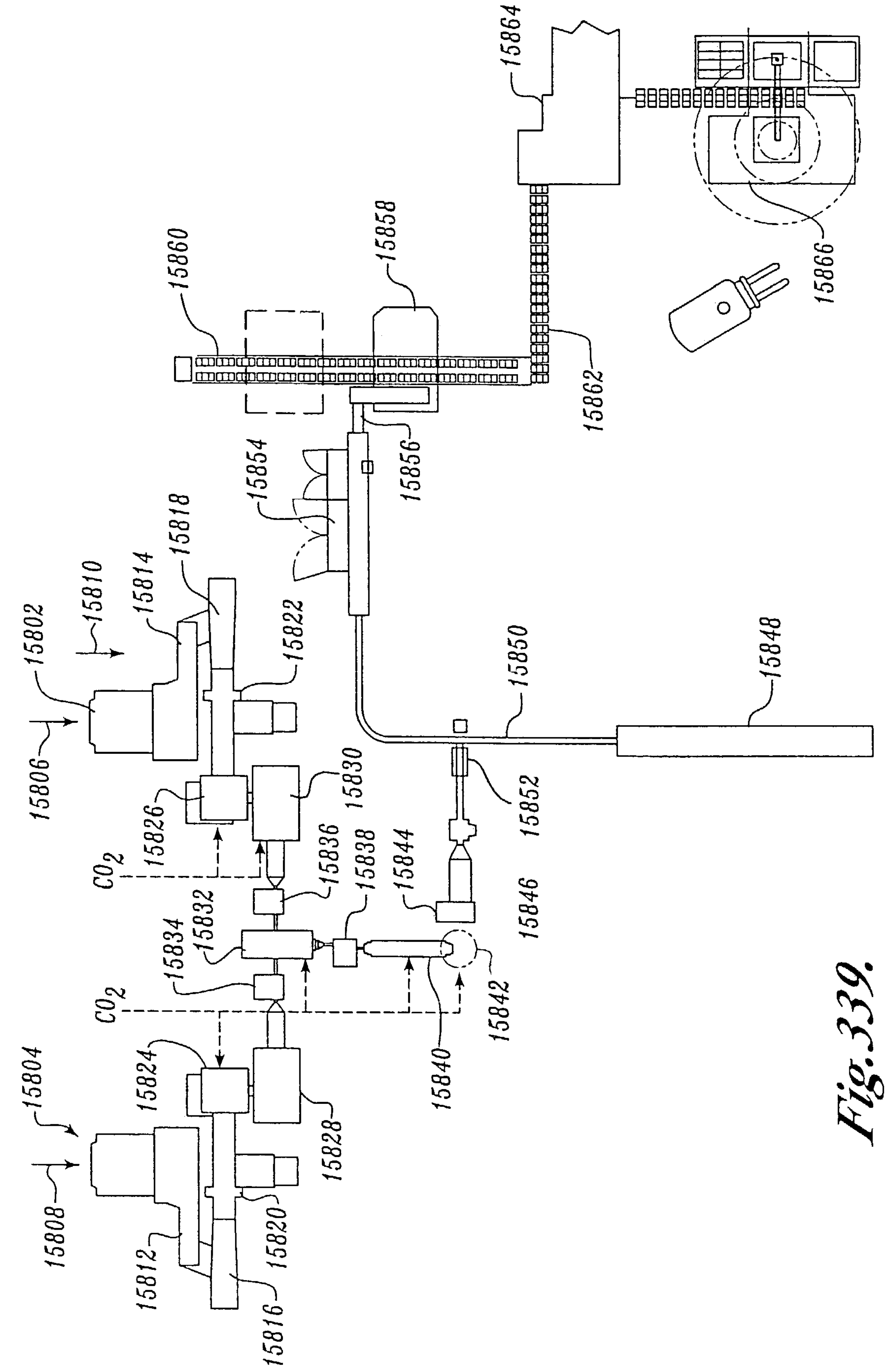
Figure 340:
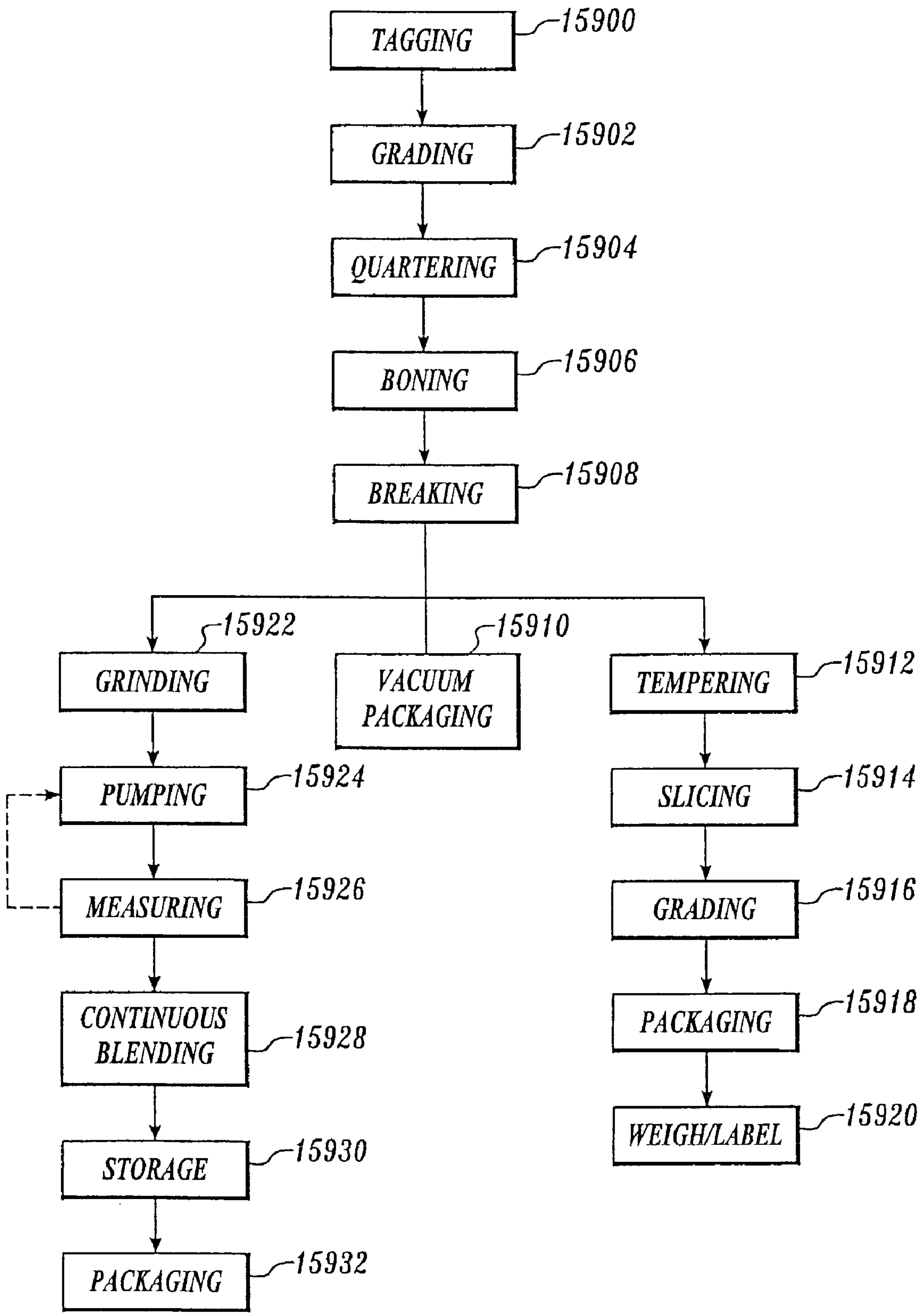
Figure 341:
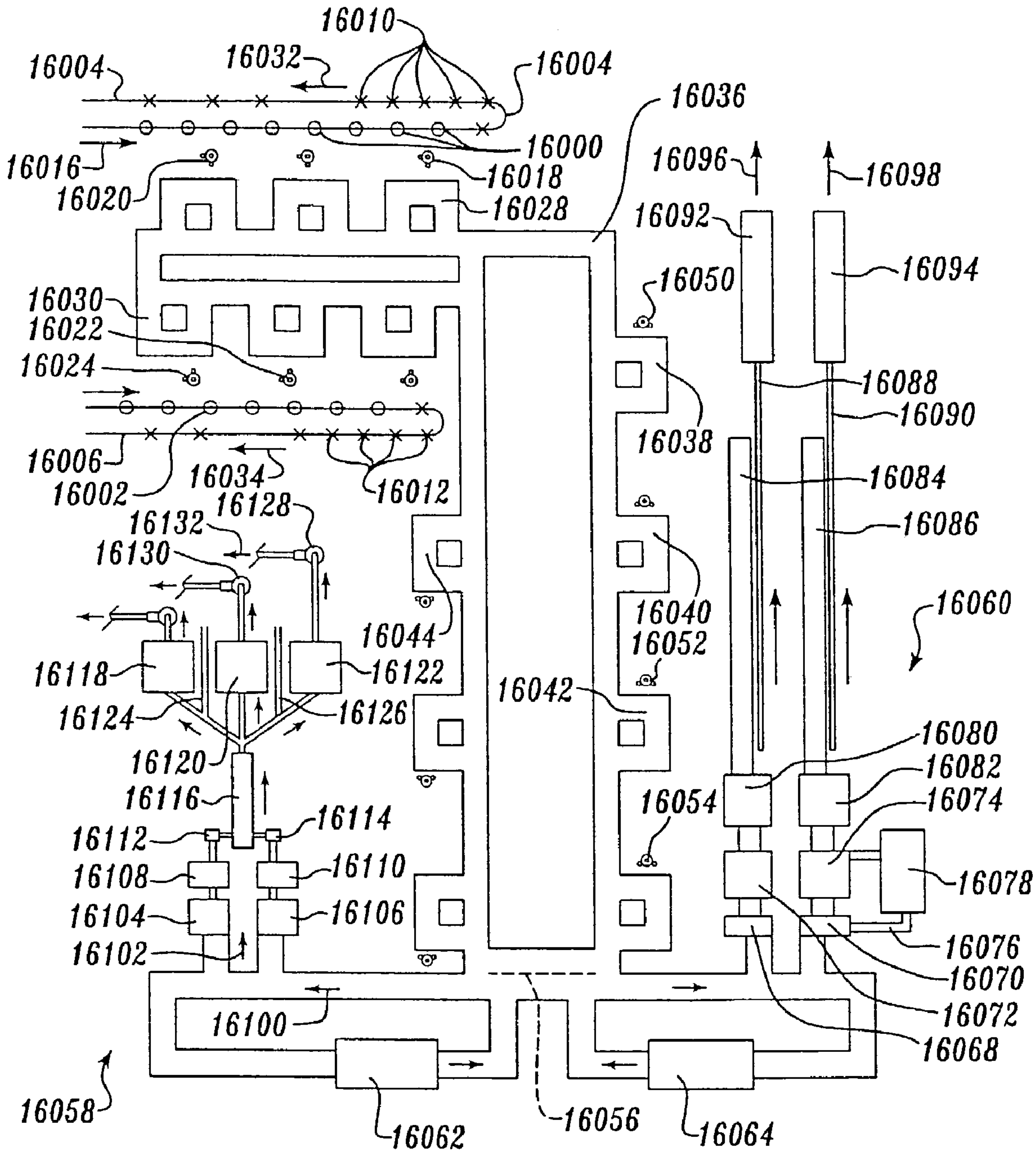
Figure 342:
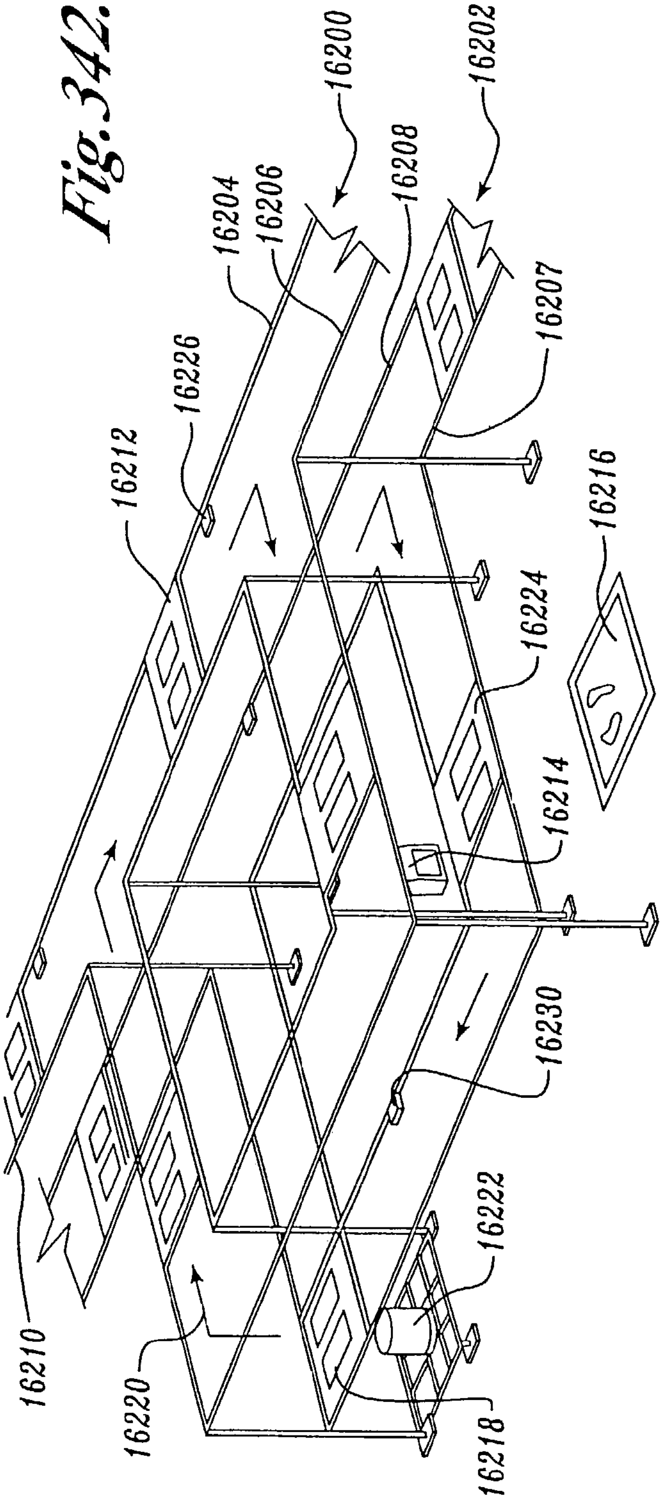
Figure 343:
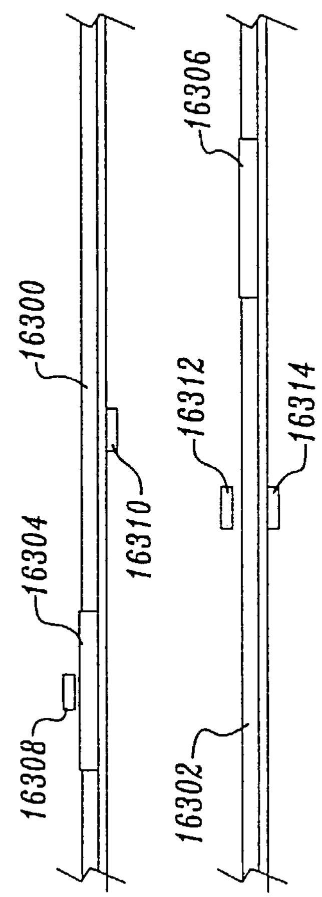
Figure 344:
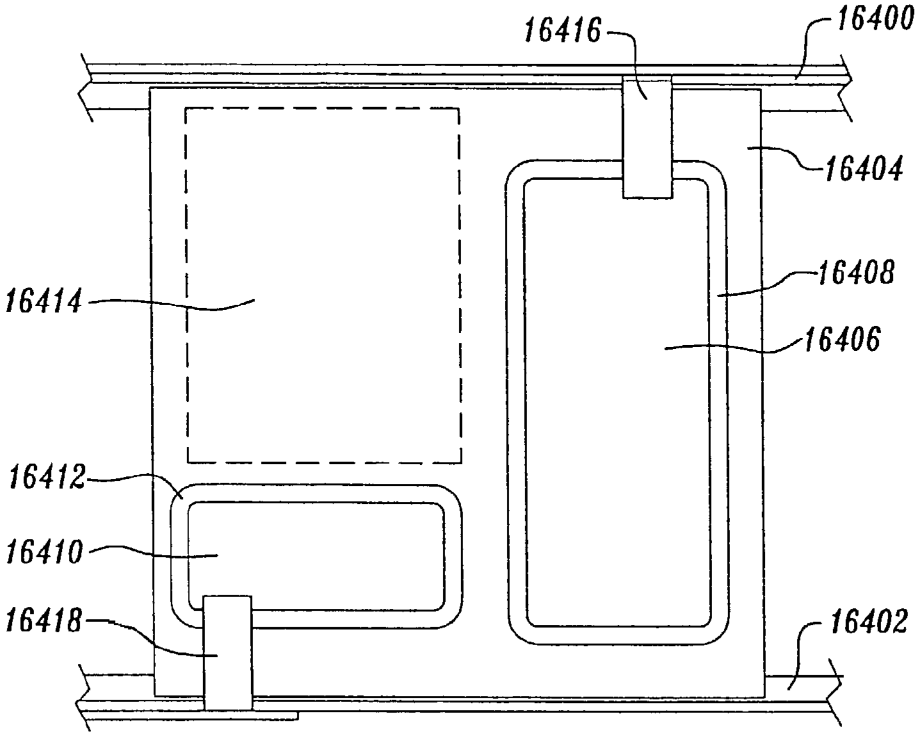
Figure 345:
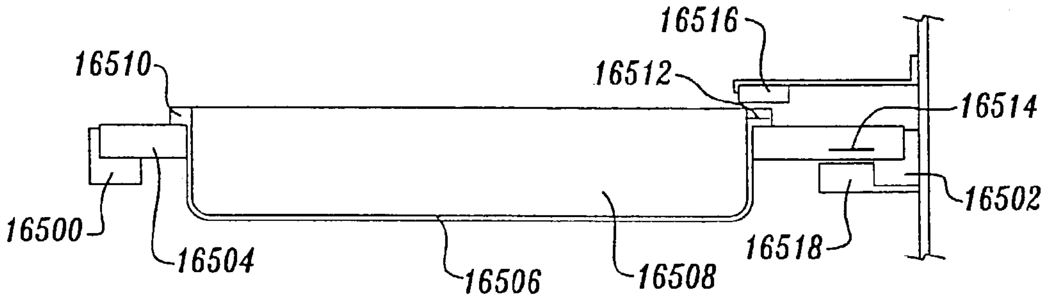
Figure 346:
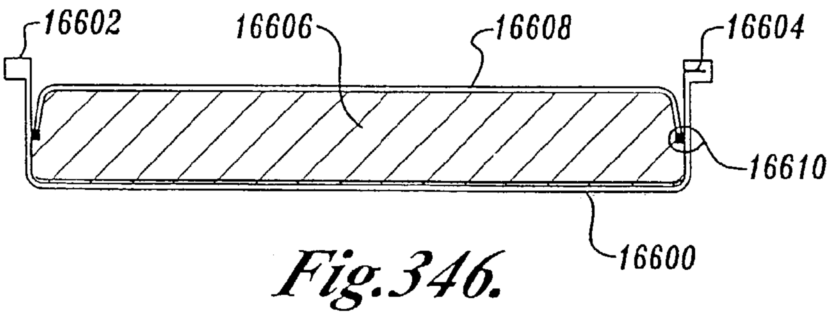
Figure 347:
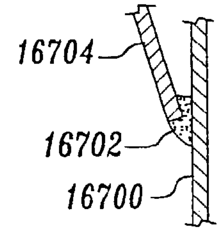
Figure 348:
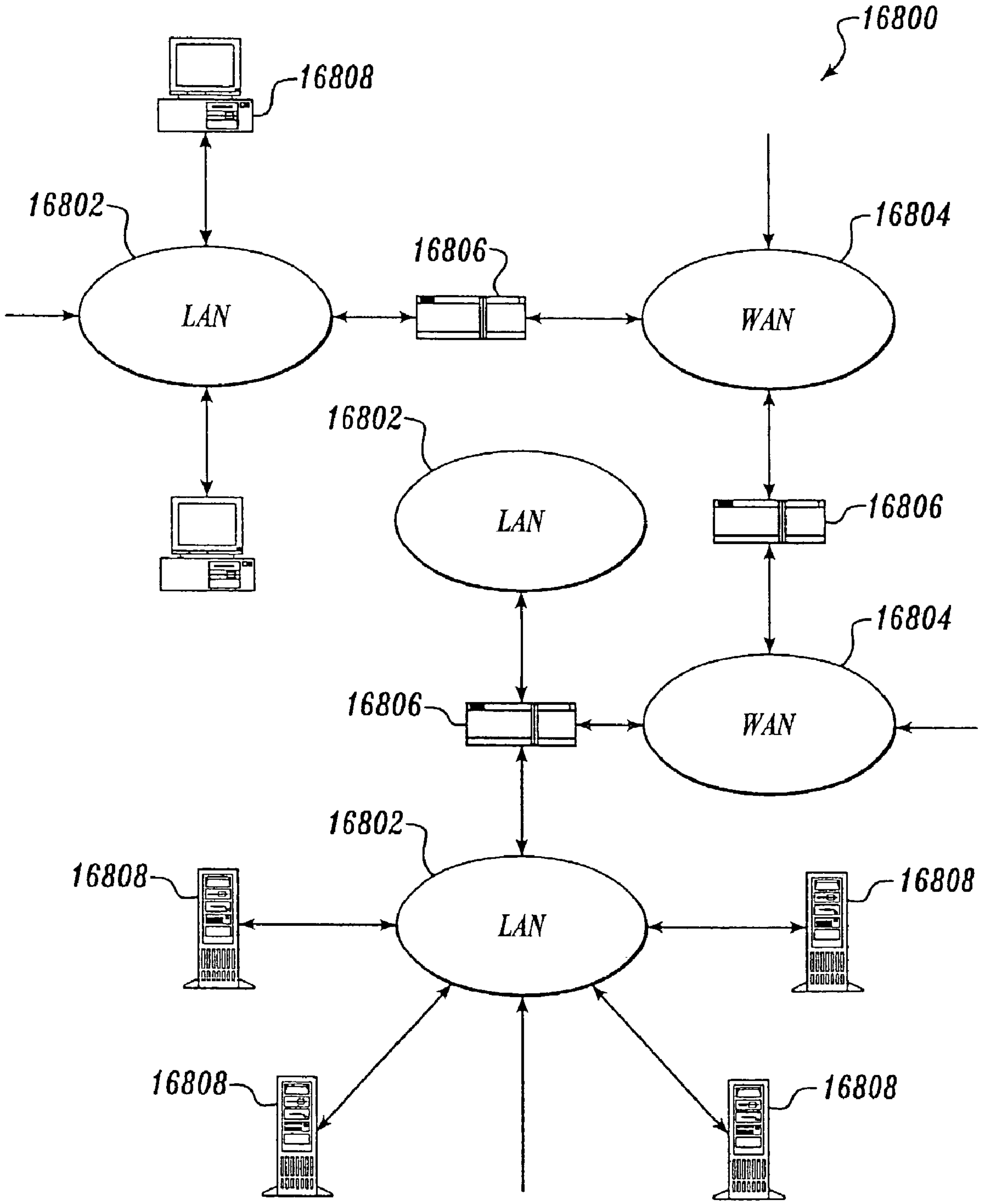
Figure 349:
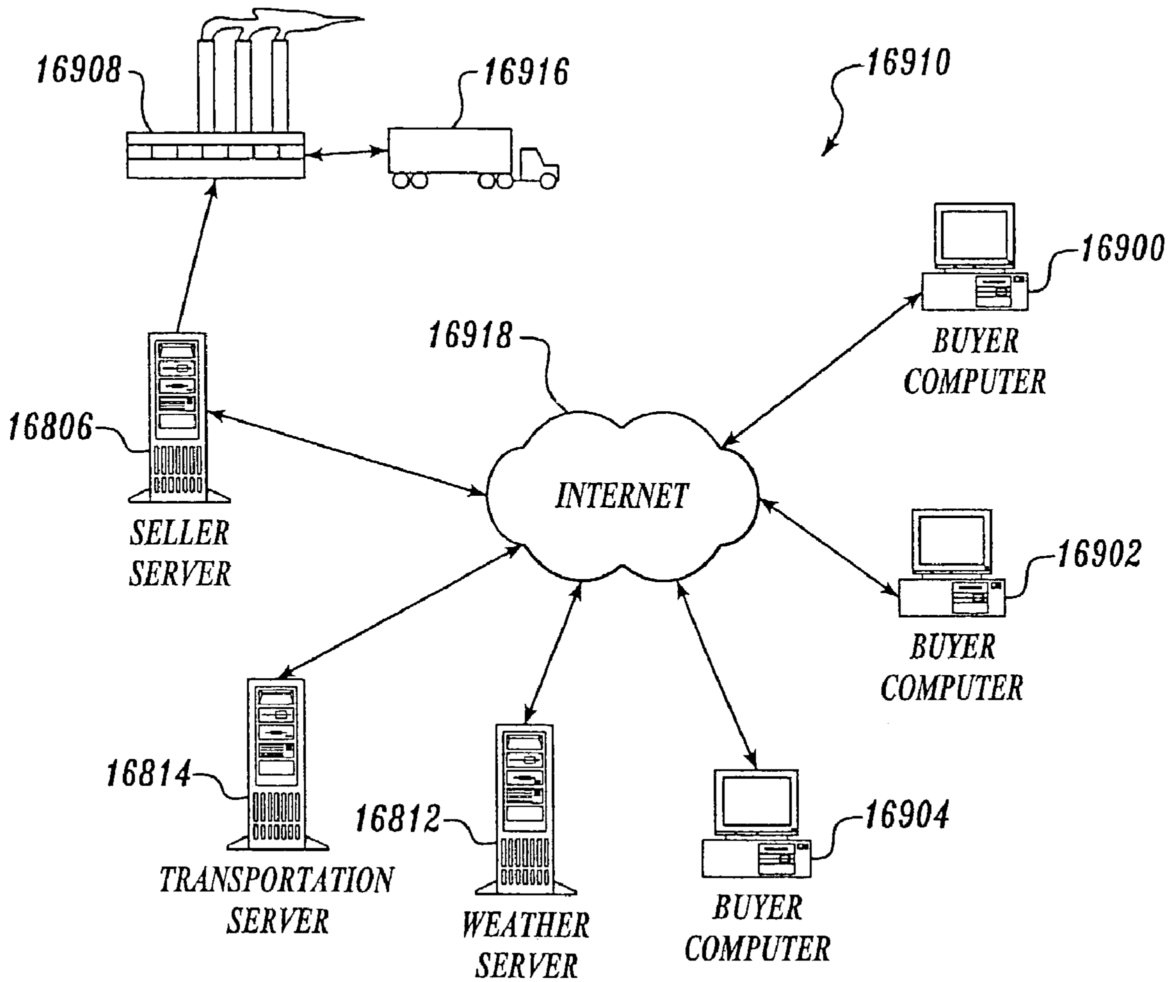
Figure 350:
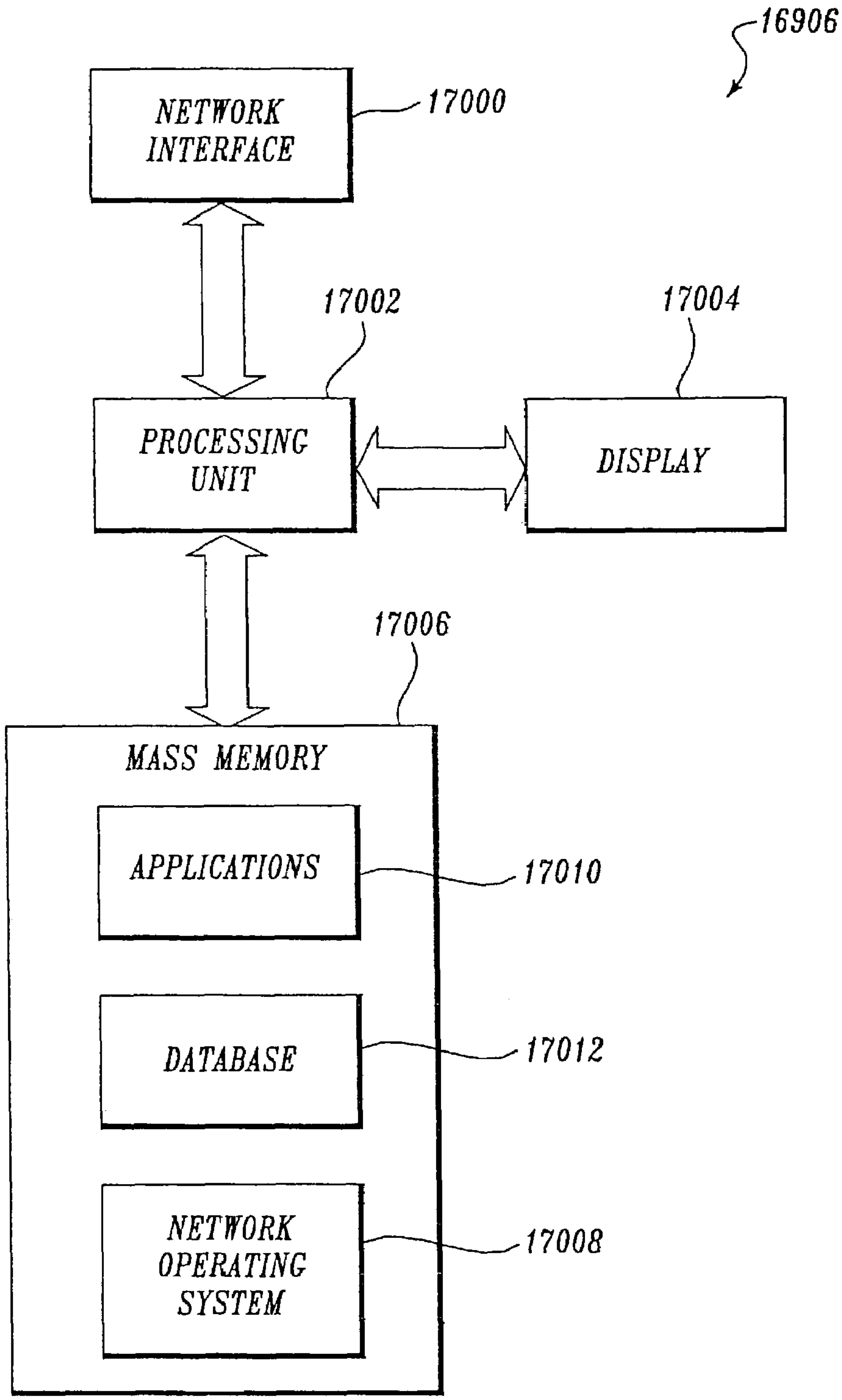
Figure 351:
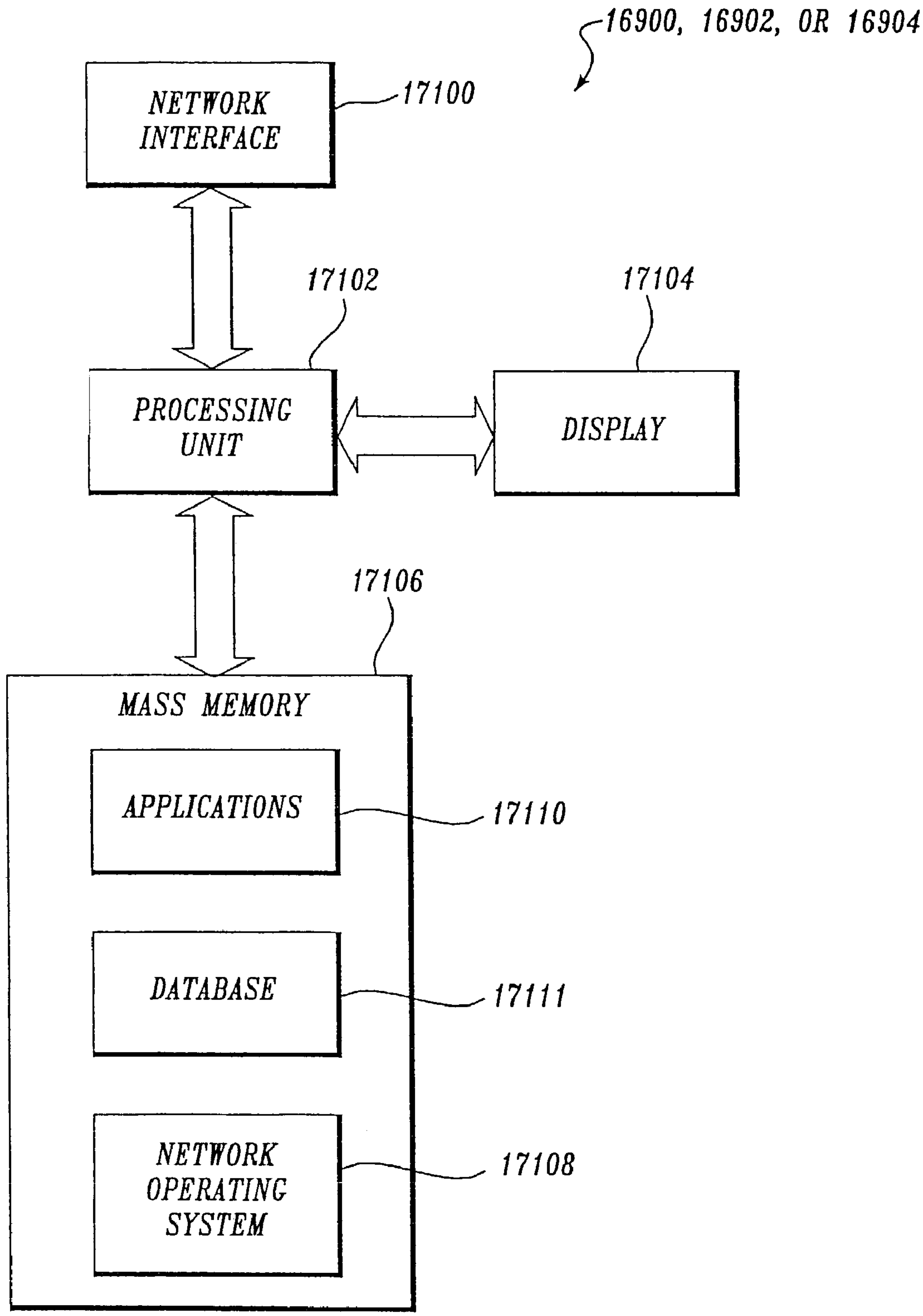
Figure 352:
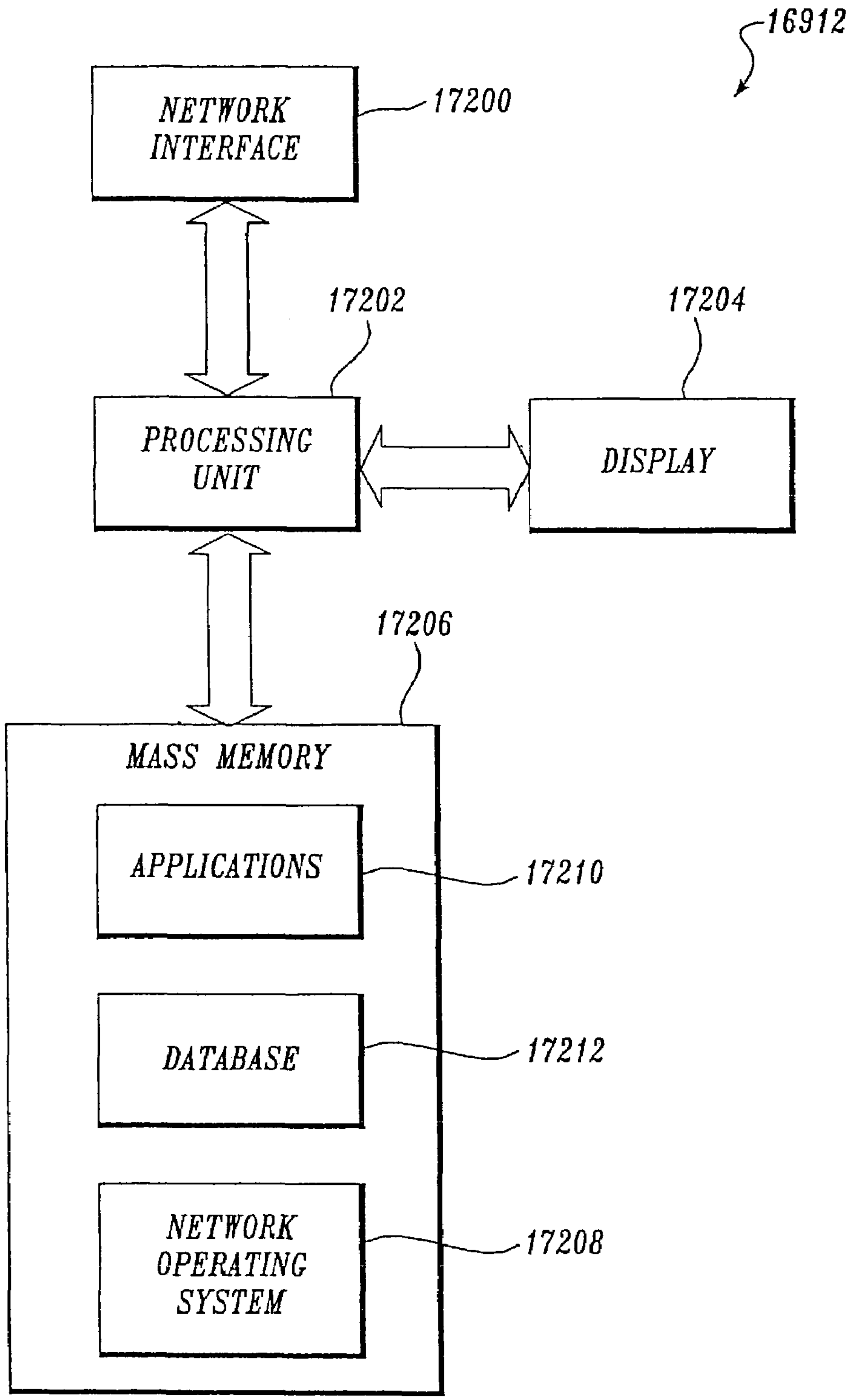
Figure 353:
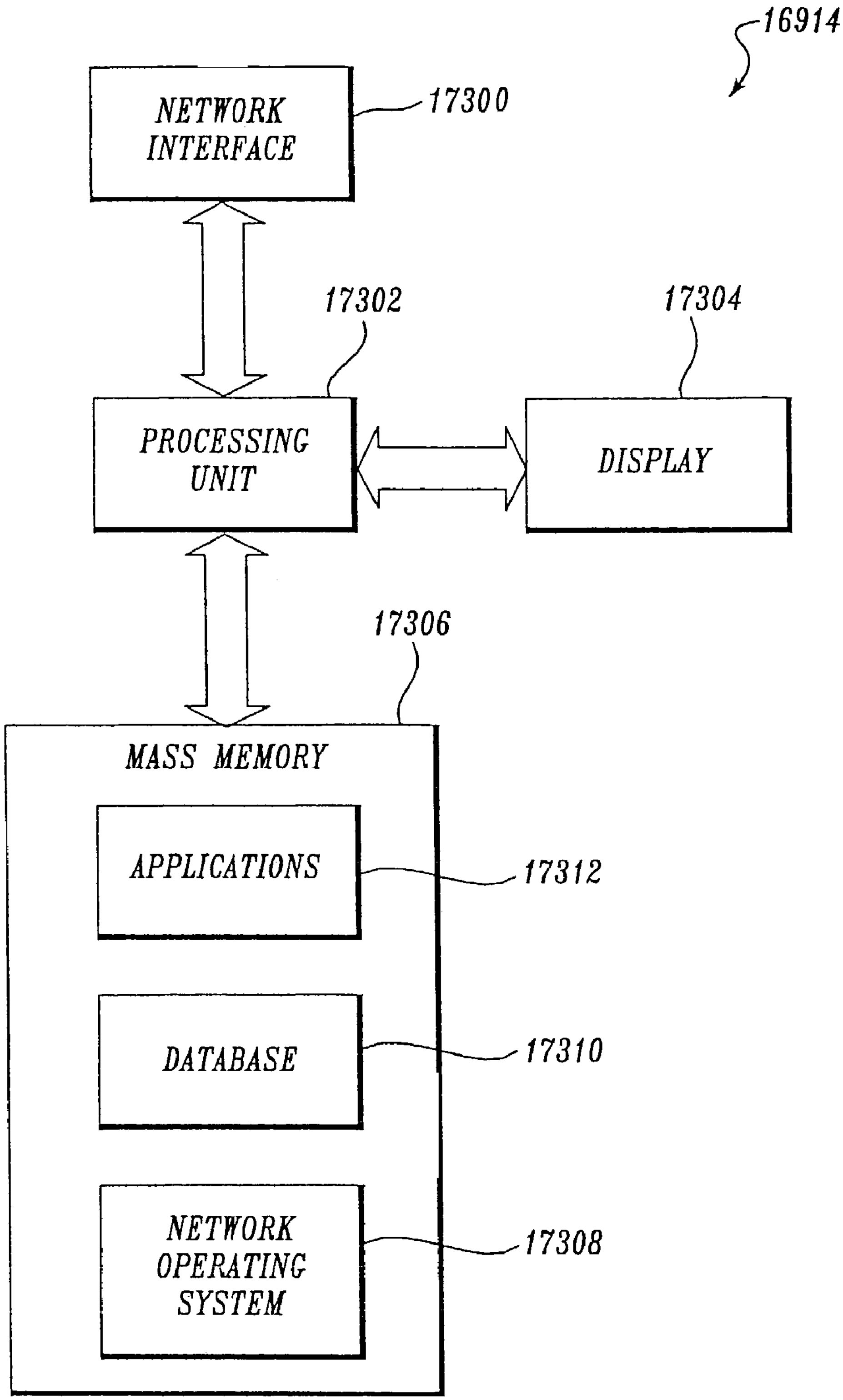
Figure 354:
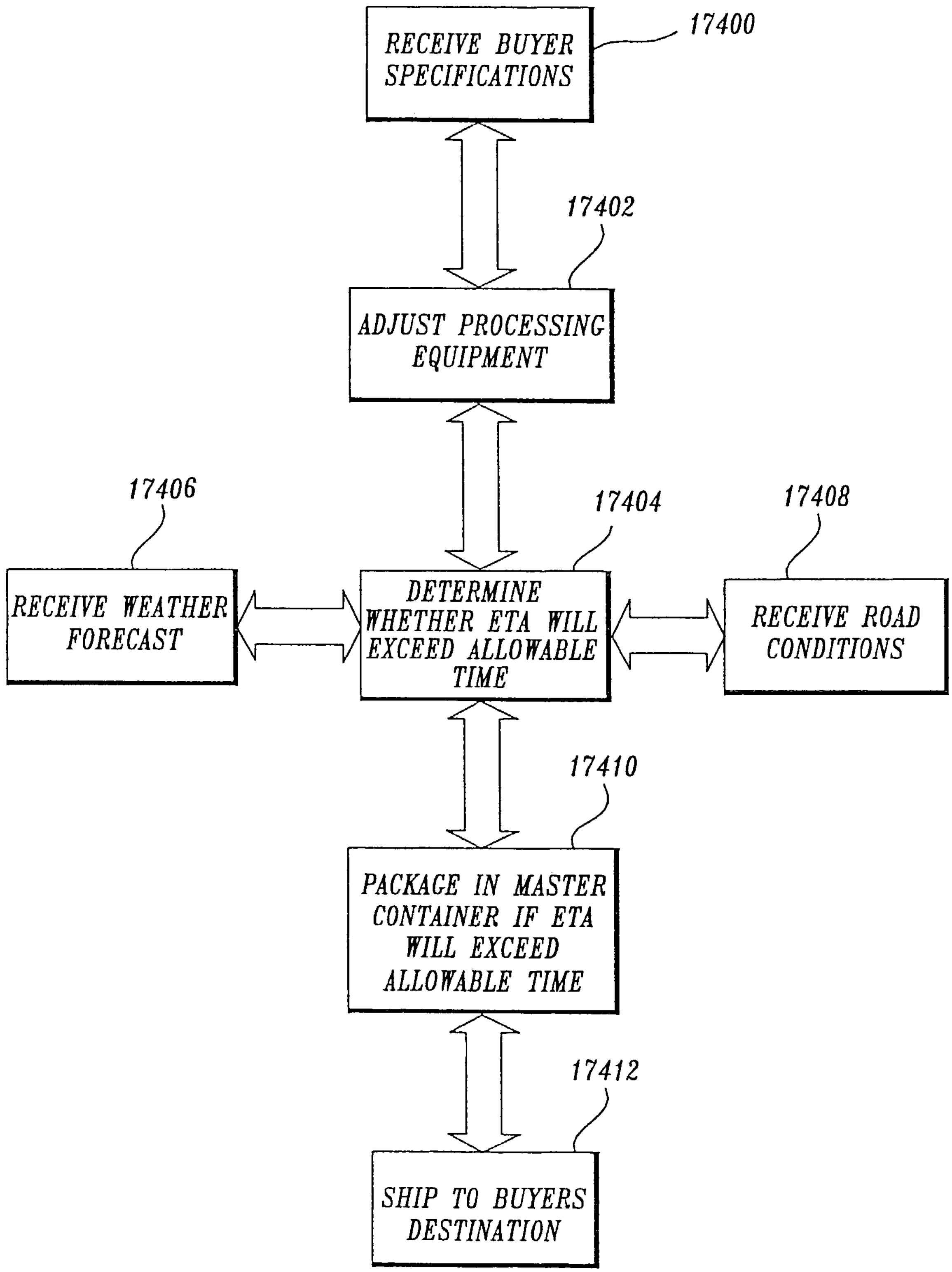
Figure 355:
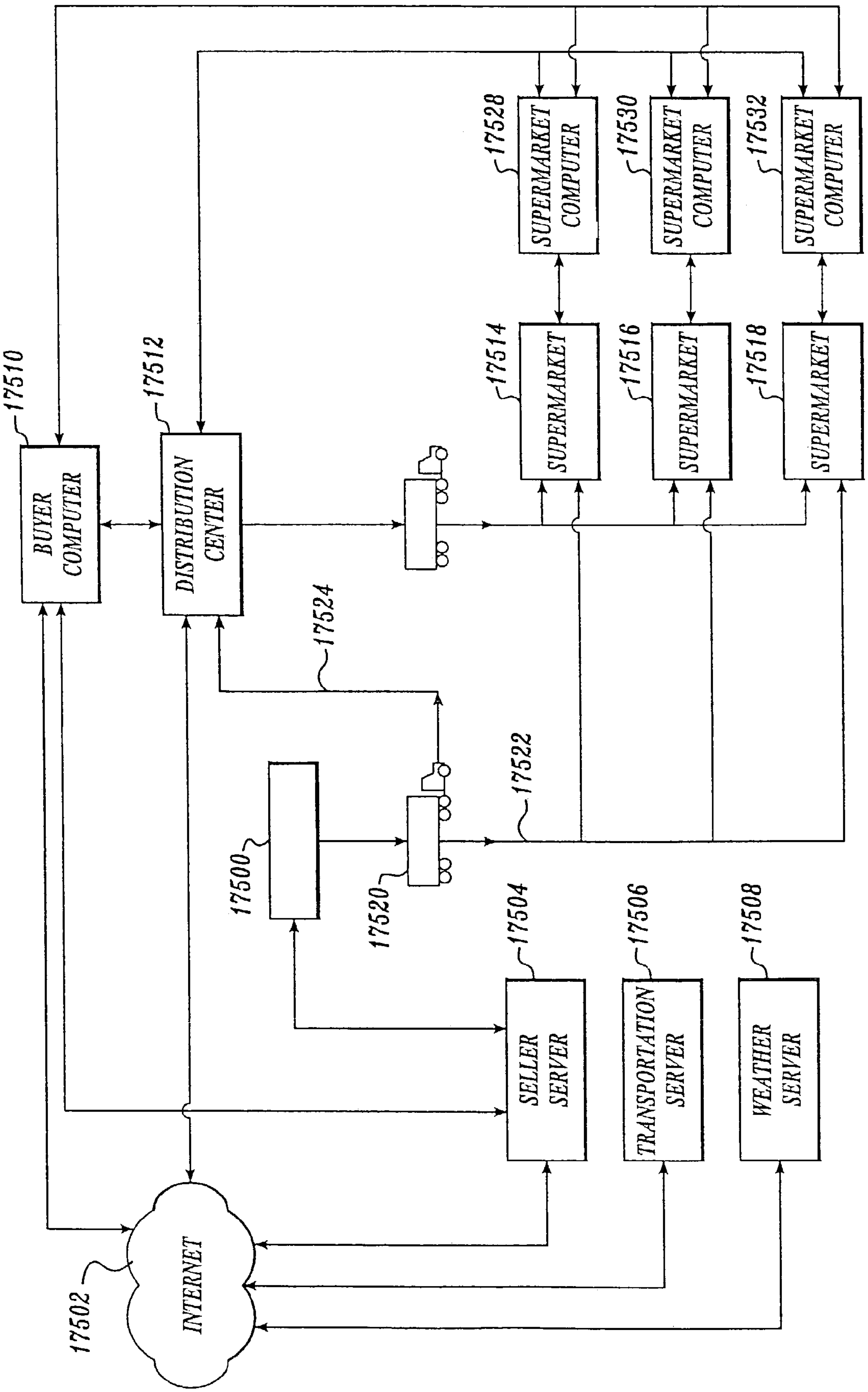
Figure 356:
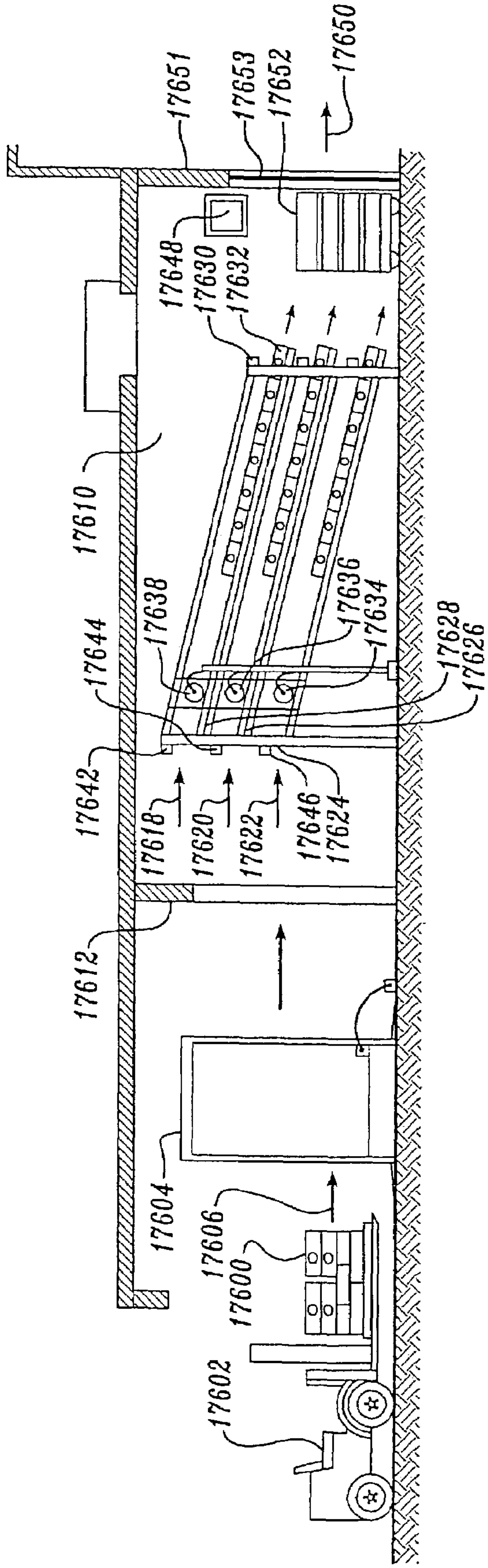
Figure 357:
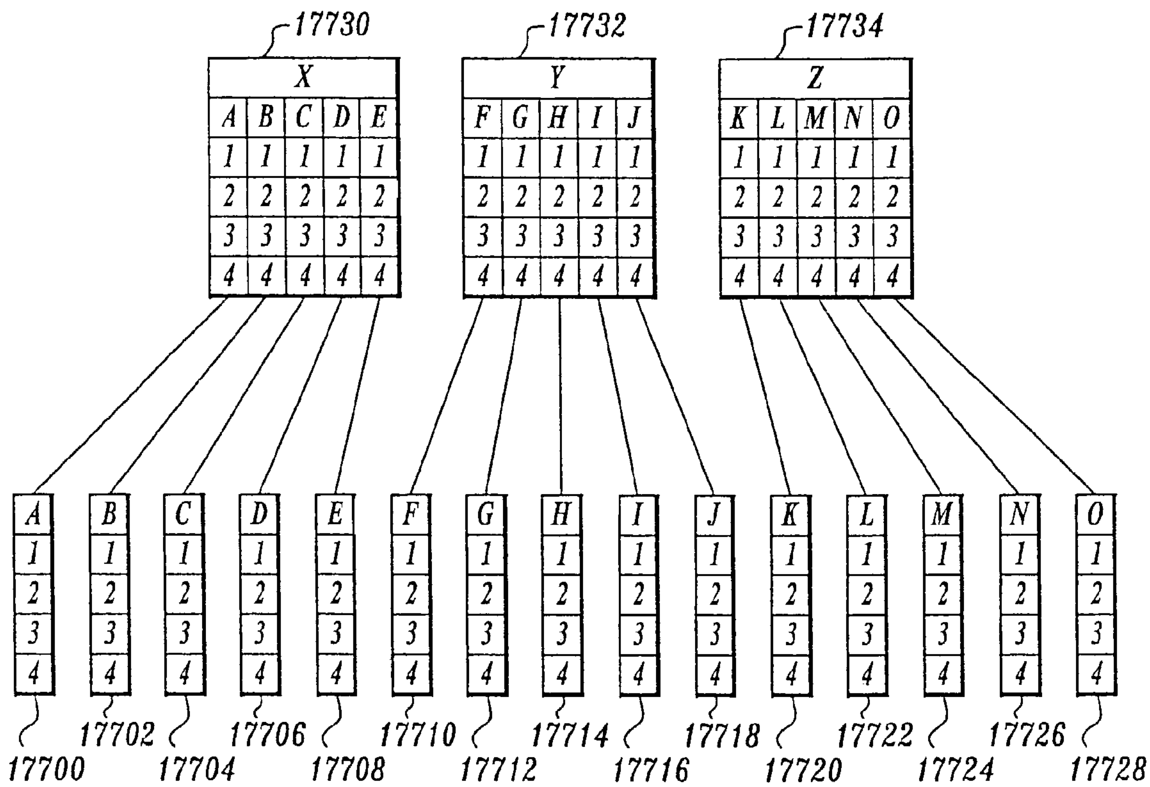
Figure 358:
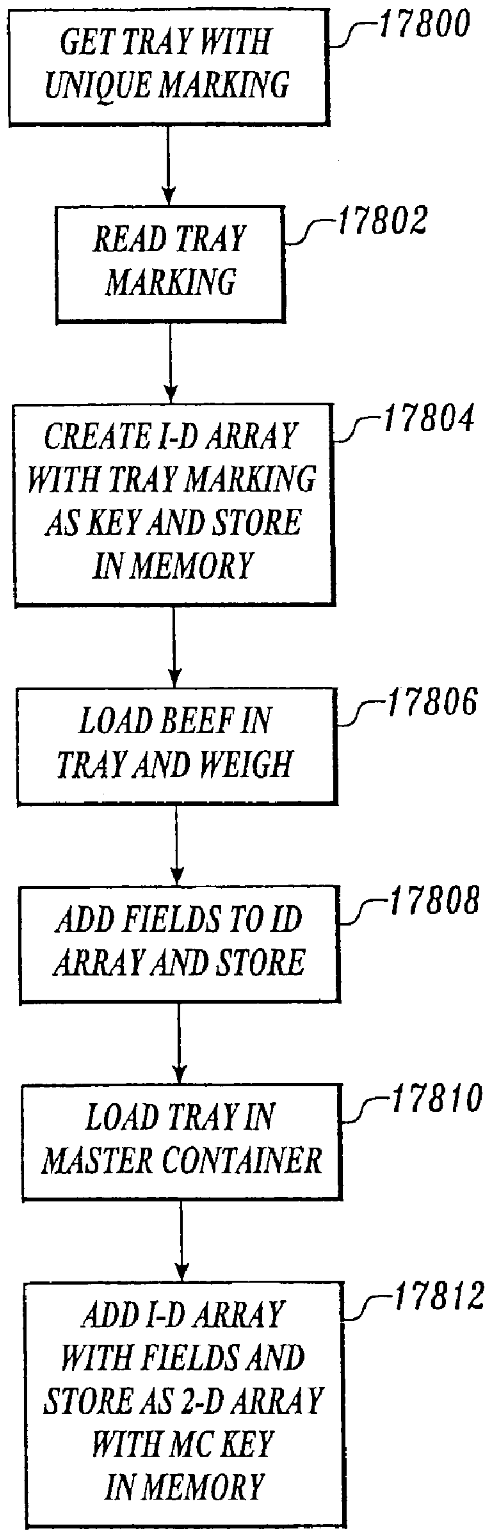
Figure 362:
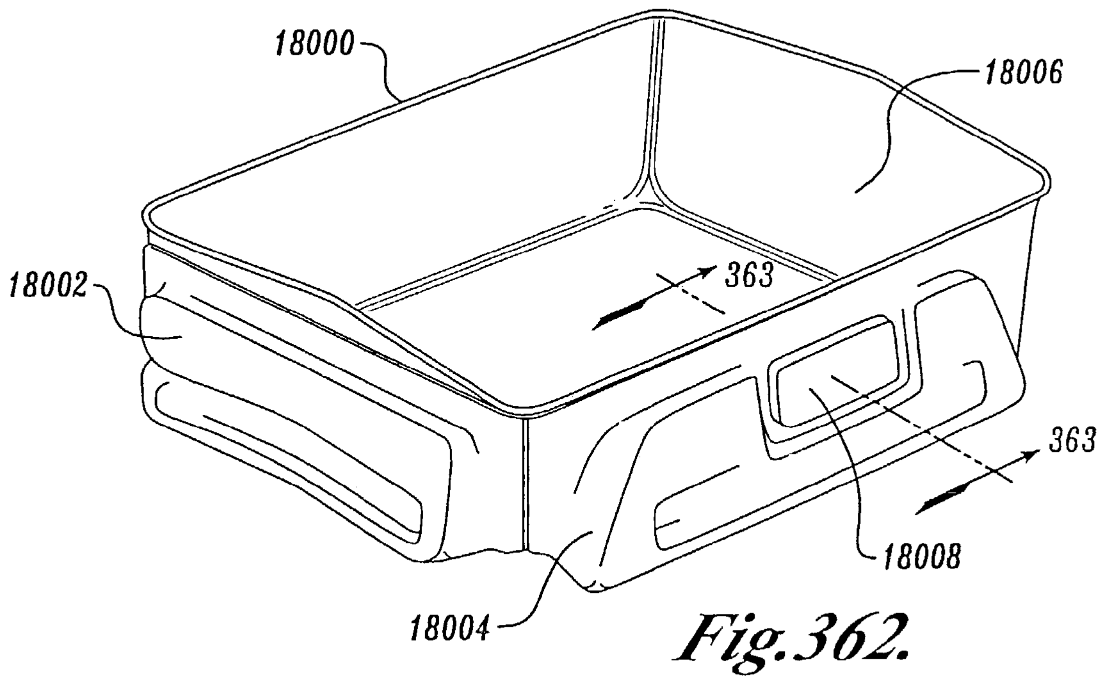
Figure 363:
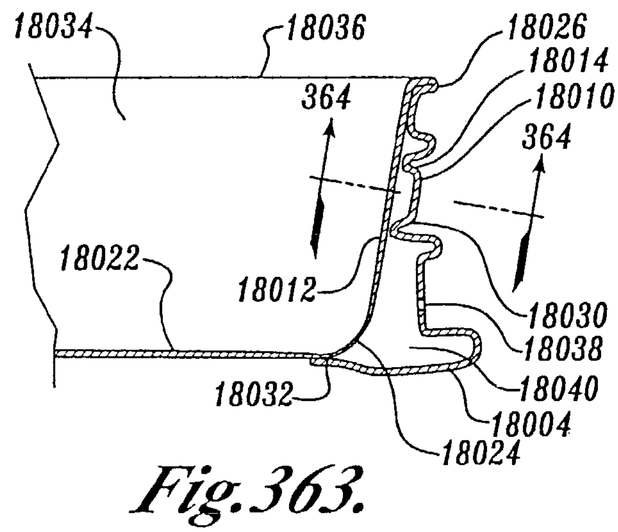
Figure 364:
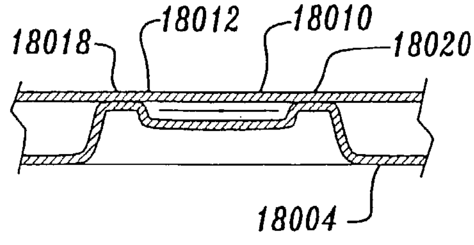
Figure 365:
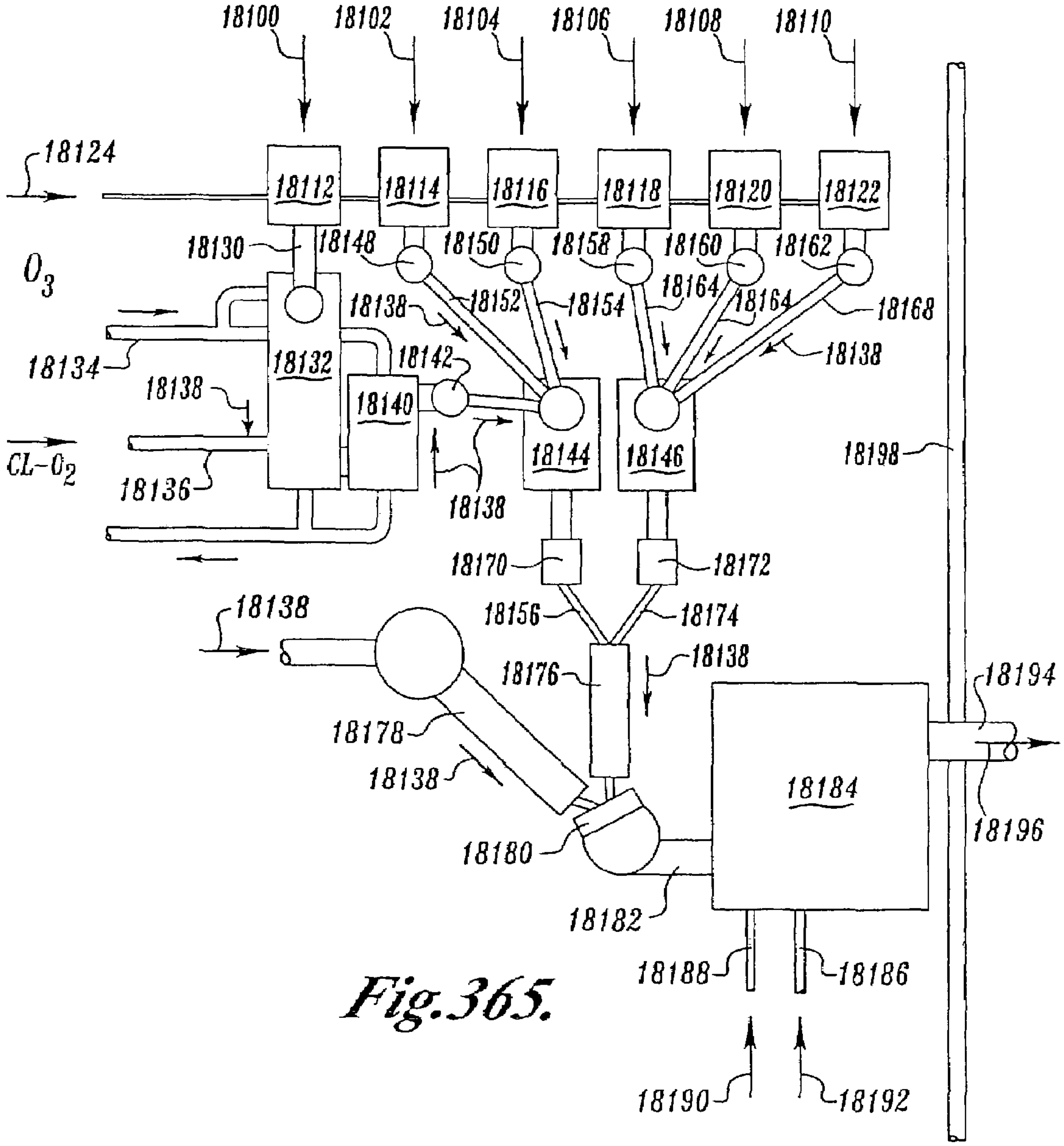
Figure 366:
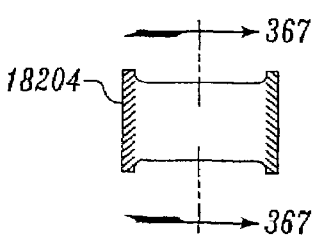
Figure 367:
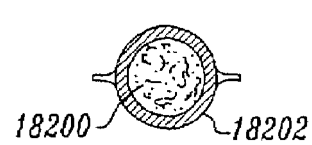
Figure 368:
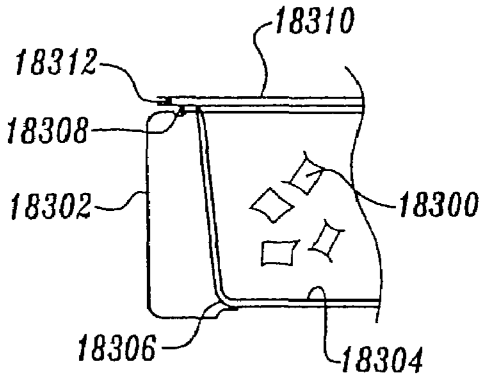
Figure 369:
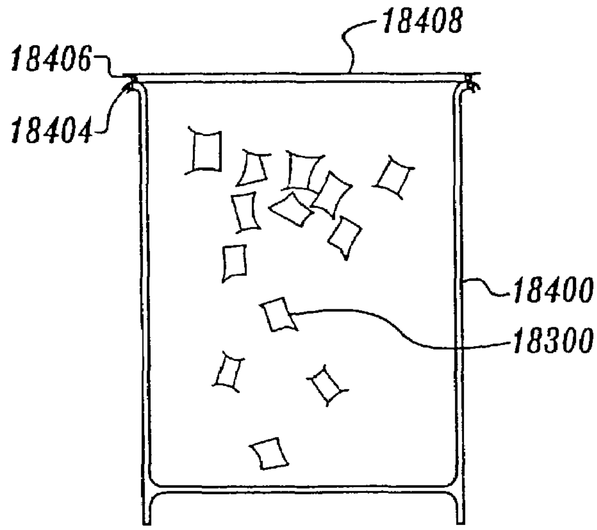
Figure 370:
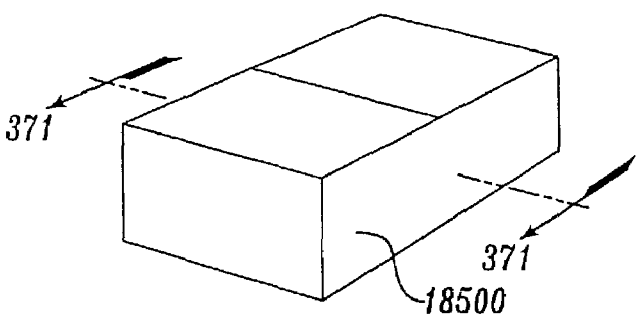
Figure 371:
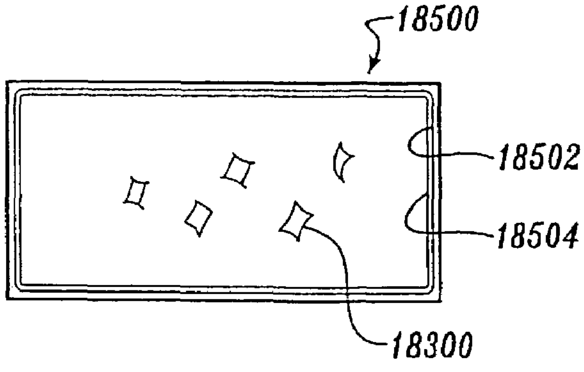
Figure 372:
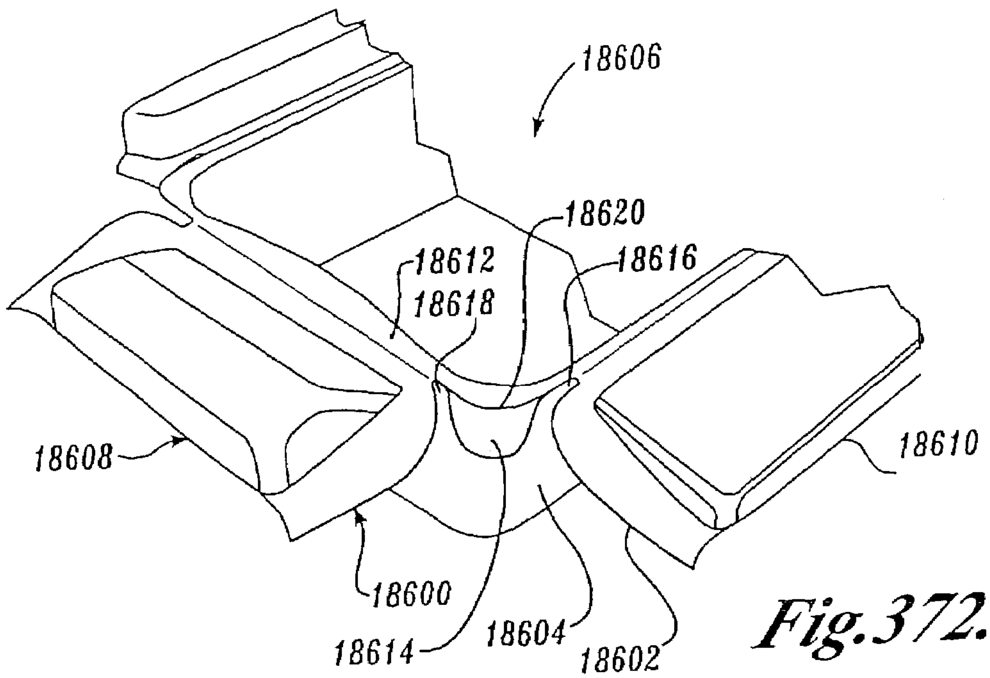
Figure 373:
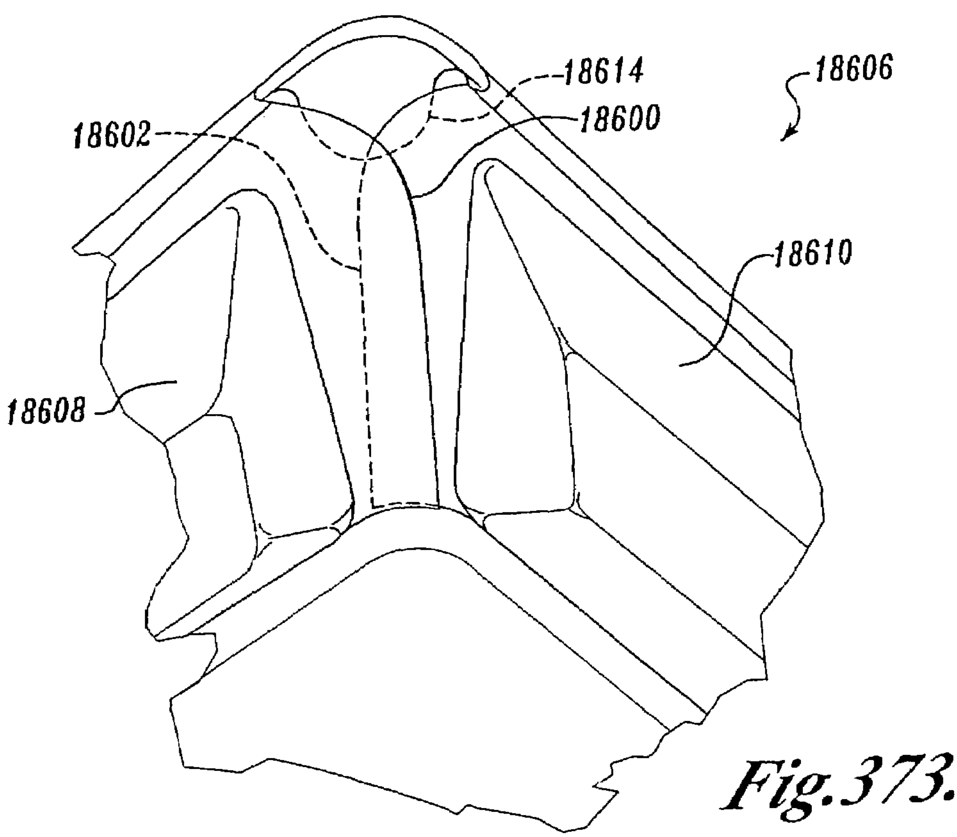

FIG. 134 shows a cross section illustration of a tray according to the present invention;

FIG. 135 shows a cross section illustration of a tray according to the present invention;

FIG. 136 shows a side illustration of a packaging apparatus according to the present invention;

FIG. 137 shows a side illustration of a tray according to the present invention;

FIG. 138 shows a side illustration of a packaging apparatus according to the present invention;

FIG. 139 shows a top illustration of a packaging apparatus according to the present invention;

FIG. 140 shows a top illustration of a label according to the present invention;

FIG. 141 shows a side illustration of a packaging apparatus according to the present invention;

FIG. 142 shows a side illustration of a packaging apparatus according to the present invention;

FIG. 143 shows a cross section illustration of a tray according to the present invention;

FIG. 144 shows a cross section illustration of a tray according to the present invention;

FIG. 145 shows a top illustration of a packaging conduit according to the present invention;

FIG. 146 shows a cross section illustration of a packaging conduit according to the present invention;

FIG. 147 shows a cross section illustration of a packaging conduit according to the present invention;

FIG. 148 shows a cross section illustration of a packaging conduit according to the present invention;

FIG. 149 shows a cross section illustration of a packaging conduit portion according to the present invention;

FIG. 150 shows a cross section illustration of a packaging conduit according to the present invention;

FIG. 151 shows a cross section illustration of a tray portion according to the present invention;

FIG. 152 shows a cross section illustration of a packaging conduit according to the present invention;

FIG. 153 shows a cross section illustration of a packaging conduit according to the present invention;

FIG. 154 shows a top cross section illustration of a packaging conduit according to the present invention;

FIG. 155 shows a cross section illustration of a vacuum chamber according to the present invention;

FIG. 156 shows a cross section illustration of a vacuum chamber portion according to the present invention;

FIG. 157 shows a cross section illustration of a vacuum chamber according to the present invention;

FIG. 158 shows a cross section illustration of a tray according to the present invention;

FIG. 159 shows a cross section illustration of a tray portion according to the present invention;

FIG. 160 shows a cross section illustration of a vacuum chamber according to the present invention;

FIG. 161 shows a cross section illustration of a composite web apparatus according to the present invention;

FIG. 162 shows a cross section illustration of a packaging apparatus according to the present invention;

FIG. 163 shows a cross section illustration of a tray according to the present invention;

FIG. 164 shows a cross section illustration of a sealing plate according to the present invention;

FIG. 165 shows a top illustration of a sealing plate according to the present invention;

FIG. 166 shows a top illustration of a sealing plate according to the present invention;

FIG. 167 shows a cross section illustration of a sealing plate according to the present invention;

FIG. 168 shows a cross section illustration of a tray according to the present invention;

FIG. 169 shows a cross section illustration of a tray and sealing plate according to the present invention;

FIG. 170 shows a top illustration of a sealing plate according to the present invention;

FIG. 171 shows an isometric illustration of a tray according to the present invention;

FIG. 172 shows a top illustration of a web portion according to the present invention;

FIG. 173 shows an isometric illustration of a web tube according to the present invention;

FIG. 174 shows an isometric illustration of an over-wrap tray according to the present invention;

FIG. 175 shows a side illustration of a web stretching apparatus according to the present invention;

FIG. 176 shows a side illustration of a web stretching apparatus according to the present invention;

FIG. 177 shows a side illustration of a web stretching apparatus according to the present invention;

FIG. 178 shows a side illustration of a web stretching apparatus according to the present invention;

FIG. 179 shows a side illustration of a web stretching apparatus according to the present invention;

FIG. 180 shows a side illustration of a web stretching apparatus according to the present invention;

FIG. 181 shows a side illustration of a web stretching apparatus according to the present invention;

FIG. 182 shows a side illustration of a web stretching apparatus according to the present invention;

FIG. 183 shows a cross section illustration of a conduit tray flap folding and bonding apparatus according to the present invention;

FIG. 184 shows a top illustration of a conduit tray flap folding and bonding apparatus according to the present invention;

FIG. 185 shows a side illustration of a conduit tray flap folding and bonding apparatus according to the present invention;

FIG. 186 shows a cross section illustration of a conduit tray flap folding and bonding apparatus according to the present invention;

FIG. 187 shows a cross section illustration of a tray portion according to the present invention;

FIG. 188 shows a cross section illustration of a tray portion according to the present invention;

FIG. 189 shows a cross section illustration of a tray portion according to the present invention;

FIG. 190 shows a side illustration of an applicator apparatus according to the present invention;

FIG. 191 shows a cross section illustration of an applicator apparatus portion according to the present invention;

FIG. 192 shows a cross section illustration of an applicator apparatus portion according to the present invention;

FIG. 193 shows a side illustration of an applicator apparatus according to the present invention;

FIG. 194 shows a side illustration of a web according to the present invention;

FIG. 195 shows a top illustration of a web according to the present invention;

FIG. 196 shows a cross section illustration of a web according to the present invention;

FIG. 197 shows a cross section illustration of a web according to the present invention;

FIG. 198 shows a cross section illustration of foam cells according to the present invention;

FIG. 199 shows a cross section illustration of foam cells according to the present invention;

FIG. 200 shows a cross section illustration of a web according to the present invention;

FIG. 201 shows a cross section illustration of foam cells according to the present invention;

FIG. 202 shows a cross section illustration of foam cells according to the present invention;

FIG. 203 shows a graphical illustration of foam cells according to the present invention;

FIG. 204 shows a cross section illustration of foam cells according to the present invention;

FIG. 205 shows a top illustration of a gas exchange apparatus according to the present invention;

FIG. 206 shows a cross section illustration of gas exchange apparatus according to the present invention;

FIG. 207 shows an isometric illustration of gas exchange apparatus according to the present invention;

FIG. 208 shows a cross section illustration of a thermoforming oven according to the present invention;

FIG. 209 shows a cross section illustration of gas exchange apparatus according to the present invention;

FIG. 210 shows an isometric illustration of gas exchange apparatus according to the present invention;

FIG. 211 shows a cross section illustration of gas exchange apparatus according to the present invention;

FIG. 212 shows a side illustration of gas exchange apparatus according to the present invention;

FIG. 213 shows a side illustration of gas exchange apparatus according to the present invention;

FIG. 214 shows a top illustration of tray forming apparatus according to the present invention;

FIG. 215 shows a top illustration of tray forming apparatus according to the present invention;

FIG. 216 shows an isometric illustration of gas exchange apparatus according to the present invention;

FIG. 217 shows an isometric illustration of gas exchange apparatus according to the present invention;

FIG. 218 shows a side illustration of a conduit gas exchange apparatus according to the present invention;

FIG. 219 shows a cross section illustration of webs according to the present invention;

FIG. 220 shows a cross section illustration of gas exchange apparatus according to the present invention;

FIG. 221 shows a cross section illustration of gas exchange apparatus according to the present invention;

FIG. 222 shows an isometric illustration of a tray portion according to the present invention;

FIG. 223 shows a cross section illustration of a tray portion according to the present invention;

FIG. 224 shows a cross section illustration of a tray portion according to the present invention;

FIG. 225 shows a side illustration of tray forming apparatus according to the present invention;

FIG. 226 shows a side illustration of tray forming apparatus according to the present invention;

FIG. 227 shows a cross section illustration of a tray portion according to the present invention;

FIG. 228 shows a side illustration of aperture forming apparatus according to the present invention;

FIG. 229 shows a cross section illustration of tray forming apparatus according to the present invention;

FIG. 230 shows a cross section illustration of a tray portion according to the present invention;

FIG. 231 shows a cross section illustration of a web according to the present invention;

FIG. 232 shows a cross section illustration of a web according to the present invention;

FIG. 233 shows a cross section illustration of a web according to the present invention;

FIG. 234 shows a cross section illustration of a web according to the present invention;

FIG. 235 shows a cross section illustration of a web according to the present invention;

FIG. 236 shows a cross section illustration of a tray portion according to the present invention;

FIG. 237 shows a cross section illustration of a tray according to the present invention;

FIG. 238 shows a cross section illustration of a web according to the present invention;

FIG. 239 shows a cross section illustration of a web according to the present invention;

FIG. 240 shows an isometric illustration of a master container according to the present invention;

FIG. 241A shows a cross section illustration of a master container according to the present invention;

FIG. 241B shows an isometric illustration of a master container according to the present invention;

FIG. 242 shows an isometric illustration of a carton according to the present invention;

FIG. 243 shows a cross section illustration of a master container according to the present invention;

FIG. 244 shows a cross section illustration of a master container portion according to the present invention;

FIG. 245 shows a cross section illustration of a master container portion according to the present invention;

FIG. 246 shows a cross section illustration of a packaging apparatus according to the present invention;

FIG. 247 shows a cross section illustration of a packaging apparatus portion according to the present invention;

FIG. 248 shows an isometric illustration of a packaging apparatus portion according to the present invention;

FIG. 249 shows a cross section illustration of a vacuum chamber according to the present invention;

FIG. 250 shows a side illustration of a packaging apparatus according to the present invention;

FIG. 251 shows a cross section illustration of a packaging apparatus according to the present invention;

FIG. 252 shows a cross section illustration of a packaging apparatus according to the present invention;

FIG. 253 shows a cross section illustration of a packaging apparatus portion according to the present invention;

FIG. 254 shows a cross section illustration of a tray according to the present invention;

FIG. 255 shows a cross section illustration of a soaker pad according to the present invention;

FIG. 256 shows a top illustration of a soaker pad according to the present invention;

FIG. 257 shows a side illustration of a web according to the present invention;

FIG. 258 shows a cross section illustration of a tray according to the present invention;

FIG. 259 shows a side illustration of a soaker pad apparatus according to the present invention;

FIG. 260 shows a top illustration of a soaker pad apparatus according to the present invention;

FIG. 261 shows a cross section illustration of a soaker pad portion according to the present invention;

FIG. 262 shows a side illustration of a soaker pad apparatus portion according to the present invention;

FIG. 263 shows a side illustration of a grinder, conditioning apparatus according to the present invention;

FIG. 264 shows a cross section illustration of a conduit grinder, blender, and pump apparatus according to the present invention;

FIG. 265 shows a cross section illustration of a conduit grinder, blender, and pump apparatus according to the present invention;

FIG. 266 shows a cross section illustration of a conduit grinder, blender, and pump apparatus portion according to the present invention;

FIG. 267 shows a cross section illustration of a conduit grinder, blender, and pump apparatus portion according to the present invention;

FIG. 268 shows a cross section illustration of a conduit grinder, blender, and pump apparatus portion according to the present invention;

FIG. 269 shows a side illustration of a conduit grinder, blender, and pump apparatus portion according to the present invention;

FIG. 270 shows a cross section illustration of a conduit grinder, blender, and pump apparatus portion according to the present invention;

FIG. 271 shows a cross section illustration of a conduit blender and pump apparatus according to the present invention;

FIG. 272 shows a cross section illustration of a conduit grinder, blender, and pump apparatus portion according to the present invention;

FIG. 273 shows a side illustration of a conduit measuring apparatus according to the present invention;

FIG. 274 shows a cross section illustration of a conduit grinder, blender, and pump apparatus according to the present invention;

FIG. 275 shows a top illustration of a conduit confluence according to the present invention;

FIG. 276 shows a cross section illustration of a conduit grinder, blender, and pump according to the present invention;

FIG. 277 shows a cross section illustration of a conduit grinder, blender, and pump apparatus according to the present invention;

FIG. 278 shows a cross section illustration of a conduit blender according to the present invention;

FIG. 279 shows a cross section illustration of a conduit blender and pump apparatus according to the present invention;

FIG. 280 shows a cross section illustration of a conduit blender and pump apparatus according to the present invention;

FIG. 281 shows a cross section illustration of a conduit blender and pump apparatus according to the present invention;

FIG. 282 shows a cross section of a illustration of a conduit blender and pump apparatus portion according to the present invention;

FIG. 283 shows a side illustration of a conduit blender and pump apparatus according to the present invention;

FIG. 284 shows a side illustration of a conduit blender and pump apparatus according to the present invention;

FIG. 285 shows a cross section illustration of a conduit blender and pump apparatus according to the present invention;

FIG. 286 shows a cross section illustration of a conduit blender and pump apparatus according to the present invention;

FIG. 287 shows a isometric illustration of a conduit blender and pump apparatus according to the present invention;

FIG. 288 shows a cross section illustration of a conduit blender and pump apparatus according to the present invention;

FIG. 289 shows a cross section illustration of a measuring apparatus according to the present invention;

FIG. 290 shows an isometric illustration of a measuring apparatus according to the present invention;

FIG. 291 shows a cross section illustration of a measuring apparatus portion according to the present invention;

FIG. 292 shows a side illustration of a decontamination apparatus according to the present invention;

FIG. 293 shows a cross section illustration of a decontamination apparatus according to the present invention;

FIG. 294 shows a cross section illustration of a decontamination apparatus according to the present invention;

FIG. 295 shows a cross section illustration of a decontamination apparatus according to the present invention;

FIG. 296 shows a cross section illustration of a decontamination apparatus according to the present invention;

FIG. 297 shows a cross section illustration of a decontamination apparatus according to the present invention;

FIG. 298 shows a cross section illustration of a decontamination apparatus according to the present invention;

FIG. 299 shows a cross section illustration of a decontamination apparatus according to the present invention;

FIG. 300 shows a side illustration of a slicer apparatus according to the present invention;, FIG. 301 shows a cross section illustration of a slicer apparatus according to the present invention;

FIG. 302 shows a cross section illustration of a slicer apparatus portion according to the present invention;

FIG. 303 shows a cross section illustration of a slicer apparatus portion according to the present invention;

FIG. 304 shows a cross section illustration of a loading apparatus according to the present invention;

FIG. 305 shows a cross section illustration of a cooking apparatus according to the present invention;

FIG. 306 shows a cross section illustration of a shaping apparatus according to the present invention;

FIG. 307 shows a side illustration of a shaping apparatus portion according to the present invention;

FIG. 308 shows a side illustration of a shaping apparatus portion according to the present invention;

FIG. 309 shows a cross section illustration of a shaping apparatus portion according to the present invention;

FIG. 310 shows a cross section illustration of a shaping apparatus portion according to the present invention;

FIG. 311 shows a cross section illustration of a shaping apparatus portion according to the present invention;

FIG. 312 shows a cross section illustration of a shaping apparatus portion according to the present invention;

FIG. 313 shows a cross section illustration of a shaping apparatus portion according to the present invention;

FIG. 314 shows an isometric illustration of a shaping apparatus according to the present invention;

FIG. 315 shows a cross section illustration of a shaping apparatus according to the present invention;

FIG. 316 shows an isometric illustration of a shaping apparatus according to the present invention;

FIG. 317 shows a cross section illustration of a shaping apparatus portion according to the present invention;

FIG. 318 shows a cross section of a shaping apparatus according to the present invention;

FIG. 319 shows a top illustration of a continuous blending conduit according to the present invention;

FIG. 320 shows a cross section illustration of a continuous blending conduit portion according to the present invention;

FIG. 321 shows a top illustration of a continuous blending conduit portion according to the present invention;

FIG. 322 shows a top illustration of a continues blending and packaging conduit according to the present invention;

FIG. 323 shows a top illustration of a packaging conduit according to the present invention;

FIG. 324 shows a side illustration of a packaging conduit portion according to the present invention;

FIG. 325 shows an isometric illustration of a packaging conduit portion according to the present invention;

FIG. 326 shows a top illustration of a continuous blending, loading and packaging conduit according to the present invention;

FIG. 327 shows a top illustration of a continuous blending conduit according to the present invention;

FIG. 328 shows a top illustration of a tray forming, loading and packaging conduit according to the present invention;

FIG. 329 shows a top illustration of a tray forming conduit according to the present invention;

FIG. 330 shows a top illustration of a continuous blending, loading and packaging conduit according to the present invention;

FIG. 331 shows a top illustration of a continuous blending, loading and packaging conduit according to the present invention;

FIG. 332 shows a top illustration of a continuous blending, loading and packaging conduit according to the present invention;

FIG. 333 shows an enlarged illustration of the apparatus of FIG. 332:

FIG. 334 shows a top illustration of a continuous blending, loading and packaging conduit according to the present invention;

FIG. 335 shows a top illustration of a loading and packaging conduit according to the present invention;

FIG. 336 shows a cross section illustration of a loading and packaging conduit portion according to the present invention;

FIG. 337 shows a top illustration of a loading and packaging conduit according to the present invention;

FIG. 338 shows a top illustration of a continuous blending conduit according to the present invention;

FIG. 339 shows a top illustration of a continuous blending, loading and packaging conduit according to the present invention;

FIG. 340 shows a flow chart illustration of an information system according to the present invention;

FIG. 341 shows a top section illustration of an information system according to the present invention;

FIG. 342 shows an isometric illustration of an information system portion according to the present invention;

FIG. 343 shows a side illustration of an information system portion according to the present invention;

FIG. 344 shows a top illustration of an information system portion according to the present invention;

FIG. 345 shows a side illustration of an information system portion according to the present invention;

FIG. 346 shows a side illustration of an information system portion according to the present invention;

FIG. 347 shows a cross section illustration of an information system portion apparatus portion according to the present invention;

FIG. 348 shows a graphical illustration of a portion of the Internet;

FIG. 349 shows a graphical illustration of a controller according to the present invention;

FIG. 350 shows a graphical illustration of a controller portion according to the present invention;

FIG. 351 shows a graphical illustration of a controller portion according to the present invention;

FIG. 352 shows a graphical illustration of a controller portion according to the present invention;

FIG. 353 shows a graphical illustration of a controller portion according to the present invention;

FIG. 354 shows a flow chart illustration of a controller according to the present invention;

FIG. 355 shows a graphical illustration of a controller according to the present invention;

FIG. 356 shows a side illustration of a controller portion according to the present invention;

FIG. 357 shows a graphical illustration of a controller portion according to the present invention;

FIG. 358 shows a flow chart illustration of a controller according to the present invention;

FIG. 359 shows an isometric illustration of a controller portion according to the present invention;

FIG. 360 shows a top illustration of a controller portion according to the present invention;

FIG. 361 shows a side illustration of a controller portion according to the present invention;

FIG. 362 shows an isometric illustration of a controller portion according to the present invention;

FIG. 363 shows a cross section illustration of a controller portion according to the present invention;

FIG. 364 shows a cross section illustration of a controller portion according to the present invention;

FIG. 365 shows a top illustration of conduit pet food system according to the present invention;

FIG. 366 shows a top illustration of pet food according to the present invention;

FIG. 367 shows a cross section illustration of pet food according to the present invention;

FIG. 368 shows a cross section illustration of a pet food container according to the present invention;

FIG. 369 shows a cross section illustration of a pet food container according to the present invention;

FIG. 370 shows an isometric illustration of a pet food container according to the present invention;

FIG. 371 shows a cross section illustration of a pet food container according to the present invention;

FIG. 372 shows an isometric illustration of a tray portion according to the present invention;

FIG. 373 shows an isometric illustration of a tray portion according to the present invention.

Figure 374:
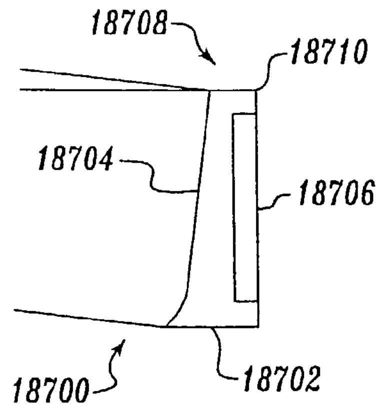
Figure 375:
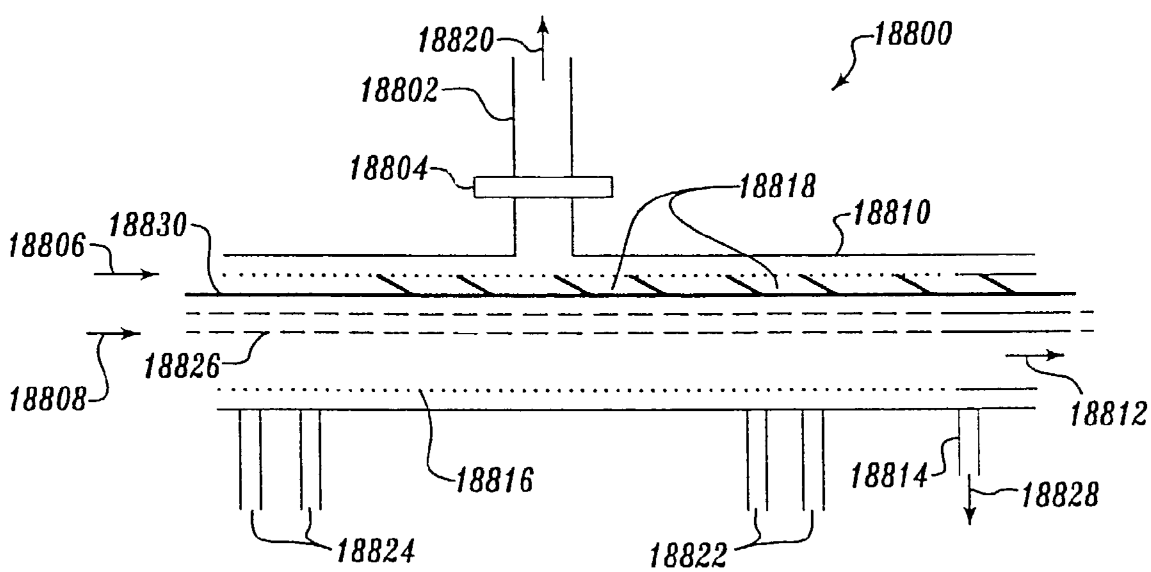
Figure 376:
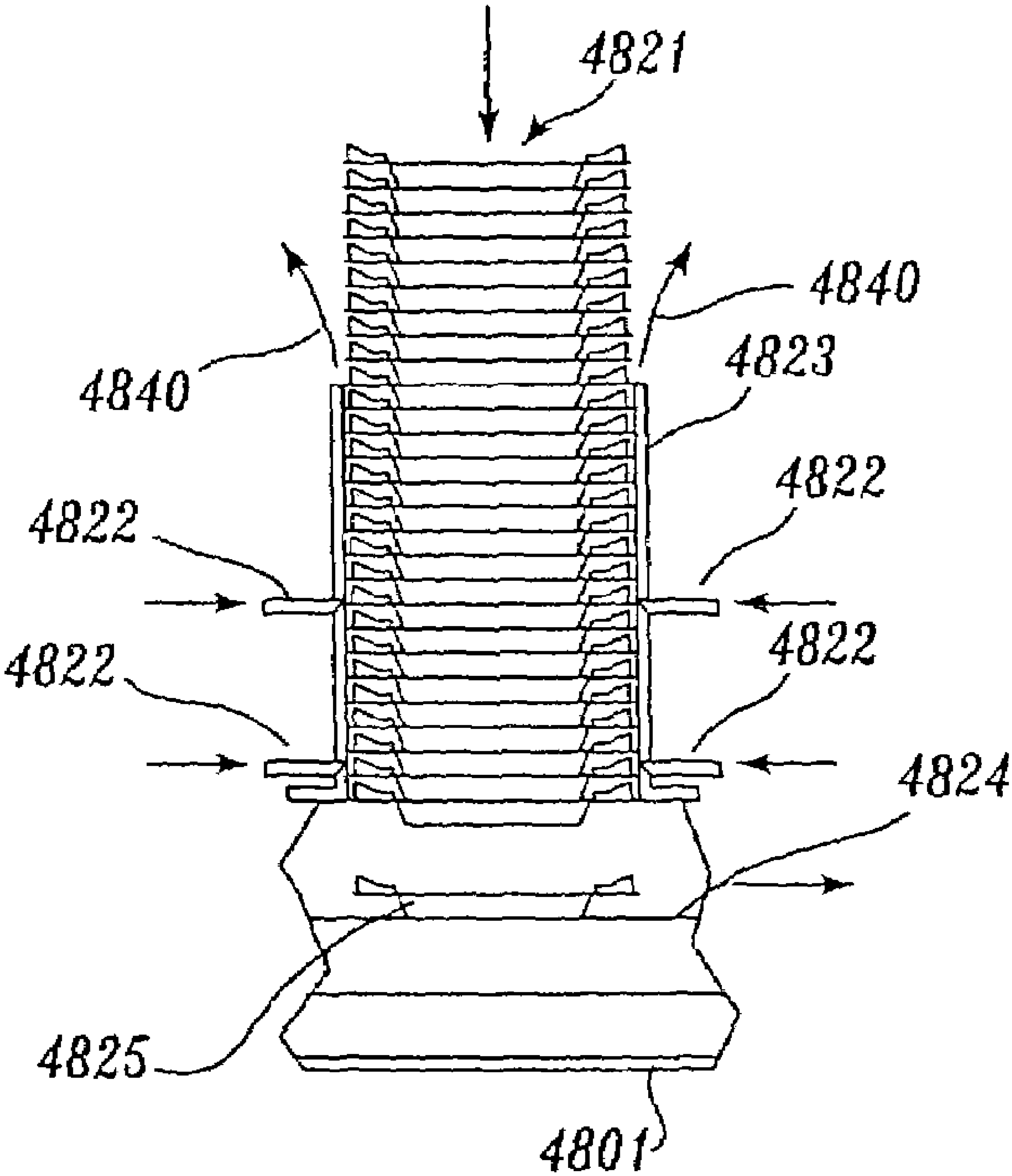

FIG. 374 shows a cross-section illustration of a tray portion according to the present invention;

FIG. 375 shows a cross section illustration of a conduit decontamination apparatus according to the present invention; and FIG. 376 shows a cross section illustration of a conduit packaging portion according to the present invention.

DETAILED DESCRIPTION OF THE PREFERRED EMBODIMENT

1. Definitions

As used herein, terms take the following meaning, unless otherwise indicated.

The term “case ready” refers to retail packaged fresh meats (that were typically formerly prepared at the supermarket) that have been packaged ready for retail sale from the meat case at a place of production remote from the supermarket.

The term “conduit” refers to a substantially enclosed space or volume regardless whether it extends to one or more vessels or equipment. A conduit may include the housings and casings of vessels, equipment, devices and any of their interconnecting portions. “Conduit” may be applied to a series of vessels, equipment and connections and/or it can be applied to any portion thereof, referring sometimes only to a single vessel or connection. In some instances, conduits are devoid of substantial amounts of oxygen, unless otherwise indicated.

The term “high oxygen modified atmosphere” refers to a blend of gases that includes some or all of the naturally occurring atmospheric gases but in proportions that are different to air and including a high level of oxygen which may be greater than 40%. Such an example would be a gas comprising 80% oxygen and 20% carbon dioxide, however in virtually all applications a residual quantity of nitrogen remains in the sealed “high oxygen modified atmosphere” package.

The term “low oxygen” or “no oxygen” modified atmosphere” refers to a blend of gases that includes some or all of the naturally occurring atmospheric gases (except oxygen) but in proportions that are different from air and include a low (or zero level of oxygen) which may be less than 300–500 parts per million.

The term “MAP” refers to modified atmosphere packaging.

The term “CAP” refers to controlled atmosphere packaging.

The term "Epsilon GMS-40" or "GMS-40" refers to an apparatus that can be used to measure the fat and/or lean content of pumpable ground meats. The GMS-40 is manufactured and supplied by Epsilon Industries, of Austin, Tex. Additional information is available at Web site: www.epsilon-gms.com.

The term "AVS-ET system" refers to a system that can be used to identify the composition of boneless meats. The system can identify quantities of fat, muscle/lean tissue, contaminants, bone, metal inclusions and other matter that is transferred, in a continuous stream, through a conduit and into and then away from the AVS-ET system. The system operates best when the continuous stream is exclusive of any voids such as pockets of air. The system is manufactured and supplied by Holmes Newman Associates, 4221 Fallsbrae Road, of Fallbrook, Calif. 92028.

The term "statiflo blending devices" refers to a continuous, static, and enclosed material blending device that can introduce gases, such as $CO_2$, into the blended material. STATIFLO is a registered trademark of Statiflo International, The Crown Center, Bond Street, Macclesfield, Cheshire SK116QS, UK. Information is available at Web site: sales@statiflo.co.uk.

The term "blending devices" refers to a continuous, static, and enclosed material blending device that can be used to continuously blend such perishable goods as ground meats that comprise substantially two components of fat and lean meat and may also be used to introduce gases, such as $CO_2$, into the blended materials.

The term "shelf life" refers to the period of time between the date of retail packaging of perishable goods (that are slowly deteriorating) of acceptable quality and a subsequent point in time or date, prior to the perishable goods having deteriorated to an unacceptable condition.

The term "PP" refers to polypropylene.

The term "EPS" refers to expanded polystyrene.

The term "pPVC" refers to plasticized polyvinylchloride.

The term "PET," polyester or "APET" refers to amorphous polyethylene terephthalate.

The term "heat activated adhesives (or coating)" refers to adhesives that become active and capable of bonding substances or webs together when heated to a suitable temperature, when neither said adhesives nor said substances will bond unaided at ambient temperature.

The term "OTR" refers to oxygen transmission rate.

The term "perishable goods" or "goods" refers to any perishable foods such as sliced beef, other fresh meats, ground meats, poultry pieces, fish, lamb, and any parts of animals thereof which are not normally fit for human consumption, but which can be fit for animal consumption, etc.

The term "liquids and oils" refers to water, liquids, blood, purge, liquid animal fats and oils and the like.

The term "master container" generally refers to a substantially gas impermeable barrier container that can be filled with finished packages (such as retail packages), evacuated of substantially all atmospheric air, and filled with any suitable gas. However, said "master container" may also be gas permeable if so desired.

The terms "suitable substance", "suitable gas" or "suitable gases" refer to any gas or blend of gases, provided at any pressure (suitable pressure) such as 45% oxygen and 55% carbon dioxide at ambient pressure or any other blend of gases. Such a gas, blend of gases agent or agents may include one or a combination of the following: oxygen, carbon dioxide, ozone, hydrogen, nitrogen, argon, krypton, neon, helium, xenon, hydrogen peroxide, potassium permanganate, chlorine dioxide, fluorine, bromine, iodine and/or any other suitable substances. A suitable gas may include a blend of carbon dioxide and nitrogen and oxygen with residual atmospheric gases in any relative proportions. Examples are provided, but are not restricted to any of the following:

A blend of gases including argon, carbon dioxide, nitrogen and a quantity of oxygen that does not exceed 5% and is not less than 5 PPM (parts per million).

Air that has been filtered to remove substantially all oxygen therefrom.

Carbon dioxide and nitrogen in any relative proportions.

Carbon dioxide and oxygen where oxygen does not exceed 5% and is not less than 5 PPM.

Carbon dioxide and a quantity of oxygen that does not exceed 5% and is not less than 5 PPM (parts per million).

Nitrogen and a quantity of oxygen that does not exceed 5% and is not less than 5 PPM (parts per million).

A blend of inert gases and a quantity of oxygen that does not exceed 5% and is not less than 5 PPM (parts per million).

A blend of pentane and nitrogen in any relative proportions and a quantity of oxygen that does not exceed 5% and is not less than 5 PPM (parts per million).

A blend of propane and nitrogen in any relative proportions and a quantity of oxygen that does not exceed 5% and is not less than 5 PPM (parts per million).

A blend of butane and nitrogen in any relative proportions and a quantity of oxygen that does not exceed 5% and is not less than 5 PPM (parts per million).

A blend of a CFC and nitrogen in any relative proportions and a quantity of oxygen that does not exceed 5% and is not less than 5 PPM (parts per million).

A blend of an HCFC and nitrogen in any relative proportions and a quantity of oxygen that does not exceed 5% and is not less than 5 PPM (parts per million).

A blend of methane and nitrogen in any relative proportions and a quantity of oxygen that does not exceed 5% and is not less than 5 PPM (parts per million).

A blend of hydrogen sulfide and nitrogen in any relative proportions and a quantity of oxygen that does not exceed 5% and is not less than 5 PPM (parts per million).

A blend of carbon monoxide and nitrogen in any relative proportions and a quantity of oxygen that does not exceed 5% and is not less than 5 PPM (parts per million).

A blend of sulfur dioxide and nitrogen in any relative proportions and a quantity of oxygen that does not exceed 5% and is not less than 5 PPM (parts per million).

A gas including about 100% carbon dioxide.

A substance or agent including one or more of the following: isoascorbic acid, ascorbic acid, citric acid, erythorbic acid, lactic acid, succinic acid or mixtures of salts thereof. Glycerol monolaurate, potassium sorbate, sodium sorbate, sodium iodoacetate, potassium acetate, iodoacetomide, potassium iodoacetate, sodium acetate or mixtures or acidic solutions thereof.

The term "suitable gas pressure" or "water pressure" refers to any pressure that is suitable for the application and may be controlled within any of the following pressure ranges, or any other suitable pressure:

Suitable gas pressure:

gas at a pressure of 1 PSI to 14 PSI.

gas at a pressure of up to 13 PSI.

gas at a pressure of 13 PSI to 50 PSI.

gas at a pressure of 50 PSI to 80 PSI.

gas at a pressure of 80 PSI to 120 PSI.

gas at a pressure of 120 PSI to 200 PSI.
gas at a pressure of 200 PSI to 500 PSI.
gas at a pressure above 500 PSI.
Suitable water pressure:
water at a pressure of 1 PSI to 14 PSI.
water at a pressure of up to 13 PSI.
water at a pressure of 13 PSI to 50 PSI.
water at a pressure of 50 PSI to 80 PSI.
water at a pressure of 80 PSI to 120 PSI.
water at a pressure of 120 PSI to 200 PSI.
water at a pressure of 200 PSI to 500 PSI.
water at a pressure above 500 PSI.

The term "suitable gas temperature" or "suitable water temperature" refers to any temperature that is suitable for the application and may be controlled within any suitable temperature ranges for any suitable period of time, or at any other suitable temperature. Suitable temperature also includes a temperature range which may be a pasteurizing temperature range such as maintaining a product such as a beef primal within a temperature range of not less than 138.5° F. to 140° F. and for a suitable period of time. The temperature range may be maintained at any suitable range such as between 160° F. to 161.50° F. or any other temperature range whatsoever.

Bond or Bonding refers to sealing or welding of two or more surfaces together by any suitable means such as with any suitable adhesive, RF welding, ultrasonic welding heat sealing, or any other suitable means.

Hermetic seal refers to a seal or bonding of two or more surfaces of any suitable material together by any suitable means to provide an enclosed space and wherein said enclosed space is rendered fully enclosed in such a manner that will substantially inhibit the passage or communication of any substance such as gas, air or liquids from within said enclosed space to and with the exterior of said enclosed space.

Pre-Form refers to a thermoformed or suitably fabricated packaging component that has been arranged with one or more hinged flaps that can be folded or bonded to produce a useful packaging tray or container for goods. Pre-forms may also comprise more than one component that are subsequently assembled together to provide one or more components but where the number of items remaining after assembly are less than the number of components from which the remaining items are produced.

"Valve" refers to any suitable valve to suit the particular needs of the disclosed application. Valves may be arranged to control the flow of gas, liquid, or solids such as powders and can be selected from manufacturers skilled in the arts of valve manufacturing of any particular valve from any suitable materials.

"CPU" refers to a central processing unit or any suitable computer processor suitable for the application such as are contained in most personal computers (PC).

"HHRCD" refers to a hand held remote controlling device such as a PALM PILOT®.

"Fat" content is a component of meat and may mean the measured fat content of a quantity of boneless meat harvested from any species of slaughtered animal such as beef.

"Meat" can mean any meat harvested from any species of slaughtered animal wherein the meat comprises several components but generally including water, fat, oils, and protein in relative quantities that are not precisely known at the time of harvesting and must be measured to determine the precise ratio of each component.

SANOVA is a trade mark of Alcide Corporation of Redmond, Wash.

Any suitable substance, gas, blend of gases, solution or agent may be substituted, included as an alternative or included with any suitable gas or blend of gases that has been specified for any use or application in this disclosure.

2. Introduction

Figure 1:
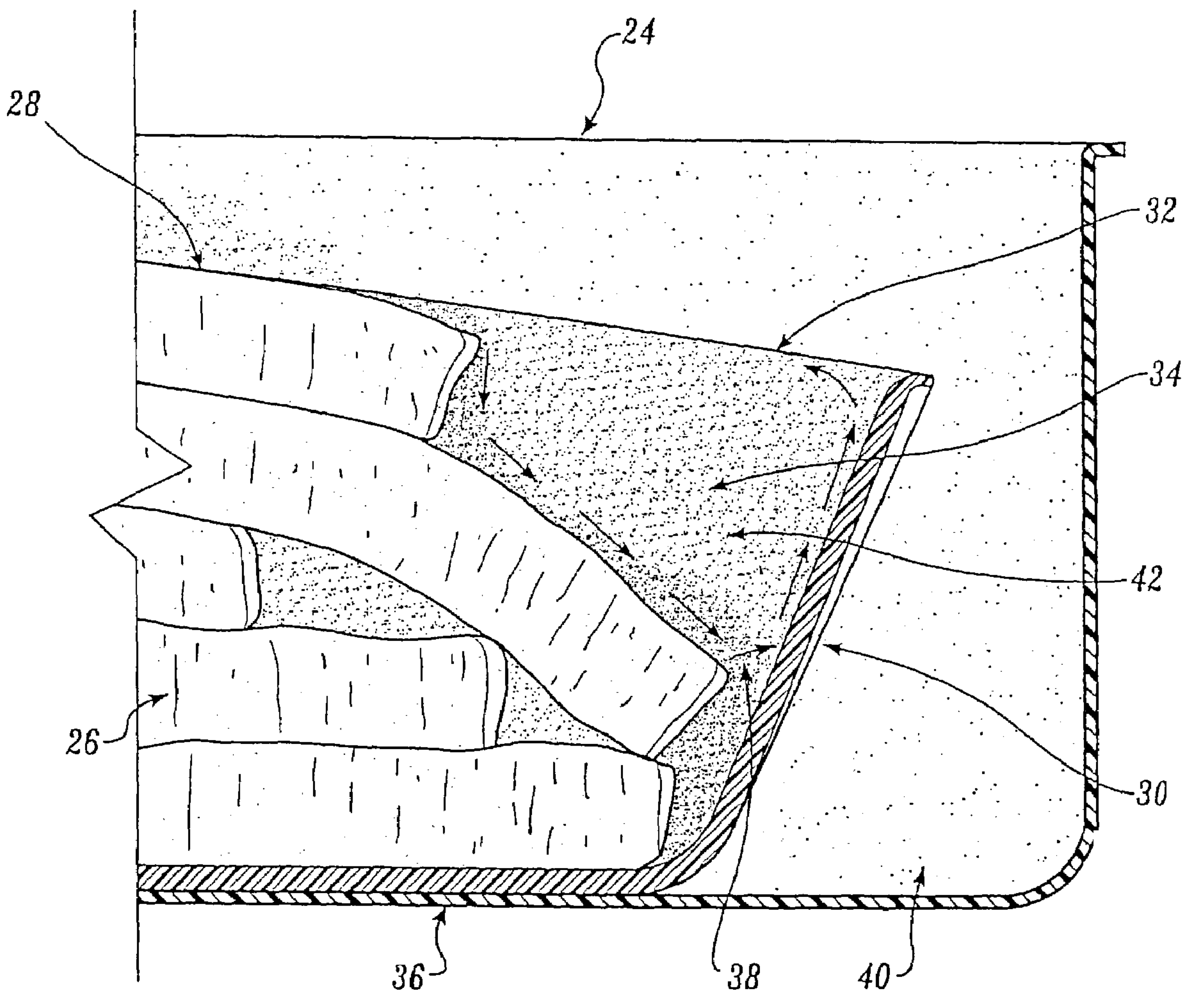
FIG. 1 shows an illustration of a proposed mechanism for mass transfers.

Before disclosure of the methods and apparatus of the invention for processing and packaging perishable meats, a theory is proposed for the formation of metmyoglobin in packaged red meats with reference to FIG. 1. The present invention, in one aspect, provides solutions to the problem of metmyoglobin formation in beef.

Fresh meats that have been chilled during an adequate storage period will contain large quantities of purple colored de-oxymyoglobin that is unattractive to typical consumers. When chilled meat is sliced in ambient atmosphere, de-oxymyoglobin comes into contact with atmospheric oxygen. Oxidation, converts the de-oxymyoglobin into oxymyoglobin (referred to as "bloom") displaying a bright red color that is attractive to consumers. However, if the sliced or ground meat will be stored in a low oxygen gas atmosphere, case ready condition, to extend its storage life prior to retail display, the oxymyoglobin that has formed after slicing and/or grinding (but before subsequent packaging in the low oxygen atmosphere), may transfer oxygen gas into the sealed environment of a master container and/or individual trays. Even though the quantity of oxygen transferred by the de-oxymyoglobin is relatively small, it can lead to the formation of undesirable metmyoglobin on the visible surface of the retail packaged red meat in conventional low oxygen case ready packages.

Metmyoglobin is brown in color and is unattractive to consumers. It is therefore desirable to prevent and/or minimize the extent of the deleterious formation of metmyoglobin. In one aspect, the methods and apparatus disclosed in the following subject matter details preventative methods. In order to provide a more detailed description of the conditions under which undesirable metmyoglobin may form, the following known laws of physics and natural processes are referenced.

2.1. Normal Conditions for Oxymyoglobin Formation

After storage under normal commercial refrigerated conditions in carcass or vacuum packed conditions, freshly sliced beef will predictably turn bright red (by oxidation of purple colored deoxymyoglobin to bright red colored oxymyoglobin) with a virtually 100% probability, when exposed to ambient air.

2.2. Optimum Conditions for Metmyoglobin Formation

It is known that optimum conditions for formation of metmyoglobin, at the surface of sliced, fresh beef muscle exposed to a gas occurs when the free oxygen content of the gas is approximately 5,000 to 30,000 ppm.

2.3. Graham's Law of Gas Diffusion

The rate of gas diffusion is inversely proportional to the density of the subject gas.

2.4. Relationship Between Density of Gas and Temperature

The density of a gas (and most matter) is inversely proportional to temperature (i.e., the gas density increases as its temperature is decreased).

2.5. Henry's Law

At a given temperature, the solubility of a gas in a liquid is directly proportional to the pressure of the gas above the liquid.

2.6 The "Mud Puddle Ring" Effect

According to the present inventor's observations and independently performed empirical trials, the "effect" can typically occur, immediately following conventionally practiced packaging methods, when one, some or all of the following prevailing conditions are generally approximated:

1). The subject sliced beef has been allowed to "bloom" as a result of exposure to ambient atmospheric oxygen immediately prior to packaging.

2). The temperature of the sliced beef is lower than the gas and packaging materials surrounding it, immediately after packaging.

3). The sliced beef is placed in an "enclosed space" defined by the "retail package" including an EPS foam tray (or other) and a high OTR overwrapping web (the "web"). The "enclosed space" is not completely filled with the subject sliced beef and a remaining space ("the space") is also contained. "The space" is subsequently filled with a "suitable gas" during evacuation of master container.

4). The ratio of beef to gas is low, i.e., the volume of suitable gas" is relatively low and the volume beef is relatively high, in the "enclosed space".

5). The "retail package" is placed into a substantially gas impermeable barrier "master container" which is evacuated (including the "retail package") of ambient air and then filled with the "suitable gas". The composition of the "suitable gas" can be carbon dioxide, nitrogen and residual oxygen at approximately 100 to <500 ppm. Thereby, substantially filling "the space" and "other space". The "other space" is defined by the internal space of the master container but excluding space occupied by "retail packages".

6). The temperature of "suitable gas" is lowest at the lowest point (i.e., near the bottom of the retail package) in "the space".

FIG. 1 is intended to be representational and not a depiction of the actual "effect" which is described as follows. Immediately after a conventional manner of packaging, the highly oxygenated condition of myoglobin (oxymyoglobin), which is present at the surface of the beef slices 26 starts to reduce, releasing oxygen gas inside the enclosed space 42. At those sliced beef surface locations shown as 28, that are in direct and intimate contact with the web 32 (such that there is no gas between the beef surface and the web 32), the released oxygen gas passes through the gas permeable web 32, directly and diffuses into the other space 40 inside master container 36 but outside retail package 30. This newly released oxygen gas is therefore immediately separated and essentially excluded from within the retail package. Any further gas contact with the beef surface locations 28 in direct and intimate contact with the web is limited to any gas outside the retail package 30, where the oxygen concentration remains relatively low. However, oxygen gas that is released from beef surface locations that are not in contact with the web enter the space 42 inside the retail package 30 and immediately cause a significant elevation of oxygen concentration in the small free space 34 under the web 32. Even though the web 32 is oxygen permeable the rate of oxygen gas diffusion therethrough is such that it can take an extended period of time for the oxygen content in the gas under the web 32 to equilibrate with the oxygen content of gas outside the retail package 30. Furthermore, the temperature of the oxygen atoms/molecules as they are emitted from the surface of the beef is the same as the temperature of the beef, which is significantly lower than the temperature of the gas in the free space 34 and therefore the density of the released oxygen is relatively high. This condition results in two additional effects. The diffusion rate through the web 32 is lower (Graham's Law) and because the density is higher, these newly emitted oxygen atoms tend to sink toward the lowest point in the retail package 30 and/or remain in contact with the sliced beef surface for a longer period than may otherwise occur. Consequently, the partial pressure of oxygen at the surface of the meat increases and, in accordance with Henry's Law, the level of soluble oxygen gas in the meat surface liquid elevates. The temperature of gas in space 42 is higher at the highest point and lowest at the lowest point. It can be concluded that oxygen gas emitted from the beef surface will remain in contact with the surface of the beef for a more extended period at lower locations and therefore higher concentrations will be present at these lower locations. Conversely, lower concentrations will be present at higher locations. Correspondingly, concentrations of metmyoglobin will form in direct proportion to the concentrations of oxygen. The gas in direct contact with the surface of the beef, a layer of gas that is probably less than about 0.01" in depth, is theorized to be the active gas that effects the surface of the beef. Under the conditions described above, the oxygen concentration in this layer can become significantly elevated.

The tendency of the relatively heavier oxygen atoms to move toward the lower levels in the space 42 can cause the oxygen atoms to follow the downwardly disposed surface of the sliced beef and be carried with other gases and liquids that are close to the surface of the sliced beef. This condition can increase the level of oxygen concentration at the surface of the beef and cause the oxygen concentration to increase exponentially toward the lowest point in the space 42. Consequently, the oxygen concentration is highest at the lowest point in the space 42. Correspondingly, higher (and darker) concentrations of metmyoglobin occur at the lowest point in the package and visible but lower concentrations occur at the highest point.

A mud pool drying in the sun can appear to be surrounded by parallel rings that are typically gray/brown in color. These rings are lightest at the furthermost point from the center of the puddle and typically darkest at the center of the puddle, with a gradual color density change between the two points. The color density of metmyoglobin that is formed under the conditions described above increases gradually from the highest point in the package (where the color is the lightest) to the lowest point in the package (where the color is darkest). Hence, the comparison with a mud pool drying under the sun.

Eventually, any free oxygen gas released by the reduction of oxymyoglobin, will become either reabsorbed in the form of metmyoglobin or will be diffused and equilibrated with the modified atmosphere contained throughout the master container 36. However, the effective, irreversible, deleterious event of formation of metmyoglobin at the visible surface of the meat will have already occurred and under the prevailing conditions prior to intended retail sale of the meat, will permanently remain visible.

Subjectively, the above occurs in what can appear to be a confusing manner. Beef that is the best looking and most highly oxygenated (i.e., beef having an attractive red "bloom") before packaging in the low oxygen atmosphere, will, with an almost certain predictability, emerge as the worst looking beef after removal from the master container. Conversely, the worst looking beef (i.e., beef colored by purple deoxymyoglobin) prior to packaging in the low oxygen atmosphere will, with an almost certain predictability, emerge as the best looking beef after removal from the master container.

Other issues of multiple species mass transfer with chemical reaction (i.e., a potential cause for the mud puddle ring problem in packaged fresh meat) are described as follows.

1. Equilibrium between a gas and a liquid is governed by Henry's law which states that the partial pressure of a gas at equilibrium is equal to the Henry's Law constant multiplied by the concentration of the gas in the liquid phase at equilibrium. The gas is oxygen ($O_2$) and the liquid is water ($H_2O$).

2. Based on the functional relationship expressed in Henry's law, several factors can influence the state of equilibrium between free $O_2$ in the package and $O_2$ absorbed in water.

A. Partial pressure of free $O_2$ in the in-package atmosphere.

B. Temperature because Henry's constant is temperature dependent.

(The work reported by Zhao and Wells indicates that in-package absolute gas pressure can vary in fresh packaged meat, either increasing or decreasing due to a combination of factors including composition, storage time, temperature, pre and postmortem factors, and others). Because total in-package gas pressure can vary, partial pressure conditions of $O_2$ can vary causing a migration of $O_2$ in and out of water solely based on consideration of a single factor A (partial pressure of free $O_2$ in the in-package atmosphere). With respect to factor B (temperature), it is likely that thermal gradients will develop across a product, from the center to the surface, resulting in slight temperature variations experienced within the package. First, this would have two results. The temperature gradients across a product would aid moisture migration within the product. Second, temperature fluctuation would promote a change in $O_2$ equilibrium concentration within water. In effect, $O_2$ could be absorbed into water, the water could then migrate, and subsequently be deposited somewhere else in the product.

As a result of factors A and B, and the role of chemical conversion, it is likely that some aqueous participation is needed. Given this, the question becomes what relative $O_2$ concentration and reaction time is needed to produce brown metmyoglobin color. Given sufficient time, factors A and B would operate to move $O_2$, seemingly through the product, to a point to produce the mud puddle ring.

Because the in-package gas atmosphere in a closely wrapped product package is minimal, the opportunity for bulk convective gas movement by mass transfer within the package is very limited. The enclosed space near the permeable web, product, and tray are particularly prone to the development of a boundary layer that is away from the free mixing of gas molecules within a larger, relatively unconfined headspace. Boundary layer phenomena may include the establishment of a proportionate localized gas concentration compared with the free gas concentration. This situation would aggravate the $O_2$ conditions outlined above with respect to factors A and B. Therefore, packages with smaller headspace volumes will experience greater aggravation of the above $O_2$ conditions than packages with large headspace volume.

Once formed on a slice of fresh red meat, metmyoglobin is essentially a fixed stain, with unappealing appearance and is generally unacceptable to consumers. On the other hand, oxymyoglobin, which imparts an acceptable red bloom color is attractive to consumers and is therefore desirable.

In one aspect, the present invention provides methods and apparatus for grinding meats such as beef by processing boneless beef through a grinding machine and substantially preventing exposure of the ground meat from contacting ambient air until the ground meat is delivered in any suitable retail package to a point of sale, such as a supermarket. In this way formation of excessive quantities of metmyoglobin and/or any cause of excessive discoloration can be minimized. In one embodiment, the meat can be vacuum packaged after treatment with $CO_2$ in any one of the methods described herein.

3. Packaging

The pre-treatment of any perishable goods, such as ground beef, as described herein can enhance the keeping qualities of the perishable goods. In one aspect, the goods can be placed into a sealed pressure vessel with a known quantity of suitable gases at any suitable pressure for a suitable period of time and maintained at a suitable temperature. The suitable gas pressure may be selected at a pressure above ambient air pressure. The quantity of the suitable gas can be increased by providing additional controlled quantities into the pressure vessel as desired. The suitable pressure, time and pre-treatment temperature can be precisely controlled and arranged so as to allow the suitable gas to dissolve into any water and oils and/or other substances contained in the goods. The quantity of suitable gas that dissolves into the goods, can therefore be controlled and may be equal to the maximum amount that can dissolve therein at any suitable gas pressure and thereby saturating the goods with the suitable gas in solution. A known amount of gas can be dissolved into the goods at a given gas pressure and pre-treatment temperature. The perishable goods can then be removed from the pressure vessel and packaged in any suitable packaging such as a hermetically sealed vacuum package that may include a gas barrier plastic pouch or container of suitable size. After vacuum packaging the perishable goods into the suitable gas barrier pouch or container, the goods can be stored in ambient atmosphere and maintained within a suitable storage temperature range. The suitable storage temperature range can be maintained at a suitable level above the pre-treatment temperature. A quantity of dissolved gas can emerge from the perishable goods and partially inflate the gas barrier pouch. The size of the gas barrier pouch can be arranged to accommodate the partial inflation without damage to the hermetic sealing of the pouch. The emerged gas then contained within the gas barrier pouch can enhance the keeping qualities of the perishable goods. The emerged gas can subsequently dissolve into the goods again and re-emerge corresponding to any temperature fluctuations that may occur within the suitable storage temperature range. A quantity of free suitable gas can be maintained in gaseous condition with the goods within the packaging and the quantity of free gas can be arranged and controlled at a minimum suitable quantity. However, if the temperature of the goods in the gas barrier pouch is increased as a result of failure of refrigeration or any other type of temperature "abuse" to an unacceptable high level (for example 50° F.) for an unacceptably prolonged period so that the quality of the goods is compromised, additional gas will be released from solution therein and cause further expansion of the gas barrier pouch. The gas barrier pouch can be sized such that it will accommodate a known amount of released gas. The known amount of the released gas can be limited to such an amount that will be released by goods at an acceptable temperature and if the acceptable temperature is exceeded any additional release of gas can cause rupturing of the gas barrier pouch (or any other suitable packaging material). Rupturing of the packaging, therefore, can be used as an indication that goods have endured an unacceptable level of abuse.

In one aspect, goods may be treated by exposure to an adequate quantity of suitable gases at a suitable temperature and pressure in such a manner so as to allow a specific quantity of suitable gas to dissolve in the goods. The specific quantity of suitable gas can be arranged so as to equal an amount that will saturate the goods with the suitable gas dissolved therein to a suitable level. The goods can then be packaged in any suitable packaging of suitable size which may include an additional quantity of suitable gas contained and hermetically sealed in the suitable packaging with the goods therein. The total volume of the goods with specific quantity of suitable gas dissolved therein plus additional quantity of suitable gas can be arranged so as to completely fill the suitable packaging of suitable size to provide a finished package with goods and the gas sealed therein. Therefore, any change in temperature of the finished package and the goods therein will result in a change in the total volume of the goods plus the additional quantity of suitable gas. The packaging, the goods with the suitable gas dissolved therein, and the additional quantity of suitable gas can be arranged so as to accommodate a known variation (increase or decrease) in the total volume, as desired. The known variation can be used as an indicator of the temperature history of the finished package. For example, the packaging may be provided with a valve indicator that will permanently open or break if the temperature of the finished package with the goods, increases to an unacceptable level and extent so that the volume of gas therein and corresponding pressure thereof increases to an unacceptable level.

The present invention thus provides methods and apparatus for the treatment of perishable goods, such as beef, within a low oxygen environment.

In one aspect, the present invention discloses a method of processing and packaging goods in a low oxygen environment, the method including placing goods in an enclosed vessel containing a gas that enhances the keeping of the goods, allowing the gas to contact and dissolve in liquids and oils present in the goods, restricting the formation of oxymyoglobin by substantially displacing ambient air, that may otherwise contact the surface of the goods, with the gas, providing a retail package including two overlapping webs with a space therebetween with at least one of the webs being gas permeable, and transferring the meats from the vessel to a position between the two overlapping webs and into the space without allowing significant formation of oxymyoglobin on surface of the meats. The present invention, thus, provides methods and apparatuses to accomplish these ends.

3.1. Peelable Lids

In accordance with one aspect of the present invention, trays having peelable lids are disclosed herein. Perishable goods packaged in trays with peelable lids have an extended shelf life. A peelable lid provides a method of delaying the exposure of fresh meat contained within a package to ambient air until a predetermined period, which may occur at the point of sale.

Figure 2:
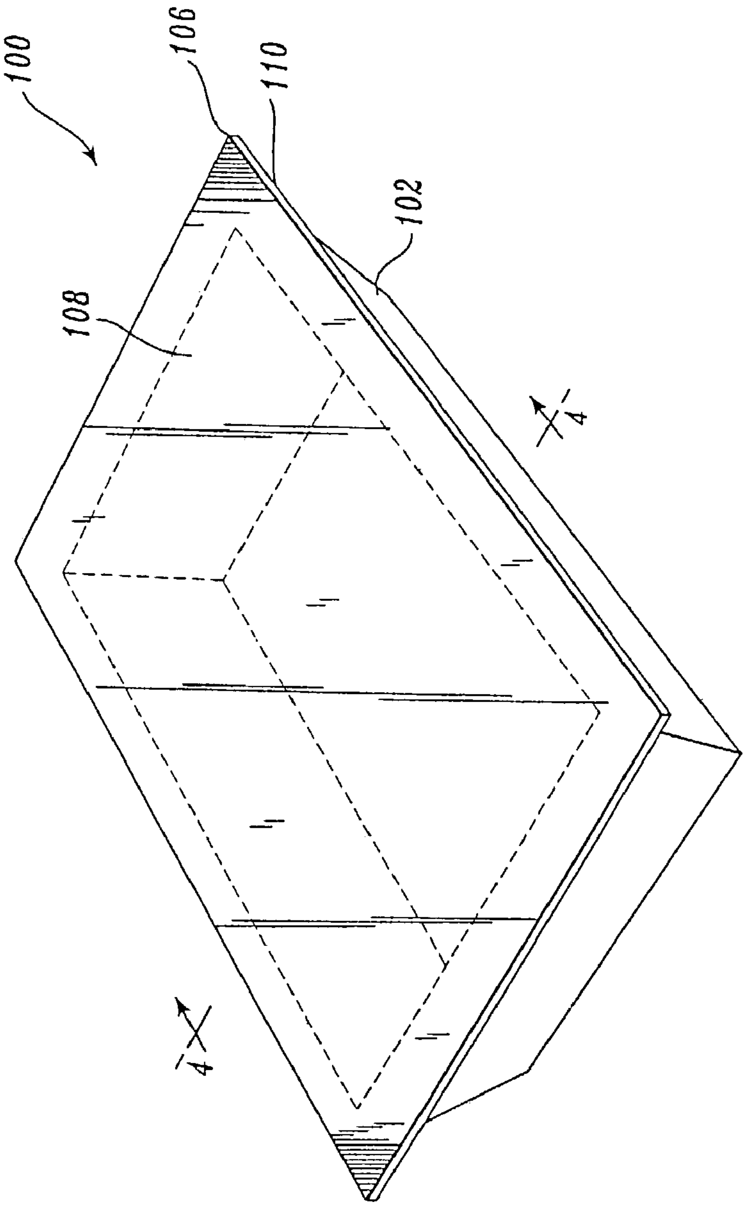
FIG. 2 shows an isometric illustration of a tray constructed according to the present invention.
Figure 3:
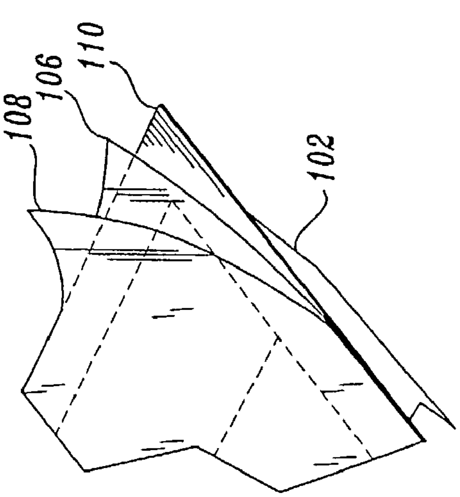
FIG. 3 shows an isometric illustration of a tray portion according to the present invention.
Figure 4:
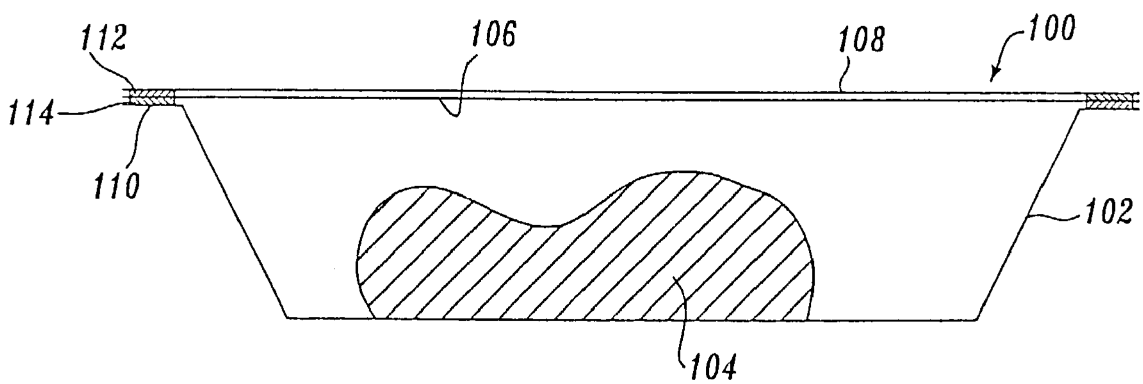
FIG. 4 shows a side illustration of a tray constructed according to the present invention.

Referring first to FIGS. 2, 3, and 4, one embodiment of a package 100 made in accordance with the present invention includes a tray 102 into which meat 104 (FIG. 4) or other perishable product is placed. A first web 106 and second web 108 of heat sealable material are then placed over the tray 102 and heat sealed to the upper horizontal flange 110 that extends outwardly from the upper periphery of the tray 102. By draftsman's license, the webs 106 and 108 are shown separated. In actuality, they are in intimate contact throughout their entire length and width. The webs 106 and 108 are also shown to be heat sealed to each other by cross hatching shown in FIG. 4 at location 112 between the two webs, 106 and 108, and between the bottom web 106 and the tray flange 110 at the location 114. In actuality again, there is no substantial thickness at the heat sealed locations, 112 and 114, but in fact, the materials are in intimate contact with each other and/or the flange 110 of the tray 102. Thereby substantially expelling/removing air or gas from therebetween.

Depending upon the particular design and use of the tray 102, the first web 106 can be composed of a substantially gas impermeable barrier web or a substantially gas permeable web. Similarly, the outer web 108 can either be substantially gas impermeable or permeable. Substantially gas permeable materials include plasticized polyvinyl chloride (pPVC) and polyethylene (PE) or any combination thereof. In one aspect, these can be used in thicknesses from about 0.0004 inches to 0.001 inches. Suitable barrier webs (substantially gas impermeable) are composed of amorphous polyethylene terephthalate (APET) unplasticized polyvinyl chloride (uPVC) and/or a composite material, such as a biaxially oriented polyester/tie/polyvinylidene chloride/tie/polyethylene or any combination thereof. Other suitable materials known to those of ordinary skill can also be employed in accordance with the present invention.

The trays 102 are made of polyester (APET, amorphous polyethylene terephthalate often referred to as polyester), polyvinyl chloride or other suitable food grade polymers. As used herein, a web is a sheet of material that may have one or a plurality of layers or zones of differing compositions. Also, when the terms "substantially gas permeable" or "substantially gas impermeable" are used, they are intended to reflect the fact that no practical heat sealable material is totally gas permeable or impermeable. Materials disclosed herein as substantially gas impermeable will serve as a barrier layer to the transfer of significant amounts of gas over time. Likewise substantially gas permeable materials will not function as a barrier but will allow ready diffusion of gas therethrough.

3.1.1 Method for Producing Peelable Lids

One aspect of the invention provides a method for producing the peelable lids disclosed above.

Figure 5:
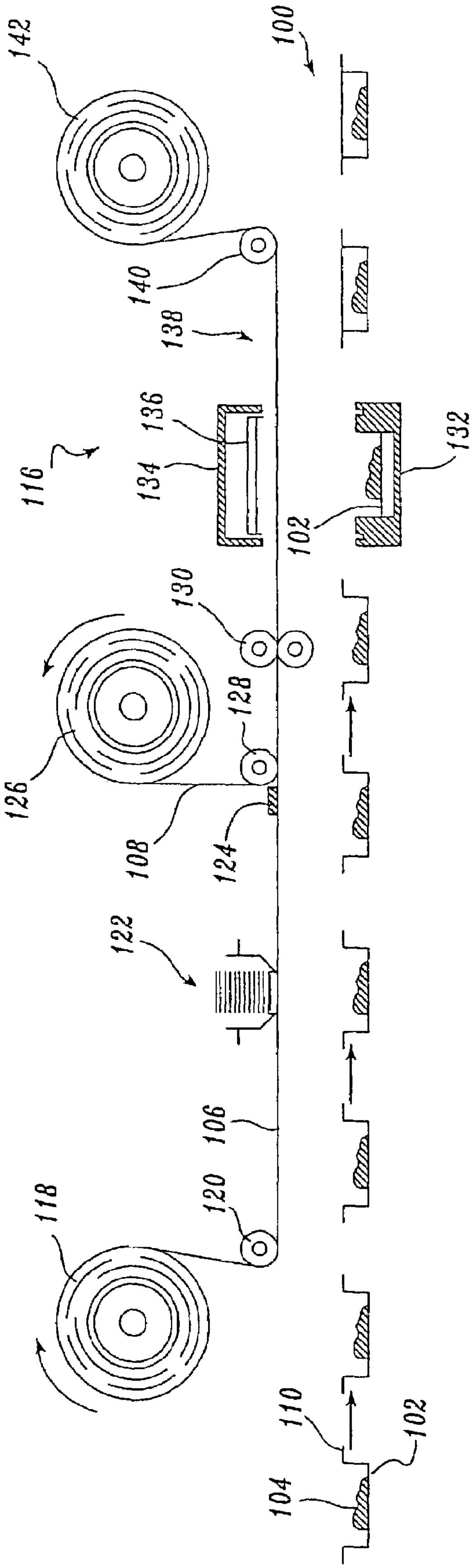
FIG. 5 shows a schematic illustration of a packaging apparatus according to the present invention.

Referring now to FIG. 5, a schematic side elevation of a package sealing arrangement for assembling a package of the type disclosed in FIG. 2 is shown. Trays 102 are loaded with any perishable material 104 and placed in carrier plates on a conveyor (not shown) and conveyed toward a first heat sealing station 116. A roll 118 of heat sealable material is supplied above the conveyor. The sheet of material that will become the inner web 106 from the roll 118 travels downwardly and wraps around a roller 120 and then traverses horizontally in a left-to-right direction along with the trays 102 being conveyed by a conveyor (not shown). A label dispenser 122 positions a label 124 on the upper surface of the inner web 106 of heat sealable material. The outer web 108 of sheet material is then drawn from roll 126 downwardly around another roller 128 and traverses horizontally from left-to-right, where the label 124 is captured between the inner and outer webs 106 and 108, respectively. The two webs and the label are then run through a pair of nip rolls 130 to cause the two webs and the label to come into intimate contact and also substantially removing air from between the webs. The webs of heat sealable material 106 and 108 are then positioned at the heat sealing station 116.

Corresponding tray 102 is positioned in the lower portion 132 of the heat sealing chamber. The lower portion 132 of the heat sealing chamber 116 is then raised upwardly toward the upper portion 134 of the heat sealing chamber 116 wherein the webs 106 and 108 are sealed to each other and to the upper surface of the flange/lip portion 110 of the tray 102 around the periphery at the flange. At the same time, a knife 136 incorporated into the sealing chamber 116 trims the excess material neatly around the outer edge of the tray flange 110. The scrap material 138 is then passed around a roller 140 and onto a scrap retrieval roll 142. The tray 102 is then moved onto another conveyor where the finished packages 100 are moved from left to right to a transportation and/or storage station.

3.1.2. Apparatus for Forming Peelable Lids

Figures 6, 7, 8:
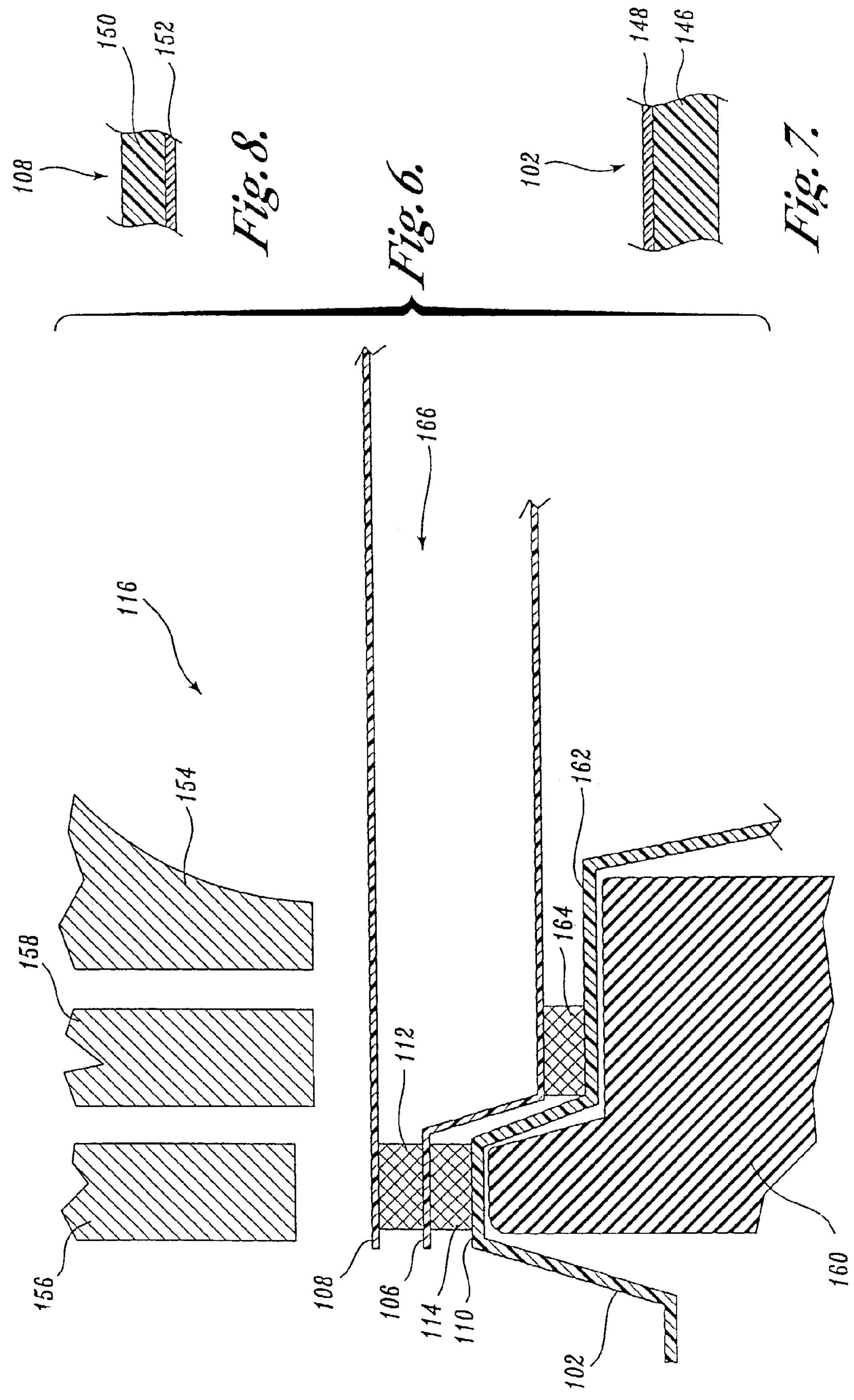
FIG. 6 shows a graphical illustration of a packaging apparatus according to the present invention.
FIG. 7 shows a graphical illustration of a web according to the present invention.
FIG. 8 shows a graphical illustration of a web according to the present invention.

Referring now to FIG. 6, a schematic side elevation view through a portion of a sealing mechanism 116 is shown. A schematic view is provided so as to disclose an example of a peelable seal mechanism that will facilitate peeling of the outer second web 108 from the package 100 while the first web 106 remains substantially intact and sealed to the tray web 102. The example is provided to show examples of plastics materials that will seal as required when used according to the present invention. Other selected materials may also be used in similar manner without departing from the general ambit of this invention.

Referring to FIG. 7, in one instance of the tray web 102, first web 102 includes a thermoformed tray produced from a multilayer co-extruded material including a first outer layer 146 of Eastman 9921 about 0.008" thick and a second inner layer 148, about 0.004" thick, including a blend of about 50% PETG 6763 and about 50% Eastman 5116 (or Eastman PM14458 or equivalent shown in FIG. 7). First web 106 includes a web of pPVC with a thickness of about 0.0008". Referring to FIG. 8, outer second web 108 includes a two layer co-extruded web with a first outer layer 150 of Eastman PET 9921 about 0.003" in thickness and a second inner layer 152, about 0.003" thick, including a blend of about 16% Eastman PETG 6763 and about 84% Eastman PET 9921.

Referring again to FIG. 6, a water cooled clamp 154 is shown in position above tray 102, first 106 and second 108 webs and two separate heat seal bars 156 and 158 are arranged adjacent thereto and all are separated by space and are each independently activated, controlled, and moved. Heat seal bar 156 can have a set temperature of about 385° F. and heat seal bar 158 can have a set temperature of about 370° F. For the materials described above, second inner layer 152 of the outer second web 108 will heat seal to the first web 106 when the temperature at the interface of first and second webs reaches about 385° F. and above. First web 106 will heat seal to second inner layer 148 of tray web 102 when the temperature of the interface between the tray and first webs is about 370° F. and above.

In one aspect, the water cooled clamp 154 is mounted to an independently activated pneumatic driver (not shown), providing downward pressure such that the water cooled clamp 154 can clamp against tray 102, first 106 and second 108 webs so as to hold them firmly against the rubber seal 160 located beneath the tray web flange portions 110 and 162. Heat seal bars 156 and 158 are independently attached to pneumatic drivers (not shown) for applying pressure thereto so as to facilitate a method to seal second 108, first 106 and tray 102 webs together under independently selected pressure. Heat seal bar 156 heat seals the second 108, second 106 and tray webs together at 112 and 114 and heat seal bar 158 heat seals the first web 106 to the tray web 102 at 164 but does not heat seal the interface between the second 108 and first 106 webs. When the package, is assembled and sealed in the foregoing manner, the second web 108 can be peeled from the package without rupturing the first web 106. First web 106 may be perforated so that after seals 112, 114 and 164 have been provided, the first 106 and second 108 webs can be separated to provide a space 166 therebetween.

Seals at 112, 114, and 164 have been shown as heat seals, however, effective sealing can be achieved with use of ultrasonic devices or alternatively latex rubber adhesives when applied at the interfaces of the webs at 112, 114, and 164, or with any other suitable method of sealing. Such sealing can provide improved economics while still providing an effective peeling mechanism as required and described above.

3.2. Trays

In another aspect of the present invention, methods, and apparatuses are disclosed that facilitate the evacuation of gases from packages to minimize the formation of metmyoglobin on the surfaces of meats. These features are incorporated into the design of several embodiments of trays herein disclosed.

To facilitate the elimination and removal of undesirable gases from within trays, one embodiment of a tray formed in accordance with the invention includes a valve. In some instances, trays made according to the present invention provide channeling or directing a fluid from within an interior of a tray to the exterior, including the evacuation and introduction of any gases and liquids. Furthermore, trays formed in accordance with the invention provide numerous other advantages. Without limitation, one advantage that is realized is the capability to be stacked atop one another.

Conventional thermoformed trays are made in molds which have sides that are generally inclined to facilitate separation between the mold and the tray. Thus, the bottom of the tray is typically smaller than the top of the tray. Consequently, conventional trays are cumbersome to stack when filled, because the smaller area at the bottom cannot be suitably supported by the larger opening at the top. Trays constructed according to the present invention include members, in the form of flaps that provide a suitable resting area for the lower portion of the tray when stacked atop one another.

3.2.1. Embodiment

Figure 9:
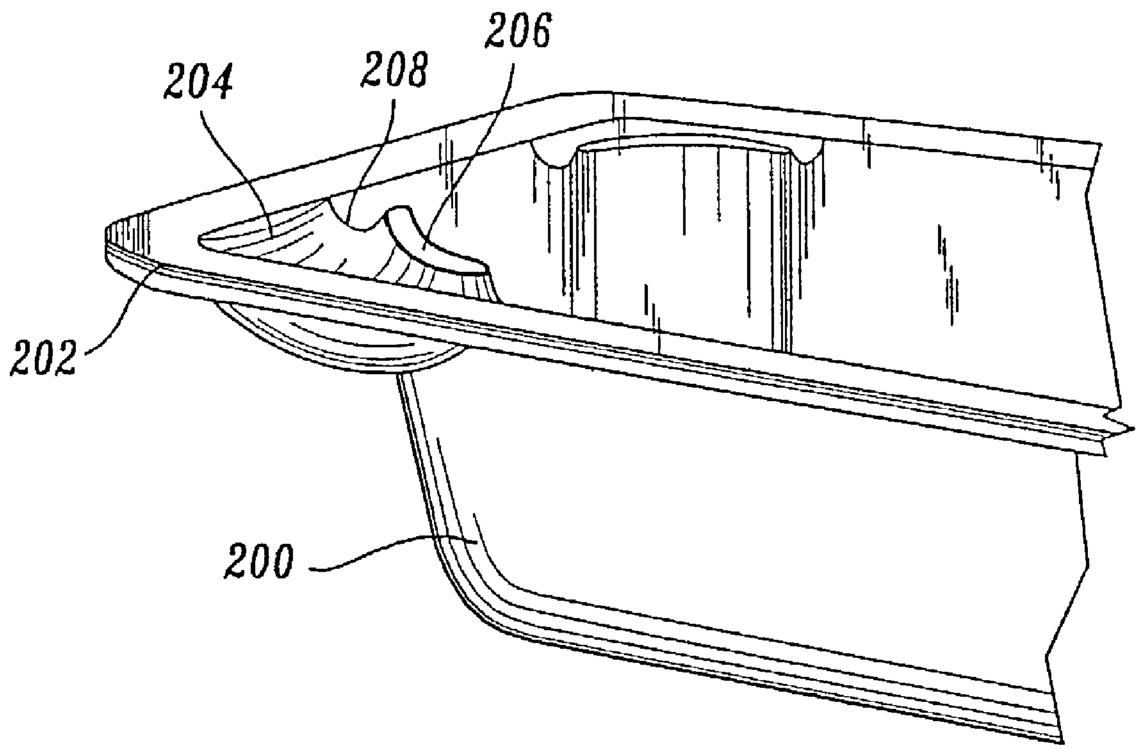
FIG. 9 shows an isometric illustration of a tray portion according to the present invention.

Referring now to FIG. 9, a portion of a tray embodiment with a valve constructed in accordance with the present invention is shown. In this embodiment, the tray 200 has an upper peripheral flange 202 that extends outwardly from the entire upper periphery of the tray opening. The tray sides extend downwardly to the horizontally disposed bottom. A downwardly extending recess 204 is cut or formed in the tray corners. The edges of the recess 204 communicate with the interior of the tray. At the inner portion of the recess, the recess and the wall of the tray terminate in an opening 206. The opening 206 has its upper edge at the same level as the upper surface of the flange 202. The lower edge of the opening is in communication with the exterior of the tray, allowing liquids and gases to exit the tray, forming a valve. However, if the tray is tipped, undesirable liquids can flow into the recess 204 and back out through the edges of the recess 208. In this manner the undesirable juices/liquids will not easily exit the package through the opening 206.

3.2.2. Embodiment

Figure 10:
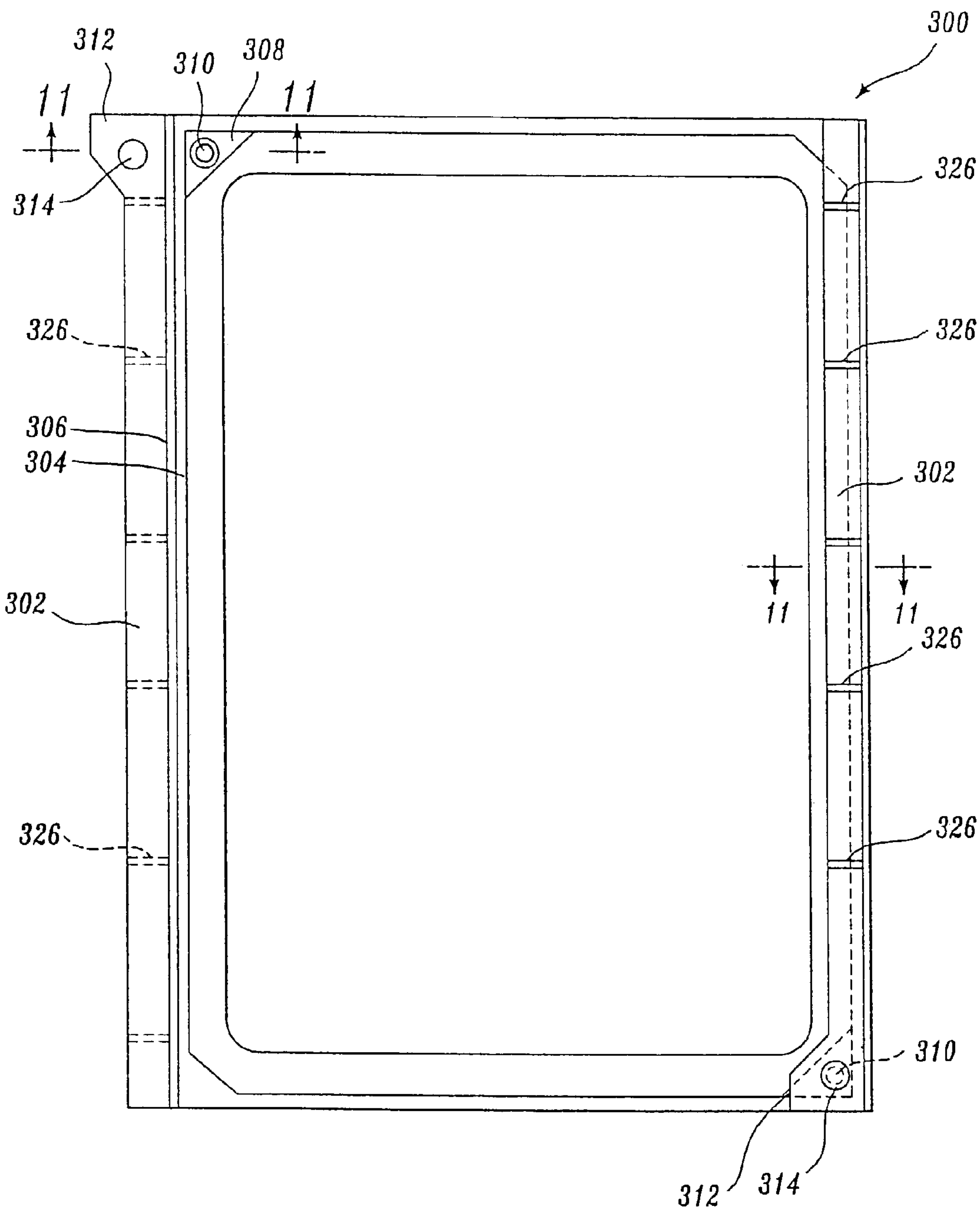
FIG. 10 shows a top illustration of a tray according to the present invention.
Figure 11:
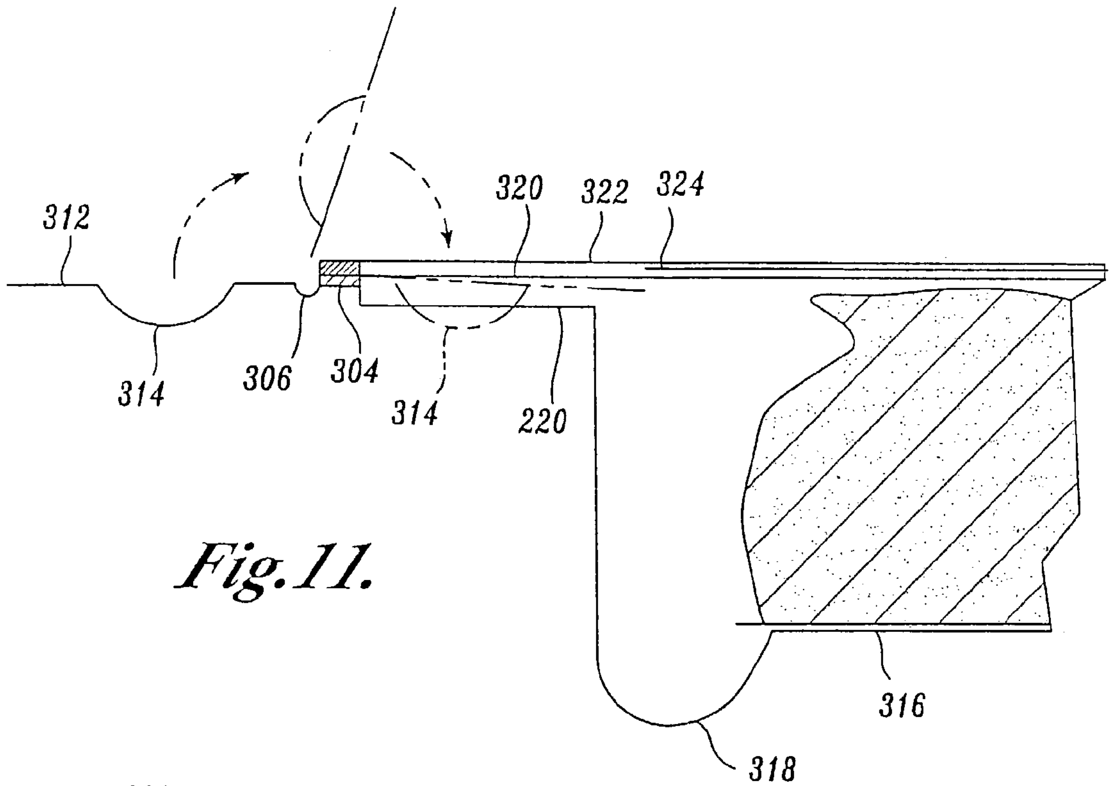
FIG. 11 shows a side illustration of a tray portion according to the present invention.
Figure 12:
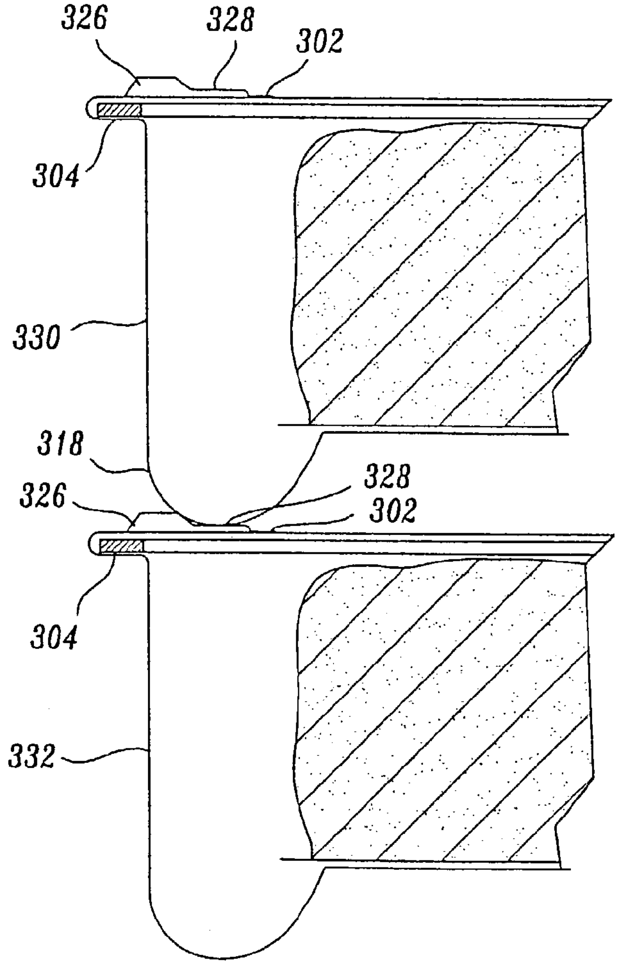
FIG. 12 shows a side illustration of tray portions according to the present invention.

Another embodiment of a tray with a valve is shown in FIGS. 10–12. The longitudinal edges of the tray 300 each include a flange having an outer 302 and inner 304 flange.

The outer flange 302 is coupled to the inner flange 304 of the tray 300 by a hinge member 306. The inner flange 304 is integral with and extends outwardly from the upper edge of the tray 300. A recessed platform 308 is formed across the corner of the tray at opposite diagonal corners of the tray. The bottom of the platform 308 is lowered slightly relative to the level of inner flange 304. The platform 308 in the edge of the tray carries a small depression 310, the bottom of which is perforated. During evacuation and flushing, gases can rapidly enter through the perforation in the depression 310, travel through the recess formed by platform 308 into the interior of the tray and vice versa. Adjacent to the recessed platform 308, the flange includes an outwardly extended flap 312. In the unfolded position shown in FIG. 10, the flap 312 carries a concave dimple 314 (viewed from the top in the unfolded position). The dimple is located relative to the hinge 306 such that when the outer flange 302 is folded over on top of the inner flange 304, the dimple 314 resides approximately directly above and central to the depression 310. When desired, the dimple 310 can be depressed from the upper side so as to reverse its concavity. When the concavity is reversed, it extends downwardly into depression 310, closes off the perforation in the cavity, and thus seals the container.

Referring now to FIG. 11, the tray 300 has a recessed bottom 316 so as to form peripheral legs 318 upon which the tray 300 rests. A first and second web 320 and 322, respectively, of heat sealable material overlay the upper portion of the tray 300 and are heat sealed to the upper surface of the inner flange 304. However, it is apparent to one of ordinary skill that a single web, such as the first web 320 may be incorporated alone by deleting the second web 322. A label 324 or other indicia bearing material can be sandwiched between the heat sealable webs 320 and 322. The method for incorporating a label between a first and second web has been described above.

The label 324 sandwiched between heat sealable webs 320 and 322 is optional and can cover the entire upper surface of the tray 300. Alternatively, the label 324 can cover only a portion of the product contained in the tray 300. The label 324 can carry graphics that, for example, show the contents in a fully prepared and cooked condition to suggest to the consumer how the product will look when cooked, yet allowing the consumer to see at least a portion of the fresh product in the tray. For example, if the tray contained fresh beef patties, the label could cover half of the exposed upper surface. The label may be arranged with a straight cut or opening running the full length of the package. Alternatively, the label could be positioned on one side of a diagonal through the package, while the portion of the package on the opposite side of the diagonal would be open for viewing the fresh, packaged product. Referring again to FIG. 10, the remainder of the longitudinal extent of the outer flange 302 includes lateral reinforcing ribs 326 that extend upwardly from the flanges 302 when folded over the top of flange 304. Referring now to FIG. 12, a first 330 and second 332 tray are stacked in a manner according to the invention. The reinforcing ribs 326 of the bottom tray 332 have a recess 328 that receives the legs 318 of a substantially similar tray 330 stacked on top of tray 332. The recesses inhibit lateral movement of one tray relative to another. Thus, these containers are stackable for use, for example, in a master container holding a plurality of similarly configured trays.

3.2.3. Embodiment

Referring now to FIGS. 13–16, another embodiment of a evacuable and stackable tray 400 constructed in accordance with the present invention is illustrated. The tray 400 is generally rectangularly shaped. The tray 400 includes first and second sidewalls 402 and first and second end walls 404. Walls 402 and 404 are generally upright and slope inwardly from their upper portion toward the tray bottom 406 to facilitate separation from a mold. The bottom 406 has a raised central portion 408 that slopes downwardly toward the bottom of each end wall 404. The upper end of the sidewalls 402 and end walls 404 terminate in an outwardly extending horizontal flange 410 that extends completely around the tray 400. Walls of tray 400 may have reinforcing ribs running vertically. Furthermore, ribs may run horizontally on the bottom 406 of the tray 400. The raised center portion 408 creates a cavity 412 (see FIG. 14) underneath the bottom 406 of the tray 400. When the trays are filled and stacked, if the contents extend above the flange 410, the cavity 412 will accommodate the raised contents without compression of the contents in a stacked arrangement.

Figure 13:
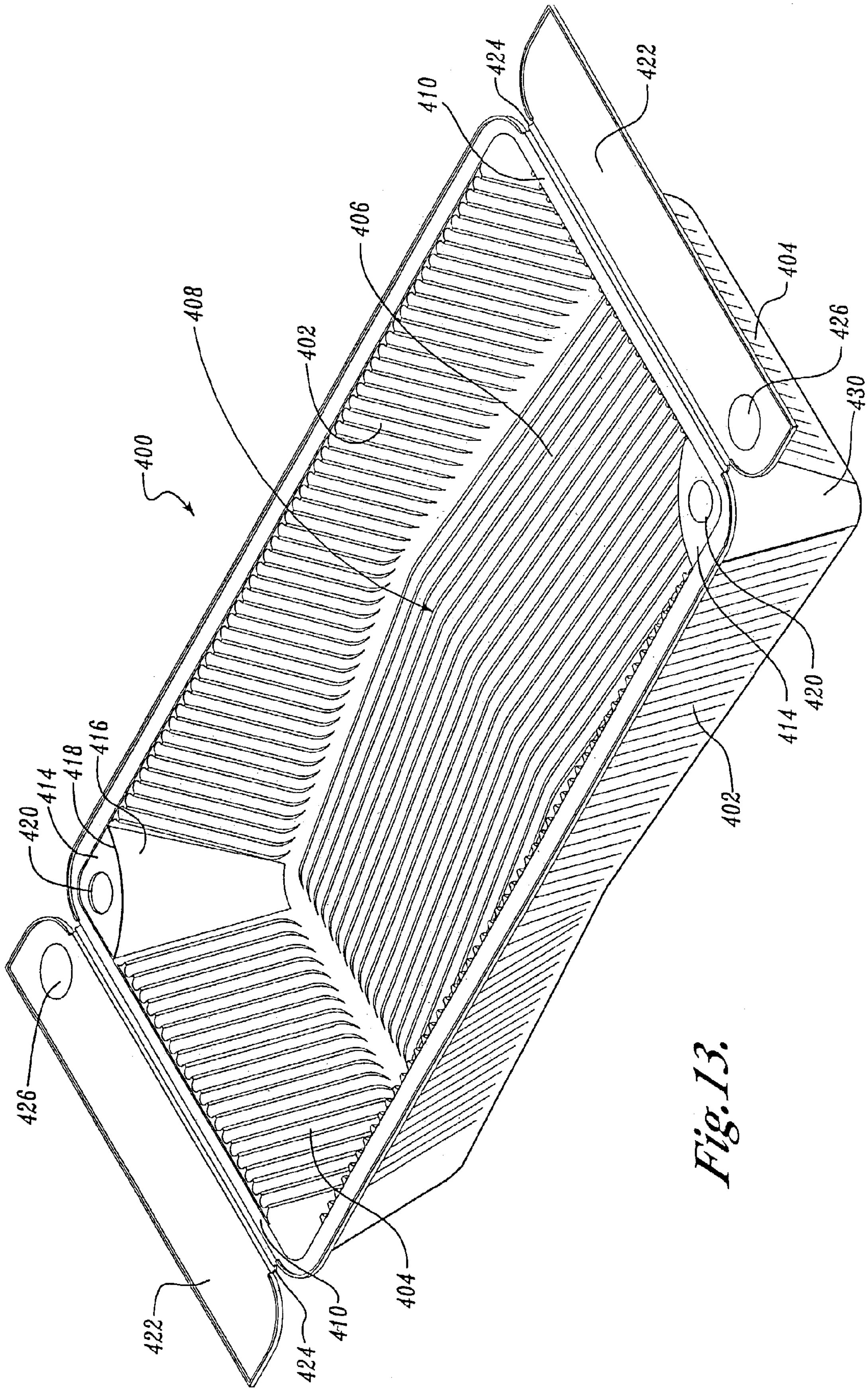
FIG. 13 shows an isometric illustration of a tray according to the present invention.

Referring to FIG. 13, a horizontal platform 414 is formed in diagonally opposed corners of the tray 400. The platform 414 is positioned at an elevation slightly below that of flange 410. A wall segment 416 extends downwardly from the inner edge 418 of the platform 414 and has edges that join with the sidewall 402 and end wall 404. The platform 414 and the wall 416 form a concave recess 430 on the outside of the tray 400. An aperture 420 is formed in the center portion of platform 414 and allows gas communication between the inside of the tray and the outside of the tray via the recess 430 when a web covering the top of the tray 400 is sealed to flange 410.

Figure 16:
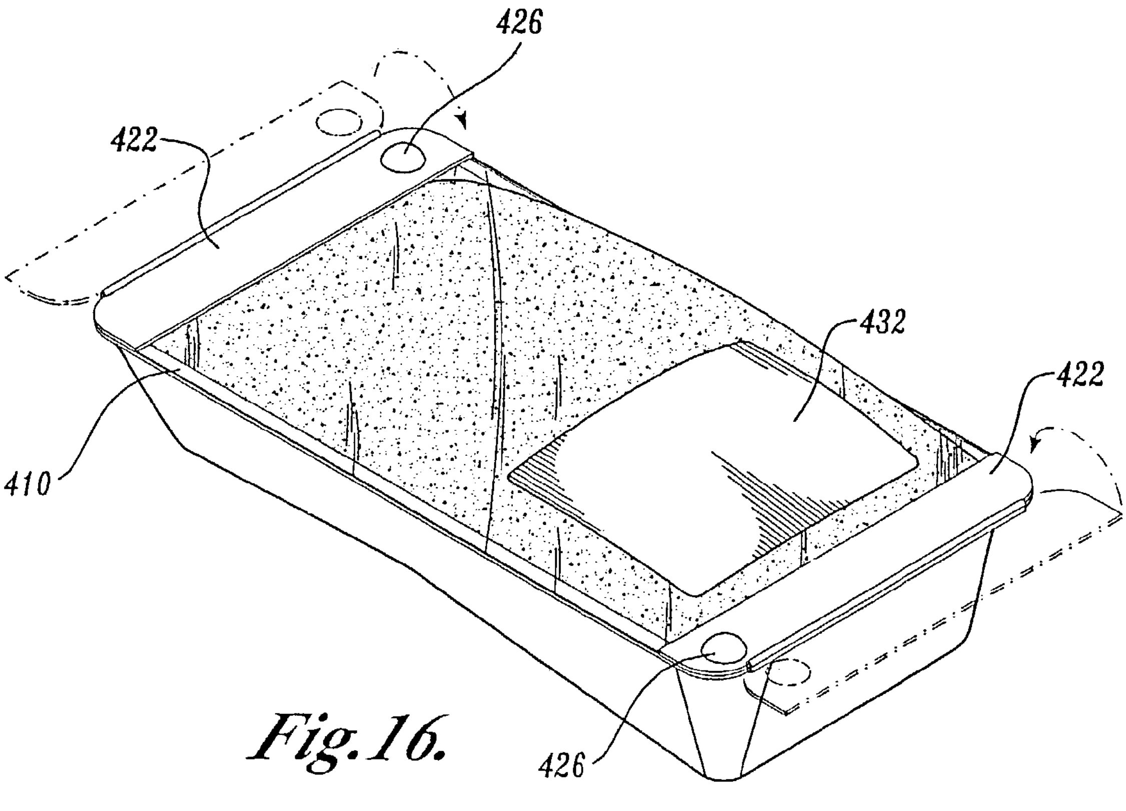
FIG. 16 shows an isometric illustration of a package according to the present invention.

Referring still to FIG. 13, the tray 400 also has movable flaps 422 that are hinged via a hinge 424 to the outer edges of the portions of horizontal flanges 410 that extend outwardly from the end walls 404. The flange 422 when open carries a hemispherical shaped dimple 426. The center of the dimple 426 is on a line perpendicular to the hinge 424; this line also runs through the center of aperture 420. The centers of the aperture 420 and the dimple 426 are equidistantly spaced from the hinges 424. Thus, as shown in FIG. 16, when the movable flap 422 is folded over the flange 410, the dimple 426 resides over the aperture 420.

Figure 14:
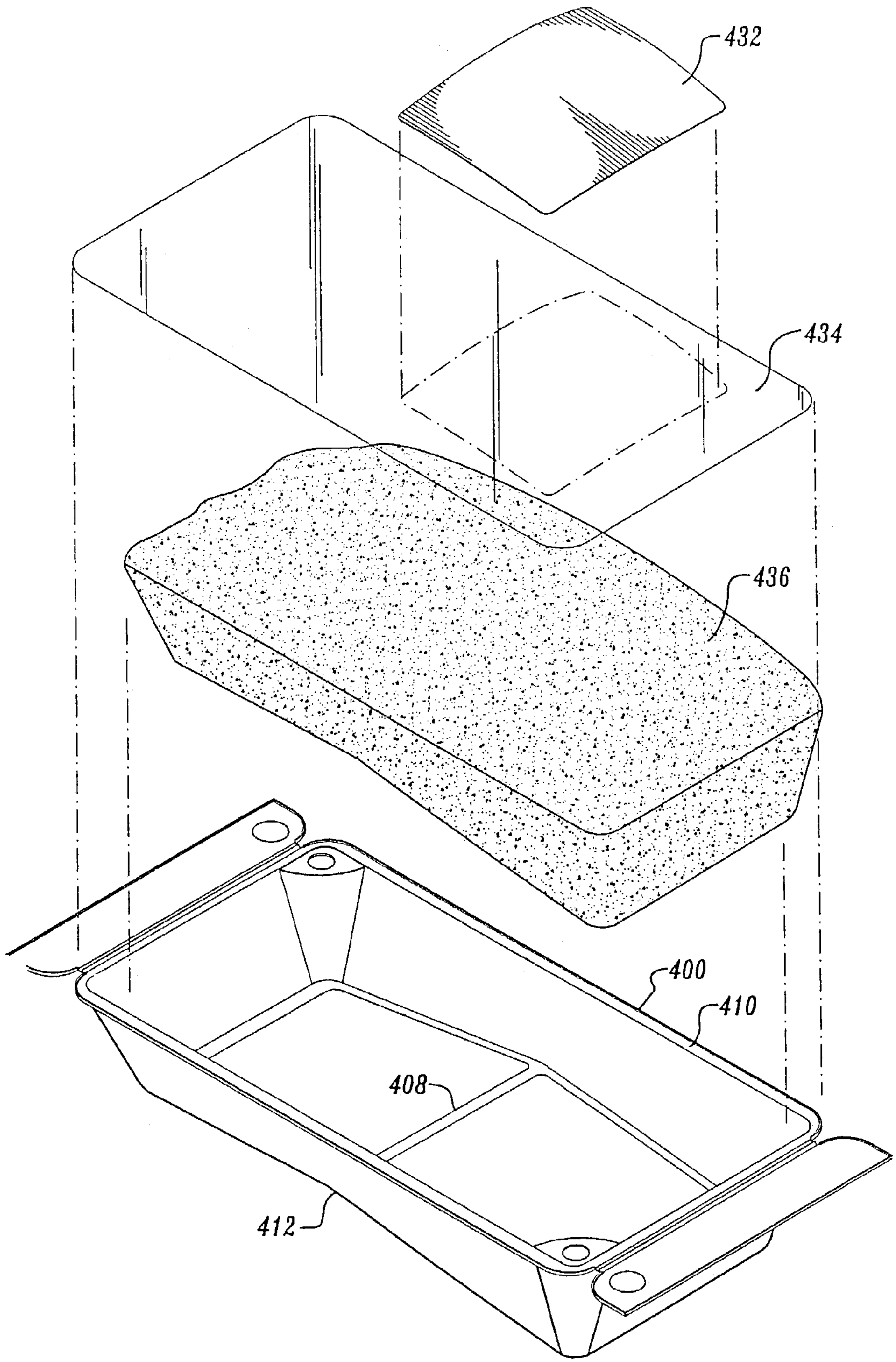
FIG. 14 shows an exploded illustration of a package according to the present invention.
Figure 15:
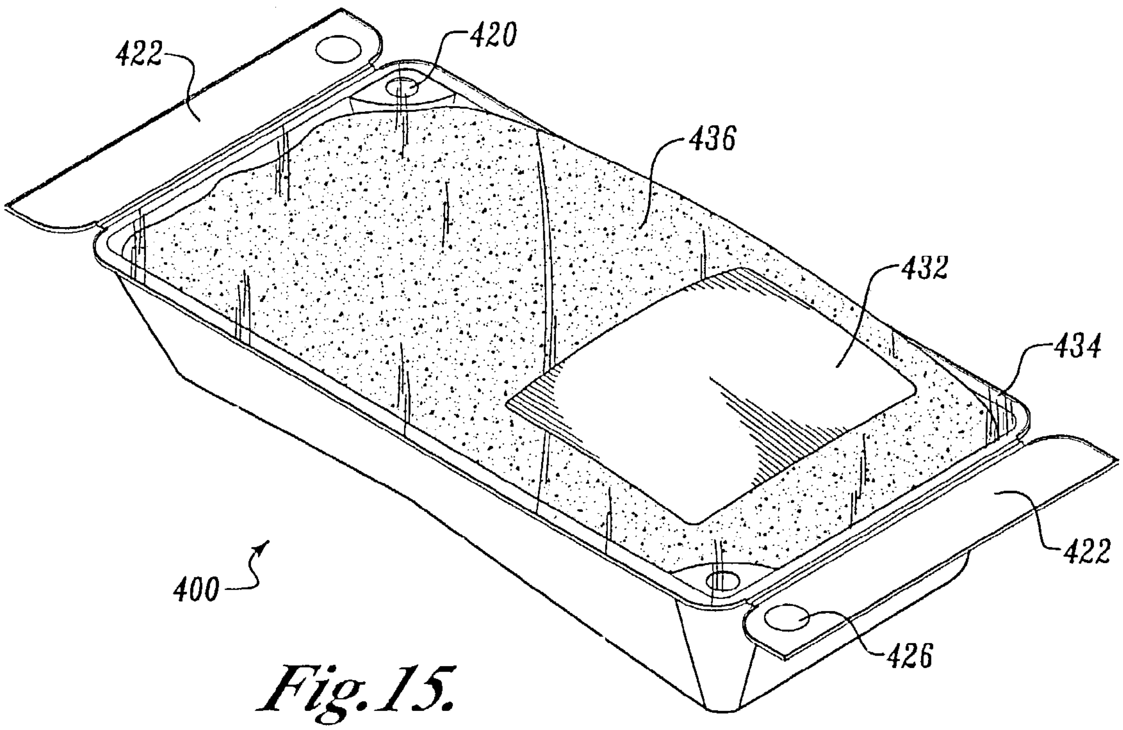
FIG. 15 shows an isometric illustration of a package according to the present invention.

Referring now to FIG. 14, an exploded view of the construction of a finished package is illustrated. Tray 400 is suitably sized to accept a perishable good 436, such as meat within the cavity of tray 400. Product 436 is suitably shaped to the tray 400 dimensions, and a web 434 can be applied and sealed to tray at flange 410 surrounding the tray cavity. Optionally, a label 432 can be applied to the exterior of the web 434 to produce a package as illustrated by FIGS. 14 and 15. FIG. 15 illustrates a tray 400 having flaps 422 in the open position, meaning that flaps 422 are not folded over to lie adjacent to the sealed web 434. FIG. 16 illustrates the intended motion of flaps 422 about the hinge 424 to match dimples 426 with apertures 420 Referring now to FIG. 17, when a web 434 of material is heat-sealed over the top of the tray 400, the interior of the tray 400 remains open to the atmosphere through the space between platform 414 and web 434 through aperture 420. As will be better understood below, it is many times desirable to close the aperture 420. This is done by pressing downwardly on the exterior of the dimple 426 forcing it to reverse itself as shown in FIG. 18 and extend downwardly to fill the aperture 420, thus closing it and sealing the inside of the tray 400 from the external atmosphere.

Referring again to FIG. 14, in one aspect of the present invention, the tray package can be used to store and transport red meat 436, for example, ground beef. In accordance with the present invention, the ground beef 436 may be ground in a conventional grinder. The grinder may be modified so that preconditioned carbon dioxide at a predetermined temperature is injected into the grinder head for two purposes. The first is to cool the grinder head; the second is to allow the carbon dioxide to mix with the ground beef 436 and become dissolved in the liquid therein. The dissolved carbon dioxide will aid in preservation of the ground beef during the storage period.

A web 434 of substantially gas permeable material is then placed over the tray 400 and beat sealed to the flange 410 in a manner as shown in FIG. 15. The web is taut over the top of the red meat to prevent its movement about the tray during handling. A label 432 may be applied to the upper surface of the web 434 if desired. Alternatively, a dual web can be employed as shown in FIGS. 2, 3 and 4 and a label sandwiched therebetween. Thereafter, the flaps or movable flanges 422 are folded over the top of flange 410 so that the dimples 426 reside over the apertures 420. However, it may be appreciated that any of the aforementioned trays with valves can be used with a dual web. The flaps 422 are then heat sealed along their outer edges to the flanges 410 at a second heat sealing station to form a completed package as shown in FIG. 16.

3.2.4. Embodiment

Figure 19:
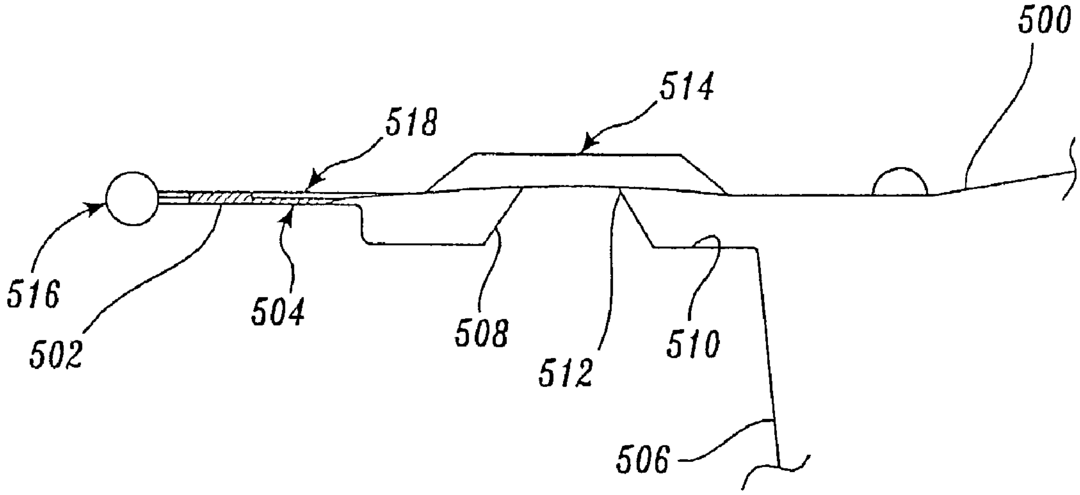
FIG. 19 shows a graphical illustration of a tray portion according to the present invention.
Figure 20:
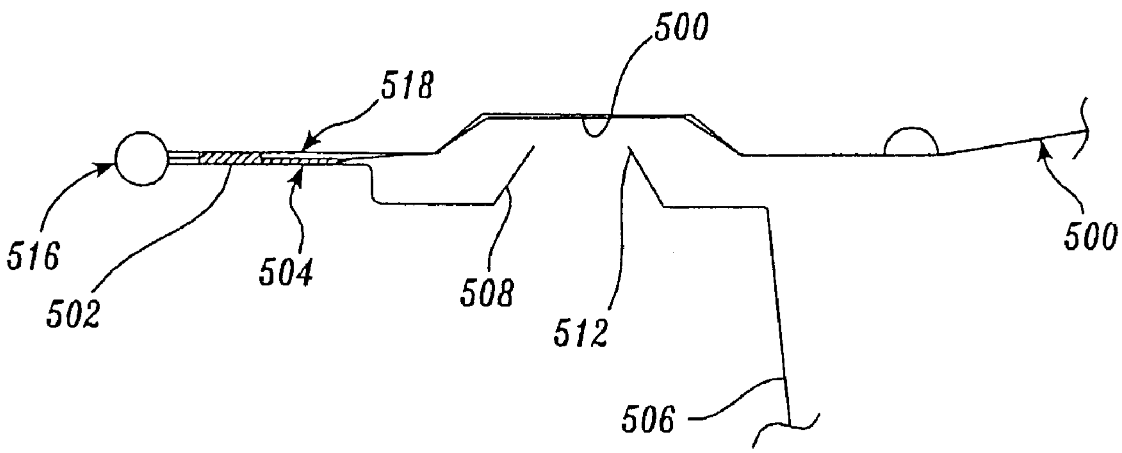
FIG. 20 shows a graphical illustration of a tray portion according to the present invention.

Referring now to FIGS. 19 and 20, one embodiment of a stackable tray with tray valve constructed according to the present invention is shown. It is apparent that FIGS. 19 and 20 show only a portion of the tray including the flap and valve, and the remainder of tray can be constructed in accordance with any of the embodiments herein described. In this embodiment of a tray valve, a web 500 of substantially gas permeable material is heat sealed at seal 502 to the top of the peripheral flange 504 of a tray 506. A frustoconical tube 508 extends upwardly from ledge 510 and terminates in an opening 512 that is slightly above the level of the peripheral flange 504. After heat sealing web 500 to the peripheral flange 504, the web 500 overlying the opening 512 contacts the upper edge of the frustoconical member thus forming an effective valve to close the interior of the tray 506 from the atmosphere.

A flap 518 is attached to the ledge 510 at hinge 516. FIGS. 19 and 20 show the flap folded over so that the flap covers the opening 512. At the location adjacent to the opening 512, the flap includes a dome 514 that extends away from the opening 512. Therefore, the web 500 is in intimate contact with the upper edge of the opening 512, but the flap is not.

FIG. 20 shows the intended operation of the valve. During evacuation of the master container, the portion of the web 500 over the frustoconical member 508 will elastically extend away from the aperture until the gas inside the package is completely withdrawn, allowing full evacuation of the individual container (or retail package). This occurs because the air/gas pressure inside the retail package is greater than the air gas pressure outside the retail package during evacuation. When gas flushing (described in detail below) occurs, which immediately follows evacuation, the web at the opening 512 will again be elastically extended and lifted off the rim of the frustoconical member 508. This again occurs because a partial vacuum remains in the recess of the dome 514 overlying the frustoconical member. Moreover, during gas flushing, at least the initial pressure in the container is less than that on the outside thus allowing gas pressure on the outside to distend the web 500 away from the opening 512. After equilibration, the tension of the web 500 over the rim of the frustoconical member 508 remains so as to effectively close it and prevent ingress of undesirable material into and/or egress of juice or matter from the container 506.

3.2.5. Embodiment

Figure 21:
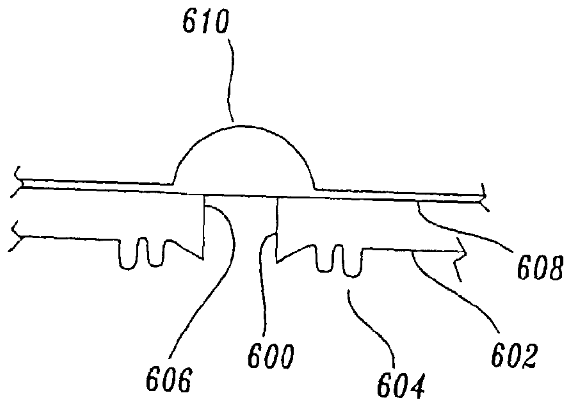
FIG. 21 shows a graphical illustration of a tray portion according to the present invention.
Figure 22:
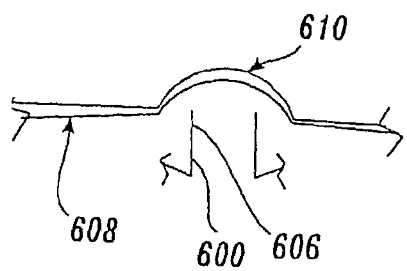
FIG. 22 shows a graphical illustration of a tray portion according to the present invention.
Figure 23:
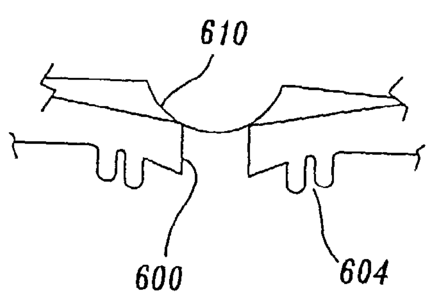
FIG. 23 shows a graphical illustration of a tray portion according to the present invention.

Referring now to FIGS. 21–23, another alternative arrangement for a valve structure similar in operation to that shown in FIGS. 19 and 20 includes a tube section 600 that extends upwardly from the upper surface of ledge 602. The tube section 600 is connected to the ledge 602 by a concentric bellows structure 604 that allows the tube section 600 to move upwardly and downwardly relative to the ledge. In practice, the upper lip of the tube section 600 (which forms an opening into the tray from the outside) is in contact with the web 608. A dimple 610 resides over the upper edge of the tube section 600. During evacuation and gas flushing, the web 608 will distend away from the lip 606 as shown in FIG. 22 of the tube section 600 in the same manner as described in conjunction with FIGS. 19 and 20. However, the tube section 600 may be more permanently closed by depression and reversal of the dimple 610 as shown in FIG. 23. Full reversal of the dimple 610 would push the tube section 600 downwardly against the resistance of the bellows structure 604, forming a very tight closure between the upper lip 606 of the tube section 600 and the bottom surface of the reversed dimple 610.

Trays constructed in accordance with the present invention provide a way of evacuating the interiors of trays and in some instances can provide a closable mechanism. In addition, trays constructed according to the present invention provide for ledges which allow the trays to be stacked in a convenient fashion in master bag or master containers as will be described in further detail below. Further, valves according to the present invention may be one way only valves.

3.2.6. Embodiment

In one aspect of the invention, trays can be provided with extended flaps that can be folded adjacent to the tray sidewalls, thus providing a double wall construction with an interior space between the inner and outer tray walls. While, reference is made to embodiments that have flaps that can be folded over the exterior wall of a tray, it can be appreciated that the flap and tray, can be constructed wherein the flap is folded in the opposite direction and over the interior of the wall of a tray. A double wall construction provides added rigidity and a means for stacking the trays atop one another. Furthermore, trays with extended flaps made in accordance with the invention include channels and apertures and are capable of being evacuated within a master container. Trays with flaps and trays with channels that are constructed according to the present invention provide sturdier stackable trays that are able to be evacuated of air and flushed with inert gases and additionally provide channels and spaces to retain any liquids exuded from the purchased goods.

Any suitable substances that enhance the keeping qualities of goods can be provided into the spaces between the flaps and the tray walls. Water, liquid and purge absorbing substances can be provided in those spaces which may be arranged so as to be non absorbing prior to exposure to and capable of absorbing liquids only after exposure to microwaves or a magnetic field.

Figure 24:
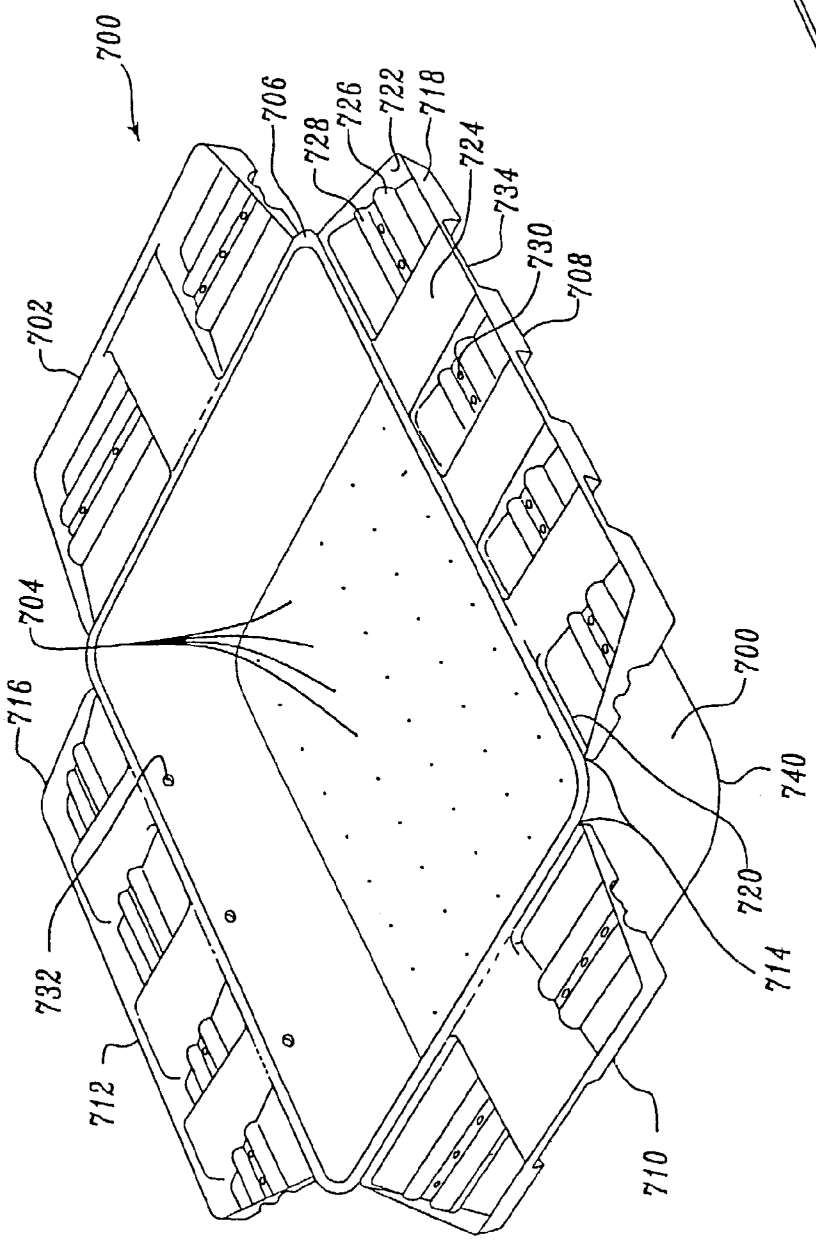
FIG. 24 shows an isometric illustration of a tray according to the present invention.

Referring now to FIG. 24, a packaging tray 700 with flaps constructed according to the present invention is shown. The tray 700 including flaps 702, 708, 710 and 712 can be thermoformed from suitable materials such as polystyrene, polyester and polypropylene in a solid or foamed sheet. In one embodiment, the tray 700 is suitably thermoformed from an expanded polystyrene sheet of suitable thickness no less than about 0.1 mil and sometimes no less than 1 mil. In some instances, the tray thickness can be adjusted for better utilization of materials, meaning finding the suitable rigidity for the least amount of material used. Tray 700 includes a base with perforations 704. Four upwardly extending sides from the tray base terminate at a common flange 706. Each flap 702, 708, 710 and 712 is attached to flange 706 at the external edge of flange 706 by way of hinges 714. Flap 702 is provided with a profile that mirror images flap 710, and flap 708 is provided with a profile that mirror images flap 712. The flaps are attached to the outer edge of flange 706 at hinges as shown, such that flaps will fold downwardly and intimately contact the outer surfaces of the tray walls. The cross-sectional profile of flaps 702, 708, 710 and 712 are similar, flap 702 and flap 710 being of substantially similar dimensions, and flap 708 and flap 712 being of substantially similar dimensions. Flaps may be formed to include a rim 716 that follows a continuous path around the perimeter of each flap. Flaps include a profile that includes a flap base 718, a flap flange wall 720 and external flap vertical walls 722. Buttresses 724 are formed into the flap profile and connect the flap flange wall 720 to flap base 718. Horizontally disposed ridges 26 and 728 provide horizontal channels that connect buttresses 724 with continuous communication to openings at each end of flaps in flap vertical walls 722. Apertures 730 are provided between the ridges. Apertures 730 thereby provide communication through flaps at locations between the buttresses. Apertures 732 are provided in the upwardly extending walls of tray at points adjacent to the buttresses 724 such that when the flaps are folded into a vertically disposed position relative to the tray 700, apertures 732 provide direct communication through the tray walls with the buttress recesses 734.

Figure 25:
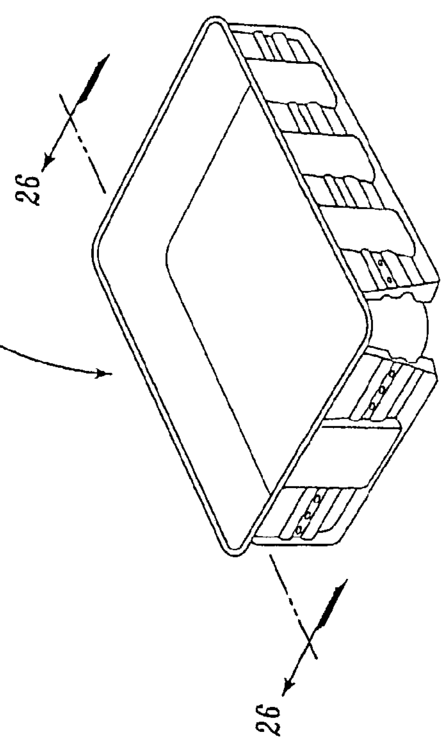
FIG. 25 shows an isometric illustration of a tray according to the present invention.

Referring now to FIG. 25, a three dimensional sketch of the tray 700 with flaps folded downwardly, is shown. When the flaps are folded to a downward position, the flap flange wall 720 is in contact with the underside of flange 706. In this position, the flaps are located in close proximity and in contact with the upwardly extending tray sides. Flap base 718 is substantially horizontally disposed relative to the tray 700 and provides an extension to the base of the tray such that when a tray 700 with flaps folded as shown in FIG. 20 is placed directly above a similar tray, the flap base is adjacent to and resting on flange 706 of an underlying tray. It should be noted that while the tray 700 shown in FIG. 24 includes a tray with four flaps, any number of flaps from one to four may be provided according to preferences and any specific requirements of a particular application.

Figure 26:
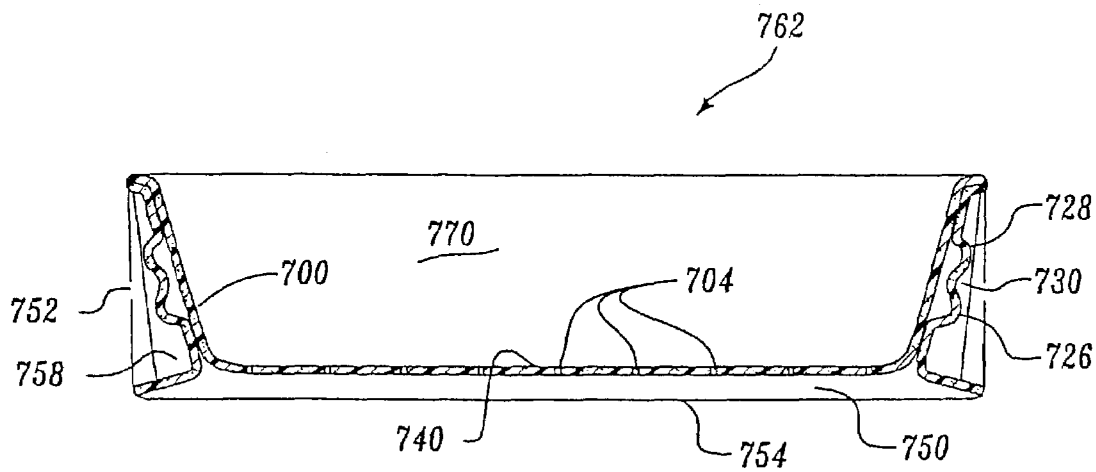
FIG. 26 shows a cross section illustration of a tray according to the present invention.

Referring now to FIG. 26, tray base 740 is shown with perforations 704 therein. Perforations 704 may extend directly through tray base or partially therethrough from either side. Perforations 704 can provide absorption of liquids that may accumulate adjacent thereto, by the open cell structure of the tray base material, such as when the tray has been thermoformed from expanded polystyrene sheet which is, at least in part, of open cell structure.

A space 750 is shown which can be provided if desired. Space 750 can be provided after a tray with flaps is inserted into a pre-formed shrink bag that is then exposed to elevated temperature that can cause the shrink bag to shrink around the tray with flaps. Alternatively, the profile of the tray with flaps can be arranged such that space 750 is substantially minimized when the tray base 740 is in direct and intimate contact with the shrink bag. Shrink bags may be printed as required with information of interest to any person interested in purchasing the finished package. Such shrink bags are manufactured for example by Robbie Manufacturing Inc., and are well known by the name PromoBag™. Shrink bags can be printed and fabricated from a clear, biaxially-oriented, heat shrinkable, anti-fog, polyolefin film material manufactured by E. I. Dupont De Nemours and known as Clysar AFG anti-fog shrink film. Clysar is a registered trade mark of Dupont, details of which can be obtained from Dupont or on the internet at www.clysar.com.

Figure 27:
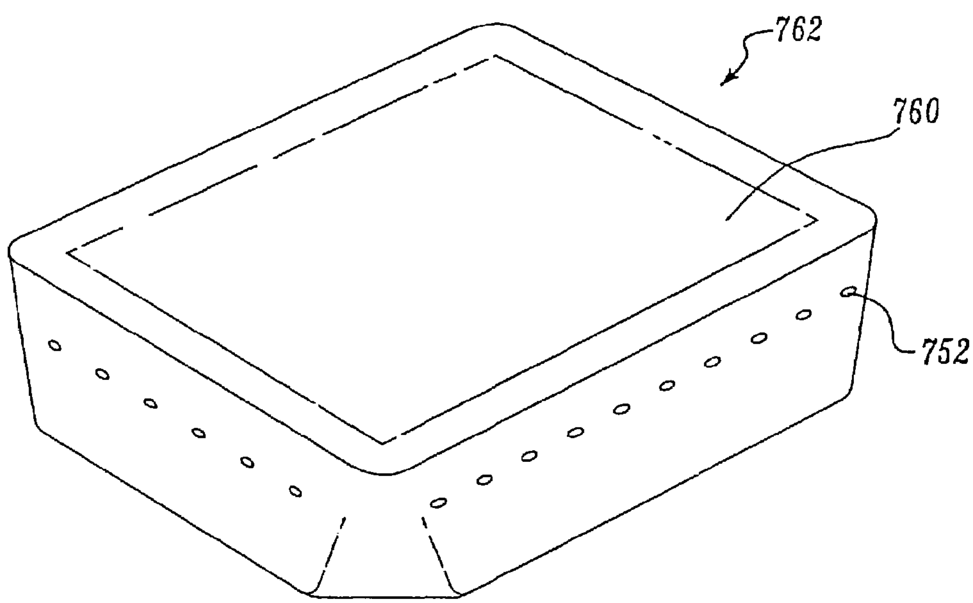
FIG. 27 shows an isometric illustration of a package according to the present invention.

Referring now to FIG. 27, a finished package is shown. The finished package includes a cover 760 which may be a shrink bag as described above or any other suitable packaging material. The finished package 762 may contain perishable goods such as fresh red meats or fresh ground meats.

Referring now to FIG. 26, apertures 752 can be provided at optimized locations and/or as shown, in the outer cover shrink material 760 of the finished package 762. Apertures 752, may be provided in the bag or web of shrink material 754 before or after package assembly, thereby providing direct communication from external atmosphere from apertures 752 through space 758, apertures 730, channels 726, 728, buttress recess 734 and apertures 732, and into the tray cavity 770.

Figure 33:
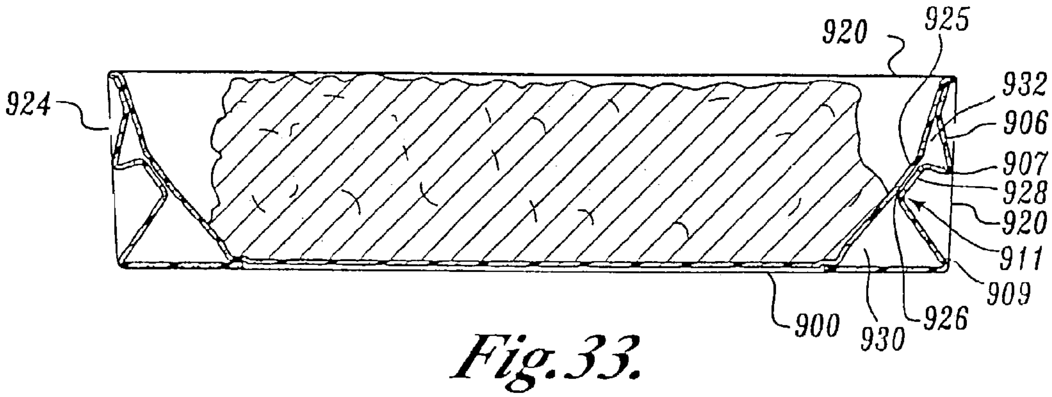
FIG. 33 shows a cross section illustration of a package according to the present invention.
Figure 34:
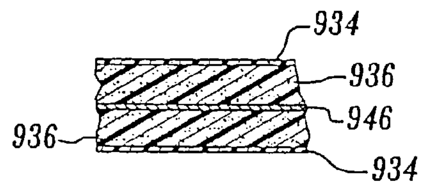
FIG. 34 shows a cross section illustration of a web according to the present invention.

Referring again to FIGS. 26 and 27, it can be seen that by manufacturing trays having one or more of the features herein described, any liquids that may accumulate within the tray cavity 770, such as blood, will be substantially restricted from escaping through apertures 752 shown in FIGS. 33 and 34. This restriction is provided by the arrangement of flaps, channels, apertures, etc., therein, and the location of the apertures. Furthermore, perforations 704 provide for retention of the liquids within the package.

3.2.7. Embodiment

Figure 28:
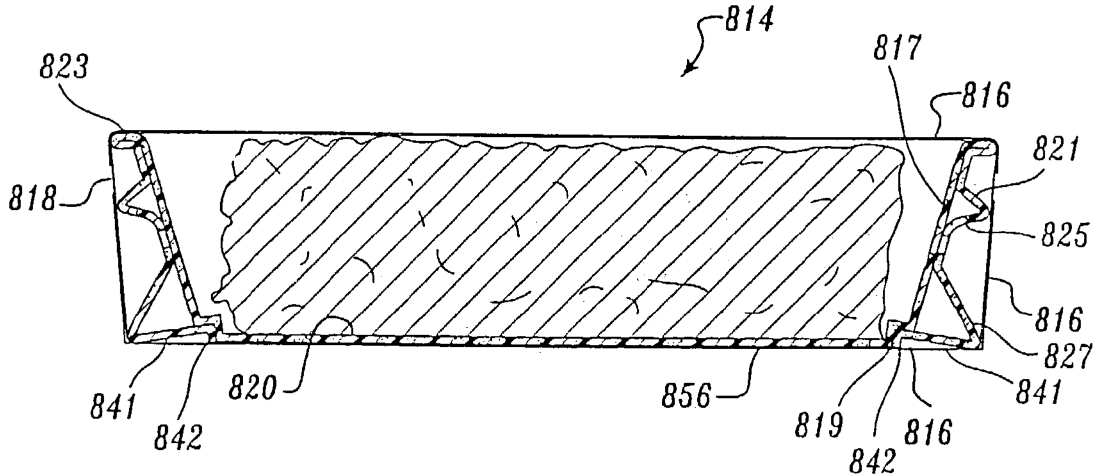
FIG. 28 shows a cross section illustration of a package according to the present invention.
Figure 29:
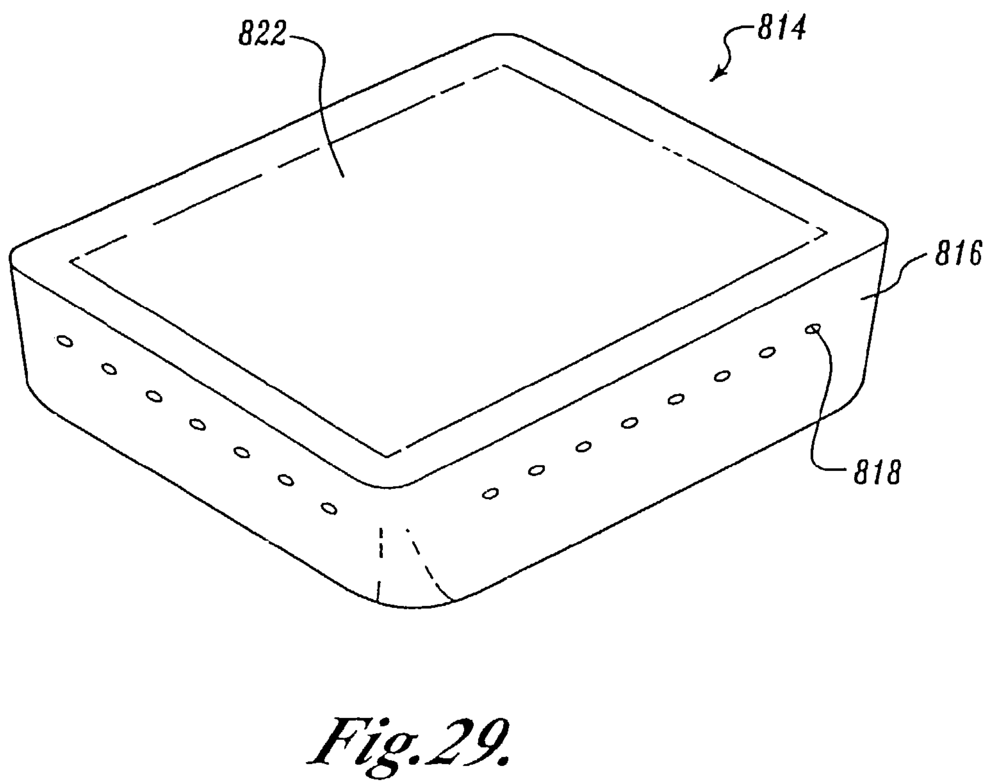
FIG. 29 shows an isometric illustration of a package according to the present invention.

An alternate embodiment of a tray with flaps constructed according to the present invention is shown in FIGS. 28–29.

Referring now to FIG. 28, a cross-sectional view of finished package 814 is shown. Finished package 814 includes a packaging tray 856 with perishable goods located in the tray cavity and an outer cover 816. The outer cover 816 includes an envelope of material that completely covers and encloses the packaging tray 856 and the perishable goods and is heat sealed to provide a sealed package. The outer cover 816 may be manufactured from a shrink material such as Clysar, manufactured by DuPont, and can be printed such that all surfaces are rendered opaque leaving a transparent window 822 on the upper surface only, as shown in FIG. 29 of the finished package 814. In one embodiment, Clysar outer cover shrink material is then heat shrunk such that the outer cover shrinks, holding the flaps against the tray walls. Apertures 818 are provided on the four vertical faces of the finished package when the base 820 of tray is horizontally disposed.

The tray of FIG. 28 includes four flaps similar to the flaps of the tray of FIG. 24, with modifications as described herein. In one aspect of the tray 856, the tray base 820 is substantially flush with the flap ends 841. To this end, the tray walls 817 are substantially planar, but slightly outwardly biased. The lower portion of walls 817 include a recess 819, wherein a corresponding portion of the tray flap 821 mates with the wall, providing a substantially sturdy construction. Recess 819 may be filled with any suitable adhesive to bond flap 821 with the tray 856. Flaps 821 like flaps 702, 708, 710 and 712 of FIG. 24 include a flap end wall that can bond to the underside of the flange 823. Continuing downward, the profile of the flap is to lie adjacent to the tray wall 817, followed by an outwardly protruding first peak or ridge 825 that at one point can make contact with the outer cover 816. Continuing downward from the first peak, the flap profile returns to lie adjacent to the tray wall 817 for a second portion, and then extends at a less obtuse angle that forms a second peak or ridge 827. The flap base 841 is then constructed to lie substantially flush with the tray base 820, and includes a short downward leg 842 that fits within recess 819. Flaps 821 may include a plurality of apertures or channels creating spaces between the inner wall 817 and flap 821 that aid in the channeling and/or retention of fluids, such as any desired gases or juices from the product. Furthermore, any suitable substances for enhancing the keeping qualities of goods can be provided into the spaces between the flaps and the tray walls. Water, liquid and purge absorbing substances can be provided in those spaces that may be arranged so as to be non-absorbing prior to exposure to and capable of absorbing liquids only after exposure to microwaves or a magnetic field.

Figure 30:
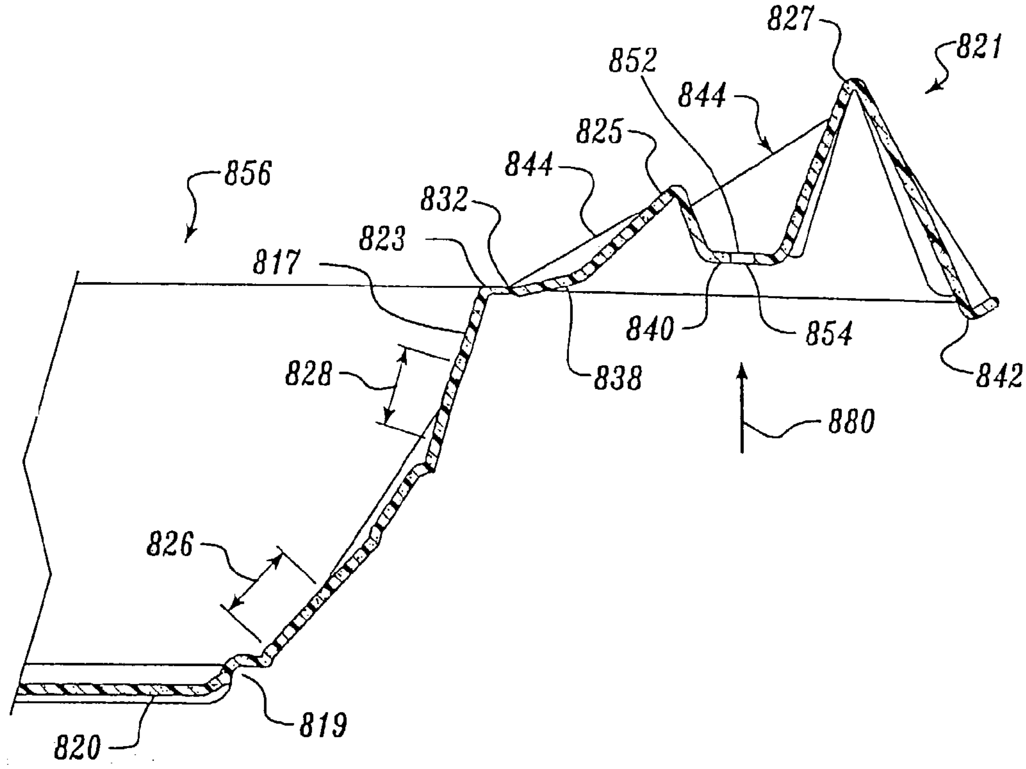
FIG. 30 shows a cross section illustration of a tray portion according to the present invention.

Referring now to FIG. 30, a detailed section of an alternate embodiment of packaging tray 856 with base 820, tray wall 817 and flange 823 attached to flap 821 at a hinge 832, is shown. The relative position of flap 821 and the section of tray is in the "open position". Flap 821 is attached at hinge 832 to flange 823, however flap 821 is not folded downwardly.

Figure 31:
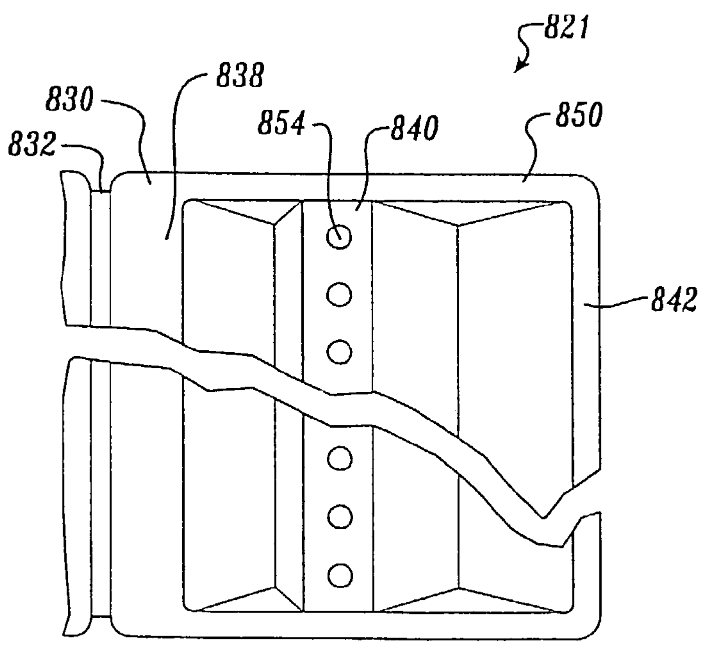
FIG. 31 shows a bottom illustration of a tray portion according to the present invention.

FIGS. 30–31 show an embodiment wherein the tray walls are perforated in sections shown as incision section 826 and incision section 828, shown in FIG. 30. Perforations of the incision sections 826 and 828 may be in the form of small holes or incisions that extend fully through the tray walls, but may be provided only within the limits of the regions shown as incision sections 826 and 828.

Referring now to the flap 821 of FIG. 30, a cross-section is shown including a first and second raised peaks 827 and 825, respectively, and a flat area shown as face 838 and face 840; also shown are a leg 842; and gussets 844, with connecting sections therebetween. Packaging tray 856 includes a base 820, flange rim 823 with tray wall connecting base of tray 820 to the flange 823. Tray wall 817 includes recess 819 at a lower portion of the tray wall 817 in proximity to the base 820, a first incision section 826, recess 819 and a second incision section 828. FIG. 31 shows a view of flap 821 from the direction of arrow 880. Flap 821 includes a perimeter 830 including hinge 832 connecting flap 821 to the tray flange 823. Face 838 and end flanges 850 are connected together to provide the continuous flat perimeter. Referring now to FIG. 30, a depressed area 852 may be provided in the flap section between peak 827 and ridge 825 but does not perforate the section. Apertures 854 are provided in face 840 to provide direct communication therethrough.

Figure 32:
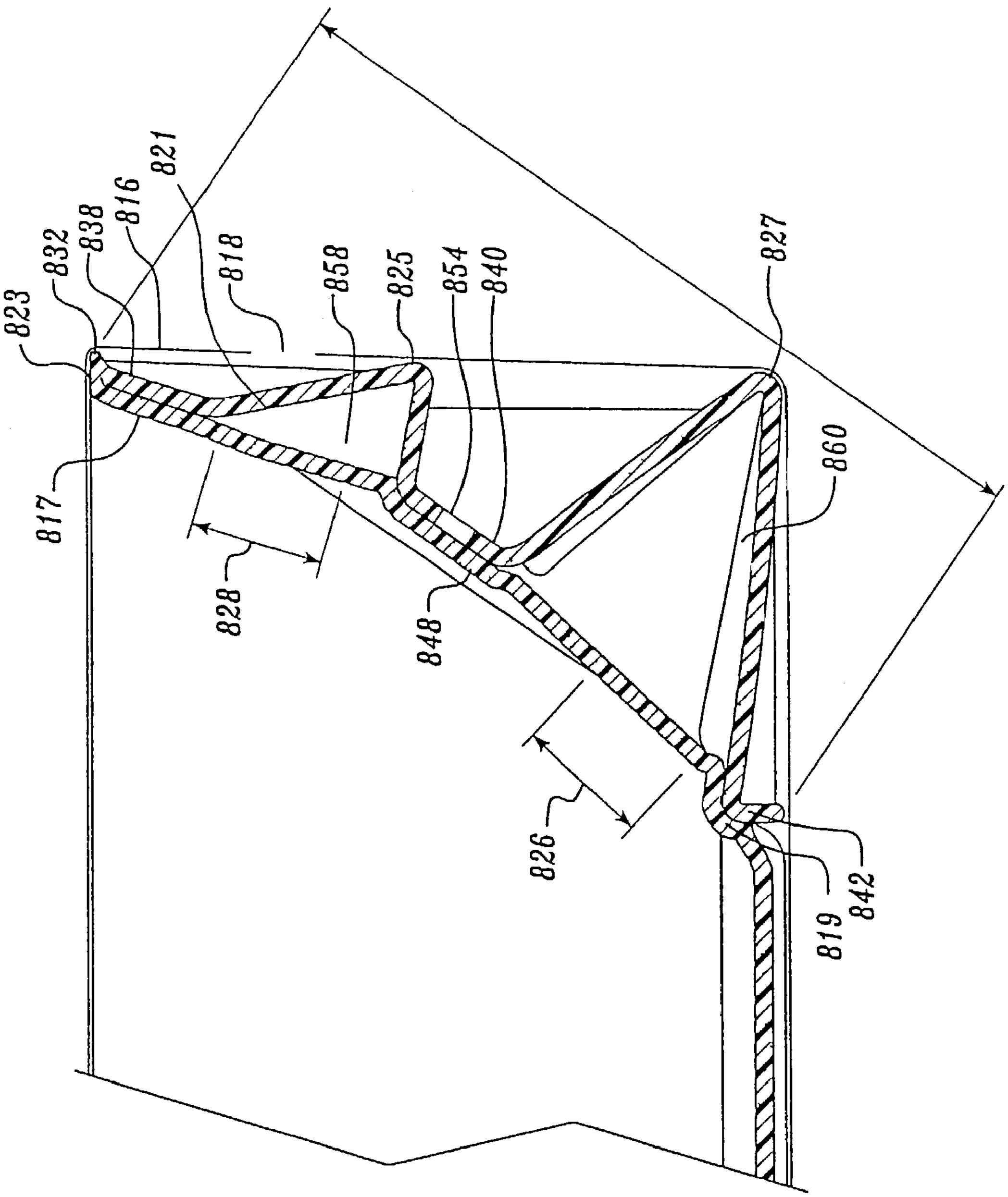
FIG. 32 shows a cross section illustration of a tray portion according to the present invention.

Referring now to FIG. 32, an enlarged view of a tray portion is shown. Flap 821 and the tray wall 817 are in adjacent contact and leg 842 and recess 819 are engaged. Faces 838 and 840 as shown in FIG. 32, are in direct and intimate contact with the tray wall 817. Face 840 may be located in recess 848, thereby closing apertures 854 when in this position. Spaces 860 and 858 are directly adjacent to first and second incision sections 826 and 828, respectively. Shrink film 816 holds flap 821 firmly and tightly against the tray wall 817 providing sealed contents within the finished package. The package may be colorized to prevent translucency. An adhesive such as a cold seal latex is provided between the continuous perimeter 830 of the flap as shown in FIG. 31 and the tray wall 817. The tray wall 817 is inwardly flexible such that when a vacuum is provided within the tray cavity, the recess 848 and face 840 will separate to provide direct communication from within the tray cavity via perforations or incisions at first and second incision sections 826 and 828 through apertures 854, and through apertures 818 in outer cover shrink film 816.

As with the other tray embodiments disclosed herein, a plurality of finished packages 814 (see FIGS. 28 and 29) of this embodiment can, as well, be stacked and placed inside a gas barrier master container inside a vacuum chamber. Substantially all the air may be evacuated from within the gas barrier container and from inside the finished packages. Air is evacuated from within the packaging tray cavity through perforations and/or incisions in the tray wall at first and second incision sections 826 and 828 into space 860 and 858, created when the flap is placed adjacent the tray wall, the air flows through apertures 854 when the tray wall 817 is distended, and then the flow path follows into apertures 818 in the outer cover 816. A suitable gas or gas blend such as nitrogen and carbon dioxide can then be provided into the vacuum chamber. The desired gas can be provided in a reverse flow direction into the finished packages by way of direct communication through apertures 818, apertures 854 into spaces 860 and 858, through perforations at incision sections 826 and 828 and thereby fill all free space within the finished packages in the gas barrier master container. A gas barrier lid can then be hermetically heat sealed to the opening of the gas barrier master container and the finished packages in the hermetically sealed master container can then be stored at a controlled temperature for a desired period of time prior to opening the master container and removal of the finished packages for retail sale. In this way air and gases can be removed from the finished and sealed packages by evacuation and then replaced by gas flushing with a desired gas, while liquids such as blood cannot readily escape.

3.2.8. Embodiment

Another embodiment of a tray with flaps is shown in FIGS. 33–37. Tray 900 includes flaps 906, wherein the flaps can be folded to lie in an adjacent position to tray sidewall 925. The flap 906 includes a first 907 and a second 909 ridge with a depression 911 spanning therebetween. The face on opposite side of the depression 911 is not in touching proximity with the tray sidewall 925, thus providing gap 926 between the flap 906 and the tray wall 925. The flap 906 is in a folded down position and a gap 926 is arranged between openings 928 and the tray side wall 925. The shrink film 920 holds the flap 906 firmly and tightly against the tray wall 925. An adhesive such as a cold seal latex, or any other suitable adhesive may be provided between the flap 906 and the tray walls 925 so as to cause sealing and bonding where contact between the flaps and the tray walls occurs.

FIG. 34 provides details of a cross-section through a section of the tray wall and the flap when in direct contact with each other. It is to be appreciated that a flap is an extension of the material that similarly forms the tray body, however, in this instance the exterior of a tray wall will be bonding to a flap that has been folded over so that similar materials are bonded to one another. In one instance, a material or "skin" 934 is shown on the outer surfaces of the section directly adjacent to EPS foam 936 that is bonded together by adhesive layer 946 causing a secure bonding and sealing of the tray wall and the flap together. The sealing and bonding can be arranged so as to provide a completely sealed and "liquid tight" condition such that any liquids contained in the spaces 930 and 932 will be retained within the spaces.

Figure 35:
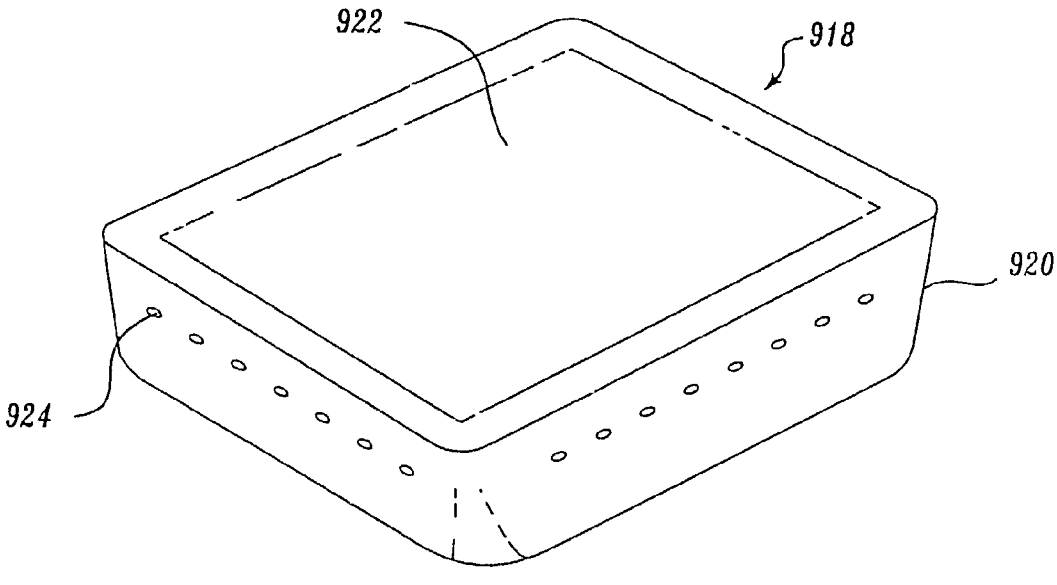
FIG. 35 shows an isometric illustration of a package according to the present invention.

Referring now to FIG. 35, an elevation of a finished package 918, is shown. The finished package 918 includes a packaging tray as shown in FIG. 33 with perishable goods located in tray cavity with an outer cover 920. The outer cover 920 includes an envelope of material that completely covers and encloses the packaging tray and the perishable goods therein. The outer cover 920 is heat sealed to provide a sealed package. The outer cover 920 may be manufactured from a shrink material such as Clysar, manufactured by DuPont, or alternatively a stretch wrapping material such as Mapac -M, a plasticized polyvinyl chloride web material manufactured by AEP Industries, Inc. The outer cover 920 can be printed such that all surfaces are rendered opaque leaving a transparent window 922 on the upper surface as shown in FIG. 35. Clysar outer cover shrink material is then heat shrunk such that the outer cover shrinks, holding flaps against the tray walls. Alternatively, if the Mapac -M, pPVC material is used, heat shrinking may not be required and the Mapac -M material is stretched over the tray with flaps such that flaps contact the tray walls. In one aspect, apertures 924 are provided on the four vertical faces of the finished package. The apertures 924 are conveniently located in such a location so as to minimize the probability of any liquids, such as blood or "purge", escaping therethrough. For example, apertures 924 can be provided in the space created by the first ridge 907 as shown in FIG. 33.

Figure 36:
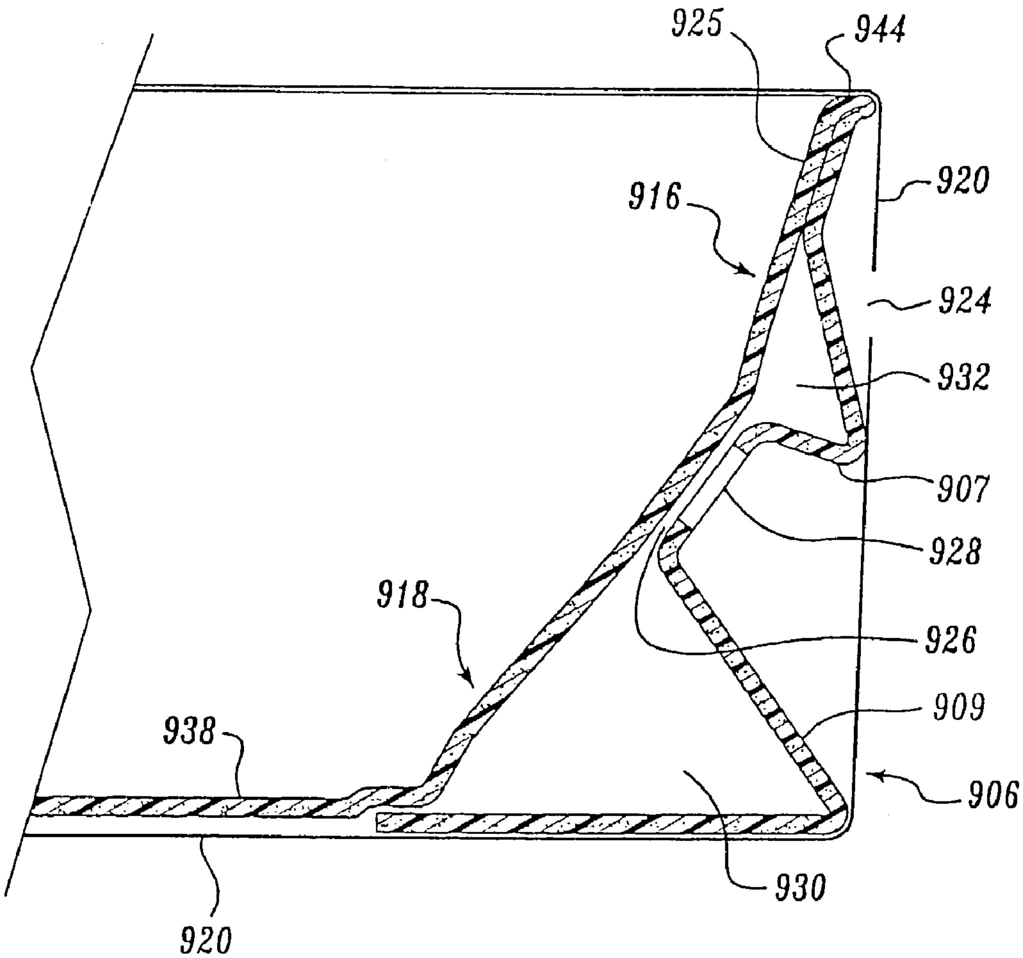
FIG. 36 shows a cross section illustration of a tray portion according to the present invention.
Figure 37:
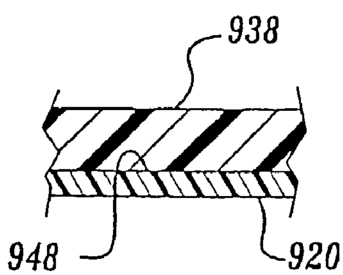
FIG. 37 shows a cross section illustration of a web according to the present invention.

Referring now to FIG. 36, an enlarged view of a cross section of the tray of FIG. 33 is shown. The flap 906 and the tray wall 925 are in some areas in intimate contact with each other. The gap 926 is arranged between openings 928 and the tray side wall 925. Spaces 930 and 932 created by the ridges 907 and 909 and the tray side wall 925 are directly adjacent to incision sections 918 and 916. A suitable adhesive can be applied between the flap 925 and the tray at all direct points of contact therebetween causing a secure bonding and sealing of the tray and the flap 906 together. The sealing and bonding can be arranged so as to provide a substantially sealed and "liquid tight" condition such that any liquids contained in spaces 930 and 932 will be retained. The shrink film, outer cover 920 holds the flap 906 firmly and tightly against the tray wall 925. Referring now to FIG. 37, a cross-section of the tray base portion 938 and the outer cover 920 are shown to be in adjacent disposition. An adhesive layer 948 can be provided so as to completely bond the outer cover 920 to the base of tray 938.

Furthermore, when the outside-surface of foam is arranged to have a capacity to absorb liquids, such liquids can be retained and substantially prevented from escaping from within the finished package. Additionally, a suitable adhesive can be provided between the tray flange rim 944 and the outer cover 920 where the continuous flange rim 944 is in contact with the outer cover 920 so as to cause bonding in a substantially liquid tight fashion therebetween. The openings at incision sections 916 and 918 in the tray wall 925, openings 928 in the flaps and apertures 924 in the outer cover 920 provide a passage and direct communication from the tray cavity to the outside of the finished package such that when the finished package is exposed to a vacuum, air and gases can be removed from within the package and replaced with a desired gas or mixture of gases through the passage.

3.2.9. Embodiment

Figure 38:
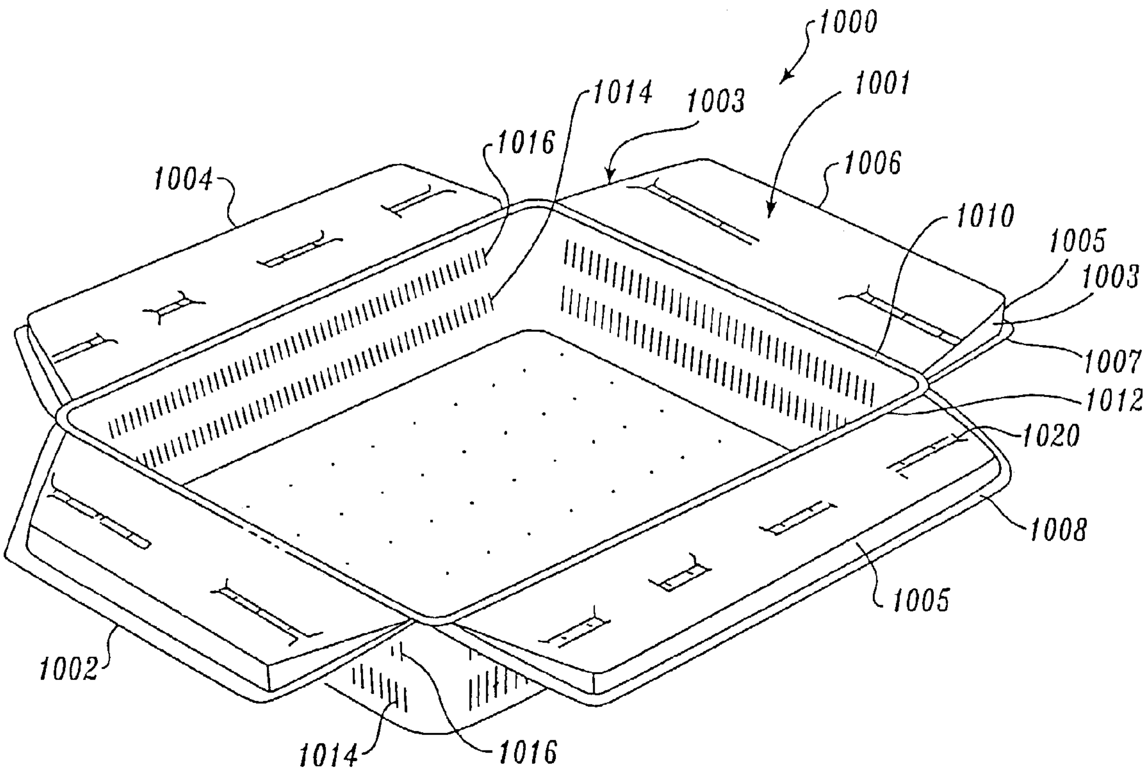
FIG. 38 shows an isometric illustration of a tray according to the present invention.

Referring now to FIG. 38, another embodiment of a packaging tray with flaps constructed according to the present invention is shown. The packaging tray 1000 of this embodiment as with the packaging trays of previous embodiments is similar in operation, but with an alternate configuration of the channels through which evacuation and flushing is accomplished.

Figure 39:
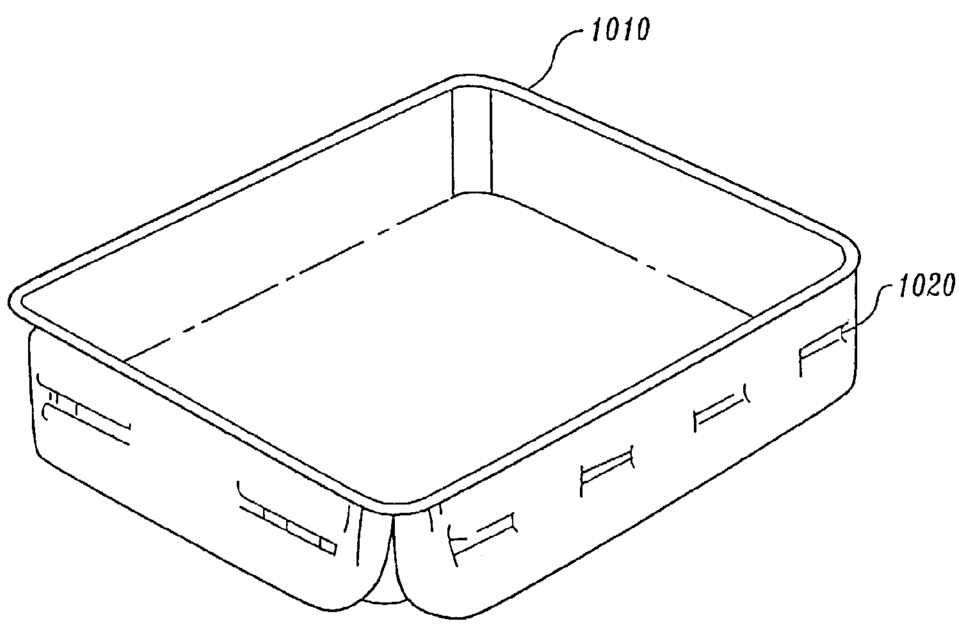
FIG. 39 shows an isometric illustration of a tray according to the present invention.

FIG. 38 shows detail of the packaging tray with flaps extended and including a tray with tray cavity and four flaps shown as flap 1002, flap 1004, flap 1006, and flap 1008. Flap 1002 is provided with a profile that mirror images flap 1006, and flap 1004 is provided with a profile that mirror images flap 1008. Flaps 1002, 1004, 1006 and 1008 are attached to the outer edge of flange rim 1010 at hinges 1012 as shown, such that flaps 1002, 1004, 1006 and 1008 will fold downwardly and intimately contact outer surfaces of the tray walls. FIG. 39 shows the packaging tray with flaps folded downwardly. The cross-sectional profile of flaps 1002, 1004, 1006 and 1008 are similar. Flap 1002 and flap 1006 being of substantially similar dimensions, and flap 1004 and flap 1008 being of substantially similar dimensions, but can be longer or shorter than flaps 1002 and 1006. Referring yet again to FIG. 38, the packaging tray 1000 includes a base with four upwardly extending tray walls terminating at a continuous flange rim 1010. The tray walls can be perforated with openings directly therethrough with the perforations arranged in sections shown as a first incision section 1014 and a second incision section 1016. The perforations may be in the form of small holes or incisions that extend fully through the tray walls, but are substantially provided within the limits of regions shown as first and second incision sections 1014 and 1016, respectively. Flaps 1002, 1004, 1006, and 1008 have a generally planar surface 1001 with two end walls 1003 that gradually increase in width from the flange rim 1010, so as to have their greatest width at the flap base 1005, thus, forming a substantially triangular appearance. The flap base 1005 connects the flap face 1001 the two flap end walls 1003 to a flap flange which forms a periphery around the flap end walls and flap base. The underside of the flap flange 1007 provides a suitable sealing surface for bonding to the tray 1000 thereto. This structure of flaps, thus creates a space between the flap face 1001 and the tray walls when the flaps are in a folded position as shown in FIG. 39. Apertures provided in sections 1014 and 1016 provide communication into the spaces formed between the flaps and tray walls. Apertures 1020 formed on the flaps provide a passage from the spaces formed between the tray flaps to the exterior of the tray as shown in FIG. 39. The combination of apertures 1014, 1016, and 1020 provide for evacuating and flushing the tray, for example, as in a master container.

3.2.10. Embodiment

Figure 40:
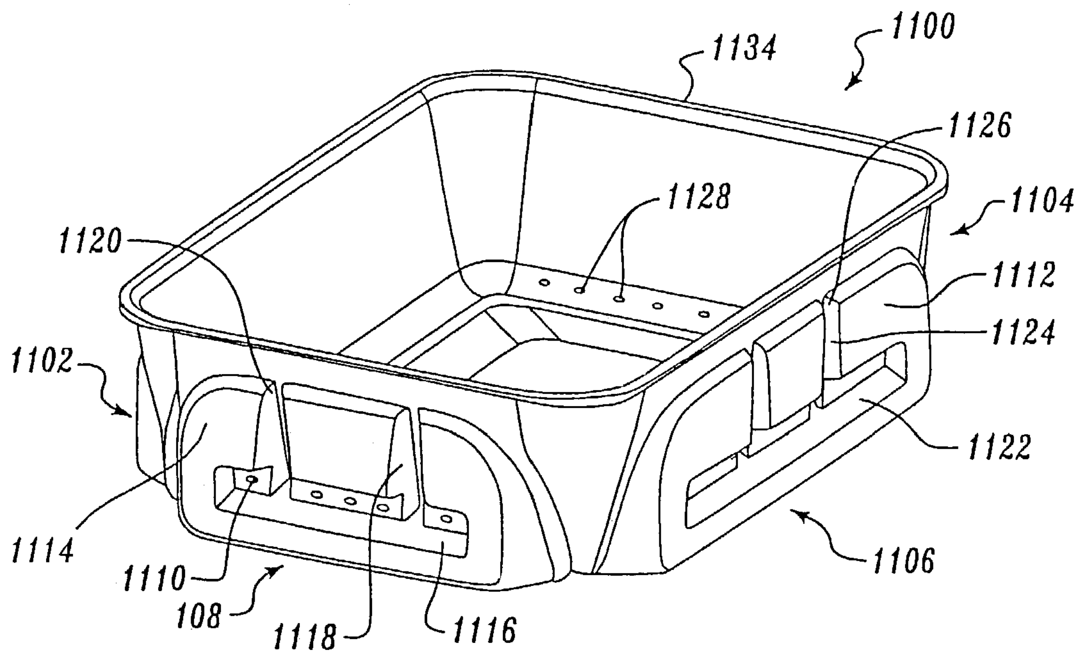
FIG. 40 shows an isometric illustration of tray according to the present invention.
Figure 41:
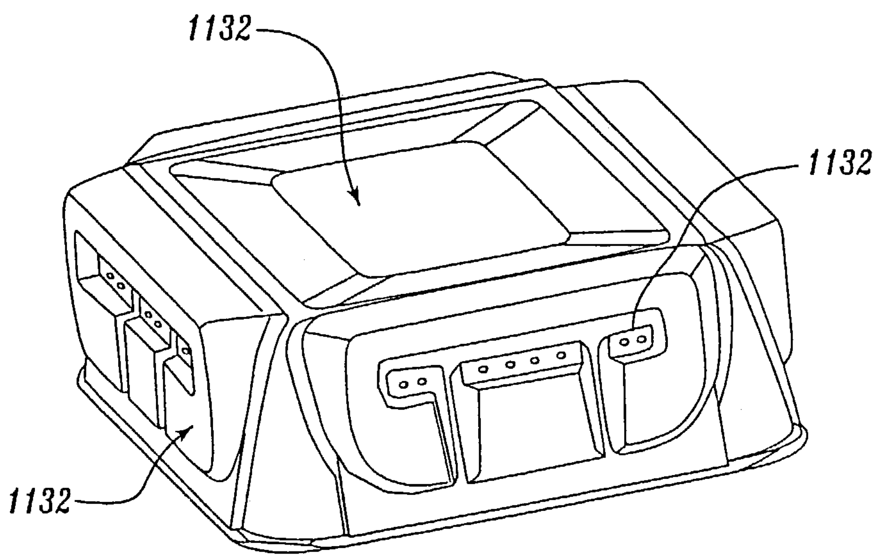
FIG. 41 shows an isometric illustration of a tray according to the present invention.
Figure 42:
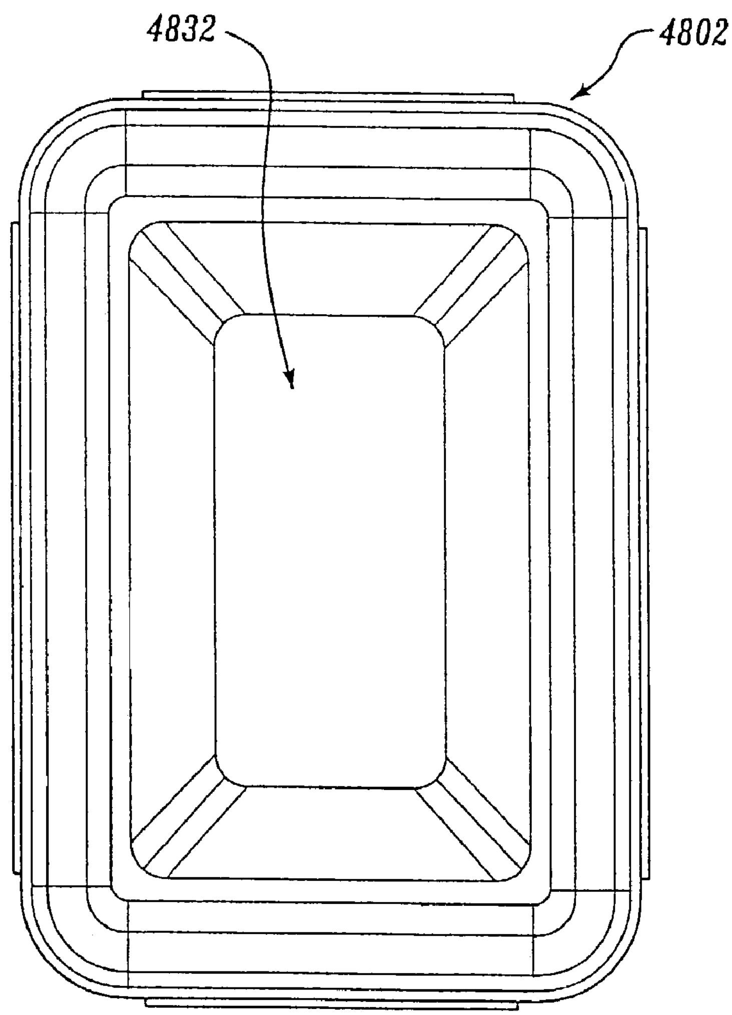
FIG. 42 shows a bottom illustration of a tray according to the present invention.
Figure 43:
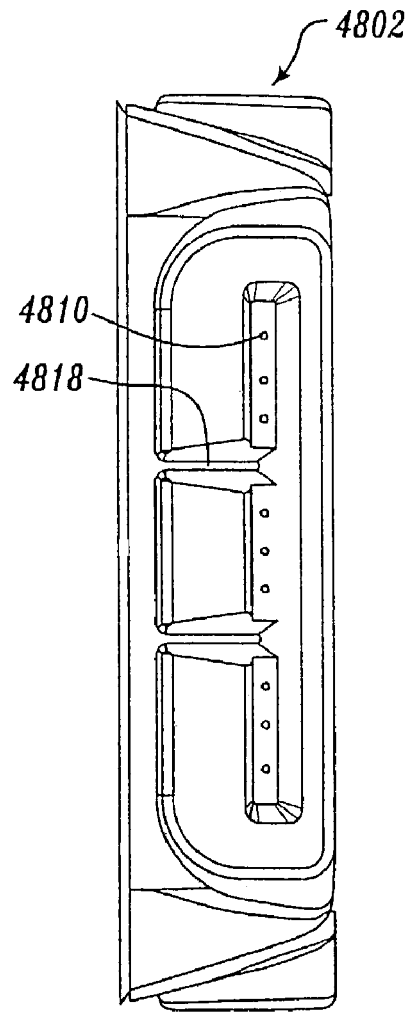
FIG. 43 shows a side illustration of a tray according to the present invention.
Figure 44:
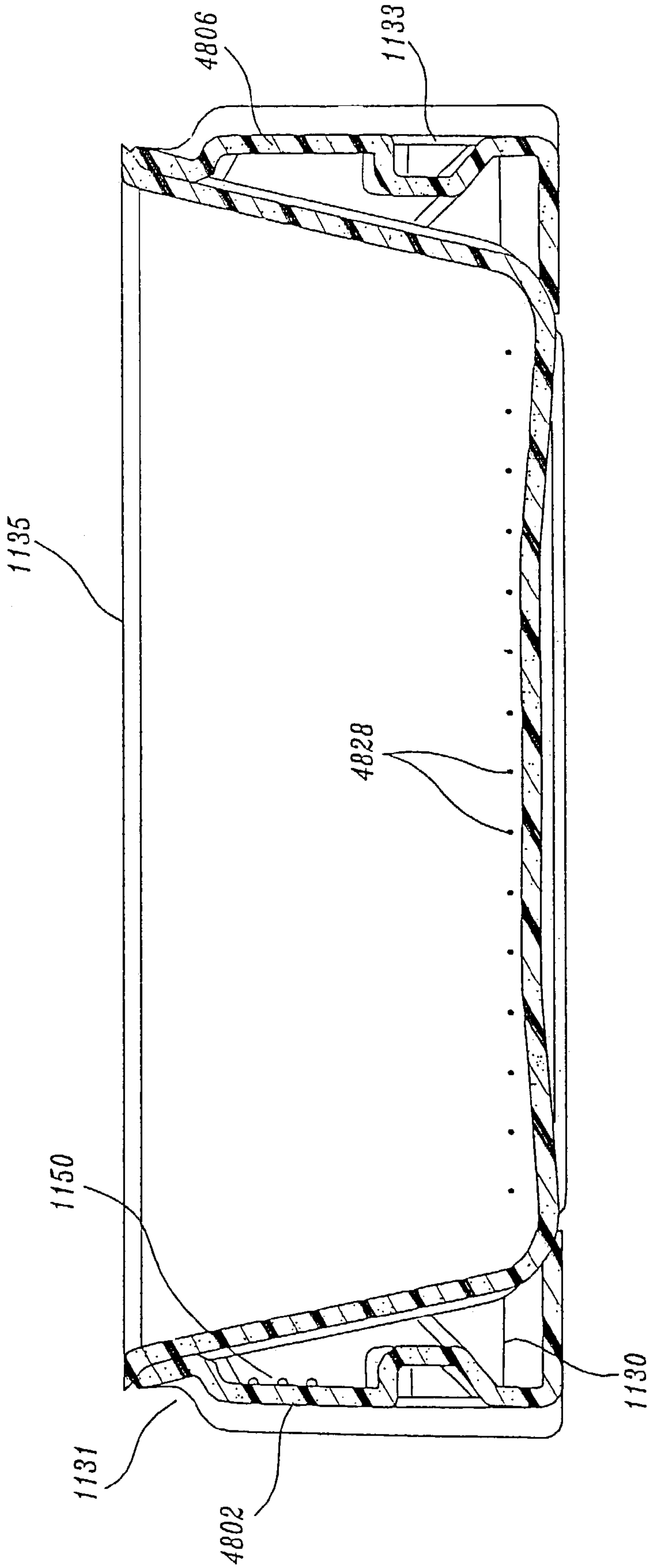
FIG. 44 shows a cross section illustration of a tray according to the present invention.

FIGS. 40–42 show yet another embodiment of a tray with flaps constructed according to the present invention. The tray 1100 of this embodiment is similar in operation to the trays described above. Referring to FIG. 40, a tray is shown whereby flaps 1102 and 1106 can be arranged so as to have no openings therein, and flaps 1108 and 1104 can be arranged to have openings 1110 therein. Tray 1100 as shown in FIGS. 40–44 can be over wrapped with a web of pPVC to produce a finished package. The web of pPVC can be printed on the inner surface with a heat activated coating that can provide a method of bonding the web of pPVC to faces 1112 on flaps 1102 and 1106 and face 1114 on flaps 1100 and 1104. The heat activated coating can be applied to the web of pPVC by typical offset printing process and applied in those areas of pPVC that will come into contact with the faces 1112 and 1114 after over-wrapping the tray 1100 with the web of pPVC in such a manner that when heat is applied to the pPVC, in contact with the faces 1112 and 1114 the web of pPVC will become bonded to the faces 1112 and 1114. The web of pPVC will thereby cover recess 1116 and recess 1118 in flaps 1108 and 1104 but will not fully enclose and isolate the recesses leaving openings at openings 1120. The web of pPVC can also thereby cover recess 1122 and recess 1124 in flaps 1106 and 1102 but will not fully enclose and isolate the recesses leaving openings at openings 1126. In this way, a path of direct communication from internal space of the tray to external atmosphere is provided through apertures 1128 in tray base into space 1130 (shown in FIG. 44) through apertures 1110 in flaps 1108 and 1104 only, and then into recesses 1116 and recesses 1118 and through openings 1120 into the space between the pPVC outer cover and tray through space 1131 (shown in FIG. 44) and therefrom through openings 1126 into recesses 1124 and 1128 and finally through apertures 1133 (shown in FIG. 44) that are provided in the outer cover 1135 pPVC adjacent to the recesses 1122 in flaps 1102 and 1106 to external atmosphere shown in FIG. 44.

The tray 1100, as well as any other tray herein described, may be thermoformed from any suitable material such as expanded polystyrene EPS materials as shown in FIGS. 231–239. The EPS materials may include several layers of co-extruded material that are arranged so as to allow any liquids that may enter space 1130 of FIG. 44 through apertures 1128 to be absorbed into the open cell structure of EPS materials through surface perforations 1150 that can be provided into the surface of the EPS materials that are adjacent to space 1130. Liquids can thereby be concealed within the layers.

The pPVC outer cover 1135 can be bonded to the underside of the tray 1100 by any suitable method, such as heat sealing or adhesive bonding, so as to follow contours of recess 1132 shown in FIG. 41. The pPVC outer cover can also be bonded, by any suitable method, such as heat sealing or adhesive bonding, to flange rim 1134 along the full length and perimeter thereof so as to inhibit liquids from passing between the flange rim 1134 and the pPVC over wrapping web of material after the bonding. In this way liquids that may accumulate in internal space of tray are restricted from escaping from within the finished package, while providing a path to allow extraction and injection of suitable gases into and out of the internal space of tray.

Figure 45:
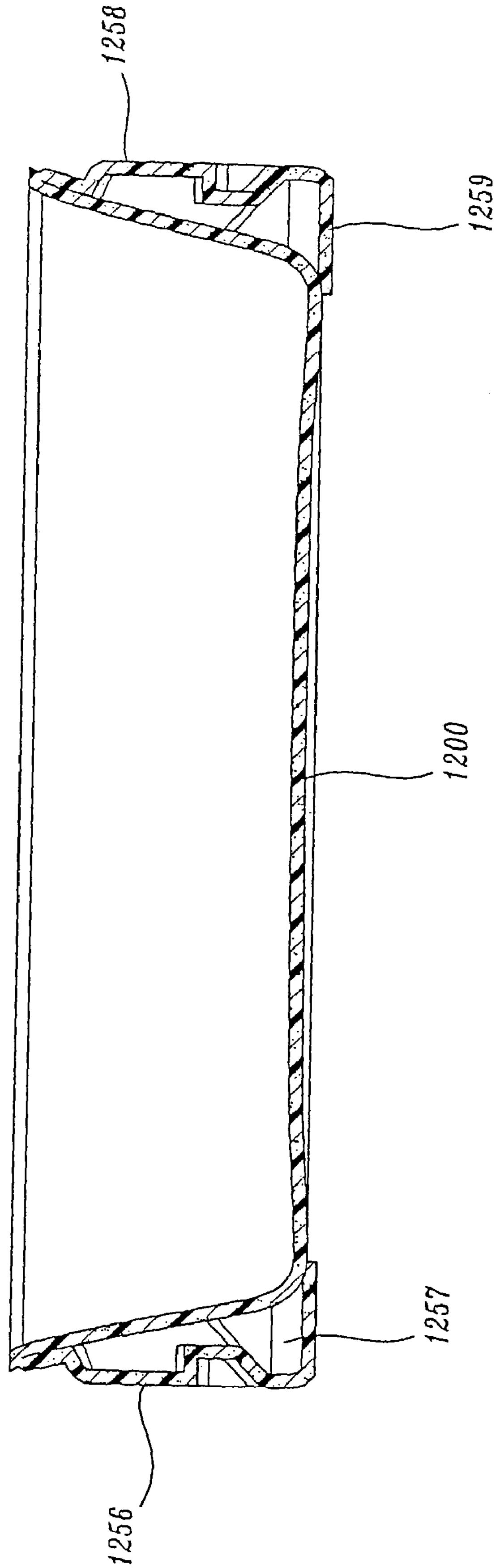
FIG. 45 shows a cross section illustration of a tray according to the present invention.

Another embodiment of the tray according to the invention has flaps as shown in FIG. 45, wherein flaps 1256 and 1258 include flap bases 1257 and 1259, respectively that extend below the lower surface of the tray base. The upper surface of the flap base 1257 and 1259 can therefore be bonded to the underside of the tray base. In this manner, the flaps 1256, 1258 provide additional cushioning around the lower perimeter of the tray 1200. The additional cushioning can provide protection of the package and the package contents during shipping from the point of production of the finished packages and to a point of sale to consumers such as a supermarket.

3.2.11. Embodiment

Figure 46:
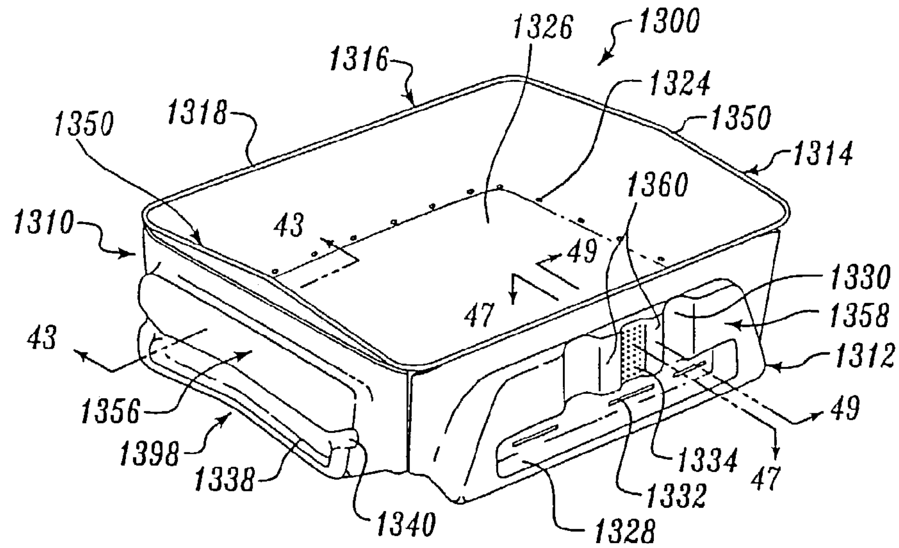
FIG. 46 shows an isometric illustration of a tray according to the present invention.
Figure 50:
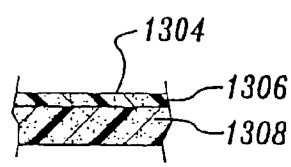
FIG. 50 shows a cross section illustration of a web according to the present invention.

Referring now to FIG. 46, another embodiment of a packaging tray 1300 with flaps constructed according to the present invention, is shown. The flaps are shown folded into a desired position and bonded to the tray base and/or walls. The packaging tray with flaps can be thermoformed from suitable plastic materials such as polystyrene, polyester and polypropylene in a solid or foamed sheet. The present packaging tray is preferably thermoformed from expanded polystyrene (EPS) sheet. The EPS sheet may include a single or multi-layer construction as shown in FIG. 50. Any suitable sheet of EPS material may be used. A suitable sheet includes three layers 1304, 1306, and 1308. The layer 1304 includes a layer of solid plastic material such as polystyrene sheet with any suitable thickness, about 0.001" and is laminated to layer 1306. Layers 1306 and 1308 include "closed" or "open cell" structures either with or without a surfactant added prior to extrusion of the sheet such that the finished tray may have a capacity to absorb water and other liquids such as "purge" or blood. The EPS sheet may be extruded with a "skin" covering on a surface that will become the inside of the finished tray. The "skin" can be arranged so as not to absorb the liquids. The non-absorbent "skin" may be provided on both surfaces of the extruded sheet. The layer 1304 may contain a white or other suitable pigment, such as white titanium dioxide in such a quantity so as to prevent visibility of any discoloration that may be caused by blood or purge absorbed by layers 1306 or 1308. In this way, the layer 1304, which will be visible, will not show substantial discoloration as a result of blood or purge that has been absorbed by any of the other layers.

Tray 1300 with flaps is thermoformed from sheet material of suitable thickness, about 0.01" to about 0.15" but sometimes about 0.090" and includes a tray with a tray cavity and four flaps. Two flaps are shown as flap 1310 and flap 1312. Flap 1310 is an end flap and flap 1312 is a side flap. The construction of tray 1300 with folded and bonded flaps, allows for production of rigid finished trays even though the thickness of the sheet material from which the tray is formed, is substantially thinner than would otherwise be required in conventionally formed packaging trays that do not have "flaps".

Flap 1310 can be provided with a profile that is a mirror image of 1314 (not shown), and flap 1312 can be provided with a profile that is a mirror image of flap 1316. Flaps 1310, 1312, 1314 and 1316 are attached to the outer edge of flange 1318 at hinges as shown by the hinge lines, such that flaps 1310, 1312, 1314 and 1316 can be folded downwardly and intimately contact outer surface locations of the tray walls as required. One or more flaps may be provided and folded to provide a plurality of enclosed spaces 1322 and/or cavities 1320 shown in FIGS. 49 and 47, respectively. The cross-sectional profile of flaps 1310 and 1314 can be similar. The cross-sectional profile of flaps 1312, and 1316 can be similar.

Figure 49:
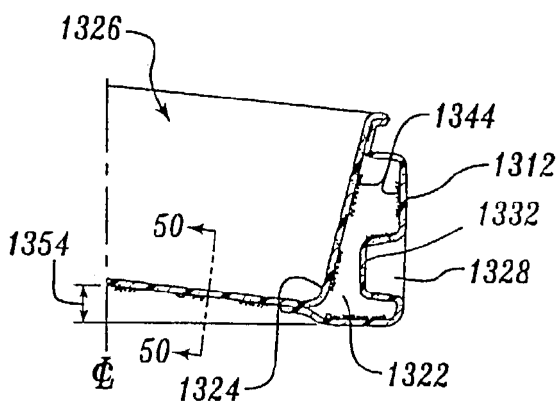
FIG. 49 shows a cross section illustration of a tray portion according to the present invention.

Referring again to FIG. 55, the packaging tray 1300 includes a base with four upwardly extending tray walls terminating at a continuous flange 1318. Tray walls can be perforated with openings 1324 directly therethrough with the perforations arranged so as to communicate between the tray cavity and space 1322 shown in FIG. 49. Referring to FIG. 49, the apertures or openings 1324 can be located so as to allow any purge that may be present in the tray cavity 1326 to pass therethrough and into space 1322. The perforations 1324, may include small holes, slots or incisions that extend fully through the tray walls. The flaps can be bonded to the tray walls so as to retain any liquids that enter therebetween and into space 1322.

In a further aspect of the present invention, any suitable liquid absorbing medium may be attached to one or more of the flaps so that when the flaps are folded and bonded the liquid absorbing material will be enclosed within space 1322. The liquid absorbing material could therefore absorb any liquids that may enter the space 1322 during use of the tray.

Referring again to FIG. 46, recesses 1328 and 1330 are shown in flap 1312. Slots 1332 are shown in flap 1312 and are located in recess 1328. Perforations 1334 are provided in flap 1312 and are located in recess 1336 (see FIG. 47). Recesses 1338 and 1340 are shown in flap 1310. A suitable adhesive is provided at the interface between the flaps and the tray walls so as to provide a bonding of the flaps to the tray walls. Bonding of flaps and tray walls is provided in such a manner so as to ensure complete bonding of flaps to the tray wall along strips that follow a path close to the perimeter of the flaps.

FIG. 49 shows a cross-section through flap 1312 and tray wall showing enclosed space 1322. Space 1322 is enclosed between the flap and the tray wall in a substantially liquid tight manner. Iron powder deposits 1344 can be applied to locations on the tray walls and flaps within space 1322 and also to the underside surface of the tray base. The iron powder deposits 1344 may include iron powder particles that have been fully coated with a special coating material, such as wax. The coating can be arranged to prevent direct contact of the iron particles with ambient air or any gas that may be present, until such direct contact with the air or gas is required. The coating may have physical and/or chemical properties that can be activated by exposure to microwaves, radio waves or a magnetic field. For example, when using wax as a coating, microwaves will cause the iron particles to heat up, thereby melting the wax and exposing the iron particles. The coating may also contain an adhesive that is heat activated and otherwise does not bond with other matter until activated and/or heated by exposure to any suitable microwaves, radio waves, magnetic field or any suitable electrically or sonically induced waves or field. The coated iron particles 1344 can be deposited on the surfaces by apparatus described herein. The coated particles can be coated with a substantial gas barrier substance that is altered when exposed to suitable microwaves or an electrically induced magnetic field. Exposure to the waves, field, or microwaves can cause the coating gas barrier substance to physically or chemically alter and become gas permeable, in such a manner that will cause the iron particles to immediately or subsequently react with any gases such as oxygen that may be present. The quantity of iron particles 1344 provided and attached to selected surfaces of the tray and flap can be measured and controlled so that an amount is present having an equal or greater capacity than may be required to absorb substantially all oxygen gas that may be present and/or become present by permeating into the finished package. While a cross-section of flap 1310 is not included with this embodiment, flap 1410 of tray 1400 (discussed below) has substantially similar features and will be discussed in detail later in this application.

Figure 47:
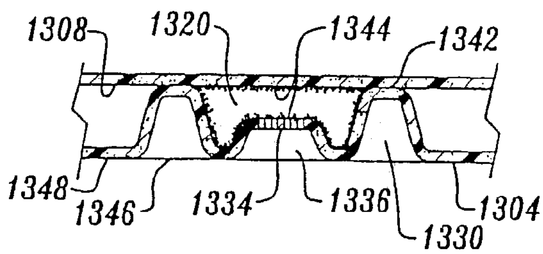
FIG. 47 shows a cross section illustration of a tray portion according to the present invention.

Referring now to FIG. 47, a top cross-sectional view through tray wall and flap 1312 is shown. For illustration purposes, a section of web material 1346 is shown bonded to plane 1348. Recesses 1336 and 1330 are therefore shown as enclosed channels. Cavity 1320 is fully enclosed by bonding at interface 1342 and sealed from external communication save through perforations 1334. Gases can therefore communicate through the perforations 1334 between the cavity 1320 and recess 1336. The gases can therefore come into direct contact with deposits 1344 deposited on the sides of cavity 1320. The deposits 1344 are suitably applied to tray and flap surfaces that will not come into contact with any goods that are subsequently located in the tray cavity.

Figure 48:
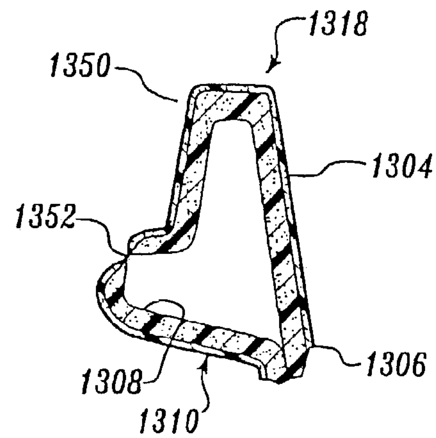
FIG. 48 shows a cross section illustration of a tray portion according to the present invention.

Turning to FIGS. 46, and 48–49, a further aspect of the present invention is shown therein. A cross-sectional view through crest 1350 is detailed in FIG. 48 with hinge 1352 between the flap 1310 and flange 1318. In FIG. 49, tray 1300 is shown in a horizontal disposition with the opening in tray cavity facing upwardly. The tray base is profiled so as to be higher at the center of the tray base than at the lowest point of the tray cavity (at a radius connecting the tray base to the upwardly extending tray wall) and a clearance, designated by arrow 1354 is shown. The clearance 1354 is the distance (clearance) measured from the lowest point of the tray 1300, at the side flaps and the highest point of the under surface of the tray base. The clearance 1354 is arranged so as to suitably accommodate and "mate" with the crest 1350 when another tray (not shown) is located above and placed onto a lower tray 1300. In another alternate, the clearance 1354 may be enclosed by over wrap material to provide a cavity into which purge may enter through suitably located apertures in the tray. Suitable liquid absorbing material with a suitable capacity may be provided between the over wrap and underside of the tray base. The crest 1350 and clearance 1354 prevent the base of a stacked tray from contact with an overwrap on the bottom tray. In this manner, the goods are prevented from touching the base of an adjacent tray.

3.2.12. Embodiment

Figure 51:
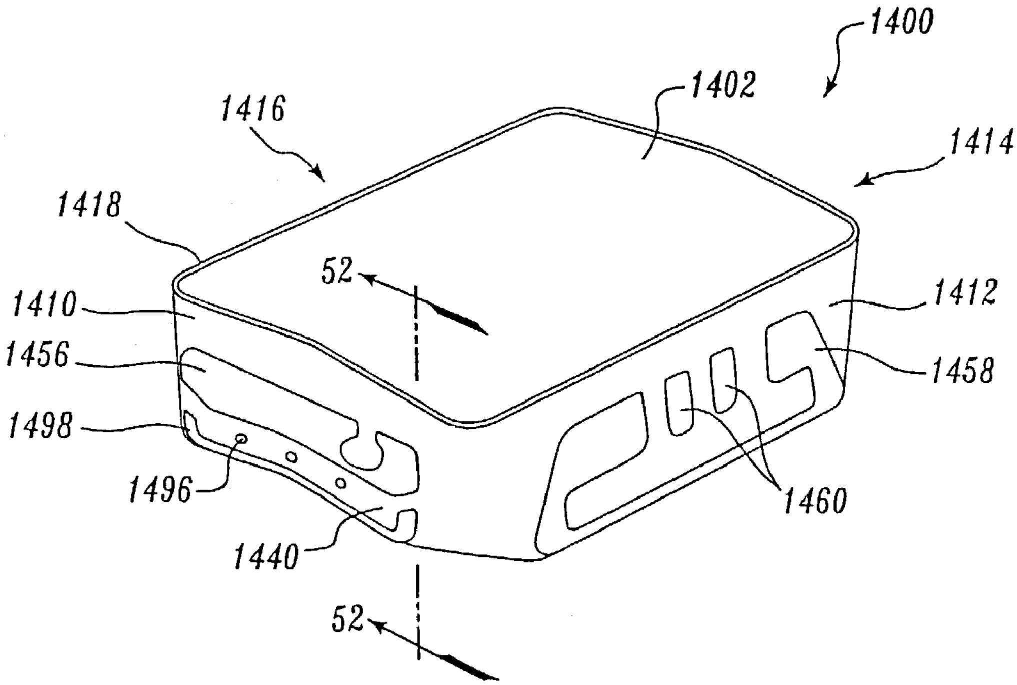
FIG. 51 shows an isometric illustration of a tray according to the present invention.
Figure 52:
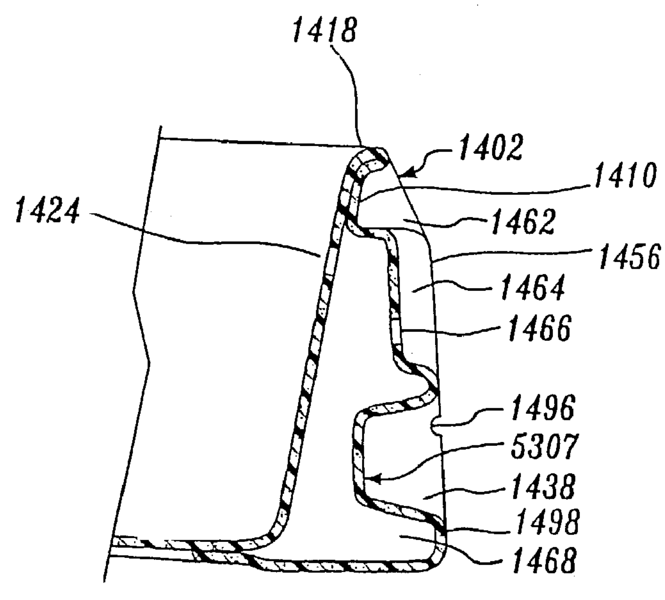
FIG. 52 shows a cross section illustration of a tray portion according to the present invention.

Referring now to FIGS. 51–52, another embodiment of a tray 1400 with flaps similar to tray 1300 is shown. Tray 1400 with an interior cavity and flaps that are substantially similar to the flaps of tray 1300 therein is shown after over wrapping with overwrap web 1402. Web 1402 may be formed from a plastic material, such as pPVC. The tray depression may be substantially filled with goods such as ground beef prior to over wrapping with the over wrap 1402. Over wrap 1402 may be stretched in such a manner as to contact the goods in the cavity. The web of material 1402 may be printed with information that gives detail of the contents of the over wrapped tray. Furthermore the inner surface of the over wrap 1402 may have been processed and a heat activated coating applied thereto, by any suitable method, and in those areas that will come into contact with surfaces of the tray 1400 and the flaps 1412, 1410, 1416 and 1414. Because flap 1416 may be a substantial mirror image of flap 1412 and flap 1414 may be a substantial mirror image of flap 1410, only flaps 1412 and 1410 will be discussed. But it is appreciated that substantially similar features are present that operate in substantially the same manner along the flaps that are mirror images of those discussed. A suitable heat source can be provided to activate the heat activated coating so as to cause bonding of the web 1402 to flaps 1412 and 1410 along planes contacting portions of the flaps at 1458, 1460, 1456, and 1498 locations shown as shaded sections. Alternatively, the shaded areas shown as 1458 and 1456 may be coated, by any suitable method, such as by "ink-jet", with any suitable bonding material such as a heat activated coating. Apertures 1496 may be provided as shown. Apertures 1496 can be provided after bonding of the web to plane 1456 such that communication directly into recess 1438 (shown in FIG. 52) is provided.

A cross-sectional view of flap is shown in FIG. 52 through where web 1402 has been bonded to plane 1456 thereby providing space 1462 and recess 1464. Apertures 1466 in flap, apertures 1424 in wall of tray and apertures 1496 in web 1402 are provided. In this manner, a communication is provided between the tray cavity to the outside of the over wrapped tray following a path that will readily allow gases to communicate therethrough but will restrict escape of liquids, such as purge. The communication follows a path through aperture 1424 into space 1468, through aperture 1466 into recess 1464, through recess 1464 to space 1462, through space 1462 to recess 1440, through recess 1440 to recess 1438 and through apertures 1496.

Figure 53:
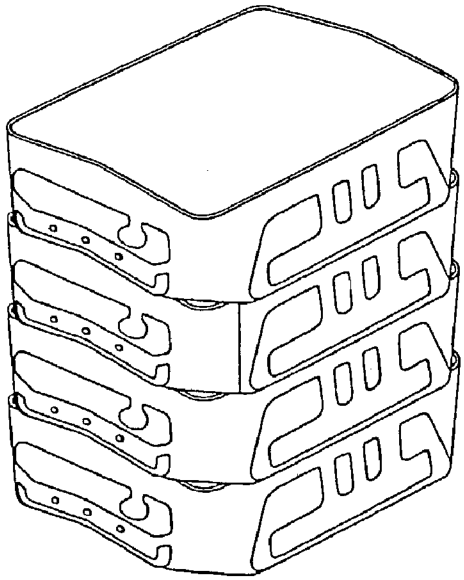
FIG. 53 shows an isometric illustration of trays according to the present invention.
Figure 54:
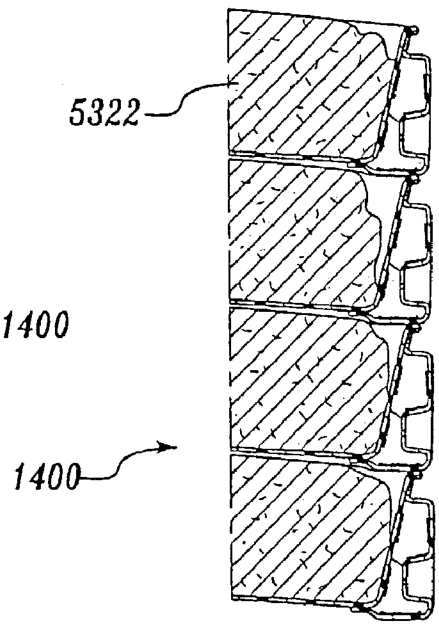
FIG. 54 shows a cross section illustration of trays according to the present invention.

Referring now to FIG. 53, a stack of 4 finished packages of the tray 1400 shown in FIG. 51 is shown. A cross-sectional view is shown in FIG. 54, through the stack of packages. It can be seen that with this arrangement an upper tray is in contact and rests on the flange of a lower tray. As can also be seen, if clearance is provided in the underside of the base of tray, the clearance mates with the upper profile of a lower tray whereby the contents of a lower tray are located in close proximity to the upper tray but are not in contact with the underside of the upper tray.

Figure 55:
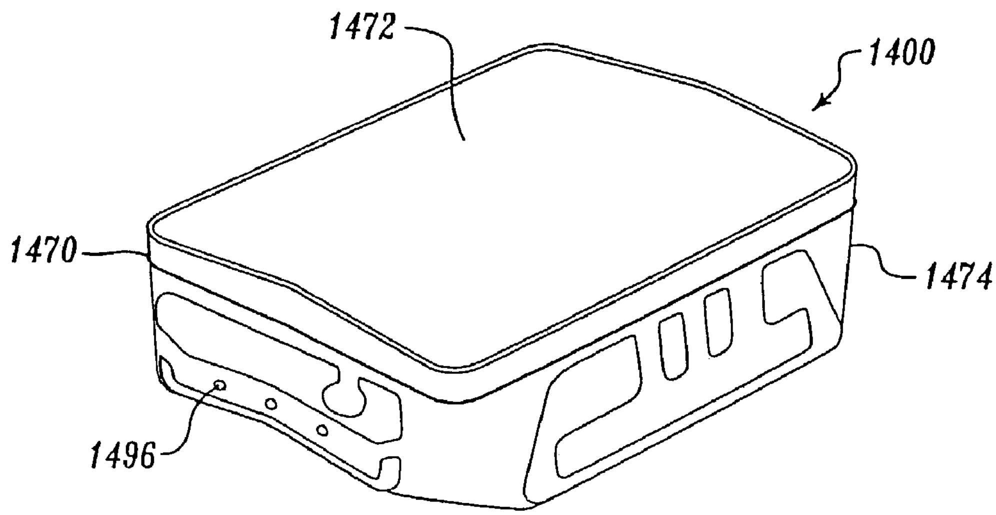
FIG. 55 shows an isometric illustration of a tray according to the present invention.

Referring now to FIG. 55, a finished package 1400 is shown with a seal 1470, that extends continuously around a horizontally disposed perimeter of the finished package. Seal 1470 is provided so as to bond an over wrap 1472, which is positioned above the seal 1470, to an over wrap 1474 which is located below the seal 1470. The seal 1470 can be provided by any suitable method such as by heating, and is arranged to be a complete and continuous and gas tight seal along the full length of the tray. The over wraps 1472 and 1474 may be clear, transparent, or printed as desired. Overwraps 1472 and 1474 may be produced from a substantial gas barrier material such that when sealed along seal 1470, a hermetically sealed finished package is produced. Alternatively gas permeable plastic materials may be used to produce the over wraps. The profile of over wrap 1472 and 1474 may be provided by a thermoforming method prior to assembly of the finished package whereby a loaded tray 1400 is located into a thermoformed over wrap 1474 prior to sealing to the thermoformed over wrap 1472 thereto at seal 1470. Alternatively, both over wraps 1472 and 1474 may be produced from a web of "stretched" material such as pPVC. The web of pPVC may be held taut above the tray cavity where the cavity is similar in profile to the lower section of tray 1400 but slightly larger so as to allow a neat location of tray 1400 therein. A vacuum can be applied in the cavity so as to stretch the pPVC web therein and thereby provide a lower over wrap 1474. Tray 1400 can be located into the stretched pPVC depression and heat sealed at 1470 to an over wrap 1472 that can be formed in a similar manner by stretching into an inverted cavity, of suitable size, that is located directly above and aligned therewith so as to allow such sealing at seal 1470. Apertures 1496 may be provided in the over wrap 1474 or alternatively, over wrap 1474 may be maintained without apertures so as to provide a substantially gas barrier package (similarly to tray 1300 in FIG. 49).

3.2.13. Embodiment

Referring now to FIG. 56, a further embodiment of a packaging tray with flaps, constructed according to the present invention is shown. FIG. 56 shows a tray 1500 with a flap 1502 attached to a flange 1506 of the tray 1500 by a hinge 1504. Tray 1500 can also be provided with similar flaps attached by hinges to all four sides of the tray at hinge lines between flaps and flanges. However, FIG. 56 shows a tray that has two flaps, on opposing sides, where one only flap is visible.

Packaging tray 1500 includes a substantially flat base that may have depressions, ridges, apertures and/or penetrations provided therein, with upwardly extending walls terminating at a continuous flange 1506. A ledge 1508 is provided in two of the four walls in a horizontally disposed position and level, across the face of the side wall and between the flange and the base of tray. The other two walls have flaps 1502 attached thereto, at a hinge 1504 connecting the flaps to the flange. Apertures 1510 are provided in ledge 1508. Apertures 1512 are provided in flaps at optimized locations that will reduce the passage of solid or liquid matter therethrough. An alternative and or additional aperture construction is also shown as slot 1534 cut through a compressed section 1540 of tray 1500 in cross-section FIG. 59 and in an enlarged view, FIG. 60, showing details of the slot 1534 provided in a section of the flap along ridge 1514. Slots may also be located at other locations shown in the FIG. 56. The region surrounding the slot is compressed to provide a section of thinner cross-sectional material. Slot 1534 includes an incision in the compressed section 1540 of the ridge 1514 and may be provided with an "H" profile. The slot 1534 with "H" profile provides two adjacent flaps, 1536 and 1538, respectively, that can open when, a differential in gas pressure is provided on opposite sides of the flap, however, when the gas pressure differential has equalized the two adjacent flaps shown as "H" flaps, can close to the former condition before opening.

Flaps 1502 are folded downwardly, against the upwardly extending adjacent tray walls 1516 as shown in end view of flap in FIG. 57, prior to over wrapping. Flaps 1502 can be provided with a fastening lug 1542 that is profiled so as to "mate" with a corresponding fastening recess 1544 provided in tray 1500. The fastening lug 1542 and fastening recess 1544 hold flap 1502 in a downwardly located position in convenient readiness to be inserted into a bag prior to sealing and shrinking. FIG. 58 shows an alternate of flap 1502, wherein fastening lug 1542 on flap 1502 and fastening recess 1544 on tray 1500 have been removed providing a substantially flat surface profile for contact with the tray walls 1516. Flaps 1502 may otherwise prevent automated loading of the tray with perishable goods therein, into the bag.

In this way, substantially all atmospheric air can be removed from within the finished packages via a route that follows a path through apertures 1510 (FIG. 56) into space 1528 (FIG. 57), through apertures 1512 (FIG. 56) into space 1522 (FIG. 57) and through apertures 1520 (FIG. 57) in the over-wrap material.

3.2.14 Embodiment

Figure 61:
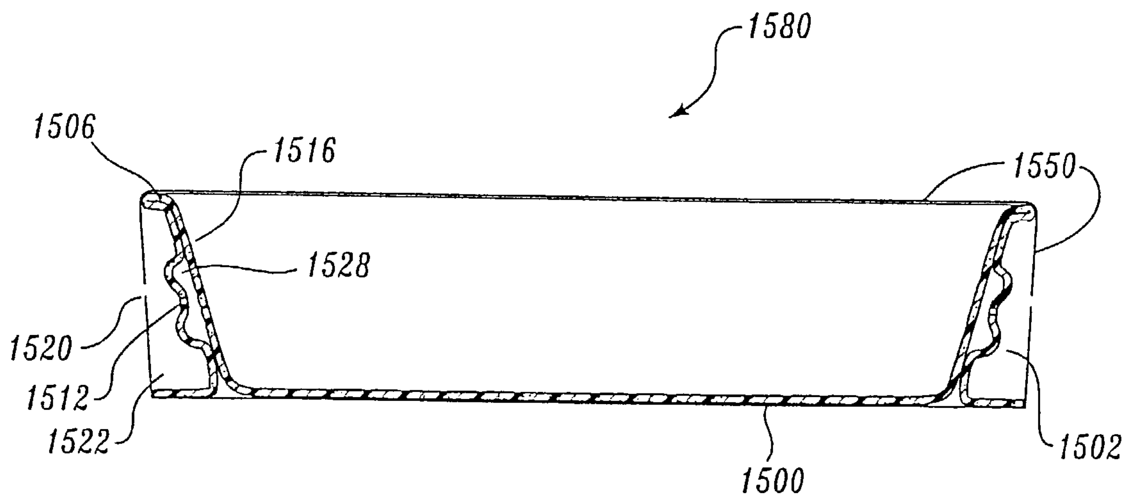
FIG. 61 shows a cross section illustration of a tray according to the present invention.

Turning now to FIG. 61, a cross sectional view of another embodiment of a packaged tray 1500 according to the invention is shown. Flap 1502 is provided with a continuous rim flange 1506. The continuous rim flange 1506 is provided in such a manner so as to contact the inner surface of the outer cover 1550. Rim flange 1506 is in continuous contact around the perimeter of the flap 1502 and substantially restricts passage of matter between the rim flange 1506 and the outer cover 1550 as shown in FIG. 61.

The tray 1500 with flaps 1502 is shown after outer cover 1550 has been heat shrunk into a finished position. Apertures 1520 are provided in the outer cover 1550. A space 1522 is provided between the flap and the outer cover such that apertures 1520 provide direct communication between the space 1522 and external atmosphere. Flap apertures 1512 provide communication from space 1522 to space 1528 and tray wall apertures 1527 provide communication from space 1528 to the tray cavity.

Figure 62:
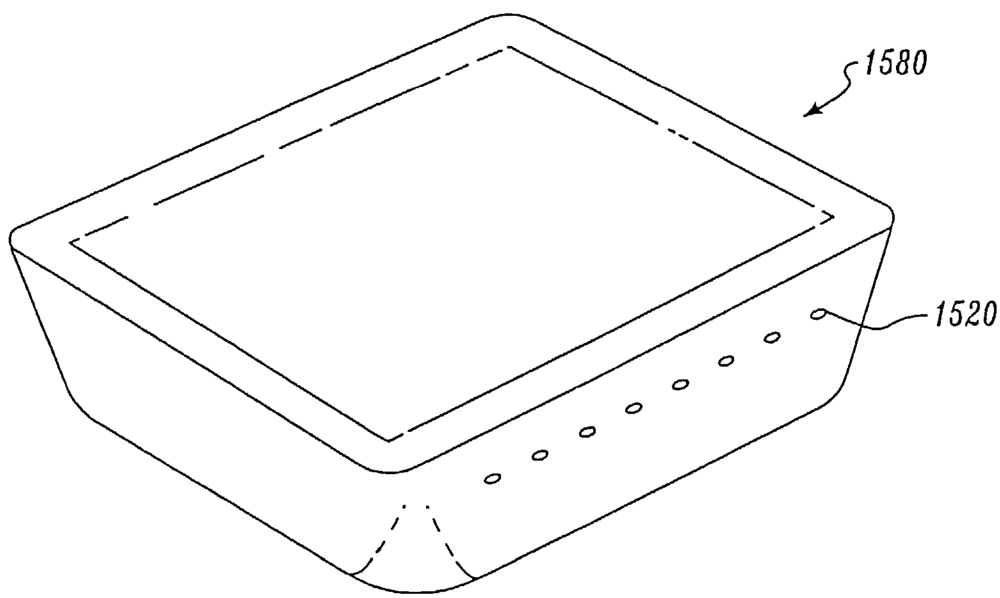
FIG. 62 shows an isometric illustration of a package according to the present invention.

While the embodiment of tray 1500 shown in FIG. 61 contains tray wall apertures 1527, it is apparent to one of ordinary skill in the art that the tray wall 1516 could include a flange 1508 containing apertures 1510 as shown in FIG. 56. The aforementioned configuration could provide a means of communication between the space 1528 and the tray cavity. A perspective view of the finished package 1580 is shown in FIG. 62.

Referring again to FIG. 61 and FIG. 62, it can be understood that when a plurality of finished packages are assembled in a stack, the base of tray 1500 with adjacent flaps will be in intimate contact with the upper surface of the finished packages. The flaps 1502 will be in adjacent contact with a portion of the rim flange regions 1506 of the lower package, thereby supporting the weight of packages stacked above. Therefore, the perishable goods contained in any package located beneath a package stacked above, will be protected from damage.

3.2.15. Embodiment

Figure 63:
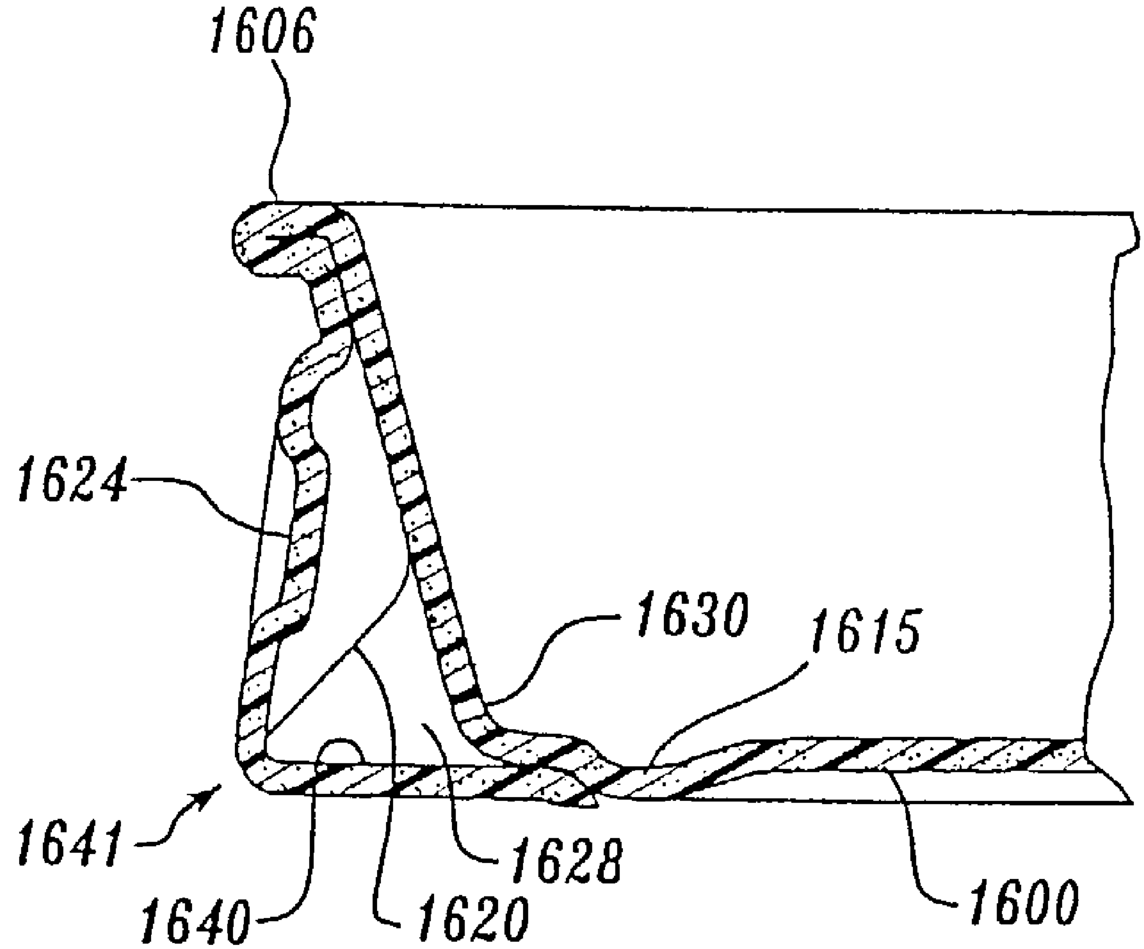
FIG. 63 shows a cross section illustration of a tray portion according to the present invention.

Referring now to FIG. 63, another embodiment of a tray flap constructed according to the present invention is shown. FIG. 63 shows a cross-sectional view through tray 1600 detailing the profile of flap 1602. Rib 1620 is formed in flap 1602 adjacent to recess 1624. Rib 1620 is formed so as to contact wall of tray as shown when flap 1602 is folded into a downward position. Recess 1624 is formed in the flap 1602 with an aperture or slot (not shown) therein but does not contact the outer surface of the wall of tray and is provided with space 1628 therebetween. A suitable adhesive such as a solvent is applied to the surfaces of the flap 1602 and the wall of tray such that when flap 1602 contacts the wall of tray, both parts bond together. The bond between the flap 1602 and the wall of tray can be arranged to follow a continuous path close to the perimeter of the flap 1602 and thereby provide a substantially liquid "tight" seal around space 1628. Adhesive can be applied to flaps in a similar manner to that described for flap 1602 then, in like fashion, bonded, to walls of tray to produce a finished tray. Apertures 1630 can be provided in the lower section of the wall of tray such that liquids that may accumulate within the tray can pass through apertures 1630 and enter space 1628. Slots, slits or holes (not shown) can be provided in recess 1624 such that direct communication through recess 1624 into space 1628 and through apertures 1630 can be provided. The surface of the flap and the wall of tray in direct contact with space 1628 can be treated so as to absorb liquids such as water, purge and blood.

Flap 1602 also includes a leg 1640 similar to the leg used in tray 900 (FIG. 33). The leg 1640 may be received into a recess 1619 formed in the base of the tray 1600. Alternatively, a support leg 1615 may be formed in the base of the tray that extends downwardly from the base. When the support leg is positioned at a sufficient distance from the wall of the tray, the leg 1640 may be received into the area along the base of the tray between the wall of the tray and the support leg 1615.

As with many of the similarly designed trays, the leg 1640 of the flap 1602 will be in intimate contact with the top flange 1606 of a tray beneath when trays 1600 are stretched.

3.2.16. Embodiment

Figure 64:
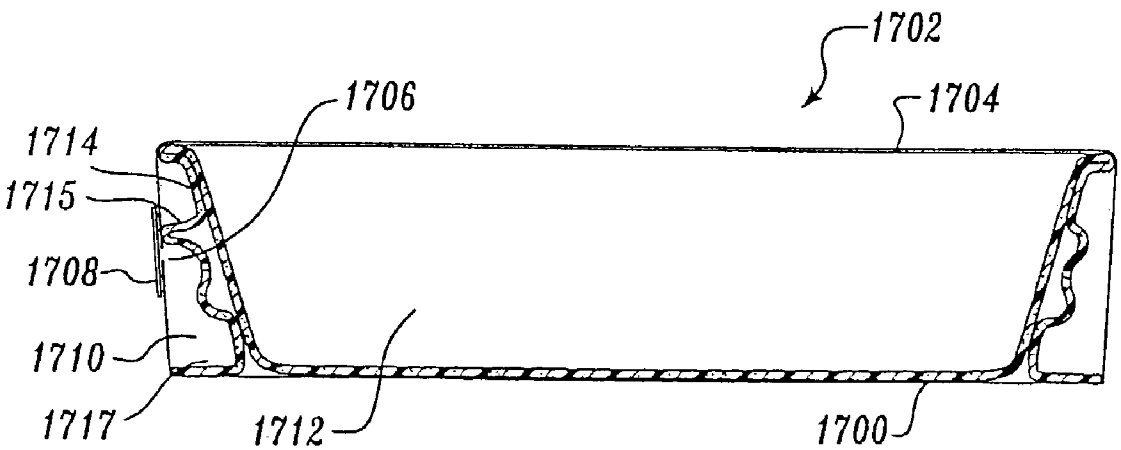
FIG. 64 shows a cross section illustration of a tray according to the present invention.
Figure 65:
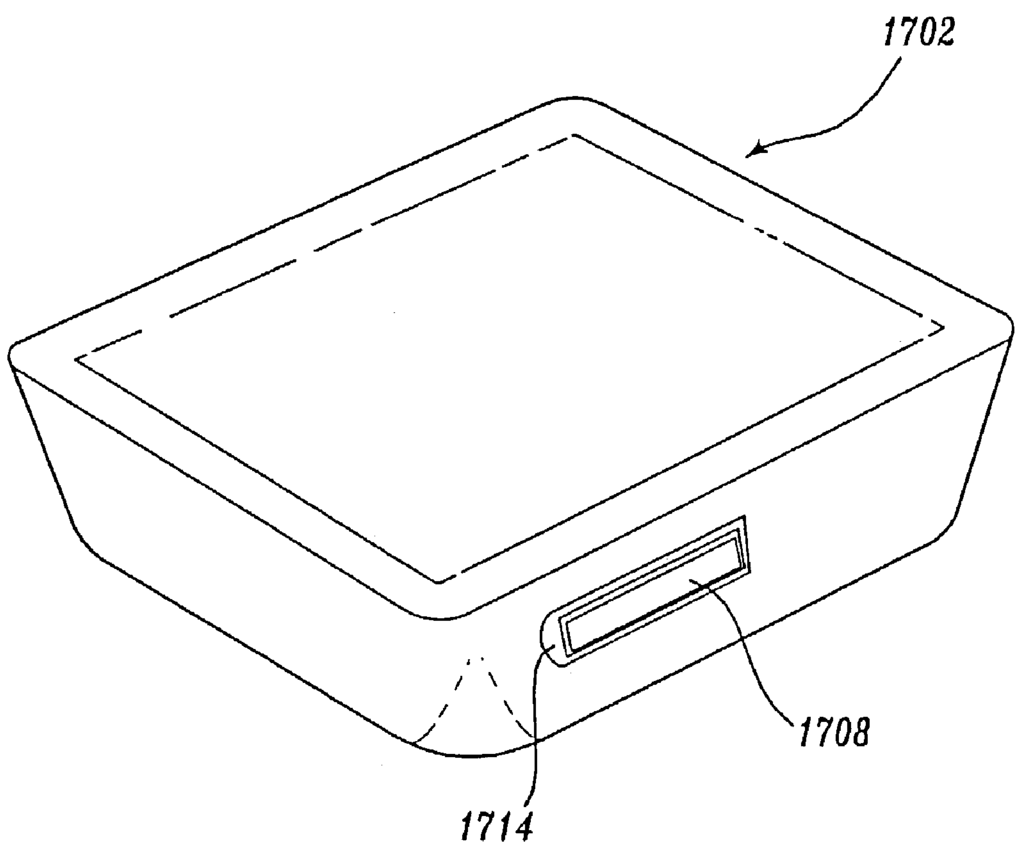
FIG. 65 shows an isometric illustration of a package according to the present invention.

Referring now to FIGS. 64 and 65, another embodiment of a tray with flaps constructed according to the present invention is shown. A cross-section view through a finished package in shown in FIG. 64 and a three dimensional view of a finished package 1702, is shown in FIG. 65. The finished package 1702 includes a tray 1700 with perishable goods contained therein and an outer cover 1704 of a substantially gas barrier shrink material. Apertures 1706 are provided in the gas barrier outer cover 1704 and a peelable, gas barrier label 1708 is hermetically sealed over the apertures 1706. The finished package 1702 has spaces 1710, 1712 and 1714 and other space contained within the outer cover 1704. Apertures and passages have been provided in the flaps and tray walls as herein described. A substantially oxygen free gas including any suitable gas, selected to extend the keeping qualities of the perishable goods, such as a blend of carbon dioxide and nitrogen, can be provided in the spaces inside the package 1702 after evacuating other gases contained therein, such that all the spaces are filled with oxygen free gas. The finished package can be stored for a period of time and then, using tab 1714, the gas barrier label 1708 can be removed by peeling, thereby allowing atmospheric gas to enter through the apertures 1706 and into the spaces around the perishable goods and contact the perishable goods, thereby causing a desirable bloom in the goods. In a further aspect, a ridge 1715 is provided in the flap 1717 to abut against the outer cover 1704. The ridge 1715 provides a suitable structure against which to apply a label 1708.

3.2.17. Embodiment

Figure 66:
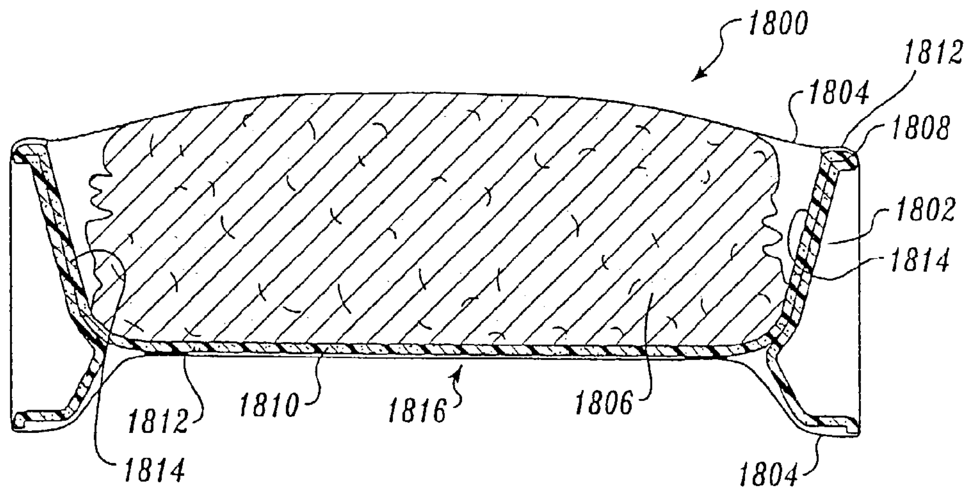
FIG. 66 shows a cross section illustration of a package according to the present invention.

Referring now to FIG. 66, another embodiment of a finished package constructed according to the present invention is shown. A cross-sectional view with details of a tray 1800 with flaps that are folded into the finished position and extend below the base of tray is detailed. As described in earlier embodiments of this present specification, a tray with flaps may include a rectangular flat base with radiused corners and upwardly extended walls that terminate at a flat horizontally disposed, common peripheral flange. A space or cavity is therefore defined between the walls. Flaps are connected directly to the peripheral edge of the common peripheral flange at a hinge along a hinge line. A single flap may be attached to a single wall or alternatively up to four flaps may be attached, one to each wall. It may also be desirable to attach several flaps to a single wall. Flaps and trays of various configurations have been described herein with apertures conveniently provided to allow gas or air exchange therethrough while inhibiting and restricting the escape of other matter such as liquids including blood or purge therethrough. Such apertures and configurations allowing gas exchange therethrough can be provided in this present embodiment if desired, however, the purpose of the description of this present embodiment is to disclose an improved packaging that will also protect the perishable goods contents of the finished package when stacked together, such as when placed in a master container.

Figure 67:
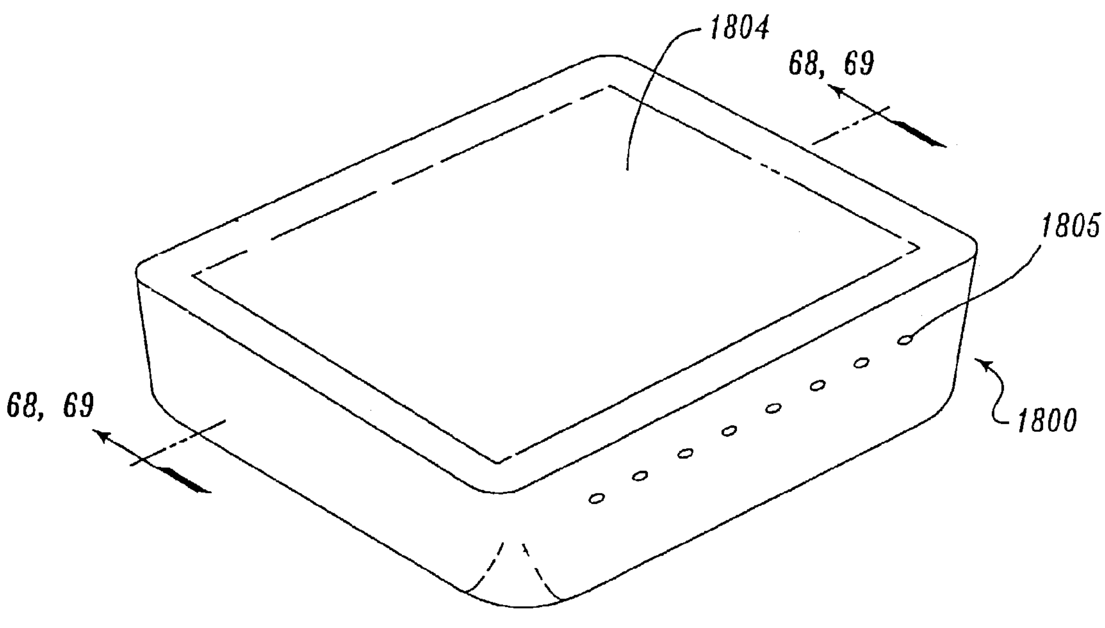
FIG. 67 shows an isometric illustration of a package according to the present invention.

Referring now to FIG. 66, a loaded tray 1800 with flaps 1802 is completely covered with an outer cover 1804 and it can be seen that the outer cover 1804 is domed upwardly and is stretched over the upper surface of the perishable goods 1806 such that the uppermost part of the perishable goods 1806 is extended above the common peripheral flange 1808 under the outer cover 1804. In this manner the perishable goods 1806 are held firmly to the base 1810 of tray 1800 by applying tension on the outer cover material. An adhesive 1812 may be provided between the outer cover 1804 and the common peripheral flange 1808 so as to seal, hermetically or otherwise, the outer cover 1804 to the common peripheral flange 1808 along a path that will become an outer edge of the finished package. Additionally and as shown, adhesive 1812 may be provided between the flaps 1802 and the tray walls 1814 so as to seal the flaps 1802 in position to the walls as may be desired, hermetically or otherwise. Adhesive 1812 may also be provided between the underside of the base 1810 and between the base and the inner surface of the outer cover 1804. Outer cover 1804 may include a suitably printed, heat shrinkable, stretchable, sealable, transparent, oxygen and gas permeable web of material with a "memory" that may be applied after loading the perishable goods into the tray cavity. The outer cover 1804 may be applied directly from a continuous web or roll of the material or alternatively may be fabricated into suitably sized bags, such as those supplied by Robbie Manufacturing, Inc., prior to sealing over the loaded tray with flaps. As shown in FIG. 67, the outer cover 1804 may be suitably perforated with apertures 1805 to allow gas and/or air exchange therethrough and can be heat shrunk after sealing over the loaded tray with flaps by passing through a suitably adjusted heat tunnel. Alternatively, in another aspect of a packaging tray, the outer cover 1804 may be applied from a continuous web and stretched during application thereof and then sealed to provide a sealed outer cover 1804 that is stretched taut around and over the loaded tray with flaps as shown in FIG. 66.

Figure 68:
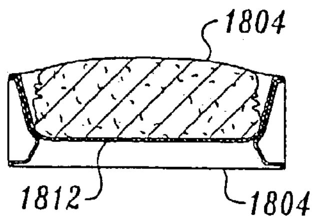
FIG. 68 shows a cross section illustration of a package according to the present invention.
Figure 69:
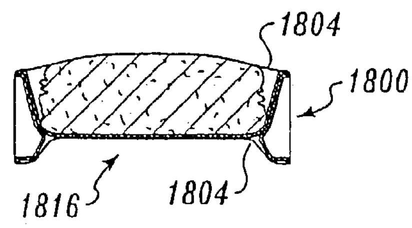
FIG. 69 shows a cross section illustration of a package according to the present invention.

FIG. 68 shows a cross-section of a tray after the application of the outer cover 1804, that may be manufactured from any transparent suitable material, but before stretching by depressing the outer cover 1804 into the recess 1816 as shown in FIG. 69. FIG. 69 shows the same cross-section as in FIG. 68 after outer cover 1804 has been depressed so as to contact the adhesive between the base of tray 1800 and the inner surface of the outer cover 1804. By a mechanical device, the outer cover 1804, that is located adjacent to the underside of the base 1810 of the tray, can be depressed and stretched so as to contact the adhesive 1812 located between the inner surface of the outer cover 1804 and the under surface of the base 1810 of tray so as to provide bonding therebetween. A recess 1816 can therefore be provided on the underside of the tray 1800 as shown. Therefore, when another finished package of similar configuration is located and stacked above and onto a similar lower package, the underside of the finished package will not contact the upper surface of the dome of the lower package. In this way, the lower packages are protected from damage when stacked and transported or when displayed in stacks at a point of sale to consumers.

3.2.18. Embodiment

Figure 70:
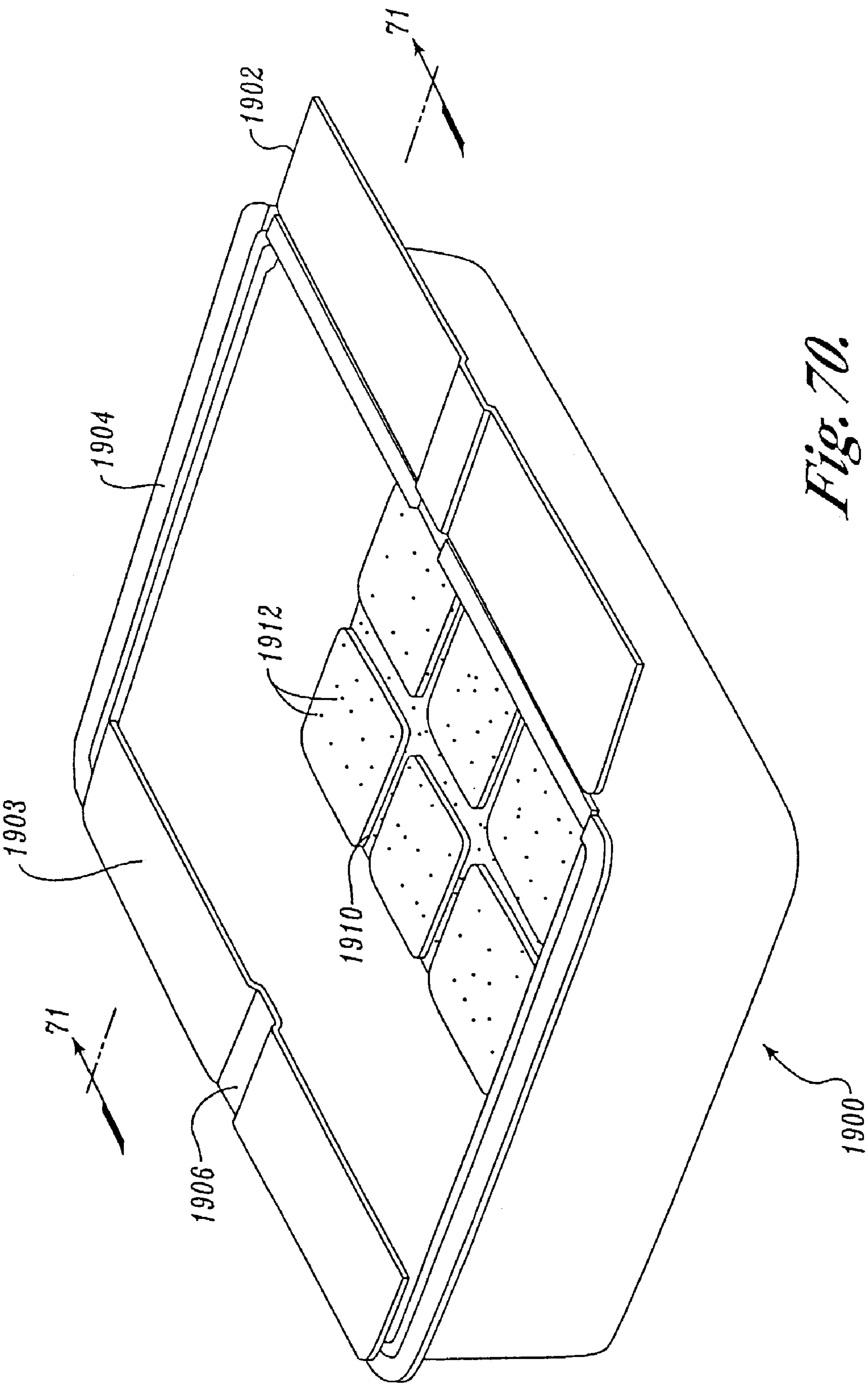
FIG. 70 shows an isometric illustration of a tray according to the present invention.
Figure 71:
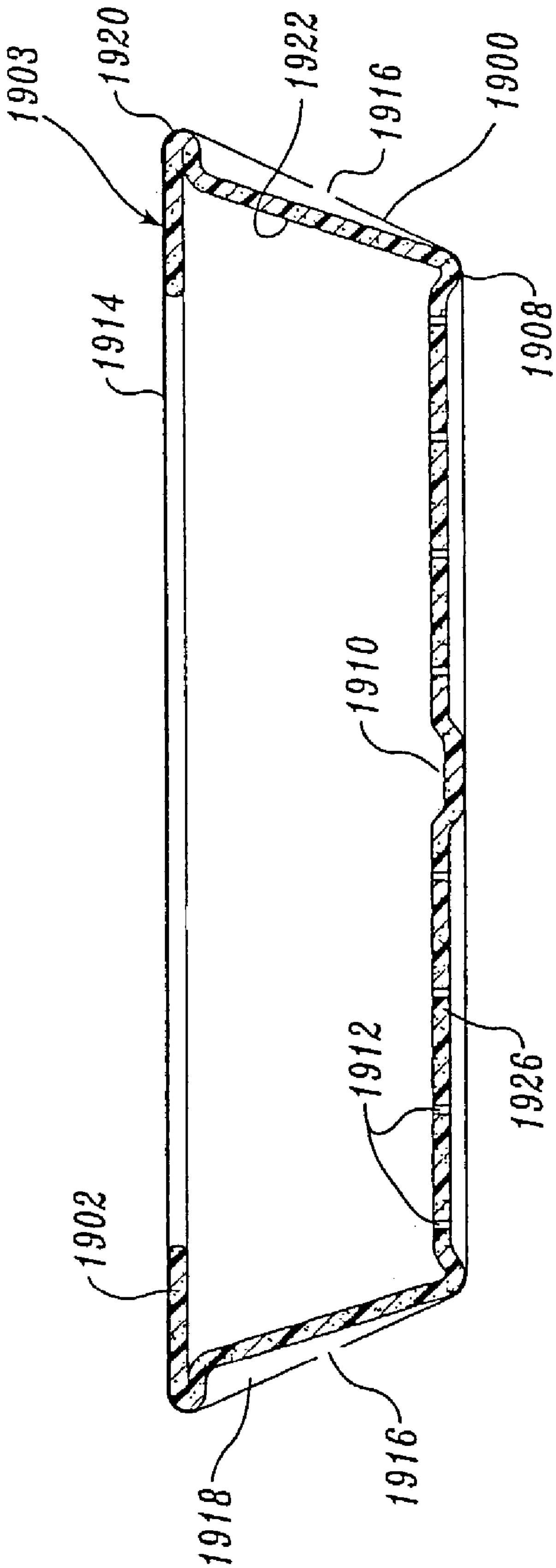
FIG. 71 shows a cross section illustration of a tray according to the present invention.

Referring to FIG. 70, another embodiment of a tray 1900, with flaps 1902, 1903 is shown. A cross-section is shown in FIG. 71, where both flaps are folded inwardly and the package has been inserted into a suitable shrink bag 1914. Alternatively, the shrink bag 1914, may be replaced with a stretch wrap material such as plasticized PVC. In this manner, the tray can be "stretch-wrapped" as an alternate to a shrink bag as shown in FIG. 71.

Tray 1900 includes a base with four upwardly extending walls, terminating at flanges 1904. Two flaps 1902, 1903 are provided such that they can fold inwardly. Recesses 1906 are provided in the flaps to allow passage of gases therethrough. Tray 1900 further includes a base rim 1908 shown in FIG. 71 that extends around the perimeter of the base. Depressions 1910 and perforations 1912 can be provided at the tray base 1926. Apertures 1916 are provided in shrink bag 1914. Tray 1900 may be thermoformed from any suitable material. Apertures 1916 provide direct communication from external atmosphere through space 1918 and recesses 1906 to tray cavity. Perishable goods can be located in tray cavity and flaps 1902 and 1903 folded inwardly. Assembled tray and perishable goods can then be located within a shrink bag, which is then heat sealed and heat shrunk or stretch wrapped. When the finished packages are stacked, the base rim 1908 of one pack will rest directly above flaps 1902 and 1903. In this way, finished packages can be stacked together without causing undesirable damage to the contents of the packages. Perforations 1912 may cause the absorption of liquids into the tray material as described herein.

3.2.19. Embodiment

Figure 72:
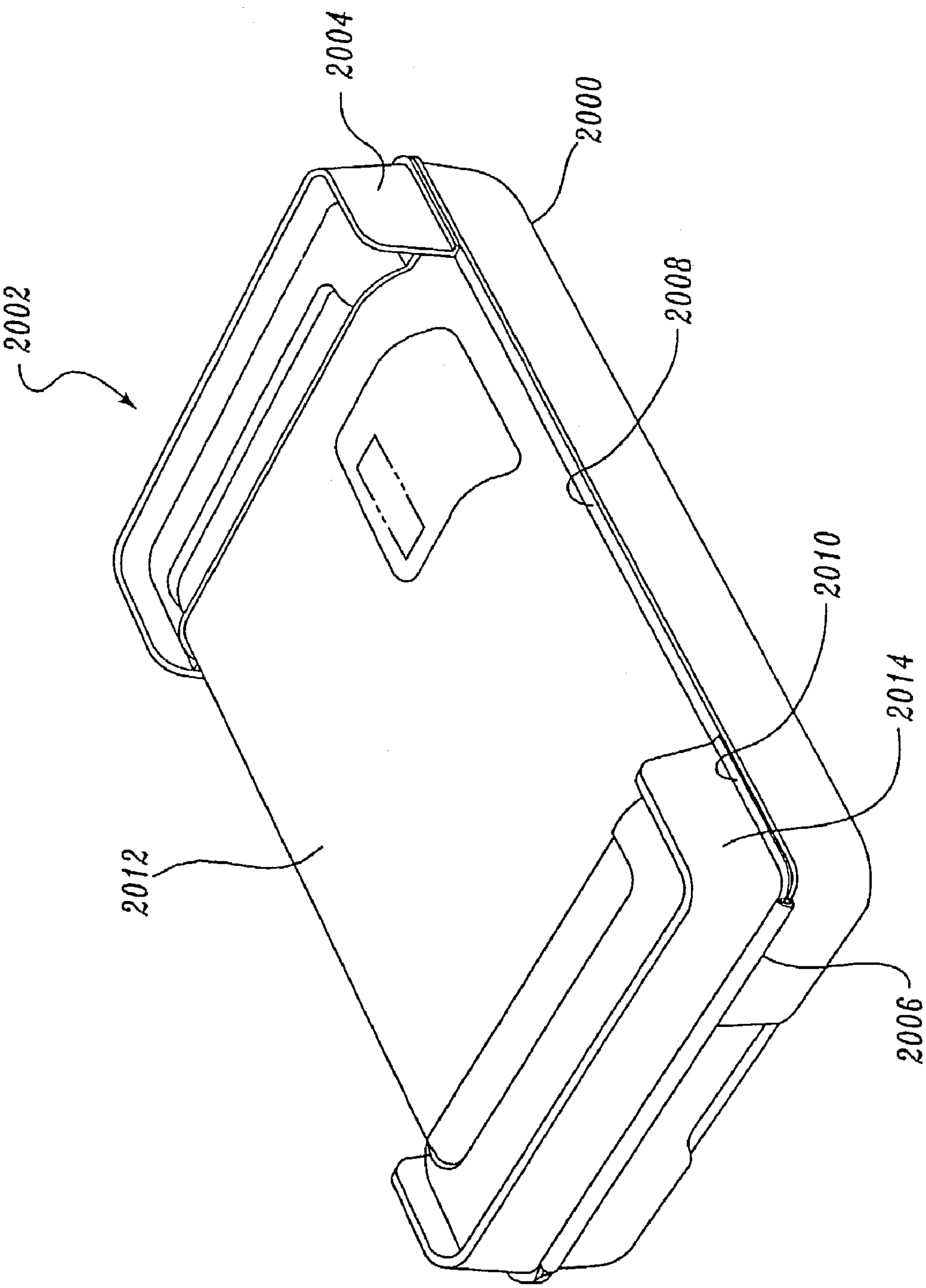
FIG. 72 shows an isometric illustration of a tray according to the present invention.
Figure 74:
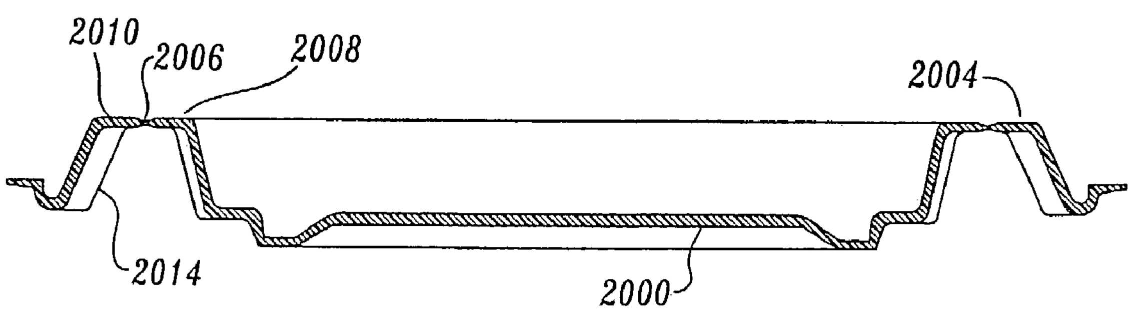
FIG. 74 shows a cross section illustration of a tray according to the present invention.

Referring now to FIG. 72 an isometric projection of a finished package 2002 constructed according to the present invention is shown and a cross-section through an empty package 2002 is shown in FIG. 74. Tray 2000 is thermoformed from a suitable material such as expanded polystyrene. Flaps 2004, 2014 are connected to the tray by way of hinges 2006. Flaps can rotate about the hinges 2006 such that upper surface of flanges 2008 can contact directly and be in alignment with flanges 2010 of the flaps.

Referring now to FIG. 72, perishable goods, such as ground meat is located in tray 2000 and a web 2012 is positioned directly above and over the tray 2000 and perishable goods. Web 2012 includes a transparent sheet of a suitable material such as plasticized PVC that has been coated with a heat activated adhesive covering the areas of the web that will come into contact with flange 2008 thereby providing a method of sealing web 2012 to the flanges 2008.

After the web 2012 has been heat sealed to the flanges 2008, the web 2012 is severed along the perimeter of flanges 2008. The web 2012 is hermetically sealed along the full flange extending around the perimeter of the tray. Flaps 2014 and 2004 can then be rotated about hinges 2006 and flanges 2010 of flaps and sealed to flanges 2008 of the tray 2000.

Figure 73:
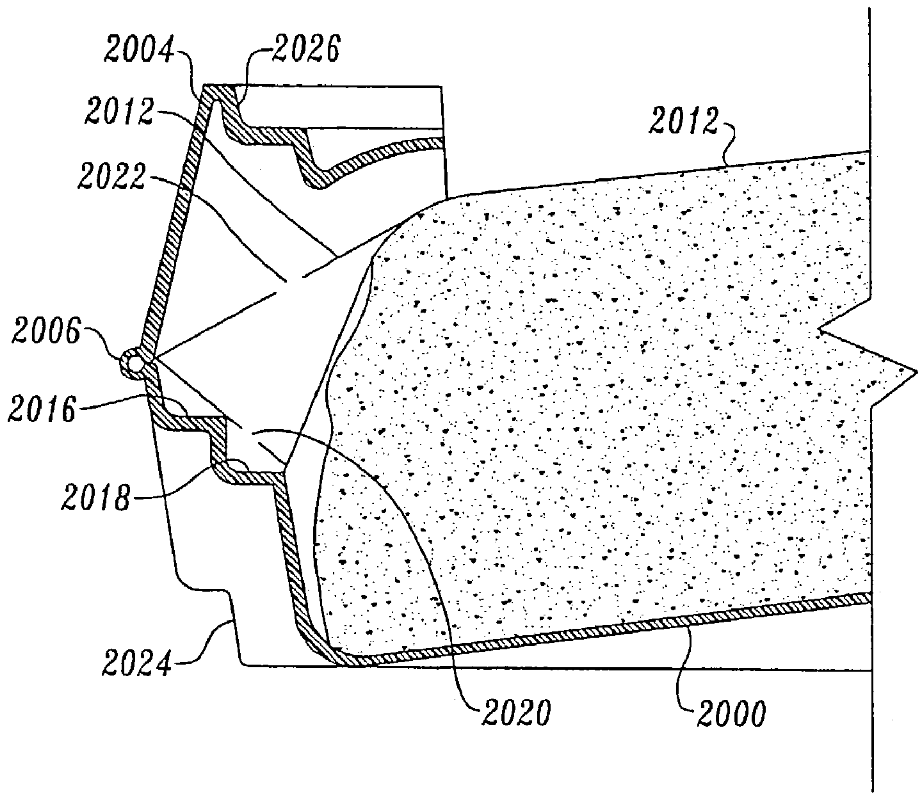
FIG. 73 shows a cross section illustration of a tray portion according to the present invention.

Turning now to FIG. 73, in an alternate embodiment of tray 2000, flanges 2016 and 2018 are formed into a portion of the end walls of the tray 2000. Web 2012 can be sealed to the flanges 2016 and 2018 as shown. Aperture 2020 can be provided in the location shown such that direct communication between the gas contained between the tray and the web 2012 and external atmosphere is enabled. The location of aperture 2020 inhibits the egress of any liquids that may accumulate within the package from escaping therethrough. Additionally or alternatively, aperture 2022 is also shown. A plurality of finished packages can be stacked together such that face 2024 formed in the walls of the tray 2000 near the base engages with face 2026 formed in the flap 2004. Such engagement of faces provides a secure method of stacking finished packages.

3.2.20. Embodiment

Figure 75:
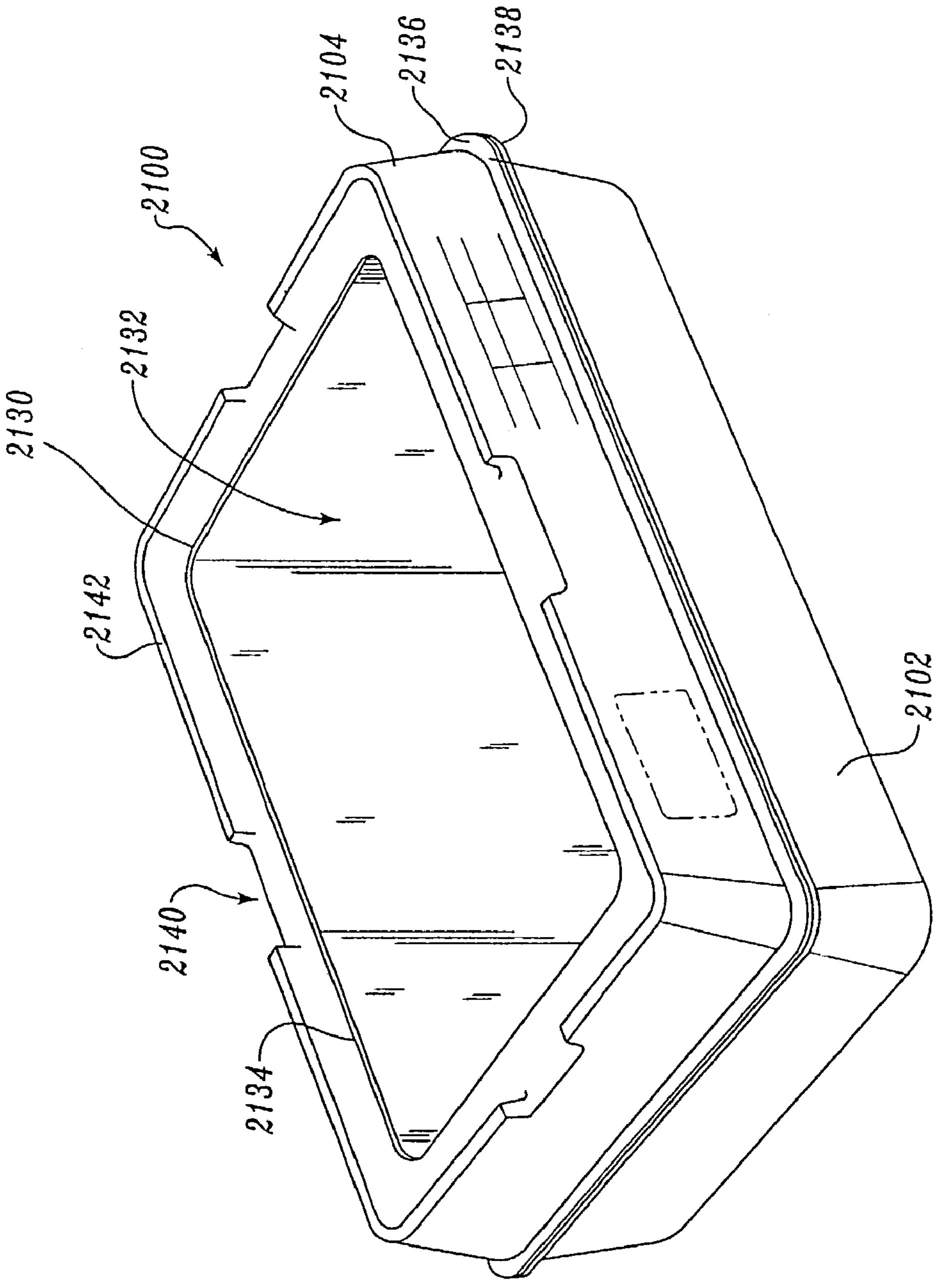
FIG. 75 shows an isometric illustration of a tray according to the present invention.

Referring now to FIG. 75, another embodiment of a finished package constructed in accordance with the present invention is shown. The package 2100 includes a tray 2102 and a tray cover 2104. Cover 2104 has a window 2130 cut therein as shown and web 2132 is stretched taut and heat sealed to flange 2134. Tray 2102 and tray cover 2104 are hermetically sealed together at flanges 2136 and 2138. Walls of tray 2102 and the cover 2104 can be printed directly thereon with information describing the contents of the package with all legally required information, pricing, weight of contents and cost per unit weight, etc. Recesses 2140 (four) in ridge 2142 are provided to allow for evacuation of air from between stacked packages. Recesses 2140 can also provide for location of bands of printed paper that may provide further information and details of package contents.

Figure 76:
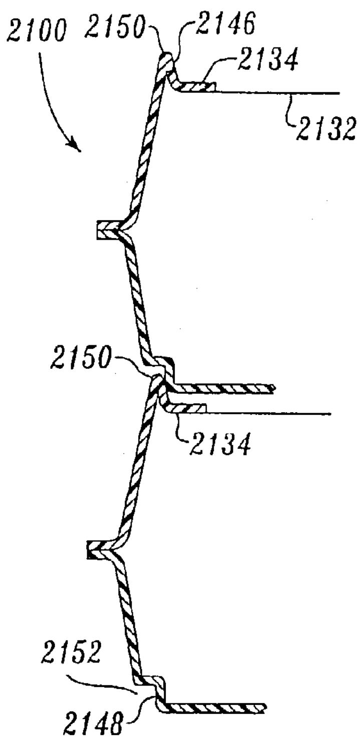
FIG. 76 shows a cross section illustration of trays according to the present invention.

Referring now to FIG. 76, a cross-section through the end section of two stacked and finished packages 2100 of FIG. 75 is shown. The perishable goods contents of the packages have been omitted for clarity. Face 2146 engages face 2148 in recess 2152 when finished packages are stacked. Engagement of the faces 2146 and 2148 urges ridge 2150 of the lower package outward. The weight of the upper package is thereby transferred through the walls of the lower tray cover while inhibiting the inward displacement of flange 2134. Such an arrangement minimizes the likelihood of undesirable pressure being applied to the perishable goods contents of the lower tray by depressing the flange 2134 downwardly.

Figure 77:
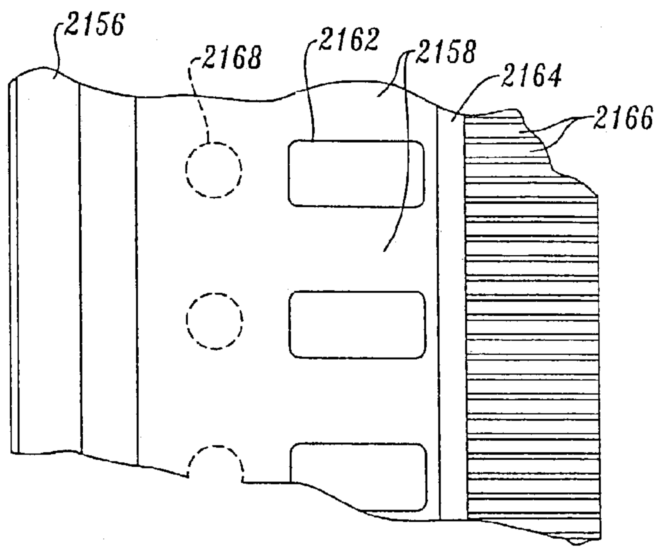
FIG. 77 shows a top illustration of a tray portion according to the present invention.
Figure 78:
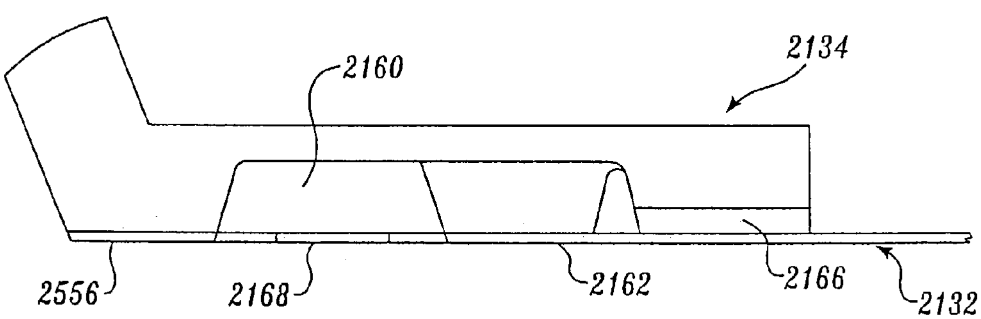
FIG. 78 shows a side illustration of a tray portion according to the present invention.
Figure 79:
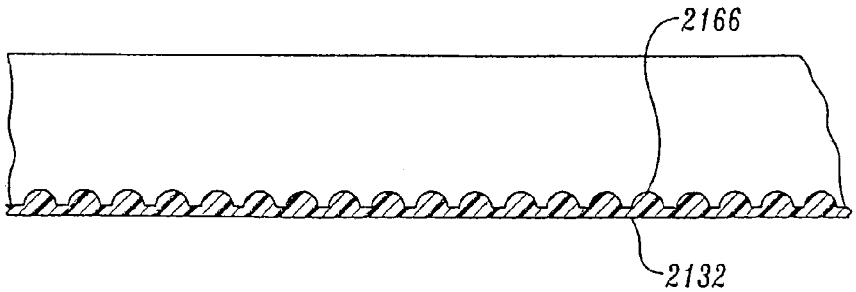
FIG. 79 shows a side illustration of a tray portion according to the present invention.

FIGS. 77–79 show an enlarged section of flange 3134, including a plan view in FIG. 77, side elevation in FIG. 78, and a further end view, FIG. 79, is shown with grooves and slots that allow direct communication between the inside of the finished package and atmospheric gases outside the package. Web 2132 is heat sealed along a continuous seal path 2156 and intermittent seals 2162 are shown with slots 2158 therebetween. Slot 2160 is therefore in direct communication with slots 2158 and 2164 and grooves 2166. Apertures 2168 are located adjacent to slot 2160 and directly between continuous seal 2156 and intermittent seals 2162. The apertures 2168 extend through the web 2132 and into the slot 2160. Web 2132 can include a sheet of plasticized PVC and is tensioned prior to sealing as shown thereby providing a transparent cover across the Window. In this way direct communication from within the package to atmosphere is provided through apertures 2168, slot 2160, slots 2158, slot 2164, and grooves 2166, while minimizing the possibility of any accumulated liquids escaping that may be present within the package.

Figure 80:
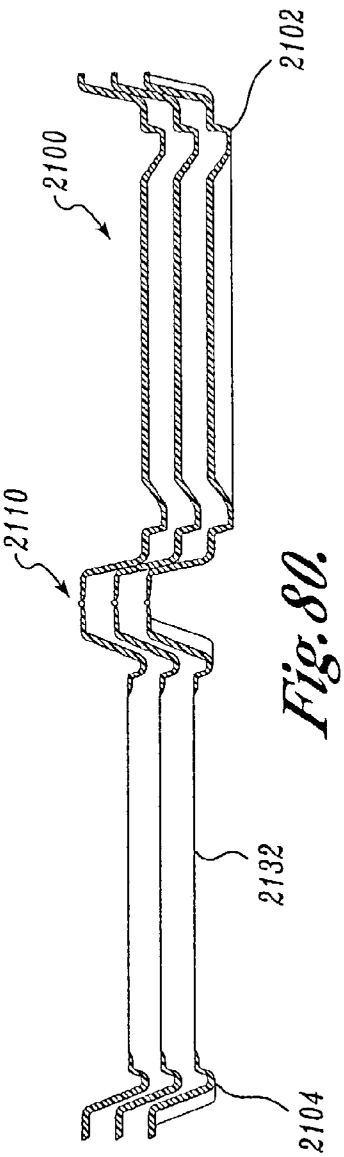
FIG. 80 shows a cross section illustration of trays according to the present invention.
Figure 81:
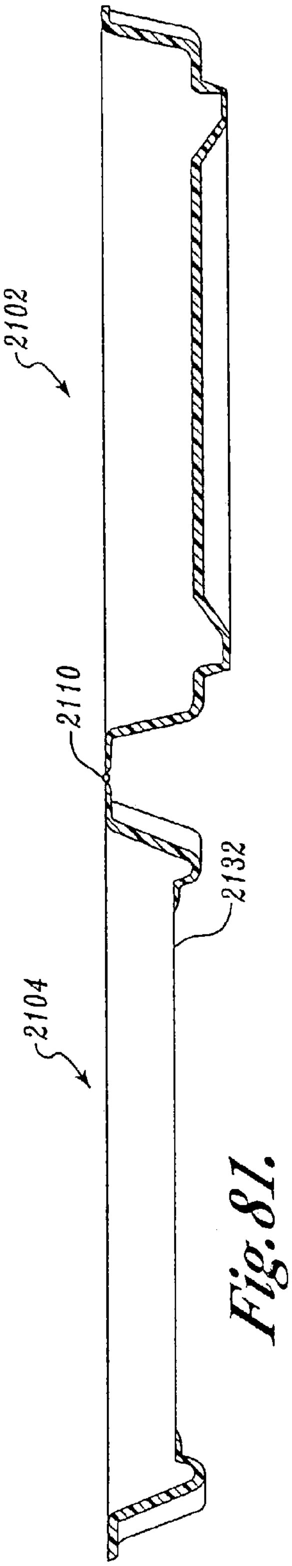
FIG. 81 shows a cross section illustration of a tray according to the present invention.
Figure 82:
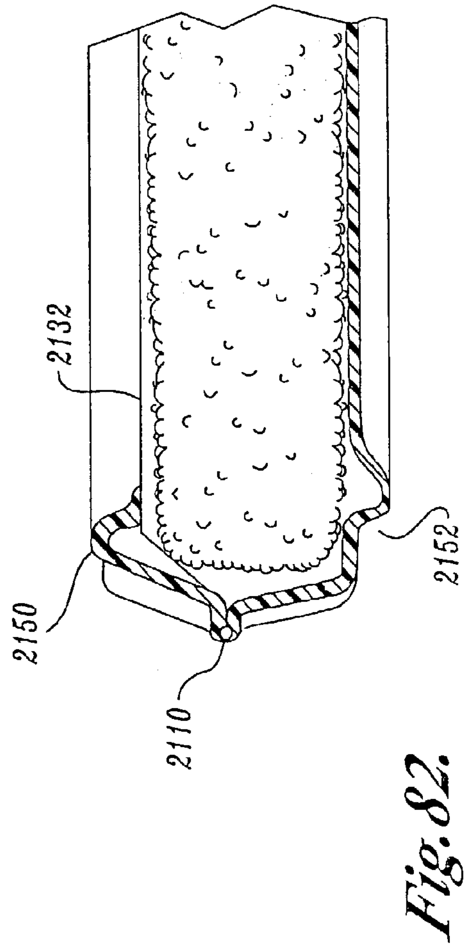
FIG. 82 shows a cross section illustration of a tray according to the present invention.

Turning now to FIG. 81, in another embodiment 2102, tray and tray cover 2104 may be integrally formed and connected by a hinge 2110 at one side thereof. Tray cover 2104 has a web 2132 bonded thereto. Three empty trays 2102 with web 2132 sealed to covers 2104 are shown stacked together in FIG. 80. A section through a finished package with goods is shown in FIG. 82. Ridge 2150 of cover 2104 suitably mates with a recess 2152 of an overlying tray.

Figure 83:
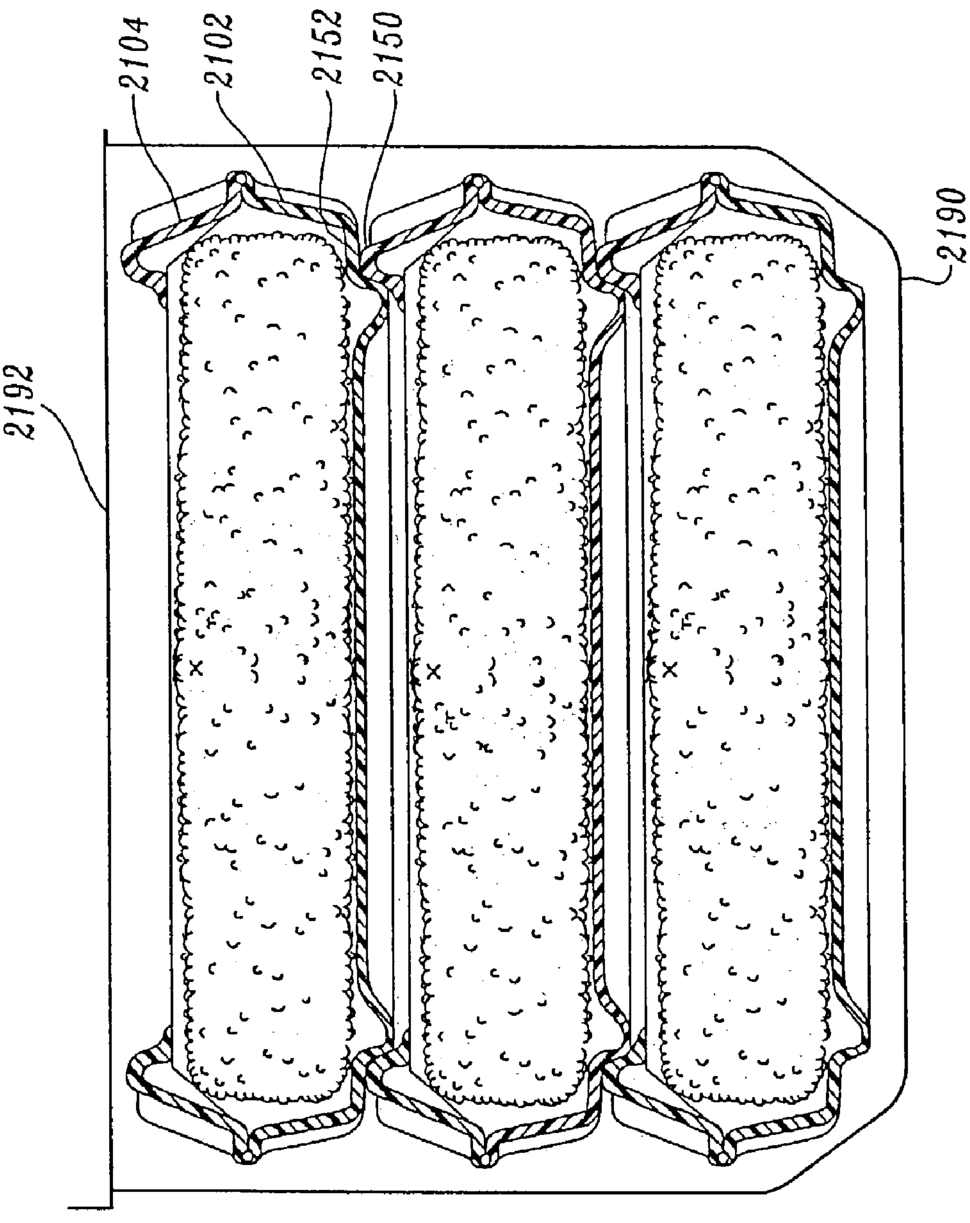
FIG. 83 shows a cross section illustration of a master container according to the present invention.

Turning now to FIG. 83, three finished packages 2100 are stacked together within a flexible gas barrier container 2190, showing how ridge 2150 mates with recess 2152. A gas barrier lid 2192 is hermetically heat sealed to gas barrier container 2190 after substantially all air has been evacuated and replaced with a suitable gas that may be substantially oxygen free.

3.2.21. Embodiment

Figure 84:
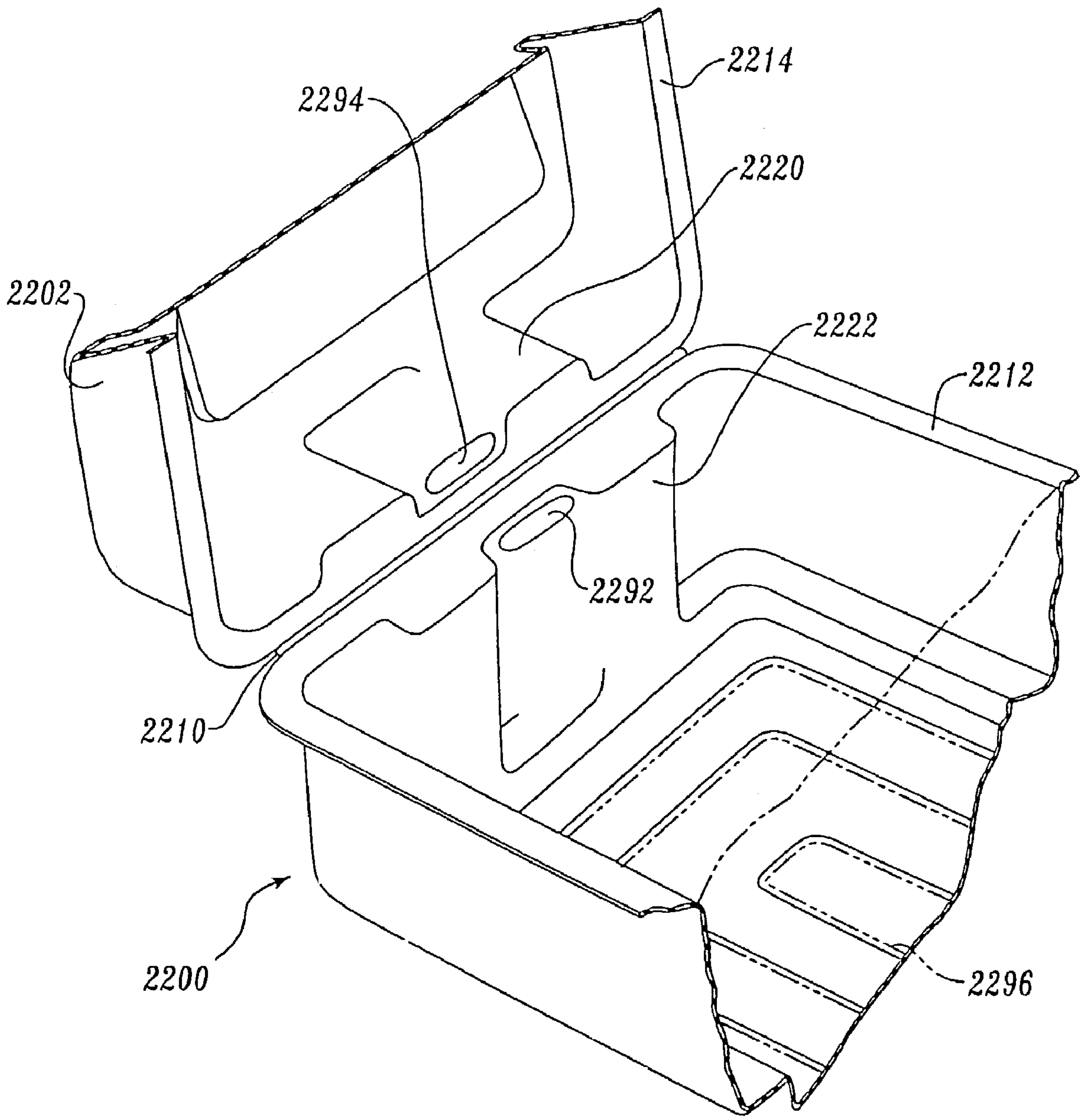
FIG. 84 shows an isometric illustration of a tray portion according to the present invention.

Referring now to FIG. 84, another embodiment of a tray with flaps constructed according to the present invention is shown. Tray 2200 includes a first 2202 and second flap (not shown). Flap 2202 is attached to tray 2200 by hinge 2210. Ridges 2220 are formed in flap 2202 and corresponding ridges 2222 are formed in the tray wall such that when flap 2202 and tray 2200 are in contact, portions of ridges are also in contact. Web 2232 is heat sealed to flanges 2212 and 2214. Apertures 2292 and 2294 are provided in the web 2232 and flap 2202 such that when flanges of the flap and tray are parallel to each other and in closest proximity, apertures are in alignment providing direct communication from the interior tray cavity to the exterior atmosphere.

Concentric depressions 2296 are shown in FIG. 84. In another aspect of the invention, tray 2200 may be formed from a three layer construction of expanded polystyrene where the inner layer includes an "open" cell structure that will absorb liquids such as water and blood. The depressions 2296 provided on the inner surface of the tray 2200, may allow contact of liquids, that may be present in the tray 2200, with the inner cells of the tray material and allow absorption of liquids by the open cell structure.

3.2.22. Embodiment

Figure 85:
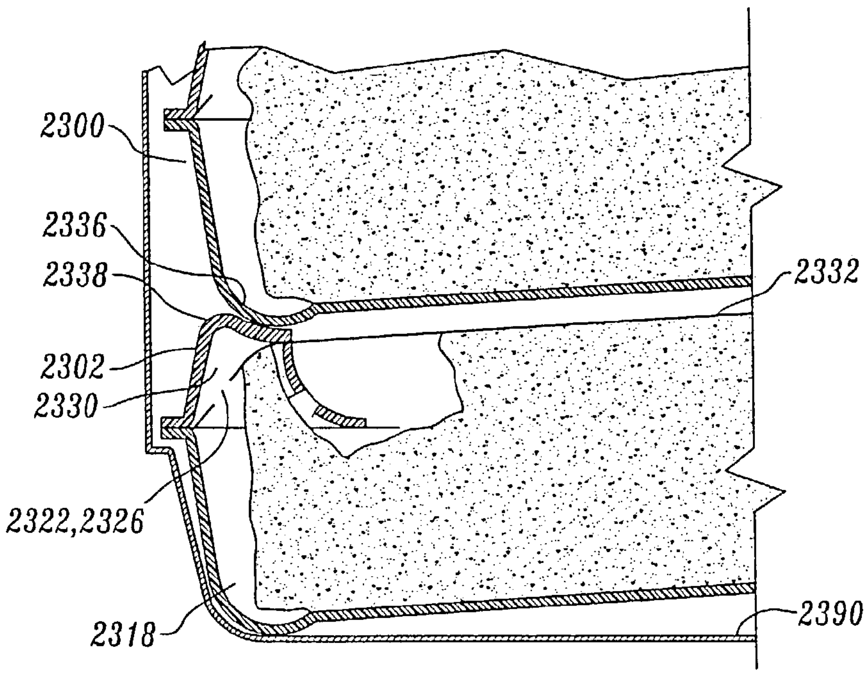
FIG. 85 shows a cross section illustration of a tray portion according to the present invention.
Figure 86:
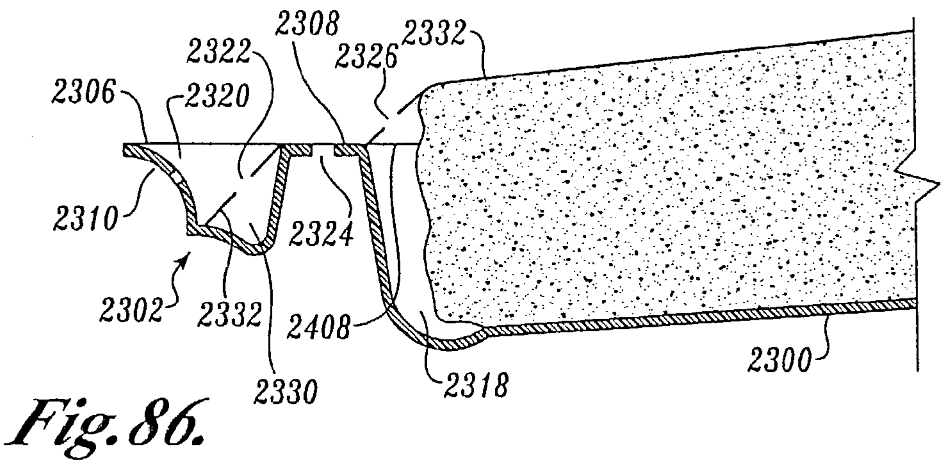
FIG. 86 shows a cross section illustration of a tray portion according to the present invention.
Figure 87:
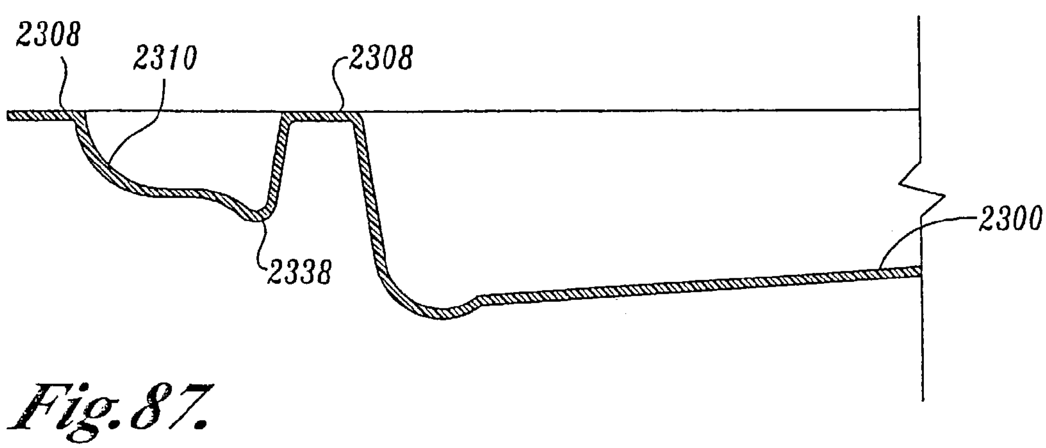
FIG. 87 shows a cross section illustration of a tray portion according to the present invention;.

Referring now to FIGS. 85–87, another embodiment of a tray with flaps constructed according to the present invention is shown. FIG. 85 shows a cross-section through a plurality of like trays 2300, showing a stackable feature according to the invention. Trays 2300 are stacked in master container 2390 containing the finished packages 2300.

In another aspect, FIG. 86 shows a cross-section through a tray 2300 that contains ground meat with a web 2332 stretched over the ground meat and sealed to flanges 2306, 2308 and edge portion 2310.

Flanges 2306 are not shown in this cross-section, but it is apparent that flanges 2306 are substantially planar with flange 2308 and at a minimum along opposite edges of flap 2302. Furthermore, flanges 2306 are oriented in the same direction as the cross-section shown in FIG. 86. The flanges 2306 occur along the bottom edge of the side walls of the flap 2302. Vertically, nearest flange 2308 when the flaps are folded inward to partially cover the tray cavity. Because the flaps have sidewalls (some of which may be curved), the walls of flap 2302 define an interior cavity 2330. Sealing web 2332 to a portion of the wall or edge portion 2310, flanges 2306, and flange 2308 creates a second cavity or recess 2320.

Flanges 2306 may also occur at other locations along the length of the flap 2302 oriented in substantially the same direction. Adding additional flanges 2306 will cause the web 2332 to seal to the flanges 2306 and the flap edge portion 2310 in an alternating pattern. This pattern will create a series of recesses 2320 in the locations where the web 2332 is sealed to the edge portion 2310. However, where the web 2332 is sealed to the flanges 2306, no recesses 2320 will occur. Recesses 2320 are carved out of cavity 2330. The space behind the web 2332 (i.e., the remainder of cavity 2330) remains in communication over its remaining area. Therefore, gases and liquids that travel into recess 2320 and enter aperture 2322 may enter cavity 2330. If apertures 2326 are provided in the walls of the flap 2302 that define the cavity 2330 (see FIG. 85), the aforementioned gases and liquids could escape the interior of the tray via the aforementioned path and exit into the surrounding environment through the apertures 2326.

A flap 2302 is shown that has been severed from tray 2300 and web 2332 is also sealed to flap 2302. Flap 2302 and tray 2300 are therefore attached together by web 2332 and a gap 2324 is provided between flap 2302 and the tray 2300. An aperture 2322 is provided in web 2332 at flap 2302 portion and an aperture 2326 is also provided in web 2332 at tray portion. A space 2318 may be provided between the product and the tray wall. Directly above space 2318, an aperture may be provided in the web 2332.

In another aspect of the invention, severing of flap 2302 is optional. In this embodiment, flange 2308 is not severed. Instead, a hinge may be provided by compressing flange 2308 with a profile so as to facilitate easy hinging of flap 2302 and tray 2300 relative to each other. FIG. 87 shows an alternate embodiment of tray 2300. In this embodiment, the flap 2302 is not severed and the edge portion 2310 has a convex profile. Furthermore, flange 2316 has been added at the end of the edge portion 2310.

Returning to FIG. 86, flap 2302 is arranged such that it can be "hinged" about the gap 2324 such that flanges 2306 and 2308 contact directly with web 2332 material therebetween. Flanges can then be sealed together through web 2332 such that web 2332 material seals together in a desired manner. The apertures 2322 and 2326 are positioned such that they become aligned after sealing of the flanges. Web 2332 material is then most likely to become lightly bonded together around the perimeter of apertures 2322 and 2326. An adhesive may also be applied to the contacting surfaces of web 2332 around the perimeters so as to cause substantial bonding and providing a substantially liquid 'tight' seal there around so as to inhibit escape of any liquids therebetween. This arrangement provides a direct communication from space 2318 to any atmosphere external to the package, via apertures 2326 and 2322, space 2330, recesses 2320 and space 2326. The location of apertures, spaces and recesses are arranged such that any liquids (or solid matter) that may accumulate within the package are inhibited from escaping from space 2318. With this arrangement, gases can communicate directly between space 2318 and while liquids and other solid matter is substantially restricted and held within space 2330 or 2318.

Referring to FIG. 85, packages are stacked such that the ridges 2336 on the base of a first package "nest" adjacent to ridges 2338 of a second package. A space can therefore be maintained between the bottom of the first package and the web and contents of the second package.

3.2.23. Embodiment

Referring now to FIG. 88, another embodiment of a tray constructed according to the present invention is illustrated.

In this aspect, the tray may be used to provide a sealable web having a peelable barrier layer to expose a semi-permeable layer beneath. The tray 2400 includes flap 2402. Flap 2402 is attached to tray 2400 along an outer edge of tray flange 2406 and a further flap (not shown) can be attached to the outer edge along the opposite side of the tray 2400 which is parallel with the first flap and is similar in operation thereto. After sealing the first and second webs to flanges 2406 and 2408, flap 2402 can be folded downwardly so that radius 2410 engages with recess 2412. Flap 2402 includes a hinge 2416 that can be folded along a hinge line through an arc. Radius 2410 and recess 2412 "mate" and can be arranged so that they "snap" into a matingly engaged position, thereby holding the flap 2402 firmly in position against the tray 2400.

Referring now to a cross-sectional view of the stacked trays in FIG. 90, an alternate embodiment of tray 2400 is shown. This embodiment is substantially similar to the embodiment shown in FIG. 88 except that this embodiment includes lip 2428 (discussed below). In both embodiments, flap base 2418 is shaped so as to correspond with profile of flanges 2406 and 2408 and a ridge 2426 is located along the external edge of flap base 2418 such that when a finished package is stacked above another similar package they will "nest" together and the upper tray is prevented from contacting the contents of the lower tray. The base 2420 of the tray can be formed with a profile providing an upwardly extending depression that extends above the highest point of the contents in the lower tray. In this fashion, the finished packages can be stacked within cartons for distribution and shipped long distances without causing damage to contents of the trays in the lower position. The tray 2400 has recessed base 2420 to clear goods in the tray below. The lip 2428 formed by the over-wrap can be heat sealed after folding of the flap 2402 by heat seal bars 2430 to ensure that flap 2402 is retained in folded position as shown in the stacked finished packages FIG. 90. Ridges 2432 can be formed into flaps to improve rigidity and stability of the finished pack as shown in FIG. 89.

3.2.24 Embodiment

Figure 91:
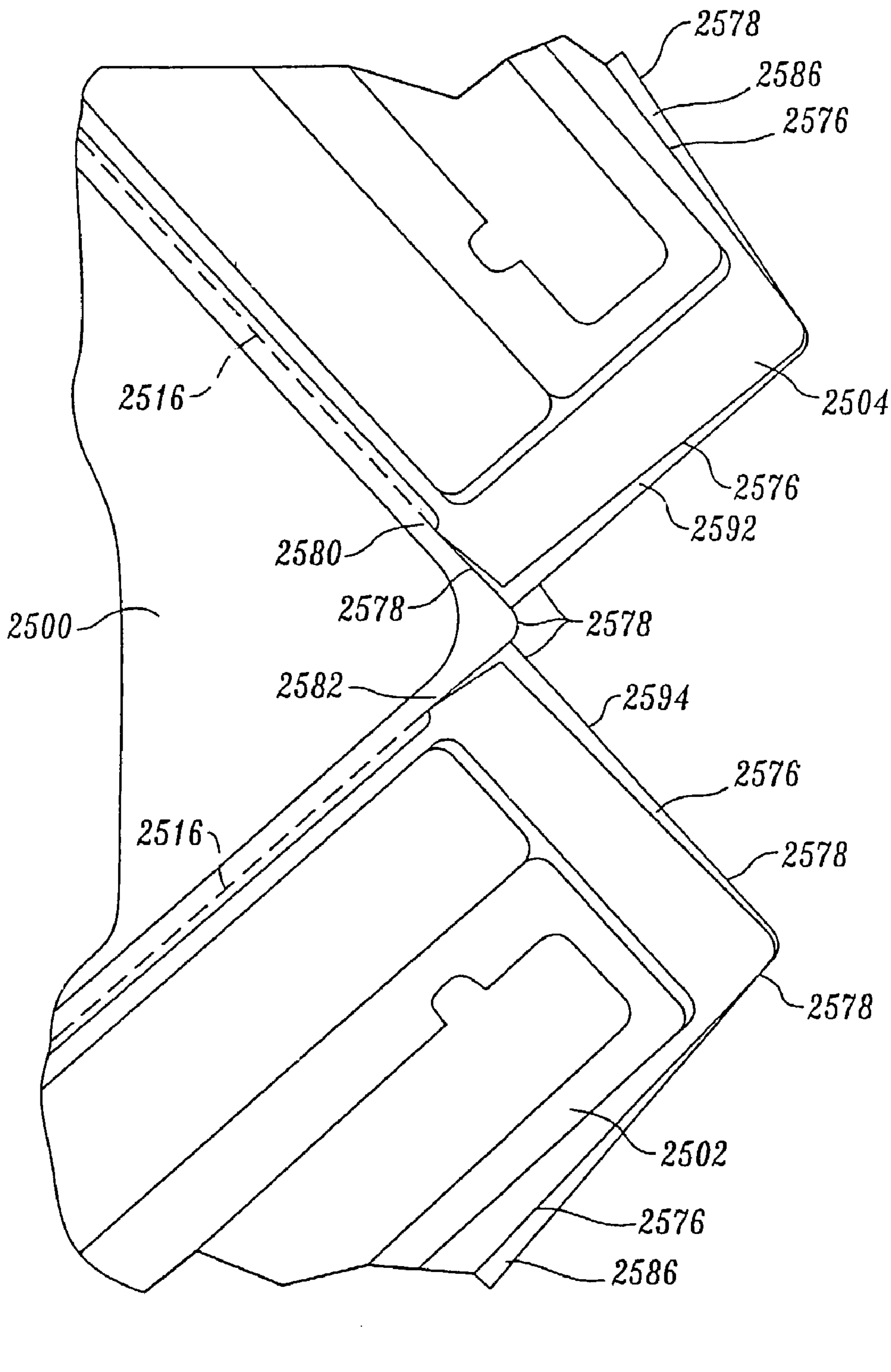
FIG. 91 shows a top illustration of a tray portion according to the present invention.
Figure 92:
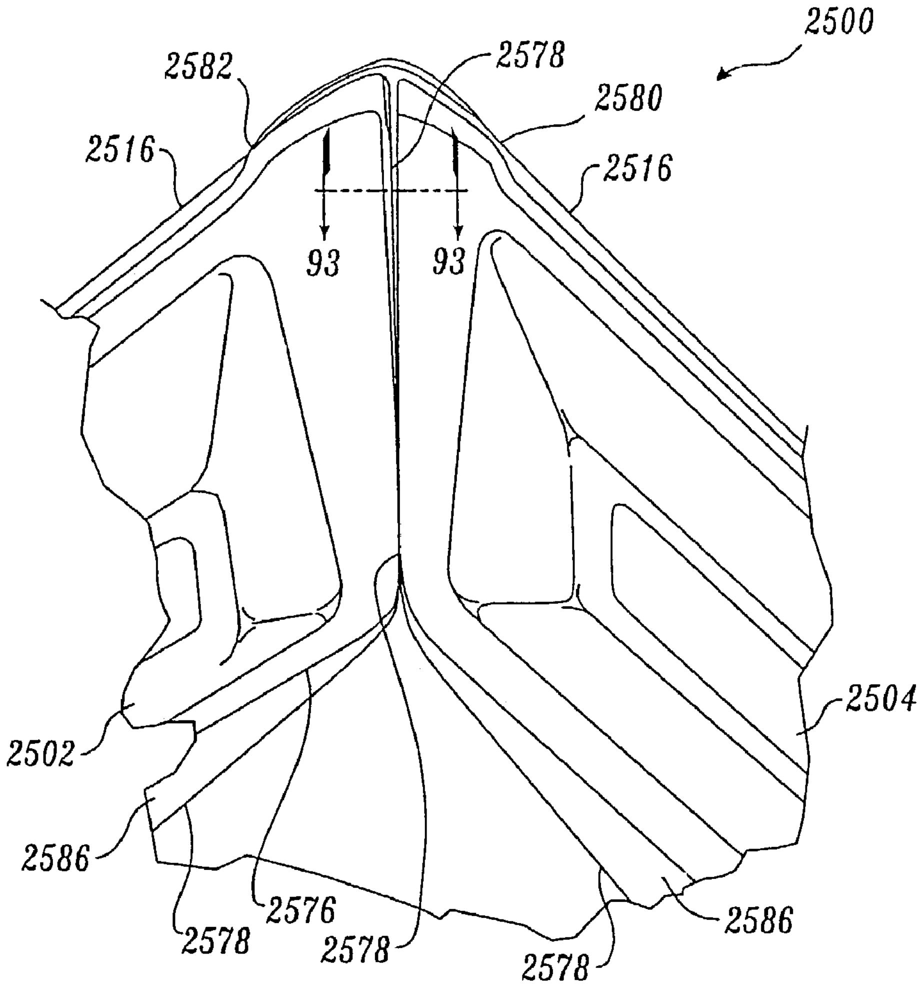
FIG. 92 shows an isometric illustration of a tray portion according to the present invention.

Another aspect of the invention is shown in FIG. 91. FIG. 91 shows a tray 2500 prior to folding and bonding of the flaps. FIG. 92 shows a view of a section of the tray 2500 after folding and bonding of the flaps to the tray wall. In this aspect, sections may be added to the edges of the flaps that are not connected to the tray 2500. Because such sections can be added to many embodiments of a tray with flaps, further features of the tray and flaps will not be discussed in detail, however several detailed embodiments with flaps including these sections are discussed later in this application.

The tray section shown in FIGS. 91–92 details a single corner section of a four cornered tray, however, all four corners of the tray with flaps can be similar. Flaps 2504 and 2502 are shown attached to a tray 2500 at a hinge 2516. The flaps 2504 and 2502 can be printed by ink jet devices, prior to folding and bonding. Adhesives can also be applied by ink jet printers to the flaps and tray. Hinge lines 2576 and cut lines 2578 are provided around the periphery of the flaps 2502 and 2504. The cut lines 2578 and hinge line 2576 terminate at points 2580 and 2582. Hinge line 2576 provides a means to fold sections 2586 at the bottom of flaps 2504 and 2502, which can be folded and bonded to the base of tray. However, it is apparent that hinge line 2576 and cut line 2578 need not run continuously around the periphery of the flaps 2502 and 2504. Hinge line 2576 and cut line 2578 could be cut into the shorter sides of the flaps 2502 and 2504 from the points 2580 and 2582 to the free corner of the flaps. The area between the cut line 2578 and the hinge line 2576 on flaps 2502 and 2504 form walls 2594 and 2592 respectively.

According to the present invention, a method for production of trays with flaps includes a thermoforming process and a "cut in place" procedure. The term "cut in place" is a common term used by those skilled in the art of tooling manufacture and use of thermoforming equipment. This term describes a thermoforming production method including the use of a thermoforming tool with a cutting devices incorporated into the tool so as to permit cutting of the subject thermoformed component from a web of plastics material immediately after forming and before ejection and removal of the component(s) from the thermoforming tool.

Figure 93:
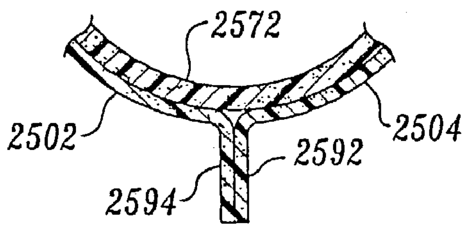
FIG. 93 shows a cross section illustration of a tray portion according to the present invention.

Referring now to FIG. 93, a cross-sectional view through a corner 2572 of the tray 2500 with flaps 2502 and 2504, after the flaps have been folded and bonded, is shown. The "cut in place" forming method allows a method to provide walls 2592 and 2594, which are extensions of flaps 2502 and 2504 that can contact each other, as shown, and be bonded together after folding the flaps into the finished position. In this way, a substantially more rigid tray structure can be provided that would otherwise require a heavier wall section for trays that have not been provided with flaps as herein disclosed. With ink jet application of adhesives, as described herein, an efficient means of economically applying the minimum quantity of adhesives is provided. In this way, adhesives can be applied in a pattern that allows for maximum surface area bonding of trays and flaps while minimizing the quantity of adhesive material required.

In another preferred embodiment, adhesives such as any suitable bonding medium may be applied to surfaces of the flaps of tray and the tray walls and base by any suitable "ink jet" apparatus. Furthermore, colored graphic printing and any desired information can be printed and/or applied to any desired surfaces of the tray and flaps by any suitable "ink jet" apparatus. The "ink jet" equipment is manufactured by several companies such as Hewlett Packard, Xerox, SciTex, Marconi/Video Jet and others. The equipment can be arranged to apply inks, lacquers and adhesive materials as required by, for example, arranging the ink jet equipment adjacent to a conveyor that can transport the trays with flaps at a suitable speed and in such a manner as to allow application of the inks and other materials to the trays and flaps, as required. A conveyor may be arranged adjacent to and integrated with thermoforming machinery such that immediately after producing trays with flaps, the trays can be automatically transferred onto the conveyor. The conveyor can be arranged to carry trays with flaps at a controlled speed and as required to allow application of inks and any suitable materials thereto by ink jet printer.

3.2.25. Embodiment

Referring now to FIGS. 94–96, another aspect of a tray with flaps constructed according to the invention is shown. This aspect includes a crest 2602 and a concave indentation 2624 in the flap base 2604. These features are provided to offer improved stackability. Because these features can be incorporated into many of the trays with flaps presented and other trays with flaps constructed in accordance with the present invention. Only these features of tray 2600 will be described in detail in this section.

Tray 2600 includes a crest 2602 (similar to crest 1350 shown in FIG. 46 of tray 1300) constructed on the perimeter of the tray opening on a wall of the tray 2600. A similar crest is also constructed on opposite sidewall so as to form two convex areas having a first radius. Referring now to FIG. 95, a flap is shown with a flap base 2604 having a concave indentation 2624 of a second radius. When folded, as in a finished package, flap base 2604 is substantially level with the tray base 2616. Two such flap bases are provided, each in opposing sides from the other. Turning now to FIG. 96, a plurality of finished stacked packages using the trays of FIG. 94 is shown. The flap base concave indentation 2624 radius is smaller than the radius of tray crest 2602, so that when stacked, flap base 2604 of upper tray 2612 makes contact with tray crest 2602 of lower tray 2614 at two locations 2608 and 2610. In this manner, trays are prevented from rocking back and forth. A space is provided between upper tray 2612 and lower tray 2614 which is also shown in FIG. 96. In this manner, the underside of tray base 2616 is prevented from touching the sealed or overwrapping web on lower tray. The sealed or overwrapped web material substantially holds the fresh meat portions to the tray base. In one instance, the web material is oxygen permeable. Finished packages can thus be stored and packaged in any of the master containers disclosed herein. The disclosed tray profile allows stacking of several layers of trays in a vertical stack, wherein each loaded and over wrapped tray is located directly above and in contact with a lower tray to maximize density of a finished master container. The profile of the flaps is an upwardly arched base that corresponds with the profile of the tray upper flange profile. In one aspect of the invention, ground meat is extruded with a profile that corresponds to the inner profile of the cross section across the length of the tray such that when loaded into the tray, the upper surface of the extruded grinds portion is in firm contact with the tray over wrap so that it holds it in place and slightly below the upper edge of the flanges. The end flanges are arched to match the arched base and end flap profile of the lower tray profile. Continuous bonding of each flap around its perimeter to ensure that the end edge butts up and contacts the adjacent flaps provides for maximum structural stability and minimum twist after fabrication and bonding. Thus, the double walls (inner cavity and outer flap) improve crush resistance.

3.2.26. Embodiment

Figure 97:
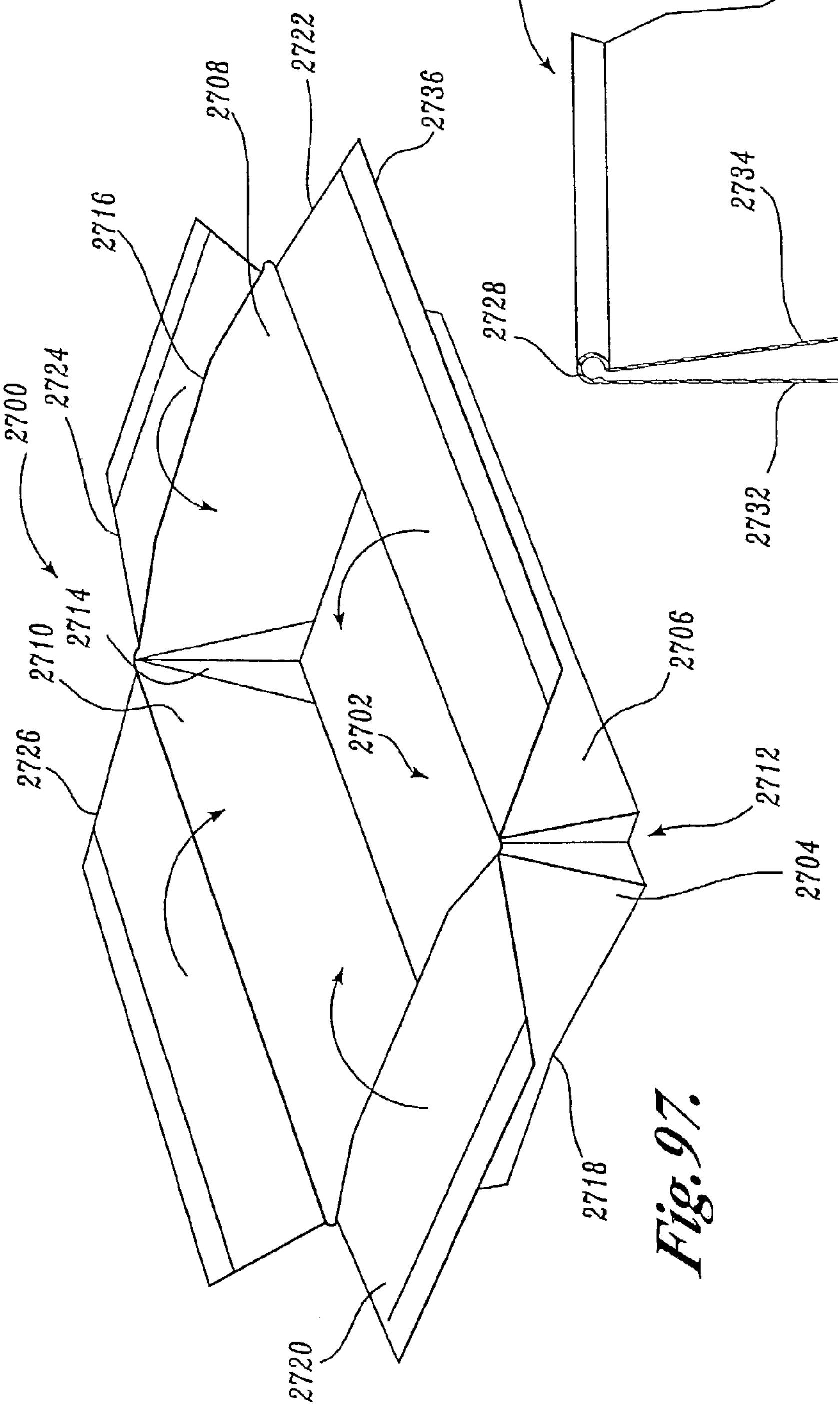
FIG. 97 shows an isometric illustration of a tray according to the present invention.

Referring now to FIG. 97, an embodiment of a pre-form tray web with flaps is illustrated. The pre-form tray web 2700 can be shaped into a finished tray. The web can be constructed of any suitable material such as PVC, PP or other suitable materials herein disclosed in this specification. The method used to form the web can be thermoforming or any other suitable methods. The web 2700 is constructed of a rectangular base 2702. The base is surrounded by four upwardly extending walls 2704, 2706, 2708 and 2710. The walls may be outwardly reclined to facilitate the removal of the web from a mold or the nesting together in a stack of similar tray pre-forms (not shown).

The walls are connected to the base 2702 at a lower portion thereof and adjoining walls are connected to each other thusly forming corner sections. In this embodiment, the corner sections are made from the ends of the walls being creased inwardly 2714 where the ends attach to an adjacent wall. Thus, two ends of two walls form an inwardly extending corrugation 2712 to give the web additional strength when finished into a tray.

Two walls 2702 and 2708 of the four walls on opposing sides are formed with an upwardly extending region 2716 in the center, and an angled shaped bottom edge 2718 to give the finished trays the ability to be stacked atop one another without allowing the sealing web of a lower tray to touch the base of the adjacent stacked upper tray. While an angled bottom has been shown, the shape may take an arcuate form. Furthermore, the base is configured to have similar angled surfaces or arcuate shape that corresponds to the shape of the lower portion of the side walls 2702 and 2708.

Figure 98:
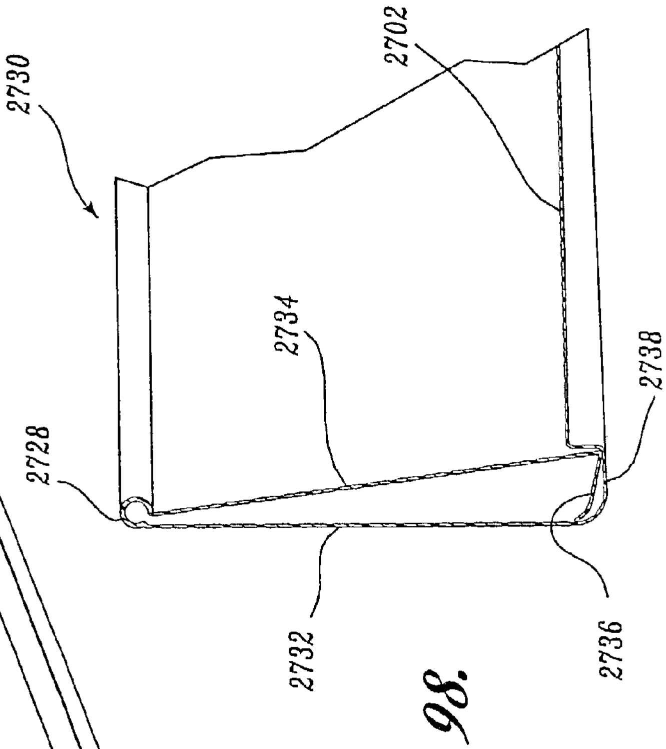
FIG. 98 shows a cross section illustration of tray portion according to the present invention.

The upper edges of the walls 2704, 2706, 2708 and 2710 are attached to flaps 2720, 2722, 2724 and 2726, respectively. Referring now to FIG. 95, the flaps are joined to the upper edge of the walls at a hinge 2728 to allow the flaps to rotate inwardly. The finished tray 2730 will thusly include an outer 2732 and an inner 2734 reinforcing wall made from the flaps. The flaps include a tab 2736 connected to one edge of the flap which can be folded inwardly as shown in FIG. 98 to press fit into a groove 2738 formed at the lower perimeter of the base 2702. The member formed by the folded tab 2736 thus forms a securing device which is press fitted into the corresponding base groove 2738 without the need for bonding the flaps to the finished tray with adhesives thereto.

3.2.27. Embodiment

Figure 99:
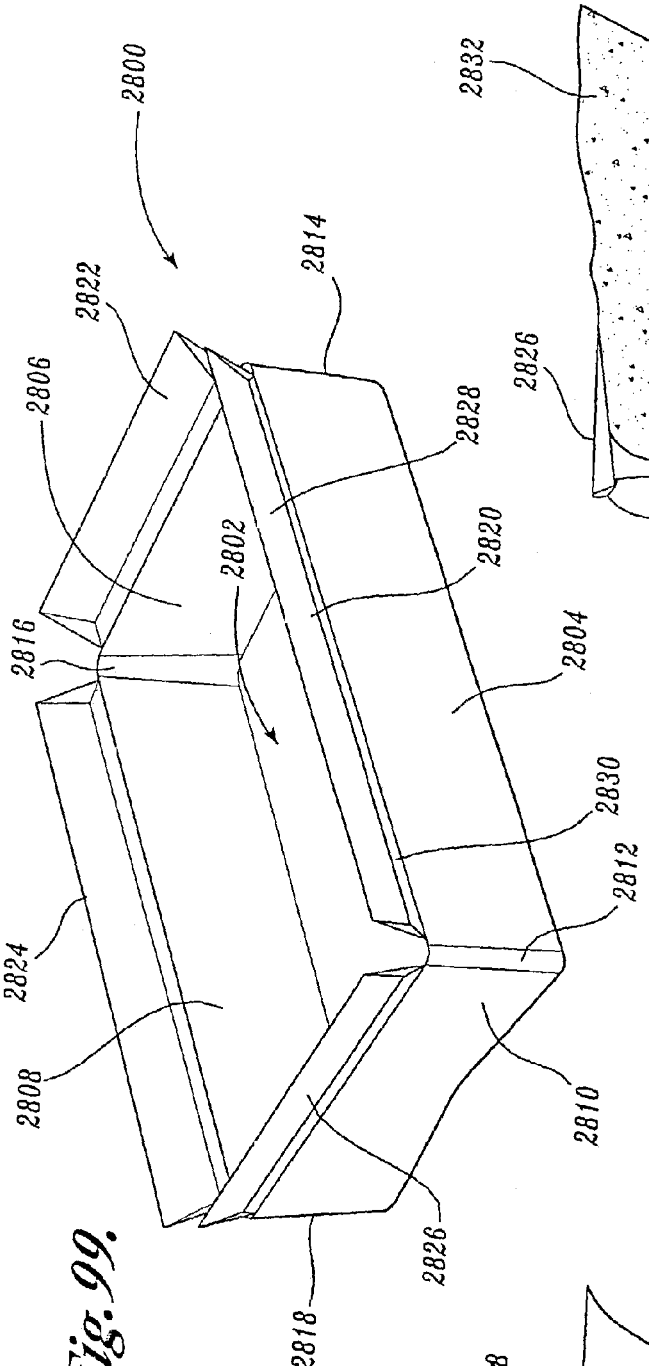
FIG. 99 shows an isometric illustration of a tray according to the present invention.

Referring now to FIG. 99, an alternate embodiment of a pre-form tray web with flaps is illustrated. The pre-form web can be either thermoformed or injection molded from any suitable plastics material, such as polypropylene. The web 2800 includes a base 2802 with four vertical walls 2804, 2806, 2808 and 2810 connected to the base 2802 at lower edges of the walls thereof. The pre-form tray web 2800 is in one instance constructed by injection molding or other suitable method, such as thermoforming. The walls may be inclined to facilitate the removal of the web pre-form from a mold. The base is connected to the walls at lower portions thereof, and the walls are connected to each other at adjacent ends, thusly forming corners 2812, 2814, 2816 and 2818 where the ends of walls connected to each other and to the base 2802 meet. Opposing two walls 2810 and 2814 of the four walls are formed with angled edges at a lower central portion thereof to form a recess under the base of the tray so that upon stacking of finished trays, the goods are not in contact with a lower stacked tray. The base 2802 is likewise configured with angled surfaces to correlate to the shape of the walls 2810 and 2814 so that the base 2802 is aptly suited to minimize contact with the goods of a lower stacked tray.

Figure 100:
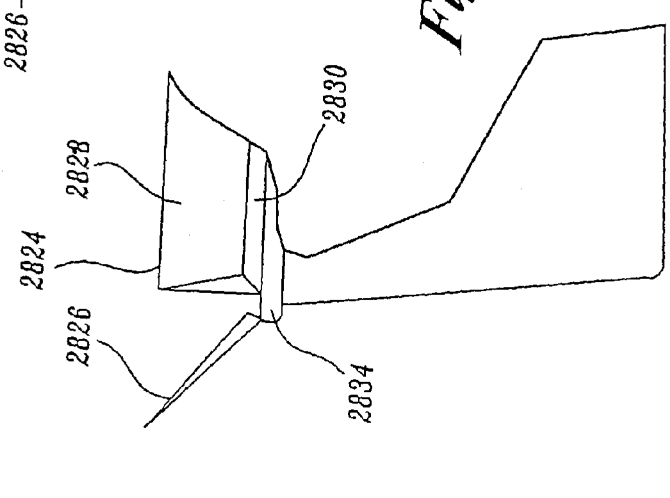
FIG. 100 shows a side illustration of a tray portion according to the present invention.
Figure 101:
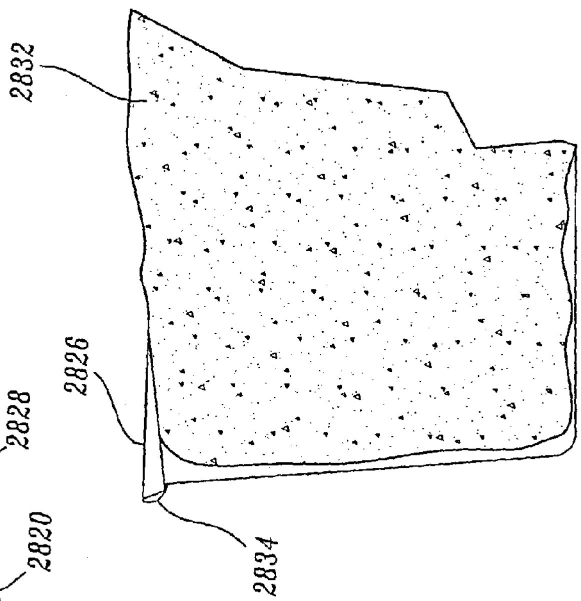
FIG. 101 shows a cross section illustration of a tray portion according to the present invention.

The upper edges of the walls include flaps 2820, 2822, 2824 and 2826 suitably constructed so as to inwardly rotate about a hinge around the perimeter of the opening. Referring to FIG. 100, the flaps are constructed with a number of surfaces 2828 and 2830 at desirable oblique or perpendicular angles to impart strength to the flaps and the finished tray in the form of a structural member. FIG. 99 illustrates one embodiment of surfaces 2828 and 2830. In FIG. 99, surfaces 2828 and 2830 form oblique or perpendicular angles that extend upward from the top of the tray when the flaps are folded inward and downward: FIGS. 100 and 101 illustrate an embodiment in which the surfaces 2828 and 2830 form an oblique or perpendicular angle that extends downward toward the base 2802 of the tray when the flaps are folded inwardly. The embodiment illustrated in FIGS. 100 and 101 also includes a flange 2834. The flaps may partially rest upon the flange 2834 when folded inwardly to increase the strength and stability of the flaps in the downward position. As with other trays disclosed herein, the trays of this embodiment are intended to be stackable atop one another. Referring now to FIG. 101, a portion of a finished tray with goods 2832 placed therein and folded flap 2836 is illustrated.

3.2.28. Embodiment

Figure 102:
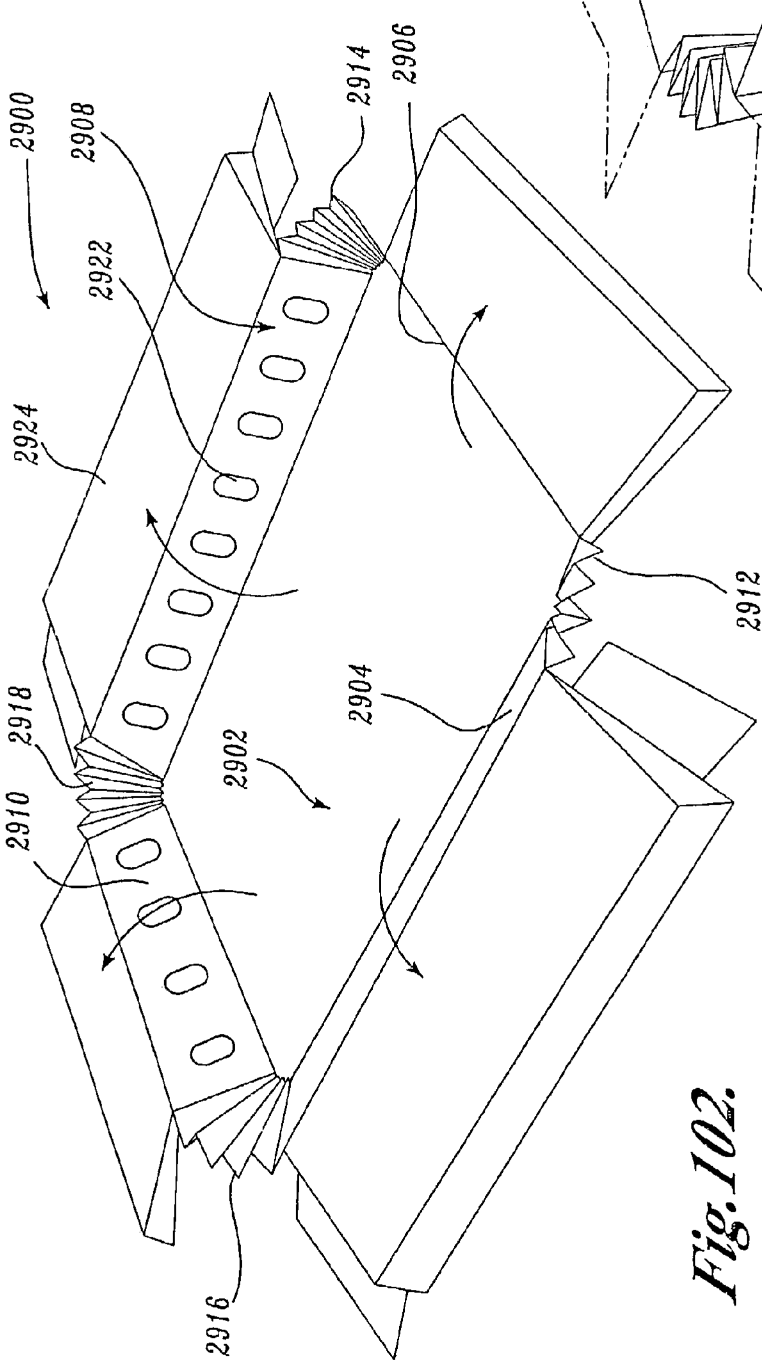
FIG. 102 shows an isometric illustration of a tray according to the present invention.

Referring now to FIG. 102, another alternate embodiment of a pre-form web for finishing into a tray is illustrated. The web in this embodiment can be thermoformed of suitable materials disclosed herein or by other suitable methods known in the arts. The web 2900 includes a rectangular base 2902 with four walls 2904, 2906, 2908 and 2910 attached at the respective four sides around the perimeter of the base 2902. The walls contain ribs 2922 to add structural rigidity and strength to a finished web. When the flaps are folded, the flaps can be bonded to the ribs, which project outward, thusly allowing bonding of the ribs to the flaps. In this manner, the flap faces 2924 can be pre-printed with a barcode containing relevant information or other product description.

Figure 103:
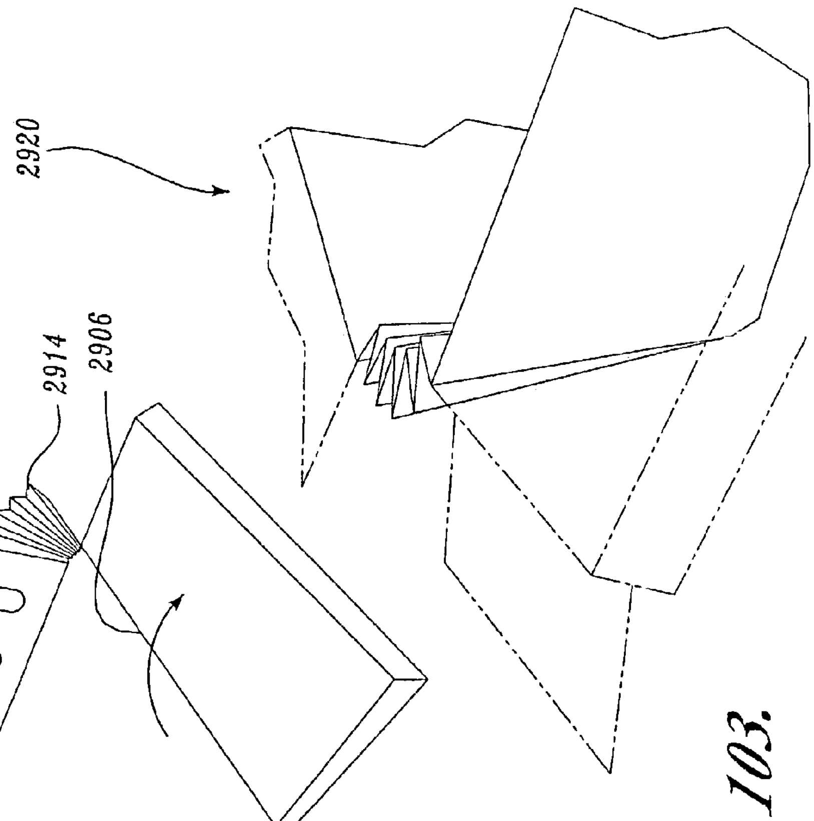
FIG. 103 shows an isometric illustration of a tray portion according to the present invention.

The walls are connected to each other at adjacent ends thereof, respectively. The four adjacent walls are joined to each other by corrugated sections 2912, 2914, 2916 and 2918 joining a first end of a first wall to a second end of a second wall and so on. When the web 2900 is finished into a tray, the corrugated sections will appear as shown in FIG. 103. The corrugated sections are intended to impart rigidity and strength to the finished tray 2920. For example, under certain thermoforming or injection molding conditions, the lower corners where the base and walls are connected, the web material may be stretched or "thinned" out, thus creating a weak spot and a potential source for leaks. By forming a web with corrugated corners the weak sections of the finished tray are strengthened accordingly.

3.2.29. Embodiment

Figure 104:
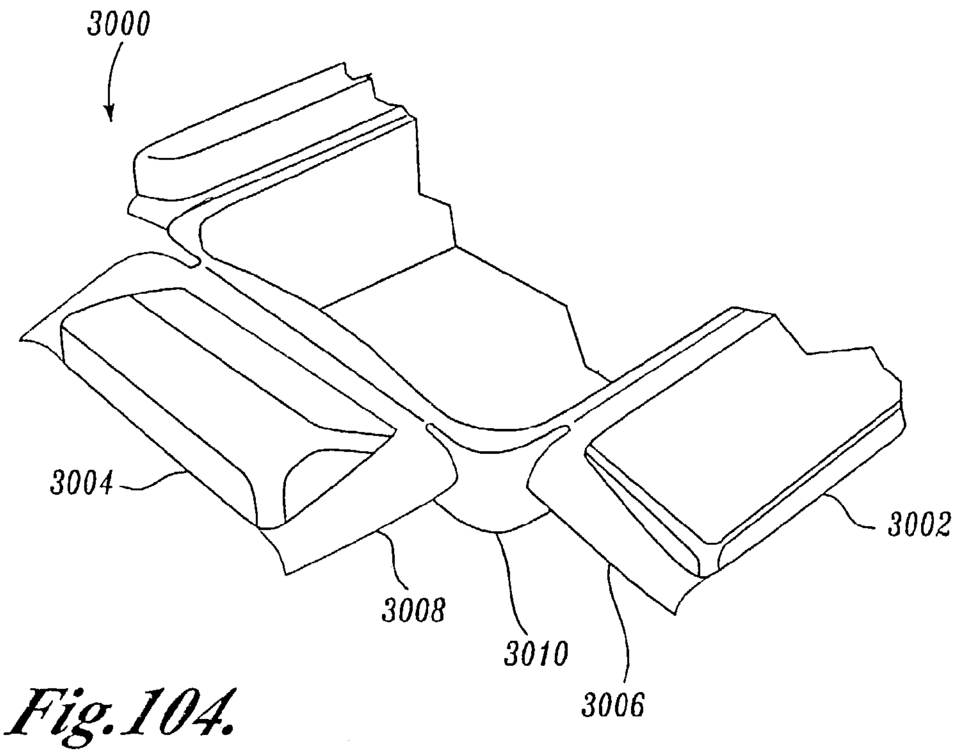
FIG. 104 shows an isometric illustration of a tray portion according to the present invention.
Figure 105:
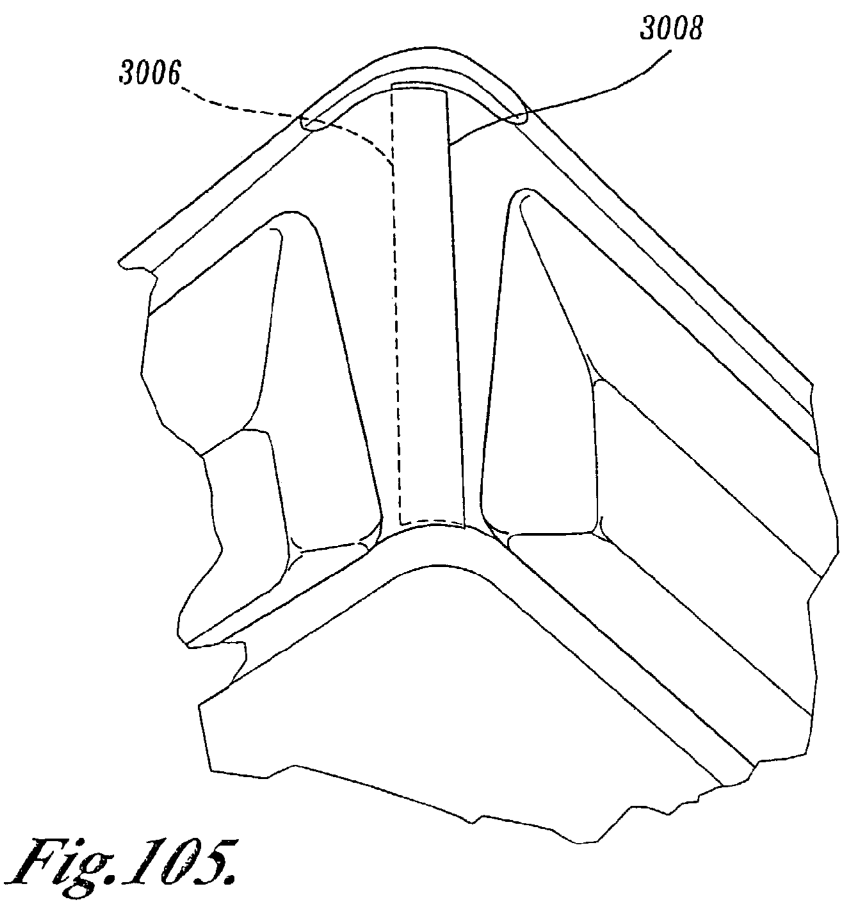
FIG. 105 shows an isometric illustration of a tray portion according to the present invention.

In another alternate embodiment illustrated in FIG. 104, a tray is constructed with flaps having contoured ends to substantially lie adjacent to a corner where the base and walls are joined together, when the flaps are thusly folded. The flap ends may reinforce the corners of the finished tray by overlapping and/or wrapping around the corner sections on the bottom and sides thereof. One or two flap ends may be bonded to a corner to reinforce the corners. In one actual embodiment, a tray 3000 includes four flaps. Flaps 3002 and 3004 include contoured end portions 3006 and 3008, respectively, rounded to conform to a rounded corner 3010 of the web base and walls. A first flap 3002 is folded and bonded to the tray 3000 such that the rounded end portion 3006 of the flap 3002 overlaps the corner area 3010. A second flap 3004 has an end portion 3008 can be folded on top of the first rounded flap end portion 3006 to doubly strengthen the corner section 3010 of tray 3000, as illustrated in FIG. 105.

3.2.30. Embodiment

Figure 106:
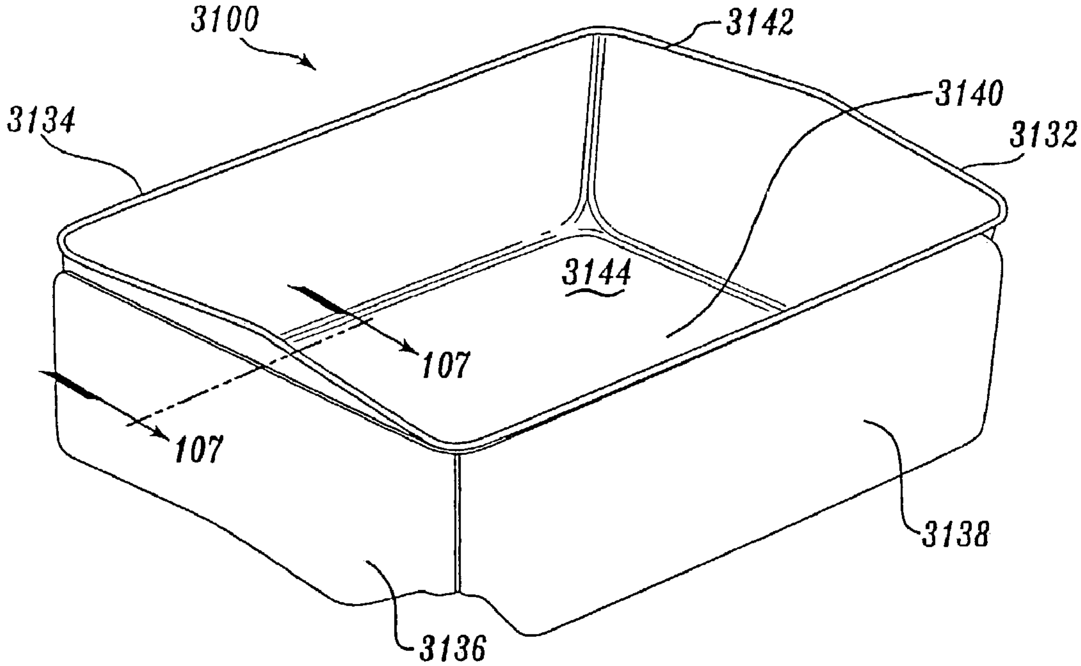
FIG. 106 shows an isometric illustration of a tray according to the present invention.

Referring now to FIG. 106, a tray is shown in a three dimensional disposition. The tray 3100 is arranged with a base 3140 and four upwardly extending walls terminating at a flange 3142. The four walls and the base define a cavity 3144. Attached to the flange 3142 are four flaps 3132, 3134, 3136 and 3138. In FIG. 106, all four flaps are folded outwardly and downwardly along a hinge that connects each flap to the tray. Each of the walls may be rigidly fabricated by bonding together, two or more layers of the tray material. Several embodiments disclosed provide increased rigidity to the side walls of the finished tray by bonding flaps to the tray walls. The current embodiment offers a means to increase the number of layers of material bonded to the tray walls. In this way, the tray walls can be rigidly constructed with higher compression resistance and at a lower cost than would otherwise be incurred for a single or double layer finished wall of a similar compression resistant rigidity.

Figure 108:
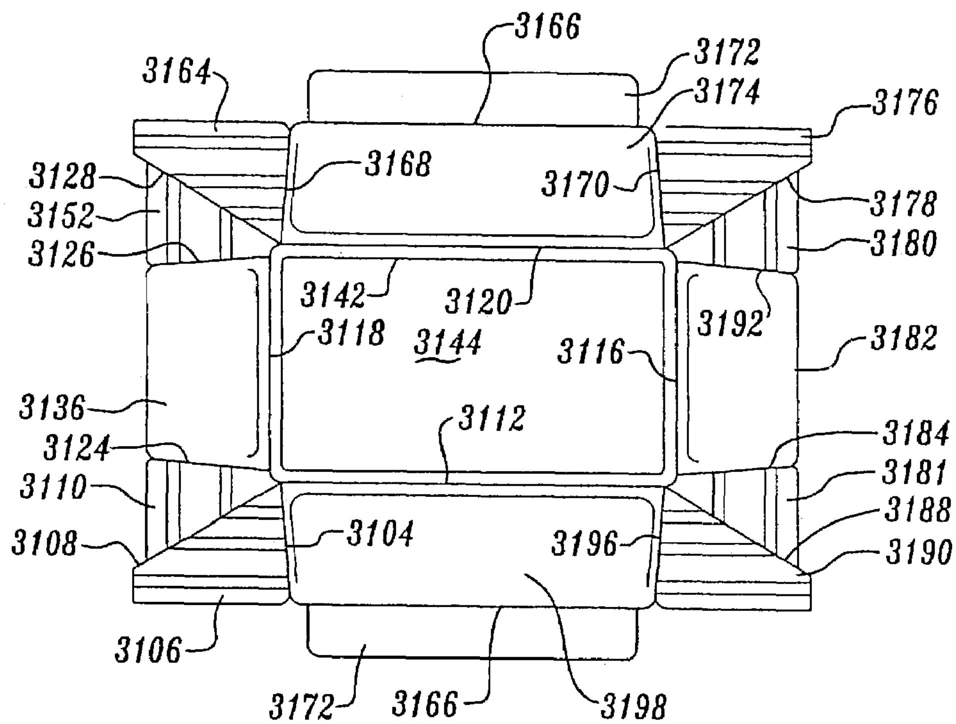
FIG. 108 shows a top illustration of a tray according to the present invention.

FIG. 108 shows tray 3100 with its flaps unfolded, so that the layers of material that will form the finished side walls can be illustrated in detail. Referring now to FIG. 108, a thermoformed pre-form is shown which can be manufactured from any suitable material, of any suitable thickness. In one instance, preforms are thermoformed from extruded polypropylene sheet with a thickness of approximately 0.018". The polypropylene sheet is then thermoformed to produce a pre-form, which is constructed so that it can then be folded and bonded into a stackable tray profile. The pre-form consists of a cavity 3144, with a series of semi-rigid flaps, all connected by at least a single hinge to the flange 3142. Cavity 3144 has a base 3140 with four upwardly extending walls terminating at a continuous flange 3142. Flange 3142 may be arranged with four straight sections connected via rounded corners but the other packaging tray configurations may be fabricated of any suitable configuration. At the outer perimeter of flange 3142, adjacent flange flaps 3136, 3174, 3198 and 3182 are attached via hinges shown as 3118, 3120, 3122 and 3116, respectively.

Located at each corner of the tray 3100 between each adjacent pair of flaps, corrugated flaps are provided. Between adjacent flange flaps 3136 and 3174 a pair of generally corrugated adjacent flaps 3152 and 3164 are located. Corrugated flap 3152 is attached to flap 3136 by hinge 3126. Corrugated flap 3164 is attached to flap 3174 at hinge 3168. However, corrugated flaps 3152 and 3164 are severed completely from direct attachment together by cut 3128. Similarly, corrugated flap 3176 is attached to flap 3174 via hinge 3170 and corrugated flap 3180 is attached to flap 3182 via hinge 3192. Additionally, corrugated flap 3181 is attached to flap 3182 via hinge 3184 and corrugated flap 3190 is attached to flap 3198 via hinge 3196. Finally, corrugated flap 3106 is attached to flap 3136 via hinge 3104 and corrugated flap 3110 is attached to flap 3136 via hinge 3124. The pair of corrugated flaps 3110 and 3106 are severed along cut 3108, the pair of corrugated flaps 3152 and 3164 are severed along cut 3128, the pair of corrugated flaps 3176 and 3180 are severed along a cut 3178 and the pair of flaps 3181 and 3190 are severed along cut 3188. Each of the corrugated flaps may be folded along the hinge connecting it to the flap in a downward direction. When the flaps are folded downward and outward, the corrugated flaps will be positioned between the flaps and the tray walls as can be viewed in FIG. 107. The corrugated flaps may then be bonded to the flap at the points of contact between the corrugated flap and the flap. The corrugated flaps may also be bonded to the tray wall at points of contact between the tray wall and the corrugated flap. In this manner, the finished side walls of the tray will be composed of three layers in certain locations increasing the rigidity of the finished tray's side walls.

Figure 107:
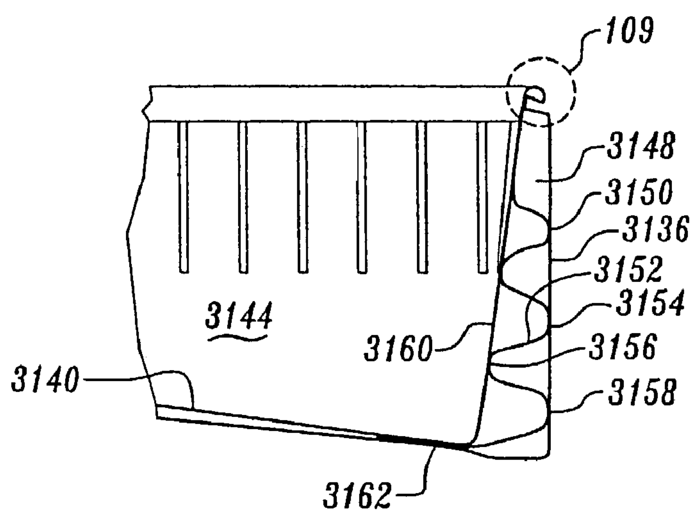
FIG. 107 shows a cross section illustration of a tray portion according to the present invention.

Referring now to FIG. 107, a finished side wall of packaging tray shown in FIGS. 106 and 108 is detailed. The folded can be bonded, by any suitable bonding means, at contact points such as 3162, 3158, 3156, 3154 and 3150. Bonding can be arranged to follow a path near the perimeter of each flap so as to hermetically seal space 3148 therein.

Figure 109:
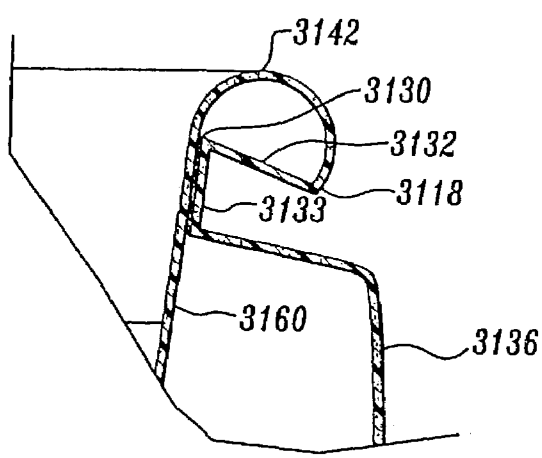
FIG. 109 shows a cross section illustration of a tray portion according to the present invention.

Referring now to FIG. 109, a cross section through flange 3142, cavity wall 3160 and flap 3136 details an embodiment wherein hinge 3118 is located parallel to a second hinge 3130 with flap section 3131 between hinges 3118 and 3130. Flap 3136 is then bonded to wall 3160 at 3133.

Referring again to FIG. 108, in an alternate embodiment, flap 3172 may be provided that is attached to the peripheral edge of flaps located at opposite sides of the tray 3100. These flaps 3172 are attached to the flaps via hinges 3166. Flaps 3172 may also be similarly attached via hinges to all flaps, if so desired. In this embodiment, pairs of corrugated flaps 3176 and 3180, 3164 and 3152, 6610 and 6606, 3180 and 3190 can be deleted and flaps 3172 folded downward against what will become internal surfaces of flaps. When the flaps are folded outward and downward, the flaps 3172 will be positioned between the flaps and the tray walls 3160.

In this manner, a three layer finished side wall may be constructed similarly to the structure shown in FIG. 104. It may be desirable to corrugate flaps 3172.

3.2.31. Embodiment

Figure 110:
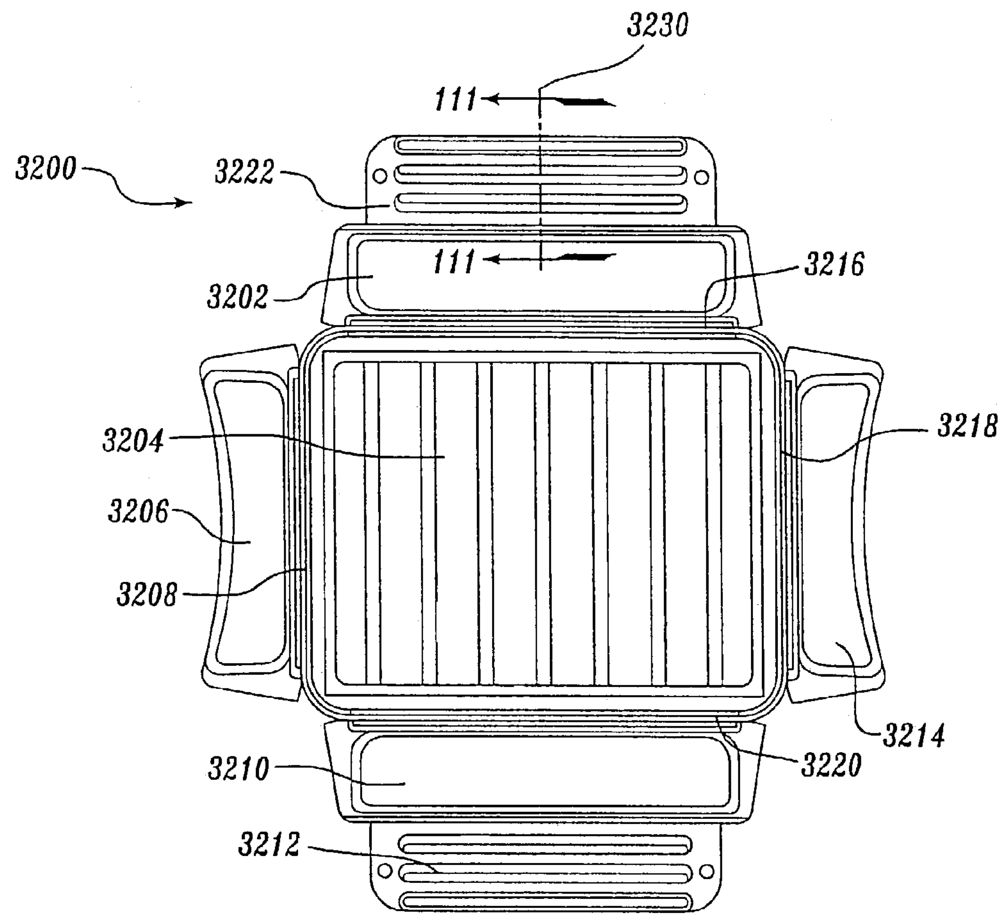
FIG. 110 shows a top illustration of a tray according to the present invention.
Figure 111:
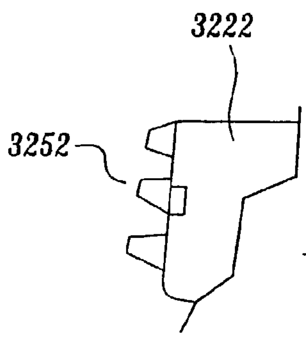
FIG. 111 shows a cross section illustration of a tray portion according to the present invention.

Referring now to FIG. 110, another embodiment of a pre-form tray 3200 is shown, wherein a centrally located cavity 3204 is connected via hinges 3216, 3208, 3220 and 3218, to flaps 3202, 3206, 3210 and 3214 respectively. Additional flaps 3212 and 3222 are attached via hinges to flaps 3202 and 3210. Ribs, such as the ribs shown in the additional flaps 3212 and 3222, can be provided to all parts of the tray cavity, walls, and flaps. Furthermore the ribs can be arranged in any suitable profile so as to maximize rigidity of the finished tray. Ribs and ridges may be positioned in any direction, including either vertically or horizontally along the surface of the tray and flaps to resist crushing and torsion of the finished tray during manufacture, handling, and transport. In FIG. 110, ribs are shown only in flaps 3212 and 3222. Referring to FIG. 111, one embodiment of ribs 3252 are shown. FIG. 111 is a cross-sectional view of flap 3222 along line 3230. The profile of the ribs is generally tapered with the widest portion of the tape coupled to the flap 3222. Furthermore, the ribs nearer the edge of the flap 3222 opposite the flap 3202 may project further from the surface of the flap 3222.

Figure 112:
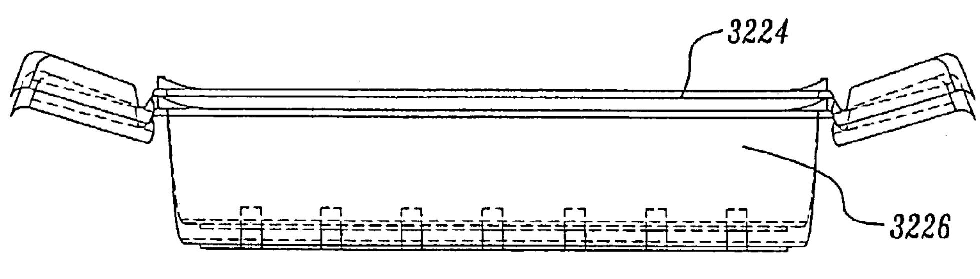
FIG. 112 shows a side illustration of nestable trays according to the present invention.

Referring now to FIG. 112, two pre-forms 3224 and 3226, similar to the pre-form shown in FIG. 110 are shown stacked and nested together. In this way, pre-forms can be manufactured and conveniently stacked in a nesting configuration, minimizing the volume of space required during storage and shipping thereof. In this manner, pre-forms may be fabricated at the point of use for packaging goods.

3.2.32. Embodiment

Figure 113:
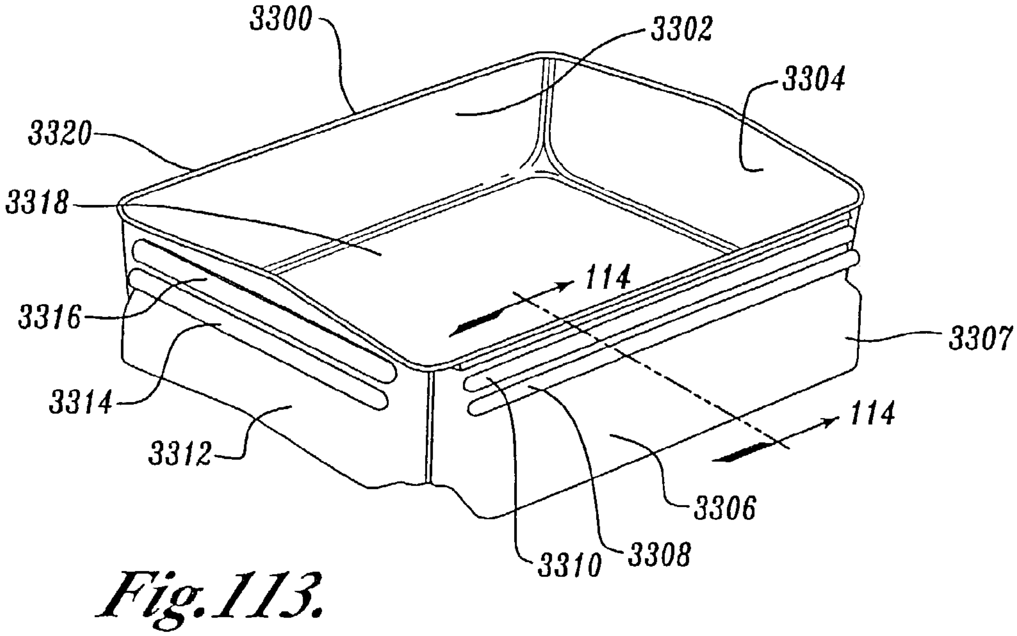
FIG. 113 shows an isometric illustration of a tray according to the present invention.
Figure 114:
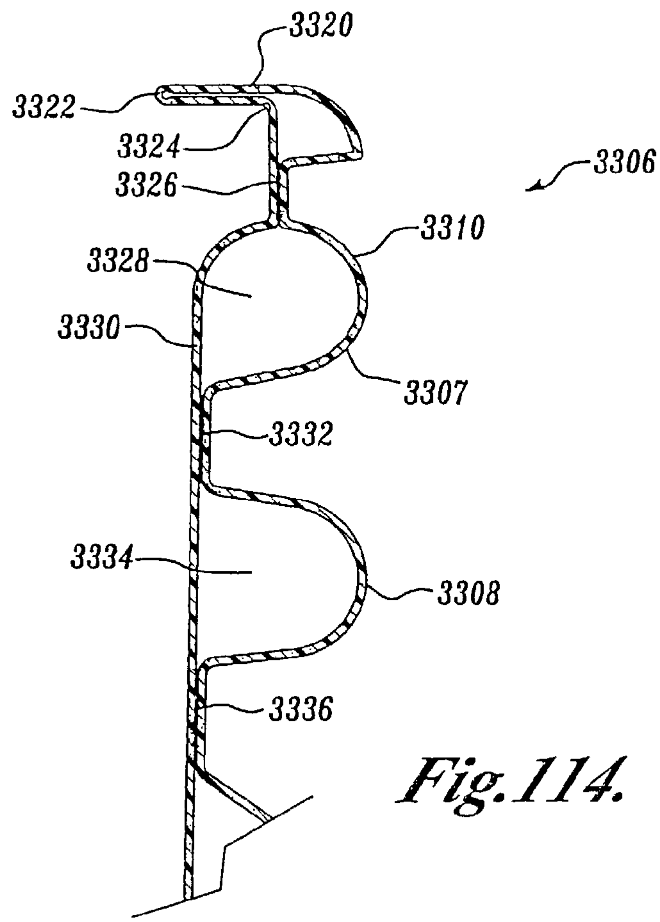
FIG. 114 shows a cross section illustration of a tray portion according to the present invention.

Referring now to FIG. 113 and FIG. 114, another packaging tray 3300 is shown with a cross sectional view shown in FIG. 114 therethrough. Tray 3300 may be manufactured from any suitable material, such as but not limited to polyethylene. A cavity 3318 is surrounded by upwardly extended composite side walls 3312, 3306, 3302 and 3304 all terminating at flange 3320. Composite side walls 3306 and 3312 are visible and ribs 3310 and 3308 are shown in composite side wall 3306 and ribs 3316 and 3314 are shown in composite side wall 3312. Composite side walls 3312, 3306, 3302, and 3304 are formed by folding flaps attached to the flange 3320 in an outward and downward direction. The folded flaps are then hermetically bonded to the side walls of tray 3300. The internal structure of a portion of composite side wall 3306 can be viewed in FIG. 114.

Referring now to FIG. 114, a cross section through ribs 3310 and 3308 of FIG. 113 is shown. Hinges 3322 and 3324 are arranged to allow folding of flap 3307 against the tray wall 3330. Hermetic seals are shown at 3326, 3332 and 3336. Hermetic seals shown as 3326 and 3332 follow a path completely around the perimeter of rib 3310 and hermetic seals shown as 3332 and 3336 follow a path completely around the perimeter of rib 3308. In this way, spaces 3328 and 3334 can be completely enclosed and hermetically sealed separately from each other. However, prior to bonding ribs so as to enclose and hermetically seal spaces 3328 and 3334, any suitable gas such as carbon dioxide at any suitable pressure, such as a relatively high pressure, such as 80 psi, can be provided therein. In this way a rigid tray can be manufactured with reduced material content and therefore at relatively lower cost. Other spaces may also be provided with high pressure gas to add rigidity to any tray part thereof.

3.2.33. Embodiment

Figure 115:
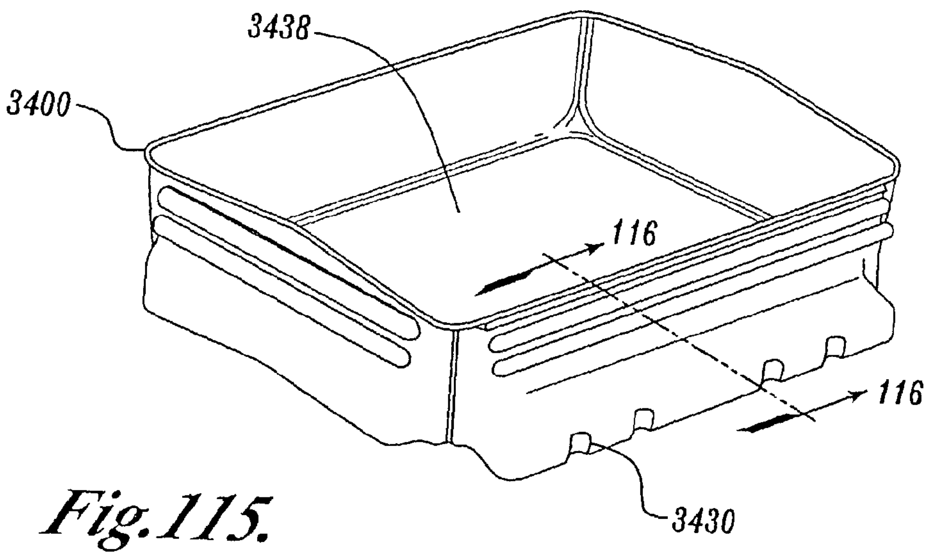
FIG. 115 shows an isometric illustration of a tray according to the present invention.
Figure 116:
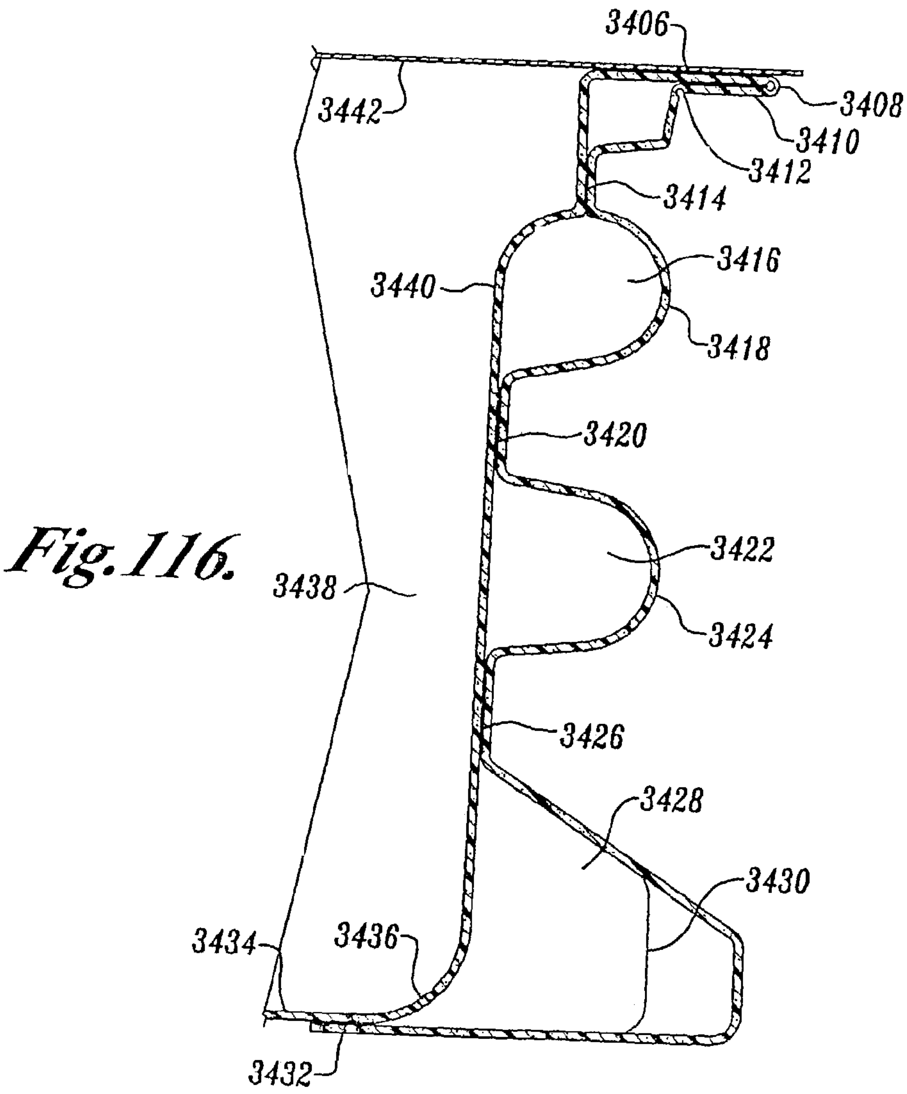
FIG. 116 shows a cross section illustration of a tray portion according to the present invention.

Referring now to FIG. 115, a tray 3400 with lateral ribs arranged in a similar manner to those (3316, 3314, 3310 and 3308) disclosed in FIG. 113 are shown. FIG. 116 shows spaces 3416 and 3422, enclosed within the composite side wall and hermetically sealed within ribs 3418 and 3424, along seals 3414, 3420 and 3426. The spaces 3416 and 3422 can be filled with high pressure gas, such as $CO_2$. Hinges 3408 and 3412 are located so as to provide an outwardly extending flap that may be folded against the tray wall 3440 to form a composite wide wall. A web of material shown as lid 3442 can be hermetically sealed to flange 3406 so as to fully enclose cavity 3438. Apertures such as 3436 can be provided to allow liquids to enter cavity 3428. Seal 3432 prevents escape of such liquids from space 3428. Ribs such as 3430 can be provided.

3.2.34 Embodiment

Figure 117:
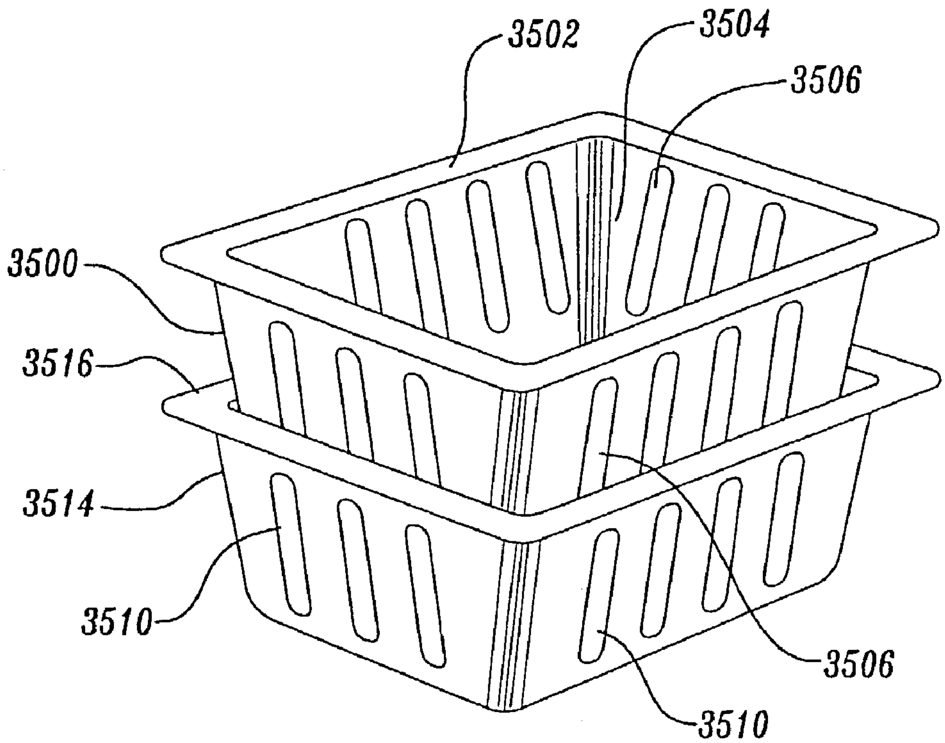
FIG. 117 shows an isometric illustration of a tray according to the present invention.

Referring now to FIG. 117, two thermoformed trays 3500 and 3514 are shown in a partially nesting disposition. The profile of tray 3500 is arranged with upwardly extending walls terminating at flange 3502 with inwardly extending ribs 3506, formed into the walls. Ribs 3506 formed in tray 3500 extend inward toward the center of cavity 3504 and ribs 3510 of tray 3514 extend outwardly away from a centrally disposed cavity.

Figure 118:
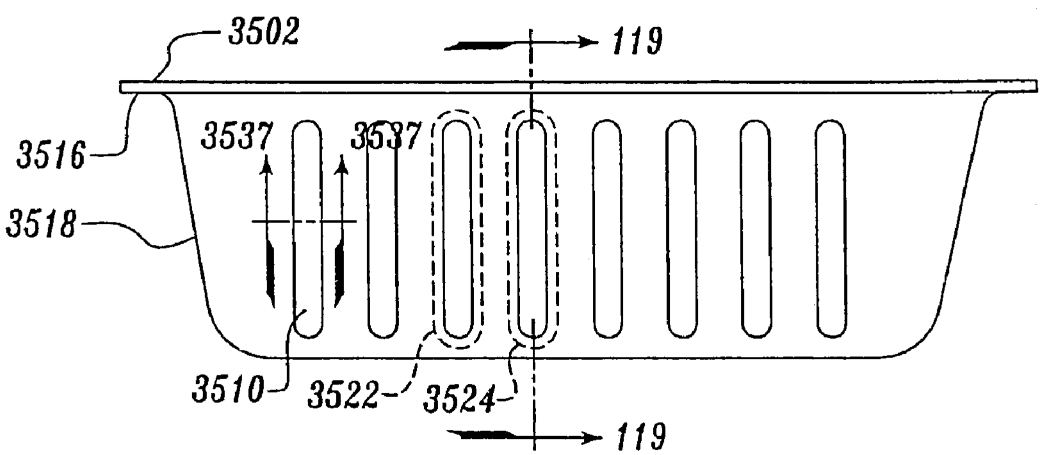
FIG. 118 shows a side illustration of a tray according to the present invention.
Figure 119:
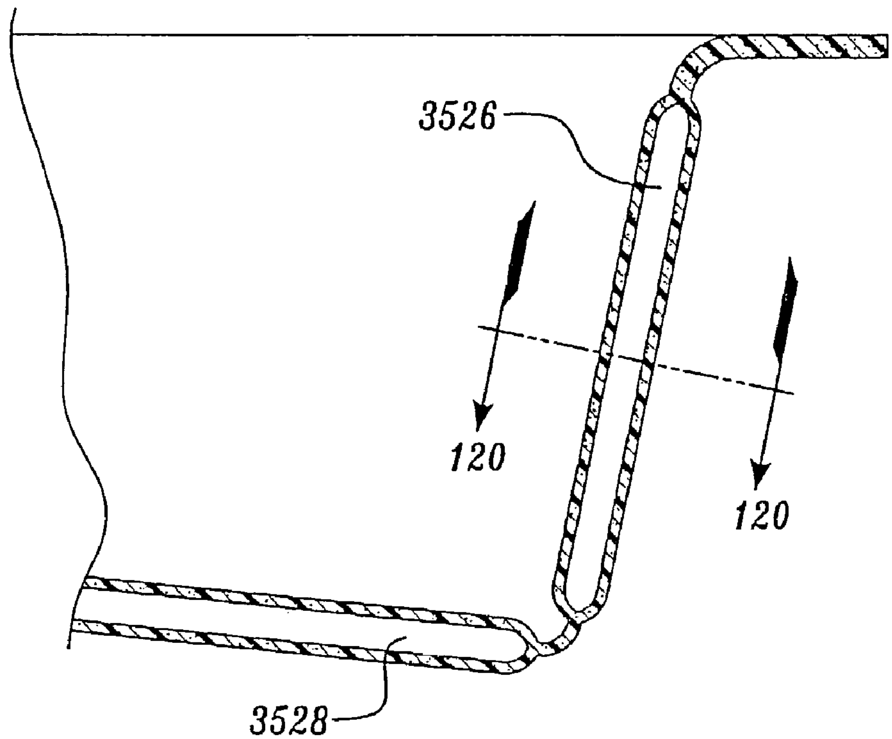
FIG. 119 shows cross section illustration of a tray portion according to the present invention.
Figure 120:
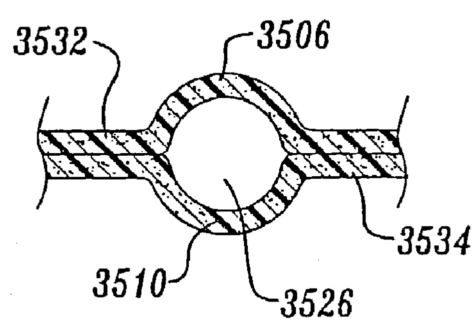
FIG. 120 shows a cross section illustration of a tray portion according to the present invention.

Referring now to FIG. 118, the two trays 3500 and 3514 in FIG. 117 are shown sealed together to form a single tray 3518. Flanges 3502 and 3516 are hermetically sealed together around the full length of what has become a path close to the tray perimeter. FIGS. 119–120 show details of enclosed spaces such as 3526 and 3528 that are formed when trays 3500 and 3514 with ribs 3508 and 3510 are bonded together. The area of the tray surrounding the ribs is also hermetically sealed such that ribs formed in the walls of the inner tray are adjacent to the corresponding rib in the outer tray to provide fully enclosed spaces such as 3526 shown in FIG. 120, that can be filled with high pressure gas. Seal paths 3522 and 3524 are shown as examples of hermetic sealing and enclosing of spaces such as 3526. FIG. 120 shows rib 3506 hermetically sealed to rib 3510, at 3532 and 3534 enclosing space 3526.

3.2.35 Embodiment

Figure 121:
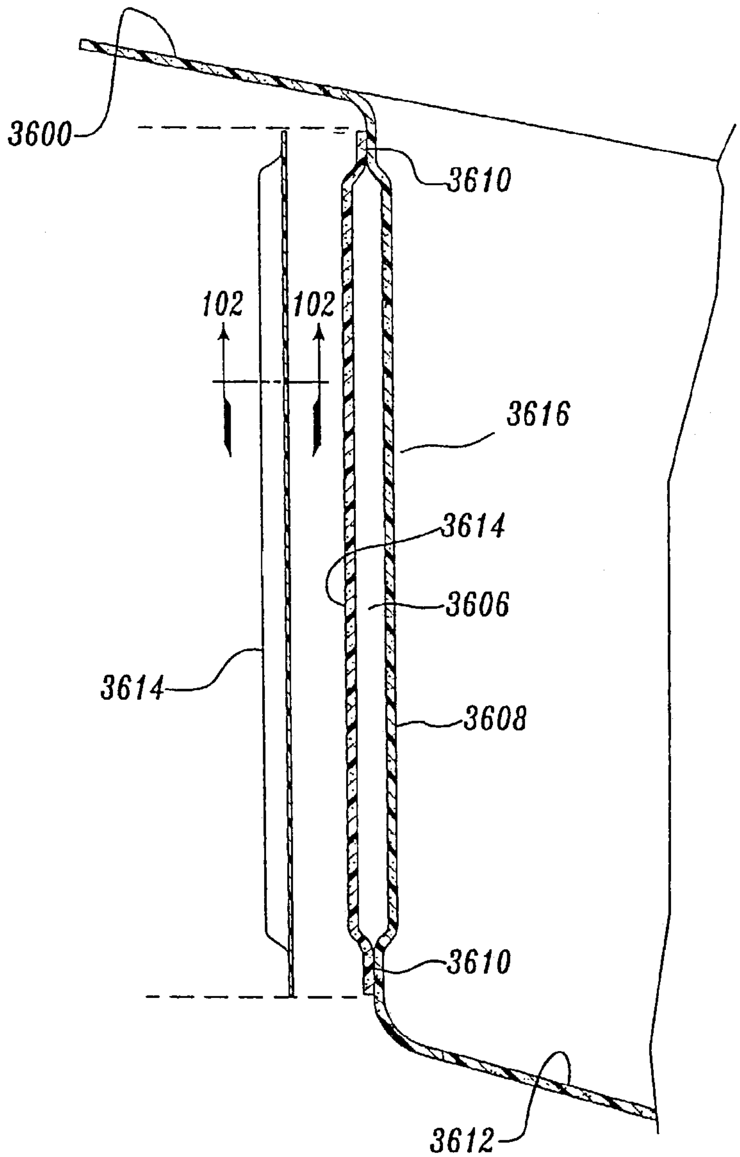
FIG. 121 shows a cross section illustration of a tray portion according to the present invention.
Figure 122:
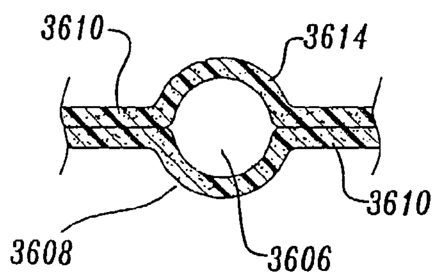

Referring now to FIG. 121, another embodiment of a tray with high pressure gas filled spaces is provided. FIG. 121 shows a cross section through a tray similar to tray 3500 shown in FIG. 117, wherein a tray with a base 3612, and upwardly extending walls 3616 terminating at flange 3600 is provided with an inward projecting rib 3608 formed therein. A separately formed outward projecting rib 3614 is shown adjacent to rib 3608 in a position prior to bonding and also after bonding to tray wall along seal path 3610. A hermetically sealed and enclosed space 3606 can be filled with high pressure gas, such as $CO_2$. In FIG. 122, a cross section through ribs 3614 and 3608 is shown with space 3606 enclosed therein.

3.2.36. Embodiment

Figure 123:
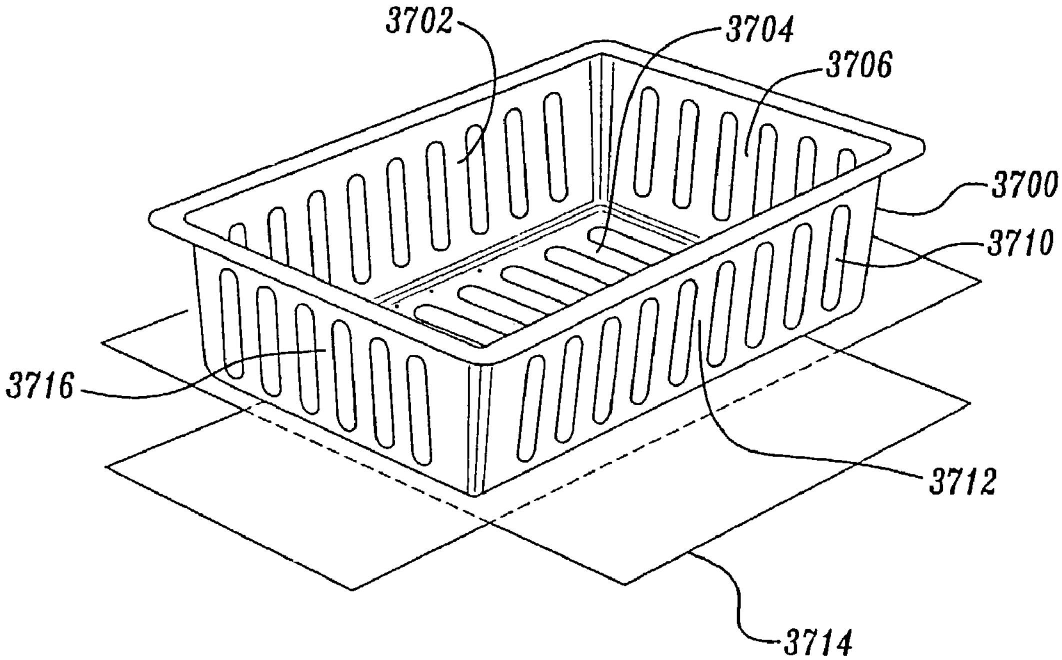

Referring now to FIG. 123, a thermoformed tray 3700 is shown in a three dimensional view located above a form cut blank 3714. Ribs are provided in the base 3704 and walls 3702, 3706, 3712 and 3716 in a vertically disposed arrangement. Any suitable rib configuration may be provided in the walls and base of any suitable size tray, in one instance, rigid ribs 3710, as shown in FIG. 123, are provided with the recess accessible from the outer side of each wall, with the ridge of the ribs 3710 extending inwardly. Trays 3700 and blanks 3714 can be manufactured in any required size, from any suitable material, such as from mono-layer extruded polyethylene terephthalate (PET) sheet. PET sheet may be extruded with multiple layers and both or a single outer layer may be provided with enhanced heat or RF (radio frequency (RF) or microwave) sealable properties. Enhanced RF sealability may be provided by including any suitable additive such as suitable metallic elements or compounds in the outer layers, by blending into the polymer prior to extrusion.

Figure 124:
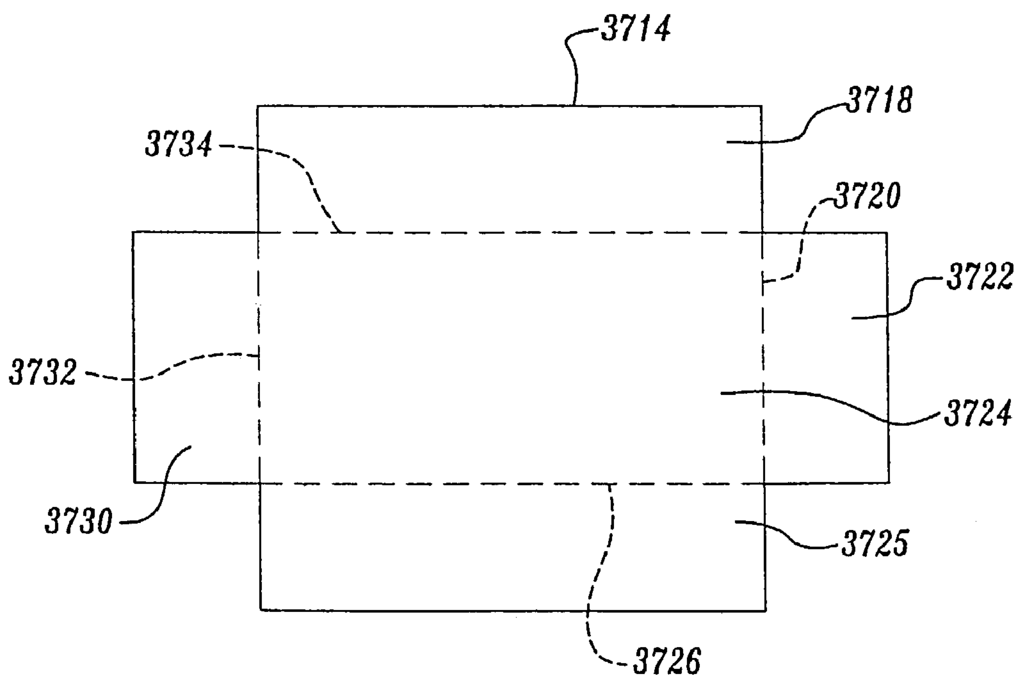

Referring now to FIG. 124, hinges shown at 3734, 3720, 3732 and 3726 are arranged so that flap portions 3718, 3722, 3725 and 3730 are all attached, thereby, to central rectangular portion 3724. In this way, flap portions can be folded upwardly about hinges so as to contact the walls of tray 3700. Flap and base portions of blank 3714 can then be sealed to the walls of tray 3700 so as to provide a hermetic seal around the perimeter of each rib after providing gas such as $CO_2$ at an elevated pressure in the recess of each rib. In this way a rigid tray can be manufactured with substantially less material content than would otherwise be required for a tray manufactured from a single component.

3.2.37 Embodiment

Figure 125:
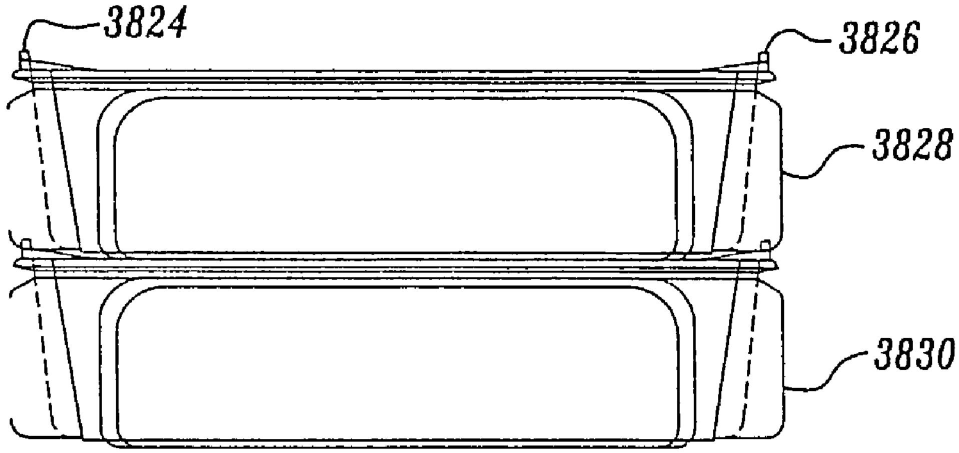
Figure 126:
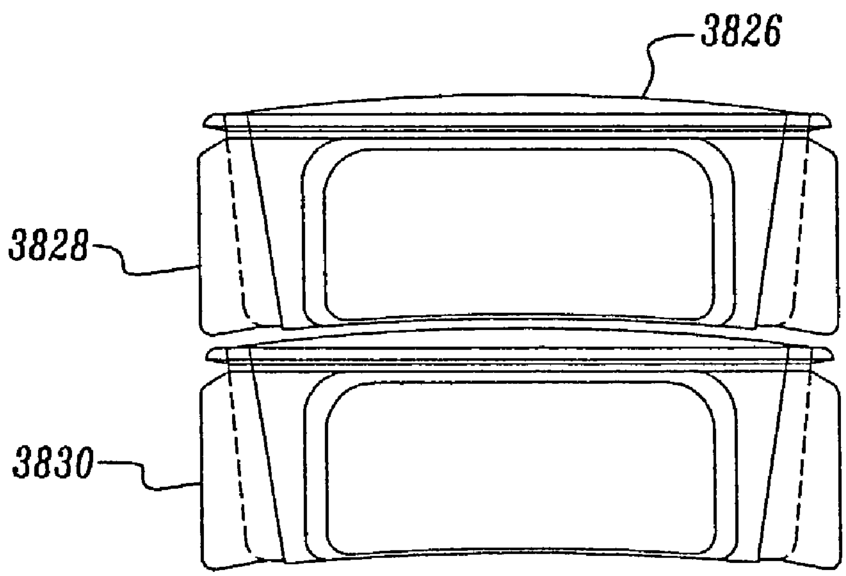

Referring now to FIGS. 125 and 126, a side view and end view of two finished packaging trays 3828 and 3830 stacked together are shown. These figures illustrate an interlocking mechanism that can be incorporated into many of the trays disclosed herein. The trays 3828 and 3830 can be made from a thermoformed pre-form, such as the one illustrated in FIG. 110.

Upwardly extending ribs 3824 and 3826 are located on the upper surface of the flange on. The ribs 3824 and 3826 are of the appropriate size and shape to mate with recesses in the underside of a tray stacked on top and interlock with the base of the upper tray stacked on top. As can best be viewed in FIG. 126, the ribs 3824 and 3826 may be curved to increase the clearance between the upper and lower trays in the central portion of the tray.

3.2.38 Embodiment

Figure 127:
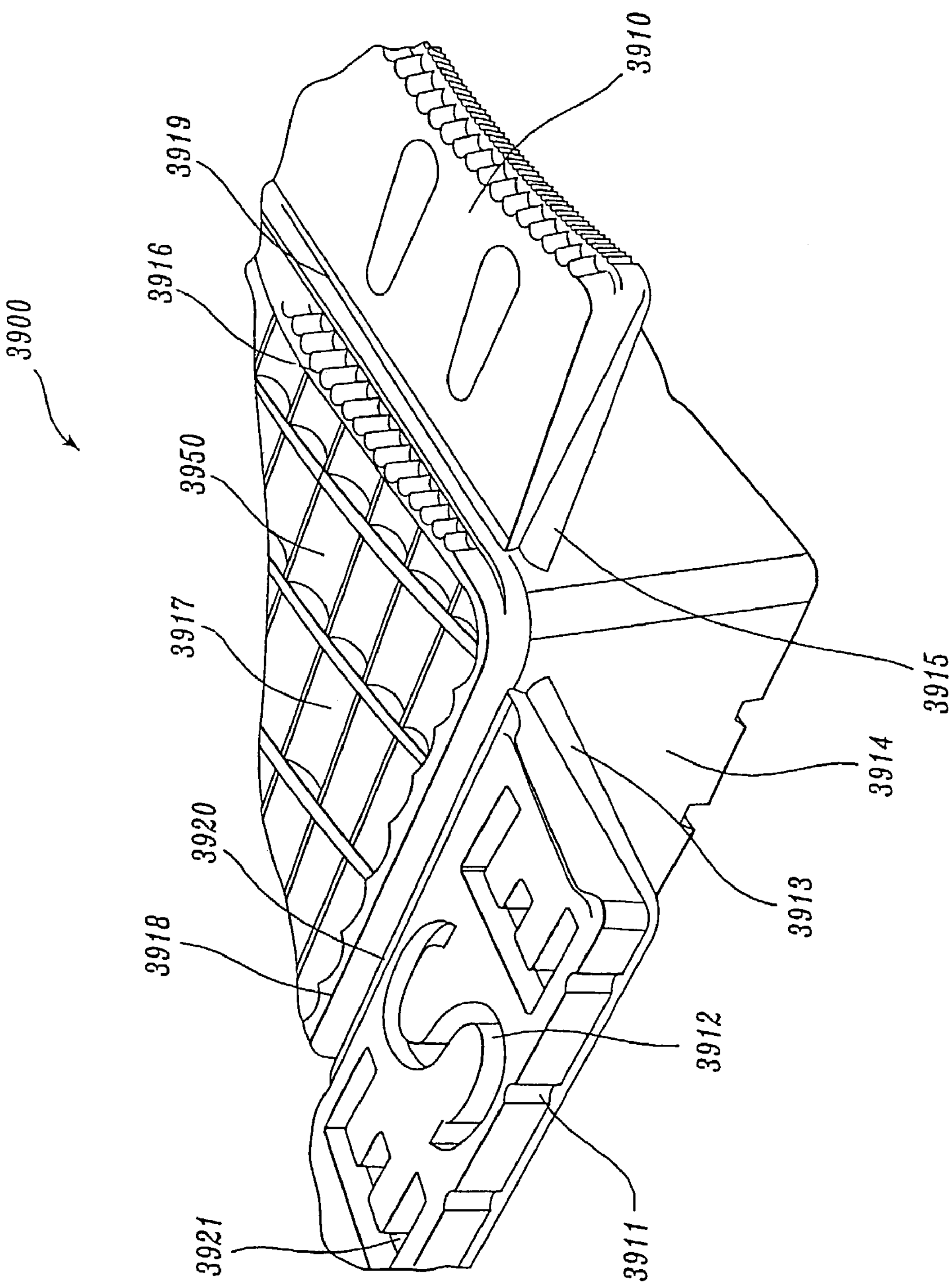

Referring now to FIG. 127, a three dimensional view of a corner section, of another embodiment of a stackable tray pre-form is shown prior to folding and bonding of flaps. Tray 3900 as any other tray in this disclosure, may be thermoformed from any suitable material, such as extruded polypropylene (co-polymer) sheet. Flaps 3910 and 3911 are attached at hinges 3919 and 3920 to the walls 3914 of tray. While only two flaps are shown, it is apparent that a flap that is a mirror image of 3910 is located along the tray wall opposite the tray wall to which flap 3910 is attached. Likewise, a flap that is a mirror image of flap 3911 may be attached to the opposite wall of the tray from flap 3911. While the term mirror image has been used to describe the flaps not shown in FIG. 127 it is apparent that any lettering or text applied to one or more flaps may not appear on the flap that is its mirror image. The tray with flaps can be either thermoformed or injection molded or produced in any suitable manner from any suitable material such as polypropylene, polystyrene or even emulsified fibrous paper molded in a suitable mold. Tray has a base 3917 and vertically disposed walls that terminate at a continuous flange 3918 and 3916. The surface of flange (3916 and 3918) may slope downward from the top edge of the tray walls to the periphery of the flange. The width of the flange 3916 and 3918 from the top edge of the tray walls to the peripheral edge of the flange is sufficiently wide to receive adhesive applied to the flange. To this end, in one embodiment, the width of the flange is no less than 1 mm, and sometimes no less than 4 mm. Flap 3911 may include profiled sections 3913 and 3915 that contact the vertically disposed walls 3914 of tray and can be bonded there together after flap is folded into the desired position.

Letters, such as an "S" 3912, can be formed into the flaps. These letters may comprise a word such as "TESCO" or "KROGER" or any conveniently lettered word which may be the name of a supermarket chain, or the name of a supplier of product to a supermarket and thus used as a helpful means of informing the consumer and advertising the name of the respective supermarket or supplier. Trademarks may also be formed into the flaps and arranged in any desirable way such that, for example, a trade mark, such as SAFEFRESH™, used to identify a process, product or additive used in association with manufacture of a complete retail package can be formed into the one or more end flap of the tray. In this manner, the letters or trademarks formed into flaps can be formed such that the base 3921 of the depression forming the letters is profiled so as to contact the vertically disposed walls of the tray after folding. A suitable adhesive or bonding agent may be applied between the base 3921 of the letters and the surface of vertically disposed walls such that the base and surfaces can become securely bonded together. In this way, a relatively rigid tray and flap structure can be manufactured that uses the formed letters as a structural component that offers a mechanical advantage and at the same time provides a low cost informing and advertising method. It is readily apparent that any lettering can be provided as a printed emblem on the outer wall of tray.

Flaps, such as 3910 and 3911, can be bonded to vertically disposed tray walls with any suitable bonding agent or process. Preferably, the bonding agent is hot water soluble or a microwave softening "hot melt" adhesive. Such a bonding process would allow for the release of the flaps 3910 and 3911, by the consumer or commercial customer after use and thereby allow flaps to return to the original formed position prior to folding and bonding. This would therefore allow stacking and easy shipping of empty trays back to the packer or packaging manufacturer, for re-use with non-food items and even with food items after adequate sanitation. Trays manufactured in the manner described in association with FIG. 127 and others herein disclosed, can be used by any person as a storage tray. The stacking feature provided in trays can provide a convenient way for a consumer to store suitable items such as nails or screws.

Recesses or dimples 3950 may be formed in base 3917 to retain and inhibit the movement of liquids such as water, blood, and purge within the tray cavity. In one aspect, the dimples 3950 are shaped and sized to maximize the adhesion forces between the liquid and the inside surface of the dimples 3950. To this end, dimples are concavely formed with a radius that may be experimentally determined to adequately utilize surface tension to retain liquids therein. Furthermore, one aspect of the invention includes shaping and sizing the dimples 3950 so that the surface tension forces at the surface of the liquid contained within a dimple 3950 are sufficient to retain the liquid within the dimple 3950. Without being bound by theory, surface tension forms only at the surface of a liquid and therefore it is desirable to have the surface of the liquid occur at the upper perimeter of the dimple (so that the maximum amount of liquid is retained within a dimple and the amount of liquid retained is controlled by the volume of the dimple) it is apparent to vary the number of dimples present based upon the moisture content of the product placed within the tray cavity.

If more dimples 3950 are needed than can be accommodated by a substantially flat and planar base 3917, the base may be profiled so that tiers, corrugations or other surface features are added to create additional surface area into which dimples may be formed. In addition, dimples may be formed on side walls.

Retention of liquids within the tray cavity by dimples 3950 inhibits the movement of liquids such as purge within the tray cavity, thus presenting a more appealing package to consumers, in addition to causing less of a mess, and increasing the yield.

Trays could be color coded to allow a consumer to decide whether or not they wanted to use the tray as a home storage tray, in which case a non-water soluble, dishwasher and microwave proof bonding agent would be used or, if the consumer intended to re-cycle the tray back into the industry distribution system, a water soluble bonding means could be indicated by a recognizable color code. In this way, a consumer could be clearly shown if the bonding agent, used to bond flaps in a complete tray and package with goods therein, was water soluble or not, prior to purchase of the tray with goods therein at a supermarket. A consumer could therefore select a package according to the type of bonding agent. If the consumer decided that a storage tray was needed to store any suitable item at home, then a tray, color-coded so as to indicate a non-soluble and dishwasher proof bonding agent could be selected at the supermarket. Alternatively, if the consumer decided that the tray should be recycled after removal of the goods contained therein at home, a tray color coded to indicate that a water soluble bonding agent, that would dissolve in a typical household dishwasher cycle, could be selected.

Figure 128:
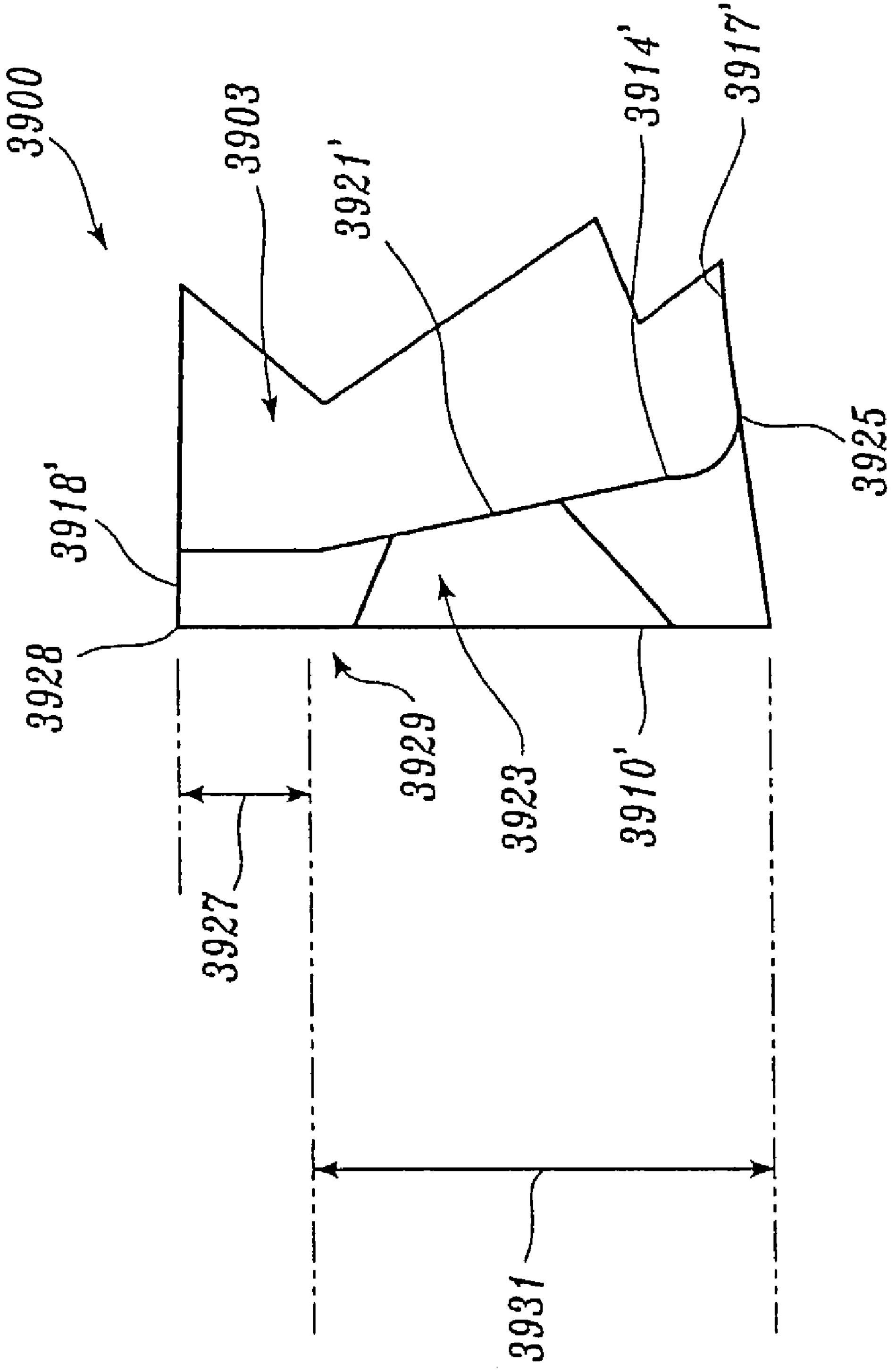

Referring now to FIG. 128, a cross section through a wall of an alternate embodiment of a stackable tray constructed in accordance with the method described above in association with FIG. 127 is shown. A tray cavity 3903 is contained with vertically disposed walls 3914' that terminates at flange 3918', and a base 3917'. A flap 3910' is shown in folded and bonded position with bonding agents provided at contact points 3921' and 3925. A recess 3923, which may be provided by the recess of a letter formed into the flap has a base at 3921'. A vertically disposed outer section 3927 has an upper edge 3928 terminating at flange 3918'. The lower edge of section 3927 terminates at a hinge 3929. The distance between upper edge 3928 and hinge 3929 may be pre-selected. Flap 3910' has a vertical height 3931. The sum of the distance shown as 3927 and distance 3931 is approximately equal to the overall finished tray height, however when distance 3927 is increased and 3931 is decreased the plan area of flap shown in FIG. 127 is also decreased. In this way, the amount of material required to form a tray pre-form such as tray pre-form shown in FIG. 128 can be adjusted. For example, if distance 3927 is decreased, the area of flap 3910' is increased and conversely, if distance 3927 is increased the area of flap 3910' is decreased. Since the amount of flap 3910' contributes to the rigidity of the overall tray, adjusting the length is a compromise between tray rigidity and the amount of material used. Therefore, the amount of material used can be optimized for the particular application.

3.2.39 Embodiment

Figure 129:
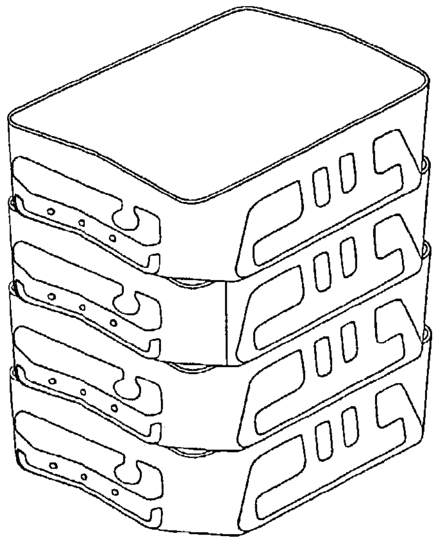
Figure 131:
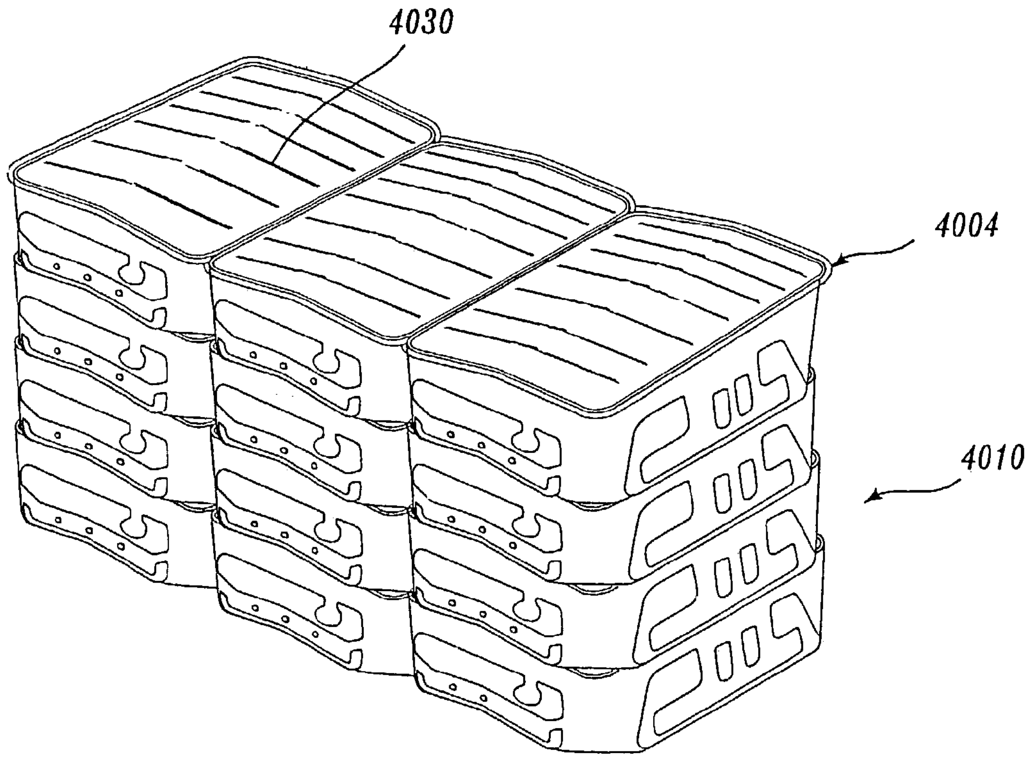

Referring now to FIG. 129 a stack of four trays constructed in accordance with the present invention is shown. While a stack of four is depicted it is apparent that the trays may be stacked in different heights such as two, three, five, six, etc. FIG. 131 shows a set of three tray stacks arranged in close proximity with one another. Trays with substantially flat vertically disposed walls have stand alone capability, meaning that they are stackable to these heights without any inter-layer sheets or columns in between. In one instance, three stacks of four trays are arranged so that adjacent stacks contact one another along their lengths. In this manner, automated means can be used to transfer using a compressive grip device in groups of twelve packages in a consistent and reliable manner. A cover 4030 is placed on top of the stacks of trays. Cover 4030 may be thermoformed to suitably mate with the tray features. The cover 4030 is designed to facilitate stacking another group of tray stacks upon the tray stacks shown in FIG. 131. The profile of the cover may be appropriately ribbed and recessed to mate snugly with the underside of the stack above it. In other aspects, the cover can be included between pouches, so that the cover is profiled to mate with the stack above and the stack below. Alternatively, the cover can be included in the interior bottom of the pouch to achieve a similar purpose for ready stacking of one pouch atop another. To this end, cover can be formed to have the negative aspect of features to mate both with stacks above and stacks below.

It may be desirable to seal the tray stacks 4010 within a pouch 4040. One non-limiting method of sealing the stacks of trays 4010 within a pouch 4040 includes placing the tray stacks 4010 within a pouch and positioning the opening of the pouch 4040 at the top of the tray stacks 4010. In this manner, the trays may be placed into the pouch 4040 from above and positioned in the bottom of the pouch 4040. The pouch may then be sealed closed to prevent outside gases from entering the pouch through the same opening in which trays entered the pouch. In the preferred embodiment, the lid is hermetically sealed to the pouch. Furthermore, a slight vacuum may be applied before sealing. Returning to FIG. 130, the pouch may be sealed to a lid 4020 that is placed on top of the cover 4030. The lid 4020 may include a flange 4002 along its perimeter to which the edges of the opening in the pouch may be sealed to create an air tight seal. The lid may be suitably thin or malleable to readily conform to the surface profile of the cover 4030. In one aspect, pouch 4040 with trays may be enclosed in a vacuum chamber, and a vacuum applied thereto, and in such a manner to cause the pouch 4040 to conform to the profile of the trays. In this manner, also, the lid will conform to the profile of the trays, thus holding pouch and lid firmly against the trays.

Said pouch 4040 may be thermoformed from any suitable materials such as coextruded or laminated Nylon//EVOH//PE. (ethyl vinyl alcohol co-polymer) A partial vacuum can be applied prior to sealing lid 4020 to pouch 4040 at flange 4002 and in such a manner so as to cause the pouch and lid to be held firmly against the outer profile of the stacks of trays 4010. Heat sealing is one suitable method of sealing the pouch to the flange 4002 although any other method of sealing known in the art and disclosed herein may be applied.

Cover 4030 may be manufactured from any suitable material such as by injection molding or thermoforming. The cover 4030 may have an upper and lower profile and will fit neatly inside the pouch 4030 and above the stacked trays as shown in FIG. 131 and cross section in FIG. 130. The edge 4004 is cleanly cut so as to not present sharp edges that could otherwise cut pouch 4040. Furthermore, the side flaps of each tray may be arranged to extend outward and beyond the edge 4004 of the cover 4030 thereby minimizing the contact of the pouch 4040 with the edge 4004.

One aspect of the cover 4040 is to provide a platform upon which the lid 4020 may rest and in to which package/trays inside pouch may nest. A soluble peelable adhesive, such as rubber cement, can be sprayed onto the cover 4030 so that it will "stick" to the base of the pouch on the outside.

In one aspect, the trays may be made from recycled packages and are returnable to the sales outlet for any further use after washing/sanitizing.

One aspect of the arrangement is to eliminate the need for a cardboard carton and any other crate or carrying fixture that may otherwise be required to ship the finished retail packages from the point of packing the goods 4005 into the trays to the point of sale, such as at a supermarket. It should be noted that the column crush resistance of the trays, when stacked and as shown in FIG. 129, with bonded flaps, is substantial and when several stacks are stacked together, as shown in FIG. 131, the combined crush resistance is enhanced.

Figure 130:
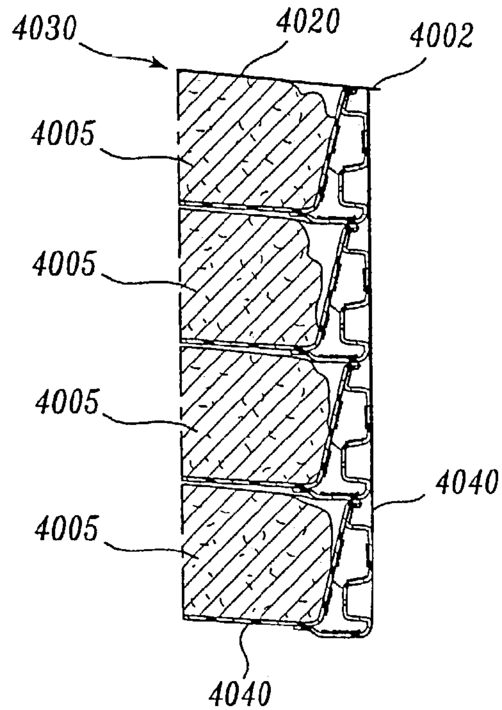

Referring again to FIGS. 129–131, various views of stacked trays that have been loaded with goods 4005, and then individually over wrapped, are shown. Referring specifically to FIG. 129, four trays are stacked vertically in a group. Referring to FIG. 131, three stacks of four trays are arranged together in a grouping of twelve trays, and a pre formed cover 4030, is located across the entire upper surface of the three adjacently stacked trays. Each individual tray has vertically disposed outer walls that contact the corresponding vertically disposed walls of trays, that are stacked directly there together. In this way, a grouping of trays as shown in FIG. 131, can be clamped together and lifted in a single unit, with just two suitably arranged vertical clamping plates, that are arranged to contact two opposing vertical faces of the stacked group of trays, and by applying compressive pressure between the two vertically arranged clamping plates, the group of twelve trays can be lifted as a single unit and loaded into a pouch, that is only slightly bigger than the overall dimensions of the clamped group of trays, together with vertically disposed clamping plates, and cover 4030. Referring now to FIG. 130, a vertical cross section through four trays is shown. The cross section shows four loaded trays with goods 4005, and where each tray has been individually over wrapped prior to stacking, within a pouch 4040. A lid 4020, is sealed to pouch 4040, at flange 4002, with cover 4030 beneath lid 4020. Prior to sealing lid 4020, at flange 4002, a partial vacuum is applied to the interior of pouch 4040, such that after sealing at flange 4002, the pouch and lid are forced by normal atmospheric pressure in such a manner that causes the pouch 4040 and lid 4020 to be held firmly against the exterior contours of the stacked trays contained therein, with cover 4030 in position. In this way, a stacked group of trays such as shown in FIG. 131, is held firmly together in a "stackable block". An additional cover similar to 4030 may be placed within the pouch 4040 and on the underside of the stacks of trays 4010. However, this may not be necessary. In this way, the finished "blocks" of trays held within the pouch and lid can be stacked onto any suitable grocery pallet without the need of a cardboard carton. In this way, the quantity of packaging materials required is reduced.

3.2.40. Embodiment

Figure 132:
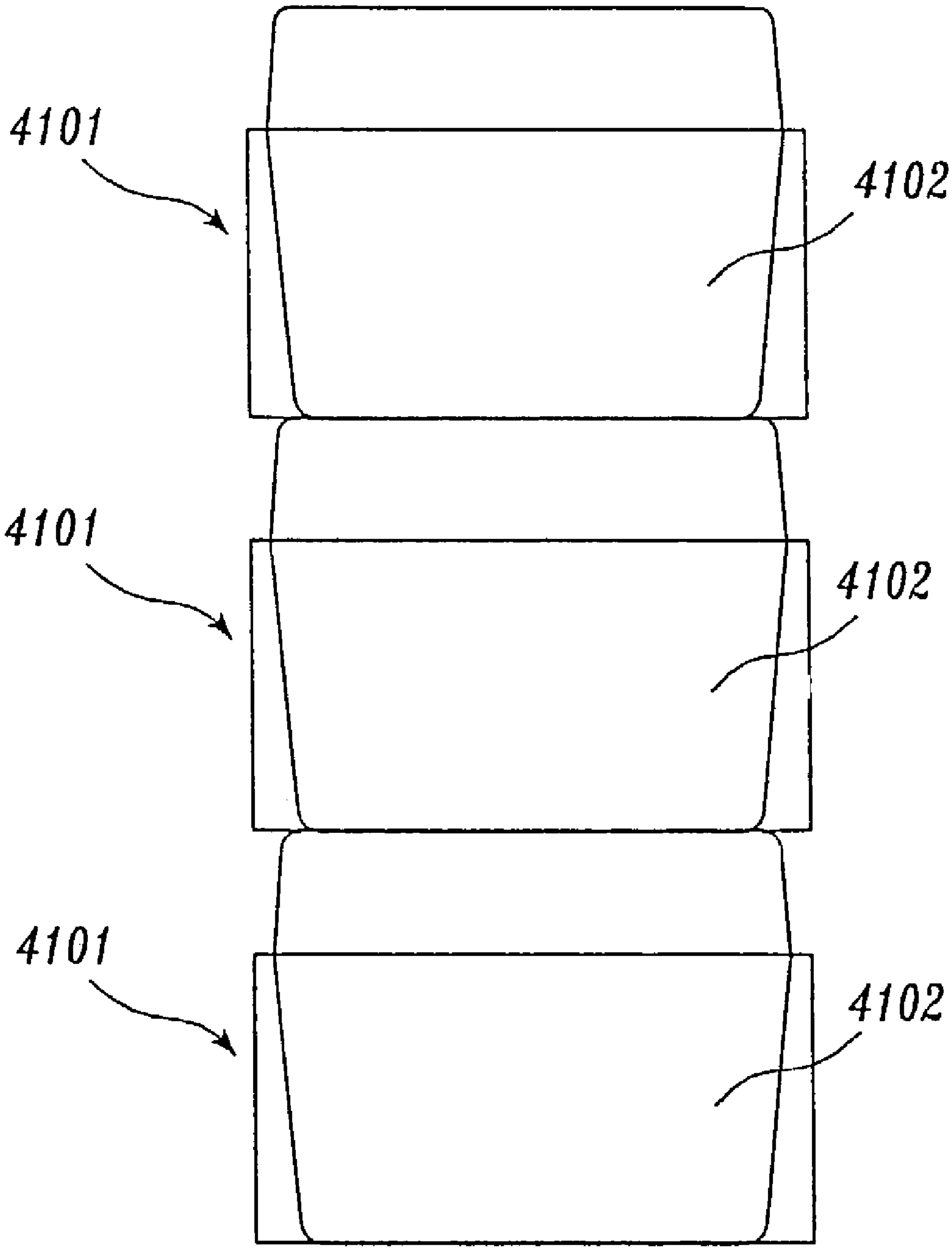

Referring now to FIG. 132, a stack of three trays 4102 with clear lids 4101 are shown in a side elevation. Trays 4102 are re-usable at home to store suitably sized items such as nails and screws. The clear lids 4101 are made for use in any suitable application which includes home use for storing any suitable items. The lids 4101 are profiled so as to allow stable stacking while allowing the contents of each tray to be viewed without the need to de-stack the stacked trays. The construction of each lid 4101 is substantial enough to allow use in this manner and can be made available as a purchased item at a supermarket, for example where the trays 4102 are sold with goods therein. Alternatively, the clear lids may be used as "give away" items to customers who purchase the trays with food therein and as a promotional item.

3.2.41. Embodiment

Figure 133:
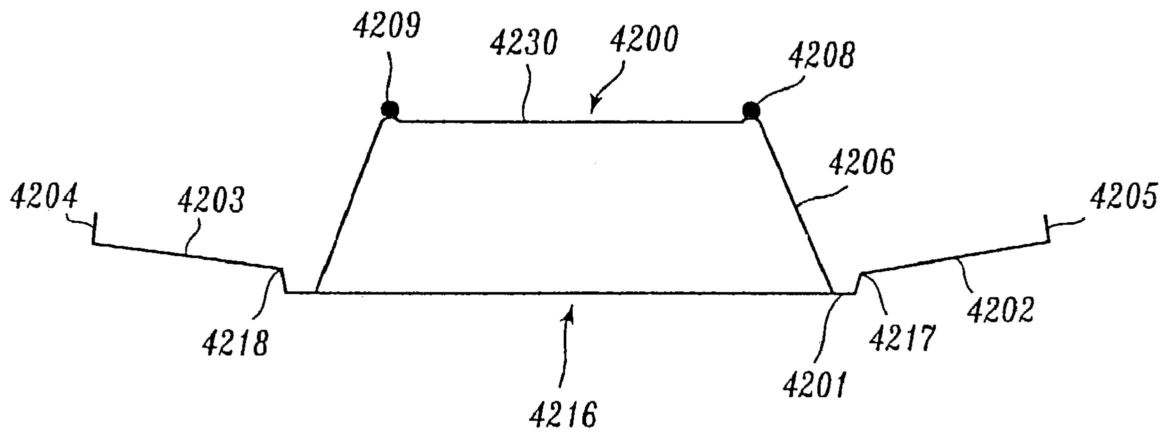

Referring now to FIGS. 133–135, a tray with elongated flaps extending past the edge of the tray base and method of bonding flaps to trays is illustrated. In this manner, wiping of the adhesive bead during folding of flaps is avoided.

Tray 4200 includes flaps 4200 and 4203 connectable to tray 4200 at hinges 4217 and 4218, respectively. Tray 4200 also includes a flange 4201 which forms the outer periphery of tray cavity 4216. It should be readily apparent that tray 4200 is in an inverted position, such that the opening to the cavity 4216 is shown in a lower position. It should also be apparent that the tray 4200 may have as many as four flaps, one for each side of the tray. Tray 4200 also includes a tray base 4230, which in the FIG. 133 is presently located in an upper orientation. Tray cavity 4216 is formed by sides 4206 and base 4230 of the tray 4200. The tray 4200 of FIG. 133 is shown in a pre-formed stage, meaning that the tray does not have a double or composite wall construction at this stage. During this stage any suitable adhesive, such as a hot melt adhesive, may be deposited by any suitable applicator on the tray base 4230 exterior around the periphery to form beads 4208 and 4209. It should be apparent that the adhesive bead may be formed around the entire lower periphery of tray base exterior; however, for ease of illustration of the present invention, only a cross-sectional view is provided. Tray flaps 4202 and 4203 include a flap base 4204, 4205 constructed on the respective ends of flaps 4202 and 4203. Flap bases 4204, 4205 are suitably constructed to be inwardly aligned so as to provide a bonding surface on the inside regions. At a stage in the tray construction, the flaps 4202, 4203 are suitably folded at the hinge 4217 and 4218 as illustrated in FIG. 134. Flap bases 4204 and 4205 now come to rest at a location which is spaced from the adhesive bead 4208 and 4209, and do not contact adhesive beads 4208 and 4209 during the flap-folding stage so as not wipe adhesive off or otherwise interfere with the bonding during the flap-folding stage. This is brought about by constructing flaps that are of a suitable length so that the flap bases 4204 and 4205 are slightly beyond the tray base. At another stage in the process, a downward pressure is brought in the direction of arrows 4212 and 4213 to press flaps 4204 and 4205 against adhesive beads 4208 and 4209. The adhesive can be allowed to cure to produce the tray of FIG. 135 having a seal 4215 and 4214 formed therein between the flap bases 4204, 4205 and the tray 4200.

3.2.42. Embodiment

One aspect of the invention provides a clean cut edge for thermoformed trays made from, in one instance, extruded polypropylene (copolymer) sheet, with reduced exposed sharp edges and tray corners.

One aspect of the invention is to seal, or otherwise conceal any openings at the intersections of tray members, such openings create an unappealing appearance to the finished tray because the trays look awkward and malformed. The openings, are in part, created when folding the flaps against the tray walls, particularly occurring at the upper corner of the tray where the tray and two adjacent flaps meet. It is desirable to cut trays in one plane, however, in the past, it has been particularly difficult to cut thermoformed trays at the tray corners to avoid having open spaces at the juncture of flaps and the tray flange. The present invention, therefore, provides a manner in which to close off any openings at the tray corners. In addition, the present invention requires no further equipment than that already described herein, and in the process facilitates the cutting of trays. The problem with the prior art is that there is no simple way to form a tray with flaps, wherein the tray corners are adequately covered by material. One aspect of the present invention is therefore to provide methods to close off any openings at the tray corners.

Referring now to FIG. 372, a thermoformed tray is shown after having been cut according to the present invention to facilitate the closing off of any open spaces occurring at the tray corners between two flaps and the flap flange. Previously, it has been considered difficult to trim flap ends 18600 and 18602, such that flap ends 18600 and 18602 can adequately wrap around tray corner 18604 in a manner that sufficiently closes off all areas of the tray corner, such that few open areas are detectable. The present invention provides a solution to this problem by providing a method of trimming excess material in the region of the tray corner so as to leave excess material in the form of a corner tab to adequately close off any openings.

A tray 18606 includes a first flap 18608 and a second flap 104 connected to the tray 18606 at a hinge 18612. Hinge 18612 is a horizontally disposed member surrounding the periphery of the opening of the tray 18606. Flap 18608 is attached to tray 18606 via hinge 18612, and flap 18610 is attached to tray 18606, likewise, via hinge 18612. Flap 18608 and flap 18610 are at right angles to one another, and flap 18608 and 18610 must fold downwardly so as to bond with the tray wall 18604. Flap 18608 includes a flap end 18600, and flap 18610 includes a flap end 116. Flap ends 18600 and 18602 must fit snugly at the tray corner 18604 to present an appealing package to consumers. The present invention provides a simplified method to cover the tray corner with adequate material using a corner tab 18614, which is integral with the tray hinge 18612.

As is readily apparent to one of skill in the art, thermoformed trays can be built with any amount of excess material that may later be trimmed as desired. In this instance, a corner tab 18614 extending outward from flange 18612 at tray corner is allowed to remain from the excess material left in the areas of the tray corners and adjacent flaps 18608 and 18610. A narrow slot 18616 is provided between the corner tab 18614 and the flap end 18602. A narrow slot 18618 is provided between the corner tab 18614 and the flap end 18600. Flap ends 18600 and 18602 are larger radiused at the upper portion in the vicinity of slots 18616 and 18618. In this manner, as is shown in FIG. 373, corner tab 18614 is folded downwardly to lie adjacent to the tray wall corner. Flap 18610 is folded over to lie adjacent to the tray wall, such that flap end 18602 wraps around tray corner and a portion of flap end 18602 retains corner tab 18614 in position. Flap 18608 is folded downwardly to lie adjacent to the tray wall, such that flap end 18600 wraps over the exterior of flap end 18602 and corner tab 18614. Flaps 18608 and 18610 are bonded in any suitable manner herein described. Any amount of additional adhesive may be provided at any suitable location. As is apparent from FIG. 373, corner tab 18614 provides means of closing off the previously open top portion of the tray corner.

In another embodiment of the present invention a method of stretching the overwrap material over a tray corner is provided, such that the tray corner is biased downwardly to close off any opening created by the folding of adjacent flaps in the vicinity of the tray corner. To this end, the tray flange 18612 is sloped downwardly form the interior to the exterior side of the flange 18612. In one instance the width of flange is about 4 mm. Any of the overwrapping equipment herein described can suitably be adjusted to apply additional downward biasing tension in the region of the tray corner hinge. In this manner, the overwrapping material holds the tray hinge corner in a position which closes off the opening.

In another aspect of the present invention, problems are posed by adhesive applicators that only move at right angles. Therefore in one aspect of the invention, that flange at tray corner 18620 is of sufficient radius to allow complete coverage by adhesive in one direction and at its right angle direction. It is one aspect of the invention to have the adhesive on tray flange intersect at the radiused corners. To this end, the correct flange radius can be found by experimentation depending on the flange width. Thus, it is one aspect of the present invention to form adhesive beads that have no "breaks." In this manner, a hermetic seal can be created between the tray flange and the web lidding material. In one particular aspect, flange width is less than 4 mm to provide an adequate target for adhesive application.

Referring again to FIG. 372, it is one aspect of the present invention to include inwardly angled interior tray walls to facilitate accurate loading portions, such as ground meat portions.

3.2.43. Embodiment

A further embodiment of a tray made in accordance with the invention is shown in FIG. 374.

Tray 18700 includes a flap 18702 that is bonded to the vertically disposed tray cavity wall 18704 with any suitable adhesive. Ridges may be suitably thermoformed into the tray cavity and flap. Web material 18706 is bonded to a continuous path along the upper flange 18708 of the tray 18700 and the web material 18706 is stretched and extended downward and parallel with the vertical wall of the flap 18702, and bonded thereto, so as to provide a rigid structural element to the finished tray package. It can be seen that the side wall construction of the finished package comprises three layers, including the tray cavity wall 18704, the flap 18702 and the web material 18706, that are bonded together. This three layer construction can allow for a reduction in material content of the total tray and web material while providing the compression resistance of a two layer tray construction which would require a greater material content. In one aspect, the web can be perforated along a path close to the upper, outer package edge 18710, such that even though the web is applied in a single piece, the portion of web that is stretched and bonded to the upper flange of the tray can be removed by peeling.

3.2.44. Embodiment

In one aspect a double walled tray can be formed by arranging the flaps to firmly contact the base of the tray at the lower corners thereof, when the flap is folded in a single movement or action. In this manner, a flap pressing step to bond the flap to the tray is avoided. However, it is preferable to have sufficient grooves to accommodate any excess glue such that it doesn't get pushed out and thereby be exposed to sight or be able to collect dust.

3.2.45. Embodiment

Packaging including a combination of features disclosed in any of the trays above may be combined to construct a finished package. For example, a package including a tray with any of the flaps disclosed herein may be constructed to provide desired features and inserted into either a Clysar AFG shrink bag or alternatively stretch wrapped in a pPVC stretch film over wrap or shrink wrapped with printed Clysar AFG anti fog shrink film.

Still, other packaging including a combination of features disclosed above may be combined to construct a finished package. However, perforations may be provided in depressions to allow any free liquids to pass therethrough to a space between the base of tray and the outer shrink bag.

Indentations may be provided in the under (or outer) surface of the tray that can allow open cells, that may be present in the EPS structure of the tray, to absorb the liquids.

Any of the foregoing trays with flaps may be used in a method to automatically or manually perform the following steps:

Providing a tray with flaps, that has been thermoformed from expanded polystyrene (EPS). The tray having dimensions that will provide for the efficient use of the internal dimensions and capacity of typical, refrigerated road and rail transport vehicles.

Trays will retain a substantially oxygen free gas within cell structure of the tray and/or exposing the tray and/or the tray material prior to and/or during thermoforming and production of the tray, to a gas that excludes oxygen and allowing the gas to exchange with any gases contained within the cells of the EPS thereby substantially displacing any atmospheric oxygen from the cells or otherwise ensuring that gases contained in the cell structure substantially excludes oxygen.

Providing perishable goods onto the base of the tray. The perishable goods having been treated and processed to enhance the keeping qualities thereof.

Over wrapping the tray with goods therein with a web of gas permeable material such as pPVC, to produce a finished package and then seal the over wrapping web of gas permeable material to portions of the tray by a heat sealer or other suitable adhesives and then perforate the over wrapping web of gas permeable material at desired locations.

Placing the finished package or a plurality of similar finished packages into a gas barrier master container.

Displacing substantially all atmospheric gas, and particularly atmospheric oxygen, from within the master container, with a suitable gas or blend of suitable gases.

Sealing a lid over the opening in the master container to form a hermetically sealed package containing the trays with perishable goods and suitable gas.

Placing the master container inside a carton such as can be manufactured from corrugated cardboard and enclosing the master container.

Locating a plurality of closed cartons onto a standard (GMA specified) pallet (Dimensions of 40"×48") so as to maximize the efficient use of the upper surface area provided by the pallet thereby producing a loaded pallet.

Storing the loaded pallet for a period of time in refrigerated space.

Delivering the finished pallets to a point of sale such as a supermarket.

Performing all aspects of the process in temperature controlled conditions 3.3. Packaging Systems Anyone of the aforementioned trays may be used in anyone of the packaging apparatus and packaging methods herein described below. One aspect of the invention provides an apparatus and method to produce packages that have been sealed under conditions that substantially excludes oxygen. This encompasses not only the sealing of a lidding material to a tray with beef therein, but also, the methods and apparatus used to form the tray, the lidding material, and the loading of master containers with finished packages, all produced under conditions which substantially exclude oxygen therefrom.

Without limitation, one aspect of the invention provides one or more vacuum chambers to evacuate the package before sealing or otherwise applying a lidding material to a tray.

Without limitation, one aspect of the invention provides an enclosed packaging conduit, wherein the conduit is padded with a desirable gas that substantially excludes oxygen from the packaging process. Sealing or otherwise applying a lidding material to a tray can therefore proceed under reduced oxygen conditions.

In addition, in other aspects, the invention provides ancillary apparatus for the folding and bonding of tray flaps in association with the packaging apparatus; and still further aspects of the invention provide for the introduction of substances to deplete oxygen within packages.

In still further aspects, the invention provides materials and methods for the construction of lidding materials which are included within the packaging apparatus herein described.

3.3.1. Embodiment

A first embodiment of a packaging system is illustrated in FIG. 136. Referring now to FIG. 136, a schematic illustration of a tray sealing apparatus is shown to produce packages, including a tray, a web and perishable goods contents shown as ground meat. The perishable goods may be portions of beef, pork, or any other suitable perishable goods. A horizontally disposed, continuous conveyor 4326 including a number of carrier plates 4302 suitably attached to chains is arranged adjacent and below a series of processing stations. The conveyor 4326 is driven by a driver that intermittently indexes in a forward direction indicated by arrow 4328, at a rate of one carrier plate per indexing step. Trays 4300, stacked in a vertical disposition in a container, are dispensed into apertures in the carrier plates 4302. With each progressive forward indexing movement of the conveyor 4326, certain operations carry out functions to arrive at a packaged tray with product. Cutting devices positioned along the conveyor 4326 generally denoted by 4304 severs flaps. Product, such as portions of ground beef, are loaded into the tray at a product loading station 4306, and a web of material 4308 is heat sealed, or otherwise bonded, to a tray flange at a heat sealer station 4312. Scrap material from web 4308 is wound onto scrap roll 4310. In one instance, tray apertures are provided by heated pin devices at station 4314. Flaps are folded over by rotating about hinge so as to then locate flaps adjacent to tray 4300, at flap turning station 4316. Flaps are then sealed to tray at station 4318 and flap trimming is performed as may be required at station 4320. Labeling is done with a tray labeler at station 4322. The finished tray with perishable goods packaged therein is ejected from the conveyor at an ejector station 4324.

Referring now to FIG. 137, a tray constructed according to the present invention is shown in an inverted position. The tray 4302 includes apertures 4322 made by the apparatus of FIG. 136.

3.3.2. Embodiment

FIG. 142 shows a packaging machine constructed according to the present invention to apply label(s) to the first web of trays sealed with at least two webs. In a further aspect of the invention, the apparatus can be used with an alternative printing device to print directly onto the web or over wrap. In some embodiments, the web printed upon will be the inner first web. Reference is also made to patent application PCT/AU93/00484, which is herein incorporated by reference. FIG. 138 shows a side elevation of the packaging apparatus and FIG. 139 shows a plan view of the upper side of the packaging machine of FIG. 138. Packaging machine 4400 is arranged in two sections to provide a space so as to allow a sufficiently clear area to install a scale 4402 with load cells 4428. In one instance, packaging machine 4400 is mounted and attached to the floor independently of scale 4402 such that they are not in contact with one another. First web unwind roll 4406 is provided with braking devices attached thereto. Drive 4404 is arranged to unwind first web from roll 4406. Printer 4408 is located between first web roll 4406 and second web roll 4410. Printer 4408 is attached to driver to move in X, Y and Z axis in horizontal and vertical planes. Printer 4408 includes a mechanism to print onto labels and then apply labels to first web or alternatively print directly onto first web Second web roll 4410 is located above first web 4412 and is fitted with braking devices as well to maintain tautness of the web as it is unrolled. Packaging apparatus 4400 includes a vacuum chamber assembly. The assembly includes a number of components including a lower 4416 and upper 4424 vacuum chamber portion, a lower 4420 and upper 4422 plate and a sealing plate 4418.

Referring again to FIG. 138, printer 4408 is equipped so as to either apply a label or print desired information onto first web 4412. Load cells 4428 are located along a beam 4454 that extends across and under the full width of sealing plates 4418. Beam 4454 can be elevated and lowered. Scale 4402 and beam 4454 is arranged to elevate load cells 4428 upwardly so as to contact underside of trays in apertures of sealing plates 4418 and lift the trays from apertures in sealing plates 4418 in conveyor. Trays are lifted to an extent that prevents any contact with anything else apart from the load cells 4428. The weight of each separate tray can thereby be determined and this information is transferred to a printer 4408. Printer 4408 prints, information onto labels (prior to application of label onto first web) or directly onto the first web 4412. First 4412 and second web 4456 are then laminated together before heat sealing to flanges of the tray web.

Referring now to FIG. 139, an upper plan view of the apparatus of FIG. 138 is shown. First 4406 and second 4410 web rolls are seen traversing approximately the entire width of apparatus 4400, so as to enable the sealing of two packages simultaneously.

FIG. 140 shows one embodiment of a single register detail that may be applied directly onto first web 4412 or to a label. The single register detail includes a frame 4442 of heat activated adhesive that can be printed directly onto web. The frame is arranged with dimensions that correspond to the tray flange of the tray web such that the frame 4442 covers the flange located above the tray web. Other details of package contents are also shown and numerous boxes 4446 provide areas onto which information can be printed at the time of packaging. Barcode 4447 contains product information, such as date of packaging and weight, which can later be used to determine price at the point of sale.

3.3.3. Embodiment

Trays constructed according to the present invention can be sealed by one or two webs. In one aspect, the web(s) are sealed to the tray flap in the non-folded state in sealing stations. Upon bending of the flaps, the web(s) are stretched, thus, providing a taut appearance and protection for the perishable goods inside.

Referring now to FIG. 141, an apparatus for the production of packaged perishable goods is schematically illustrated. In one aspect, this embodiment can be used for the packaging of shallow products such as boneless pork loin chops, butterfly steaks, thick-cut bone in pork chops and New York Strip, super trim beef and pork cuts that are generally not displayed in the package by shingling but are laid flat and adjacent to each other and spaced apart so that a consumer can inspect carefully. However, it is apparent that the apparatus and method can also be used to package any perishable product, such as beef.

FIG. 141 shows a sketch of a side elevation of a packaging machine constructed according to the present invention that can be used to produce packages of the types described herein. The packaging machine includes a frame supporting a conveyor 4510. The conveyor is carried on a first 4544 and second 4528 roller sprockets located on opposite ends of the frame. The first roller sprocket can be fitted with a drive chain secured to a driver 4542. In this manner, by turning one roller 4544, the conveyor 4510 can be incrementally or continuously moved. Continuous conveyor 4510 carries sealing plates 4512 in the direction indicated by arrow 4526 across a plurality of processing stations. Details of a sealing plate 4512 will be described herein below. Sealing plates 4512 are attached to the conveyor 4510 via attachment points. Web unwind rolls 4530 and 4532 and scrap web wind-up arrangements 4520 and 4538 are provided to supply the apparatus with a web to seal to the trays. A first loading station, generally denoted by reference numeral 4518 provides perishable products into trays carried by the sealing plates 4512. Conveyor 4510 next carries trays with perishable products to a first sealing station having a first 4514 and second 4520 sealing assembly portions. First portion 4514 is mounted on an upper side of the conveyor 4510, and the second portion 4520 is mounted on an underside of the conveyor 4510, so as to approach the trays from opposite sides thereof. The packaging apparatus includes a heat sealing device 4516 located downstream of the vacuum chamber. Conveyor 4510 is supported within the frame and is attached to a powered indexing device for moving the conveyor 4510 and sealing plates 4512, intermittently and in a direction from loading section 4518 toward sealing station 4514. Each intermittent movement of conveyor 4510 travels one pitch which is equal to at least the distance required to move a sealing plate 4512 the full distance of the length of the sealing plate. Thereby, with each movement of the conveyor, a sealing plate with tray is located directly between the lower vacuum chamber portion 4520 and the upper vacuum chamber portion 4514. A sealing plate is also located directly beneath heat sealer 4524. This arrangement transfers a package that has been evacuated of undesirable gases in the vacuum chamber 4514 to be sealed in heat sealer 4516. The driving devices for the packaging machine, machine components and conveyor are a pneumatic cylinder and electrically powered driving motors of suitable size and capacity. As the conveyor indexes forward, the web assemblies 4530 and 4532 unwind to provide new web material to seal to tray, while web take up rolls 4520 and 4538 pick up the scrap material.

3.3.4. Embodiment

FIG. 142 shows a schematic representation of a side elevation of a packaging apparatus including a conveyor 4670 with a plurality of sealing plates 4636 generally denoted 4636 attached thereto. A drive motor 4638 is connected to conveyor sprockets 4640 and 4641 and arranged so as to provide intermittent driving of the conveyor 4641 as required. Trays 4647 with goods therein are loaded into apertures in sealing plates at the loading section and the conveyor 4670 is driven forward in the conveyor direction shown in intermittent increments which are equal to the distance of a single sealing plate. The conveyor 4670 is otherwise stationary except during each movement of indexing. A scale 4642 can be positioned under the upper section of the conveyor and is attached to a driver such that when the conveyor is stationery the scale 4642 can be elevated and lift the tray 4647 from sealing plate 4636, and weigh the tray and goods. Presumably, the tray weight will be known, and the weight of the goods can therefore be obtained. In one instance, scale 4642 can be interfaced with a label printing device 4649. The labels may include information such as price, weight and time of packaging and then label printing device will apply the label to the upper surface of the first (or second web) in a desired label position. Label position can be predetermined such that when tray, first and second webs are sealed together, the self adhesive label is in a desired location which can be easily seen by any prospective purchaser of the finished package after removal of the second web. Alternatively, if the label is located on the second web and if the second web is not removed before retail display then the label can be viewed. A roll of material 4644 is mounted above the conveyor adjacent to a first station 4646 to facilitate unwinding of the material 4643. The material may include a single web of material or alternatively the material may include a roll of two laminated webs such as described above. Packages produced with material according to the present invention would be similar to packages shown in FIG. 143, whereas packages produced with a single web of material would resemble the package in FIG. 144.

First station 4646 includes an upper vacuum chamber 4648 and lower vacuum chamber 4650 and both are mounted to the packaging machine and attached to pneumatic drivers. Pneumatic drivers are arranged to move the upper 4648 and lower 4650 vacuum chamber in a reciprocating upward and downward motion. Vacuum chambers operate such that they move simultaneously but in opposing directions such that when they are moved toward each other a sealing plate 4636 is clamped therebetween to provide a completely enclosed chamber that is isolated from ambient atmosphere. Each vacuum chamber has ports 4652 that is attached to a vacuum pump (not shown) and sources of gases via ports 4652. The gas sources can be several in number but typically can include: substantially 100% carbon dioxide and a blend of carbon dioxide and nitrogen in any concentration. Sources of gas can be switched from one to the other such that a selected gas can be injected into the chamber as required and at will. For example after evacuation of the vacuum chambers, a gas, such as substantially 100% carbon dioxide, can be provided in the vacuum chamber at a gas pressure above ambient atmospheric pressure, for example about 25 psi. Gas pressure may, then be reduced to any pressure between about 0 and about 25 psi before providing a gas, such as substantially 100% nitrogen, in the vacuum chambers. A heat bank sealer 4654 is located within the upper vacuum chamber 4648. Sealing device is also attached to a pneumatic cylinder that provides motion in an upward and downward fashion. Sealing device is profiled to provide a flat strip like surface, horizontally disposed, that corresponds to the flange of the tray and can apply pressure downwardly onto the flange.

Second station 4656 includes lower clamp 4658 and upper clamp 4660 with ports 4652 for providing any suitable gas or for pulling vacuum. Clamps 4658 and 4660 are attached to a pneumatic cylinder and can be operated such that when moved toward each other a single sealing plate 4636 is clamped therebetween. A sealing device is located within the upper clamp 4660 with pneumatic cylinders attached thereto and a cutting device 4662 is located on the outer perimeter of heat bank 4664 and on the inside of 4660. Members 4662, 4660, 4664, and 4658 can be moved independently and in vertical directions. A winding arrangement 4666 is mounted above the conveyor and is powered by an electric driver to wind skeletal scrap web material.

In one instance, a sequence of operation of the packaging machine is as follows. Sealing plate 4636 attached to the conveyor 4670 with a loaded tray 4647 contained therein is indexed into position in first station 4646. Lid material 4643 is unwound from roll 4644 and located above tray 4636. Chambers 4650 and 4648 are clamped together with seal plate and tray clamped therebetween. Air is substantially evacuated from the vacuum chambers which are then filled with carbon dioxide gas or a blend of carbon dioxide and nitrogen. The gases are pressurized to a pressure above atmospheric pressure to about 25 psi and held for a period exceeding about one second. Pressure of the gas in the chambers is reduced to about atmospheric pressure and sealer 4654 is lowered so as to clamp the lid material against the flange portion of the tray. The lid material is then sealed thereto along the complete path of tray flange. Vacuum chambers 4648 and 4650 open and the conveyor indexes forward until another sealing plate 4636 is located at first station 4646 while the previously sealed tray can advance to a second station 4656, between upper clamp 4660 and lower clamp 4658. Clamps 4660 and 4658 close together thereby clamping sealing plate 4636 between the clamps. Sealing device 4664 is lowered to seal the lid material to tray at flange and cutting device 4662 is also lowered and retracted thereby severing the tray and package from web while the tray is still located in the sealing plate 4636. Skeletal scrap is wound onto scrap winding spool 4666. Conveyor continues to index forward and at one point packages are ejected therefrom. A tray constructed according to the present invention provides a peelable lib to introduce oxygen at a predetermined time, thus extending the shelf life of the perishable good stored therein.

3.3.5. Embodiment

Referring now to FIG. 145 and FIG. 146, a plan view and a side elevation view of an apparatus designed to slice meat while conditioning in an oxygen free environment is shown. The apparatus is shown in diagrammatic form and includes a continuous conveyor 4700, with a driver mounted to a rigid frame (not shown) and horizontally disposed to allow horizontal motion in a machine direction in intermittent or continuous movement. The conveyor 4700 is fitted with two corresponding and vertically opposed pairs of pressure chambers, generally denoted by 4716 and 4717. Upper chamber 4702 includes a corresponding lower chamber 4704 and upper chamber 4706 includes a corresponding lower chamber 4708. An enclosed gassing tunnel 4718 is arranged to enclose the upper section of the conveyor 4700 with a gassing port 4712 affixed thereto to provide any suitable gas, such as nitrogen gas or carbon dioxide, into the tunnel 4718.

Referring now to FIG. 146, upper chamber 4702 and corresponding lower chamber 4704 are arranged so as to open and close in vertical alignment with one another. Upper chamber 4702 is mounted to a driver (not shown) to provide elevating, and lowering of a clamping apparatus. Lower chamber 4704 is also mounted to a separate driver (not shown) to provide elevating, lowering and clamping to upper chamber in a manner described above. Chambers 4702 and 4704 can be closed together by moving in opposing directions so as to contact each other along a path around the perimeter of openings. In this way, a single chamber is so arranged in a manner that is airtight and sealed from external atmosphere. An evacuation port 4714 and a gas port 4716 are provided so as to allow evacuation and gas flushing of the closed chamber. As shown in FIG. 146 two separate pressure chamber assemblies are arranged such that conveyor 4700 passes through both chamber assemblies. Trays with sliced beef or other meat primal, placed therein, are located into carrier plates in conveyor 4700. In one aspect, primals can be sliced in a suitable manner and can then be opened so as to expose the multiple surfaces of the slices immediately prior to entry into enclosed tunnel 4718. Enclosed tunnel 4718 is arranged so as to substantially exclude atmospheric oxygen gas by flushing other suitable gases therein.

The trays with sliced primal 4722 are located in carrier plates and progressively move through enclosed tunnel 4718 until each tray with primal is located directly between an upper chamber 4702 and lower chamber 4704. The upper and lower chambers close together and around the sliced primal 4722 in an airtight and sealed manner. Substantially all air is evacuated from the chambers and a suitable gas, including carbon dioxide, is injected through port 4716. The suitable gas pressure can be increased to any suitable pressure as desired. The primal 4722 can be retained in the pressure chambers for a desirable period of time so as to cause sufficient carbon dioxide gas to dissolve in the oils and water contained in the primal 4722. After the primal 4722 has been exposed to the high pressure carbon dioxide gas for a suitable period of time, the pressure chambers open and allow conveyor 4700 to carry sliced primal 4722 in tray, forward in machine direction and through the enclosed tunnel 4718. A second pressure chamber assembly may also be closed around the sliced primal 4722 in tray. Any suitable gas at any suitable pressure can be provided in the second enclosed chamber. Second chamber includes an evacuation port 4715 and a gassing port 4717. The sliced primal 4722 in tray is intermittently carried through the tunnel 4718 until it emerges at the exit end of the tunnel. In this way, formation of oxymyoglobin is inhibited when the primal 4722 is exposed to ambient atmosphere.

3.3.6. Embodiment In one aspect of the invention, a gas padded packaging conduit is provided for the substantially oxygen free packaging of perishable goods. Referring now to FIG. 147, a schematic, cross sectional illustration of a section of a packaging conduit is illustrated.

The conduit is located on a factory floor 4800, and at a convenient elevation from the floor, in an enclosed, suitably ventilated room that is temperature controlled at about 38° F. in one instance. A generally horizontally disposed conduit is defined by an outer, substantially gas tight enclosed conduit 4801. Conduit 4801 includes varying modifications as will be described herein to accommodate various apparatus. Packaging components such as tray performs 4821 and web materials 4811, and ground meat 4827 are transferred into the conduit 4801 in such a manner so as to substantially exclude the entry of atmospheric oxygen by the introduction of a purge gas 4832 provided in any space inside conduit 4801 that is not occupied by equipment or goods. It is to be appreciated that all seals may not be substantially leak proof and therefore purge gas 4832 may be continually replenished so as to provide a gas padded enclosure. Gas 4832 is selected and may comprise any suitable gas such as carbon dioxide or nitrogen and is maintained at a pressure above ambient atmospheric pressure. A conveyor 4824 is conveniently mounted within conduit 4801 and arranged to carry trays 4820 therethrough.

Tray pre-forms 4821 are stacked into profiled and vertically disposed magazines 4823 and 4899. Magazines 4823 and 4899 are mated to conduit in a manner that substantially seals the magazines 4823 and 4899 to the conduit 4801 to reduce the loss of padding gas therefrom. Magazines 4823 and 4899 are arranged to have an outer wall that closely, but not substantially touches, and follows the outer profile of the stacks of pre-form trays 4821, contained therein. De-nesting mechanisms (not shown) are arranged to remove a single perform tray from the bottom of a stack, such as is contained in magazine 4823 and position it onto conveyor 4824. In this way, gas contained within conduit 4801 can then fill the cavity in the tray pre-form and thereby substantially prevent any atmospheric oxygen or other undesirable gases from entering into the tray cavity. Tray pre-forms 4821 are then carried in the direction shown by arrow 4831 to a position below the folding and bonding assembly not shown but housed within enclosure 4817. During the folding and bonding of pre-form 4821 to form tray 4820 gas 4832 fills all cavities or interstitial voids, or cells contained in the tray and tray materials and in this way it is ensured that only a selected and suitable gas is contained therein. Finished empty trays 4820 are then placed by folding and bonding assembly 4817 onto conveyor 4824 and carried forward to be loaded with portions of ground meat 4827.

A stream of selected ground meat is transferred through conduit 4803 in the direction of arrow 4829 at a convenient velocity and into fine grinder 4828 and in such a manner so as to extrude a continuous and suitably cross sectional profiled stream of ground meat 4804 onto conveyor 4824. Extruded stream 4804 is extruded into conduit 4804 and onto conveyor 4830, mounted therein, at a suitable velocity so that guillotine 4826 can cut portions of substantially similarly sized ground meat sections there from. Portions of ground meat 4827 are then transferred into trays 4820 which are together transferred through conduit 4801 on conveyor 4824. Conveyor 4824 can be arranged with upwardly disposed "cleats" 4880 or a series of suitable sealing plates to ensure that when ground meat portions 4827 are loaded into trays 4820 the tray is positioned precisely beneath the respective ground meat portion, allowing accurate loading into tray 4820 to produce a loaded tray with goods 4850.

Loaded trays with goods 4850 are then transferred through conduit 4801 toward over wrapping equipment arranged to over wrap trays 4850. A roll of suitable over wrapping web material 4810 is conveniently mounted above conduit 4801 and is unwound by transferring a single web of material 4811 through a slot like conduit 4812. Gas contained in conduit 4801 at an elevated pressure can pass over the surfaces of web 4811 while it passes through slot like conduit 4812 and in this way ensure that substantially no atmospheric oxygen is allowed to enter conduit 4812 or conduit 4801.

Over wrapped and hermetically sealed trays 4852 are transferred along conduit 4801 toward robot stacking arrangement 4814. Robot 4814 is enclosed in a housing that forms a part of conduit 4801 and is programmed to stack trays 4852 into groups 4815 that are then loaded into gas barrier containers 4813. Gas barrier containers 4813 can be formed in line and flushed with a suitable gas prior to loading of stacks 4815 therein. Horizontal thermoforming machine 4816 may be located conveniently below robot 4814 and arranged so that the thermoformed barrier containers 4813 are enclosed within an extension of conduit 4801 and thereby ensuring that gas 4832 is in contact there while forming barrier containers and filling cavities in the barrier containers 4813.

In another aspect of the present invention, an enclosed tray flap folding bonding apparatus is provided.

Referring now to FIG. 376 the tray de-nesting apparatus portion of FIG. 147, before the pre-form flaps have been bonded to the tray walls, is shown in a cross sectional view. Vertically disposed magazine walls 4823 are arranged to closely conform to the outer edge perimeter of the stacked pre-forms 4821. A narrow gap is thereby maintained between the stack 4821 and magazine walls 4823 allowing the tray pre-forms to slide through the magazine without restriction, as the lowest tray performs are progressively removed and placed onto conveyor 4824. Gas 4832, from conduit 4801, is exhausted through the narrow gap at 4840 and additionally selected gas such as 4832 can be injected through conduits 4822 at a suitable pressure so as to substantially fill spaces between the stacked pre-forms as they are gradually transferred through magazine 4823.

3.3.7. Embodiment

Referring now to FIG. 148 a side elevation of an apparatus for packaging trays with fresh meat products constructed according to the present invention is shown in schematic form. This apparatus may be used to seal lidding material 4953, which may be a suitable grade of pPVC, to the flanges of trays (such as is shown in FIG. 94) wherein the apparatus is employed as an alternative, for example, to flow wrappers shown as in FIG. 176 herein. A rigid base 4950 is constructed from suitable materials such as stainless steel providing a suitable structure to mount horizontally disposed first and second conveyors 4970 and 4969 there upon. The first conveyor 4970 is driven by a driver (not shown) at a first speed, and the second conveyor 4969 may be driven by the same driver as drives first conveyor 4970. However, second conveyor may advantageously be driven at a second and suitably faster speed than first conveyor. Alternatively, second conveyor may be driven by a second driver (not shown), similarly configured to be driven at a speed which is faster than the speed of the first conveyor. A person of ordinary skill in the art would readily appreciate a suitable arrangement for accomplishing first and second driven conveyors.

A conduit 4958, suitably fashioned of a transparent material, is provided over the conveyors, and fastened in any manner readily available to the base 4950. The conduit 4958 is arranged so as to be substantially gas tight and sealed in such a manner that any suitable gas 4951 can be provided within the conduit 4958 so as to substantially eliminate oxygen from within the conduit 4958. The conduit 4958 may be directly connected to the previous upstream and subsequent downstream equipment to reduce the amount of gas that is lost at the entry and exit ends of the conduit 4958. Trays 4957 loaded with perishable goods, processed and portioned in any manner described herein can be transferred through conduit 4958 along conveyors 4970 and 4969 at a controlled rate or velocity as previously described. Conveyors 4970 and 4969 are arranged to carry trays in a direction shown by arrow 4980. A first, suitably narrow slot 4987 is provided on the upper side of conduit 4958 between sections 4956 and 4977 so as to allow passage of web material 4953 there through but to also minimize the quantity of gas that may escape from conduit 4958.

Any gas that escapes from conduit 4958 can be automatically replaced from a suitable source attached directly to conduit 4958 and wherein the source of gas is controlled by suitable valves and pressure gauges and switches arranged to ensure that a selected gas pressure is maintained in conduit 4958. A suitable gas pressure can be any pressure above atmospheric pressure to about 16 psi.

Sections 4976 and 4977 are arranged in close proximity and angled at a suitably inclined disposition so as to allow web material 4953, that is unwound from either of first or second rolls 4952 and 4954, to be carried through said slot 4987. Rolls of web material 4952 and 4954 are mounted upon an unwind assembly that can be arranged to automatically splice the end of one roll to the start of the other and in such a way so as to provide a continuous web of material. Any suitable splicing apparatus may be used to continuously provide lidding material 4953 without the need to stop production. Such apparatus is suitably provided by Hitech Systems Srl of Torino, Italy (www.hitechsystems.it). When the lidding material is pPVC, suitably, a stiffening material, such as duct tape or the like, may be applied laterally at the end of the first roll 4952 and at the beginning of the second roll 4954 to facilitate the automatic splicing of the first roll 4952 to the second roll 4954. When the need arises, the speed of the conveyors 4970 and 4969 or the takeup assembly 4965 may be speeded up or slowed down to prevent the spliced portion containing the stiffening material to form any part of a tray lid. The unwind assembly is securely mounted to a vertically disposed, rigid backing plate 4955. A suitably profiled housing 4981 is mounted to conduit 4958 in a substantially gas tight manner on an upper portion thereof. A carousel style assembly, comprising a vertically disposed circular plate 4961 mounted to a cantilevered shaft 4959 with sealing assemblies 4982, 4962 and 4983 mounted thereto, is located within housing 4981. A second, suitably narrow slot 4988 is provided on the upper side of conduit 4958 between sections 4979 and 4978 so that after sealing the web 4953 to the tray 4957, the used or remaining web material 4964 (which is a continuation of web 4953) therethrough minimizing the quantity of gas that may escape from conduit 4958. The second slot 4988 is suitably located at a position near the exit of conduit 4958, and near the end that is opposite the first slot 4987, so as to allow the remaining web material 4964 to exit the conduit 4958. Section 4979 and 4978 are arranged in close proximity and angled at a suitably inclined disposition so as to allow used web material 4964 to be carried through said slot 4988 and then wound onto either of rolls 4963 or 4965.

Rolls of remaining web material 4963 and 4965 are mounted upon a winder assembly that can be arranged to automatically splice the end of one used roll of web material onto the alternative roll winder in such a way so as to provide a continuous winding of remaining web of material 4964. The splicing of the remaining web material 4964 may take place in a manner similar to that described for splicing the unused lidding material 4953 on rolls 4952 and 4954. The winder assembly is securely mounted to vertically disposed and rigid backing plate 4960.

A longitudinally disposed parallel pair of continuous gripper chains 4971 (note that only a single chain can be seen in FIG. 148, however, the cross sectional view shown in FIG. 150 shows both gripper chains 4971 and 4931), are held in tension by a series of guides and sprockets 4956, 4986, 4967, 4966, 4968 and 4972. The chains extend longitudinally at least partially to coincide with the area of the first and the second conveyor. At least a single sprocket in each continuous gripper chain is spring loaded in such a manner so as to ensure a suitable degree of tension is maintained in each gripper chain. The gripper chains may be driven by a suitable servo electric motor at a suitable speed that is determined and controlled by a central processing unit (CPU) or PLC (Programmable Logic Controller) and in such a manner that is suitable for effective operation of the packaging apparatus. For instance, the gripper chain may travel at the same speed as the first conveyor 4970. However, the chains may be sped up under certain circumstances, for example, at the end of a web roll to avoid the spliced portion of the two ends of rolls 4952 and 4954. The gripper chains, which may be purchased from several chain manufacturers, such as Iwis of Germany, are arranged with web grippers that open as the chains pass around the sprocket 4956 and allow the continuous gripping of one edge of web material 4953. The two continuous gripper chains (as represented by 4971) are arranged to grip both edges of web material 4953 and carry it through slot 4987 and along the upper side of conduit 4958, and parallel thereto, and above trays 4957. A suitable level of longitudinal tension may be induced in web 4953, after unwinding from roll 4952 and prior to gripping by chains as represented by 4971, by providing a retarding or braking means to roll 4952. In this way trays can be carried along conveyors 4970 and 4969 at substantially the same speed as, and in the same direction to web 4953.

Referring again to carousel assembly mounted in housing 4981, three sealing assemblies 4982, 4962 and 4983 are mounted to rigid backing plate 4961 which is, in turn, mounted to shaft 4959. Shaft 4959 is rotated in the counterclockwise direction shown by arrow 4989, by a suitable servo motor (not shown) and at a speed that corresponds to the speed of both conveyor 4969 and web 4953. Assemblies 4962, 4982 and 4983 are similar and will be described in further detail herein below. Any suitable number of such assemblies may be arranged on such backing plate as 4962 but in this instance three are shown and mounted at pivot points 4974, 4973 and 4975 respectively. Furthermore, as the backing plate 4961 is rotated in a counterclockwise direction, the lower face of each assembly 4962, 4982 and 4983 is arranged to maintain a parallel disposition to web 4953. In this way, the lower face of each assembly can contact the web 4953 and apply a stretching force thereto prior to sealing to a tray and severing the web as described below. As trays are carried along conveyor 4970 and assemblies 4962, 4982 and 4983 rotate about shaft 4959 and successively apply stretching of web 4953 followed by sealing and severing of a portion of web 4953 to the flanges of each successive tray.

Referring now to FIG. 149 a cross section through a typical sealing assembly 4983 constructed according to the present invention, is shown. While sealing assembly 4983 is described in detail, it can be appreciated that sealing assemblies 4962 and 4982 are similar in contribution and therefore will not be described in detail. The assembly comprises a frame 4919 with pivot 4910, said pivot being fixed rigidly to frame 4919, but capable of rotating so the assembly can rotate about the pivot 4910. The frame 4919 is rigidly connected to a first backing plate 4920. Rectangular walls forming an outer stretching member 4913 are attached to the underside of the backing plate 4920. The walls forming the outer stretching member 4913 may be discrete or continuous so that member 4913 may include one or more discrete pieces. The stretching member 4913 includes rounded lower edges around the periphery of the lower open side. The lower open side of stretching member 4913 provides an opening which is suitably large enough to fit over the upper portion of a tray. The assembly 4983 also comprises an inner, rectangular profiled web sealing member 4917, having an inwardly sloping, angled face 4915. The member 4917 is mounted to a backing plate 4914 which, in turn is mounted to a pneumatic cylinder 4911. A rectangular profiled cutting member 4912 suitably corresponding to tray dimensions includes four cutting edges disposed along the lower peripheral edge. The member 4912 is mounted in interposed location between outer web stretching member 4913 and inner web sealing member 4917, and is fixed to a backing plate 4920.

Referring now to FIG. 150 a cross section X—X (see FIG. 148), through conduit 4958 constructed according to the present invention, is shown. A first gripper chain 4971 and a second gripper chain 4931 are arranged interiorly within the conduit 4958. The sections of chains 4971 and 4931 that travel in the same direction as the web 4953 are located in the upper portion of the conduit 4958. The sections of the chains 4971 and 4931 that travel in the opposite direction as the web 4953 are located in the lower portion of FIG. 150. In this manner, the forward moving chain sections may be the upper sections and the return sections may be the lower sections of the chains 4971 and 4931, so as to provide an endless continuous chain loop. The gripper chains 4971 and 4931 are suitably arranged on opposite lateral sides of the conduit 4958 and are configured to include devices capable of holding lateral edges of web 4953. The web 4953 is held between opposing upper chains 4971 and 4931 and the web 4953 is made taut there between by tensioning members 4924 and 4932 arranged so that respective upper edges 4926 and 4930 of tensioning members 4924 and 4932, respectively, are in tensioning contact with web 4953, i.e., the upper edges 4926 and 4930 are placed higher than the devices holding the lateral edges of the web 4953, such that the web 4953 is stretched. Tensioning members 4924 and 4932 are fixed vertically on a base 4939. The tensioning members 4924 and 4932 may run along the length of conduit 4958 in interposed position between the lateral conduit walls and conveyor sides for so long as tensioning of the web 4953. The upper chain sections are held captive in chain guides 4941 and 4942 but in such a manner so as to allow substantially unrestricted longitudinal chain movement along said chain guides and conduit. Trays, such as is detailed in FIG. 46 herein above, are carried along conveyors 4970 and 4969 at a suitable speed, which may be the speed that web 4953 is carried by the upper sections of the chains 4971 and 4931, so that the upper flanges 4943 of the trays 4957 are held in close and optionally touching proximity to web 4953. Conduit 4958 is mounted on a base 4940 and over conveyor 4969 and chains 4971 and 4931 in a substantially gas tight manner so that a selected gas 4951 which may substantially exclude oxygen, can be provided in the free spaces 4923 within conduit 4958.

Referring now to FIG. 151, a cross section through the flange portion of a tray similar in construction to that disclosed in association with FIGS. 46–49 herein above is shown. A vertically disposed, inner tray wall 4991 is shown terminating at a flange 4943. Flange 4943 slopes downwardly toward its outer edge to, in one instance, allow the stretch upper web 4953 to conform more readily to the flange and thus a more reliable hermetic seal. In some instances, the width of flange is not less than 1 mm and sometimes not less than 4 mm to provide a “target” for adhesive application. A flap 4993 is attached at hinge 4992. A bead of suitable cold seal adhesive 4990, such as a suitable latex compound, is provided as herein described above, along the full length of flange 4943 around substantially the entire upper periphery of tray and in such a manner so as to provide a hermetic seal with a lidding web 4953 after web 4953 has undergone stretching, sealing and severing of a suitable portion of web material from web 4953. Referring to FIG. 151, a web 4953 is shown, prior to sealing to flange 4943 of tray, but in contact with the tray flange 4943 at 4997, but is not in contact with cold seal adhesive bead 4990. A broken line 4995 is shown terminating at 4996 which represents the edge of lid web material after stretching of web 4953 with stretching member 4913, sealing with member 4917, and severing from web 4953 by knife 4912 shown in FIG. 149.

Referring to FIG. 148, sealing assembly is thus meant to operate in the following manner. Conveyors 4970 and 4969 position a tray 4957 underneath a sealing assembly 4962, 4982 or 4983 as shown in FIG. 148. As backing plate 4961 is rotated about shaft 4959, a sealing assembly such as sealing assembly 4983 is lowered over the tray. Within the sealing assembly, lower rounded edges of stretching member 4913 (FIG. 149) will stretch and displace web in a downward position on the insides of tensioning members 4924 and 4932 (FIG. 150). Further, while tray 4957 and sealing assembly 4983 continue moving forward in a direction indicated by arrow 4985 in FIG. 148, sealing member 4917 is lowered over tray 4957 by pneumatic cylinder 4911. Sealing member 4917 is suitably configured to dimensions which substantially correspond to tray flange periphery dimensions so that on activation of sealing member 4917, sealing member can depress web 4953 onto bead 4990, thereby hermetically sealing web 4953 to tray flange 4943. Sealing member 4917 may be retracted and cutting member 4912 cuts web 4953 around the periphery of tray 4957. Referring now to FIGS. 148–151, it can be seen that a lidding web material can be readily and effectively sealed, in an automated and continuous process, to the flanges of trays containing goods such as fresh meat.

3.3.8. Embodiment

Referring now to FIG. 152, an alternative embodiment of an enclosed packaging conduit 4958' is illustrated. This embodiment optionally uses ultraviolet radiation to cure the adhesive that bonds the lid material to the tray flange. This embodiment can further eliminate the need to have the sealing assemblies mentioned above. This embodiment uses a downward traveling chain assembly to bring the lidding material in touching proximity to the tray flange and thereby bond the lid to tray. The reference numerals used to describe the apparatus of FIG. 152 are similar to the ones used in the embodiment of FIG. 148 and denote like features. The operation of the enclosed conduit of FIG. 152 is similar in operation to the conduit of FIG. 148, but for some of the features described herein below.

Referring now to FIG. 152, as with the embodiment mentioned above, the packaging apparatus includes a pair of gripper chains 4971', one located on each side of the conveyors or conveyor runs to hold the lidding material therebetween. In FIG. 152, a side view of the apparatus is seen. Because the gripper chains are located in substantially the same horizontal plane, only gripper chain 4971' may be seen in FIG. 152. However, the other gripper chain is a substantial mirror image of gripper chain 4971' and is located on the opposite side of the conveyors 4970' and 4969'. At a suitable location along the conduit 4958', the pair of gripper chains 4971' are directed over roller 5099 and 5067. A roller that is a substantial mirror image of roller 5067 is located in approximately the same horizontal plane as roller 5067 on the opposite side of the conveyor 4969'. This roller guides the gripper chain also located on the opposite side of the conveyor from roller 5067 and gripper chain 4971'. Likewise, a roller that is a substantial mirror image of roller 5099 in form and function is located on the opposite side of conveyor 4970' from roller 5099. As is apparent in the FIG. 152, only one gripper chain 4971' and one roller 5067 is shown, but the opposite side of apparatus contains similar features. After the chain 4971' passes roller 5067, the chain is again directed upwards and over roller 4966'. As the gripper chain 4971' is directed downward by roller 5067, the lidding material 4953' is brought in direct contact with tray 4957 at station 5002. Station 5002 can suitably be an ultraviolet source to cure UV-curable adhesive, which can be supplied by the National Starch and Chemical Co.; however, any other suitable adhesive can also be used in the present invention. The application of UV curable adhesive can suitably take place at a station having a frame with a ring containing the adhesive. As each tray passes below the frame, a suitable lifting arm or other lifting apparatus elevates the tray through the frame to bring the tray flange in contact with the ring holding the adhesive, thusly applying adhesive on the flange surfaces of the tray. However, other alternatives to apply adhesive on a tray flange can be realized. For instance, with slight modification the ring can be lowered to the tray; or other methods may apply the adhesive with a spray or roller carrying the adhesive. Before the lidding material 4953' is laid on the flange carrying the adhesive, the lidding material 4953', at this point is suitably pre-stretched, so as to prevent the wiping of adhesive from tray flange. Lidding material 4953' can then be bonded by curing the adhesive with the UV source 5002.

Referring now to FIG. 153, a cross sectional view taken along the length of the enclosed packaging conduit 4958' where the lidding material 4953' is brought into contact with the tray flange is schematically illustrated. As is evident from the FIG. 153, the enclosed packaging conduit 4958' is attached to a base 4940'. Conveyor 4969' and 4970' are included within the conduit 4958'. The conduit 4958'further includes a pair of continuous gripper chains 4931' and 4971'. As previously described, the gripper chains catch on to either side of the lidding material and thereby stretch the lidding material before it makes contact with the tray flange. However, the lidding material is not stretched appreciably after the lidding material makes contact with the tray flange because the upper sections chains 4971 ' and 4931 ' may be directed inward toward the tray. The upper and lower sections of gripper chain 4971' are part of the same chain that form one continuous loop. However, the upper section of chain 4971' is traveling in an opposite direction as the lower section of chain 4971', thusly forming the continuous loop, while chain 4931' forms a similar continuous loop traveling in the same direction on the opposite side of the conveyors 4969' and 4970'. The chains function similarly to the embodiment described above, i.e., to carry and apply tension to the lidding material 4953' in a traverse, or side to side fashion. As can be seen in the FIG. 153, the conduit also has a pair of devices 5099 and 5098 that are suitably configured to trim the lidding material 4953' along the longitudinal direction. Also present (but not shown) are trimming devices that trim the lidding material along the traverse direction, i.e., front and back. Suitably, the front and back trimming of lidding material 4953' occurs before the trimming of the side material. However, other embodiments may have the trimming carried out in the reverse manner.

The conduit may also include one or a plurality of radiation sources 5006, 5008, and 5005, located either internally or externally to the conduit 4958'. Such sources, may provide ultraviolet, infrared or microwave radiation for one or more purposes. For instance, infrared may be used to reflow an adhesive that has hardened or solidified. Ultraviolet or microwave radiation may be used to cure an adhesive.

The means for bringing the lidding material in touching proximity to the tray flange includes a pair of guide members 5013 and 5004 located on opposite sides of the conveyor 4969'. It is important to note that station 5002 is located above conveyor 4969', therefore the conveyor in FIG. 153 has been labeled 4969'. However, because conveyors 4969' and 4970' are arranged linearly and the cross section occurs at a location adjacent to conveyor 4970', the conveyor section in FIG. 153 also corresponds to conveyor 4970'. However, guide members 5013 and 5004 are angled or sloped, meaning that they originally begin at a higher position, generally, beginning above the lidding material 4953', and thereafter sloping downward and directing the lidding material to a lower position which generally ends at a position that is below the base of tray 4957. The upper surface of the lidding material suitably contacts the guide members 5013 and 5004 and as lid material 4953' is carried forward, it may be directed downward until the lid material directly above the upper flange of the tray 4957 makes contact with the upper flange on tray 4957. As lid material is directed downward, if chains are not directed inward, lid material would undergo significant tensioning, therefore chains 4971' and 4931' can be directed inward at the same time they are directed downward to maintain the appropriate amount of tension in lid material 4953'. As the chains are directed inward the resulting tension in the web material may be more or less than tension originally imparted by chains on the lid material before the lid material was directed downward.

The guide members 5013 and 5004 in addition to bringing the lidding material to the tray flange also cause the lidding material to lay against the sides of tray 5009. The lidding material can then be partially relaxed, for example, by directing the gripper chains 4971' and 4931' further inward. Another station may then bond lid material to the exterior tray walls 5009 (described in more detail below). To this end, guide members 5013, 5004 serve to press lid material to the exterior of the tray wall 5009 along two sides thereof by their sloping character. Before or after bonding of lid material to the side walls of the tray, lidding material 4953' may be severed from continuous roll in both the traverse and longitudinal directions. A suitable cutting devices 5099 and 5098 are positioned to trim the lidding material 4953' at a location approximately at tray base level. Other cutting devices (not shown) can sever the web material at transverse locations. As described above, the adhesive for this purpose can be any suitable adhesive, such as, but not limited to a pressure sensitive adhesive. If the adhesive is in need of reflowing or to add tackiness, the adhesive can be reflowed by devices 5008 and 5005, which can be infrared or ultraviolet sources. The guide members are suitably constructed out of circular solid metal which can be optionally coated with a lubricating material, such as, but not limited to Tufram or Teflon, to prevent binding or sticking of the lidding material to the guide members 5013 and 5004 as the lidding material travels in a forward and downward direction. Prior to the lidding material being applied to the tray flange, an earlier stage in the package formation applies an adhesive to the tray flange. A non-limiting example of a suitable adhesive includes a UV curable adhesive supplied by National Starch and Chemical Company of Bridgewater, N.J.

Referring now to FIG. 154, a top plan view of a suitable embodiment of lidding material 4953' useful in sealing a tray is illustrated. Optionally, the lidding material or web can be printed by any suitable means. The lidding material 4953' can include a plurality of regions, 5019, 5017, 5098, and 5022, appropriately called lid material flaps so as not to be confused with tray flaps. The lid material flaps are locations or regions located in the lidding material that will be adjacent to the tray walls 5009 when the lidding material is pressed against the tray walls 5009. The lid material flaps 5019, 5017, 5098 and 5022 can include any printed material. Without limitation, the printed material can include information regarding the source of origin or ownership or specifications concerning any information or advertising pertaining to the product contained within the package. Furthermore the lid material flaps may be colored coded according to the product that is being contained within the tray. In one embodiment, particular to some European countries the flaps are colored pink for pork, yellow for chicken, blue for fish, etc. However, any color code particular to any recognized standard is within the scope of the invention. The lidding material may come preprinted with the color coded regions, or the regions may be colored along the length of the enclosed packaging conduit. The lid material flaps 5019, 5017, 5098, and 5022 can suitably be bonded to the side walls of the tray 4957, while a window 5020 or clear unprinted portion of the lidding material can provide viewing of the contained package contents. As shown in the FIG. 154, the dashed lines bordering lid material flaps 5019, 5017, 5098 and 5022 indicate approximately the locations where the cutting devices 5099 and 5098 will sever the lidding material from the tray after the lidding material has been sealed to the tray walls 5009. Gripper chains 4971' and 4931' are shown placing tension on lid material 4953' as the material is being applied to the underlying tray 4957.

3.3.8.1. Embodiment

In an enclosed packaging conduit, one aspect of the present invention is to provide an adhesive that can be used to seal both the tray to the flap and the web lid to the tray. One aspect of the present invention is to apply adhesive on the tray flange, when the tray flaps are folded. One aspect of the present invention is to apply adhesive around the base and flange of the tray. One aspect of the present invention is to rotate the tray 90 degrees, so as to complete applying adhesive for box shaped trays. One aspect of the invention is to laterally and longitudinally stretch a web lid 10 to 20% before applying the lid to the tray. One aspect of the invention is to bring the web in contact with the tray while under tension. One aspect of the present invention is cut the web on three sides thereof when the web is bonded at the adhesive. One aspect of the present invention is to relax the lateral tension after the cutting step to about 5 to 10% stretch. One aspect of the present invention is to cut and roll the web lid onto the sides of the tray. One aspect of the present invention is to release the web lid from the gripper chains. One aspect of the present invention is to overlap an upper corner of the tray with the web lid. However, overlapping of the lower tray corners can also be undertaken. One aspect is to take up any scrap web with a vacuum device.

While one example has been provided of the events that may occur in the present invention, it is to be appreciated that more or less steps can be undertaken, the ones mentioned herein being merely an example of one embodiment.

3.3.8.2. Embodiment

In another aspect of the present invention, a plurality of different adhesives may be used to construct and seal a packaging tray in an enclosed packaging conduit, such as the embodiments disclosed herein above. These adhesives may be selected depending on the ultimate use in the package. For example, a UV curable adhesive can be used to bond the lidding material 4953 to the tray flange 4957. Such an adhesive can be obtained from the National Starch and Chemical Company of Bridgewater, N.J., under the mark CONTOUR. This adhesive can come as 100% solid, with little to no water, can be a heavy liquid or hot melt and is cured by ultraviolet radiation. The ultraviolet radiation suitably penetrates a transparent member to reach the adhesive. A hot melt adhesive or microwave curable adhesive may be used to weld the tray flaps to the sides and bottom of the tray as will be described below, and a pressure sensitive adhesive may be used to hold the lidding material flaps to the sides of the tray package. This is advantageous because not all bonding operations may desirably be occurring at the same stage of packaging. For example, the tray flaps may have been bonded to the tray prior to entering the enclosed packaging conduit 4958. However, with slight modifications, the conduit 4958 may accommodate a tray flap folding and bonding station. Suitably, pressure sensitive adhesive may be applied to the sides of tray flaps to bond with the lidding material. These adhesives may also suitably be provided before the entrance of the tray package to the conduit 58. However, again with slight modification, the conduit 58 can be made to accommodate any adhesive application station, such as the use of sprayers or rollers. Also suitably, since any selected adhesive may lose its tackiness or may harden over time, this condition can be corrected to cause re-flow or re-melt of the adhesive by the use of heaters located along the exterior or interior sides or top of the packaging conduit 58. Under certain conditions, it may be desirable to cause such adhesives to harden, for example, a hardened adhesive will have minimal flow, thus, it will not smear or attach itself if it is accidentally contacted with foreign substances. Suitable adhesives may be any of the rubber based adhesives that can suitably be reflowed.

In another aspect of the present invention, bonding may take place with any suitable adhesive that is capable of withstanding the temperatures that may be encountered in a microwave oven. In this manner, the whole tray may be placed in the microwave oven or any heat convection oven. One suitable adhesive includes crystallizable PET.

In still another aspect, the stretch sealing machine as disclosed above, can stretch a web, and after adhesive has been applied to tray, the web is bonded to the tray on contact in a tensioned state.

3.4. Vacuum chambers

In one aspect of the invention, vacuum chambers are provided with the packaging apparatus herein described above, for the evacuation of oxygen or other undesirable gases from trays and flushing with a desirable gas to enhance the shelf life of perishable goods.

3.4.1. Embodiment

FIG. 155 shows a cross-section through one embodiment of a vacuum assembly constructed according to the present invention. The vacuum chamber assembly includes a first upper 5124 and a second lower 5116 vacuum chamber portion. Sealing plates 5118 disclosed herein may be first arranged on a conveyor that is driven by any suitable motor as required providing intermittent movements of the conveyor. Lower vacuum chamber 5116 is independently moved by a pneumatic driver (not shown) so as to apply pressure to underside of sealing plate 5118. Plate 5120 is located between sealing plate 5118 and plate 5122. Plate 5122 has vacuum port 5130 provided therein. Upper vacuum chamber 5124 is located above plate 5122. All components are in vertical alignment and when lower chamber 5116 and upper chamber 5124 are retracted and moved in the vertical plane away from each other, plates 5118, 5120 and 5122 may be spring loaded and also "expand" away from each other so as to allow free movement of the tray 5136 and first 5132 webs between plate 5120 and plate 5122 or between plate 5118 and plate 5120 as may be selected according to requirements or operation of apparatus. As is shown in FIG. 155, second web 5134 enters the vacuum chamber assembly between plate 5122 and upper vacuum chamber portion 5124 and exits the vacuum chamber assembly between plates 5120 and 5122. Also, it can be seen that first web 5132 enters vacuum chamber assembly between plates 5120 and 5122. A space 5138 is shown between the first 5132 and second 5134 webs with port 5130 opening into space 5138.

During the operation of the packaging apparatus, after closing of lower vacuum chamber 5116 and upper vacuum chamber 5124 toward each other thereby providing a closed and sealed vacuum chamber, a vacuum source can be applied to port 5130 and thereby evacuate substantially all air from the space 5138 between the first web 5132 and the second web 5134. Evacuation of air from space 5138 can cause first 5132 and second 5134 webs to become laminated together after removing substantially all air from the space 5138. Slots shown as 5140 are provided between the faces of plates 5116 and 5118, 5118 and 5120, 5120 and 5122, and 5122 and 5124. These slots provide spaces between each of the components, "O" rings are fitted along the outer edges of each slot to provide a seal when the components are in contact with each adjacent component. A vacuum source can be applied to each of these spaces, simultaneously, thereby providing a method to hold them together with a force equal to that provided by the ambient atmospheric air pressure prevailing at the time. The holding force that urges the components together is therefore approximately equal to the width of the slots between each component, times the length of the slot, multiplied by the difference of the prevailing atmospheric air pressure minus the air pressure within the slots defined by the equation:

$$F=WL(P_a-P_s)$$

wherein,

F is the force,

W is the width of the slot,

L is the length of the slot, $P_a$ is the atmospheric pressure, and $P_s$ is the pressure inside the slot.

It should however, be apparent that other configurations are possible. The width of each slot can be arranged, by enlarging (or decreasing) so as to provide a level of force that exceeds the desired and opposing force of gas pressure within the closed chamber. A pair of "O" rings are also provided around all shafts that penetrate the chamber and spaces provided between each pair of "O" rings can also be evacuated. In this manner, the vacuum chamber can be used to eliminate ambient air, oxygen or any undesirable gas and replace it with a suitable gas of suitable composition, in one instance, being mainly carbon dioxide.

In another aspect of the present invention, the space 5138 provided between webs 5134 and 5132 can be eliminated prior to the webs entering the vacuum chamber assembly 5100. Referring momentarily to FIG. 156, a cross-sectional view through a laminating assembly 5147 including a first 5148 and second 5150 rubber coated roller arranged in horizontal disposition and with devices (not shown) urging them toward each other so as to press and laminate the first 5132 and second 5134 webs when the webs are passed between the rollers 5148 and 5150. Rollers 5148 and 5150 are driven by a variable speed motor (not shown). Laminating assembly 5147 can be located before the vacuum chamber assembly 5100 to thereby provide a method to laminate first 5132 and second 5134 webs together before entering the vacuum chamber assembly 5100.

3.4.2. Embodiment

Referring now to FIG. 157 a cross-sectional view through a vacuum chamber 5214 constructed according to the present invention is shown. The tray 5202, first 5204 and second 5206 webs are shown prior to sealing the webs together. This vacuum chamber has a plate 5254, separating first 5204 and second 5206 webs, at both the entrance and exit portions of the chamber for both the first and second, unlike the chamber of FIG. 155.

A system incorporating vacuum chamber 5214 may be configured as follows. Perishable product, such as beef, is loaded into tray (tray web 5202) and then each loaded tray is placed into apertures in sealing plate 5250. The conveyor indexes forward such that a loaded tray is located at first station 5214. During indexing, second web 5206 and first web 5204 are also indexed forward and a longitudinally disposed tension can be applied to second and first webs and in a direction parallel with the conveyor. Lateral stretching can also be applied to first web 5204 such that it is stretched taut. Upper vacuum chamber portion 5216 includes a plurality of clamp members to hold the first 5204 and second 5206 webs in position. Upper clamp member 5252 and lower clamp member 5222 close against the middle clamping plate 5254 thereby clamping and firmly holding second and first webs 5206 and 5204, respectively. Lower vacuum chamber 5220 and upper vacuum chamber 5216 are closed against the clamping plate assembly 5250 such that a substantially "airtight" seal is provided and the upward movement of lower vacuum chamber 5220 lifts sealing plate 5250 and holds it firmly against the underside of the lower clamp 5222 thereby providing substantially "airtight" seals around the perimeter of the upper and lower vacuum chambers 5216 and 5220. Closing the upper and lower chambers thereby defines a single enclosed chamber that is substantially isolated from atmospheric gases. During the procedure of closing the upper and lower chambers, the lower vacuum chamber 5220 lifts the sealing plate 5250 upwardly and tray (tray web 5202) is carried upward as well. The upper rim portion of sealing plate 5250 at 5258 contacts the underside of first web 5204 stretching first web upwardly until sealing plate 5250 contacts the underside of lower clamp 5222 thereby stopping the upward movement. The first web 5204 is now stretched taut across the opening of the ring 5258 and distanced about 1/64 to about 1/2 inches, or about 1/8 inch above a suitable tray flange and about 1/64 to about 1/2 inches, or about 1/8 inch below second web 5206.

Atmospheric air contained within the enclosed chamber is then substantially evacuated through evacuation ports 5208, to a pressure of less than 5 torr. Immediately after evacuation, the chamber can be filled with carbon dioxide gas, or a blend of carbon dioxide and nitrogen gases, to a pressure of up to 2 bar (28 psi) or more, by injection through ports 5264 and optionally 5208, and held at pressure for a period of 1 to 5 seconds or more and until water and goods in the tray have become substantially saturated with dissolved carbon dioxide. The gas pressure within the chamber assembly can then be lowered to a pressure equal to that of the prevailing ambient atmospheric pressure prior to sealing. Evacuation and gassing of the chamber assembly in accordance with the invention, provides a method of filling packages with a chosen gas such that the residual atmospheric oxygen that remains within the package does not exceed an amount about 0.05% by volume of the gas that remains within the package after sealing the tray 5202, first 5204, and second 5206 webs together.

Referring again to FIG. 157 in conjunction with FIG. 158 and FIG. 159, a clamping member 5236, that can be water cooled, can now be moved and positioned so as to clamp second web 5206 against first web 5204 and in turn against the flange portion 5272 on tray web 5202. A first heat bank 5224 at a first temperature can then clamp and heat seal first and second webs 5204 and 5206 to flange portion 5272 of tray web 5202, under pressure. Heat bank 5224 can now be retracted followed by cutting of first and second webs with cutting member 5240 attached to cutting device 5238. The cutting member is withdrawn from the cutting position followed by release of clamp 5236. Enclosed vacuum chamber assembly can then be opened allowing a conveyor to index forward to place another sealing plate with a tray web, followed by closing the vacuum chamber assembly, followed by evacuation, gassing and heat sealing. This cycle can be repeated in an automatic and continuous mode. Pneumatic cylinders are attached to shafts 5230 (attached to heat bank 5224), 5232 and 5228 (attached to water-coded clamp 5236) and 5234 and 5226 (attached to cutting device 5238), and provide independent reciprocating movements to each shaft and attachments generally in the vertical plane of motion. Similarly, pneumatic cylinders (not shown) are attached to upper 5214 and lower 5220 chambers to provide reciprocating movements parallel with shafts 5230, 5228, 5232, 5226, and 5234 to provide movement and apply pressure as required.

An optional method of using the apparatus whereby a gas is not provided in the space between second web 5206, and first web 5204 (so as to subsequently facilitate urging of the first 5204 and second 5206 webs together), before sealing the second web 5206, first web 5204 and tray web 5202. In this aspect, the tray web 5202 is elevated so as to urge first web 5204 toward the underside of second web 5206, thereby providing stretching means to first web 5204 and removing any air between the first 5204 and the second web 5206. Apparatus for evacuation of substantially all air from the space between the second 5204 and the first 5204 webs, through ports 5208 are therefore optional.

After the first and second webs are scaled to the tray web at flange 5272, it may be desirable to seal the first web 5204 to flange 5274 of the tray web 5202 as shown in FIGS. 158 and 159. The sealing apparatus 5316 described below may be used to create the seal.

3.4.3. Embodiment

Referring now to FIG. 160, a cross-sectional view of sealing apparatus 5316, constructed according to the present invention is shown in a partially closed position.

Referring to FIG. 158 and FIG. 159, a cross-sectional view through a finished and sealed package constructed by the vacuum chamber 5214 is shown. Package 5292 includes a flange 5272 with first web 5204 and second web 5206 attached thereto. Shown is tray web 5202, formed with two flange portions 5272 and 5274. Flange portions 5272 and 5274 are adjacent and concentric to each other, with flange 5274 located on the inner side of flange 5272.

Referring now to FIG. 160, a sealing plate with package constructed by vacuum chamber 5214 is located beneath heat bank 5370. It can be seen that lip 5380 has a profile that corresponds to and follows the path and plan profile of flange portion 5274. A section of flange 5274 is more clearly seen in the enlarged cross-section in FIG. 159. Flange portion 5274 is parallel and concentric to flange portion 5272 but follows a path on the inner side of flange portion 5272 and at a plane shown to be at a distance 5276, about 1/8 inches below flange portion 5272. Heat bank 5370 is pneumatically operated and can extend downwardly and be retracted upwardly as required to exert a force such as to provide pressure onto the lip 5380 and when engaged with flange portion 5274, simultaneously depressing second and first webs that are then held, under a sealing pressure (sealing pressure), between the surface of flange portion 5274 and lip 5380 for a set period of time (set time). The temperature of heat bank 5370, and correspondingly lip 5380, can be controlled and is set at a suitable temperature (set temperature). The temperature of heat bank 5370 may be less than the temperature of the heat bank 5224 located in vacuum chamber 5214. Pressure is applied at lip 5380 and can be set at sealing pressure. The suitable time of contact and clamping of second and first webs to flange portion 5274 can be varied. Time of contact is defined as the length of time during each cycle from the first instant of first contacting between lip 5380 and flange portion 5274 through the second and first webs, to the first instant of no contacting after retraction of heat bank 5370. Thereby, when the set temperature, sealing pressure and set time of heat bank 5370 are adjusted as required, the selective heat sealing of first web 5204 to flange portion 5274 can be achieved while second web does not heat seal to first web. This can be achieved when tray, first and second webs include materials as described below.

Referring again to FIG. 158 and FIG. 159, a representation of an enlarged view of a section through a flange portion of an assembled package is shown. In one instance, second web 5206 is a co-extruded web including at least two layers with a first layer 5282 of Eastman PET 9921 and a second layer 5284 of material on the underside of the second web including a blend of 2 grades of Eastman polyesters in amounts of about 50% Eastobond 6763 and about 50% Eastobond 9921 or alternatively the layer on the underside may be about 520% Eastman PM 15086. Second web can be about 0.006" thick, about equally divided between first and second layer. In one instance, first web 5204 is a web of pPVC with a thickness of about 0.0008". In one instance, tray web 5202 includes a thermoformed tray produced from a multilayer co-extruded web with an outer layer of Eastman 9921 and an inner layer including a blend of about 50% Eastman PETG 6763 and about 50% Eastman 5116 (or Eastman PM14458 or equivalent). In one instance, tray web 5202 has a thickness of about 0.012" where the inner layer is about 0.004" thick and the outer layer is about 0.008" thick. Under such conditions and materials, the heat transferred through second web is insufficient to cause bonding between the second and first webs but sufficient to cause bonding between the first and tray webs at flange portion 5274. Such arrangement provides stretching of first web, after sealing of second and first webs to tray web at the vacuum chamber 5214. Applying gas pressure to the upper surface of the second web, when located at sealing apparatus 5316, so as to cause the first and second webs to depress downwardly and substantially conform to the contours of flange portion 5274 prior to providing heat sealing the first web to flange 5274 provides an alternative means of providing contact between the first web and flange 5274.

In another aspect, first web 5204 will have a feature known as a "memory". The term "memory", in this context, is known in the packaging industry and is characterized as a material that will substantially return to its original shape after distortion has occurred due to, for example, a consumer "feeling" the goods contained within the package while the package remains intact, with first web sealed to the tray flanges. This can cause finger marks and depressions in the first web as prospective purchasers of the package examine it prior to purchase during retail display of the package. After excessive handling by consumers the package can become unattractive to an intending purchaser and financial losses can result therefrom. Materials such as polyethylene substantially do not have "memory". However, plasticized PVC (pPVC) web materials, such as made by Borden do provide this desirable feature. First web constructed from pPVC may be perforated by perforating apparatus to improve gas transmission therethrough.

Perforations can be provided in first web 5204. The perforations can allow gas to permeate into a space between first web and second web. When the gas pressure inside the sealed package is at a pressure slightly above ambient air pressure, second web will be stretched outwardly into a dome shaped condition thereby providing a gas buffer between second web and the surface of goods beneath the first web. First web may be in contact with the surface of package goods, alternatively a space can be provided therebetween. The seal between first web and second web may be arranged such that it is not a continuous seal along the full path of flange portion 5274 and may be arranged as an intermittent sealing, completely along one or more sides only or parts thereof.

In yet another embodiment heat bank 5370 may be mounted at the vacuum chamber 5214, concentrically with and on the inside of heat bank 5224 within the same chamber but with separate moving shafts. Such an embodiment would allow sealing at flange portion 5272 and flange portion 5274 without the need to transfer the package from the vacuum chamber 5214 to sealing apparatus 5316 for sealing of flange 5274. Suitable web cutting devices are located at sealing apparatus 5316 to separate the sealed and finished package 5292 from webs if necessary.

3.5. Composite Lidding Materials

In another aspect of the present invention, a pre-stretched web of flexible gas permeable material laminated to a substantially more rigid gas barrier material is provided.

Referring to FIG. 161, first 5400 and second 5402 roll of web material including a first web 5404 and a second web 5406 are unwound simultaneously and laminated by passing the webs through a pair of "nip" rollers 5408 that apply pressure against each other in the direction of arrows 5415 and to the webs as they pass through nip rollers 5408. Nip rollers 5408 are driven by any suitably powered driver to rotate at a suitable speed. The laminated web 5412 is rewound onto a single roll 5410 together to produce a roll of laminated web 5412. Second web 5406 may include a semi rigid polyester material, of about 0.005" to about 0.007" thick. The construction of this material is such that it can be used in a packaging machine to produce packages as described herein whereby laminated webs, such as web 5412, are sealed to a tray web of gas barrier material (tray).

Tray web may have a depression formed therein into which goods such as red meat can be placed before heat sealing the second and first webs to the tray web. Goods will typically not completely fill the depression and space will remain in the depression in addition to the goods. A blend of gases or a single gas such as $CO_2$ can be provided in the space with goods and thereby can contact the goods. The gas substantially eliminates the presence of oxygen and any red color present in the red meat may be transformed to a purple color. This is caused in part by the reduction of oxymyoglobin to deoxymyoglobin. After storage of perhaps a period of 14–28 days from packaging but prior to retail display at an intended point of sale to consumers, the second web can be peeled from the package allowing atmospheric oxygen to permeate the first web of gas permeable material and to contact the goods. Atmospheric oxygen can then generate a bright red colored substance, such as oxymyoglobin. Such use involves the sealing of the laminated webs to the tray web of gas barrier material such as a two-layer co-extrusion where the outer layer includes Eastman APET 9921 of about 0.0035" thickness, and the inner layer may is a blend of Eastman polyester materials including about 16% of 6763 and about 84% of 9921.

The thickness of blended layer 5412 can be about 0.0015". First web 5404 includes a roll of monolayer pPVC with a thickness of about 0.0008" to about 0.0012". As first web 5404 is unwound it can be passed through a perforator 5414 that perforates the first web by creating small apertures therethrough. First web 5404 can be tensioned in a controlled manner by retarding the rate of unwinding of first web 5404 from roll 5400 relative to the unwinding rate of second web 5406 from roll 5402. Tension is thereby applied to first web 5404 of material prior to passing through the nip rollers 5408 at which point substantially all of the air between the two layers of material is forced out by the nip rollers 5408. The consistency and texture of elasticized PVC material included in first web 5404 is such that it adheres lightly to second web 5406 unwound from roll 5402 forming a very light seal that excludes all air from between the webs. First web 5404 is applied to the inner, blended layer of second web 5406, a substantially more rigid material unwound from roll 5402. In one instance, an anti-blocking agent, such as very fine sand, can be added to the second web upper or outer layer of the co-extrusion so as to inhibit sticking of first web to what will be upper layer such that first web will remain in close contact with what will be the underside of second web during storage in a roll 5410 condition and during unwinding from roll 5410 in normal operation on a packaging machine.

First 5404 and second 5406 webs, having been laminated to produce a lamination and subsequently wound onto the finished roll 5410 can be stored and when required for use in packaging can be loaded onto packaging machine as shown in FIG. 162.

Referring now to FIG. 162, a process to bond a laminated web of material 5412 to a tray web or tray is shown. The two webs include the second and first webs. The apparatus is suited to produce any packages herein described. Tray web 5416, preferably of a substantially gas barrier material is located into an aperture (not shown) in sealing plate 5418 mounted on the conveyor 5420. Tray web 5416 has a cup-shaped depression formed therein. Red meat or another perishable good is loaded into tray web 5416 and a plurality of trays are located into the apertures in each sealing plate 5418 mounted to conveyor 5420. The conveyor indexes forward such that a loaded tray is located between upper vacuum chamber 5422 and lower vacuum chamber 5424. During indexing of the conveyor 5420, the tray web 5416 is also indexed in a direction parallel with the conveyor and placed into position between upper 5422 and lower 5424 vacuum chambers. Upper 5422 and lower 5424 vacuum chambers are closed together such that sealing plate is clamped therebetween to provide a substantially sealed and enclosed chamber assembly. Air is evacuated from the chamber assembly to a pressure level of approximately 5 torr and a selected gas is injected into the chamber assembly. The gas being chosen for its properties of enhancing the keeping qualities of goods, in tray web 5416, such as carbon dioxide or a blend of carbon dioxide and nitrogen is suitable. Tray web 5416 is then bonded to laminated web 5412 to produce a package. Upper 5422 and lower 5424 vacuum chambers are then opened so that conveyor 5420 can carry sealed package to an ejection point. The package may be trimmed by cutting devices located within the chamber assembly such that a skeletal scrap web can then be wound onto a single wind-up spool, or alternatively, if it is desired to have similar materials only as a single roll, the scrap laminated web 5412 can be separated by de-laminating the second web scrap 5406 from first web scrap 5404 onto scrap wind-up 5426 and 5428, respectively. The package may be trimmed within vacuum chamber in one machine cycle or alternatively the package may be trimmed from the web in a second operation immediately after the vacuum chamber.

Tray web 5416 or tray may be thermoformed from co-extruded polyester plastic materials as shown in FIG. 163. Co-extruded material may include two layers of a total thickness of about 0.015". The outer layer 5430 is about 0.0135" thick and the inner layer 5432 is about 0.0015" thick. The outer layer 5430 includes Eastman APET 9921 and the inner layer 5432 is about a 50/50 blend of Eastman 13162 and Eastman 6763.

3.6. Stretch Wrapping

In one aspect of the invention, methods and apparatus are provided to stretch a lidding material over a tray to produce a finished package. Stretch wrapping can occur under reduced oxygen conditions to provide for extended shelf life to products. Over wrapping can be heat sealed and/or adhesively bonded to the tray.

3.6.1. Sealing Plates

In one aspect of the invention, stretching a web across the a tray is provided by a sealing plate. Any of the foregoing methods requiring a sealing plates can be provided with sealing plate of the following nature.

Referring to FIG. 164, a cross-section of a sealing plate 5550 constructed according to the present invention is shown with a plan view shown in FIG. 165. Sealing plate 5550 includes attachment points 5594. Attachment points 5594 may be used to attach the sealing plates 5550 to a pair of continuous chains that engage with sprockets located one at each end of conveyor. Sealing plate 5550 has a depth dimension that is about equal to or deeper than the depth of depressions in tray web, so that tray web does not protrude through the lower surface of the aperture 5530. A rubber seal 5535 is attached to the sealing plate 5550 by an adhesive and is profiled to provide flanges 5596 and 5598 that correspond to flange portion 5272 and flange portion 5274 of first tray web 5292 shown in FIG. 159. A space 5551 between the rubber seal 5535 and rim 5578 is provided to allow clearance for a cutting member during the cutting of the second and first webs after sealing to flange portions 5572 and 5574.

Referring now to FIG. 165, one embodiment of a sealing plate 5550' is shown in top plan view. In the embodiment represented here, the sealing plate includes two apertures 5530' to accommodate two trays. However, it is apparent that any number of apertures can be provided, depending on the desirability of including one or more apertures capable of carrying a plurality of trays, such as shown in FIG. 166, having three apertures 5530".

Referring now to FIG. 167, a cross-sectional view of the details of sealing plate 5550" with three apertures 5530" is provided. As an example, this embodiment has three apertures 5530" and rubber seals 5535" located around the perimeter of each aperture is shown. However, sealing plates may have more or less apertures and corresponding rubber seals. Under some circumstances, rubber seals are made optional. Sealing plates are machined from aluminum or other metals or any suitable plastic, for example, about 0.75 inch thick polypropylene with upper 5552 and lower 5554 faces. Sealing plates constructed according to the present invention can be used as members being attached to conveyors to carry trays in the packaging system.

Referring now to FIGS. 168–171, one aspect of the sealing plates is to provide a method of stretching webs after being bonded to tray. Referring first to FIG. 168, package 5624 containing goods 5614 is shown with webs 5602 and 5604 stretched taut. In FIG. 168, the tray web 5600, first web

5602, and the second web 5604 are shown sealed together to form a complete package 5624. Referring now to FIG. 169 dotted lines 5618 are shown to represent the position of the side walls 5616 before insertion of the tray 5600 into the aperture 5606 in the sealing plate member 5608 shown in FIG. 170. Referring to FIG. 170, the aperture 5606 is located in plate member 5608 which in turn is attached to two chains 5605 on opposite sides thereof. The aperture 5606 has dimensions slightly smaller than the external dimensions of the side walls of the tray web 5600 such that when the tray 5600 is inserted into the aperture 5606, the side walls are urged inwardly.

Referring now to FIG. 171, dotted lines 5617 show the relative position of the edge of the flange 5610 that may be present prior to the tray insertion into the aperture 5606, whereas solid lines 5620 show the edge of flange 5610 after insertion of tray into aperture 5606. After bonding the tray to webs and release of the tray from the sealing plate, the tendency of flange to return to its original position urges webs taut, substantially retaining the position that is induced by placing the tray into the aperture 5606. In this manner, the webs are held taut to present a more attractive appearance for a potential buyer Referring again to FIG. 170, wherein a plan view of a section of a conveyor such as may be installed in a packaging machine, is shown. Sealing plate 5608 may have a plurality of apertures 5606, all of a suitable size and arranged to hold a plurality of the trays in a flexed condition as herein described.

Referring again to FIG. 169, the arrangement of tray web 5600 (tray) with a flange 5610 extending continuously around the perimeter of tray 5600 to provide a flat ledge to which first web 5602 can be sealed, is shown. Tray 5600 has been distorted such that side walls are urged inwardly and held in position by the limiting size of aperture 5606 located in sealing plate 5608 of FIG. 170.

Referring again to FIG. 168, in one instance, first web 5602 is a gas permeable material such as pPVC of about 0.0008 inches thick and tray web 5600 is constructed of a substantially gas impermeable material such as a co-extruded multilayer sheet of Eastobond APET 9921 and a blend of about 16% Eastobond PETG 6763 and about 84% Eastobond 9921. A second web 5604 is sealed to first web 5602 adjacent to seal 5612 of the first web to the tray web. Alternatively, the tray 5600 can be formed from a web of polystyrene foam that has been previously laminated to a web of gas barrier material. A first web of material can be sealed to the web of gas impermeable material laminated to the upper side (inside) of foam tray. Trays according to the present invention are substantially impermeable to gases. Webs are shown sealed together by a strip-like seal 5612 on flange 5610 that follows a path that continues around the flange near the perimeter of the package thereby providing a substantially hermetically sealed package. Goods 5614 are contained within the sealed package and a suitable gas blend which may include about 40% carbon dioxide and about 60% nitrogen is provided within the package. Sealing of the package is effected while side walls 5616 of the tray 5600 are urged inwardly. Side walls 5616 thereby retain a tension and desire to return to their original relative position thereby exerting a substantially outwardly disposed urging around the perimeter of the depression in the tray 5600 but which is retained and held captive by the combined strength of second and first webs sealed to the flange. Second web 5604 can be sealed to the package in such a manner as to allow peeling from the package, without rupturing first web and thereby leaving first web attached to the flange. When second web is peeled from the package the strength of the first web 5602 is sufficient to restrain outwardly urging of the side walls, thereby providing a means to stretch the first web 5602 into a substantially flat condition. The extent of the urging can be controlled such that it will maintain a tension in first web 5602.

3.6.2. Overwrapping and Web Stretching 3.6.2.1. Embodiment

Controlled Atmosphere Packages (CAP) are packages prepared or treated in an oxygen deficient atmosphere to remove or prevent the accumulation of oxygen within the package materials. Packages are overwrapped with apparatus having web stretching capabilities in an enclosed conduit containing a suitable has as herein above described.

Referring now to FIG. 172, a section of PVC web material 5700 used for overwrapping is illustrated. Web material 5700 is about 0.0008" in thickness. However, any suitable thickness or gauge can be used. Web 5700 can be coated, fully or in part and with any desired pattern such that parts of the web remain clear and other coated parts may be opaque. Web 5700 is shown with a suitable heat sealing coating that has been applied in two continuous strips 5704 along the edges of the web such that a continuous, central strip 5702 remains clear. The width of the clear section central strip 5702 may be about 50% of the total width of the web 5700 and the outer two printed sections 5704 of about equal width being about 25% of the full width each of web 5700.

Referring to FIG. 173, web 5700 may be formed into a tube when folded along a lateral axis, such that edges of portions 5704 may be joined such that when formed into a tube 5714, a fin seal, 5708, can be provided by heat sealing the edges. In one instance, the sealed tube, can include an upper clear section through which a tray 5710 and its contents can be seen and a lower, opaque section 5712 through which a tray 5710 and its contents cannot be seen.

Referring now to FIG. 173, web 5700 can be processed by a modified Hayssen machine model RT1800, for example, in such a manner so as to form a continuous tube 5714, where PVC web material forms a "fin" sealed tube, such that fin 5708 is formed on a lower surface of tube 5714. Suitable packaging trays 5710, such as Mono-Pak™ or any other tray herein described, that have been filled with perishable goods such as ground beef can be inserted into the tube 5714, by automatic devices (not shown) or any other suitable devices, and lateral stretching can be induced into the tube 5714. The lateral stretching can cause the tube 5714 material to firmly contact the tray 5710 and hold the perishable goods contained therein firmly. After the trays 5710 are located inside, the fin sealed tube 5714 can also be stretched longitudinally. After the longitudinal stretching of the tube 5714, lateral fin seals also may be formed, followed by severing of the tube 5714 adjacent to the lateral fin seals, can be provided so as to provide a fully and hermetically sealed package as shown in FIG. 174. The lateral and longitudinal stretching can be provided prior to sealing and severing of the lateral fin seals. Longitudinal stretching can be effected by the modified Hayssen model RT1800 after modification as generally described below.

The following disclosure details the modification that can be incorporated in the RT1800 so as to facilitate the use of pPVC web material as the over wrapping packaging material used thereon to over wrap such packages as the Mono-Pak EPS, or any other tray, foam or otherwise.

The Hayssen RT1800 is manufactured by Hayssen, a division of the Barry-Wehmiller Company, which is located at 225 Spartangreen, Boulevard, Duncan, S.C. 29334. Other information describing the RT1800 can be obtained from the following Web site: www.hayssen.com. The RT 1800 incorporates a "rotary die wheel" in such a manner so as to provide a continuous movement of the web during machine operation and package sealing. This arrangement provides a method to process and seal packages more rapidly than other types of over wrapping machines but until now, the RT 1800 has not been used to over wrap packages with pPVC (plasticized polyvinylchloride) web material.

It is desirable to use pPVC web material, in this particular application, because of its most suitable physical characteristics for the packaging of fresh meats such as ground meats and poultry pieces. However, the standard RT1800 is not ideally suited to process pPVC web material and in order to ensure efficient stretching and sealing of the pPVC web, the modifications to the RT1800 are necessary.

The HAYSSEN RT1800 rotary die wheel concept operates on the principal of maximizing dwell time. Individual MAGNUM sealing dies are released on demand as packaging material and product move through the machine. The RT1800 packaging equipment is well known to those skilled in the arts and all details of the RT 1800 machine construction are readily available from the manufacturer to potential end users of this popular packaging equipment.

Suitable packaging materials for use in this aspect of the invention, may include the Mono-Pak™ EPS tray, over wrapped with plasticized PVC web material, (supplied by AEP/Borden or Huntsman).

It should be noted that the readily available, low cost, pPVC web material as intended for use in this application, has the following properties:

1. Glass clarity
2. Stretch and high extensibility (50–100% before exceeding elastic limit)
4. Memory, providing a "return to its original condition" after stretching (within elastic limit).
5. Standard, enhanced oxygen permeability.
6. Rapid heat sealing to itself.
7. Rapid hot "knife" cutting, providing clean cut edges.

Generally, the basic RT1800 machine, as manufactured by Hayssen, would remain similar to existing standard equipment, except for the modification described herein. The existing longitudinal fin or lap sealing may require adjustment to facilitate an enhanced lateral web "stretching" capability for a pPVC web. The longitudinal web stretching apparatus, as disclosed herein, should be capable of installation without major structural and basic frame modifications to the existing equipment.

Referring now to FIG. 175, the apparatus constructed according to the present invention includes a die wheel 5716 shown in part with the axis of the wheel marked as axis 5718. A number of die carriers 5720 are also shown connected to the axis 5718. For the most part, the wheel die assembly includes a standard Hayssen component modified according to the present invention.

The packaged product 5754 may include any of the number of trays disclosed herein, over wrapped with standard (with enhanced $O_2$ permeability) plasticized PVC web material, (supplied by AEP/Borden or Huntsman). In one aspect, the tray EPS material can be produced with a surface finish that will not "cling" to the pPVC web material.

Plasticized web of stretch over wrap material is printed or plain material can be used. Partial coating of the inside web surface, with a low melt heat activated coating (HAC), can provide improved performance.

Referring now to FIG. 176, a detailed portion of the modification according to the present invention is shown. A first and second package (both denoted by reference numeral 5754) are shown enclosed in a tube of web material 5700. Web material 5700 is seen being clamped on the bottom and top sides thereof by an assembly designed to stretch, seal and cut web material 5700. A full width, lateral, impulse, heat sealing, element 5732 (e.g., cut from Inconnel, SS sheet or other "marine" grade, SS sheet material) is installed by attachment to a horizontally disposed rigid and suitably heat tolerant, non metallic base 5760. Compensation for normal expansion and contraction of the element 5732, during heating and cooling, can be provided. The element 5732 is covered with suitable material (such as PTFE) so as to provide a "non-stick" surface that will not "cling" to pPVC web. The heating and sealing element 5732 is in close, adjacent and parallel disposition to a full length strip of a portion of the outer surface of roller 5724, as shown in the sketch. When held together under suitable pressure with two webs of pPVC material located between element 5732 and roller 5724, a full length and hermetic seal between the two webs can be produced.

The heat sealing device may include a heat bank. Use of either impulse or heat bank devices may be determined by manufacturer preference. In the case of a heat bank device, the clamping bars 5739 and 5730 would be separated and insulated from the adjacent heating elements 5732 and 5741 and the clamping bars 5739 and 5730 would require independent, return spring mounting. A suitable distance or gap (to insulate and control the sealing/cutting devices), between the top surfaces of the clamping bars (5739 and 5730) and the top contact surface of the heat elements 5732 and 5741 would be required. This would allow clamping of the web(s) by the clamping bars 5739 and 5714 with subsequent web clamping, sealing and cutting by the heat elements 5732 and 5741. Rubber coated roller 5724 with cam/clutch bearing includes a heat resistant rubber coated and suitably ground, solid steel, hardened, rigid roller. Roller 5724 is located between two end plates and mounted thereto by bearing (one located at each end of the roller 5724'. The bearings are of identical dimensions with the "cam/clutch" feature suitably provided in only one bearing. Such arrangement allows the roller 5724 to rotate in a clockwise direction only as shown by the arrow in the sketch.

Heat sealing element 5732 is arranged to mirror image element 5741 and web clamping bar 5730 is arranged to mirror image web clamping bar 5739.

Rubber coated roller 5744 with cam/clutch bearing includes a heat resistant rubber coated, solid steel, hardened, rigid roller identical to roller 5724 but with a "cam/clutch" feature provided in one only bearing so as to allow roller 5744 to rotate in a counter clockwise direction only, as shown by an arrow in the sketch. The surface finish on both rollers 5744 and 5724 can be arranged so as to cling to web 5700 when contact occurs between suitably tensioned web 5700.

Two end plates ______ and ______ are arranged to rigidly retain rollers 5744 and 5724 in relative, respective, parallel and separated proximity, allowing the rollers to rotate as described above. Both end plates may be fitted with suitable coil or flat return springs to hold the rollers 5744 and 5724 in a normal position at a desired distance from bars 5730 and 5739 and heating elements 5732 and 5741.

A cam follower is mounted to each end plate so as to engage with cam tracks (not shown but mounted to main frame of FFS machine) arranged to provide a web sealing pressure to web 5700 by causing depression of end plate return springs.

The web stretching bar 5726 includes a strip of suitable material suitably profiled that may be provided with an outer surface treatment that can cling to pPVC web material. Web stretching bar 5726 is attached to at least one pneumatic cylinder (5746) that may include slotted fixture apertures to eliminate locking that may otherwise occur during operation. The web-stretching bar is shown in a withdrawn (closed) position and also in a fully extended position, by dotted lines. When in the closed position, the upper and highest edge of the bar extends along its full vertical length (the vertical length is orthogonal to the cross section in FIG. 176 and cannot be seen) and is in contact with web 5700. This contact is arranged so as to ensure a suitable tension is induced in the web 5700. The contact between bar 5726 and the web 5700 urges the web 5700 upward toward the rollers 5724 and 5744. The rotation of the rollers 5724 and 5744 urges the web toward the bar 5726. The cam/clutches installed in the rollers will not allow the web to be pulled away from the web-stretching bar. Web 5700 can be freely stretched but is essentially clamped by its tensioned and intimate contact with the surface of the rollers (5724 and 5744) and the upper edge of the web-stretching bar 5726.

The roller assembly, includes two sets of rollers, 6244 and 6224, endplates, cam followers, fasteners and return springs as required. When assembled the complete web stretching assembly in a normally closed position maintains a suitable gap between the rollers and the adjacent contact surfaces of items 5730 and 5732, thereby allowing free stretching of the web 5700, by activation of web-stretching bar 7526.

A pneumatic cylinder 5746 is shown, attached to the web-stretching bar 5726 to extend bar 5726 to the position shown by dotted lines and thereby stretch the web 5700. In one aspect, two cylinders would be provided. Compressed air flow and pressure controls can be arranged to activate cylinders so as to optimize induced tension in web 5700. Any suitable alternative method of web-stretching bar activation and control may be used.

A vacuum tube 5737 may be conveniently located so as to provide a method of removing scrap web material, for example, any excess material accumulation may be directed to a canister.

It may be desirable to mount each roller and clamping assembly on an independent pivotal mount. A roller and clamping assembly refers to roller 5724, clamp bar 5730 and heating element 5732 as one assembly and roller 5744, clamp bar 5739, and heating element 5741 as a second assembly. Each roller and clamping is generally held in a central position where the roller and clamping assemblies are in close proximity to one another by controlled return springs. Activation of the web-stretching bar 5726 may cause the two assemblies to move away from one another until each assembly contacts a package 5754. The roller and clamping assembly including roller 5724 will contact the package 5724 shown on the right side of FIG. 176 (i.e., the completed package) while the roller and clamping assembly including roller 5744 will contact the package 5754 shown on the left side of FIG. 176. Such an arrangement will provide consistent web stretching and a final web heat seal at a constant distance from the package. In this configuration, end plates would require slotting to accommodate outward movement of each roller and clamping assembly.

During operation the following events may occur. The packages 5754 move along a conveyor (not shown) until one is positioned on either side of the roller/clamping assemblies as shown in FIG. 176. Then pneumatic cylinders move the base 5760 forward toward the web 5700 located in the gap between the packages 5754. At this point, several options exist. In one embodiment, the clamp 5739 clamps the web 5700 against the roller 5744 tightly. However, the web is not clamped against roller 5724 by clamp 5730. Then the web stretching bar 5726 moves forward and stretched the web. In this manner, the web portion surrounding the package 5754 located on the side rear roller 5724 is stretched. Then the clamp 5730 is moved forward to clamp the web 5700 to the roller 5724. Next the heating elements 5732 and 5741 move forward and seal the web 5700 at points of contact between the heating elements and the web 5700. The heating may sever the web or cutters (not shown) may be included to sever the web 5700. The scrap portion of the web 5700 (i.e., the portion located between inside surfaces of heating elements 5732 and 5741) may be removed by vacuum tube 5737. Then the roller/clamping assemblies are retracted (moved out from between the packages 5754) and the conveyor indexes the left package to the right and a new package into the position previously occupied by the left package. The above cycle then repeats for each successive set of packages.

In another embodiment, after the pneumatic cylinders move the base 5760 forward toward the web 5700, the clamp 5739 does not clamp the web 5700 against roller 5744. Instead, the clamps 5739 and 5730 urge the web against the rollers 5744 and 5724 but do not clamp the web to the rollers. Then the web stretching bar 5726 moves forward as each roller and clamp assembly moves outward (i.e., toward the packages located on their respective sides of the web stretching bar 5726). After the roller and clamp assemblies have been stopped from further outward movement by contact with the packages 5754 and the web stretching bar 5726 has completed its forward movement, the clamps (5730 and 5739) and the heat sealing elements (5732 and 5741) move forward and clamp the web 5700 to the rollers (5724 and 5744). The heating elements then seal the web in the locations where the heating elements are in direct contact with the web 5700. Then the cycle completes in a similar manner to the cycle described above. The scrap web material is removed and the roller and clamping assemblies are withdrawn. Then the conveyor moves or indexes the package (as described above) and the cycle repeats.

Products, pre-filled with ground beef portions/blocks, are automatically loaded onto the entry end of the Hayssen FFS equipment. Orientation of the products may be in normal or inverted disposition. A normal disposition (with package “open top” side facing upward) would require a side fin or lap web seal, whereas an inverted disposition would require a bottom web seal. Normal operation would include longitudinal sealing after induction of maximum stretch in web 5700. Lateral sealing would occur after longitudinal stretching by web stretching bar 5726. Activation of the web-stretching bar would not commence until closure of the subsequent closing of the closest clamp to the rear portion of wheel. In this way, gradual stretching of the pPVC over wrap, during the wheel rotation, can occur until the desired level of stretch and/or tension is achieved when web heat sealing and simultaneous cutting could be provided immediately prior to ejection of the finished package(s). The finished packages could be ejected in a normal and upright disposition, assuming that the packages were loaded in an inverted disposition, alternatively, the packages could be inverted after ejection if the packaging had been loaded onto the RT1800 packaging machine in a normally upright position.

By incorporating the above described modification in the Hayssen RT 1800 packaging machine a web stretching arrangement is provided to stretch the over wrap material 5700 during the normal rotation of the die wheel. It is anticipated that, in view of the rapid heat sealing and cooling characteristics of thin gauge (0.0008") pPVC, the operational speed of the Hayssen RT 1800 could be increased to more than 1800 feet per minute.

3.6.2.2. Embodiment

Referring now to FIG. 177, a cross section through an assembly substantially similar to the device described in association with FIG. 176 herein above is shown but having some differences as described below. A base 5812 is attached to profiled bar 5819 with upper assembly, comprising rollers 5860 and 5865 retained by bar 5820 in clamping position. Two package trays 5867 and 5861 are shown with clamped assembly there between. Heat seal bar 5818 and clamp 5817 assembly is mounted to a pneumatic piston and cylinder 5863 with web 5810 stretched there across and tensioned with web section 5868 stretched over roller 5865. An aperture 5869 is provided in web section 5810 and an enclosed space 5821 is contained within the assembly and substantially sealed and separated from the surrounding atmosphere 5822. A port 5862 is provided in profiled bar 5819 and in communication with space 5821. A vacuum applied to port 5862 can therefore lower the pressure in space 5821 which is in direct communication with space 5823 through aperture 5869. In this way, gas in space 5823 can be extracted thus lowering gas pressure in the space and causing web 5868 and 5810 to collapse toward the tray 5861 and therefore by controlling the level of vacuum applied to space 5821 through port 5862 the amount of gas in space 5823 can be adjusted to any desired level prior to sealing web section 5868 to web section 5810 at a strip along the roller 5865 and bar 5863. In this way, the web section 5868 can be sealed to web section 5810 after the gas pressure in space 5823 has been adjusted to a desired level.

3.6.2.3. Embodiment

Referring now to FIG. 178, a schematic, side elevation view of a web stretching and sealing sub-assembly, that can be installed into a horizontal, form, fill and seal packaging machine, such as an Integra Flowpak, is shown. A continuously formed tube 5902 of stretch material is provided in a horizontal disposition with loaded trays such as 5900 and 5901 enclosed therein. Tube 5902 may be formed by lap or fin sealing together the edges of a flat web of material such as pPVC or a suitable stretch PE web of material and with a thickness of less than about 0.001". Conveyors 5903 and 5904 carry tube 5902 in the direction shown by arrows 5935 and 5936. A space 5937 is, provided between the ends of conveyors 5903 and 5904 to allow lower sealing assembly 5906 to be elevated there between and to mate, as required with upper sealing assembly 5905 that can be lowered accordingly and as required to mate with the opposing lower assembly 5906. Assembly 5906 is arranged with two outer clamping bars 5907 and 5915 that are in line and adjacent to correspondingly opposing clamping bars 5907 and 5915 attached to assembly 5905. All clamping bars 5907, 5915, 5908 and 5916 are mounted in such a manner that they can be independently activated by moving means such as pneumatic cylinders or other suitable drives, in a vertical reciprocating action and thereby clamp web 5902 as required between the corresponding opposing clamps. Heat banks 5909 and 5913 are mounted on assembly 5906 with independent driving means, such as pneumatic cylinders or other suitable drives. Two rollers 5918 and 5919 can be mounted to lower assembly 5906, via cam clutch bearings such that roller 5918 can rotate in a clockwise direction only as shown, by arrow 5938 and roller 5919 can rotate in a counter clockwise direction only as shown by arrow 4939. A vacuum tube 5912 is mounted to lower assembly 5906 and is arranged to provide a means of removing excess web material that is severed from the web 5902 during operation of the apparatus. Heat banks 5910 and 5914 are mounted to assembly 5905 in such a manner as to correspondingly oppose heat banks 5909 and 5913 respectively on assembly 5906, and in such a manner that sides of web tube 5902 can be sealed together along a traverse sealing strip, at the contact point between heat bank 5909 and 5910 and heat bank 5914 and 5913. The sealing strip in tube 5902 provided by each correspondingly opposing set of heat banks can be arranged to completely seal across the full width of the tube 5902 in a hermetically or liquid tight manner. A web stretching bar 5911 is mounted centrally to upper assembly 5905 and is attached to a driving mechanism that can independently extend and retract the stretching bar 5911 in a vertical reciprocating motion, as required. Lateral knives 5940 and 5941 can be mounted as shown and independently activated by driving mechanisms so as to provide a web cutting feature as may be required.

Referring now to FIG. 179, upper assembly 5905 has been lowered between packages 5900 and 5901 and lower assembly 5906 has been elevated so as to compress tube 5902 in a clamping motion. In one aspect, packages may be concaved at an end that is to receive compressive forces. Referring now to FIG. 180, upper assembly 5905 and lower assembly 5906 are closed and clamps 5907 and 5908 are firmly clamping web 5902 in such a manner so as to hold it firmly and stationary. Opposing clamps 5915 and 5916, however, have been closed toward each other so as to depress walls of web 5902 toward each other but not to contact and clamp together. Web stretching bar 5911 has been activated so as to stretch the central portion of web 5902 and in this way tension is induced into the web section, therefore pulling web 5902 from between the point of clamping by clamps 5907 and 5908 to the seal 5917, located at an opposite end of package 5901. In this manner, the web tube 5902 is stretched laterally from the seal 5917 around package 5901. Clamps 5915 and 5916 react against the tendency of tray 5901 to be drawn toward the stretching bar 5911, holding it firmly against the stretching action of bar 5911 and in this way, web 5902 can be stretched. Referring now to FIG. 181, correspondingly opposing clamps 5907 and 5908 are held closed and correspondingly opposing clamps 5915 and 5916 are also held closed so as to firmly clamp web 5902 there between. Similarly correspondingly opposing heat banks 5910 and 5909 are closed and correspondingly opposing heat banks 5913 and 5914 are also closed so as to heat seal web 5902 along strip seals between each pair of heat banks. At this time, web 5902 will be severed along the outer edges of both seal strips which are closest to the stretch bar 5911 at 5991 and 5993. A vacuum source, attached to tube 5902 can be applied to remove scrap section 5992. Referring now to FIG. 182, it can be seen that the opposing assemblies 5905 and 5906 have been retracted away from each other and finished package 5901 has been sealed at 5993. It can be seen that a mechanical stretching of web 5902 can be provided without the need to use the more expensive method of heat shrinking a costly heat shrinkable web material.

3.7. Tray Folding and Bonding

One aspect of the invention is to provide methods and apparatus for folding and bonding tray flaps under conditions of reduced oxygen. Tray folding and bonding apparatus may be incorporated in an enclosed packaging conduit as herein provided.

3.7.1 Embodiment

Referring now to FIG. 183, a cross section through a tray assembly apparatus 6001 arranged to fold and bond pre-forms in an enclosed chamber is shown, such as the one shown in FIG. 10. FIG. 183 is divided into two views. A left side view shows the apparatus in a closed position, while the right side view shows the apparatus in an open position. In this manner, the operation of the device is better understood. The apparatus 6001 is rigidly constructed from suitable materials wherein a base frame 6014 is connected to a platen 6016. Base frame 6014 and platen 6016 can be securely connected together by any suitable means that may include a quick release arrangement so as to allow the rapid separation of the two components. In one embodiment, several similar assembly fixtures can be attached to a horizontally disposed continuous conveyor and arranged to operate automatically as a complete machine and this will be generally described in a later part of this disclosure. Platen 6016 is securely attached to a profiled fixture 6012, which is shaped to correspond with the internal cavity surface profile of a pre-form such as these disclosed in previous sections. A pre-form 6020 is shown in position and mated with fixture 6012. Part 6018 is hinged at 6011 and part 6006 is hinged at 6010. Parts 6018 and 6006 are arranged to dimensionally correspond to the flaps of pre-form 6020, and can be attached to a suitable driving arrangement such as pneumatic cylinders that will drive each part to close in a sequence as required. Part 6018 is shown in an open disposition whereas part 6006 is shown in a closed position and firmly holding a flap of pre-form 6020 against a wall thereof. A source of vacuum may be attached to fixture 6012 or single chamber (6004 and 6002) so as to assist in securely holding the pre-form in place during folding and bonding of flaps. After flaps have been bonded into position the vacuum may be released to allow easy removal of the folded and bonded tray. Additional hinged parts (not shown), similar to 6018 and 6006, may be attached to other sides to fixture 6012 as may be required to correspond with additional flaps that may be attached via hinges to pre-form 6020 on any side thereof. Hinged parts 6018 and 6006 and any others can be arranged to fold flaps against the side walls of pre-form 6020 and to hold flaps securely during bonding of flaps to correspondingly adjacent side walls.

A single chamber is shown in two parts, 6002 and 6004, that can be opened and closed as required to allow pre-forms such as 6020 to be located on fixture 6012 and sequentially unloaded by any suitable means in an automated and continuous process. The single chamber (6002 and 6004) is attached to a shaft 6000, which in turn is attached to a drive such as a pneumatic cylinder, which can provide alternating opening and closing of the chamber. Ports can be provided in the single chamber with valves arranged to allow any suitable gas at any suitable pressure therein and connection to a suitable source of vacuum. The single chamber can be arranged to close over fixture 6012 after locating a pre-form 6020 thereon and a seal, such as 'O' ring 6022, can be installed along the contacting face between the single chamber (6002 and 6022) and platen 6016. In this way, an enclosed and substantially gas tight space 6008 can be provided. Prior to closing the single chamber against platen 6016, hinged parts 6018 and 6006 can be activated by driving air driven cylinders. After closing the single chamber, space 6008 can be substantially filled with any suitable gas at any suitable pressure via valves and ports (not shown) and to ensure that cavities between flaps and cavity walls are filled with the selected gas and thereby substantially excluding atmospheric oxygen. Hinged parts 6018 and 6006 can be arranged to carry any suitable sealing mechanism, such as RF welding and arranged to bond flaps to side walls of pre-form 6020 directly. In this way, cavities between the flaps and walls described in other sections above can be filled with any suitable gas at any suitable pressure. In summary, a sequence of apparatus operation can be as follows:

A. Provide a pre-form 6020, locate on fixture 6012, and apply a vacuum source to hold the pre-form securely to fixture 6012.

B. Apply any suitable adhesive to selected surfaces of flaps of pre-form and fold hinged parts such as 6018 and 6006 so as to fold and close flaps against the side walls of the pre-form. [Hinged parts 6018 and 6006 may be arranged with a means to partially close and thereby allow substantially complete evacuation of air or gas therefrom prior to bonding].

C. Close single chamber over pre-form and seal chamber against platen 6016.

D. Evacuate space 6008 and provide any suitable gas at any suitable pressure therein.

E. Seal flaps to side walls of pre-form 6020.

F. Open chamber and allow removal of pre-form with flaps bonded to side walls.

Referring again to FIG. 183, assembly apparatus detailed therein can be arranged in groups wherein each assembly fixture is attached, via quick release connection, to a pair of parallel horizontally disposed, continuous chains, with a driving motor such as a servo electric motor, horizontally disposed to provide a conveyor. In this way a complete machine can be arranged with the upper section thereof, enclosed and a suitable gas provided in enclosure, such that when pre-forms are located on fixtures (6012), if so desired, the gas in contact with pre-forms is oxygen free. The apparatus herein described can be used in one or more of the disclosed system apparatus for the packaging of perishable goods, such as beef.

3.7.2. Embodiment

In one embodiment of the present invention, the trays with flaps are (invariably) thermoformed at a remote location, relative to the point of tray flap folding and bonding, loading and sealing. The trays with flaps are suitably "nestable", meaning that the tray cavity of one tray can come to rest inside of an adjacent tray prior to bonding. In this manner, they can be conveniently nested together to occupy relatively less volume. After folding and bonding, the trays are no longer considered "nestable", but are considered "stackable", and in this condition occupy a volume that is greatly increased as compared to the nested tray pre-forms.

One aspect of trays made in accordance with the invention are that they can be single component, thermoformed trays to facilitate de-nesting and assembly at the point of folding, bonding, utilizing modified tray/carton assembly equipment. To this end, FIG. 184 shows a plan view of an apparatus arranged to de-nest and orient pre formed trays with flaps onto fixtures, then fold and bond flaps within an enclosed conduit containing a selected gas. FIG. 185 shows a side elevation of the apparatus shown in plan view in FIG. 184. Four magazines shown as 6101, are arranged in vertical disposition such that trays with flaps can be automatically withdrawn from the lower end of each magazine. De-nest apparatus 6108 de-nests pre-formed trays and transfers directly onto fixtures 6102, attached to a continuously, or intermittently moving continuous horizontally disposed conveyor 6103. Enclosure 6104 is arranged to encapsulate the apparatus and is filled with pressurized selected gas 6105.

Fixtures 6102 are arranged such that an adhesive can be applied to a surface of two opposing flaps 6106 on each pre form. After application of glue, the two opposing flaps are folded and bonded to the vertically disposed walls and or base of the tray 6107. The fixture is then rotated through 90 degrees 6109 and in a subsequent operation, adhesive is applied to the remaining pair of flaps 6110, which are then also folded and bonded to the vertically disposed side walls or base of the tray 6111. Trays, having been folded and bonded as herein above described, may then be transferred onto a conveyor. The apparatus disclosed herein in association with FIGS. 184 and 185, is arranged to operate at a production rate of 100 to 120 trays per minute, in one instance. However, other rates below or above what are herein described are possible, that mentioned being only exemplary of one particular embodiment of the invention. Fixtures shown as 6102, are readily interchanged for other fixtures that correspond with trays of different specified dimensions. The apparatus is arranged to ensure that gas that becomes enclosed between the outer vertical walls of the finished tray, and the inner vertically disposed walls of the tray cavity, is assured of being the selected gas as provided in the enclosure 6104.

3.7.3. Embodiment

Referring now to FIG. 186, a cross section through a tray assembly fixture arranged to fold and bond pre-forms in an enclosed chamber is diagrammatically shown. Only one view of the assembly apparatus is shown which is rigidly constructed from suitable materials. A chamber 6281 is arranged to enclose a stack 6233 of preformed trays with flaps at a suitable angle such that single trays with flaps can be removed from the lower end of the stack, by any suitable means, such as suction cups 6235, attached to frame 6226. Such a tray preform stack 6233 may be held, for instance, in a magazine. Frame 6226 is in turn attached to a mechanism that can repeatedly present the suction cups in contact with portions of the tray, remove each tray from the bottom of the stack and place in an inverted position on upper end of frame 6236. An adhesive extruding nozzle 6283 is mounted to the end of tubular shaft 6282, which in turn is attached to a robot that can move nozzle 6283 according to a predetermined path, and apply an adhesive 6212 to the portions of tray 6237. A fixture 6211 is attached to shaft 6210, that is in turn attached to a driving means (not shown) that will drive fixture 6211 upwardly and downwardly in the directions shown by arrow 6289, as required. A port 6230 is provided and any suitable gas such as carbon dioxide or nitrogen is provided by injection through port 6230 in the direction shown by arrow 6229, and in such a way that will substantially displace all atmospheric air or any undesirable gas from space 6227. Nozzles 6286 and 6285 are also provided to facilitate injection of any suitable gas in the direction shown by arrows 6288 and 6287.

It can be seen that a preformed tray withdrawn from the lower end of tray stack 6233 (magazine), is placed at the upper end of frame 6236. Adhesive 6212 is applied to portions of tray 6237 with flaps 6215, 6214, 6213 and a fourth flap not shown. After application of adhesive 6212 nozzle 6283 is withdrawn so as to allow fixture 6211 to move downwardly and in such a manner that will push tray 6237 downwardly into frame 6236 and in so doing, cause flaps 6215 and 6213 to fold toward the walls of tray 6237. This occurs because frame 6236 includes two sets of angled portions. A first set has portions 6219 and 6220 arranged opposite of each other. A second set of angled portions 6228 and a second portion (not shown) corresponding to angled portion 6228 is arranged opposite of angled portion 6228. The first set 6219 and 6220 is arranged on an upper end of frame 6236 and the second set is arranged to have angled portions spaced from the first set of angled portions 6219 and 6220. Angled portions 6219 and 6220 of frame 6236 are suitably angled to cause folding of flaps 6215 and 6213 as tray preform 6237 moves downwardly in frame 6236. The second set of angled portions 6228 now engages flaps 6214 and a flap opposite of flap 6214. This process causes the tray to descend in the direction of the arrows shown at 6222 and 6221. It should be apparent that any number of angled portions may be provided in a frame similar to 6236, and furthermore that it is not necessary to have angled portions in sets opposite of each other. The frame 6236 of FIG. 186 is exemplary of one embodiment of the present invention. Other embodiments may have angled portions that incrementally decrease in height so as to sequentially bond flaps to tray. Fixture 6211 is withdrawn in an upwardly direction to allow another tray with flaps to be positioned on frame 6236, and to be held precisely in position so as to allow adhesive application via nozzle 6283. In this way, as folded and bonded trays are sequentially pushed downwardly by fixture 6211, a stack of trays 6216, 6217 and 6218, with folded flaps bonded there together, gradually progresses through frame 6236. The vertically disposed sides of frame 6236 are arranged to apply suitable pressure onto the flaps of each tray. Angled portions 6219, 6220 and 6228 are arranged such that a first pair of opposing flaps are folded immediately prior and slightly before the alternate pair of flaps are folded, so as to allow overlapping of flaps at each corner of rectangular tray. In this way trays can be folded and bonded in a continuous fashion, and ejected from the lower end of frame 6236. A plurality of such tray folding and bonding assemblies, can be arranged together and thereby provide a tray production capacity as may be required.

3.8. Adhesives

Referring now to FIGS. 187–189 three cross-sectional views of selected sections of EPS trays with flaps are detailed. FIG. 187 shows a section of a tray with a flap 6302 attached at a hinge 6304 and where the flap is “open” and not folded so as to be in contact with tray. FIG. 188 shows a flap 6302 folded into a finished position and contacting tray.

Referring now to FIG. 188, flap 6302 can be formed with a recess 6320 that is in contact with the tray. The recess 6320 can be a arranged to be a continuous recess that follows a path close to the perimeter of the flap. The tray can be arranged to have a ridge 6308 that follows a path corresponding to the recess 6320 such that when the flap is folded about the hinge so as to intimately contact the tray wall and base, the ridge 6308 will mate with the recess 6320, as shown in enlarged view of FIG. 189. Accordingly, the flaps with heat activated adhesive 6316 applied in recesses 6320 can be folded, as shown in FIG. 188, so as to cause intimate contact with the tray base 6312 and/or walls 6314 thereby providing a tray with folded flaps. The tray with folded flaps can be held in such a folded condition so as to hold ridges 6308 firmly against adhesive 6316 and in continuous contact along the full length of the ridge 6308 and recess 6320. The tray with folded flaps can be transferred automatically into and through a microwave oven source of heat such that adhesive 6316 is activated by exposure to a suitable level of microwave heat source and thereby bond the flap and tray together at ridge 6308 and recess 6320. The bond can be arranged along a continuous path and enclose the space between the flaps and the tray so as to provide a substantially liquid tight seal. Selective heating of adhesive 6316 can be provided by microwave or magnetic field devices so as to cause bonding without application of excessive heat that could otherwise cause undesirable distortion to the EPS tray. Any suitable heat activated adhesive may be provided by any suitable device. In another embodiment, the heat activated adhesive may be provided in the recess 6360 by computer controlled robots such as in the form of a heated and softened continuous extruded bead that may be subsequently heated so as to provide good bonding in the recess, followed by cooling thereof to provide hardening of the heat activated adhesive. Heat activated adhesives may be applied to the tray with flaps or any other suitable packaging materials by any suitable method prior to bonding. Subsequent exposure to microwave or other suitable source of heating, that can be selectively applied in such a manner so as not to cause undesirable damage or distortion to the packaging materials, can produce a package according to the present invention. One suitable device for adhesive application to selected surfaces of packaging may be provided by the known process of ink jet printing.

3.8.1 Embodiment

Referring now to FIGS. 190–192, an apparatus constructed according to the present invention that can be used to apply substances to the surface of packaging materials, such as EPS trays, for bonding thereto is shown.

In FIG. 190, a cross-sectional view through a diagrammatically represented apparatus is shown where a horizontally disposed motor driven conveyor 6400, can be intermittently indexed by driving a set distance. Magnets 6402 can be located at desired positions along the conveyor 6400. Conveyor 6400 is adapted to receive a web 6404, wherein the web has a plurality of tray impressions formed thereon. The web of tray impressions can be arranged to mate with the conveyor 6400 and can thereby be carried by the conveyor 6400. The distance traveled by the conveyor in each movement or index is equal and can be arranged so as to carry a single tray impression a distance equal to the machine direction length of each consecutive tray impression. Such an arrangement can therefore position each tray impression adjacent to a station or processing device for a desired period of time followed by further movement of the tray impression to a subsequent station to allow further processing. FIG. 190 shows a first, second, and third station which are marked 6406, 6408 and 6410, respectively. First station 6406 is arranged to apply an adhesive 6414 by a nozzle spray device 6412 to an exposed surface of the tray impressions. Second station 6408 is arranged to dispense iron powder 6410 or other suitable substance from a conveniently located hopper 6418 with valve 6420, directly above an exposed surface of a tray impression that has had adhesive applied thereto. Magnets 6402 which may be arranged as permanent or as electrically induced (electromagnets) magnets, are conveniently located in the conveyor such that when iron powder 6416 is dispensed from hopper 6418, it will be attracted toward the magnets 6402 and be deposited in a pattern on the exposed surface of the tray impressions. The pattern of iron powder deposits can be determined by the profile/shape of the magnets 6402 which can be adjusted as required to provide a suitable pattern. The iron powder 6416 is bonded to the tray impression 6424 by adhesive 6414. Third station 6410 can be arranged to provide drying or curing, such as with a radiant heater 6422, to the adhesive sprayed and tray impressions 6424 and thereby cause setting and/or drying of the adhesive applied at the first station 6406 with iron powder 6416 thereto. The iron powder applied at second station 6408 can thereby be suitably bonded to the tray impression 6424. Additional stations may be arranged, adjacent to the conveyor 6400 so as to apply additional layers of adhesive and/or additional substances as may be required or desired.

A further aspect of this invention includes a vacuum plate 6428 connected to the source of iron particles. For example, vacuum plate 6428 could be attached to the valve 6420. Referring now to FIG. 191, a cross-sectional view through a section of a diagrammatically represented apparatus is detailed and showing a profiled vacuum plate mating with a section of an EPS tray that is located between a manifold 6426 and a vacuum plate 6428. Manifold 6426 and the vacuum plate 6428 can be attached to moving devices such as pneumatic cylinders that can be operated as desired to move the vacuum plate and the manifold toward and away from each other in an automated cycling and repetitive sequence. The vacuum plate 6428 and the manifold 6426 can be closed together so as to conveniently clamp an EPS tray 6446 (or other material) therebetween for a period of time.

The EPS tray 6446 can be arranged with perforations 6430 therein. The perforations 6430 can be located in a recess shown as 6432 in the enlarged view in FIG. 192. The vacuum plate 6428 can be provided with vacuum ports 6434 therein and located so as to provide connection between the under surface of EPS tray 6446 and a suitable vacuum source designated by arrow 6436. In this fashion, a vacuum source can be applied to the under surface of the EPS tray with communication through the perforations 6430. The manifold can be provided and arranged with suitable openings that connect selected exposed sections, such as sections 6440 and 6442, on the exposed surface of the tray to a source of powdered substances. In this way, powdered substances such as heat activated adhesives, can be provided into the manifold openings and by applying a vacuum source to the underside of the tray, the powdered substances can be deposited onto the exposed surfaces of the tray and/or in recesses such as recess 6432. After the powder 6414 has been deposited into the recesses 6432, the manifold 6426 and vacuum plate 6428 can be opened pneumatically allowing the EPS tray to be removed therefrom and subsequently passed into and through a suitable heat and/or suitable energy source, such as a microwave oven. The powder 6416 can be arranged to contain substances, such as water or suitable metal elements, so that when the tray with powder 6416 is exposed to a microwave, magnetic field or other suitable source of heating energy, the powder will be heat activated and bond together and to the surface of the tray and in the recess 6432. The powder 6416 can thereby be securely bonded to the EPS tray 6446 at selected locations on the exposed surfaces of the EPS tray. This method of using a magnetic field, microwave or other suitable source of heating energy can selectively heat the powder 6416 without application of excessive heat to the EPS tray. Powder application apparatus including the vacuum plate and the manifold material clamping devices with all required driving and controlling apparatus can be integrated into a typical thermoforming equipment, such as an Irwin Magnum or a Commodore 730–12 MM continuous thermoformer (as manufactured by Commodore Machine Company of Bloomfield, N.Y.). The disclosed powder application with selective microwave heating of the powder 6416 can be located between a thermoforming station and a trim press of the thermoforming equipment. In this way, a heat activated adhesive can be applied to specific locations of any suitable material such as the flaps and/or tray walls of EPS trays such as a tray with flaps described above.

One aspect of the invention is the inclusion of particles that deplete substantially any residual oxygen that remains within enclosed packages. Such particles can be incorporated with the spaces of trays or in master containers. According to the present invention, air and gases can be removed from a finished and sealed package by evacuation and then replaced by gas flushing with a desired gas, while liquids such as blood cannot readily escape. Furthermore, gases can readily flow through the communicating passage from inside to the outside of the package (but still inside the master container) to enable rapid equilibrium of gases when oxygen gas is released by reduction of oxymyoglobin after sealing of the master container. In the eventuality that any residual oxygen remain present in the sealed master container, the oxygen can be readily absorbed by the oxidizing iron particles after activation with the electromagnetic field, causing release of water or other suitable substances and direct contact with the iron particles.

3.8.2. Embodiment

Referring now to FIG. 193, a further aspect of the present invention provides an apparatus to apply adhesive materials and powdered iron, or other desirable substances, to a web of material, such as stretch or shrink wrapping materials, is shown.

The description disclosed herein provides details of a method and apparatus for producing stretch or shrink wrapping material that can be used in the production of those packages disclosed above, having an outer cover web material. The stretch or shrink wrapping material with powdered iron attached thereto absorbs any residual oxygen that may be present within the master container and also the cell structure of EPS materials used in the production of the finished package.

The apparatus shown in FIG. 193 includes a series of rollers, a hopper containing powdered iron, a tray containing solvent based adhesive, an oven and a continuous web of outer cover material 6500 that is arranged to follow a path over rollers, through oven and onto a web winder assembly as shown. The sketch includes a cross-section through the apparatus.

A suitable tension is applied to web outer cover material 6500 which is arranged to follow a path over idler roller 6502 and then to contact imprint roller 6504, and then over the roller 6506, followed by being directed between oven segments 6508 and onto a roll 6510 at a web winder assembly 6512. Web 6500 is wound onto roll 6510 by web winder assembly 6512 at a suitable tension and speed. In this manner, imprint roller 6504 is arranged to apply a suitable adhesive, which may be solvent based, onto web 6500 in a registered print pattern and in rectangular areas 6514 as shown in FIG. 195 where a section of finished web material 6516 is detailed in plan view, with a cross-sectional view shown in FIG. 194, after processing through the apparatus shown in FIG. 193.

The method includes transferring the adhesive 6518 from the tray 6520 via contact with roller 6522 which in turn transfers the adhesive to transfer roller 6524 which in turn transfers the adhesive onto the imprint roller 6504, which makes contact with the web 6500, thereby transferring the adhesive 6518 to the web 6500. Transfer of the adhesive from the transfer roller 6524 to imprint roller 6504 occurs only at selected areas on the roller 6504 that correspond with the rectangular areas 6514 such that areas 6514 only are imprinted with the adhesive applied thereto and leaving other sections of the web 6500 free of adhesive. The outer cover web material 6500 can be printed with information and graphics as required on the side of the web opposite to the applied solvent based adhesive and in registered relationship to the rectangular areas 6514, such that when the web 6500 is cut by slitting along the length of the outer cover web, and wound conveniently onto rolls, the web 6500 can be applied, in an earlier described manner to cover the finished packages and with the rectangular area 6514 adjacent to and in direct contact with the base of trays.

Referring again to FIG. 193, powdered iron 6523 is dispensed from the hopper 6522 evenly across the web, so as to fall directly downward toward web 6500 above roller 6506. Roller 6506 includes a tube manufactured from a non-metallic material, such as fiberglass, and is cylindrically ground on both internal and external surfaces to provide a finished tube of specified internal and external diameters. External diameter is arranged so as to have a circumference equal to two (×3 across the web) consecutive imprints (6 imprints in total) of rectangular areas 6514 per single revolution of the roller 6506. Correspondingly, during a single, full revolution of the roller 6506, 2 times 3 imprints (6) are applied to the web 6500. Corresponding to the imprint areas 6514, magnets 6505 are located and fixed to the internal surfaces of roller 6506 in a pattern that corresponds with the rectangular areas 6514 in positions such that when the powdered iron is dispensed from the hopper it is drawn by the magnets so as to be deposited substantially within the specified rectangular areas 6514. When the powdered iron contacts the areas 6514, on the web 6500, the powdered iron bonds to the solvent based adhesive applied by imprint roller 6504. The powdered iron thereby becomes fixed to the web 6500 by adhering to the solvent based adhesive. The web 6500 then passes between the oven segments 6508 that are arranged to have sufficient capacity to cure and dry the solvent based adhesive prior to further processing and/or winding of web 6500 onto the roll 6510 by web winder assembly 6512.

Web 6500 may be further processed by applying solvent based adhesive onto rectangular areas 6514 after the powdered iron has been applied and cured together therewith by passing through the oven segments. This process may be repeated several times and as may be required to produce the most effective finished outer cover web materials.

In yet another embodiment, other web materials such as perforated polyethylene and polyester may be laminated to web 6500 and over the powdered iron. In some instances, the powdered iron will thereby be applied and retained between the outer cover web 6500 and the polyethylene and/or polyester webs in such a manner so as to allow oxygen to transmit through the outer webs and contact the powdered iron and after reacting therewith, inhibiting the escape of any odor that may be produced as a result of oxygen reacting with the powdered iron, and/or other substances contained therein. Solvent based adhesive can also allow transmission of oxygen therethrough while inhibiting transmission of odors therethrough.

Alternative oxygen absorbing materials that are suitable for the application may be applied with the iron powder or in place thereof.

The finished web material 6516 can be slit and wound onto conveniently sized rolls for subsequent use as the outer cover of packages similar to the finished packages described above.

3.9. Gas Exchange

One aspect of the invention is the production of trays with thermoforming apparatus that provides reduced oxygen content trays. This is accomplished by thermoforming in a reduced oxygen environment, and in some instances can include a method of gas exchange, whereby any oxygen gas contained within the cells of foam is exchanged with a suitable gas other than oxygen. In this manner, the oxygen is prevented from contact with the perishable goods.

Referring now to FIGS. 196–204, cross-sectional and enlarged views of expanded polystyrene (EPS) foam sheet are shown, wherein FIG. 196 shows a cross-section through a portion of co-extruded EPS foam including three layers 6600, 6602 and 6604. FIG. 197 shows a cross-section through a portion of extruded EPS foam sheet including three layers 6606, 6608 and 6610 and wherein layers 6606 and 6610 include a "skin" layer similar to the section shown in FIG. 200. In one embodiment, such structures make suitable materials to use in the production of trays disclosed herein.

Referring first to FIG. 196, outer layers 6600 and 6604 sandwich an inner layer 6602. Outer layers 6600 and 6604 include closed cell EPS foam as shown in FIG. 199. "Closed cell" EPS foam describes a physical condition where the cells or bubbles, that are filled with gas, generally include enclosed spherical spaces where the cell, bubble or sphere is not fractured and therefore any gas contained therein can enter or exit the spheres by diffusion through the spherical wall only and not through fractures or openings in the sphere wall. FIG. 199 shows a grouping of cells or bubbles that contain a gas which may be air. Layer 6602 includes a layer of open celled EPS foam as shown in FIG. 202. "Open cell" EPS foam is a physical condition where most cells or bubbles are fractured and allow gas and other matter to invade the internal space of the open cells readily. Production of open cell EPS foam can be effected by introducing contaminants into the polystyrene melt prior to foaming. The contaminants may include a surfactant to enhance liquid absorbing properties, which can cause fractures in the cell walls to appear. Closed cell EPS foam is produced by ensuring that there are no contaminants in the polystyrene melt prior to foaming. Closed cell foam generally provides a more mechanically stable and rigid structure than does open cell foam. Therefore in order to produce a more mechanically stable and rigid packaging tray, closed cell polystyrene can be used as a construction material. However, closed cell EPS foam resists absorbing liquids such as blood, water and purge. In order to produce an EPS foam packaging material that has both liquid absorbing and structurally sound properties use of a combination of both types of open and closed cell foam is provided. In one embodiment, a tray material would include three layers of co-extruded multi-layer foam sheet where layers 6600 and 6604 include closed cell EPS foam and layer 6602 includes open cell EPS foam. However, an alternate embodiment is to use closed cell foam for the center layer and open cell foam for the exterior layers, or any combination thereof. It is also possible to have less than three layers shown, or in some instances four or more layers of either closed cell or open cell foam can be used.

Referring now to FIG. 197, a cross-section through one embodiment of a material useful for making trays disclosed herein is shown where the material includes two outer layers 6606 and 6610 and a center layer 6608. Layers 6606 and 6610 are similar and include a skin that can be induced by exposing a mono extruded layer of EPS foam, before the foam has cooled and solidified, to relatively cool air applied thereto under regulated pressure. By applying the regulated compressed air in this way, a skin can be formed by deflating the open or closed cell structure at one or both surfaces of the EPS sheet. The layer 6608 includes a layer of open cell EPS foam. The layers 6606 and 6610 can be closed cell EPS foam with an additional skin formed thereon as described above. However, an alternate embodiment is to use closed cell foam for the center layer and open cell foam for the exterior layers, or any combination thereof. It is also possible to have less than three layers shown, or in some instances four or more layers of either closed cell or open cell foam can be used.

Without being bound be theory, gas exchange in foamed EPS can proceed under the following conditions. Referring now to FIG. 198, the closed cells are shown schematically, as being exposed to gas pressure, designated by arrows, that is higher than gas pressure inside the closed cells. The enlarged view of a single closed cell in FIG. 204 shows a pressure differential where P equals the external gas pressure and P1 is the closed cell internal gas pressure. FIG. 201 shows a grouping of closed cell EPS foam cells where the internal pressure P1 is greater than the external gas pressure P, and therefore exerts a force on the interior of the cell walls. An exterior pressure greater than the interior pressure causes gas exchange by diffusion of the exterior gas through the cell walls and into the interior of the cell. Whereas, an interior pressure greater than the exterior pressure causes diffusion of the gas within the interior cell to diffuse through the cell wall to the exterior atmosphere. Referring now to FIG. 203, an open cell of EPS foam is shown in enlarged detail. As is apparent, because of the ruptured cell wall, the internal pressure of the cell is substantially the same as the external pressure P. In this case, gas exchange occurs more rapidly by transfer through the rupture, and diffusion through the cell wall can be negligible.

The present invention provides a method to substantially remove oxygen gas that may be retained within the cell structure of the EPS foam packaging materials and to also reduce the amount of oxygen and/or slow the rate at which oxygen may re-enter the cell structure after removal from storage and processing in a suitable gas. The following steps disclose a method that can be used to achieve this condition. Any or all of the following steps may be effected in the sequence shown or any other sequence that enhances the most efficient and rapid removal of undesirable gases, including oxygen, from the structure of the packaging materials. In one aspect of the invention a quantity of EPS foam packaging materials, such as trays with flaps, are placed in a gas tight and sealed pressure chamber, with evacuation and gassing ports therein and valves attached so as to allow evacuation and gassing, with suitable gas, of the pressure chamber as desired. According to the present invention, a vacuum is provided inside the pressure chamber by lowering gas pressure therein, and maintaining the pressure for a period of time so as to enhance the removal of oxygen from the structure of the packaging materials in a desired manner. According to the present invention a suitable gas is introduced into the pressure chamber at an initial selected and suitable pressure that may be below ambient atmospheric pressure. The gas pressure is maintained for a period of time that enhances the removal of oxygen from the structure of the packaging materials in a desired or optimized manner. According to the present invention, the pressure of the suitable gas is progressively increased in the pressure chamber, in a continuous or intermittent manner, over time, until the gas pressure is above atmospheric pressure. The gas pressure is maintained for a period of time that enhances the removal of oxygen from the structure of the packaging materials in a desired or optimized manner.

In one aspect, by using heating and/or cooling apparatus, the temperature of the packaging materials can be maintained at a temperature that enhances the removal of oxygen from the structure of the packaging materials in a desired or optimized manner.

During the process described above, gas exchange takes place which replaces any undesirable gas, such as oxygen from the interior of the cell with a suitable gas, such as carbon dioxide. According to the invention, the packaging materials are removed from the pressure chamber and allowed to physically expand as can occur due to a higher relative gas pressure that may exist in the closed cell structure of the EPS packaging materials in comparison to the ambient atmospheric pressure. The packages are maintained at a suitable temperature for a suitable period of time, after removal from the pressure chamber.

The steps disclosed above may be repeated, sequentially or otherwise and in a manner that provides an efficient process to remove undesirable gases from the structure of the packaging materials and to enhance the expansion of the packaging materials in a desired manner. In this way, undesirable gas, such as oxygen gas can be removed, from within the open and closed cell structure of EPS foam material, and replaced with the suitable gas, such as carbon dioxide, at a pressure above atmospheric pressure. The packaging materials can then be used for packaging. The higher pressure within the closed cell structure can gradually reach equilibrium with that of the prevailing ambient atmospheric air pressure, however during this equilibration period the rate of re-entry of atmospheric oxygen into the structure of the packaging materials can thereby be reduced.

Thermoforming apparatus includes a typical method of pre-heating the sheet, clamping convenient rectangular sections of the heated sheet and vacuum (or pressure) forming the sheet onto a suitable tray forming mold, however, at the moment of thermoforming and prior to cooling of the sheet, a suitably shaped tool, that may also be heated to a desired temperature, can be pressed against the flange regions, or edge of the flange regions, of the trays during the forming process and thereby compress the flanges. Most desirably the compression of the flanges will cause substantially all gas to be expelled from the inner layer of foamed polyester in the flange regions only. Said trays are severed, by a cutting member, from the sheet of material such that the edges of the flange are substantially sealed together. Such a process can provide a tray with gas barrier outer layers of polyester and an inner foamed layer of polyester such that the inner layer is substantially prevented from direct contact with ambient air. In this way ambient air will be substantially prevented from permeating into the inner layer and also providing a gas barrier to substantially prevent nitrogen gas within the foam cells from escaping and exchanging with air.

3.9.1. Embodiment

One aspect of the invention is directed to the formation of packaging trays that eliminate the aforementioned problems with conventionally produced packaging trays. In this aspect of the invention, apparatus and methods are disclosed that provide a suitable packaging tray of EPS foam or otherwise wherefrom substantially all oxygen has been removed. In this manner, perishable products, such as beef, experience a considerably expanded shelf life.

One embodiment of the invention is a method wherein one or more of the following steps are carried out. One aspect of the invention is to provide a tray that may be thermoformed from expanded polystyrene (EPS) with flaps. The tray has dimensions that will provide for the efficient use of the internal capacity of typical, refrigerated transport vehicles. One aspect of the invention is to expose the tray during its formation to a gas that excludes oxygen and allowing the gas to exchange with any gasses contained within the cells of the EPS thereby substantially displacing any atmospheric oxygen from the cells. One aspect provides perishable goods in the tray under conditions which substantially eliminate any oxygen. The perishable goods have been treated and processed to substantially eliminate any bacteria thereon. One aspect of the invention is sealing a gas permeable material such as pPVC to the flanges of the tray under conditions which substantially eliminate any oxygen. One aspect of the invention is folding and then sealing the flaps to flanges of the tray under low oxygen conditions. One aspect of the invention is placing the tray or a plurality of similar trays into a gas barrier master container under low oxygen conditions. One aspect of the invention is displacing substantially all atmospheric gas, and particularly atmospheric oxygen, within the master container, with a desired single or blend of desired gasses. One aspect is sealing a lid over the opening in the master container to form a hermetically sealed package containing the trays with perishable goods and desired gas. One aspect is placing the master container inside a carton such as can be manufactured from corrugated cardboard and enclosing the master container. One aspect of the invention is locating a plurality of the closed cartons onto a standard (GMA specified) pallet (dimensions of 40"×48") so as to maximize the efficient use of the area provided by the pallet. One or more of the aspects described above are met by the apparatus and methods disclosed herein.

3.9.2. Embodiment

Referring now to FIG. 205, a schematic plan view of thermoforming equipment according to the present invention is shown that can be used to produce trays.

The equipment layout is shown in a convenient arrangement for the efficient production of trays according to the present invention. Primary extruder 6700 is arranged adjacent to secondary extruder 6702 for production of expanded polystyrene (EPS) foam sheet. Direction of material flow is toward wind-up mechanism 6704 with spool 6706 attached thereto. A roll 6708 of EPS sheet material is shown adjacent to tube 6710. Spools 6706 are transferred to tube 6710 by any means such as a conveyor (not shown). Likewise spools 6720 are transferred to tube 6712 by any means such as a conveyor. When the spools 6706 and 6712 are transferred they are loaded with sheet material wound around them. Tube 6710 follows a path that is conveniently arranged parallel with tube 6712. Tube 6710 and tube 6712 are shown completing a circular path. A cross-section through tube 6712 is shown in FIG. 206. However, it is apparent that tube 6710 can be similarly provided. Tube 6710 extends to a point of termination adjacent to thermoforming machines generally denoted as 6704. A second EPS foam extrusion system with primary extruder 6716 and secondary extruder 6718 is located adjacent to the first EPS foam sheet extrusion system 6700 and 6702. Second extrusion system extrudes sheet material in direction toward winder 6722, spool 6720 and roll 6724 adjacent to the entry end of tube 6712. The construction of tube 6712 can be similar to tube 6710. Tube 6710 and tube 6712 can be constructed parallel to each other and follow a concentric path such that 6712 terminates at an end in close proximity to thermoforming machines 6726. Tubes 6710 and 6712 follow concentric paths that spiral upwardly thereby providing an extended length of tubes 6710 and 6712 and to be contained within a convenient area.

Referring now to FIG. 206, a section through tube 6712 is detailed. However, tube 6710 can be similar. Spool 6720 can be seen inside tube 6712 resting on belt 6728 and belt 6730. Belt 6728 and belt 6730 are held taught and arranged to engage with drive sprockets conveniently located so as to engage the belts. Belts can, thereby, carry spool 6720 within the tube 6712. Carrying members extend throughout the full length of tubes 6710 and 6712 thereby carrying spool 6720 through tube 6712. A dish 6732 is mounted to a pneumatic cylinder 6734 such that when extended, the dish 6732 can elevate the spool 6720 upwardly so as to lift the spool away from driving belts 6728 and 6730. Tube 6712 is shown mounted directly onto a floor, however the tube 6712 can be elevated above the floor by suitable frame members. Gas can be introduced through inlet 6736 to tube 6712. Gas introduced into inlet 6736 may be nitrogen gas or any suitable gas.

Referring now to FIG. 207, a three dimensional sketch of spool 6720 is shown with roll of web material 6738 wound thereon. Returning to FIGS. 205 and 206, spools 6720 and 6706 can be loaded into the entry end of tubes 6712 and 6710 which are conveniently located adjacent to the winding members attached to foam extrusion equipment. Spools can be carried through tubes 6710 and 6712 on belts 6728 and 6730 that may be operating continuously. Dish 6732 is located conveniently between belt 6728 and belt 6730. Dish 6732 and spool 6720 can thereby be elevated, by activating pneumatic cylinder, upwardly and away from contacting belts 6728 and 6730. Pneumatic cylinder 6734 with dish attached thereto may be provided in sections that extend throughout the full length of tubes 6710 and 6712. By operating belts 6728 and 6730 with forward driving motion and pneumatic cylinder 6734 and dish 6732, spools 6720 can be carried through tubes 6710 and 6712 and delivered to thermoforming machines according to demand.

Tubes 6710 and 6712 can be flooded with a suitable gas such as nitrogen or a blend of gases including argon, carbon dioxide, nitrogen and a quantity of oxygen that does not exceed about 5% and is not less than about 1000 PPM of a blend of gases, through ports 6736 and 6742. Spools with rolls of EPS foam material can be stored in tubes 6710 and 6712 for a period of time as may be required in the normal aging of EPS foam material. This period of time may be in the order of twelve hours and accordingly the length of tubes 6710 and 6712 will be arranged so as to accommodate sufficient spools of material required for production of trays and also allowing for the twelve hour residence time as required. After storing the spools 6720 and 6706 in tubes 6712 and 6710 quantities of spools can be removed from the exit end of the tubes adjacent to the thermoforming machines, generally represented by 6714 and 6726, respectively for tubes 6710 and 6712. Spools can be loaded onto the thermoforming machines and thermoformed trays with flaps can be manufactured, as required.

3.9.3. Embodiment

In a one aspect, the web of EPS used for trays can be heated in an oven that substantially excludes oxygen so as to ensure that during any expansion of the EPS sheet prior to thermoforming of the EPS sheet, oxygen gas will be substantially prevented from entering into the cell structure of the EPS sheet. This can be achieved by providing a suitable gas such as nitrogen in the oven during the heating of the EPS sheet, the nitrogen gas being in direct contact with the surfaces of the EPS sheet. The EPS sheet can then be transferred directly into a forming station that is arranged to substantially exclude oxygen gas therefrom and furthermore, apply pressurized nitrogen gas to one side of the tray with flaps during the forming process and causing the nitrogen gas to pass into and through the tray and flaps during the forming process. Adhesive or solvent can then be applied to selected areas of the flaps and the tray, either before or after trimming the tray with flaps from the sheet of EPS material. Then automatically fold the flaps and mechanically apply sufficient pressure to the flaps to hold against the walls of tray and cause bonding between the flap and the tray at desired regions therebetween.

Referring now to FIG. 208, a cross-section through a thermoforming oven 6826 built to exclude oxygen therefrom is shown. Although reference is made to a single oven 6826, any number of similar ovens may be placed in the apparatus of FIG. 205 prior to thermoforming. The oven includes a substantially sealed and enclosed rectangular tube 6828 with heaters 6833, 6835 arranged to be above and below EPS sheet 6831 that can be carried therethrough. The EPS sheet can be fed into the oven through a slot that is slightly larger than a cross-section through the EPS sheet. Tube 6846 is attached to the under section of the oven and tube 6844 is attached to the upper section of the oven. Gas can be provided at a pressure above the ambient atmospheric pressure, from a "nitrogen generator" directly into tube 6846. Gas can be extracted from tube 6844 that follows a path along 6848 and through cooler 6850. Tube 6844 delivers the gas and an additional quantity of air 6847 into the nitrogen generator 6845. The nitrogen generator 6845 generates nitrogen gas by way of separating oxygen from air and allowing only nitrogen to pass into and through tube 6846. Gas may be provided into tube 6846 directly from tube 6844 through cooler 6850 if required. In this manner, substantially all amounts of air can be removed from within tube 6828.

Referring again to FIG. 205, tubes 6760, 6762, 6764 and 6766 are shown passing through a wall 6767. The tubes may be filled with a suitable gas. Fully formed trays with flaps can be loaded into the tubes for direct transfer and use on packaging machines.

In one aspect, the thermoforming apparatus herein described can be incorporated into any plant layout herein described.

3.9.4. Embodiment

Referring now to FIG. 209, a cross-sectional view of a pressure chamber apparatus or vacuum tube apparatus 6900, is shown. The apparatus is intended to be used in the process of removing any oxygen gas that may be retained within the cell structure of expanded polystyrene foam packaging materials such as trays with flaps, that are intended for use in packaging perishable products such as red meats in a low residual oxygen modified atmosphere package. The vacuum tube assembly 6905 includes a tube 4900 of suitable length, open at both ends with end caps 6904 and 6906 fitted to each end. End caps 6904 and 6906 include seals 6907 and 6909 so as to provide a sealed and air tight pressure chamber. The end caps 6904 and 6906 can be clamped in position and are removable as desired. The tube 6905 may be manufactured from any suitable material such as aluminum, stainless steel or a plastic material or a combination thereof. The size and profile of the vacuum tube assembly 6900 can be arranged to suit and accommodate a magazine, described in detail below.

A piston 6910 fitted with seals 6911 between the piston and the internal surface of bore of the tube 6905 can be located in the bore of the tube 6905 adjacent to end cap 6906. The piston 6910 can be manufactured from materials that include a suitable quantity of a magnetic material, such as iron. The piston is arranged so as to move easily within the confines of the tube 6905 along the bore. The end cap 6906 can be manufactured with an electromagnetic device attached thereto that is capable of activation as required in a manner that, as and when required, will cause the piston 6910 to become magnetically attached thereto. A port 6912 is provided in the end cap 6906. Port 6912 can be use to provide a gas that pushes against piston 6910, thusly moving piston in the direction away from end cap 6906. A first manifold 6914 and a second manifold 6916 are fitted on opposite sides of the vacuum tube 6905. The manifold 6914 has direct communication with the interior of the vacuum tube 6905 through apertures 6918 and manifold 6916 has direct communication with the interior of the vacuum tube 6905 through apertures 6920. Ports are provided at each end of the manifolds 6914 and 6916. The manifold ports 6922, 6924, 6926 and 6928 are connected to a vacuum source and nitrogen gas or any other suitable gas source, via a three-way valve such that either gas, set at a selected and adjustable pressure, or alternatively a vacuum source can be attached directly to the manifold ports. The gas supply and the vacuum source can be alternately attached to each manifold port, together or separately, in any desired sequence and/or manner that will efficiently remove residual oxygen from the interior of tube 6905 and cell structure of packaging materials 6902 contained in the vacuum tube 6905.

3.9.5. Embodiment

Referring now to FIG. 210 a magazine for holding a plurality of trays according to the present invention is shown. The magazine 7038 has an outer profile and dimensions such that it can be readily located inside the vacuum tube 6905 in FIG. 209. The inner profile of the magazine 7008 can be suited to fit a particular size or configuration of tray with flaps. In this manner, all magazines can be used with a vacuum tube of similar interior configuration, yet provide a convenient manner in which to hold a plurality of differently configured trays. A plurality of a particular size of tray with flaps can be located within the magazine and held in this position as required for further processing as a complete unit.

3.9.6. Embodiment

Referring now to FIGS. 211–213, an apparatus that is intended to be used in the process of removal of any oxygen gas that may be retained within the cell structure of expanded polystyrene foam trays and flaps that are intended for use in packaging perishable products such as red meats in a low residual oxygen modified atmosphere package is shown. FIG. 211 shows details of three vacuum tubes 7000, described above in association with FIG. 209, in various stages of the process and at positions A, B and C. Vacuum tubes 7000 are substantially similar in contribution to vacuum tubes 6900 shown in FIG. 209 above. Each vacuum tube 7000 includes a tube, open at one end and closed at the other. The vacuum tubes 7000 may be manufactured from any suitable material such as aluminum, stainless, steel or a plastic material or a combination thereof. The size and profile of the vacuum tubes 7000 can be arranged to suit and accommodate any sizes of trays with flaps. A piston 7002 fitted with a seal between the piston and the internal surface of bore of the vacuum tube, such as "O" rings 7001 appropriately attached to the piston, can be located in the bore of each vacuum tube 7000. The piston 7002 is arranged so as to move easily within the confines of the vacuum tube 7000 along the bore, with low friction and resistance between the bore and the piston "O"-rings 7001. A port 7008 is provided in the closed end of each vacuum tube 7000 and a cap 7010 is provided, when required, to completely close and seal in an airtight manner, the open end of the vacuum tubes 7000. A first and second manifold 7012 and 7014 are fitted on opposite sides of the vacuum tubes 7000. The manifold 7012 has direct communication into the vacuum tube 7000 through apertures 7016 and manifold 7014 has direct communication with the vacuum tube 7000 through apertures 7018. Ports 7020, 7022, 7024 and 7026 are provided at each end of the manifolds 7012 and 7014, respectively. The manifold ports 7020, 7022, 7024, and 7026 are connected to a vacuum source and nitrogen gas or other suitable gas source, via a three-way valve such that either gas, set at a selected and adjustable pressure, or alternatively vacuum source can be attached directly to manifold ports. The gas supply and the vacuum source can be alternately applied to each manifold port in a manner that will most efficiently remove the residual oxygen from the cell structure of trays 7034.

Referring now to FIG. 212, a rear end elevation of the apparatus is shown. As can be seen, four horizontally disposed vacuum tubes 7000, are mounted to a frame 7032 which is in turn attached to a main frame 7040 via pivot 7032. The main frame 7040 is rigidly attached to base of frame that is located firmly on a floor. A driver (not shown) is provided and arranged to rotate the vacuum tubes about pivot 7032. The driver can rotate the vacuum tubes, attached to frame 7028, together as a single unit with an intermittent motion such that during each intermittent motion the frame 7028 with vacuum tubes 7000, moves through 90 degrees. In this way vacuum tube 7000 at position A would move to the position B. The vacuum tube at position B would move to C, C to D and D to A. The apparatus is arranged so as to allow automatic loading of a quantity of trays at position A. At position B, the vacuum tube is arranged to be sealed with trays therein and position D is arranged so as to allow unloading of the trays from vacuum tube 7000.

Referring again to FIG. 211, with vacuum tube 7000 at position A, trays 7034 are shown being loaded into the vacuum tube with a loading force in the direction of the arrow 7004. During the loading, a suitable gas such as nitrogen can be provided through port 7008 of the vacuum tube 7000 at position A, at a desired pressure so as to exert a desired level of force against piston 7002, thereby holding the trays 7034 in a firmly held, nested, disposition while submitting to the loading force. The piston thereby moves toward the closed end of the loading vacuum tube 7000 until the vacuum tube 7000 is filled with trays 7034. Cap 7010 is then positioned into the open end of the vacuum tube 7000 thereby sealing in an airtight manner with trays 7034 enclosed therein. Immediately after closing and sealing the open end with cap 7010, a vacuum source is attached to all ports 7020, 7022, 7024, and 7026. The vacuum source remains attached thereto for a set period of time, sufficient to remove substantially all air from the closed vacuum tube 7000. After evacuation of substantially all air from the vacuum tube 7000 at position A, the vacuum source can be disconnected from manifold 7012 and a nitrogen gas source attached thereto, such that nitrogen gas is provided into manifold 7012 and through apertures 7016 so as to flood the vacuum tube 7000 at a desired pressure with nitrogen. The nitrogen gas then flows across the surfaces of trays 7034 and through apertures 7018 and into manifold 7014. The vacuum source can then be disconnected from the manifold 7014 so as to allow pressure of nitrogen gas inside vacuum tube to be increased to a desired pressure. The nitrogen gas can be maintained at the desired pressure for a desired period of time sufficient to allow exchange with and thereby removal of substantially all oxygen that may be present in the cell structure of the trays 7034. Alternating and or pulsating vacuum and gassing of the vacuum tubes 7000 can be arranged so as to provide rapid removal of the oxygen gas. A gas analyzer can be attached to each vacuum tube and arranged to determine the residual oxygen gas content inside the vacuum tube. When the residual oxygen content of gas present inside the vacuum tube 7000 has been reduced to a desirable level, the frame 7028 with vacuum tubes 7000 attached thereto, can be rotated so that the vacuum tube 7000 at position B is rotated to position C, the cap 7010 is removed and the trays 7034 are extracted by providing nitrogen gas through port 7008 at a suitable pressure so as to cause the piston to move toward the open end of the vacuum tube and eject the trays through the open end of the vacuum tube. Suction cups 7036 may be used to intermittently remove a single tray at a time until the vacuum tube is emptied.

Each vacuum tube 7000 can be provided with individual and separate identification. Separate identification may be arranged by way of a bar code attached to the vacuum tube 7000, at a convenient location or alternatively it may be by way of a chip, embedded into a section of each vacuum tube 7000.

The vacuum tubes 7000 may be arranged to accommodate any size of tray with flaps. The trays with flaps may be pre-loaded into an open magazine 7038, such as shown in FIG. 210, that is arranged to fit inside any of the vacuum tubes 7000. Any suitable quantity of open magazines 7038 may be provided and each one can be arranged so as to have constant outer dimensions that allow close and neat fitting within the vacuum tubes 7000, while the open magazine internal dimensions are arranged to suit different sizes of trays with flaps. In this manner, only magazine internal dimensions need to be accommodated for different trays, while interior dimensions of the vacuum tubes 7000 can remain constant Each magazine 7038 can be fitted with an individual address or identifying mark such as a machine readable and recognizable bar code or computer chip, embedded into the magazine at any convenient location. The address of the individual open magazine can thereby be identified. The open magazine can be loaded with the trays with flaps and then stored in, for example, a suitable racking system for a period of time, and when required for use, the loaded open magazine can be automatically removed from the racking system and transferred to the vacuum tube 7000 for processing. Any convenient quantity of open magazines can be manufactured and loaded with trays of various sizes, collectively providing an open magazine. The racking system may be located inside an enclosed storage space that may be filled with a desired gas such as nitrogen. In this way, the procedure of loading, processing and then unloading the trays with flaps, in the vacuum tubes 7000, that have been stored in the open magazine with identifiable address, may be arranged in an automatic process. Trays can suitably be held within the magazine by a clip or a brush.

Referring now to FIG. 213, an alternate embodiment of a vacuum tube assembly is provide. This embodiment uses a horizontally disposed conveyor 7042 trained on a first and second roller sprocket 7044 and 7046. Any number of vacuum tubes 7000 can be provided attached to the conveyor 7042. Conveyor 7042 can be intermittently indexed to move vacuum tubes 7000 to a station where one of the aforementioned operations proceeds to take place.

3.9.7. Embodiment

Referring now to FIG. 214, a plan view of a system apparatus constructed according to the present invention to form trays and provide for gas exchange is shown. A pair of horizontally disposed, parallel, continuous chains 7146 are arranged on suitable sprockets 7148 mounted in a frame. The sprockets are attached to a driver (not shown) that includes a programmable servo motor arranged to drive the parallel chains, in either direction, as required. Vacuum tubes 7100 are fixed to continuous chains 7146 as shown and include any number of vacuum tubes 7100, marked with individual addresses to provide a vacuum tube assembly generally denoted by 7150. The vacuum tubes 7100 are positioned with the closed ends toward the rear of equipment layout and the open ends toward the front of the equipment layout. Vacuum tubes 7100 are similar in contribution to vacuum tubes 6900 shown in FIG. 209 above.

Thermoforming machines 7152 and 7154 are positioned adjacent to the vacuum tube assembly 7150 so as trays produced therein can be loaded directly into vacuum tubes. Three tray folding and bonding machines 7156, 7158 and 7160 are also located adjacent to the vacuum tube assembly 7150.

Forming machines 7152 and 7154 include suitable thermoforming apparatuses that are arranged to thermoform trays with flaps from suitable rolls of expanded polystyrene sheet 7162 provided in rolls on spools 7164. Spools of web material may be treated in the manner described herein above. Each thermoforming machine 7152 and 7154 may include ovens, forming, and trimming apparatus. Trays with flaps are thermoformed, trimmed and ejected in horizontally disposed, and nested quantities onto shelf 7166 and 7168. Vacuum tubes 7170 and 7172 are positioned adjacent to and in line with shelf 7166 and 7168 so as to facilitate loading of the trays with flaps directly therein. In this way, trays with flaps can be produced by thermoforming machines 7152 and 7154 and loaded directly into the vacuum tubes. Each vacuum tube 7100 has an address which is known, and a computer, with CPU (central processing unit) can control the thermoforming machines 7152 and 7154 in concert with the vacuum tube assembly 7150. Any suitable quantity of thermoforming machines can be arranged at positions adjacent to the vacuum tube assembly 7150. Each thermoforming machine can be arranged to produce different sizes of trays with flaps, as required, which can be arranged to be transferred and loaded into vacuum tubes 7100 with known addresses. Alternatively, the thermoforming machines may be arranged so as to produce trays with flaps for loading into open magazines for subsequent storage before processing on the vacuum tube assembly.

The tray folding and bonding machines 7156, 7158 and 7160 are arranged to fold and bond the trays of different specification details. The CPU is programmed with location of each machine 7156, 7158 and 7160 and specification details of trays. Accordingly, the vacuum tube assembly 7150 can be programmed to unload trays into magazines 7174, 7176 and 7178, as required for subsequent folding and bonding. After folding and bonding has been completed by any of the machines 7156, 7158, and 7160, finished trays are positioned onto the respective conveyors 7178, 7180 or 7182 for transport thereon to packaging machines denoted by the direction of the arrows shown.

The tray folding and bonding machines 7156, 7158, and 7160, the corresponding magazines 7174, 7176 and 7178 and conveyors 7178, 7180 or 7182 can be enclosed in a space that can have a desirable gas, such as nitrogen, provided therein.

The desirable gas, such as nitrogen can be produced by a suitably sized nitrogen generator such as an on-site nitrogen supply, incorporating a non-cryogenic air separation devices known as Pressure Swing Absorption (PSA) Generators. Suitable PSA generators are available from BOC Gases, a division of The BOC Group. Any convenient source of gas supply may be provided to the equipment herein described above for the removal of oxygen from web materials.

Referring now to FIG. 215, a vacuum tube assembly 7200 may be manufactured with any number of vacuum tubes. The vacuum tubes 7200 are arranged to allow the transfer of magazines 7208, therethrough after removal of both end caps with the piston electro-magnetically attached to an end cap (similar to end cap 6906 in FIG. 209). Alternatively, the trays with flaps may be transferred from the magazine 7208 directly there from. Empty magazines can then be returned by automatic transfer to a known location and as controlled by a programmable CPU or PLC (programmable logic controller) attached to the magazine assembly.

Referring again to FIG. 215, a system apparatus is shown containing a vacuum tube assembly 7200, and including a quantity of horizontally and parallel disposed vacuum tubes, similar to 7100 in FIG. 214, and each marked individually to enable tracking. Vacuum tubes are attached to a pair of parallel and continuous chains that are in turn arranged to engage with sprockets that are in turn arranged with suitable drivers. The quantity of vacuum tubes, attached to the chains, may be varied according to requirements.

A magazine assembly 7208, including a quantity of magazines, are horizontal and parallel disposed, each magazine similar to magazine 7038 shown in FIG. 210, and each is marked individually to enable tracking. Each magazine is secured to a pair of parallel and continuous chains, that are in turn arranged to engage with sprockets that are in turn arranged with suitable drivers. The magazines can be arranged so as to be detachable from the magazine assembly.

The vacuum tube assembly 7200 and the magazine assembly 7208 are arranged such that magazines can be automatically transferred between the assemblies, as required. In this way, a magazine that has been loaded with trays with flaps can be selectively transferred from the magazine assembly 7208 to a selected vacuum tube location in the vacuum tube assembly 7200.

Any quantity of thermoforming machines 7248, 7250, 7252 and 7254 are shown positioned adjacent to the magazine assembly 7208 so that trays with flaps, produced by the thermoforming machines 7248, 7250, 7252 and 7254, can be loaded directly into the magazines. Any suitable quantity of thermoforming machines with interchangeable tooling to suit any number of different sizes of trays with flaps can be provided, as required, and located adjacent to the magazine assembly 7208.

Machines 7248, 7250, 7252 and 7254 include suitable thermoforming machines that are arranged to thermoform trays with flaps from suitable rolls of expanded polystyrene sheet provided on rolls 7256 on spools 7258. Each thermoforming machine may include ovens and forming and trimming (cutting) devices. Trays with flaps are thermoformed, trimmed and ejected in horizontally disposed stacks, such that the stacks extend onto shelves 7260 and 7262' arranged on each machine 7248 through 7254. Magazines can be positioned adjacent to and in line with stacks on shelves 7260 and 7262 so as to facilitate loading of the trays with flaps directly therein. Trays with flaps can be produced by thermoforming machines 7248, 7250, 7252 and 7254 and loaded directly into any selected magazine. Each magazine has an address which is known and a computer a CPU (central processing unit) can control the thermoforming machines in concert with the magazine assembly. Any suitable quantity of thermoforming machines can be arranged at positions adjacent to the magazine assembly. Each thermoforming machine can be arranged to produce different sizes of trays with flaps, as required, which can be arranged to be transferred and loaded into suitable magazines with known addresses.

Magazine assembly 7208 and the vacuum tube assembly 7200 can be arranged to operate in concert and suitably controlled by the CPU.

Apparatus that is arranged to fold and bond trays with flaps are shown and marked 7264, 7266, 7268, 7270 and 7272. Apparatus may fold and bond trays with flaps of different sizes, and specification details, as required. The CPU is programmed with the location of each machine 7264, 7266, 7268, 7270 and 7272 and specification details of trays with flaps. Accordingly, the apparatus can be programmed to operate in concert with the vacuum tube assembly 7200 such that magazines can be transferred between the apparatus and the magazine assembly by transfer of magazines to magazine locations shown as magazine 7274, 7276, 7278, 7280, and 7282 as required for subsequent folding and bonding. After folding and bonding has been completed by any of the machines 7264, 7266, 7268, 7270 and 7272, finished trays are positioned onto the respective conveyors 7284, 7286, 7288, 7290 or 7292 for transport thereon to packaging machines.

The magazine assembly 7208 and/or the vacuum tube assembly 7200 can be enclosed in a space that can have a suitable gas, such as nitrogen, provided therein and temperature controlled at a suitable temperature.

Apparatus shown in FIG. 215 is thus arranged to automatically produce trays with flaps on the thermoforming machines. The trays with flaps can then be transferred into magazines that can be secured to the magazine assembly. The magazines can be transferred from the magazine assembly to any of the vacuum tubes attached to the vacuum tube assembly. Trays with flaps can then be processed according to any suitable process and as herein disclosed. The magazines can then be transferred to the folding and bonding apparatus for further processing and subsequent transfer to packaging machines for use in packaging perishable goods.

The tray folding and bonding machines 7264, 7266, 7268, 7270 and 7272, are arranged to fold and bond any trays with flaps of different specification details. The CPU is programmed with location of each machine 7264, 7266, 7268, 7270 and 7272, and specification details of trays with flaps stored in the magazines. Accordingly, the vacuum tube assembly can be programmed to unload trays with flaps into magazines 7274, 7276, 7278, 7280 and 7282, as required for subsequent folding and bonding. After folding and bonding has been completed by any of the machines 7264, 7266, 7268, 7270 and 7272, finished trays are positioned onto the respective conveyors 7284, 7286, 7288, 7290 or 7292 for transport thereon to packaging machines.

The thermoforming machines 7248, 7250, 7252 and 7254 and the tray with flaps, folding and bonding machines 7264, 7266, 7268, 7270 and 7272, the corresponding magazines 7274, 7276, 7278, 7280 and 7282 and conveyors 7284, 7286, 7288, 7290 or 7292 can be enclosed in a space that can have a suitable gas, such as nitrogen, provided therein.

The nitrogen gas can be produced by a suitably sized nitrogen generator such as an on-site nitrogen supply, incorporating a non-cryogenic air separation apparatus known as Pressure Swing Absorption (PSA) Generators. Suitable PSA generators are available from BOC Gases, a division of The BOC Group. Any convenient source of gas supply may be used.

3.9.8. Embodiment

Referring now to FIG. 216, details of an apparatus for storing foam (EPS or polyester foam) trays, for gas exchange in cells with a desired gas is shown. This apparatus provides a method to substantially remove any residual oxygen that may be retained in the cell structure of EPS packaging materials intended for use in packaging fresh red meats in a "low oxygen" master container, case ready packaging system. The method and apparatus disclosed herein can provide a process to remove and replace the residual oxygen, with a desired gas, more rapidly than occurs when the EPS packaging materials are stored in a chamber containing desired gas in a static condition at ambient atmospheric pressure.

The apparatus includes a rectangular or suitably profiled tube 7300. The tube 7300 is arranged to have two open ends 7302 and 7304, one at each end of the tube 7300. The tube 7300 is provided with evacuation port 7306 and gas entry port 7308. The tube can be filled with precut foam (EPS) trays with flaps, or sheets of foam 7304. The tube 7300 can be arranged to have a suitable length and be configured in such manner as to allow automatic loading from the trim press of a suitably modified thermoforming and tray trimming apparatus. The tube 7300 can further be arranged so as to allow automatic removal of one tray with flaps at a time for subsequent automatic processing of the tray with flaps to form a finished tray with bonded and sealed flaps.

Open ends 7302 and 7304 can be arranged to mate with covering caps (not shown) in such a manner as to completely enclose the tube 7300 and provide airtight seals at both open ends. The completely enclosed tube 7300 can thereby provide a vacuum chamber containing the trays with flaps such that when a vacuum source is connected to evacuation port 7306 substantially all air contained therein can be removed. After evacuation of the air from the tube, the vacuum within the tube 7300 can be maintained for a period of time, the period of time being sufficient to allow removal of substantially all retained air and oxygen from the cell structure of the trays with flaps. After removal of substantially all air and oxygen from within the cell structure, a suitable gas such as nitrogen or carbon dioxide can be provided into the tube via gas entry port 7308. The gas can be retained within the enclosed and sealed tube 7300 for a period of time, which may be from 1 to 2 hours, sufficient to allow the cell structure to become filled with the suitable gas. The air will be substantially evacuated through the evacuation port 7306 and then a gas such as nitrogen will be introduced through port 7308 at a suitable low pressure. In one aspect, the gas will be held at the suitable low pressure for a period of time and then, the low pressure of the gas will be gradually increased, over a period of time, and until the gas pressure is increased to a maximum gas pressure above ambient atmospheric pressure. The maximum gas pressure may be 60 psi or more.

Alternatively, a partial evacuation of air from within the tube 7300, to a level that does not completely evacuate the tube 7300 but lowers the air pressure therein to a pressure above zero and below ambient atmospheric air pressure. A suitable, oxygen free, gas such as nitrogen, can be provided into the tube 7300, through the port 7308, so as to blend with the remaining air contained therein. This process of partial evacuation followed by gassing can be repeated, sequentially until the oxygen gas contained in the EPS cell structure is removed and in an optimized process that will result in the rapid exchange of the retained oxygen in the cell structure with a desired gas.

In another embodiment, the evacuation port 7306 may be provided in the sealing cover over the open end 7304 and the gas entry port 7308 may be provided in the sealing cover over the open end 7302. A vacuum source can be attached to the evacuation port 7306 and a suitable gas source, such as nitrogen or a blend of gases including argon, carbon dioxide, nitrogen and a quantity of oxygen that does not exceed 5% and is not less than 1000 PPM, or any combination thereof, can be attached to the gas entry port 7308 and thereby providing a continuous flow of gas through the tube 7300 from port 7308 to evacuation port 7306 so that the suitable gas contacts the surface of the trays with flaps contained herein. The pressure of the gas flowing through the tube 7300 can be arranged at a level most suitable to achieve the most rapid removal of air and oxygen that may be contained within the cell structure of the trays with flaps and thereby exchange the oxygen with the desired gas.

In yet another aspect of the invention, a plurality of tubes 7300, may be conveniently stacked together and located inside a suitably sized vacuum chamber. Substantially all air may be evacuated from within the vacuum chamber and held with the vacuum source attached thereto for a period of time sufficient to allow removal of substantially all gas from within the expanded polystyrene foam cell structures. A suitable gas, such as nitrogen, can then be provided into the vacuum chamber, at a pressure equal or greater than ambient atmospheric pressure so as to completely fill the vacuum chamber and contact all surfaces of foam trays in the tubes. After a period of time the plurality of tubes can be removed from the vacuum chamber.

Referring now to FIG. 217, another embodiment of a rectangular tube 7300'having top and bottom open ends is shown. The rectangular tube 7300' may be manufactured from any suitable material such as stainless steel or other plastics material and may be arranged to have any convenient length. In one instance, the rectangular tube 7300' can be manufactured with longitudinally parallel sides and a cross-section that corresponds with the cut size of the trays that are shown therein. More specifically the rectangular tube 7300' will have a cross-sectional opening that is sized so as to be slightly larger that the cut size of the trays contained therein. For example, if the plan, cut size dimensions of the trays is 5" long by 4" wide the opening in the rectangular tube will be about 5.125" long by about 4.125" wide. However, it is apparent that the tube can be made of any size.

A gas entry port 7308' is shown located in the wall of the rectangular tube 7300' at about equal distance from each end of the rectangular tube. A plurality of additional gas entry ports may be provided at any suitable location in the wall of the rectangular tube 7300'. A suitable gas or blend of gases, such as nitrogen, may be provided inside the rectangular tube 7300' through the entry port 7308'. The gas may be provided by an injector into the rectangular tube through one or more of gas entry ports at a set pressure and volume. The length of rectangular tube 7300' can be arranged such that when trays are passed through the rectangular tube 7300', the residence time of trays within the rectangular tube 7300' will be sufficient to allow gas exchange to occur between the suitable gas provided through the entry port 7308' and into the rectangular tube 7300' and gases such as oxygen that may be contained within the cell structure of the trays. Trays may be loaded through an opening at the open top of rectangular tube 7300' and unloaded through the open bottom.

In one instance, rectangular tube 7300' is vertically disposed such that gravity will provide sufficient force to cause the trays to pass through the opening through the rectangular tube 7300', when trays are removed from the bottom of rectangular tube 7300'. Alternatively, the rectangular tube 7300' may be horizontally disposed and a driver such as a rotating helical elevator (not shown) may be provided to transfer the trays through the rectangular tube 7300'. In one aspect, the rectangular tube 7300' may be arranged so as to connect with an automatic tray dispenser so that trays can be automatically removed, one or more at a time, and subsequently be positioned onto a packaging machine in readiness for loading of perishable goods such as fresh red meat therein. In one aspect, a plurality of rectangular tubes 7300' may be arranged together in a grouping so as to process a plurality of trays simultaneously. The rectangular tube 7300' can be manufactured to suit trays of any size. Furthermore, tubes 7300' may be used in the system apparatus according to the present invention.

3.9.9. Embodiment

In one aspect of the invention, apparatus is provided for the thermoforming of webs into tray pre-forms and barrier master containers. Referring now to FIG. 218, a schematic illustration of an embodiment of a specially arranged thermoforming apparatus is shown according to the present invention. The apparatus shown in FIG. 218 is intended to provide an alternative, but economical method of delivering trays to conveyor 7424 as shown in FIG. 147. The apparatus includes a modification of the conduit 7401, wherein a portion of the apparatus is under the gas pad. A wheel 7466 is mounted onto a shaft 7470. Wheel 7466 is arranged to have 8 flat sided faces, onto which tooling 7467 can be mounted. However, it is apparent that more or less faces can be provided. Wheel 7466 is attached directly to a sprocket (not shown), which engages with a pair of continuous gripper chains 7473. Other sprockets including idler sprockets 7475 and drive sprockets 7474 are mounted to maintain gripper chains 7473 in a fixed and generally horizontally disposed track. A roll of interchangeable and thermo-formable material 7464 is located between chains 7473 and is unwound in a continuous web of material 7463. As web 7463 is unwound from roll 7464 it is held by gripper chains 7473 at each side edge and withdrawn, at a suitable rate, from roll 7464 by the forward motion of chains 7473. Sprockets 7474 are attached to a suitable drive motor with controller that progressively carries web 7463 between upper and lower heat banks 7462. Heat banks 7462 are mounted in close proximity to be above and below web 7463 and as gripper chain 7473 carries web 7463 there between, the web 7463 is heated. The temperature of heat banks 7462 is controlled and maintained within a selected range so as to ensure that the temperature of web 7463 is at a thermoformable temperature as it passes from between heat banks 7462 and onto a flat face of wheel 7466. Rollers 7460 and 7461 are arranged to contact the upper and lower surfaces of web 7463 and apply a calendering pressure thereto. Rollers 7462 and 7461 are maintained at a temperature as required. Eight sets of tools 7467 are mounted to wheel 7466. Each tool 7467 may comprise a four-sided tray cavity forming depression with a flap forming depression adjacent to each side, such that a pre-form with four flaps can be formed therein. Clamping fixtures with plugs or matching molds 7465 are arranged to conveniently be incorporated as required while the pre-form being formed in matching tools 7467. Forming tool 7467 can be arranged such that the flap forming sections of the tool can be hinged so as to fold the flaps after cutting from web 7463, and become bonded to walls of the tray cavity prior to ejection. In this way, a pre-form tray can be thermoformed, cut from the web 7463, folded and bonded, and ejected by tools on wheel 7466. A finished tray 7420 is then ejected and allowed to fall in the direction as shown by arrow 7468, onto conveyor 7424. Enclosure 7401 is arranged to completely enclose the wheel assembly 7466, clamping arrangements 7465 and conveyor 7424, and in such a manner to ensure that all cavities between walls and flaps of tray 7420 are filled with a selected gas 7432.

Web 7463 may comprise a solid extruded sheet of plastics material, extruded from any suitable polymer. In one instance, an additive can be provided therein that will generate a suitable gas such as carbon dioxide when heated to a thermoformable temperature. Web material 7463 may comprise a polypropylene polymer with any suitable additive such as a filler additive containing calcium bicarbonate that will release carbon dioxide gas when heated, within the extruded polymer sheet, at a thermoformable temperature. In this way, an expanded polypropylene sheet (EPP) of material can be formed immediately prior to use, and ensuring that carbon dioxide gas fills the interstitial spaces within the web material from which trays 7420 are formed. This disclosed apparatus may be suitably arranged with an enclosed packaging conduit as described above.

Referring now to FIG. 219, a section A of web 7463 is shown prior to heating with a thickness 7473, which may be for example 0.010". A section B of web material 7463 also is shown after heating to a thermoformable temperature with thickness 7472 which may be for example 0.030" thick. As shown, web 7463 can be increased in thickness from 0.010" to 0.030", by heating to a thermoformable temperature. One suitable web material is expanded polypropylene sheet or EPP.

3.9.10. Embodiment 9

Referring now to FIGS. 220–221, one embodiment of a tray forming apparatus 8000 is illustrated. In one aspect, the apparatus is used in a method for removing oxygen gas from a tray web, such as one made from expanded polystyrene packaging materials. In one aspect, such webs are used in packaging perishable goods that could be deleteriously affected by the presence of oxygen in quantities that exceed 500 PPM. The method includes but is not limited to the use of any suitable gas at any suitable pressure arranged to pass through the web materials by providing the suitable gas on one side of the web materials at a pressure above the gas pressure of any gas that is present on the opposing side of the packaging materials. The suitable gas will thereby be caused to pass through the packaging materials and furthermore cause a reduction in oxygen contained in the structure of the web materials.

In one embodiment, the apparatus includes two chamber members. FIG. 220 is a side view cross-section of a two chamber embodiment with the apparatus in a closed position and a tray clamped between an upper chamber 8002 and a lower chamber 8004. FIG. 220 shows half of the apparatus with a center line marked through what would be the center of the apparatus. The other half of the apparatus is a mirror image of the part that is shown. FIG. 221 shows a cross-section across the entire width of the upper and lower chambers 8002 and 8004.

The upper 8002 and lower 8004 chambers are arranged so as to be moveable toward and away relative to each other, thereby allowing trays to be processed in a continuous mode. A porous mold 8006, that is profiled to follow the contours of the upper surface of tray web 8008 and to neatly fit within the confinement of the chambers 8002 and 8004, is provided and can be fixed to the upper chamber 8002. A gassing port 8010 is provided in the lower chamber 8004 and an evacuation port 8012 is provided in the upper chamber 8002. The porous mold 8006 can be manufactured from a suitable porous material, which in some instances, may have grooves and slots machined across the surface of the profiled face 8014 that are all connected to evacuation port 8012, thereby allowing gasses to be evacuated therethrough and through port 8012. The apparatus can be configured to accommodate one or more trays, however, for ease of explanation, the apparatus shown in FIG. 220 and FIG. 221 accommodates a single tray. In one instance, a cutting blade 8016 is provided within lower chamber 8004 and is suitably attached to a member 8018 fixed to a piston 8020. The piston 8020 is actuated by a suitable pneumatic driver or other suitable driver means. The blade 8016 can be arranged in a continuous length following the outer edge of the tray web to provide a cutting edge 8030 that follows the perimeter of the tray web. A space 8022 is provided between the surface of the profiled mold 8006 and the lower chamber 8004, providing a space into which a suitable pressurized gas can be provided.

In one embodiment, a tray 8024, having flanges 8026, is located on the porous mold 8006 and the chambers 8002 and 8004 are closed so as to clamp the flange 8026 around the full perimeter of the tray web 8024. The tray 8024 may be thermoformed from expanded polystyrene and therefore is porous and can allow pressurized gas to pass therethrough. Suitable methods of forming trays from expanded polystyrene are described herein. Pressurized nitrogen gas can then be provided into the space 8022 through port 8010 at a suitable pressure. A vacuum source can be attached to port 8012 to draw the gas through the space 8022 and tray 8024. The gas thereby passes through the porous tray walls and can displace oxygen gas that may be present therein. The blade 8016 with cutting edge can be activated and moved by the member 8018 so as to cut through the tray flange 8026. Chambers 8002 and 8004 are opened allowing the tray 8024 to be removed in readiness for additional trays to be processed in a similar fashion as described above. Trays 8024 can be removed and replaced on the porous mold 8006 in a continuous, intermittent and automatic procedure. The porous mold 8006 can be interchanged with other molds having different profiles to suit other trays of different size and profile.

In another aspect of the present invention, flange 8026 and any other part of the tray 8024 and the flap 8028 may be compressed, as desired, to substantially remove gas from the foam cells thereby forming a substantially solid section in the tray body 8024, flap 8028 and flap flange 8026 as required. In one instance, the solid section can be arranged to provide a continuous solid section around the perimeter of the tray such that a web of material such as pPVC can be sealed to the solid section along a strip-like path around a perimeter of a package. The solid section may be located at the connection between the flap 8028 and the tray 8024 such that the flap 8028 and the tray 8024 can be hinged and folded so as to allow contact of tray flange 8026 with the tray 8024. However, tray web can be compressed at any desired location.

3.9.11. Embodiment

In one aspect of the invention, an apparatus is provided to compress tray portions where desired. Such apparatus includes a first and second platen arranged in close relative proximity and with a powered device for moving the platens toward and away from each other. Matched compressing tools including two parts, are typically mounted onto the platens such that a heated sheet of expanded polystyrene or other suitable sheet, can be located between the platens and placed in between the matched tool parts. The platens can be moved toward each other to a position that clamps the heated sheet between the two parts of the matching tools, thereby imparting a three dimensional profile that corresponds to the profile of the matched tool, into the sheet. After the sheet cools, the platens and the matched tool open and the profiled sheet can be removed automatically to allow the positioning of another sheet of FPS sheet therebetween. The EPS sheet is typically provided in a continuous web.

As disclosed in the aforementioned description, trays can be processed in an automatic and continuous mode, such that any oxygen gas that may be retained in the EPS cell structure can be substantially removed and replaced with a desired gas such as nitrogen. The method and apparatus described herein, can be incorporated into standard thermoforming machinery used for production of thermoformed EPS trays by employing the following methods and modifications to the apparatus.

3.10. Tray Rigidity

In one aspect of the invention, trays may be formed with ribs to provide increased structural rigidity. Referring now to FIG. 222, a tray 8100 with ribs 8102 formed in accordance with this invention is shown. As previously described, nitrogen can be used to displace oxygen within the cells of EPS foam trays. During evacuation, as would occur when packaging, all contents of the container including the tray are exposed to a high level of vacuum, the pressure of nitrogen gas contained within the inner layer foam cells which is approximately equal to the prevailing ambient atmospheric pressure, will exert an outward pressure against the inner surfaces of the outer layers of material. This pressure can cause distortion resulting in, at least, partial separation of the inner layer from the outer layer. Furthermore, in extreme cases tray walls could rupture and burst open. Clearly, such an event is undesirable and the present invention provides a method, equipment and tray, that can minimize this undesirable event. By including regions of dense compressed material, the trays can withstand the low pressure atmosphere environments caused during evacuation.

FIG. 222 shows a three dimensional section of a tray 8100 that has been thermoformed from expanded material having compressed sections therein. Tray 8100 includes a tray flange 8104 provided about the periphery of the tray at an upper portion thereof. Tray 8100 includes an extended flange, generally denoted by 8106. Extended flange 8106 includes a portion of a non-compressed foam 8108, generally forming the majority of the central portion of the extended flange 8106. Portions of extended flange 8106 on sides of the non-compressed portion 8108 are compressed, thereby providing increased structural rigidity to extended flange 8106. Tray 8100 includes a wall 8110 with vertically disposed ribs 8102 formed of compressed tray wall material. However, compressed portions can be provided as desired on any portions of the tray.

Referring now to FIG. 223, a portion of extended flange 8106 is shown connected to a tray wall 8110. Central non-compressed portion 8108 is shown surrounded on sides thereof by compressed portion of flange 8104 and an opposite compressed portion 8112, containing an aperture 8114 therein. In some instances, the inner surfaces of the compressed materials may bond to one another and therefore provided added rigidity to the tray.

Referring now to FIG. 224, a portion of tray wall 8110 is shown containing compressed tray material portions 8102 forming ribs on tray wall 8110. It can be seen that compressed material portions 8102 are compressed from both sides thereof, so that an indentation is created on both the exterior and the interior surfaces of the tray wall 8110. While portions of the tray flange and wall have been shown as being compressed, it should be apparent that other tray portions can be compressed as well, the preceding being merely exemplary of several embodiments.

Referring now to FIG. 225, an apparatus 8200 that can be used to provide compressed ribs is shown. Apparatus 8200 includes an upper 8202 and lower 8204 platen with forming tools attached thereto. Upper platen 8202 includes tools 8206 formed in the negative of the desired shape that is imparted to the tray. Upper platen includes a heating element (not shown) to facilitate molding of the tray wall. As used herein, the heating element will be referenced with the same numeral as used for the upper platen 8202 Lower platen 8204 is provided with a flat shaping tool. However, in the embodiment of a tray with ribs described in connection with FIG. 222, shaping tools 8206 such as those on the upper platen 8202 can be provided on the lower platen as well, so as to form indentations on both sides of material. Ribs 8208 can be provided by closing platen 8202 onto the wall of tray 8210 while tray 8210 is supported by lower platen 8204. Heat bank 8202 can thereby weld/heat seal a portion of the inner surface of the outer layers 8212 and 8214 to each other after compression of inner layer 8216 foam cells such that the outer layers become welded/heat sealed to each other at the point of contact. Radius 8218 of ribs 8208 can be adjusted and also the distance of pitch 8220 from radius to radius can also be adjusted by production of equipment providing the desired adjustments. Adjustments can be made in order to provide for optimized configuration of radius 8218 and pitch 8220 such that the exploding effect of exposure to high vacuum that could otherwise result in the rupturing of the tray, as described above, can be minimized.

Referring now to FIG. 226, an another embodiment of an apparatus for compressing a web of material 8300 to provide ribs therein is detailed. Heat banks 8302 and 8304 are arranged in a vertically opposing manner in a mechanism so as to enable compressing of material therebetween and thereby bond outer layer 8306 and inner layer 8308 together with compressed foamed polyester layer 8310 therebetween.

Referring now to FIG. 227, an enlarged cross-sectional view through a portion of compressed material 8300 with an aperture 8312 punched therethrough is shown, showing the layer of compressed foam cells 8310 in between the upper and the lower layers, 8306 and 8308, respectively.

Referring now to FIG. 228, an apparatus for providing perforations in an outer layer 8306 of a tray wall is shown. The apparatus includes an assembly containing one or a plurality of punch pins 8400, mounted on a retractable platform 8402. Platform 8402 may be actuated by pneumatic means or any other suitable driver. A base 8406 is provided on an opposite side of punch pins 8400 to buttress the tray 8408 as punch pins are applied to the tray. Any portion of tray 8408 can thusly be perforated, including the interior. By controlling the length of actuation, perforations 8410 can be provided in the exterior layer 8306 only, or they can be provided in the exterior layer 8306 and the interior layer 8310 to any desired depth, or they can be provided clear through the tray 8408, also perforating interior layer 8308. Perforations 8410 can be provided to allow communication and transfer of gasses or liquids from the foamed polyester layer 8310 and through perforations 8410.

3.10.1. Embodiment

Referring now to FIG. 229, one embodiment of a temperature controlled shaping apparatus is shown. Apparatus 8500 includes an upper and lower tool part 8502 and 8504, respectively. Upper tool part 8502 includes a plurality of rounded indentations 8506, while lower tool part 8504 is substantially flat. Upper tool 8502 includes a heating element, which is incorporated in the part. In one aspect, the upper tool part 8502 is temperature controlled by passing a liquid through conveniently located passageways shown as ports 8508. Any number of ports can be provided to distribute a liquid to achieve the desired heating or cooling. Liquid is preconditioned to a specified and desired temperature and is passed through ports 8508 at a rate sufficient to control the temperature of upper part 8502. In this manner, the heating or cooling rate of part 8502 can be increased, therefore, increasing the amount of trays that can be processed therethrough. Lower part 8504 can be temperature controlled in a similar manner.

In one aspect, tray compression means can be combined with tray foam cells evacuation means. In this manner, trays can be expanded to conform to the shaping tools rather than be compressed. In this aspect, apparatus 8500 is provided with a means of evacuating any undesirable gases, such as oxygen, generated during the forming process. To this end, evacuation ports 8510 are located in part 8502 and evacuation ports 8512 are also located in part 8504.

FIG. 230 shows a cross-section through a material 8600, which has been sealed around its periphery 8602 by compressing and sealing the outer layers 8604 and 8606 together, before processing with matching tool parts 8502 and 8504. FIG. 230 shows a cross-section of the material showing an upper 8604, an inner 8608, and a lower 8606 layer. The upper layer 8604 is about 0.002" thick, the inner layer 8608 of foam polyester is about 0.15" thick and the lower layer 8606 is about 0.002" thick. When the material is compressed according to the present invention. Outer layers 8604 and 8606 remain substantially about 0.002" thick, but inner layer 2608 has been compressed to about 0.001" thick.

Referring now to FIG. 229, face 8514 of part 8502 is arranged to have width and length dimensions such that it can enter and partially penetrate cavity 8516 on lower part 8504 with a clearance around the perimeter of the cavity of about 0.010 inches or greater, such that the parts 8502 and 8504 are in close proximity, but substantially do not contact each other. The tooling parts 8502 and 8504 can be mounted onto independently moving members that can simultaneously provide a predetermined closing movement toward each other and with a desired force. Face 8518 is parallel to face 8520 and when parts 8502 and 8504 are closed together, parts 8502 and 8504 are arranged so as not to contact one another. The distance between face 8518 on part 8502 and 8520 on part 8504 is set not to exceed a predetermined distance.

A vertical wall 8522 is located around cavity 8516 and when parts 8502 and 8504 are in a closed position, an enclosed space is defined by face 8518, face 8520 and walls 8522. Therefore, the volume of space can be predetermined and the displacement of the section of material 8602 can also be predetermined. Volume of cavity 8516 and the displacement produced by tool part 8502 can be arranged to be substantially equal. A section of material 8602 is heated to a desired temperature and located into the cavity 8516 immediately prior to closing parts 8502 and 8504. When parts 8502 and 8504 are closed and a vacuum source is applied to evacuation ports 8524 and 8526 in parts 8502 and 8504, the profile of the section of material 8602 will be altered, so as to substantially conform to the profile of the space wherein ribs 8528 will be formed by rib mold 8506 attached to face 8518. This method of forming a part with a desired profile from a substantially flat (two dimensional) sheet of material 8602 can be applied to form trays. The profile of the trays will be determined by the profile of the tooling parts which can be manufactured to specific requirements and particularly to provide a method of producing trays of optimized profile and rigidity for use, for example, in master container modified atmosphere packaging systems as described herein.

3.11. Web Materials

Many aspects of the invention call for the application of barrier webs, suitable to make trays and lids. One aspect in particular calls for sealing a tray or master container with a substantially barrier web. Such webs can be formed from a single layer of material or a composite of materials having barrier properties, wherein one or more layers comprises a barrier material. As used herein, barrier materials generally comprise one or more of the following, in any proportions and thickness.

Where barrier webs are not desired or discouraged, such webs can generally comprise the following, in any proportions and thickness.

However, while reference has been made to barrier materials and non-barrier materials, it is to be appreciated that every web described herein possesses, at least, some amount of barrier capability, as such, any application which calls for a barrier material, can suitably be implemented from a material which has not been so designated as a barrier material. Conversely, it is to be appreciated that every material possesses the capability to be permeable to one or more gasses, as such, any application which calls for a permeable material, can suitably be implemented from a material which has been designated as a barrier material as well. The lists above, being examples of some materials being more barrier prone than others.

One aspect of the present invention is the production of a co-extruded plastics sheet product extruded through an annular die, including substantially amorphous polyester polymers, with additives, similar, but not exclusively, to the structures shown in FIGS. 231–239. The sheet product is multi-layered, where at least one of the layers is a foamed polyester and where at least one or more other layers includes at least about 30% regrind material derived from the skeletal scrap remaining after production of thermoformed trays from the sheet, with the balance of the regrind layer including a chosen virgin amorphous polyester polymer. It should be readily appreciated that other composites exist and are within the ambit of the present invention other than those mentioned herein, the following examples being illustrative of one aspect of the present invention.

FIG. 231 shows a multilayer coextruded plastic sheet constructed according to the present invention including five layers. Beginning from the uppermost layer 8700, the co-extruded first layer 8700 includes a mix of blended components about 50% Eastman 6763 and about 50% Eastman 19411. The first layer 8700 is about 0.001 inches thick. The second co-extruded layer 8702 includes Eastman 9921 and is about 0.0025" thick. The third co-extruded layer 8704 includes a blended mix of foamed Eastman 9663 and Eastman additive G4ZZZ-3AZZ, and is about 0.012" thick. The fourth co-extruded layer 8706 includes Eastman 9921 and is about 0.0015" thick. The fifth layer 8708 includes regrind material recovered from tray thermoforming processes, and is about 0.002" thick. The overall thickness of the sheet material shown in FIG. 231 is about 0.019" thick.

FIG. 232 shows a multilayer coextruded plastic sheet constructed according to the present invention. The sheet material includes four layers. Starting from the uppermost layer, the first co-extruded layer 8000 includes a blended mix of about 60% Eastman 9921 and about 40% Eastman 6763. The first layer 8800 is about 0.002" thick. The second co-extruded layer 8802 includes a blended mix of foamed Eastman 9663 and Eastman additive G4ZZZ-3AZZ, and is about 0.011" thick. The third co-extruded layer 8804 includes regrind material derived from skeletal scrap recovered from the tray thermoforming process, and is about 0.0015" thick. The fourth co-extruded layer 8806 includes a blended mix of about 60% Eastman 9921 and about 40% Eastman 6763 and is about 0.002" thick. The overall thickness of the material shown in FIG. 232 is about 0.0165" thick.

FIG. 233 shows a multilayer, coextruded plastic sheet including three layers. Beginning with the uppermost layer, the first co-extruded layer 8900 includes a blended mix of about 20% Eastman 6763, 50% Eastman 9921, and about 30% of regrind material. The first layer 8900 is about 0.0025" thick. The second co-extruded layer 8902 includes a mix of blended and foamed Eastman 9663 and Eastman additive G4ZZZ-3AZZ. The second layer 2918 is about 0.011" thick. The third co-extruded layer 8904 includes a mix of about 20% Eastman 6763, about 50% Eastman 9921, and about 30% regrind material. The third layer 8904 is about 0.0025" thick. The overall thickness of the sheet material of FIG. 233 is about 0.016" thick.

FIG. 234 shows a multilayer, coextruded plastic material constructed according to the present invention. The sheet material includes five layers. Beginning with the uppermost layer, the first co-extruded layer 9000 includes a blended mix of about 50% Eastman 19411 and about 50% Eastman 6763. The first layer 9000 is about 0.0015" thick. The second co-extruded layer 9002 includes a blended mix of about 90% Eastman 9921 and about 10% of regrind material derived from skeletal scrap recovered from the tray thermoforming process. The second layer 9002 is about 0.006" thick. The third co-extruded layer 9004 includes a blended mix of about 90% of regrind material derived from skeletal scrap from the tray thermoforming process and about 10% of Eastman 9921. The third layer 9004 is about 0.003 inches thick. The fourth co-extruded layer 9006 includes a mix of blended and foamed Eastman 9663 and Eastman additive G4ZZZ-3AZZ. The fourth layer 9006 is about 0.019 inches thick. The fifth co-extruded layer 9008 includes a mix of about 90% Eastman 9921 and about 10% of regrind material. The fifth layer 9008 is about 0.0005" thick. The overall thickness of the sheet material of FIG. 234 is about 0.03" thick.

FIG. 235 shows a multilayer, coextruded plastic sheet material constructed according to the present invention. The sheet material includes five layers. Beginning with the uppermost layer 9100, the layer 9100 includes about 50% blended Eastman 6763 and about 50% Eastman 19411. The first co-extruded layer 9100 is about 0.0015" thick. The second co-extruded layer 9102 includes about 10% blended Eastman 9921 and about 90% regrind materials derived from skeletal scrap recovered from tray thermoforming process. The second layer 9102 is about 0.0015" thick. The third co-extruded layer 9104 includes blended and foamed Eastman 9663 and Eastman additive G4ZZZ-3AZZ. The third layer 9104 is about 0.010" to about 0.019 thick. The fourth co-extruded layer 9106 includes about 10% blended Eastman and about 90% regrind materials derived from skeletal scrap recovered from tray thermoforming process. The fourth layer 9106 is about 0.0015" thick. The fifth co-extruded layer 9108 includes about 50% blended Eastman 6763 and about 50% Eastman 19411. The fifth layer 9108 is about 0.0015" thick. The overall thickness of the sheet material of FIG. 235 is about 0.016" to 0.025" thick.

Referring now to FIG. 236, a cross-sectional view through a portion of material constructed according to the present invention is shown. Polyester sheet material is co-extruded in a three layer construction having two outer layers 9200 and 9202 of Eastman APET 9921 (each about 0.002" thick) and an inner layer 9204 of foamed Eastman 9663 with an Eastman recommended quantity of Eastman melt strength enhancer G4ZZZ-3AZZ. Inner layer 9204 is about 0.015" thick. Inner layer 9204 is foamed with a suitable quantity of nitrogen gas, substantially excluding air from the foam cells. The total thickness of co-extruded sheet is approximately 0.019" thick. The gas barrier properties of the outer layers of Eastman 9921 are such that air will be substantially prevented from permeating into the inner layer of foamed polyester. Sections of the material have been compressed so as to solidify the inner layer of foamed Eastman Polyester 9663 with the melt strength enhancer. Both edges of co-extruded sheet are sealed together, by any suitable sealer, in some instances after co-extrusion and prior to winding onto a roll. Sealing edges substantially prevents air from permeating into inner layer 9204 of foamed polyester. Material is wound onto a roll and is then stored, suitably in a temperature controlled storage area and at a temperature below 10° C. Following storage, the roll of co-extruded polyester material is substantially converted into trays of a desired profile and size by a thermoforming apparatus as herein described above. Referring now to FIGS. 238 and 239, a non compress composite sheet is shown in FIG. 238 and its compressed state is shown in FIG. 239. FIG. 237 shows one embodiment of a tray 9206 having compressed flanges 9208, wherein a lidding web material 9210 has been sealed to the upper exterior surfaces of the web lid material 9210.

3.12. Master Containers

In a further aspect of the present invention, a master container is provided to hold any number of finished and packaged trays. Master containers made according to the present invention include a plurality of packaged trays that can, in some instances, be stacked, evacuated and flushed with desirable gases, followed by sealing of the master container. In this manner, the shelf life of the individual packages is enhanced.

Referring now to FIG. 240, one embodiment of a master container constructed according to the present invention is shown. The master container 9300 can be thermoformed from substantially gas barrier materials such as unplasticized PVC or alternatively a coextruded material including amorphous polyethylene terephthalate and polyethylene glycol. The material can be formed with the polyethylene glycol layer on the inside allowing exposure to the web of PVC material for heat sealing. The master container 9300 includes flange 9302 located around the periphery of the upper portion of the container 9300. The master container containing finished packages 9304 with perishable goods therein can be evacuated and flushed with a gas of suitable composition. In some instances, the trays encased within the master container can include apertures and channels that allow for the evacuation of the trays along with the master container. However, in other instances the trays will have already been packaged in a substantially oxygen reduced environment, therefore there would be little need to evacuate the interior of the trays along with the master container. In this instance, care must be taken not to rupture the already hermetically sealed packages in the master container. Still in other instances, the master container is packaged in an enclosed conduit with a suitable gas provided therein. In this instance, the master container need not be evacuated as the master container is continuously exposed to a suitable gas. However, in most if not all aspects, a suitable gas, which substantially excludes oxygen will be provided in the interior of the master container and hermetically sealed by a web of material to the master container flange 9302.

Still referring to FIG. 240, a plurality of trays 9304 are positioned in a master container 9300. In one instance, the trays can be stacked in a 3 high by 4 wide array. In accordance with the method of the present invention, the master container 9300 can then be evacuated and flushed with substantially oxygen free gases. At the same time, the individual packages 9304 are evacuated through the apertures 9306 and flushed with inert gases that enter the individual packages through apertures 9306 as well. A package formed in accordance with the present invention allows the use of relatively large aperture 9306, which in turn enables very rapid evacuation and gas flushing of the individual packages. With the disclosed system, it is estimated that only a few seconds will be needed to completely evacuate and gas flush the master tray 9300 and individual trays 9304. After the containers are evacuated and flushed, a master web 9308 is heat sealed to the top of the master tray 9300. To form a completed master tray 9300, if desired, an oxygen absorber may be inserted in the master tray 9300 so that it is assured that the residual oxygen content in the package will stay below about 0.05%. This low level of oxygen is required to prevent irreversible oxidation of the deoxymyoglobin in the red meat and formation of metmyoglobin. Although, trays with apertures and channels have been described above as suitable to use with master containers, in another aspect, it is possible to use trays made from any material, barrier or otherwise. In one aspect, the trays are built with thin walls so as to enhance the permeability of the oxygen therethrough. Selective thinning of tray areas, specifically at the tray cavity and/or the base members will allow rapid oxygen transmission, and in some instances can result in equilibrium with the external environment in less than five minutes. However, greater times are possible. Furthermore, in this aspect, there need for any holes for communicating from the tray interior to the tray exterior is obviated. Thus, it is one aspect of the present invention that tray walls can be made of thermoformable materials such as polypropylene having walls no greater than, in one instance, 1 mil. It is apparent, however, that tray walls can be made to any suitable dimension that will achieve gas permeability, the dimension given here being only illustrative of one embodiment.

Once the package reaches its destination, it can be stored for several days in a sealed condition. When it is time to display the meat, the master web 9308 is removed from the master tray 9300 and the individual packages can be weighed and labeled in accordance with the description provided herein. At that time, oxygen reenters the individual packages 9304 through the aperture 9306 as well as through the substantially gas permeable web 9308. However, in the alternate embodiment where no apertures are provided, the oxygen permeates through the relatively thin walls. The oxygen converts the deoxymyoglobin in the red meat to oxymyoglobin, giving the meat a very fresh red appearance.

Figure 17:
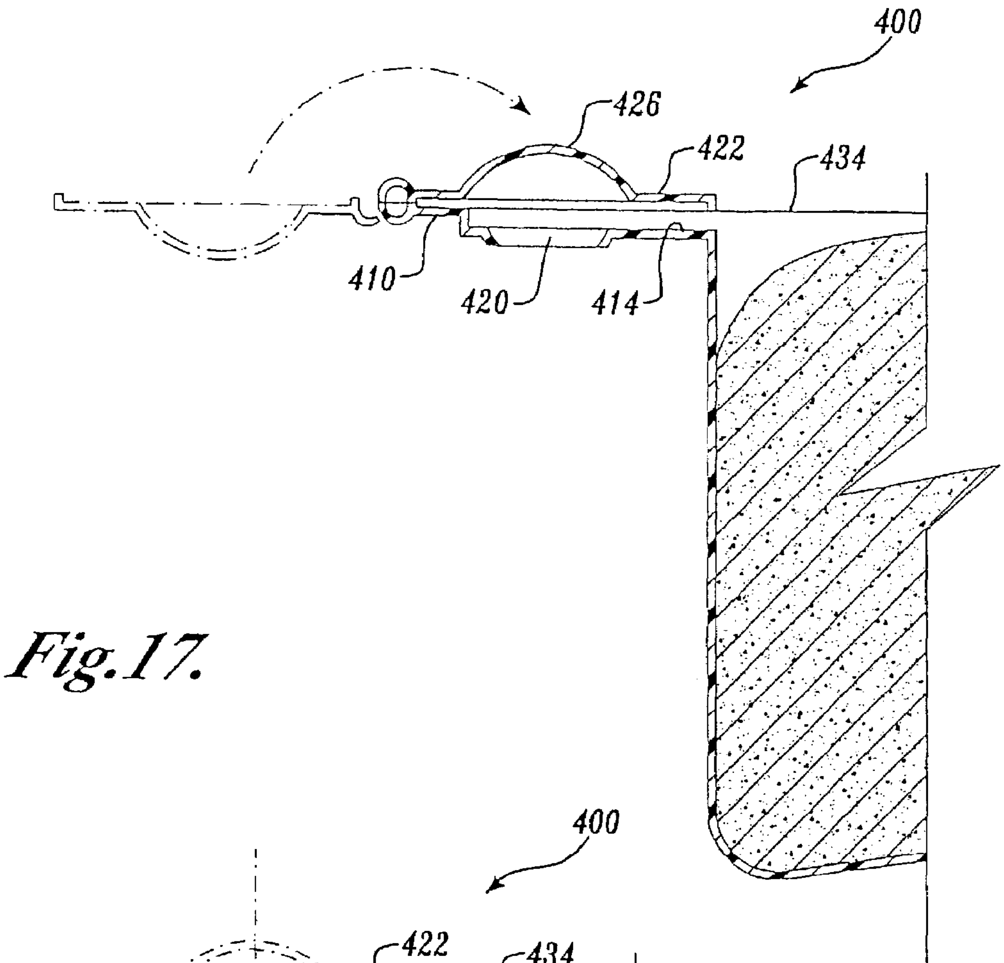
FIG. 17 shows a side illustration of a tray portion according to the present invention.
Figure 18:
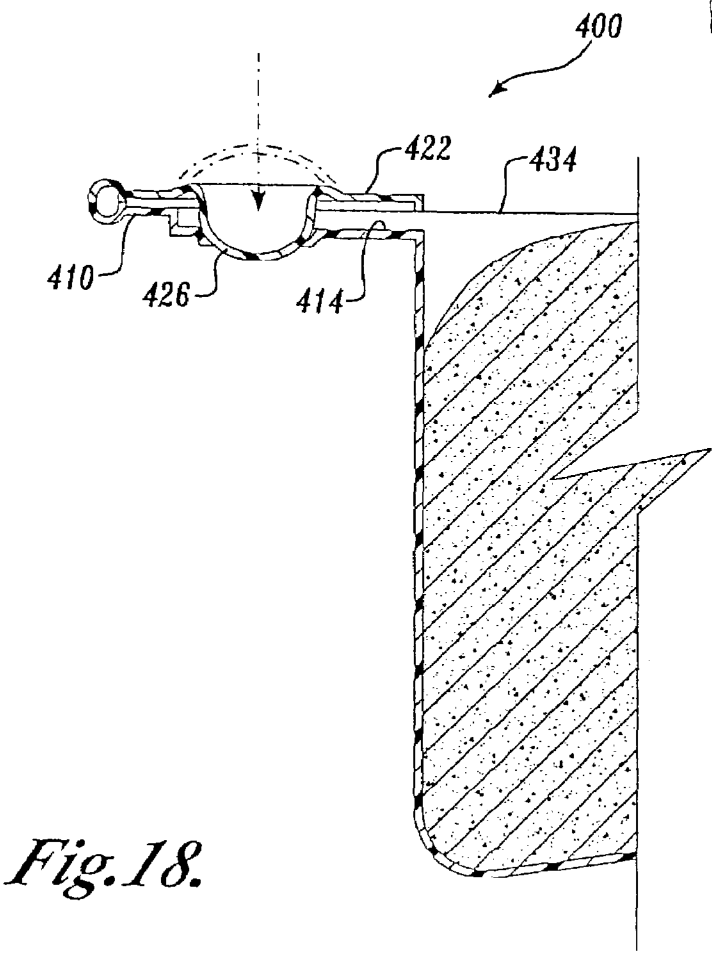
FIG. 18 shows a side illustration of a tray portion according to the present invention.

In one particular embodiment, before placing the package in the display case, the dimple 426, one embodiment of which is shown in FIGS. 17–18, is depressed so as to close the aperture 420 which prevents the entry of undesirable elements such as insects into the package, and also substantially seals the package so that juices from the red meat cannot escape from the container if it is tipped on end.

Referring now to FIG. 241A, an alternate master container can be provided as a bag container 9400. Trays constructed according to the present invention can be stacked conveniently atop one another because the trays have been provided with flaps to provide a ledge for a tray to rest atop an underlying tray. Once trays are placed inside a master container bag 9400 as shown in FIG. 241A, the gas inside the master container bag and trays can be evacuated through opening 9402. Trays constructed according to the present invention include valves or otherwise which allow the interior of sealed trays 9404 to also be evacuated, and then flushed with a gas of desirable composition. As mentioned above, the trays included within any master container may have already been hermetically sealed with a desirable gas, and therefore evacuation of the trays need not occur with evacuation of the master container; and therefore, evacuation of the master container should not pull such a vacuum as would rupture the already hermetically sealed trays. The gas is substantially oxygen-free so as to reduce oxidation of the edible products in the packages during storage. The number of cycles which are necessary to lower the level of the undesirable gas will vary. Once the master container bag reaches an intermediate processing station prior to delivery to the location at the point of display, it can be opened and flushed with high oxygen atmosphere containing about 80% $O_2$ and about 20% $O_2$. The packages can be weighed and labeled in accordance with the description herein provided.

While the description above has been made with reference to beef, it is to be appreciated that this method of packaging can be advantageously used for other types of high value products such as tomatoes, grapes, peaches and the like.

Referring again to FIG. 241A, an alternative and or in addition to evacuating the master container bag 9404, an oxygen absorber 9406 such as an iron compound is placed in the interior of the master container bag 9404. Thus, instead of or additionally to evacuating and flushing with an inert or substantially oxygen free gas, the oxygen-absorbing compound quickly absorbs all remaining oxygen in the bag leaving only nitrogen and other inert gases, or carbon dioxide that will not adversely affect the condition or value of the food or red meat products in the containers.

In practice, it is possible that some or all features described above will be incorporated into individual retail package structures to enhance the evacuation, flushing or exchange of gas. In addition, small microperforations in the overlying web may be employed to allow more rapid gas/air exchange than would otherwise occur through a substantially gas permeable material such as plasticized polyvinyl chloride. Such microperforations would facilitate more rapid reoxygenation of the deoxymyoglobin and generation of a desirable bright red meat color.

Referring to FIGS. 241B and 242, in yet another aspect of the present invention, the master container 9600, which can be packaged with one or more finished packages 9602 contained therein. The master container and packages may be located inside a pressure vessel that is arranged to operate as a vacuum chamber with gas flushing capabilities. After location of the "loaded master container" inside a pressure vessel, the pressure vessel is closed and sealed from atmospheric air and substantially all air is evacuated to a desired and predetermined level. Following evacuation, the pressure vessel can be filled with a desired gas such as carbon dioxide to a predetermined, controlled and maintained pressure, above atmospheric pressure, such as 12 psi or up to 250 psi or higher, and held at a predetermined pressure for a period of time that will allow sufficient carbon dioxide gas to dissolve in the perishable goods contained in the finished packages in the master container. Carbon dioxide gas can be held at the pressure, for a period of time, as required to prolong the subsequent storage life of the perishable goods. Following the period of time, the gas pressure may be lowered to a pressure equal to that of the prevailing atmospheric pressure and a gas barrier lid then hermetically sealed to the flanges of the master container prior to opening the pressure vessel and removing the master container. One aspect of the present invention is locating a master container 9600, with finished packages such as those shown as 9602 contained therein, into a suitable pressure vessel. One aspect of the present invention is closing and sealing the pressure vessel so as to isolate it from atmospheric air. One aspect of the present invention is evacuating substantially all air from within the pressure vessel. One aspect of the present invention is providing a gas such as carbon dioxide in the pressure vessel at a pressure above atmospheric pressure. One aspect of the present invention is holding the pressurized carbon dioxide provided in the pressure vessel for a period of time sufficient to enhance the keeping qualities of the perishable goods contained in the finished packages 9602 for an extended period. This period can vary but is influenced by conditions such as pressure and temperature, gas composition, and diffusivity coefficients. One aspect of the present invention is lowering the gas pressure within the pressure vessel to a level equal to the prevailing atmospheric pressure. One aspect of the present invention is hermetically heat sealing a gas barrier lid to the flanges of the master container so as to substantially exclude oxygen gas from inside the master container. One aspect of the present invention is removing the master container from the pressure vessel automatically. One aspect of the present invention is locating another master container in the pressure vessel by automatically repeating the above steps in an automatic fashion. One aspect of the invention is placing and sealing the master container into a finished shipping case as shown in FIG. 242, which may be constructed of cardboard material with a crush test rating of 44 lbs. per inch, or any other suitable crush test rating as required. One aspect of the present invention is shipping the finished container to another location. One aspect of the present invention is removing the finished packages from the finished shipping case and allowing atmospheric air to penetrate through the apertures in the finished package. While the present invention has been described with reference to the above mentioned aspects, it is to be appreciated that deviations therefrom are within the scope of the present invention, the steps performed above being illustrative of one embodiment.

Referring now to FIG. 243, a cross-sectional view through an assembled and finished master container 9700 is shown inside a closed and sealed corrugated cardboard carton 9702. Two finished packages 9704 and 9706 are shown inside the master container 9700. As can be seen, the extended flaps of the upper finished package 9704 provide a recess to accommodate the upper surface dome of the lower finished package 9706 thereby providing protection to the perishable goods contained therein. The master container 9700 may be thermoformed from a web of flexible, substantially gas barrier, plastic material such as Curlon Grade 9315-II as manufactured by Curwood of Oshkosh, Wis. and can be provided so as to tightly hold the finished packages. A substantially gas barrier lid 9708 that is provided from a web of plastics material such as Curlam Grade 2500-K as manufactured by Curwood of Oshkosh, Wis., is shown heat sealed to the flange of the master container 9700. The seal 9710 between the lid and the master container will in some instances be a peelable seal that can be peeled with relative ease by any person wishing to open the sealed master container. A desired gas 9712 is contained within the hermetically sealed master container and an oxygen scavenger 9714 is located therein. Further, the lid of a master container may contain a relief valve to allow escape of any excess gas that may be released from solution in the meat and to accommodate for an expansion of the master container.

The sealed, gas barrier, master container 9700 is located in a corrugated cardboard carton 9702. The corrugated cardboard carton 9702 may be manufactured by the Weyerhaeuser Corporation, of Tacoma, Wash. from 69/40/69, 5100 flute corrugated cardboard and such a construction will withstand substantial loading.

An enlarged view of the seal arrangement is shown in FIG. 244. As is shown, the seal, provided in a horizontal disposition, can occupy a substantial amount of volume in the master container. An alternative configuration showing flange of master container in position after folding inwardly is shown in FIG. 245, and is shown to occupy less volume in the master container. In this embodiment, the corrugated cardboard carton is just large enough to contain the master container but the flange of the master container is folded inwardly to allow the sides of the master container to be in close contact with the inner surface of the carton, thereby reducing the size of the carton to a minimum.

3.12.1. Embodiment

Referring now to FIG. 246, details of a vacuum and modified atmosphere packaging and sealing apparatus is shown. The apparatus 9000 can be used to hermetically seal a web of material over the open end of a master container plastic bag or pouch. In one aspect, the master container bag or pouch can be filled directly with any suitable processed product, such as pet food morsels, as will be described herein below. However, in still other aspects, a master container bag can be used to contain one or a plurality of packaged trays. The web of material and pouch may include substantially gas barrier materials and the hermetically sealed pouch and web can be used for any useful purpose, such as vacuum packaging meat primal portions or to contain one or more retail packages, or pet, food morsels, thereby providing a master package which can be subsequently packaged inside a suitably sized shipping carton.

Still referring to FIG. 246, the apparatus 9800 includes a lower vacuum chamber 9802, that is suitably mounted with a driver (not shown) attached to a shaft 9804, an upper vacuum chamber 9806 that can suitably be stationary. The upper chamber 9806 includes a moveable heat bank 9808, attached to a driver (not shown) via shaft 9810 and suitably mounted between the upper and lower vacuum chambers, and a web unwinding assembly 9812 arranged to allow controlled unwinding of web material 9814 from roll 9816. A conduit 9818 is connected to upper vacuum chamber 9806 and a conduit 9820 is connected to lower member 9802. Both conduits 9818 and 9826 can be connected to a suitable source of vacuum and/or supply of suitable gas, such as any amount of carbon dioxide or nitrogen. The upper vacuum chamber 9806 is fitted with a suitable rubberized sealing member 9822 which is attached to the rim of the vacuum chamber 9806 on a lower portion thereof and a corresponding and matching sealing member 9824 is mounted to a rim of lower member 9802 on an upper portion thereof, so that when the upper and lower vacuum chambers are closed and held together, members 9822 and 9824 are in intimate contact with each other, thereby providing an enclosed vacuum chamber that is sealed from ambient atmosphere with space 9826, for any suitable container, contained therein. Web unwind assembly 9812 is arranged to unwind material 9814 from the roll of material 9816, as required, and locate the web between the upper and lower vacuum chambers. In this way, suitable portions of the material 9814 can be automatically unwound by the web unwind assembly and clamped between sealing members 9822 and 9824, so as to position web material directly above any container that is desired to be sealed.

Referring now to FIG. 247, it can be seen that a first rim at 9824 is extended vertically beyond a second rim at 9830 such that when web 9814 is clamped between members 9802 and 9806 a space 9832 between the web 9814 and the rim at 9830 is provided. Sealing members 9824 and 9822 follow adjacent paths at perimeters of the respective members 9802 and 9806, such that when the vacuum chambers 9802 and 9806 are closed together a completely sealed and defined space 9826 is provided therein. In this way, space 9826 can be evacuated and substantially all air contained therein removed, as required, and then space 9826 can be filled with suitable gas such as nitrogen, carbon dioxide ($CO_2$) or any other suitable blend of gases, at a suitable pressure, via conduits 9818 and 9820.

Referring now to FIG. 248, a three dimensional sketch is shown of the lower vacuum chamber 9802. The lower vacuum chamber 9802 can be manufactured from any suitable material such as stainless steel. It can be seen that vacuum chamber 9802 includes a rectangular profiled component with vertical walls and a rectangular depression 9834 provided therein; two parallel and continuous rims, an inner rim 9830 and an outer rim 9824 are provided with a recess 9836 between the parallel rims. Rim 9830 is concentric with rim 9824 having the larger perimeter. A suitably sized pouch 9838 can be located in the depression 9834 and the "mouth" 9840 of the pouch can be draped over the rim 9830 such that the mouth of the pouch is tensioned around and over the external and upper surface of rim 9830. A vacuum source can be provided to recess 9834, via conduit 9820, such that the pouch can be drawn against the internal walls of the depression 9834, prior to closing the upper and lower vacuum chambers together. In this way, the mouth portion of the pouch 9838 can be tensioned across the rim 9830 in such a manner so as to ensure that no creases are present in the pouch mouth section that is located directly adjacent (and above) the rim 9830. Any suitable stretching devices may be provided that will stretch the mouth section of the pouch and ensure that no creases are present, thereby allowing subsequent and effective sealing of the web 9814 to the pouch when required. Following loading of goods into the pouch 9838, the upper 9806 and lower 9802 vacuum chambers can be closed to provide a substantially enclosed chamber and any undesirable ambient atmosphere containing oxygen may be evacuated, followed by flushing with a desirable gas or gases. This cycle may be repeated to ensure that substantially little to no oxygen remains in the chamber or pouch.

Referring now to FIG. 247, heat bank member 9808 can be activated so as to provide heating and sealing of a section of web 9814 to the mouth of the pouch around the full continuous length of rim 9830. An automatic cutting device 9842 can be arranged so as to provide suitable cutting and severing of the web 9814 after sealing the pouch 9838. In this way, web 9814 can be hermetically sealed to the mouth section of the pouch 9838 so as to completely seal and enclose any space and goods that may be located in the pouch prior to sealing of web 9814 thereto.

Any suitable method of manufacturing a suitable pouch with adequate gas barrier properties may be employed to manufacture the pouches used as master containers. For example, the pouch may include a suitably sized, multi-layer plastics tube, extruded from an annular die with specified layers of material that provide all gas barrier and sealing properties and features required. Such a tube may be extruded and cut into suitable lengths and then heat sealed to close one end of each length of tube, in any suitable fashion, to produce pouches and, if required, a valve may be fitted to the wall of the pouches. The valve can be arranged to allow excess gas such as carbon dioxide, that may be generated in the pouches after sealing with goods, such as carbonized retail packaged ground meat, therein. In other instances, the pouch may be produced having a layer of foil. The foil layer may be manufactured in any suitable manner that is known and incorporated within the bag or pouch as an enhanced barrier material.

Referring to FIGS. 246 and 248, a grouping of several members 9800 may be arranged by attaching each to the upper surface of a suitable conveying device such as a horizontally disposed carousel style, circular table of suitable size arranged with a suitable driver to intermittently rotate the carousel. In this way, pouches could be automatically loaded into each lower vacuum chamber 9802, consecutively and immediately prior to loading goods into the pouch. After loading the goods, the carousel can rotate so as to locate the loaded member 9802 directly under upper vacuum chamber 9806 and web unwind assembly so as to allow sealing of a section of web 9814 thereto. In this way, an automatic and semi-continuous packaging process can be arranged to automatically open the pouches, manually or automatically load pouches into member 9802, fill the pouch with goods, evacuate and gas fill the pouch with goods therein and then heat seal a web of material 9814 over and to the mouth of the pouch. An automatic ejection device can be provided that may include a method of relaxing tension in the pouch mouth and lifting the sealed and finished pouch (with goods therein) from member 9802 and then locating the finished pouch into a carton prior to closing the carton and sealing the finished pouches therein.

3.12.2 Embodiment

Referring to FIG. 249, yet another embodiment of an apparatus 9900 for producing a master container with finished packages is shown. Equipment 9900 includes an upper chamber 9902 and a lower chamber 9904. A master container 9906 with finished packages 9908 is contained within lower chamber 9004. The operation of this apparatus is in many respects similar to the apparatus of FIGS. 246–248, with respect to including both an upper and lower chamber with one or the other chamber being located on a movable conveyor or carousel. Master container 9906 is loaded with finished packages 9908, and located in the lower vacuum chamber 9904. A web 9910 is passed in between the upper 9902 and lower 9904 chamber portions to cover the opening in the master container 9906. The upper 9902 and lower 9904 chambers close, providing a substantially air tight seal. Air is evacuated through any number of ports 9912 and 9914. A suitable gas is flushed into the chambers. The cycle can be repeated any number of times to expel the air and/or oxygen from the master container 9906 and packages 9908. The master container 9906 is then sealed with web 9910. The vacuum chambers separate, and a new master container is located with the lower vacuum chamber 9904, which is then evacuated, flushed and sealed in the manner described above.

In yet another aspect of the present invention, the master containers can be made from a suitable material that contracts to the shape of the trays stored therein under vacuum. In this manner, any number of trays may be vacuum packed within a master container.

In yet another aspect of the present invention, the packages do not have apertures, but rather are sealed or wrapped in a web that expands to fill the voids in the master container to expel the air. In this case, the tray interiors need not be evacuated because trays are wrapped in an enclosed conduit with a low oxygen atmosphere.

3.12.3. Embodiment

Referring now to FIG. 250, details of a packaging apparatus for producing substantially gas barrier master containers and heat sealing a substantially gas barrier lid material to the master containers to produce hermetically sealed containers is shown. The following description discloses a method and apparatus for producing the hermetically sealed containers for providing a vacuum and/or selected gases in the containers at selected and variable pressures, so as to accelerate the dissolving of selected gasses into perishable goods such as red meat that may be contained therein and then exchanging the selected free gases with other suitable gases for the purpose of enhancing the keeping qualities of the perishable goods. Furthermore, the method provides for removing residual oxygen gas that may be retained within the cell structure of packaging materials such as EPS, that may be contained in the hermetically sealed master container.

FIG. 250 shows a cross-section through an apparatus intended to thermoform, load and seal master containers thermoformed from a continuous web of plastics material. The dimensions of the master containers are arranged so that they can be filled with any number of finished packages containing perishable goods such as any of the finished packages herein described. The apparatus includes a horizontal thermoforming, reel fed packing machine, similar to Model R530 packing machine manufactured by Multivac Sepp Haggenmuller GmbH & Co. of Germany, modified as herein described below.

The apparatus includes a frame (not shown) that is arranged with two horizontally disposed and parallel continuous gripper chains generally denoted as 10000 in FIGS. 251 and 252 that run almost the full length of the frame and are retained in tracks that are located on each side of the frame. Gripper chains 10000 are arranged to grip the two opposing edges of the lower web 10002 that is to be formed into the master containers, and apply suitable lateral and longitudinal tension thereto. The direction of travel of gripper chains is shown by arrow 10004 and the chain is suitably powered by an electrical motor (not shown) that is controlled electronically to carry the lower web 10002 in the direction indicated by the arrow 10004 in intermittent movements. The distance traveled by the gripper chains 10000, carrying the lower web 10002, is controlled so as to locate a suitable area of the lower web 10002 between the upper and lower sections of the thermoforming section 10006. Each intermittent movement of the gripper chains 10000 is equal in distance traveled and the apparatus can be arranged to automatically operate at a machine speed of a set number of cycles per minute which may be, in one instance, 4 cycles per minute.

During a single machine cycle, the following functions can occur. After the gripper chains 10000 cycle forward carrying a section of lower web material 10002 into position between the upper and lower sections of the thermoforming upper 10006 and lower 10008 sections close together and thermoform master containers including, in the present embodiment, three containers. A punch 10010 is arranged to provide longitudinal apertures 10012 in the lower web located between the master containers as shown in FIG. 251 and in an enlarged cross-sectional view in FIG. 253. In this manner, individual master containers can be separated from one another. Packaged trays are then loaded into the master containers in the loading section 10014 and with each machine cycle, the lower web 10002 travels forward. The gripper chain 10000 carries the lower web 10002 in the direction, a distance of a single indexing movement for each machine cycle, until the loaded master containers are located between upper chambers, generally denoted by 10016 and lower chambers, generally denoted by 10018. In one instance, a total of five upper chambers and five corresponding lower chambers are arranged such that the upper chambers 10020, 10022, 10024, 10026, and 10028 can be elevated and lowered as required. Lower chambers 10030, 10032, 10034, 10036, and 10038, are located beneath the upper chambers and arranged with powered drivers (not shown) to elevate and lower the lower chambers as required. A cross-section is shown in FIG. 251 and is typical for upper chambers 10020, 10022, 10024, and 10026 with corresponding lower chambers 10030, 10032, 10034, and 10038. Upper chamber assemblies 10016 and the lower chamber assemblies 10018 operate simultaneously so as to close toward each other and open away from each other, as required. During one indexing movement, upper chambers and lower chambers close and open once. After upper chambers and lower chambers open, gripper chains 10000 carrying the lower web 10002 move and carry the master containers forward one indexing movement. A roll 10040 of upper web lidding material 10042 is located as shown and upper web lidding material 10042 is unwound, as required, during each indexing movement, providing a length of upper web lidding material equal to the distance of the lower web forward movement. A web sealer 10044 is located one on either side of the machine in a position that allows sealing of the upper web 10042 to the lower web 10002, forming a single and continuous heat seal between the upper web 10042 and the lower web 10002, along the outer edges of the upper web 10042, along path 10046 and 10048 shown in FIG. 251. A gassing member 10050 is located between the upper web 10042 and the lower web 10002 such that when the upper web 10042 and the lower web 10002 are heat sealed together at paths 10046 and 10048, thereby encapsulating the gassing member 10050 with the upper web 10042 and the lower web 10002, in close and touching proximity to the gassing member 10050. The gassing member 10050 is attached and fixed to the machine at the entry end to the upper and lower chambers assembly and otherwise floats along its entire length. Gas ports 10052 and vacuum recesses 10054 are machined in the gassing member 10050, such that the gas ports 10052 provide direct communication from a suitable gas source separately to each lower chamber location 10030, 10032, 10034, and 10036, thereby introducing into the master containers chosen gases separately and during each indexing of the machine. Vacuum recesses 10054 provide communication between the master containers and a vacuum source via apertures 10056 in lower web and vacuum ports 10058.

During each machine index, upper chamber assembly 10020 and lower chamber assembly 10030 close toward each other with a clamping force, clamping the upper web 10042 and lower web 10002 with gassing member 10050 therebetween, such that master containers 10060 in lower web are enclosed in the cavity of the lower chamber 10018.

Referring now to FIG. 253, the upper chamber 10020 is clamped against the upper web 10042 and the lower chamber 10030 is clamped against the lower web 10002 with the gassing member 10050 between the upper web 10042 and the lower web 10002, which are sealed along path 10048. Seals 10062 are provided as required and as can be seen in this closed position, the upper chamber 10020 and the lower chamber 10030 provide a substantially airtight assembly. After closing of the upper 10020 and lower 10030 chambers together, a vacuum source is connected to vacuum ports 10058, which substantially evacuates all air from within the lower chamber and draws the master containers to fill the lower vacuum chamber. After evacuation of the master containers, a suitable gas which may be selected from those gases listed herein, is provided through gas port 10052 and into the master containers 10060. The suitable gas is provided at a pressure that exceeds ambient atmospheric pressure and may be provided at a pressure greater than 0 psi to about 200 psi or more. The gas can be retained at the desired pressure for a set period of time, which in some instances, can be about one or more seconds. After the set period, suitable gas pressure is reduced to slightly above ambient atmospheric pressure so as to maintain a positive pressure within the master containers but not at such a high pressure that may cause rupturing of the seal between the upper and lower webs at seal paths 10046 and 10048, after opening of the upper and lower chambers.

The upper 10020 and lower 10028 chambers assembly are then opened and the master containers index forward so as to be located directly between upper chamber 10020 and lower chamber 10028. The upper and lower chambers assembly is then closed and the evacuation and gassing sequence as described for upper chamber 10020 and lower chamber 10030 is repeated, however, the gas provided through the gas port into the closed upper and lower chambers may be a different gas or similar gas. This sequence of evacuation and pressurized gassing is repeated for upper chambers 10024 and 10026 with corresponding lower chambers 10034 and 10036. It should be apparent that any number of vacuum chamber assembly sets can be provided in order to practice the invention.

Referring now to FIG. 252, a cross-sectional view through the last upper chamber 10028 and lower chamber 10038 with heat bank 10064 is shown. It can be seen that gassing member 10050 has been extracted to allow bonding of the upper web 10042 to the lower web 10002. Upper chamber 10028 and lower chamber 10038 close against each other and heat bank 10064 heat seals the upper web 10042 to the lower web 10002, at a path that follows the perimeter fully around each master container, so as to hermetically heat seal the upper web 10042 to the lower web 10002 with suitable gas contained therein. Upper chamber 10028 and lower chamber 10038 open to allow the hermetically sealed master containers 10066 to be carried forward toward the exit end of the machine. The master containers 10066 are slit longitudinally with a slitting device 10068 and cut laterally with a knife 10070 as shown in FIG. 250, prior to the ejection of finished master containers from the machine.

In this way, residual oxygen that is retained in the cell structure of the EPS foam trays, contained in the master containers, can be exchanged with other suitable gasses. Gasses, such as carbon dioxide can be provided under pressure so as to dissolve in any free liquids such as water and oils contained in the perishable goods, such as red meat.

3.13. Soaker Pads

In yet another aspect of the present invention, soaker pads are provided herein to be used in any one of the disclosed tray embodiments. Soaker pads provide materials to absorb liquids exuded by the packaged goods. In one aspect, soaker pads constructed according to the present invention can include bacteria sensing materials to indicate the presence of undesirable contamination.

Referring now to FIG. 254, a tray constructed according to the present invention is shown. While reference and the FIG. 254 will be made to one particular embodiment of a tray, it is to be appreciated that any of the disclosed tray embodiments can include the use of soaker pads. Tray 10100 is configured similarly to that of the tray shown in FIG. 241A, and carries a soaker pad 10102 that lies on and adjacent to the bottom of the tray 101000.

Referring again to FIG. 254, the ground beef 10104 or other edible material is positioned on the soaker pad 10102 and first and second webs 10106 and 10108 of heat sealable material are placed over the tray and sealed to the horizontal flanges 10110 that extend outwardly from the upper edges of the tray 10100. In one instance, a label 10112 is included between the first and the second webs, 10106 and 10108 of a special polymeric material that has the capability of indicating the presence of *E. coli* bacteria as shown in FIG. 255. This material may be laminated into a three-layer web including polypropylene/*E. coli* sensor material/polypropylene or polyethylene/sensor material/polyethylene or any combination thereof, including more than three layers. The polymeric material employed is of the type disclosed in the paper entitled "A Litmus Test for Molecular Recognition Using Artificial Membrane," Charych, D. et al. *Chemistry and Biology*, Vol. 3, No. 2, February 1996, 3:113–120, expressly incorporated herein by reference. The lower web 10106 may be microperforated in the region of the label 10112 so that juices from the ground beef 10104 can penetrate the web and contact the label 10112. The label 10112 will change color in the presence of *E. coli* bacteria. The upper surface of the label can also be treated so that it may be printed with instructions relating to the *E. coli* test and/or information relating to the ground beef 10104 or other edible product. A detail of the webs 10106 and 10108 carrying the litmus test label 10112 is shown in FIG. 255.

Alternatively, as shown in FIGS. 256 and 257, a soaker pad 10102 can be made of a laminated three-layer webs containing as the middle layer a litmus test sensor material. In this embodiment, the absorbent material 10114 in the soaker pad 10102 is encased in an upper web 10116 of the tri-layer test material and a lower web 10118 of the same test material. It is heat sealed around the entire periphery 10120 and placed in the bottom of the tray 10100. Both webs 10116 and 10118 are microperforated so that juices from the red meat 10104 can penetrate to the absorbent layer 10114. Microperforated webs and apparatus to form microperforations are described herein above and can be used in the practice of the present embodiment of the invention. The presence of *E. coli* will be shown by a change in color of the test material in the web 10116 and 10118. It is to be appreciated that webs 10116 and 10118 are composites, made from three layers as will be described below. It should also be appreciated that soaker pads need not include an absorbent core to be used as bacteria indicators.

FIG. 258 illustrates a tray 10100 similar to that shown in FIG. 254. However, in this embodiment tray 10100 carries a plurality of ground beef patties 10122 that are interleaved with web composites 10124 including the test material. In this manner, the presence of *E. coli* bacteria can be ascertained at a variety of locations in the package.

3.13.1. Embodiment

Referring to FIG. 259, a side elevation of an apparatus for manufacture of web composites with the engineered polymerized molecular film (EPMF) of the type that detects *E. coli* 0157:H7 and indicates its presence by a change of color, is shown. Said web composites can be used in the manufacture of soaker pads when attached to an inner surface of the soaker pad. While reference is made to the *E. coli* bacteria, it is to be appreciated that other materials can be used to indicate the presence of other bacteria.

A roll of coextruded transparent, perforated, plastics material 10200, including a rolled length of web 10202, is mounted on an unwind stand 10204 and the end of the web is "threaded" around a series of drive and idler rollers 10206, 10208, 10210, 10212 and 10214 such that when drive rollers 10208 and 10214 are driven, the web 10202 is pulled over the drive roller 10208 so that the inside surface of the web 10202 contacts the surface 10216 of the water 10218 flowing through the trough 10220. The trough 10220 is connected to a Langmuir-Blodgett water trough in such a manner as to cause water 10218 to flow, from the Langmuir-Blodgett water trough, horizontally, underneath and parallel to web 10202 and at a similar rate of flow to the speed of the forward movement of the web 10202 as controlled by the rate of revolutions of drive roller 10208. The Langmuir-Blodgett water trough is provided to generate sufficient quantities of EPMF as required by the process. The EPMF floats on the surface 10222 of the water 10218 and is carried with the flow of water at a similar speed. When the web 10202 contacts surface 10222, the EPMF is transferred from the water surface to the web 10202 and travels adjacent to a drying section 10224 that evaporates any surplus water. In this manner webs with bacteria indicating means are provided which can be used in the manufacture of absorbent articles.

The web 10202 is transferred from a vertical disposition across drying section 10224 to a horizontal disposition by way of movement over the idler roller 10210. Soaker (absorbent) cores 10228 are positioned onto the surface of the web 10202 and a further perforated web 10226 is unwound from roll 10230 mounted on unwind stand 10232. The two webs 10202 and 10226, with absorbent core therebetween 10228, are transferred, between two drive rollers 10214 and into a heat sealing station 10234. The heat sealing station seals the two webs 10202 and 10226 together by applying pressure through two sets of temperature controlled heat sealing bars 10236 and 10238 shown in detail in FIG. 262. The sealed material next passes through longitudinal slitting station 10240 to slit and separate the sealed soaker pads into continuous strips and the lateral cutting station 10242 cuts across the webs thereby separating the complete soaker pads 10244 as shown in FIG. 260.

Referring now to FIG. 262, the pressure applied by seal bars 10236 and 10238 is sufficient to distort the EPMF layer 10246 and allow direct contact of the webs 10202 and 10226 to the surface of layer material 10246. EMPF layer is an ionomer resin, such as SURLYN, supplied by the DuPont Company, which readily bonds together. Webs 10202 and 10226 are composites which include an outer and inner layer 10248, 10250, 10252 and 10254, respectively, as shown in FIGS. 261 and 262.

3.14. Iron Particle Deposits

A particular aspect of the present invention will be described with reference to the tray of FIGS. 46–49, however, it is apparent that the aspect of the invention described herein below can be practiced on any of the herein disclosed trays with spaces between the tray walls and the flaps. In one aspect of the invention, coated iron particles may be deposited on any surface of a tray. A plurality of finished trays that may be conveniently stacked atop one another may be placed in a gas barrier master container which can then be evacuated of substantially all air. Ambient air that may be present within the finished tray cavities and spaces between tray walls and flaps will be evacuated through apertures and replaced with a suitable gas. The air can be replaced or displaced with any suitable gas prior to hermetically sealing the master container to provide a single container with finished packages enclosed and sealed therein. At a convenient time after sealing, the sealed master containers may be exposed to a suitable level of microwaves or magnetic field or other suitable source of energy that will selectively alter the gas barrier coating on the iron particles so as to render it permeable and further activate the iron particles to oxidize any residual oxygen that may remain within the trays and the master container. Iron particle deposit substances (IPD) may include any suitable substance that can be applied in any convenient manner to the trays so as to remain inactivated until exposed to the microwave and/or magnetic field in such a manner as to render the IPD activated. When the IPD is selectively activated by any suitable source of energy that is applied before or after the trays are loaded with goods, the IPD can react with and thereby absorb any residual oxygen gas remaining within the finished packages, in such a manner so as to inhibit the formation of metmyoglobin that may otherwise be formed as a result of available oxygen that has been released during reduction of any oxymyoglobin that may be present in the finished package after sealing the master container.

The IPD can be applied in any suitable manner to selected surfaces of the tray and/or flaps so as to not directly contact but to be in close proximity to goods that are subsequently loaded into the cavities of trays. Ground or sliced red meats may have been exposed to ambient oxygen, after grinding or slicing and prior to packaging, for such a period of time that deoxymyoglobin present in freshly cut red meats has reacted with ambient atmospheric oxygen to form oxymyoglobin. Fresh meat with oxymyoglobin may be then packaged in a substantially oxygen free gas package such as a barrier master container that has been evacuated and filled with any suitable gas that may contain less than 500 PPM oxygen. However, the amount of oxygen may be less than 95% oxygen. After packaging, the oxymyoglobin will reduce to deoxymyoglobin thereby releasing oxygen gas into the spaces in the master container. The released oxygen can then react with the deoxymyoglobin to form metmyoglobin. The metmyoglobin is brown in color and is undesirable and consumers are unlikely to purchase meat that is brown in color. The IPD substances can be provided within the finished packages in such a manner so as to substantially absorb, and thereby render inactive, the oxygen that has been released by reduction of the oxymyoglobin to deoxymyoglobin, after hermetically sealing the finished packages. In this way, the formation of undesirable metmyoglobin can be inhibited and/or minimized. In order to enhance the absorption of oxygen gas by the substance IPD, any suitable method to cause circulation and movement of any gas inside the finished package can be incorporated. Such methods may include shaking or suitable movement of the finished and sealed master containers in such a manner so as to cause gas to circulate through apertures in webs from the spaces in the tray cavities and more particularly near and over the exposed surfaces of the goods.

In another alternate embodiment, the present invention provides capsules of suitable size, in one instance, having a diameter or widest/longest/deepest dimension of less than 0.25", wherein capsules have a generally rounded, spherical or oval profile with a continuous capsule wall of any suitable thickness, in one instance approximately 0.060" thickness, with a cavity enclosed within the continuous capsule wall and wherein each enclosed capsule cavity contains a suitable quantity of any selected agent, substance or material, such as, for example, a bactericide, a water absorbing gel, and a $CO_2$ generating agent. The capsule wall may be manufactured from a material such as wax or a flexible waxy plastics material that is affected by microwaves, RF (radio frequency) or a magnetic field that is generated from a controlled source and with such an intensity that it can cause the capsule walls to rupture or soften or dissolve and to such an extent that the contents of the capsule cavities will be expelled or allowed to escape from within the enclosed capsule cavity. A suitable quantity of capsules or combination of capsules containing separate quantities of several agents, with any selected agent(s) contained therein may be enclosed, for example, within the cavity(ies) of any suitable packaging tray prior to use in a packaging application. At any time during or after assembly of such a tray with capsules contained therein, it may be exposed to the appropriate source and intensity of microwaves, RF (radio frequency) and/or a magnetic field and in such a way so as to cause the release of any agents contained within the cavity of the capsules. In this way, for example, a bactericide may be held until required for use within the package walls or base and after assembly of the package such as a tray containing fresh red meat, at which time the bactericide can be released and thereby made available to substantially kill bacteria, fungi, virus or any undesirable life form that may be dangerous to human or animal life.

In yet another aspect of the invention, iron powder that has been completely coated with a substance, such as any wax, can be included in one or more layers of a tray thermoformed from one, two, three or more layer sheet of co-extruded EPS foam. The wax coating can be arranged so as to prevent contact of undesirable substances such as water, with the powdered iron that is completely covered by the wax coating, until a suitable time. The wax coating can be arranged so as to melt or otherwise change when exposed to an electromagnetic field, microwaves or other suitable medium. The melting or change of the wax coating can allow the powdered iron to become exposed and thereby react with oxygen gas that may be present, after exposure to the electromagnetic field, microwave or suitable medium. In this way, trays formed from the EPS foam with coated iron powder contained therein, can be used to package perishable goods and when the tray with perishable goods has been over wrapped with a gas permeable web of plastics materials, can be located in a master container with a suitable gas, and all hermetically sealed so that the master container contains the over wrapped tray with perishable goods and a suitable gas. Immediately after hermetically sealing the master container, the master container can be exposed to an electromagnetic field, microwave or other suitable medium, so as to change the coating and thereby expose the iron powder and allow reaction of the iron powder with any oxygen gas that may be generated within the master container as a result of reduction of oxymyoglobin.

Immediately prior to or after loading goods such as ground or sliced meats into the tray cavities, the trays can be exposed to a suitable level of microwaves or a magnetic field sufficient to cause the wax coating to be altered and thereby allowing the IPD to react with any oxygen that is present and in contact with the IPD. In this way and due to the close proximity of the IPD to the oxymyoglobin, the oxygen that is released by reduction of the oxymyoglobin, can be quickly absorbed by the iron powder IPD as soon as it contacts oxygen.

3.14.1. Embodiment

Powdered iron is useful as an agent for scavenging free, residual oxygen gas in packaged perishable, foods. Iron particle deposits suitable to use in the practice of the present invention are supplied by the Keplon Co., Ltd. of Kanagawa, Japan have manufactured deoxidizers such as Keplon-TY suitable for use in the present invention. As exemplary of one embodiment of the present invention, reference will be made with regard to FIG. 36, but it should be readily apparent that the method herein described can be easily applied to any of the trays made according to the present invention. Powdered iron may be applied to the inner surface of the outer cover of any tray, in such a manner so as to become activated by water that may be provided in the adhesive layer. Furthermore, when the outside surface of foam 948 (see detail in FIG. 36) is arranged to have a capacity to absorb liquids, such liquids can be retained and substantially prevented from escaping from within the finished package. Additionally, a suitable adhesive can be provided between the tray flange rim 944 and the outer cover 920 where the continuous flange rim 944 is in contact with the outer cover 920.

Powdered iron can be used as an oxidizing agent and removal of oxygen gas from within a hermetically sealed, gas barrier package. Powdered iron may be applied, in combination with other suitable sealing substances and agents, to the surface and in some instances to an inner surface of the outer cover 920 at locations that will become in direct contact with underside of the base of tray. The iron powder can be applied to outer cover 920 in such a manner so as to allow subsequent activation by water that may be contained in the adhesive layer when applied to the under surface of the base of tray, at the time of over wrapping the tray with perishable goods therein, and when cover 920 contacts the base of tray.

Prior to application to the inner surface of the outer cover 920, the powdered iron particles may be coated with a suitable coating including a suitable protecting substance or blend of protecting substances, such as wax, that can provide a protecting layer over the complete outer surface of the iron powder particles thereby protecting and isolating the iron powder particles from direct contact with water or other substances that may cause the iron powder to oxidize. The protecting layer can thereby remain in the protecting condition until the coating is altered to allow water to permeate therethrough or otherwise contact the iron particles. The coating may be altered at, for example, a convenient time after complete or partial assembly of the finished packages by exposing to an electromagnetic field of such intensity or in such a manner as to induce generation of heat in the particles of iron. Generation of heat in the iron particles by, for example, exposure to an electromagnetic field, may be induced by a suitable frequency of alternating electric current. Generation of heat in this manner may cause the protecting coating to release water or allow water from adhesive layer to contact and thereby activate the powdered iron to oxidize. Oxidation of iron powder in this way can result in absorption of residual oxygen that may be present inside the master package. Any suitable coating that possesses the required chemical and physical properties may be used to coat the iron powder. In this way the iron powder particles can be maintained in a protected and "dormant" condition until required to absorb oxygen such as after sealing of the package and when enclosed within a master container.

Perishable food products produced, in part or otherwise, in the manner described herein may be placed in any suitable tray with or without any suitable substance and over wrapped with any suitable web of material such as pPVC and then placed in a master container that may be manufactured from a substantially gas barrier material or partial gas barrier material to provide finished packages. Following this, finished packages may be stored in any suitable storage room maintained at any suitable temperature until required for sale, at which time finished trays may be removed, labeled and displayed for sale in a retail outlet such as a supermarket as herein described below.

Any suitable substance, gas, blend of gases, solution or agent may be substituted, included as an alternative or included with any suitable gas or blend of gases that has been specified for any use or application in this disclosure.

4. Processing

In one aspect of the invention, any vessel, equipment or line carrying product may be provided with a suitable gas, which may be substantially low in oxygen to enhance the quality of the product. Furthermore, it is possible that any number of suitable gasses or gas combinations can contain flavoring or bactericides. One such gas can be carbon dioxide. Carbon dioxide can be used as a carrier gas for various agents. For instance, two streams of carbon dioxide may be introduced into the process at a suitable point. Such as by injection into all pre-blenders in all streams of grinds. The streams of carbon dioxide, which may be in gaseous or liquid form, can be arranged in pairs such that each single stream of each pair becomes mixed with the other so as to allow mixing of the two streams (in each pair) there together. One stream of carbon dioxide may carry citric acid, while a second stream of carbon dioxide may carry sodium chlorite. Upon mixing of the two streams acidified sodium chlorite, is produced which in turn causes production of chlorine gas, which acts as a sanitizing agent. The use of carbon dioxide as a carrier advantageously eliminates or reduces the amount of water that is introduced into the process. An optional, "Clean In Place" (CIP) System for sanitizing equipment constructed according to the present invention comprises a stainless steel frame, recessed and embedded into a profiled concrete floor with horizontal, exposed, equipment tracks. Any equipment made in accordance with this invention, can be made as a split casing to allow the upper casing to be removed and suspended for cleaning. A specifically designed, floor drainage system, installed to suit the equipment layout is required. A computerized "Robot" suspended overhead is programmed to direct suitably heated, pressurized water with automatically measured quantities of sanitizer, according to a specified program that ensures complete, consistent and thorough clean down in a "lights-out" condition. Primary benefits are rapid sanitizing (in less than 33% of the time required with a manual sanitizing process) while maintaining normal standards as required by authorities. It is anticipated that the economic use of sanitizers, labor cost reduction, virtual elimination of typical damage to equipment by sanitizing crews will increase the amount of time that the equipment is up and running "up time". Thus, the present invention can advantageously yield a ROI of less than 18 months.

4.1. Pre-Conditioning Conduits

Pre-conditioning of the goods, prior to loading into the trays can reduce the quantity of oxymyoglobin formed immediately after slicing or grinding of the goods but before packaging and sealing in the master container. Pre-conditioning suitably takes place inside a conduit. Conduits, without limitation, include grinders, blenders, measuring devices, pumps, portioners, extruders, packagers, slicers, etc. The pre-conditioning can include the process of exposing the goods to carbon dioxide or any suitable gas at any suitable pressure or high pressure before, during and after slicing, grinding, blending and packaging. In one aspect of the invention, the goods are exposed to a substantially reduced oxygen environment. The goods can be exposed to the gas at elevated pressure in such a manner that the gas becomes highly soluble in liquids and oils present in the goods, and dissolves in the liquids and oils. The goods can be exposed to high pressure gas for an adequate period of time to allow saturation of the liquids with soluble gas. Saturation of liquids and oils will therefore occur at the high pressure. Therefore, when goods are removed from exposure to high pressure gas and returned to exposure to normal ambient atmosphere for subsequent packaging into finished package and/or master container, gas (or gases) that have dissolved in the liquids and oils will be then exposed to a lower gas pressure. Gas that has dissolved under the high pressure into liquids will be "released" and return to a gaseous condition. The release of gas will occur at the surface of goods and during this event, any oxygen that is present in atmospheric air will be inhibited from contacting the surface of the goods. This procedure can therefore provide a method to transfer, grind, blend, slice and package goods while reducing and minimizing the formation of oxymyoglobin prior to packaging and consequently minimizing the otherwise corresponding formation of metmyoglobin after packaging in the manner described herein.

In one aspect, a pre-conditioning process according to the invention can also include the method of lowering the temperature of the goods to any suitable "pre-conditioning" temperature, which in one instance may be about 28° F. prior to slicing and/or subsequent immersion in high pressure gas with exposure thereto. After removal of the goods from immersion in and exposure to high pressure gas at a lower temperature the goods will be exposed to ambient atmospheric conditions which will be at a higher temperature and lower gas pressure. After packaging the goods in the finished package and/or master container, the packaged goods can be stored and maintained within a suitable temperature range that may be higher than the "pre-conditioning" temperature. The pre-conditioning temperature may be maintained within a range of approximately 29 to 32° F. The suitable post conditioning temperature range may be maintained between 33 to 36° F. The difference between the pre-conditioning temperature and the post conditioning temperature may be less than 15° F.

4.1.1. Embodiment

One apparatus for pre-conditioning perishable goods, such as meats, is illustrated in FIG. 263. Goods may be pre-conditioned by passing through a first tube at a suitable pressure where the first tube has a given diameter and is centrally located within a second tube that has a diameter that is greater than the first diameter, in one instance, the second tube can be greater by about one inch or more and thereby provide a space between the outer surface of the first tube and the inner surface of the second tube. A temperature controlled liquid, such as brine or glycol, can be provided in the space between the first and second tubes and thereby provide cooling or heating that will allow temperature controlling of goods that are present in the first tube. A specified and controlled quantity of any suitable gas at any suitable temperature and pressure can also be provided in the first tube with goods so as to provide a controlled way of dissolving suitable gasses into the goods. The goods with the gas can be held in the first tube for a suitable period of time so as to allow the gas to dissolve into the liquids and oils in the goods at a suitable temperature. The first tube can be filled with compacted goods in such a manner so as to restrict any gas, that is provided therein, from escaping or leaking there from. The first tube may be provided with mixer therein to allow mixing of goods contained therein. The first tube may be fitted with scraper and substantially remove any solids, such as frozen liquids, ice and/or solids that may accumulate on the internal surfaces thereof.

The pre-conditioning apparatus is intended for use to pre-condition such perishable goods as ground meats in a continuous process (as opposed to a batch process where the perishable goods may be transferred into a pressure vessel which is then sealed prior to removal of any undesirable gases and provision of desirable and suitable gases therein). The continuous process may be arranged so that the ground meats are continuously transferred through an entry orifice that restricts the transfer of gas into a vessel in such a manner so as to provide a seal. The vessel can be filled with any suitable gas at any suitable pressure and maintained at any suitable temperature. The vessel can be arranged to accommodate any suitable quantity of the ground meats for any suitable period of time. The ground meats can be arranged to exit the vessel after a suitable period of time by transfer through a restricting exit orifice. The exit orifice and the entry orifice can be arranged to restrict transfer of ground meats therethrough in such a manner so as to prevent suitable gases provided in the vessel from escaping therefrom.

A meat hopper 10400, meat grinder 10402 and drive motor 10404 is arranged to grind meat which passes from the meat grinder 10402 directly into a first conical shaped connection 10406 to a tube 10408. Tube 10408 includes a length of high pressure stainless steel tube or other suitable material, and connects with a second conical shaped connection 10410 to grinder 10412. First conical connection 10406 is provided so as to elevate the pressure of the ground meat as it is transferred from said grinder 10402 to tube 10408. Tube 10408 may follow any convenient path and is arranged to have any suitable length and, save two end portions of convenient length, is located in an insulated tank enclosure 10414 that contains a suitable liquid cooling medium 10416, such as brine or glycol. Tube 10408 can be completely immersed in the cooling medium 10416 which can be maintained at a desired and suitable temperature that may be set between about 32 and about 33° F. Another tube 10418 connects the tank enclosure 10414 to a heat exchanger 10420 via a suitably sized pump 10422. Tube 10424 connects the tank enclosure 10414 to the heat exchanger 10420. The pump 10422 is arranged in such a manner that cooling medium 10416 can be pumped at a controlled rate through the heat exchanger 10420 so as to maintain the medium 10416 at a desired temperature. Tube 10426 connects the heat exchanger 10420 with a source of suitable gas 10428, such as carbon dioxide, provided at a suitable volume, temperature and pressure. Tube 10430 is arranged to carry any excess quantities of gas 10428 away from heat exchanger 10420 as may be required. Tube 10426 is arranged to connect gas 10428 supply to tube 10408 via the heat exchanger 10420 and connects to the tube 10408 at connection 10432. Connection 10432 is arranged to allow a constant flow of gas 10428 directly into or through suitable valves attached to tube 10408 at a position approximately equal distance from each end of tube 10408.

Meat, which may have been dipped in or sprayed with any suitable bactericide such as natural citric acids, is loaded into the meat hopper 10400 at a convenient rate and is processed by grinding in the meat grinder 10402. Meat grinder 10402 is driven by drive motor 10404 at a suitable speed and ground meat which may be coarse ground, is forced into the first conical connector 10406 at a suitable pressure. Ground meat is therefore forced under suitable pressure into and along tube 10408. Due to the immersion in the medium 10416, the temperature of the tube 10408 is approximately equal to the temperature of the medium 10416 and therefore temperature of the coarse ground meat is affected and will be either heated or cooled accordingly. The coarse ground meat can be held in the tube 10408 for such a period of time that will allow the temperature of the coarse ground meat to become substantially equal to the temperature of the medium 10416 by transfer of heat through the walls of the tube 10408. The coarse ground meat can pass through the entire length of the tube 10408 and into the second conical shaped connection 10410 to grinder 10412. Grinder 10412 is driven by motor 10434 and is arranged to grind the coarse ground meats and can be further arranged to produce fine ground meat from coarse ground meat. A speed controller can be arranged to control the speed of motor 10434 and the corresponding production rate or output of the grinder 10412 can thereby be controlled as may be required to correspond with the speed and output of the grinder 10402. Suitable gas 10428 can be injected at a suitable rate, into tube 10408 via tube 10426, at a suitable temperature which may be equal to the temperature of medium 10416, and at a suitable pressure which may be about 200 psi. Gas 10428 may be carbon dioxide and can therefore dissolve into coarse ground meat as it passes through tube 10408. The diameter of tube 10408 can be arranged to be smaller than the internal diameter of grinders 10402 and 10412. The source of gas 10428 can be arranged to provide gas at a suitable pressure and in quantities sufficient to meet the desired rate of absorption by the ground meat passing through the tube 10408 and also the quantity required to maintain medium 10416 at the desired temperature. If the volume of gas 10428, required to maintain the suitable temperature of medium 10416 exceeds the volume of gas required to be provided into tube 10408 then excess gas can be vented to atmosphere through tube 10430. Conversely, if the quantity of gas 10428 required to be provided into tube 10408 is greater than the quantity required to maintain the temperature of medium 10416 at a suitable level, such that the temperature of medium 10416 is otherwise thereby depressed, then a heater can be provided. The heater can be arranged to heat gas 10428 as required to ensure and maintain the temperature of medium 10416 as required.

A suitable device to vary the quantity of medium 10416, that is pumped by pump 10422 through tube 10418 can be provided. Gas 10428 may be injected into the tube at any suitable gas pressure that may be 200 psi, however, under such conditions gas 10428 will be soluble and therefore dissolve in liquids contained in tube 10408, resulting in a pressure drop as the gas and liquids are transferred along tube 10408 toward grinder 10412.

The quantities of gas 10428 and ground meat present in tube 10408 and the length of tube 10408 can be arranged so as to allow partial or complete dissolving of gas 10428 into ground meat while still present within tube 10408.

It may be important that ground meats are not exposed to conditions that will either partially or fully freeze the ground meats during processing in the pre-conditioning apparatus. Accordingly, heat exchanger 10420 can be arranged so as to provide a method of transferring heat between the ground meat within the tube 10408 and gas 10428, and medium 10416 as required and in such a manner that will inhibit and/or prevent freezing of the ground meat during the pre-conditioning process. Heat exchanger 10420 can be arranged so as to provide a method to ensure that, irrespective of the temperature of the meat provided in the hopper 10400, the temperature of the ground meat 10436 will be maintained at a suitable temperature that may vary within a limited range of plus or minus about 0.5° F. Ground meat 10436 can be processed in the pre-conditioning apparatus so as to saturate or partially saturate, to any suitable level, the ground meat with any suitable dissolved gases.

Any suitable gas such as nitrogen may be provided directly into grinder 10402 through tube 10438 shown, so as to substantially purge and remove any air that may be present with the meat in hopper 10400. The quantity of meat transferred along tube 10408 and the quantity of gas 10428 injected into the tube 10408 at connection 10432 can be measured and controlled with motors 10404 and 10434 and pump 10422, by a programmable logic controller (PLC). Ground meat pre-conditioning apparatus may be controlled by any suitable controller so as to provide an automatic process. The apparatus can be manufactured to suit any required rate of production.

An auger or other pump to assist in transfer of the ground meat through tube 10408 may be located between the meat grinder 10402 and the first conical connection 10406 or any other suitable location.

A suitable tube (not shown) and valves to open and close the tube, may be provided to connect the second conical connection 10406 to the meat grinder 10402 thereby allowing any re-cycling of ground meats that has passed through tube 10408. Such a re-cycling would allow for further pre-conditioning of any goods that had not been correctly processed during a first passage through tube 10408.

Vents to allow excess gas may be provided at suitable locations in tube 10408 or at any other suitable location.

Ground meat 10436 may be further processed by direct transfer from grinder 10412 to any other suitable processor such as a patty forming machine or directly into a vacuum packaging machine. The transfer of the ground meat 10436 may be via an enclosed mode of transfer so as to eliminate or minimize exposure to ambient atmosphere prior to further processing or packaging.

4.1.2. Embodiment

Referring now to FIG. 264, a cross-sectional view of an enclosed and continuous grinding head 10500 constructed according to the present invention is shown. The equipment shown in the FIG. 264, can be substantially enclosed from the surrounding atmosphere to minimize the introduction of undesirable gasses, such as oxygen therein. Grinding head 10500 is attached to a source for the carbonation of liquids and water contained in ground meats. Meat 10502 is processed through grinding head 10500 of a meat grinder 10504 and deposited into vessel 10506. Vessel 10506 is substantially sealed from the external atmosphere. Entry point 10508 and exit point 10510 are such that when compacted meat fills the grinding head 10500 adjacent to the cutter 10514 and similarly compacted ground meat 10516 fills the exit point 10510 of vessel 10506 adjacent to the end of screw-auger 10518, the vessel 10506 can be filled with a gas such as carbon dioxide under pressure. Pressure is kept above ambient atmospheric pressure therefore assisting the dissolving process of carbon dioxide into water in meat. Screw-auger 10518 is attached to a driver (not shown) and rotated so that the ground meat is carried forward and as it travels down the length of the screw auger 10518, the space between the tapered flights 10520 of the screw auger 10518 is gradually reduced, thereby compressing the ground meat just prior to ejection at exit point 10510, thus providing a seal of the vessel 10506 from ambient atmosphere.

This embodiment provides a cost effective method of increasing the pressure of carbon dioxide and elevating the quantity of dissolved carbon dioxide in water and ground meat to a desirable level. Vessel 10506 includes a port 10522 for the introduction of any suitable gas. Gas provided under pressure into the vessel may include, a suitable blend of carbon dioxide and other gasses such as nitrogen, stabilized chlorine dioxide (stabilized chlorine dioxide brand name Oxine), helium, and/or other inert gases, but substantially excluding oxygen, and including an amount of carbon dioxide of about 5% to about 100% by volume or weight.

One embodiment of screw-auger 10518 is shown but alternates may be arranged in other configurations such as when connected directly to and parallel with screw auger 10524 and housed in a tube that has an internal diameter slightly larger than the outside diameter of screw auger 10518, that is also in line and parallel with screw auger 10524. Such an arrangement passes ground beef through a pressure box or vessel and exposes the ground beef to carbon dioxide or other suitable gasses at a gas pressure above ambient atmospheric pressure.

Suitable blends of gasses can be produced and/or blended at the point of use and injected into vessel 10506 and grinding head 10500 at ports 10522. A stainless steel or plastic extension tube is fitted to the flanges of the "downstream" egress/exit point 10510 of the pressure box (so as to allow all ground meat to pass through the tube) and the blend of gases is injected into the tube so as to substantially expel atmospheric gasses and oxygen from the tube such that the blend of gasses remains in contact with the meat within the tube. The tube may house an auger type screw arrangement to transfer ground meat inside the tube. The auger has apertures and holes drilled that connect to a pressurized supply of gas. Holes may be at the edge of screw flights at the outermost radius of the flights, however, holes may be positioned at any location on the auger to carry suitable gases to the meat. A central aperture is provided in the axis of the auger which connects to the holes provided in the auger.

When the gas is injected through the drilled holes and apertures, exposure of the ground meat to the gasses will be maximized. In one aspect, the ground meat can be shaped or profiled and cut into portions of specified size and directly loaded into packaging while enclosed in a space containing the gas.

Temperature of the gas or blend of gases can be controlled, and may include individual gases in varying relative proportions so as to optimize the cooling of the meat simultaneously while providing sufficient carbon dioxide to allow maximized dissolving of carbon dioxide into the water or other liquids contained in the freshly ground meat.

Gases can be injected into the grinding head at a pressure that will purge or cause to be expelled, substantially all atmospheric gases from the grinding head and both upstream and downstream of the grinding head. Covers (not shown) will enclose the portions of the grinding process, package filling and packaging equipment to limit and control escape of dangerous levels or quantities of carbon dioxide or other gasses that may cause damage to health of any machine operators and/or personnel. Gas extraction fans or blowers can be located adjacent to the equipment to ensure that safety to operators of the equipment is maintained.

Covers will also restrict egress of atmospheric gasses, such as oxygen, from contacting the freshly ground beef and/or meat prior to packaging and hermetic heat sealing of each package. Such apparatus will substantially inhibit the oxidation of deoxymyoglobin contained in those freshly ground meat portions that were previously not exposed to atmospheric oxygen.

Alternatively, a suitably concentrated solution of carbonic acid (carbon dioxide dissolved in distilled water) can be injected into the grinding head 10500 at port 10522, or mixed with the meat portions immediately prior to grinding such that it becomes mixed with the meat in the grinding process. In one aspect, subsequent to grinding, the ground meat can be carried through a tube or "tunnel" that is filled with carbon dioxide that substantially excludes oxygen. In this manner, contact with oxygen is minimized while the ground beef is transferred to other processing equipment.

Alternatively, prior to grinding the meat, the portions of meat are passed through a carbon dioxide tunnel to evaporate a quantity of free water equal to the amount of carbonic acid injected into the grinding head. Carbonic acid solution may be sprayed onto the portions of meat while passing through the carbon dioxide tunnel. In another aspect, solid carbon dioxide ("snow") may be dissolved into water to produce carbon dioxide solution (carbonic acid and water). A measured quantity of snow may be injected into the grinding head at a point immediately adjacent but located on the upstream side of the grinding head such that, during the grinding process, the solid carbon dioxide is blended with the meat so as to substantially cover the surface of the meat particles after grinding. A controlled and continuous weighing and feeder device may be used to accurately dispense the solid carbon dioxide.

The process of the present invention advantageously inhibits the growth of bacteria on the surface of the meat portions and particles and maximizes shelf life of the meat for a longer period than the shelf life period that would otherwise be possible without an increase of dissolved carbon dioxide in surface water and also minimizes exposure of ground meat to atmospheric oxygen while in processing from grinder to retail pack. This reduces the normal event of the oxidation of deoxymyoglobin, contained in the meat prior to cutting, to oxymyoglobin and then the reduction back to deoxymyoglobin after packaging in the packages that do not contain oxygen. Alternatively, after grinding, the freshly ground or cut meat may be passed through apparatus for removing and collecting some of the free surface liquid in a continuous or batch process such as with a centrifuge. The liquid is then processed by way of pasteurization at a temperature that does not cause any undesired effects on the ultimate oxidation of the deoxymyoglobin to oxymyoglobin to produce a desirable fresh red color at the point of sale. The free surface liquid can also be exposed to carbon dioxide by mixing with solid or gaseous carbon dioxide. After sufficient carbon dioxide has dissolved into the liquid, the liquid can be sprayed onto meat or other types of goods in a continuous production process.

Alternatively, in another embodiment of the present invention, the carbonation of the free surface liquid may be achieved in the following manner. Fresh meat can be packaged in a substantially gas impermeable plastic package including a thermoformed tray and flexible plastic lid, hermetically sealed to the tray. The process involves locating the tray (with fresh meat) in an enclosed chamber and then substantially removing atmospheric air from within the chamber before filling the chamber with a blend of desired gases followed by hermetically sealing the lid to the tray. The present invention provides an apparatus and method for, after substantially evacuating the chamber and filling the chamber with the desired gas, compressing the gas (blend of $N_2$ and $CO_2$ or 100% $CO_2$) within the chamber to an optimized pressure of between slightly above ambient atmospheric pressure and up to 6 bar (6 times the atmospheric pressure). The gas pressure within the chamber is then lowered to ambient pressure (1 atmosphere) and the package is then hermetically sealed. This process of carbonation increases the quantity of carbon dioxide that is dissolved into the liquid in the meat and goods. After hermetic sealing of the package, the liquid is substantially saturated with dissolved $CO_2$. This inhibits further dissolving of $CO_2$ into the liquid, that may otherwise cause the package to collapse, and can also extend the shelf/storage life of the meat when held under refrigeration (at between about −2 to about 4° C.).

4.1.3. Embodiment

Referring now to FIG. 265, another embodiment of a pressure vessel assembly constructed according to the present invention is shown. The pressure vessel 10600 substantially saturates any given quantity of ground meat, with absorbed or dissolved gasses and particularly carbon dioxide gas while also controlling the temperature of the ground meat and minimizing or eliminating freezing of the ground meat during the process.

An adapter tube 10602 is shown connecting a meat grinder 10604 to the pressure vessel assembly 10600 with a substantially airtight connection. Compacted meat 10606 is shown within the meat grinder 10604. The compacted meat 10606 is forced through holes in a plate and cut by a rotating blade in a manner as is typically incorporated in most meat grinders and is well known to manufacturers and users of meat grinding equipment. Compacted meat provides a seal to substantially prevent escape of pressurized gasses that may be provided to the pressure vessel. A port 10608 is provided in a section of the meat grinder 10604 to allow injection of gasses such as carbon dioxide or blends of carbon dioxide nitrogen or any other suitable gas. Injection of the gasses into port 10608 substantially purges air that is in contact with the meat just prior to grinding and displaces the air with the desired gas. The gasses may include a gas blend of carbon dioxide and nitrogen where the percentage of carbon dioxide is about 95% and the balance of about 5% includes nitrogen. The interior of pressure vessel 10600 is substantially isolated from atmospheric air and oxygen and is fitted with a removable dome 10610. Removable dome 10610 can facilitate easy access for general cleaning and sanitizing purposes. The main portion of pressure vessel 10600 is enclosed by a jacket 10612 providing a space between the jacket 10612 and walls of pressure vessel 10600. Temperature is controlled by circulating fluid through jacket through port 10614 and extracted through port 10616. A cross-section of the vessel 10600 through the jacket and pressure vessel walls is shown in FIG. 266 for clarity, wherein 10612 is the jacket exterior wall, 10618 is the jacket interior wall, also the vessel wall and 10620 is the interior vessel.

In one instance, a port 10622 can be provided at the apex of removable dome 10610 to inject gasses and other substances such as $O_3$, $F_2$, $H_2O_2$, $KMnO_4$, HClO, $ClO_2$, $O_2$, $Br_2$, $I_2$, or any combination thereof and flavors into or alternatively extract from within the pressure vessel through port 10622. Alternatively, a gas blend is injected into the pressure vessel through port 10622 and maintained at a pressure of about 25 psi. A gas blend including nitrogen and/or carbon dioxide and/or ozone ($O_3$) will be provided into pressure vessel via port 10622. Water and oils contained in the ground meat can then absorb carbon dioxide until it becomes substantially saturated and cannot absorb any additional carbon dioxide. A controller to maintain and/or adjust and vary pressure of the gasses within the pressure vessel, as desired, is also provided but not shown. A side port 10624 is provided in the wall of the pressure vessel 10600 through which ground beef may be provided into the pressure vessel 10600 for further processing in the pressure vessel assembly. The size of the pressure vessel can be adjusted to suit requirements. The dimensions of length and height may be increased or decreased to accommodate the required processing capacity of the first pressure vessel assembly. The lower end of the pressure vessel 10600 is attached to a horizontally displaced tube section 10626 within which an auger 10628 is mounted. Auger 10628 includes passageways and holes 10630 provided so as to allow injection of gasses therethrough by connection to a source of gasses through port 10632, thus substantially maximizing exposure of the ground meats to direct contact with the gas blend. Tube section 10626 length can be increased or decreased according to requirements. Auger 10628 is attached to a driver (not shown) that can provide a force to rotate auger 10628 in a direction such that ground meat will be transferred through horizontally displaced tube section 10626 and toward a tapered tube section 10634. Driver has the capacity of rotating auger 10628 at a desirable speed which can be adjusted as may be required to optimize throughput of ground meat through first pressure vessel assembly.

In one aspect of the present invention, the meat contained within pressure vessel 10600 is controlled at a predetermined level. Fine ground meat passes into the pressure vessel 10600 and accumulates until the upper level of accumulated ground meat is adjacent to proximity switch 10636. Switch 10636 sends a signal to the variable speed drive motor which starts to slowly rotate auger 10628. Ground meat continues to accumulate and when level reaches a point adjacent to proximity switch 10638 variable drive motor is accelerated to a higher speed. The level of ground meat may continue to elevate and when the level reaches proximity switch 10638 drive motor speed is increased to maximum speed causing the level of ground meat to drop below a level adjacent to proximity switch 10640 at which point the drive motor slows down to a lower speed. When the level of ground meat drops to a level below 10636 the drive motor is signaled to stop. Therefore, in this fashion, the level of ground meat within the pressure vessel 10600 can be maintained at a point between the lowest proximity switch 10636 and the highest proximity switch 10638.

In one aspect, tapered tube section 10634 has ports 10642 and 10644 to allow injection of gasses into section 10634 or allow gasses to be extracted from within the tapered section. Additional ports may be provided through any part of apparatus walls as may be required to optimize efficiency and operation of pressure vessel assembly. A transfer section 10646 is located at the egress end of tapered tube section 10634. Section 10646 can likewise be provided with a port through which gasses may be injected into or extracted from within section 10646. In one aspect, a desired profile of meat can be obtained by including a profiling section 10648 at the egress end of section 10646. The profile of meat can be varied by interchanging the extruded profile section 10648. For example in one aspect, the profile of meat can be rectangular as shown in FIG. 267. As the meat is extruded in a continuous fashion, the continuous length of extruded food product can be severed by a cutting device such that pieces of extruded food can be provided with specified and desired lengths and profiles. This may for example, facilitate the placing of the extruded and profiled sections into similarly shaped containers or trays. The pieces of extruded good can then be packaged into packages of suitable size. Such an extruded profile section 10648 is attached to the egress end of the transfer section 10646. One embodiment of cross-section through section 10648 is shown in FIG. 267 where a rectangular profile can be seen. However, other profiles may be obtained by varying of the profile section and can include any number of sides or oval and round shapes. Ground meat can be compressed by auger 10628 and thereby forced through section 10648. Compression of the ground meat through the profiled section 10648 provides a similar rectangular profile to the ground beef as it passes through the egress end of section 10648. In one aspect, the egress end of apparatus 10600 can be connected via an enclosed conduit to feed a packaging section as herein disclosed.

A side view and end view of an alternative extruded profile section 10648 in the form of a manifold is shown in FIG. 268 and FIG. 269. In one aspect, manifold 10650 includes a series of three tube profiles 10654 through which ground meat can be extruded. Such a process can provide three separate streams of profiled ground meat. The manifold 10650 may include one or several streams of profiled ground meat. A tube of similar internal cross-section to the stream of ground meat may be connected to each stream of ground meat and thereby contain each stream of ground meat separately within a corresponding number of tubes so as to allow transfer of the profiled ground meat to other processing equipment such as automatic ground meat patty production equipment or a second pressure vessel. The tube(s) will thereby provide protection to the ground meat and substantially isolate it from contact with external contaminants or any oxygen-containing atmosphere.

In one aspect, a 3 way valve (not shown) can be inserted between transfer section 10646 and profile section 10648. The 3 way valve can be attached to section 10646 and section 10648 in a substantially airtight fashion so as to provide direct connection to each other or a connection to an alternative tube connected to other equipment or to port 10624. This provides diverting the ground meat to other equipment for further processing or, as may be required at the start of a period of production, diversion of the ground meat into a first pressure vessel through port 10624 for additional processing to ensure that the ground meat is substantially saturated with dissolved carbon dioxide or other gasses. After the ground meat has been re-processed, which may require return to pressure vessel 10600 via port 10624 repeatedly, the three way valve can be switched to direct passage of the ground meat through the extruded profile section 10648 or other equipment for further processing or retail packaging. Valves (not shown), which may be automated or manual can be used to close all ports shown in FIG. 265 and any others that may be provided, in a substantially airtight manner.

As can be learned and understood with the foregoing description an adequately effective gas tight seal can be provided by compacted meat 10606 within meat grinder 10604. Furthermore, auger 10628 can be arranged so as to fit closely within transfer sections 10634 and 10646 such that when auger 10628 is rotating, during normal operation of the apparatus, ground meat will become compacted within sections 10634 and 10646 and around auger 10628 and thereby provide an adequately effective gas tight seal. Therefore, gas pressure within the pressure vessel 10600 can be increased to above ambient atmospheric air pressure as required and maintained at a selected pressure by a controller to maintain and/or adjust and vary pressure of gasses within the pressure vessel 10600, as desired. The gasses within the pressure vessel 10600 will therefore be substantially contained between the compacted meat at 10606 in the meat grinder and compacted meat 10652, within transfer sections 10634 and 10646 at a desired pressure. Pressure can therefore be maintained at a pressure most suited for rapid absorption by water and oils in the ground meat contained within the apparatus during operation and transfer of the ground meat through the apparatus.

In one aspect, a second and additional pressure vessel assembly of similar construction to the first pressure vessel assembly 10600, can be provided and attached to the first pressure vessel assembly via an adapter tube so as to provide direct passage of the ground meat from the egress point at the extruded profile section 10648 by way of a tube connected directly to the adapter tube 10602 into the second pressure vessel assembly thereby providing direct communication to the second pressure vessel. After passage of the ground meat through the first pressure vessel it can therefore be passed directly into a second pressure vessel. The second pressure vessel is attached to a vacuum pump via a port similar to that shown as port 10622 in FIG. 265. In one aspect, the port shown as port 10624 is not provided in the second pressure vessel. A suitable gas, such as nitrogen, is injected into ports provided in the second pressure vessel assembly which are shown as ports 10642, 10644, and 10656 and the gas is also injected through ports and passageways in auger, also provided in the second pressure vessel assembly, and shown as 10628 in the first pressure vessel assembly. The gas pressure within the second pressure vessel assembly is maintained at approximately a pressure equal to or higher to the prevailing atmospheric pressure. The ground meat is passed through the second pressure vessel assembly and through extruded profile section and into other equipment as required for packaging and or further processing. In one aspect, passage of the ground beef through the second pressure vessel assembly removes substantially all free carbon dioxide that may remain within the voids contained within the ground meat from the first pressure vessel, and replaces it with a gas such as nitrogen or carbon dioxide.

A method and apparatus according to the invention substantially restricts the escape of any gasses, such as carbon dioxide or ozone, from an apparatus, that may be hazardous to the wellbeing of operators of the apparatus. This can be achieved by locating the apparatus, such as shown in FIG. 265, within a confined space such as an enclosed room or other enclosure that is substantially filled with an inert gas such as nitrogen. The enclosure may include several parts and be arranged to cover only certain parts of the apparatus. The apparatus can be arranged such that certain parts are exposed to allow access or loading. The gas contained in the room or enclosure will be substantially nitrogen with a residual oxygen content of less than 20,000 parts per million. The enclosures or room can be extended to enclose or house other equipment such as conveyors and packaging apparatus that may be used to process and package the ground meat. Such an arrangement would isolate the ground beef from contact with gasses containing oxygen in concentrations greater that 20,000 parts per million, or greater than 300 parts per million, and allowing the ground meat, which may be ground beef, to be packaged in a vacuum pack or a modified atmosphere package containing a gas that includes a blend of desired gasses but containing residual oxygen of not more than 500 parts per million. The gas contained within the enclosures or the room may be pressurized and vented to a convenient and safe point into the atmosphere.

While reference has been made to fine grinding above, it is to be appreciated that any number of grinders and vessels, with and without grinders can be placed in line or in series as required. In addition to providing grinding, the above apparatus can be used a blender to mix, and thereby, homogenize the ground meat to have a uniform composition, both in the lateral and radial direction.

4.1.4. Embodiment

In another aspect of the present invention, a series of enclosed vessels which may be pressure vessels, can be connected together, in series, via any suitable conduit with a positive displacement pump located between each pressure vessel and connected to the conduit such that a pump can transfer product such as ground meat, from a first pressure vessel to a second pressure vessel. Goods, such as ground meat can be transferred directly from a grinder into a first pressure vessel and a first pump can transfer the ground meat from the first pressure vessel to a second pressure vessel. A second pump can be provided to transfer the ground meat from the second pressure vessel to a third vessel and a third pump can be provided to transfer the ground meat from the third vessel to a fourth vessel. Any desired number of vessels and pumps may be assembled in series so as to provide a method of transferring the ground meat progressively from the first vessel to subsequent vessels as may be required. Gases and/or other goods and materials may be transferred by any suitable means into any of the vessels at any suitable temperature and pressure. Blending and mixing devices may be installed in the vessels, as may be required, and any suitable means of controlling and adjusting temperature of goods transferred into and from the vessels can be provided. In this way, each vessel can be separately and independently controlled and arranged with a holding capacity to accommodate any desired quantity of ground meat, with selected gases and other materials provided therein, and held at any chosen temperature and pressure. Each pump can be arranged to separate each vessel such that temperature and pressure can be independently adjusted in each of the vessels.

Referring now to FIG. 270, a meat grinding assembly constructed according to the present invention includes a first and second meat grinder that are in direct communication via a pressure vessel 10700. First meat grinder 10702 is fitted with an auger 10704 and meat grinder 10702 is attached to pressure vessel 10700 via adapter tube 10706 thereby providing direct communication to transfer ground meat that has been ground by grinder 10702 directly into the pressure vessel 10700. Adapter tube 10706 is provided with a substantially gas tight seal at the point of connection to pressure vessel 10700 such that pressurized gas that can be provided into 10700 will not escape. The adapter tube 10706 is fitted with a valve (not shown), such that when grinder 10702 has completed grinding and no compacted meat remains in the grinder, the valve can be closed thereby closing communication between the pressure vessel 10700 and grinder 10702. Closing the valve can thereby allow continued processing of any coarse ground meat that may remain in pressure vessel 10700 with gas provided therein under pressure and above ambient atmospheric pressure as required and until all coarse ground meat contained in the pressure vessel 10700 has been processed through second fine meat grinder 10708 and into downstream pressure vessel 10710. Furthermore, if so desired an additional valve, similar to the valve at grinder 10702, can be provided in the adapter tube 10712 so as to allow further processing of the fine grinds in the pressure vessel 10710.

Pressure vessel 10700 is fitted with a removable dome 10714 in which is provided a port 10716. The lower portion of pressure vessel 10700 is attached to a housing containing auger 10718 which is directly attached to a variable speed drive (not shown) that can rotate auger 10718 in a direction that causes coarse ground meat to be urged into and through blade 10720 and plate 10722. An adapter tube 10724 is fitted so as to provide direct communication to pressure vessel 10716. Proximity switches 10726, 10728 and 10730 are conveniently located in walls of the pressure vessel 10700. Proximity switch 10726 is located at a point higher than the location of switch 10730, and switch 10728 is located between switches 10726 and 10730.

Pieces of meat are placed into a hopper (not shown) attached to first meat grinder 10702 and auger 10712 is rotated to cause pieces of meat to be urged through a rotating blade and a perforated plate 10722. Compacted meat 10732 accumulates in a compressed condition just prior to passing through blade 10734 and plate 10736, providing a gas tight seal between the grinder 10702 and the pressure vessel 10700. Coarse ground meat passes into pressure vessel 10700 and accumulates until the upper level of accumulated ground meat is adjacent to proximity switch 10730. Switch 10730 sends a signal to a variable speed drive motor (not shown) connected to shaft 10738 which starts motor to slowly rotate auger 10718. Coarse ground meat continues to accumulate and when level reaches a point adjacent to proximity switch 10728, the variable drive motor is accelerated to a higher speed. The level of ground meat may continue to elevate and when the level reaches proximity switch 10726, the drive motor speed is increased to maximum speed causing the level of ground meat to drop below a level adjacent to switch 10728 at which point, the drive motor slows down to a lower speed. When the level of ground meat drops to a level adjacent to switch 10730, the drive motor is signaled to stop. Therefore, in this fashion, the level of ground meat within the pressure vessel 10700 can be maintained at a point between the lowest proximity switch 10730 and the highest proximity switch 10726. Meat is compacted at just prior to passing through rotating blade 10720 and perforated plate 10722, thereby providing a gas tight seal between pressure vessel 10700 and pressure vessel 10710.

In this fashion compacted meat remains in a compacted condition at location 10732 and 10740 providing gas tight seals. A desired gas or blend of gasses can be injected into pressure vessel 10700 at a desired pressure. Gas pressure is slightly above ambient atmospheric pressure or up to 150 psi and is maintained at desired pressure by metering and gas pressure regulating equipment (not shown). In this fashion gas can be continuously injected into the pressure vessel 10700 and maintained at a desired pressure at a rate equal to the rate of absorption of gasses by the ground meat. The meat and ground meat may be compacted to provide substantially gas tight seals other than as described herein while providing for a continuous production process of meat treatment during the meat grinding procedure. Production speed can be adjusted to optimize the gas absorption (and contact with surface of the ground meat) at a desired rate while maximizing output of the apparatus and equipment.

In yet another embodiment, pressure vessel 10700 and/or other pressure vessels attached thereto, are provided with valves, that can be opened and closed, and that are provided at all ports, adapter tubes, entry and egress apertures in the pressure vessel(s), so as to enable isolation of the pressure vessel(s) from external ambient atmosphere. When isolated, gas pressure within the pressure vessel(s) may be adjusted to a suitable and adjustable pressure below and/or above ambient atmospheric pressure. The gas pressure in the pressure vessel, may be increased and decreased in a pulsating and/or oscillating frequency and pattern that can provide for the efficient removal of undesirable gasses and the replacement with desirable gasses at a desired pressure.

4.1.5. Embodiment

Referring now to FIG. 271, a cross sectional view of an apparatus that is arranged to separate boneless beef from air or oxygen, is shown. Oxygen may have been evolved in any previous treatment step that concerned treating the perishable product with ozone. In this aspect of the invention, air and oxygen is an undesirable gas that can suitably be replaced with a desirable gas, such as carbon dioxide. The apparatus includes a housing having an entry and an exit point for a perishable product. One example of a perishable product which may be used in the present invention is boneless beef. The housing is arranged to have an entry point 10800 and an exit point 10802 in a horizontal configuration; however, other housing configurations are suitable in keeping with the choice of the system designer. The housing contains a vessel 10804 formed from a cylindrical body. The vessel has the entry point 10800 located on a sidewall of the vessel body 10804 proximate to an upper peripheral end and generally perpendicular to the vessel body 10804. The entry point 10800, which may be a flange, nozzle or a sleeve, or other connecting means, is connected to a conduit 10806. Conduit 10806 may be any suitable conduit for transferring perishable products such as boneless beef. Any suitable transferring mechanism capable of transferring the perishable product is enclosed in the conduit 10806. In one embodiment, an auger 10808 is shown located in conduit 10806, for transferring boneless meat into space 10810 in enclosed vessel 10804. It should be readily apparent that auger 10808 is connected to a driver (not shown) capable to rotate auger 10808 so as to convey boneless meat into vessel 10804. However, in other aspects of the invention, other means exist for transferring perishable products into vessel. For example, any suitable type of conveying device can be readily configured to transfer product to vessel. In one such aspect, transfer means may be a type of conveyor, or any suitable like device.

In one aspect of the apparatus of FIG. 271, boneless meat is not ground; however, it can readily be envisioned to provide a meat grinder heat at the entry point in other aspects of the invention. Boneless meat is substantially provided unground in the apparatus of FIG. 271, and is transferred in a substantially uncut condition, through conduit 10806.

The vessel 10804 has a base containing a plurality of ports. Ports 10812, in the base of vessel 10804, are provided for any suitable gas such as carbon dioxide, to be injected therein, in the direction shown by arrows 10814. In one embodiment, vessel 10804 has a horizontal portion enclosure to encase any suitable rotating mechanism. Lower horizontal portion includes an auger 10816 arranged with a suitable variable speed drive attached to shaft 10818. Exhaust port 10820 is located on the upper section of the enclosed vessel, and allows gas to escape there through. Any suitable exhaust port can be provided in a location suitably opposite of any gas injection port, such as the ports 10812. The auger 10816 can taper to a smaller diameter as the auger 10816 approaches the exit point 10802 of apparatus. Auger 05690 also provides for propulsion of boneless beef through the exit 10802 to transfer the boneless beef to any downstream unit or equipment. Furthermore, apparatus of FIG. 271 can suitably be constructed of one or a plurality of joined pieces at flanges. For example, the taper portion 10824 of apparatus can be connected to a flange at a lower portion of vessel 10804. Furthermore, the exit 10802 of vessel may further include a profiling section, attached to the exit end 10802 to provide for profiled boneless meat exiting the vessel 10804. The profiled beef takes the form of the die as it is extruded therefrom. The rotating action of auger 10816 combined with scrubbing action of a suitable gas provides for boneless meat substantially free from air. However, other means to remove air from boneless meat can be envisioned, for example, auger may be replaced with any number of shaped blades that can otherwise mix or cause boneless meat 10826 to contact any suitable gas injected into injection ports 10812. It can be seen that boneless meat processed through the apparatus shown in FIG. 271, can be transferred into any suitable vessel or conduit, after having been separated from contact with air.

4.1.6. Embodiment

A processing system is disclosed including a meat grinder and blending tube, wherein the blending tube includes three augers to transfer and blend the meat therein. The tube includes a heat exchanger to maintain temperature and ports for the introduction of conditioning gases.

Referring now to FIG. 272, an apparatus constructed according to the present invention arranged to blend perishable foods such as ground beef is shown. The apparatus can be assembled in a gas tight manner with components manufactured from any suitable materials such as approved stainless steel or plastics. The assembled apparatus may be arranged in a horizontal disposition or with devices to adjust the horizontal disposition to any desirable angle of repose.

Apparatus 10900 includes an enclosed vessel 10902 of circular cross-section profile, with end enclosures 10904 and 10906. Vessel 10902 can be arranged to contain any suitable gas at any suitable internal gas pressure and at any suitable temperature. In one aspect of the invention, the temperature of the gas is controlled. Vessel 10902 can be fitted with drivers 10908, 10910, 10912 and 10914 attached thereto at suitable convenient locations and as required to provide driving forces to a round blending tube, shown as 10916, located inside vessel 10902. The drivers can be controlled to drive the tube 10916 at a suitable constant and variable speed. The tube 10916 engages with four drive wheels, shown as 10918 for clarity, and tube 10916 is supported thereon, but otherwise is free from contact with other components except for suitable contact with seals as may be required at each end of the tube 10916. Drive wheels 10918, are engaged to the corresponding drivers 10908, 10910, 10912 and 10914. In this way, the tube 10916 is retained by the drive wheels 10918, in a horizontally disposed position or as may be otherwise required. Pressure vessel 10902 is fitted with vent 10920 which can be provided with a valve (not shown) to allow any excess liquids or gases to be drained therefrom. A vent with valve and venturi 10922, can be fitted to vessel 10902. Any desired number of vents with valves and venturis can be fitted to the vessel 10902. Venturis can be arranged to provide gas injection into space 10924 in such a manner that will cause the injected gas to flow along space 10924 and then through tube 10916, in a desired direction and at a suitable velocity.

Pressure vessel 10902 can be provided with a means of supplying or maintaining heat to the interior contents of the vessel. For example, pressure vessel 10902 can be provided with a jacket surrounding the vessel. The Jacket can have an entry and an exit for any suitable heating medium, such as steam or any other heat transfer fluid. In one aspect, steam can be injected into the jacket to thereby provide or maintain the temperature of the interior contents at any desirable level. In another aspect, pressure vessel 10902 can be provided with electrical heat tracing or heating panels to provide heat to the interior contents of the vessel 10902 or to maintain the temperature of the interior contents of the vessel 10902. Depending on the constraints of the particular heat tracing provider, the heat tracing may be applied up to the minimum operating low level of the vessel. Depending on the particular constraints of the processing systems relating to the vessel 10902, steam or electrical energy for supplying heat to the interior contents of vessel 10902 may be more desirable.

The tube 10916 is arranged inside the vessel 10902 and passageway 10924 is thereby provided between the outer surface of the tube 10916 and the inner surface of vessel 10902. Gas can therefore be provided inside the pressure vessel and in the passageway 10024. Any suitable gas temperature controller may be arranged, such as by arranging a heat exchanger 10926 connected to the vessel 10902 as shown. First and second suitably sized tubes, 10928 and 10930 are attached in direct communication with vessel 10902 such that gas can pass through the tubes and heat exchanger 10926 and the vessel 10902. Tube 10928 is connected to the heat exchanger 10926 and another connecting tube 10932 is attached to a gas blower 10934 which in turn is connected to the connecting tube 10930. In this way gas can pass through tube 10928, into and through the heat exchanger 10926, through tube 10932, into and through the gas blower 10934, and through connecting tube 10930. In one aspect, a barrier 10936 is located in space 10924 which can follow the outer circumference of tube 10916 so as to substantially inhibit gas passing therethrough. In this way, when gas blower 10934 is activated, gas can be drawn in from space 10924 on one side of barrier 10936, through tube 10928 and passed through tube 10930 and back into space 10924 on the opposite side of the barrier 10936. This provides recirculation of any suitable gas along the space 10924, through tube 10916, back into space 10924 and again through the heat exchanger 10938. The gas can be re-circulated and repeatedly passed through heat exchanger 10926, to maintain the gas at a desired temperature. A tube shown as 10938 is provided to allow suitable gas to be injected into the heat exchanger 10926. The suitable gas can be provided in a liquid or high pressure condition and allowed to expand in the heat exchanger 10926, and thereby cause a lowering of temperature. Suitable gas can then pass from heat exchanger 10926 and into tube shown as 10940 which is connected to tube 10932. Alternatively, suitable gas can be allowed to escape through tube 10942 and valve 10944. In this way, by controlling the flow of gas, the internal temperature of vessel 10902 and all other items therein can be controlled. During the re-circulation of gas through tube 10916 and heat exchanger 10926, a quantity of water, contained in the grinds, may evaporate and condense in heat exchanger 10926. The quantity of condensed water in the heat exchanger may be processed, sterilized and carbonized, by dissolving carbon dioxide therein and then injected into the grinds through vent tube 10946. Tube 10940 may be provided with pressure regulators and valves to allow excess gas to escape therethrough, from vessel 10902 at a suitable rate and in such a manner as to maintain the temperature of the gas within a temperature range of plus or minus about 0.5° F., or at any other suitable temperature range. A suitable gas and/or any other suitable substances can be provided in vessel 10902 at any suitable gas pressure to facilitate dissolving of the gas and/or substances into the ground meats contained in the tube 10916. In this way, the suitable gas can be controlled to either chill or heat the ground meats being processed in tube 10916, and by the apparatus.

In one aspect, tube 10916 can be provided with a means of supplying or maintaining heat to the interior contents of the tube. For example, tube 10916 can be provided with a jacket surrounding the tube 10916. The jacket can have an entry and an exit for any suitable heating medium, such as steam or any other heat transfer fluid. In one aspect steam can be injected into the jacket to thereby raise or maintain the temperature of the interior contents of tube 10916 at any desirable level. In another aspect, tube 10916 can be provided with electrical heat tracing or heating panels to provide heat to the interior contents of the tube 10916 or to maintain the temperature of the interior contents of the tube 10916. Depending on the constraints of the particular heat tracing provider, the heat tracing may be applied up to the minimum operating low level of the tube 10916. Depending on the particular constraints of the processing systems relating to the tube 10916, steam or electrical energy for supplying heat to the interior contents of tube 10916 may be more desirable.

Referring now to end enclosure 10904, cover 10948 is located over an inspection access hole so as to provide a convenient access into the apparatus for any purpose such as for cleaning. A vent 10950 is provided to allow excess gas to escape. Vent 10950 can be attached to suitable valves with gas pressure regulators as may be required to control gas pressure. A tube 10952 is located through a tube in the wall of end enclosure 10904. Tube 10952 connects to a nozzle 10954 at an interior end thereof, that can be arranged to provide temperature controlled water or other liquids, at any suitable pressure into the inner space contained within tube 10916. In another aspect, water or other liquids can be used to clean the internal surfaces of the apparatus after use of the apparatus. End enclosure 10904 also includes means of holding rotating augers on ends thereof. Bearings used for rotating augers, such as bearing shown as 10956 are also located in the end enclosure 10904. Other augers may be attached to end enclosure 10904 on the interior.

Referring now to end enclosure 10906, several openings are shown therein with other apparatus attached thereto. Three variable speed drive motors 10908, 10910 and 10912 are fixed to the end enclosure 10906 and each motor is attached to corresponding shafts shown as 10958, 10960 and 10962. A subassembly 10964 is mounted to end enclosure 10906 in a desired position and can pass ground beef into the tube 10916 directly from a grinding apparatus without contacting atmospheric air. Shafts, tubes, components and assemblies attached to end enclosures are sealed in a suitable and desired gas tight manner, thereby retaining any gas that may be contained within vessel 10902, at any suitable pressure.

Three separate augers (two shown), depicted as 10966, 10968 and 10970 are mounted in close proximity to each other and with a member 10972 arranged above auger shown as 10966 separating it from augers 10968 and 10970. In this manner, beef is carried in one direction by augers 10968 and 10970, and then carried in a second and opposite direction to expel beef from vessel 10900. Augers 10966, 10968 and 10970 can be arranged in a horizontally disposed and parallel position. Auger 10966 is attached to drive motor 10908, auger 10968 is attached to drive motor 10910 and auger 10970 is attached to drive motor 10912. The end sections of each auger 10966, 10968 and 10970 are arranged with shafts and each shaft end mates with bearings located in end enclosures 10904 and 10906. Drive motors 10908,

10910 and 10912 are arranged to drive the corresponding augers at variable rotating speeds in any chosen direction, either clockwise or counterclockwise, as may be selected according to any desired direction and at any suitable speed that will enable optimized mixing of the ground meats processed in tube 10916. Alternatively one or any number of augers may be located in tube 10916 to provide the most optimized mixing therein.

Referring again to FIG. 272, sub-assembly 10964 is attached to end enclosure 10906 and can be operated to grind beef and inject the ground beef directly into tube 10916. In this way, ground meat can be continuously provided into tube 10916, at any suitable rate within the capacity of the apparatus.

Referring momentarily to FIG. 274, the ground beef that flows into tube 10916 can be arranged to fall directly onto but centrally and between the center lines of augers 10968 and 10970. Augers 10968 and 10970 can be arranged to rotate in opposite directions. Direction of rotation of auger 10968 can be in a clock-wise direction and auger 10970 can be rotated in a counter clockwise direction. In this way, the ground beef can be carried by augers 10968 and 10970 toward end enclosure 10904 and away from end enclosure 10906. Member 10972 is arranged to allow containment of the ground beef between its upper faces and augers 10968 and 10970 for a brief period such that as augers rotate the ground beef is carried toward the end enclosure 10906. As augers 10968 and 10970 rotate the ground beef will then drop and contact tube 10916. Tube 10916 can be arranged to rotate at a suitable speed, of between about 100 rpm or less and about 500 rpm or more, such that centrifugal force will hold the ground beef against the internal surface of tube 10916. When tube 10916 has rotated by approximately one half of one revolution and the ground beef is carried to an upper location and above augers 10968 and 10970, a scraper 10974 can be provided to remove the ground beef from contact with tube 10916. The scraper 10974 can be arranged to cause the ground beef to be directed back onto augers 10968 and 10970. Auger 10966 can be driven in a direction that will carry any ground beef, that it contacts, toward the end enclosure 10904. The rotating speed of each auger can be adjusted as required. Auger 10966 can be arranged to have an extended length, that is longer than 10968 and 10970 such that 10966 extends beyond 10968 and 10970 and into a tubular section, shown as 10976 (FIG. 272), with an internal diameter slightly larger than the external diameter of auger 10966. As shown in FIG. 272, auger 10966 can then be arranged to carry ground beef from within tube 10916 and through tubular section 10976 at a desired rate. In this way, the ground beef will be carried toward end 10904 by augers 10968 and 10970 and toward end 10904 by auger 10966. The rotation of tube 10916 and its interaction with the scraper 10974 will then provide further mixing fat and muscle content of the ground beef. By independently adjusting the rotating speed of augers 10966, 10968 and 10970 and also tube 10916, the period of time that the ground beef is retained within the tube 10916 can be controlled to an optimized period of time and thereby allow an efficient method of blending. After a suitable period of retention, the ground beef will be transferred through tube 10930 and will then fall downwardly into tube 10978. Tube 10978 can be located directly above and connected to a suitable vane pump shown as 10980, which may include any suitable vane pump manufactured by Weiler & Company, Inc. The ground beef can be pumped at a known and controlled velocity by vane pump 10980 into tube 10982 which is connected directly thereto. Tube 10982 can be connected to a fat measuring device 10984. In this way, beef can be ground and injected into tube 10916, by sub-assembly 10964, blended by augers before pumping through measuring device 10984 located between tubes shown as 10982 and 10986. Ground beef can be conditioned and blended at a production rate limited only by the chosen size and capacity of the ground beef conditioning and blending apparatus, which may be varied in size and capacity as required.

Referring again to end enclosures 10904 and 10906 shown in FIG. 272, suitably located apertures shown as 10988, are provided therein so as to allow free movement of gas therethrough. The velocity of the gas can then be controlled by blower 10936 and along a path through tube 10916, into the spaces shown as 10990 and back through space 10924. The velocity and temperature and pressure of the gas can then arranged at the most effective settings to control the temperature of the ground beef and the rate of gas dissolving therein.

Referring now to FIG. 276, and particularly, end enclosure 10906, a member shown as 10990 is arranged to mate with member 10906 at a close contacting face shown as 10992. Members 10906 and 10990 are in contact at interface 10992, and fixed relative to each other but not locked together. Member 10990 can move relative to 10906 but is retained by interface 10992 and shafts shown as 10958 and 10962 (and 10960, which is not shown). Suitable bearing surfaces are provided between 10990 and 10906 and also between 10990 and 10966, 10968 and 10970. Sub assembly 10964 is arranged so as to be removable for cleaning purposes and plugs may be inserted into the connecting apertures created by removing sub-assembly 10964. When 10964 is removed and replaced with the plugs, member 10990 can be moved away from tube 10916 by sliding along shafts 10966, 10968 and 10970 so as to provide a space between member 10990 and the end rim of tube 10916. Such an arrangement may be installed at either or both end enclosures of the apparatus in such a manner so as to facilitate effective cleaning of apparatus after use. Other cleaning features may be incorporated into the apparatus. Pressurized and heated water may be provided inside the apparatus with suitable sanitizing detergents in such a manner so as to facilitate an automatic cleaning when augers 10966, 10968 and 10970 and tube 10916 are all rotated in common or opposing directions and at suitable speeds. Alternatively or additionally high pressure steam may be provided inside the apparatus to facilitate sterilization and thorough cleaning of the internal surfaces of the apparatus.

The conditioned and blended ground beef can thus be pumped through tube 10986 at a desired and controlled temperature with a quantity of suitable gas such as carbon dioxide, dissolved in the ground beef to any desired level of saturation. Vane pump 10980 can be provided with a variable speed drive motor and arranged to pump ground beef at a controlled velocity into other apparatus for subsequent blending with other ground beef or chosen material and/or further processing.

In one aspect of the present invention, the conditioned ground beef may be exposed to a suitable beam of electrons by locating an electron beam generator and accelerator such as may be manufactured by Titan-Scan Systems of 3033 Science Park Road, San Diego, Calif. 92121. The electron beam generator may be located in such a manner that the beam of electrons produced there with, is directed directly at and through a stream of grinds while the grinds are passing through a tube such as tube 11008 shown in FIG. 275. The cross-sectional profile of the tube may be arranged to provide maximum exposure to the electron beam. In this way the conditioned ground beef can be sterilized at any temperature while maintaining a fresh and uncooked condition. Electron beam sterilization is used on fresh ground beef which is in a low oxygen environment to prevent over-oxidation. In an alternative embodiment, the stream of conditioned ground beef can be exposed to irradiation from a source of gamma rays.

Referring again to FIG. 275, a section of assembled tubes is detailed. The section of tubes includes a first tube 11000, a second tube 11002 and a third tube 11004 which are all joined at a confluence 11006, to a fourth tube 11008. The tubes and particularly the confluence may be manufactured from any suitable plastics or stainless steel materials and machined so as to ensure that any processed materials passing therethrough, will not be subject to significant turbulence until after passing through the confluence 11006, which may be done by increasing the diameter or profile area of tube 11008. Any number of two or more tubes joined, at a confluence, to a single tube 11008, may be arranged to produce processed materials as may be desired. In one aspect, for example, a first processing machine (not shown), is arranged to deliver the processed material via tube 11000, a second processing machine (not shown), is arranged to deliver the processed material via tube 11002 and a third processing machine (not shown) is arranged to deliver the processed material via tube 11004. In one aspect, the fat content of each stream of ground beef can be measured, by any suitable measuring device such as that shown as 10984 in FIG. 273, and the fat content will therefore be known. The velocity of each stream of material can be adjusted by adjusting the speed of separate vane or any other suitable pumps arranged in such a manner so as to provide for velocity adjustment. By adjusting the velocity of each stream of processed material corresponding to the measured fat content contained therein, delivered quantities of the processed material, can be adjusted such that when any two or more streams are combined together, the resultant fat content of the combined stream will be substantially constant and as desired. In this way, the known fat content of the combined stream of processed material can be maintained to within a narrow range of variation. The variation may be within a range of not more than +/−1% of the fat content of any item such as Item IF in TABLE 2 above.

4.1.7. Embodiment

Referring now to FIG. 277, a meat grinder assembly according to the present invention is shown. In one aspect, the assembly 11000 can be installed into end enclosure 10906 as sub-assembly 10964. The sub-assembly 11000 includes a pressure vessel 11102, with an entry port 11104 at an upper location and an exit port 11106 at a lower location. A horizontally disposed and tapered auger 11108 is located in a lower portion of vessel 11102 and arranged with a shaft 11110 that can be attached directly to a suitable variable speed driver. The tapered auger 11108 is suitably profiled and is fitted with passageways therein to allow any suitable gas to be injected therethrough as herein described. A meat grinding apparatus is attached directly to the entry port 11104 and can be disconnected therefrom to provide access for cleaning as required. Boneless meat portions can be processed by grinder 11112 to produce grinds which are then transferred directly into vessel 11102 in a continuous stream. In one instance, the cross-sectional profile of vessel 11102 is circular and a valve member 11114 is arranged to mate with a valve seat 11116, which is located between the entry and the auger 11108, to provide a gas tight seal therebetween when required. Valve member 11114 can be opened and closed by valve stem 11118 as required and arranged to automatically close as required for any reason. Ground beef that is transferred into vessel 11102 can contact auger 11108. Any suitable gas at any suitable pressure can be injected into vessel 11102 through ports 11120 and/or 11122. Each port such as 11122 can be fitted with suitable valve and pressure regulator. As desired, gas can be injected into a port such as port 11122 and allowed to exit through a port such as 11120. Pressure regulators maintain a desired gas at any suitable pressure in the vessel 11102. In this way, the continuous stream of ground beef can be transferred through the vessel 11102 by auger 11108 at a desired rate and pressure. As the ground beef is transferred through vessel 11102 by tapered auger 11108, the ground beef is compressed and extruded through a restriction as shown, so as to exclude gas and produce a substantially continuous flow of ground beef without gas bubbles contained therein. In this way, the compressed ground beef can provide an effective gas tight sealing between vessel 11102 and vessel 10902 of FIG. 272. The continuous flow of ground beef is passed through a tube section 11122 at a desired and controlled rate. After passing through tube 11122 the ground beef passes through the exit port 11106 and can be directed into any suitable container such as tube 10916 shown in FIG. 272. If desired, a secondary grinder may be interposed between the vessel 11102 with a valve 11124. Valve 11124 is provided at the exit port 11106 and can be arranged with an automatic actuator to open and close at a remote distance as may be required for any reason. When in a closed position valve 11124 can seal the exit port 11106 in a gas tight manner. As the ground beef passes through tube section 11122, the fat and muscle content of the ground beef can be measured. The measuring device may include the passing of an electric current through the ground meat as it passes through the section 11122 as described above in connection with FIG. 273, or any other measuring device herein described.

4.1.8. Embodiment

Referring now to FIG. 278, one embodiment including a group of three blending tubes 11200, 11202 and 11204 is shown, each tube being similar in operation to tube 10916 shown in FIG. 272. The group of three blending tubes are each assembled with augers similar to as described above in association with the tube 10916 and auger 10966, 10968 and 10970. Rollers 11206, 11208 and 11210 are arranged to engage and retain the blending tubes as shown. A pressure vessel 11212, is arranged to accommodate the group of three blending tube assemblies such that drive wheels 11214 are engaged there with and as shown and can be activated as required so as to rotate the blending tubes. Ground beef can be provided into each blending tube by similar apparatus to that disclosed above with sub-assemblies 10964 of FIG. 272. In this way, three grades of ground beef can be processed simultaneously in three continuous streams and fed to each tube of FIG. 275. Alternatively, each of the continuous streams of conditioned ground beef can be further processed if desired.

In one aspect of the present invention, a plurality of processing machines are arranged to process material such as fine ground (or coarse ground) meat, such as beef grinds. Each of the processing machines may be similar to the apparatus shown in FIG. 272. A total of three processing machines can be arranged so that each processing machine can process a separate quantity of boneless beef. The first machine, may process a quantity of Item 1, the second machine, may process a quantity of Item 2 and the third machine, may process a quantity of Item 3 found in TABLE 2 above. The first, second and third machines will therefore produce first, second and third streams of ground beef (processed material) that, after processing, will be pumped, by separate vane pumps (for delivery as required), along tubes shown as 10986 in FIG. 273 to a confluence of the three tubes shown in FIG. 275. Although, FIG. 275 shows a confluence of three streams, more or less streams may be used. In one aspect, a relatively low fat content stream may be blended with a higher fat content stream. In this manner, a desired stream possessing a fat content between the first and the second stream may be produced. It will often be desirable to further process the resultant stream to provide a well blended stream of substantially similar composition.

Any number of one or more processing machines may be arranged so to provide any number of streams of processed material. The streams of processed material may be combined and joined together in any chosen configuration, to produce one or more subsequent streams of processed material. In one aspect, the velocity of each stream of material may be adjusted, so as to deliver a known and corresponding quantity of processed materials with any desired fat content as required. The fat content and muscle content of each stream of processed material can be continuously measured, as described herein, the measurements may occur before or after the joining of one or more streams to another stream. One or more streams of processed materials may be combined to produce a single stream of processed material. By adjusting the velocity and consequent delivered quantity of each stream of material (before combining together into a resultant single stream) any quantity of any processed material, such as Item 1F can be produced to a substantially constant and precise specification. The combined stream of processed materials may be further processed through a grinder and/or through processing machines such as any disclosed herein. Additionally, the streams of processed materials may be directed through a tube that is exposed to sterilization such as by exposure to gamma irradiation, or any other suitable sterilizer while contained within the tube.

Subsequent to processing, the beef grinds or processed material can be retail or bulk packaged in any suitable manner, such as a substantially oxygen free modified atmosphere master package.

The packaging may be arranged to accommodate a variation in total volume of the package such as an expansion or contraction in volume. The package volume variation may occur as the temperature variation of the packaged processed material. The volume variation may correspond to the temperature variation as a result of any gases dissolved in the processed materials "boiling off" or again dissolving in direct relationship to the temperature variation. Accommodation of the variation in package volume may be achieved by provision of a suitably sized, flexible, substantially gas barrier package.

4.1.9. Embodiment

Referring now to FIG. 279 and FIG. 280, one embodiment of an apparatus that can be used to blend one or more individually controlled streams of ground meats that can also be combined with selected conditioning gases or suitable materials and blended together to produce a single stream of blended and conditioned ground meat, is shown. FIG. 280 shows a diagrammatic representation of three streams of ground meats, 11300, 11302 and 11304 that are each pumped through conduits shown as 11306, 11308 and 11310 at independently controlled velocities. The apparatus can be arranged to provide one or more streams of ground meat but in one instance, three streams will be provided where, for purposes of example, one stream may have an approximate fat content of about 20%, a second stream has an approximate fat content of about 30% and a third stream has a fat content of about 7%. The content of each stream can be varied as may be required. Conduits 11306, 11308 and 11310 can be arranged to house independent measuring devices (not shown) such as the Epsilon GMS-40 in-line measuring equipment. The streams of ground meat can be pumped, by positive displacement pumps that are independently driven by variable speed drivers, at velocities that are continuously adjusted directly corresponding with the respective fat and muscle content of each stream such that when the three streams are subsequently combined together into a single stream of ground meat, the fat and muscle content of the combined stream is substantially consistent and constant at a chosen composition with percentage quantities of fat and muscle held within a range of less than about +/−1% fat content. Furthermore, even though the velocity of each separate stream of ground meat is independently varied according to the fat and muscle content of the respective stream, the resultant single, combined stream can be arranged, by adjusting the velocity of each of the streams 11300, 11302 and 11304, to be at a constant velocity, volume and production rate and as desired within the capacity of the apparatus.

Referring now to FIG. 279, a housing 11318 is arranged with six suitably profiled blades 11312 that are attached together at a central axis 11314 which in turn are attached to a driver 11316. Blades 11312 are attached at axis 11314 and to a driver 11316 in such a manner that blades 11312 can be rotated within the confinement of housing 11318, which is sealed and separate from external atmosphere. Blades 11312 are arranged so as to not contact but be in close proximity to the internal surfaces of the housing 11318. A total of six spaces or segments shown as 11320, are therefore arranged between the blades 11312 that include equal volumes and a recess 11322 is provided at the axis of the blades 11312 so as to allow direct communication between the spaces. The direct communication between the spaces 11320 may be provided or otherwise, if so desired, not provided. A conduit 11324 is attached to the housing 11318 with a spiral auger 11326 contained therein. Auger 11326 may be directly connected to any suitable driving device (not shown) that can provide a variable speed rotating of the auger as required to further blend the single stream of combined ground meats. The streams of ground meat can be transferred directly through housing 11318 and into conduit 11324. Blades 11312 can be rotated about the axis 11314 by driver 11328 at a suitable speed. In one instance, a series of conduits 11330 can be arranged to have direct communication with the spaces between the blades 11312, as they rotate adjacent thereto, so as to allow injection of any suitable substances such as carbon dioxide into the spaces at any suitable pressure and from a suitable source and in controlled quantities. A known quantity of ground meats can be transferred from conduits 11310, 11308 and 11306 into spaces 11320 with a known and controlled quantity of gas or other suitable substance provided therein via conduits 11330, as spaces 11320 rotate about its axis 11322, and pass through conduits. Blades 11312 are arranged with edges that are parallel and in close proximity to the internal surfaces of housing 11318. As ground meat is transferred from the conduits into the spaces 11320 at controlled rates and quantities, controlled quantities of carbon dioxide can also be transferred into the spaces. Selected quantities of ground meat and carbon dioxide can be transferred, consecutively, into spaces 11320 and transferred as a single volume of materials into conduit 11324 and blended therein, in a continuous process of measured amounts of ground meat and carbon dioxide. Relatively small quantities of measured amounts of ground meat with a selected quantity of carbon dioxide can be blended most efficiently in a continuous process. Such a method of blending can provide a method of thorough and accurate blending with a minimum energy requirement. It can now be seen that the apparatus herein described can be used to efficiently produce a blend of ground meats that has been pre-conditioned with such substances as carbon dioxide and at a chosen rate of production within the capacity of the apparatus. The apparatus shown in FIGS. 279–280 can be enclosed in any suitable jacket or containment so as to allow any suitable heat exchanging medium to contact the housing and thereby, by a heat exchanger means provide precise temperature control of the apparatus and any goods processed therethrough. The temperature control can be precise and set at any suitable temperature within any suitable temperature range. In one instance, the conduit 11324 may include a suitable portion of static mixing conduit as may be supplied by Statiflo, alternatively auger 11326 may be driven by a suitable driver at any suitable speed. Conduit 11324 may be connected to a suitable positive displacement pump or other suitable pump so that any goods that may have been processed by the apparatus can be directly transferred thereto and then pumped at a desired rate into suitable holding containers or directly into further processing and/or packaging equipment.

4.1.10. Embodiment

FIG. 282 shows a cross section through an apparatus (shown in FIG. 281) that may be used for pumping pre-blended grinds into a profiled conduit thereby providing an extruded stream of grinds for subsequent slicing and production of patties. An enclosed housing 11400 is shown with a tapering screw 11402 mounted therein. The external surfaces of the tapering screw 11402 can be profiled to match the internal surface of housing 11400 such that these surfaces are in close but not touching proximity and so that the screw 11402 will scrape the internal surface of the housing 11400. The arrangement in FIG. 282 shows a single screw but may alternatively be arranged with parallel sides that are not tapered. In one instance, the screw 11402 is tapered, and may be mounted in tandem and adjacent to a counter rotating, correspondingly matching, second tapering screw (not shown) in parallel therewith. Such a pair of matched and meshing screws can provide a means to scrape all surfaces of the screws and all internal surfaces of housing 11400. Screw 11402 is driven via a shaft 11404 attached to a suitable driving motor (not shown) such as a servo electric motor, which can drive the screw(s) 11402 in a direction indicated by arrow 11406 and at a variable speed. Pre-blended grinds 11408 that have been processed as required in enclosed vessels (not shown) that substantially excluded oxygen from contact thereto, are provided by any suitable transferring mechanism into conduit 11410 which is attached via a gas tight flange 11412 to housing 11400.

Grinds 11408 provided into housing 11400 are substantially free of air or oxygen and any voids contained therein can be substantially filled with carbon dioxide. Grinds 11408 can be transferred into housing 11400 at a controlled temperature below the freezing point of water, such as at 29.5° F. Housing 11400 may be fitted with a suitable jacket and insulation with conduits provided therein (not shown) through which any suitable liquid, maintained at any suitable temperature, can be transferred. A piston 11414 is shown located within a cylinder 11416, which in turn, is mounted directly to housing 11400. Piston 11414 can be directly coupled to a driving mechanism (not shown) that will activate movement of the piston in a reciprocating manner with directions of movement shown by double headed arrow 11418. FIG. 283 shows piston 11414, cylinder 11416, grinds 1140, and screw 11402 and it can be seen that the end of piston 11414 is provided with a radius 11420, that matches the external radius of screw 11402 such that when piston 11414 is in close but not touching proximity to rotating screw 11402, the external surface of piston 11414 at 11420 will be wiped by the outermost edges of screw 11402 as it rotates. In this way substantially no fat or grinds' can accumulate by sticking to the exposed surface of piston 11414, at 11420. A single matching piston and cylinder assembly is shown mounted to housing 11400, however, more than one such matching assembly may be mounted in radial disposition to housing 11400. For example, three or four such matching piston and cylinder assemblies may be mounted around the circumference of housing 11400 and arranged to operated simultaneously or as may otherwise be required. Mounted to the exit end of housing 11400, a conduit 11422 is fixed in a sealed and gas tight manner. Conduit 11422 is shown with a restriction therein, such that the internal diameter at the point of entry is substantially similar to the internal diameter of housing 11400 and the diameter of conduit 11422 is tapered so as to reduce the cross sectional area and therefore, when grinds are pumped there through, back pressure is generated against the exposed end surface 11420 of piston 11414. A flange 11424 is shown at the exit end of apparatus shown in FIG. 281 which may correspond with matching flanges of profiled conduits, such that can be used for a patty forming machine, that can be interchangeably attached thereto, to provide a different profiles and size of extruded streams of grinds pumped there through. An arrow 11426 shows the direction of flow of extruded stream of grinds 11408.

Grinds 11408 are transferred into housing 11400 and carried in a forward direction, indicated by arrow 11426, by rotation of tapered screw 11402, in a continuous stream. During transfer through housing 11400, grinds 11408 are compressed so as to ensure any voids that may be contained therein are eliminated by dissolving of $CO_2$, contained in the voids, into said grinds. As stream 11408 is transferred in the direction shown by arrow 11426, a cone shaped conduit at 11422 further restricts stream of grinds 11408 and compresses it into a substantially void free stream exerting a back pressure that is proportionate to the velocity of stream 11408 and the restriction according to the diameter of conduit 11422. Alternatively, other suitable restrictive conduits or valves may be provided in place of conduit 11422. In order to provide a stream of grinds that has been conditioned to a suitable temperature, housing 11400 can be temperature controlled by any suitable heat exchanging and temperature controlling apparatus.

4.1.11. Embodiment

Referring now to FIG. 283, a side elevation of an apparatus assembled to continuously produce fine ground boneless beef 11500, from coarse ground boneless beef 11502 in an enclosed system that substantially excludes oxygen, is shown. Coarse ground beef 11502 is transferred through conduit 11504 to fine grinder 11506. Flanges 11508 and 11510 are fixed together to provide a gas and liquid tight seal there between allowing continuous transfer of pressurized coarse ground beef 11502 to fine grinder 11506. Ground beef 11502 and 11500 can be maintained at a selected temperature such as 29.5° F. Fine ground beef 11500 is then transferred into vessel 11512 from grinder 11506, and allowed to accumulate therein. A connection to vessel 11512 from a gas source, via a pipe 11514 provides a conduit to deliver suitably pressurized gas such as carbon dioxide into vessel 11512 and to allow contact of selected gas with grinds 11500. Also, a conduit 11516 allows controlled release of excess gas that may accumulate in vessel 11500, for example via controlled pressure release valves (not shown) installed in conduit 11516. In this way a selected gas such as carbon dioxide can be provided in any free space in vessel 11512, at a constant, selected gas pressure. Positive displacement pump 11518, is driven via shaft 11520, that in turn is driven by a servo electric motor (not shown) or other such suitable variable drive motor and in such a manner as to allow adjustment, as required, to the rate of pumping of fine grinds 11500 from vessel 11512 into conduit 11522. Pump 11518, may also provide a controlled pressure inducing feature by its pumping action of fine ground beef 11500 into conduit 11522 thereby causing substantially all gaseous voids, contained in 11500, to be eliminated by dissolving of any free $CO_2$ gas contained therein. In this way, grinds 11500 that may contain voids or spaces filled with $CO_2$ can be transferred to a solid stream of grinds 11510 that is substantially free of any voids. Solid stream of grinds may be transferred in the direction shown by arrow 11524 to directly connect to conduit 11410 shown in FIG. 281.

4.1.12. Embodiment

Referring now to FIG. 284. A pressure vessel 11600 is connected directly to a supply conduit 11602 in a gas and liquid tight manner, such that goods 11604 can be transferred through conduit 11602 and into vessel 11600 for storage and processing therein. Vessel 11600 may be arranged in an inclined disposition so as to reduce the depth of goods, measured along a vertical, straight line inside the vessel, contained therein. Vessel 11600 may also be arranged with a suitable blending arrangement mounted therein in such a manner so as to allow blending of any goods stored in or transferred through vessel 11600. A fat, protein and water content measuring device 11608 is inserted between conduit 11602 and valve 11610. The measuring device 11608 may be mounted at the connecting point and directly between conduit 11602 and vessel 11600 to provide a means of isolating conduit 11602 from vessel 11600 in a gas tight manner. A tube 11612 connects vessel 11600 to a source of suitable gas or agent via a suitable valve (not shown) to allow transfer of any suitable gas or agent, such as any storage life enhancing gas, into vessel 11600. A port 11614 with connection hose to a suitable vacuum generator is provided in the wall of vessel 11600 at an upper location so as to allow evacuation of gases from vessel if required. A connection to conduit 11616 is provided at a lower location in the vessel 11600 such that any goods transferred into vessel 11600 will tend to gravitate there toward, irrespective of any mechanical transferring arrangement that may be mounted inside vessel 11600. Conduit 11616 is connected directly to a positive displacement pump 11618 via a liquid collection point arranged to collect any purge 11620 or liquids that may accumulate in vessel 11600 after normal release from goods therein, such as purge associated with meats. A connection tube 11622 is coupled to pump 11624 in such a manner so as to allow pumping of any accumulated purge or liquids 11620 via tube 11626. Tube 11628 is connected to a spray nozzle arrangement 11664 mounted on the internal wall of vessel 11600 at an upper location of vessel 11600. In this way purge 11620 can be sprayed in a spray 11630 onto the upper surface of goods 11604 and thereby be returned to its source within vessel 11600. Purge 11620 may reticulate downward and again accumulate in 11616 and so be recycled by pumping again through tube 11622. Purge 11620 may also be treated with any suitable agent such as suitable bactericide, prior to spraying at 11628 and thereby reducing bacteria content and improving safety of the ground meat product for human consumption. With the apparatus herein disclosed, it can be seen that goods 11604 can be transferred via conduit 11602 through measuring device 11608 and valve 11610 and into vessel 11600 in a manner that substantially excludes ambient air. Measuring device 11608 can provide a means to measure the quantity of fat and/or water and/or protein in goods transferred there through. In this way, the value of goods in vessel 11600, based on current market pricing, can be immediately and automatically calculated as it is transferred therein. A valve 11634 is mounted directly beneath conduit 11616, which in turn connects to positive displacement pump 11618. Valve 11634 is arranged to provide a means to substantially isolate vessel 11632 in a gas and liquid tight manner. Positive displacement pump 11618 is arranged to pump goods, as may be required, through fine grinder 11636 and subsequently extrude fine ground goods, such as ground beef, directly into packaging trays, such as 11638, that is positioned adjacent thereto. Alternatively, any other processing arrangements such as pattie manufacturing equipment, can be connected directly to the downstream and exit end of pump 11618, and in such a manner so as to allow any selected processing methods of goods. The exit end of pump 11618 may be enclosed in an enclosure that is filled with an oxygen free and suitable gas, selected for its food product quality and storage life enhancing properties.

Referring now to FIG. 285, a cross section of a portion of the meat packaging system is illustrated. A pair of horizontal conveyors 11640 carry a tray 11642 loaded with meat 11644. A space is defined between the horizontal conveyers 11640, such that a ink jet printer 11646 can reside between the conveyors 11640. The ink jet printer 11646 can print a barcode with information such as weight and date of packaging the meat product 11644.

4.1.13. Embodiment

In one aspect of the invention, a blending and/or grinding apparatus are provided. Referring now to FIG. 286 a side elevation of a pre-blending and pumping device is shown. An enclosed vessel 11700 includes a first and a second end, wherein the second end is enlarged relative to the first end. Enclosed vessel 11700 is fitted with impellers 11702 and impeller 11704. Impeller 11702 is mounted to shaft 11706 which is rotated by a driver (not shown) in a direction as shown by arrow 11708. Impeller 11702 is arranged to provide a blending and transferring action of beef grinds 11710 entering vessel 11700, transferred therein from grinder 11712 at the inlet end of the vessel 11700. Horizontal impeller 11702 is configured to blend by a rotating action and move beef 11700 toward the opposite and larger end of the vessel 11700. In one aspect, blending action may be imparted by a number of horizontally disposed fins mounted onto shaft 11706. In another embodiment, blending action may be imparted by a number of paddles mounted on shaft 11706 or in yet another embodiment, blending action is imparted by the rotating screw or cylindrical tumbler or any combination of the above. A pre-grinder 11712 is located adjacent to the pre-blender 11700, such that ground boneless beef can be transferred directly into the enclosed vessel 11700. On the end opposite of the entry point for boneless beef, vessel 11700 is directly attached to a vertically disposed cone shaped section 11714. The cone shaped section 11714 is fitted with an impeller 11716 mounted vertically to shaft 11718 and has a cone shaped profile corresponding with the cone 11714 and is driven by suitable driver such as an electric motor, rotating about the vertically disposed shaft 11718. The vertical impeller can further impart a blending of boneless beef by rotation. Impeller 11704 can include any number of vertically disposed fins mounted to shaft 11718 or to a central core. The horizontal impeller 11702 and vertical impeller 11716 can be driven by a common drive that is directly connected in such a manner so as to ensure that the impellers do not collide during normal operation. Vessel 11700 is fitted with injector ports shown as 11720 located on a underside of the vessel 11700, through which any suitable substance can be injected such as $CO_2$, into enclosed space 11722, in liquid or gaseous form and can be used for cooling contents 11710. A vent 11724 is located at the upper side of vessel 11700 and opposite to ports 11720 so as to allow any spent gases to escape. In one aspect, vent 11724 can be fitted with a pressure release valve to allow a controlled elevated gas pressure to be maintained therein. A barrel type conduit 11726 can be located in the lower section of the cone 11714. Barrel conduit 11726 includes pumping screws suitably mounted in the conduit 11726. Screws mounted within conduit 11726, may be a single screw or matching twin screw arrangement. In one instance, the barrel 1126 with pumping screws therein can be arranged such that it is inclined upwardly from the lower section of the cone 11714, and connected directly to a measuring/analysis device such as the AVS or Epsilon equipment herein described below. In this way, ground meat 11710 can be fed directly into the enclosed pre-blender vessel 11700 from a pre-grinder 11712. Pre-grinder 11712 can also be fitted with injection ports 11728 to allow injection of any selected gas, such as $CO_2$ into the grinding head of the pre-grinder 11712. In this way, ground and blended beef that has been conditioned to a selected temperature, can be transferred to the cone section 11714. The lower section of the cone 11714 can be at a lower elevation to the lower floor of the pre-blender, at ports 11720, such that grinds naturally fall therein after transfer along the pre-blender. The vertical cone shaped impeller 11704 will assist in ensuring that a minimum quantity of gas is transferred within the grinds and into pumping screws at 11726. The pumping screw(s) 11726 and 11730 can then pump the grinds upwardly through the measuring device (not shown) and into the entry end of the continuous blender 11732. In one aspect, two or more pre-blenders, similar to vessel 11700, with cone shaped sections and pumping screws can be arranged to transfer corresponding streams of grinds directly into the entry end of the blender 11732 via measuring devices. The velocity of each stream can be adjusted according to the measured properties and or contents of each respective stream of grinds. The speed of the rotation of the screws mounted in the continuous blender 11732 can also adjusted as required and according to, for example, the fat content of each stream of grinds, so as to produce a single stream of grinds blended to a pre-determined specified fat content. In this way, the complete pre-blending apparatus, which may comprise two pre-blenders with cones and screw pumps arranged to connect to a centrally located continuous blender 11732 mounted between the pre-blenders, occupies the minimum floor area. By elevating the pumping screws and continuous mixing barrels at a suitable angle to the horizontal, the ground meat is elevated therefore allowing easy transfer to one or more silo. All conduits are enclosed with a selected gas provided therein and light is also excluded from within the conduit.

4.1.14. Embodiment

Referring now to FIG. 287, a perspective view of a ground meat pre-blending, fat measuring and continuous blending assembly is shown. Pre-blender 11800 comprises an enclosed vessel 11802 mounted on a frame 11804 with an enclosing lid 11806 fitted there upon so as to substantially retain any selected gas that may be provided therein. Liquid $CO_2$ gas injector nozzles 11808 can be provided in the lower sections of the vessel 11802 walls and venting conduits 11810 and 11812 can be provided in the upper walls of vessel 11802 to allow excess gas to vent to atmosphere or for transfer to other equipment for further use therein. Valves such as butterfly valves can be provided in vent as shown. Powered impellers 11814 are mounted within vessel 11802. A twin screw pump 11816 is fitted to vessel 11802 so as to provide pumping of the contents of vessel 11814 into continuous blending device 11818 via fat measuring conduit 11820. A port 11822 is provided in a vertical wall of vessel 11802 and pre-ground meat can be transferred directly there through, for a pre-grinder (not shown), in the direction shown by arrow 11824. An additional pre-blender 11826, substantially similar to pre-blender 11800 is provided in an opposing position, and connected to continuous blender 11818 via fat measuring conduit 11828. Continuous blender 11818 is fitted with twin mixing screws 11830 which are arranged to continuously mix such pumpable product as grinds and pump in a direction shown by arrow 11832. With the assembly arranged as described herein, pre-ground meat can be transferred directly into pre-blenders 11826 and 11800 in continuous streams and then pumped directly therefrom by pumping screw pairs 11834 and 11816 respectively, into continuous blender 11818 via fat measuring devices 11828 and 11836 respectively. Fat measuring devices 11828 and 11820 may be AVS equipment as referenced herein. In another embodiment, excess $CO_2$ gas that would otherwise vent to atmosphere from vents 11812 and 11810 in the direction shown by arrows 11838 and 11840 can be transferred directly into conduit 12442 in the direction shown by arrow 12444 as shown in FIG. 294 and in so doing provide a means of reducing surface water that may otherwise be retained on the surface of the boneless portions of meat shown as 12408 and 12410. In this way, excessive water can be removed from being present with boneless portions of meat shown as 12408 and 12410 prior to further processing thereof.

4.1.15. Embodiment

Referring now to FIG. 288, a cross section through a continuous blender 11900 constructed according to the present invention is shown. In one instance, the continuous blender 11902 comprises an elongated cylindrical tube of diameter greater than inlet conduit 11900. Continuous blender 11902 includes an internal screw 11904 having a first and second section with a spiral configuration of screw flights with a diameter that is substantially similar to the inner diameter of the continuous blender 11902. In one aspect, screw 11904 is arranged to provide a pumping effect to grinds transferred into conduit 11900 and is arranged also with a mixing section 11906 that separates the first spiral screw section from the second spiral screw section, such that a radial mixing effect is suitably provided to the stream of grinds 11908 at the mixing section 11906. In one aspect, the mixing section 11906 includes paddles affixed onto the central core of the screw rather than helical screws. Slanted paddles may be oriented at varying degrees. The direction of flow of stream 11908 is shown by arrow 11910. In this way, grinds transferred into conduit 11900 on the upstream side of continuous blender 11902 is pumped and blended by the action of screw 11902 and then transferred into conduit 11900 on the down stream side of blender 11902. In one instance, by monitoring and/or adjusting the back pressure in a continuous blender, surge can be controlled to a desirable level in the continuous blender or eliminated altogether.

4.2. Measuring Instruments

One aspect of the present invention is a measuring instrument capable to measure a suitable variable, such as fat, water, lean, and the like that comprises the goods.

4.2.1. Embodiment

Referring now to FIG. 289, a cross sectional view of the conduit of FIG. 273 is shown as a square or rectangular tube 12000. Tube 12000 and tube 12002 are similar. Tube 12000 can be manufactured from any suitable material which includes plastics as well. In one aspect, two electrodes, shown as 12004 and 12006 are located on opposing internal sides of tube 12000 and attached to terminals 12008 and 12010. Electrode 12004 is attached to terminal 12008 and electrode 12006 is attached to terminal 12010. An electrical current can be arranged to flow through terminals 12008 and 12010 and into electrodes 12004 and 12006. Ground beef (ground meat) is shown as 12012 and in this way, will directly contact the electrodes as it passes through tube 12000. The electrical current can therefore pass through ground beef from electrode 12006 and to electrode 12004. Electrical current will be affected by the resistance of the ground beef and this resistance will vary according to the ratio of fat and muscle content of the ground beef and therefore the electrical resistance can be measured. The variation in electrical resistance can be measured and such measurements can be converted and used to determine the ratio of fat and muscle contained in the ground beef in a continuous manner. Tube 12000 with terminals and electrodes together comprise a measuring device shown as 12014. The measuring device may be installed, and used to measure the ground beef fat and muscle content ratio, at any convenient location as may be required.

4.2.2. Embodiment

Referring now to FIG. 290, a perspective view of one embodiment of conduit section 12100, for use with an AVS fat measuring system is shown with a cross section in FIG. 291. In one embodiment of a measuring system, the depth through which the x-ray fat measuring means is projected through the product is reduced. This provides for improved fat measurement accuracy when using an x-ray measuring means. Consequently, in order to allow for high levels of production, the slot or conduit opening shown by arrows 12102 and 12104 is in one aspect, shallow and wide. More specifically, dimension 12104, which is the height of the slot should be relatively shallow and the dimension shown by arrow 12102 which is the slot width, should be relatively wide. Typical dimensions could be a height of 1.3" and a width of 7.7". However, it is to be appreciated that other dimensions are suitable for the particular application, the dimensions given here being examples of one particular embodiment.

Such a slot profile will provide for more accurate measurement of the grinds fat content as it passes through the slot. However, in some instances this may result in an increase of the exposed surface area of the 2× "windows", to which fat can stick/build-up, within the conduit. Therefore, such a slot or conduit profile can allow improved accuracy of the actual fat measurement but can decrease the accuracy of measured fat content in the grinds passing through the conduit, which would vary according to the amount of fat that has built-up on the two "windows" at any particular time during production, because the fat that is fixed to the windows will be continually measured and added to the fat content of the grinds passing there through. Therefore, one aspect of the present invention is to provide a method and apparatus to allow more accurate fat measurement and also ensure that inaccuracies due to fat build-up, on the windows does not occur. To this end, a suitable scraping means may be incorporated as described herein below.

Conduit 12100 may be manufactured from any suitable plastics material that allows x-ray's to pass there through in a suitably unrestricted manner, and is attached at flange 12106 to a ground meat supply conduit 12108 and also, at the opposing end, at flange 12110 to a continuous blender 12112. In this way a continuous stream of ground meat 12114 can be transferred directly through conduit 12100 in the direction shown by arrows 12116 from an upstream pre-blender such as shown as 11826 in association with FIG. 287 and directly through conduit 12118 and into continuous blender 12120 and at a known velocity. The working details of AVS fat measuring equipment are available from the manufacturers recently located at Safeline AVS Limited, Cheyneys Lodge, Ashwell, Herts., SG7 5RP, UK and it should be noted that such conventional equipment can be prone to failure or inaccuracy due to "fat build-up", more specifically when fat adheres to the internal walls of the conduit shown as 12118 and, in particular, when "fat build-up" occurs in the direct view of the fat measuring x-ray's that pass directly through the stream of ground meat, such as at the windows shown as 12122 and 12124.

Referring now to FIG. 291, the present invention discloses an apparatus and method of ensuring that such "fat build-up" is minimized by providing x-ray transparent lenses or "windows" 12122 and 12124 with a means for scraping. In one particular embodiment, windows 12122 and 12124 are cylindrical members made from any suitable x-ray transparent material. In one aspect, the windows 12122 and 12124 include scraping members such that window surfaces can be either intermittently or continuously scraped by a scraping edge such as 12126 in the interior of conduit. "Windows" 12122 and 12124 are attached to bearings 12128 to enable rotation in the direction of arrow 12130. Window 12122 can be attached to any suitable driver such as a geared servo electric motor arranged to provide a rotating movement to each window in the direction shown by arrows 12130 and 12132, which can be arranged to correspond with the same velocity and direction of stream of grinds 12114 in the direction shown by arrows 12116, and in such a way that scraping edge 12126 will scrape substantially any and all substances such as fat that may become adhered to the surface of either window that is exposed to the stream of ground meat 12114 that is transferred through conduit 12100. Referring again to FIG. 291, clamps 12134 and 12136 can be arranged to provide a clamping force so as to minimize leaking of beef 12114 through any gap that may otherwise exist between the retainer bearings 12128, 12138, window 12122 and conduit 12100. This clamping force can be varied according to the pressure of the grinds passing through the conduit 12100.

Referring again to FIG. 290, windows 12122 and 12124 can include longitudinal apertures 12140 and 12142 therein through the center axis. In this manner, a conditioned stream of suitably temperature controlled fluid can be transferred through apertures 12140 and 12142 and all components in the assembly shown in FIG. 290 can be temperature controlled by way of temperature controlled fluid transferred through enclosed apertures 12140 and 12142 attached directly to the respective components.

Additionally, the internal surface of the other parts of the conduit 12100 can be coated or treated with such materials known as Tufram, as supplied by General Magnaplate to minimize fat build-up at those other locations within the conduit.

In one aspect of practicing the present invention, certain measuring devices may be preferable over others for use in certain applications of the present invention. For example, it has been discovered that GMS devices are not suitably capable of measurement of certain substances that are not affected by the microwave radiation within a particular wavelength being used by these devices. Without limitation, ice may be one of those substances suspected not suitably capable of measurement using the GMS device. A further feature of GMS devices is the rate at which readings are collected. In a GMS device, the device is capable of taking up to two readings per second. In comparison, an AVS device can take readings as high as 600 times or more per second. It is believed that this may be due to the type of radiation emitted from each of the devices.

Considering the limitations and strengths of the foregoing measuring devices, one aspect combines the strengths of each device in a processing method and apparatus. For instance, the AVS strengths are that it can measure readings at a rate of 600 times per second. For control purposes, this type of device is advantageously used in streams that are desired to be flow controlled, whose flow rates can see rapid and relatively wide swings in composition. These devices are best suited for the individual streams that feed into the continuous blenders described herein.

On the other hand, the conditions of the stream exiting the continuous blender is best suited for the GMS device. This is because the conditions are less varying and a reading every half second is suitable. Furthermore, the GMS device is capable of taking readings of the composition of a product such as beef grinds while being transferred through a conduit with a screw transfer means fitted within a conduit and wherein the conduit and screw equipment is manufactured from a suitable plastics material, such as ultra high molecular weight linear low density polyethylene, and therefore can be incorporated into these applications. While reference is made to one material suitable for practicing the present invention, it is to be appreciated that other suitable materials can be used, the one mentioned here being an example of one embodiment.

4.3. Decontamination

At a time when there is increasing consumer demand for natural, if possible, organic foods and an increasing regulatory requirement for reduction or elimination of artificial chemicals and preservatives in such foods, particularly meat and meat products, it is alarming to note that many proposed methods for decontaminating meat and other foodstuffs rely on the addition of chemicals not normally found in or on such foodstuffs or by irradiating such foodstuffs with ionizing radiation.

Therefore a need exists to better control the meat processing environment and the materials being processed within it so as to more effectively reduce or remove the microbial population on the materials being processed, eliminate sources of cross contamination and recontamination within that environment and simultaneously maintain or improve the meat quality and keeping quality attributes of the products processed and produced within that system. The apparatus and methods of the present invention fulfill these needs.

It is one aspect of the invention to provide for the decontamination of bone-in or de-boned animal carcass, boneless beef, primals, cut primals, ground and sliced beef and like products, but also including any other perishable item, such as fruits and vegetables, and grains and their products. While reference will be made to beef, it is to be appreciated that any other perishable goods will realize benefits if treated in accordance with the apparatus and methods disclosed herein. Decontamination and sanitizing may be used interchangeably.

One aspect of the invention provides for aseptic packages that can substantially eliminate or significantly reduce the amount of refrigeration required for the storage of certain otherwise perishable goods.

One aspect of the invention provides methods and apparatus that obviate the limitations of decontamination methods for meat which principally rely on adding powders, water, solutions or other liquids to raw meat and its sequent products such that either the volume of water added may either exceed the natural proportions normally found in raw meat and its products and/or may require labeling of the fact, accordingly.

One aspect of the invention provides a method that can enhance the decontamination capabilities of the system by changing the physical properties of the meat to make the surface less suitable for microbial growth and the microbes themselves more susceptible to the decontamination treatment and as a consequence enhance the keeping qualities of the raw meat and its products so formed.

One aspect of the invention includes pre-grinding the meat to a substantially uniform size and exposing the freshly ground meat particle surfaces to a sufficient quantity of carbon dioxide gas such that the pH at the surface of the meat is reduced to a pH of less than 7.0, and in some instances less than 5, and still other instances less than 2.8 or less. It is also an aspect of the present invention to treat the beef with a suitable narrow wavelength, germicidal UV source. Additionally, and if necessary, provision is made to add a further decontaminating component to the suitable gas flow which may be any suitable substance such as reduced quantities of any suitable salt solution, liquid or powder or chlorine dioxide or an inactive precursor to such a gas which becomes active on contacting the carbon dioxide enriched surface of the ground meat.

One aspect of the invention minimizes sources of recontamination and cross contamination within the processing environment generated or enhanced by either the action of the processing equipment itself or the enclosed atmosphere within which the processing operations occur. This can be accomplished, for example, by cleaning in place all such processing equipment which comes in contact with the food item. According to the present invention, a substantial portion of the processing equipment is enclosed, thereby providing an efficient means to flood the conduits with a suitable decontaminating gas, such as ozone, chlorine dioxide and the like. In this manner, the decontaminating agent reaches all contact surfaces and provides aseptic conditions for the processing and packaging of beef. In this environment, the bacterium *E. Coli* 0157:H7, can be either killed or, should the bacterium be injured in the decontamination step and then be deprived of oxygen, in some instances, it will subsequently die in an oxygen free environment. The inventor of the present subject matter theorizes that this strain of bacterium will be injured and put in a weakened state, making it more susceptible to the lack of oxygen. Therefore, in one embodiment, a vessel wherein the beef is treated with a decontaminating agent, such as ozone and/or chlorine dioxide, will either kill or place the bacterium in an injured state, so that the ozone treatment vessel can be followed with a vessel wherein a substantially reduced oxygen environment is provided. In one instance, the reduced oxygen environment can be as low as 5% oxygen and 95% carbon dioxide. However, other embodiments can provide for an oxygen concentration of less than 1% down to about 10 ppm or even less than 3 ppm. In this manner, due to the injured condition of the bacterium, after having been exposed to a decontaminating agent, the reduced oxygen environments which are herein described for the treatment of beef will increase the potential to kill the *E. coli* bacterium.

One aspect of the invention provides a method which utilizes the mechanical action of the processing operation to keep the processing equipment as clean and debris free as practically possible and substantially continually present all exposed surfaces to a suitable physical decontaminant, such as UVC on its own or in conjunction with reduced quantities of solutions, liquids, powders or carbon dioxide gas that may contain an effective quantity of decontaminating agent or agents in active or precursor form, such as chlorine gas, chlorine dioxide, ammonia, hydrogen peroxide, acidified sodium chlorite and anti-oxidants. The atmosphere can be maintained aseptic by any suitable method using any suitable substances which may include a combination of the mechanism of forming the carbon dioxide, passing the carbon dioxide through suitable physical filters and then exposing the suitably filtered gas to a suitable germicidal UV source before entering the processing environment.

One aspect of the invention minimizes oxidation reactions or the rate of oxidation reaction occurring within the product and thus maintain the highest meat quality attributes or even enhance the meat quality.

One aspect of the invention provides a method which undertakes all material grinding operations, material measurement operations, material adjustment and blending operations in a substantially enclosed environment of carbon dioxide or carbon dioxide with other gases or substances to the substantially complete exclusion of oxygen and may include the provision of a suitable means to monitor and maintain the substantially complete exclusion of oxygen without the need for any evacuation step nor a need to significantly alter the atmospheric pressure within the processing environment while excluding substantially any presence of natural or artificially generated light of any wavelength except that which may be generated by the narrow wavelength UV sources used to generate a substantially aseptic atmosphere within the substantially enclosed processing environment. This method can be further enhanced by accurately monitoring and controlling the processing temperature to ensure it substantially remains in the range −2° C. to 0° C. or if processing operations cause deviation from the desired range, it returns to the set temperature as quickly as possible thereafter.

Another aspect of invention provides apparatus and methods of disinfecting raw red meat, white meat, and any other suitable food stuff, any individual component thereof, and/or any resultant processed product, the processing environment, any associated equipment and the associated processing by means of a carrier gas which itself acts as a microbiostat and microbiocide, in the presence of one or more decontaminating agents which themselves may be a gas or a gas in a precursor form, in the presence of a sterilizing atmosphere generated by and maintained by germicidal UV, in the absence of visible light and under tightly controlled temperatures in such a manner as to enhance the overall effectiveness of treating beef.

In accordance with one aspect of this invention, it has been found that exposing meat surfaces to an introduced atmosphere predominantly of gaseous carbon dioxide during all practical stages of processing has resulted in a significant reduction in the total numbers of viable microorganisms compared with meat not so treated. For the purpose of definition, the carbon dioxide atmosphere means an atmosphere which is predominantly carbon dioxide but may also contain amounts of other gasses including air, nitrogen and noble gases such as argon, krypton, xenon and helium but significantly excluding oxygen. It may also include additional gaseous components. For the purpose of definition the term ‘additional gaseous components’ may include but is not limited to chlorine, chlorine dioxide or ozone. However the composition of the carbon dioxide in the total introduced atmosphere will always exceed the combined total of the other gaseous components by at least a ratio of 2:1 and in some instances 4:1 or more. In one instance, the atmosphere is exclusively carbon dioxide with or without any additional gaseous components added in a concentration sufficient to induce a synergistic microbiocidal effect.

This effect is further believed to be enhanced by the various stages in the processing operations including but not limited to the grinding, cutting, blending and agitation processes all of which ensure that substantially all new surfaces formed are thoroughly bathed in the carbon dioxide atmosphere. The operations generating the new surfaces cause an increase in the free natural moisture on the combined surface area of the particles, primarily due to cellular disruption and diffusion which further enhances the ability of the surface to absorb further amounts of carbon dioxide resulting in increasing acidity at the immediate surface. While the microbiocidal effect is noticeable at acidic pH values below 7.0 and in some instances below 4.0, in one instance of this aspect of the invention, the effect is maximized when the level of dissolved carbon dioxide is such that the pH at the immediate surface of the particle is 3.0 or less.

It is a further aspect of this invention that the effect is still further enhanced when the temperature of the surface of the meat is kept substantially at 0° C. or below but not lower than −2° C. such that any part of the foodstuff being processed is exposed to any substantial freezing or freeze followed by thawing. This is effectively accomplished by using the carbon dioxide atmosphere in a form which provides substantial latent heat to the operation such as a pressurized liquid or as a solid such that it additionally acts as a refrigerant during the subsequent processing operations.

By introducing the carbon dioxide atmosphere to the processing system in this manner and further allowing it to contact all food surfaces immediately as they are formed throughout the many processing operations, it eliminates the need to previously dissolve the gas in any liquid or other carrier prior to or during any contact step.

Many chemical methods which rely on, if not entirely, at least in part, the lowering of pH as a means of generating antimicrobial properties, also require the presence of carrier liquids not only to provide suitable dilutions thus preventing the introduction of deleterious physical and chemical properties to the foodstuff being treated, but also to effect an even distribution around the particle surfaces. The use of carbon dioxide atmosphere as described here is both advantageous and desirable as it eliminates all of these deleterious effects without the addition of any significant amount of carrier liquid or other medium. In some instances, the concentration of carbon dioxide environment is greater than 50%; however, in other instances, the concentration is greater than 90%, 95%, 98%, 99%, or the residual gasses make up no more than 1000 ppm, or 500 ppm or 100 ppm or 10 ppm.

In a further aspect of this invention, it has been found that with the surfaces of the meat, meat product or other foodstuff substantially exposed to the carbon dioxide atmosphere, the addition of other natural products or materials herein described can synergistically enhance the overall microbiocidal and microbiostatic effects of the carbon dioxide atmosphere alone.

In one aspect of the invention, the various stages in the processing operations including but not limited to the grinding, cutting, blending and agitation processes are not only exposed to sufficient amounts of the carbon dioxide atmosphere to achieve the pH conditions required and an excess of the gas to maintain them throughout but they are simultaneously exposed to a suitable source of narrow wavelength of germicidal UV. This exposure may be in the form of one continuous exposure throughout the processing operation or several discontinuous exposures of differing doses and duration throughout the processing operations such that a synergistic effect between the carbon dioxide atmosphere and the germicidal UV is achieved resulting in a substantially greater anti-microbial effect that can be achieved with either the same level of the carbon dioxide atmosphere or germicidal UV alone.

These conditions produce a very substantial microbiocidal reduction in both pathogenic bacteria and total viable counts for a very wide variety of foodstuffs. However, very occasionally, either when the foodstuff has a very heavy total microbial load or contains some very specific pathogens, a more extensive decontamination treatment has been necessary to ensure a satisfactory reduction for processing purposes. Such methods and materials are disclosed herein.

It is therefore a further aspect of this invention that these additional materials which may include but not limited to chlorine gas, chlorine dioxide gas, ozone all in gaseous form or organic acids such as citric, acetic, ascorbic or proprionic acids, their salts and esters or sodium chlorite in micro-droplet solution form or any other suitable decontaminating component can be introduced to the carbon dioxide atmosphere gas stream which acts as a carrier to these materials and moves them to the surface of the foodstuff. These additional decontaminating agents are applied at a concentration that would achieve the necessary level of decontamination without exceeding any regulatory limitations on the upper level of concentration used, or upper levels of residual concentration remaining in or on the foodstuff after treatment, or failing to meet statutory labeling requirements. The additional agents and strengths can be readily determined by experimentation.

As prolonged exposure to elevated levels of the carbon dioxide atmosphere and germicidal UV and any additional decontaminating agent can be hazardous to the health of human operatives working within the processing environment, it is a further aspect of the invention that these reactions and interactions occur within a substantially enclosed processing environment which minimizes any human exposure to either or both processes.

One aspect of the invention substantially decontaminates the surfaces of foodstuffs prior to commencement of processing operations, but it is acknowledged that such action may not generally sterilize the foodstuff adequately. As a consequence, without suitable preventative treatment, all the surfaces of the processing operation equipment which come in contact with the foodstuff would steadily become contaminated themselves and act as a potential source for cross contamination and recontamination of already substantially decontaminated foodstuffs. It is therefore a further aspect of this invention that most, if not all, of the processing equipment which comes in contact with the foodstuff being processed is itself subjected to a decontamination regime similar to that of the foodstuff. This may be the carbon dioxide atmosphere alone, the germicidal UV alone, or the carbon dioxide atmosphere together with the germicidal UV, or any of these in combination with but not limited to chlorine, chlorine dioxide, ozone all in gaseous form or organic acids such as citric, acetic, ascorbic or proprionic and their salts and esters, or sodium chlorite in micro-droplet solution form or any other suitable decontaminating component at a concentration that would achieve the necessary level of decontamination without exceeding any regulatory limitations on the upper level of concentration used, or upper levels of residual concentration remaining in or on the foodstuff after treatment, or failing to meet any statutory labeling requirement as the result of any such treatment.

To achieve the required level of continuous sanitation of processing equipment, the surfaces of such equipment need to be substantially devoid of physical debris and/or biofilm residue. While this is usually accomplished by the continuous movement of the foodstuff components through the processing equipment or the mechanical action of the processing equipment or the interaction between the physical surfaces of the equipment and the foodstuff components, occasionally there is a need to augment such activities to achieve the required low level of residual physical debris and/or biofilm residue. It is therefore a further aspect of this invention that mechanical and/or other physical means can be applied to the processing system equipment components as necessary. This function may carried out in the form of scrapers, brushes, air jets, water jets or similar actions where the surface to be cleaned has occasion to be presented to the mechanical cleaning action without the presence of the foodstuff or where otherwise allowable.

Alternatively, this may be achieved by one or more of the foodstuff components themselves in either an isolated form, for example, rusk, bran or other abrasive foodstuff used in a sausage or product formulation or a changed physical state for example lean meat in a substantially frozen or tempered state. These may be within a substantially continuous processing operation or between phases of a substantially continuous processing operation or in a discontinuous batch processing operation.

When carbon dioxide is supplied in an excess of that necessary to achieve the desired level of microbiocidal and microbiostatic control. Such a waste of excess material is an additional expense to operational costs. In an effort to eliminate such additional processing cost, a further aspect to this invention, allows for the excess carbon dioxide within the carbon dioxide atmosphere to be recovered and reused. This can be substantially achieved by venting the excess gas from the processing system through one or a plurality of vents and passing the excess gas back into the gas generation system through a series of necessary filters to remove unwanted gases and contaminating materials, for example an oxygen absorber to remove unwanted oxygen, an oxygen scavenger to remove unwanted residual oxygen, a scrubber unit to remove unwanted moisture and materials in solution or suspension, a filter to remove particulate matter and a germicidal UV cabinet to remove contaminating microbial organisms. Other units can be added to remove any other specific unwanted materials as necessary. The cleaned carbon dioxide atmosphere can then be reprocessed, for example, put under pressure to change the carbon dioxide component of the carbon dioxide atmosphere to a liquid or otherwise refrigerated to convert it back to a solid form. Such a final step would also allow any of other gaseous contaminants not already removed or inerts to other applied removal steps to be removed from the recovered gas. Additionally, and as a further aspect to the invention, this also serves as a method of maintaining the processing atmosphere substantially aseptic.

In a further embodiment to the invention, the introduction of an excess of the carbon dioxide atmosphere to the processing operation at its very earliest stages allows for all subsequent processing operations to be carried out in an atmosphere which minimizes or substantially eliminates the presence of air, and more specifically, oxygen. All oxidation reactions are substantially deleterious to a number of attributes related to product quality. For example, meat in the presence of air or oxygen will irreversibly change colour from an initially attractive red colour primarily due to the formation of oxymyoglobin to an unattractive brown colour primarily due to the formation of metmyoglobin. In the presence of the carbon dioxide atmosphere and the absence of air or oxygen, an alternative purple red pigment, ferrous myoglobin is formed and is maintained in the continued absence of air or oxygen. However, the attractive oxymyoglobin is easily formed when the meat is exposed to air in a controlled manner, for example, within a modified atmosphere package.

A further advantage of the presence of the carbon dioxide atmosphere and the absence of air or oxygen is the minimizing or elimination of deleterious biochemical and chemical reactions within the foodstuffs which result in a reduced keeping quality of the foodstuff, an increased likelihood of the generation of off-flavours and off-aromas due to the formation of oxidation products and the generation of an atmosphere more favorable to the growth of any residual aerobic microorganisms which themselves generate different but additional off-flavour and off-aromas.

In a further aspect to this invention, all processing steps which include the presence of germicidal UV are carried out in an atmosphere substantially of carbon dioxide and to the exclusion of oxygen or air. Germicidal UV is a known oxidizer and under specific conditions particularly in the presence of foodstuffs which are low pH and/or contain components capable of substantial oxidation such as unsaturated fats, germicidal UV can initiate undesirable accelerated actinic oxidation reactions. The presence of a substantially air or oxygen free atmosphere will minimize or eliminate these effects. However, while nitrogen or other inert gases can achieve such an atmosphere, and would permit germicidal UV to have a decontaminating effect on its own, they do not allow the immediate surface of the meat or other foodstuffs to become sufficiently low in pH to enable the synergistic microbial reduction reaction to occur as when germicidal UV and carbon dioxide are simultaneously present.

In a further aspect to this invention, all or most of the processing operations are undertaken in an environment also substantially devoid of natural or artificial light except for that generated by germicidal UV or as a consequence of the generation of germicidal UV. Light or more particularly reactions such as photo-oxidation or photo degradation which reduce overall meat quality are initiated, amplified and/or accelerated by the presence of natural light and certain wavelengths of artificial light. Germicidal UV alone does not generate such an oxidizing environment.

It is a further aspect of this invention that the biocidal effect is still further enhanced when the temperature of the surface of the meat is kept substantially at 0° C. or below but not lower than −2° C. such that any part of the foodstuff being processed is exposed to any substantial freezing or freeze followed by thawing.

The early provision of a controlled and defined atmosphere also allows for that aseptic atmosphere to be maintained throughout all processing operations. It also permits the aseptic atmosphere to be continuously or subsequently modified so that the product is substantially in its final defined and desired atmosphere at the time it enters its packaging operation. This has a double benefit. Firstly the aseptic nature prevents any product recontamination or cross-contamination as the product moves between processing and packaging operations thus maintaining the very highest level of product safety. Secondly, it eliminates the need for the customary evacuation cycle at the time of final packaging when the existing atmosphere is removed and replaced by a defined atmosphere within which the product is sealed during any final packaging operation.

It is a further aspect of this present invention that the carbon dioxide atmosphere in which the product substantially undergoes its processing operations is monitored and controlled or monitored and adjusted, either in a single step or in a series of smaller controlled steps so that the finished or final product is predominantly surrounded within the desired final packaging atmosphere at some suitable point during the processing operation and before it enters any final packaging operation. However, other embodiments may still provide for the packaging operation to be done in the final environment.

In one aspect of the invention, sanitizing, de-contamination, and pasteurizing as described in the methods herein are carried out substantially prior to grinding and are carried out in a continuous manner, meaning that the transfer of the boneless beef from the sanitizing conduit/vessel to the grinder is substantially direct (as would occur in an enclosed conduit) so as to minimize any delay between sanitizing and grinding. The grinding process increases the surface area of the meat by several hundred fold, which exposes substantially increased quantities of surface liquid which can then mix with the sanitizing agent thereby affecting the pH which can minimize oxidation, which is desirable. With such agents as acidified sodium chlorite, the increased surface area/surface liquid will lower the pH, which is desirable and will immediately reduce oxidation.

4.3.1. Embodiment

Referring now to FIG. 292 a side view of an apparatus that can be used to surface treat freshly slaughtered (pre-rigor) animal carcasses that are intended for human consumption, is shown. Carcasses harvested from identified live animals with all details of origin that meet any legal requirements can be marked with any suitable markers and/or tagged with tags 12200 and 12202. The tags may comprise any suitable programmable chip, barcode, radio frequency (RF) tag or suitable means of recording detailed information as needed and can be attached to the carcass or to the roller assemblies 12204 and 12206. The detailed information can be arranged in readable form so as to allow accurate transfer to any other information record that can be attached to each and all items derived from the original carcass from which the items are sourced. In this way, all legally required information relating to any item derived from the original carcass can be retained and attached to all items derived from the live animal with it's source information retained by each item at all times prior to human consumption of the items. Further description on how to trace the information associated with a particular animal carcass to the final packaged product is provided below.

Referring again to FIG. 292, rail 12208 is mounted at a suitably elevated location above floor 12210 in a refrigerated room or enclosure, in some instances, maintained at a selected temperature such as about 40° F., by suitable refrigeration equipment. However, other suitable temperatures can be used. Carcasses such as are shown as 12212 and 12214 are suspended on rollers 12204 and 12206 respectively, such that the carcasses can be moved by automatic drivers and transferred in the direction shown by arrows 12216 at a continuous rate or intermittently.

An enclosure 12218 is located on along the path of travel of carcasses, such as carcass 12212, wherein carcass 12212 can be made to pass into enclosure 12218. Enclosure 12218 includes vertically disposed sides 12218 arranged in relative close proximity to the carcasses as they are transferred along rail 12208 and in such a manner so as to substantially retain any gas or liquid that may be sprayed within said enclosure. "Air curtains" 12220 and 12222 supplied by blowers or vacuums are mounted at each upper end of the enclosure and arranged to minimize escape of any gas or substances that may be sprayed within the enclosure 12218. A lower side cover 12228 with a drain mounted therein is located along the lower section of the enclosure 12218 and nozzles 12224 are provided in the side 12218. Nozzles 12224 can be used to inject gases and/or liquids such as ozone and $CO_2$, or any other suitable gases into the enclosure 12218. A vent 12226 is mounted at the upper side of the enclosure 12218 and a powered extractor fan or impeller can be provided in such a manner so as to cause the extraction of any gases or vapors from within the enclosure 12218 as may be required. In this way, any suitable gas such as ozone and carbon dioxide or gas mixtures containing ozone, chlorine, $CO_2$ or any combination of suitable bactericide gases can be provided within said enclosure and in such a way so as to reduce the quantity of any undesirable bacteria that may be present on the carcasses that are transferred through said enclosure 12218.

Immediately after transfer through enclosure with side wall 12218, carcasses can be transferred either to a chilling room where rigor mortis will occur to the carcass muscle and body matter, or alternatively the carcasses can be transferred directly to a disassembly area so that the carcass can be broken down into smaller components such as primal pieces or boneless meats prior to rigor mortis occurring. The process of breaking will be described in greater detail below.

4.3.2. Embodiment

Referring now to FIG. 293, a view of a meat processing and de-contamination apparatus constructed to provide a process for sanitizing boneless meat such as beef, prior to and in some instances immediately prior to grinding in an enclosed system that substantially excludes oxygen. FIG. 293 shows a cross section through an enclosure 12300. Enclosure 12300 includes a boneless beef (meat) loading hopper 12302 shown with boneless beef 12304 provided therein. An elevating screw or other suitable elevating mechanism 12306 is mounted within an upwardly disposed conduit 12308 which is attached to and forms an integral part of an enclosure 12300. A selected gas is provided within the free space contained within enclosure 12300. The selected gas may be carbon dioxide but may comprise any suitable gas or decontaminating agent, described above, at any suitable temperature and gas pressure. An entry port 12316, to allow loading of sanitizers such as SANOVA, any acidified sodium chlorite substance and any other suitable sanitizing substance whatsoever, that may be approved by USDA or FDA authorities, into conduit 12308, is provided. Any convenient number of entry ports may be provided in conduit 12308. Additional entry ports, such as 12312, for liquid carbon dioxide injection, which may comprise injectors as provided by BOC Gases, can be provided at any suitable position. Lower portion of screw 12306 is in communication with meat hopper 12302 so as to elevate any boneless beef therein, while upper portion of screw 12306 unloads onto a horizontal conveyor. Horizontal conveyor is located near the upper roof of enclosure 12300. Ultra violet C emitting apparatus, shown as 12314 is located above and in suitably close proximity to the boneless beef and at any convenient location within the apparatus shown in FIG. 293, as the boneless beef is transferred from the screw along the horizontally disposed conveyors 12316. Conveyors 12316, that are horizontally disposed are arranged to carry boneless beef at a suitable velocity beneath the UVC generators 12314. In one aspect, there are a total of three horizontal conveyors 12316, wherein a UVC generator 12314 is positioned above and adjacent to each of the horizontal conveyors 12316. However, other embodiments may have more or less conveyors, depending on the length, and the amount of duration desired for exposure to the UVC radiation. Any amount of UVC radiation produces an effective and beneficial result, and may be determined experimentally for any application. The conveyor 12316 may be arranged in any suitable configuration such as shown, horizontally disposed and located one above the other as shown in FIG. 293. The conveyors 12316 can be arranged to carry the boneless meat product along conveyors 12316 in alternating directions and allowing the boneless beef to drop onto another conveyor located immediately below and arranged to carry the boneless beef in any suitable direction prior to depositing the boneless beef onto yet another conveyor located beneath the previous conveyor. UVC is generated and directed onto the boneless beef and in such a manner as to maximize death of any anaerobic or aerobic bacteria. The amount of exposure to UVC radiation is readily determined by experimentation. It should be noted that pathogen bacteria is particularly labile or prone to death when exposed to UVC light. Furthermore, death of the bacteria is most effective when the pH at the surface of the meat is low, within the acidic range. Therefore, a gas such as $CO_2$ enhances the likelihood of the UVC killing bacteria that may be present when the $CO_2$ dissolves in water at the meat surface and contained in the meat, thereby forming carbonic acid. The addition of a bactericide such as sodium chlorite that will release bacteria killing chlorine compounds upon contact with water or a solution of citric acid. Such release can result in the production of hydrochloric acid and hypochlorous acid. Therefore, by following the above procedure, the pH at the surface of the boneless meat can be reduced as may be required, according to the quantities of sodium chlorite and carbon dioxide made available.

From the lowermost horizontal conveyor 12316, the boneless beef is transferred to transition piece 12318. A meat grinder 12320 is shown attached directly to the transition piece 12318 in a gas tight manner.

An exhaust duct 12322 is conveniently located at an upper location on the roof of apparatus. An additional gas entry port 12324 is located on a wall of the apparatus. The direction of flow of a sanitized stream of ground meat is shown by arrow 12326 leaving the apparatus after optionally being ground and the stream of boneless beef can be retained within an oxygen free conduit for transfer into other apparatus (not shown) for further processing in any desirable manner.

Several of the systems as described in association with FIG. 293 may be arranged in an adjacent grouping so as to produce two or more streams of sanitized ground meat for subsequent automatic blending, according to the description provided herein. However, direct contact of raw meat, particularly raw red meat and red meat products, with either solid or liquid $CO_2$, results in freezer burn at the point of contact which is displayed as a loss of colour as well as localized freezing. Also, the rate of addition needs to be carefully controlled to maintain the required physical conditions. None of the published methods include the provision of eliminating oxygen, air and other undefined gases as included in the present invention to improve performance particularly those related to maintaining meat quality attributes.

Ozone is a very strong oxidizing agent and in addition to the loss of colour, it can also initiate deleterious auto-oxidation reactions in the meat, more particularly red meat which significantly reduce its quality attributes and especially customer appeal. Thus its use on red meat and its products has been extremely limited and while colour loss is not as much of a problem on white meat and fish meat, the fat complement of such meats renders them more susceptible to the generation of deleterious oxidation products more so than that found in most red meats and at a much faster rate. Finally, conventional processes of decontamination of foodstuffs utilize some degree of chemical and/or physical mechanisms that use oxidation and/or denaturation reactions to achieve their main aims. One of the greatest causes of loss of meat quality in raw meat is oxidation reactions. These mechanisms are well described in most classic meat science text books. Thus, any process which induces oxidation and/or denaturation reactions will be deleterious to the maintenance of meat quality attributes and keeping quality as are processing which add additional moisture to the raw material as a consequence of their activation mechanism, i.e., the use of water to carry the active agents to the site where the action is required. In such circumstances, methodologies that minimize such reactions as well as limiting them solely to the sites of interest rather than an indiscriminate decontamination action on all materials, i.e., total volume rather than contaminated surfaces alone are to be achieved. The use of germicidal UV is one such mechanism. Thus, the primary source of loss of meat quality and keeping quality is oxygen and byproducts generated by oxidative reactions.

4.3.3. Embodiment

Referring now to FIG. 294 a side, cross sectional view of an apparatus arranged to treat boneless portions of meat is shown. A horizontally disposed conduit 12400 and 12402, that may be fabricated from any suitable metallic or plastics material which may also be transparent, is arranged with a product conveying apparatus 12404, mounted therein. In one embodiment, conveyor 12404 includes three conveyor runs. Each conveyor run rises in the direction of travel, so the end of a proceeding conveyor run is slightly at a lower position from the preceding one. Conveyor runs are thus connected with short sharp downward legs so as to provide "waterfalls" as shown at 12406. Waterfalls are created by providing a roller that overhangs into a proceeding conveyor run and a roller that is behind the overhanging roller, so as to resemble a backward "S" path traveled by conveyor. Product conveying apparatus 12404 is arranged to carry product 12408 and 12410 in the general direction shown by arrow 12412. A conveyor belt 12414 manufactured from any suitable conveyor belt material such as stainless steel wire mesh, is driven by a suitable electric motor over a plurality of rollers 12416. Gas injection ports 12418 are provided in groups 12418, 12420 and 12422 in the lower section of conduit 12400 through which any selected gas such as ozone, chlorine or carbon dioxide can be injected into spaces 12424 and in such a manner so that selected gases will reticulate upward through wire mesh conveyor belting and so as to contact all exposed surfaces of product 12410. Exhaust ducts 12426 and 12428 are located on the upper side of conduit 12400. It should be noted that the injection nozzles 12430 and exhaust ducts 12428 and 12426, could be located at any convenient position around the circumference of conduit 12400. Walls, such as 12432, can be provided on the upper interior surface of the conduit 12400 dividing gas injection groups. In this manner, gas is restricted from travelling thereto. However, interior walls 12400 are optional. A hopper 12434 is located at the entry end of conduit 12400 and product 12408 is suitably provided therein. A wall can be provided between conduit 12400 and hopper 12434 to restrict gas passage therethrough. UVC light sources are provided at 12436, 12438 and 12440 and in such a manner so that UVC light generated at said sources can pass through transparent conduit 12400 and directly contact the exposed surfaces of product 12410 as it is transferred along conveyor 12414. As product is transferred along conveyor 12414, it is exposed to gases (or liquids such as a solution of acidified sodium chlorite) provided through injection ports 12430 and UVC light. Gases, such as ozone and chlorine, introduced through injection port groups 12418 and 12420 can be extracted through exhaust port 12426 and are substantially restricted from passing through wall 12432, and likewise, gases injected through ports in group 12422 are also substantially restricted from passing through wall 12432. In this way, any gases injected through port groups 12418 and 12420 that do in fact pass by wall 12432 can be "washed" out through exhaust duct 12428 by any suitable gas such as carbon dioxide, injected through ports in group 12420. In this way product 12408 can be transferred through conduit 12400 from hopper 12434 and treated by exposure to various selected gases and UVC light and in such a manner so as to substantially, if not completely pasteurize the product by killing bacteria that may be present thereon. Conduit 12400 with conveyor 12414 therein mounted can be arranged with any suitable length and divided into any number of separated zones by such means as wall 12432. In this way, product 12408 can be sequentially exposed to any selected gases that can be then exchanged in a subsequent zone with another selected gas. A conduit 12442 may be provided in the wall of conduit 12428 and any suitable dry gas such as substantially dry $CO_2$ can be blown there through in such a way so as to contact the surfaces of product 12408 as it is transferred along conveyor 12414 and thereby assist in the evaporation and removal of excessive liquid such as water that may be present at the surface of the product. This is particularly helpful if bactericide liquids, such as a solution of acidified sodium chlorite (SANOVA), has earlier been sprayed onto the product. It should be noted that a screw conveyor can be used as an alternative to belt conveyor 12414.

4.3.4. Embodiment

Referring now to FIG. 295 another embodiment for decontaminating beef according to the present invention is illustrated. A horizontally disposed conduit 12500 is arranged with a rotating wire mesh tube 12502 mounted therein. Conduit 12500 includes exhaust conduits 12504 mounted at any location about the circumference of the conduit 12500. Tube 12502 is arranged with spiraling blades 12506 attached about the inner surface of tube 12502 and in such a manner so that product 12508 is transferred in a direction indicated by arrow 12510 when tube 12502 is rotated in a constant direction and at a constant speed. In one aspect, the blades 12506 can be inclined in a direction to transfer the product in the direction of arrow 12510. A tube 12512 with ports 12514 therein is provided at the center of wire mesh tube 12502. Any selected gases can be injected through tube 12512 and through ports 12514 into tube 12502 and thereby into conduit 12500 so that direct gas contact with the exposed surfaces of product 12516 will occur. Gases can be vented through exhaust vents 12504 as required.

In this manner, the product 12508 is provided with selected gaseous, liquid or powdered substances in such a way so as to enhance the keeping qualities and quality of the boneless portions of meat.

4.3.5. Embodiment

In yet another aspect of the present invention, an apparatus is disclosed that will provide for an optimum duration of ozone exposure to perishable products, such as meat. Thus, the present invention provides for protection against the over exposure to ozone which may cause undesirable results in the final product. Contrary to conventional thinking, the present invention also minimizes the amount of liquid added in the product that reacts with ozone.

Referring now to FIG. 296, a system for maintaining the proper duration of ozone gas or ozone aqueous solution contact and or hydrogen peroxide ($H_2O_2$) with meat is schematically illustrated. Suitably, the contact time can be from several seconds to several minutes, with a suitable amount being from about 10 seconds to about 45 seconds, and sometimes from about 15 seconds to 30 seconds. The ozone treatment system includes at least a first propulsion station 12600 capable of transferring product from a receiving container, indicated by reference numeral 12602 forward to an ozone contact station 12604. The perishable product is suitably cut into sizable chunks coming from a portioning station (not shown). The chunks may be any suitable size. Suitably, the product can even come in different sizes so that parallel propulsion stations 12600 and 12606 and ozone contact stations 12604 and 12608 are provided, one for the relatively larger chunks and one for the relatively smaller chunks. In this manner the smaller chunks of perishable product can be contacted with ozone for a longer duration period. Suitably, this second contact period can be longer than 30 seconds. This is because the increased surface area of the smaller chunks of product can bear and carry therewith larger quantities of bacteria such as *E. coli* 0157:H7. The product can then be transferred to the first contact station to finish treatment and continue with gas scrubbing. The ozone contact station 12604 is suitably attached to the propulsion station 12600 in a substantially gas tight manner. The ozone treatment system further includes an ozone scrubbing station 12610, located downstream from the ozone contact station 12604, to substantially cleanse the ozone, and/or hydrogen peroxide, and/or any oxygen gas that may be present having been derived from the decomposition of the ozone, from further or extended contact with the product. A venting station 12612 is located at a junction of the ozone contact station 12604 and the ozone scrubbing station 12610. While reference is made to a vessel having one vent. However, more than one vent can be provided in an ozone contact station, the description and the FIGURE being an example of one embodiment. The ozone contact station 12604 and the ozone scrubbing station 12610 are likewise connected to one another in a substantially gas tight manner at the venting station 12612. However, in other embodiments, the need for one or more venting stations, similar in operation to venting station 12612, are provided along that upper length of ozone contact stations 12604 and/or ozone contact station 12608. In this manner, any excess ozone or additionally added gasses can be vented more effectively. The ozone contact station 12604 includes an ozone injection point 12614, for ozone or any desirable bactericidal gas or mixture of gases or other suitable substances, injection point 12614 may also be used to inject a suitable quantity of water such as 1.5%, while the ozone scrubbing station 12610 includes a scrub gas injection point, for a gas without any free oxygen, such as carbon dioxide or nitrogen or mixture of such gas and any other gas. The ozone gas can combine with the water to form an aqueous ozone solution or hydrogen peroxide and thereby enhance the contact of the ozone with the relatively inaccessible surfaces of the meat portions. The ozone gas flows in the direction towards the venting station 12612, while the scrub gas likewise flows in the direction of the venting station 12612. The venting station 12612 can include a pressure regulating station that controls the pressure of the ozone contact chamber within a suitable range that inhibits the decomposition of the ozone. The ozone contact station 12604 can include a mixer to enhance the contact of ozone with the perishable product. The mixer may likewise perform as a transferring conveyor to move the product forward through the ozone contact station 12604. Likewise, the ozone scrubbing station 12610 may include a mixer to expose areas of trapped ozone gas to the scrubbing gas to expel the ozone from the product. The ozone scrubbing station 12610 can also include a transferring conveyor to carry the product forward. Once the product has been treated and scrubbed of ozone, processing according to other aspects of the present invention may proceed such as grinding or blending in a controlled atmosphere. Other embodiments of the scrubbing station 12610 can include a source of ultraviolet C radiation to further cause decomposition of the oxidizing gas, ozone. In this way, the ozone gas is displaced by the scrubbing gas, such as carbon dioxide.

In a further aspect of the present invention, the ozone contact stations 12604, 12608 and/or the scrubbing station 12610, can be provided with one or more nozzles (not shown) for the introduction of one or more substances. It is known that ozone is a strong oxidizing agent. Therefore, in an effort to minimize or substantially reduce any deleterious oxidizing effect that the ozone may have on the beef product, an antioxidant, such as an organic acid, including the salts and esters of the organic acids, such as citric, acetic, ascorbic, and proprionic acid can be introduced before, after, sequentially or concurrently with the introduction of ozone, nitrogen, and/or carbon dioxide. Other agents, such as ammonia and hydrogen peroxide, or any combination of the all the above can be provided. In one instance, ozone can be introduced into one of the aforementioned ozone contact stations, followed by an antioxidant, which is thereafter followed by purging with nitrogen and/or carbon dioxide gas. In this manner, any oxidizing effect imparted by ozone is significantly reduced.

In an aspect of the present invention, a substantially enclosed system still allows the escape of gases and vapors. However, solids loss is kept at a minimum, unlike the conventional systems which allow blood or other fluids to escape with the water and/or wash.

A further aspect of the present invention is realized by including in the aforementioned system the capability to add moisture in the form of water to the system where the amount of water is calculated based on the amount of gas added. This is advantageous from the standpoint of conserving the yield. For instance, in one aspect, the gas, such as carbon dioxide is injected into the system as a gas (or in some instances as a solidified form or as a liquid form) The process of injecting liquid carbon dioxide then causes an amount of moisture to be driven away as water vapor or ice crystals. The amount of water vapor that is driven away can be readily calculated by the amount of carbon dioxide which is injected and perhaps also knowing the form of the carbon dioxide. In turn, the amount of carbon dioxide that is injected is based on the temperature of the product. Thus, by measuring the amount of carbon dioxide that is injected, a quantity of water can be calculated to compensate for the moisture that is calculated to be driven away. The amount of water that is lost as water vapor and is being replenished may also be calculated from the temperature of the product in some instances. Under some circumstances, the amount of moisture that is lost can be as high as 1% or sometimes even higher. The method and apparatus of providing capability to add water based on the amount of gas realizes a substantial cost savings, since the moisture is considered to have value in the final product which is eventually packaged. Any suitable port can be provided on any vessel to inject an amount of water based on the amount of carbon dioxide. Alternatively, the water can be injected along with any line or stream being transferred into the vessel.

In other aspects of the invention, moisture losses occur through the normal tendency of water to evaporate into the ambient atmosphere. The loss of water occasioned by evaporation can be compensated for by including a calculated amount of water to make up for the water lost through evaporation. Such calculated measurements can consider the time and temperature exposure of the products through the several processing stages. In still further aspects, the amount of water can be determined by weighing the product before and after any processing stage and realizing any weight loss is due to evaporation or other form of moisture loss. The amount of water can then be added that is approximately equivalent to the difference in weight. In yet another aspect, the product may undergo freezing or exposure to temperatures below the freezing point of water at the particular pressure. The time and temperature exposure of the product to these conditions further causes loss of moisture from the product, thus reducing yield. In one aspect of the invention, an amount of moisture in the form of water can be added to compensate for the amount of water that is lost at any freezing stage of the product processing. In one instance, the amount that is lost to freezing can be calculated by measuring the time of exposure of the product to the freezing temperature and also by measuring the temperature. Thus, a calculated amount of water can be added to the product to compensate for any moisture loss during any freezing stage of processing, such as occurs in a freezing tunnel or during tempering.

In a further aspect of the present invention, the amount of water with agent, wherein the agent may be selected from ozone or SANOVA, can be determined based on the how the beef portions or any other perishable product, such as ground beef will be subsequently processed. For example, in one instance, chubbs or ground beef portions will have about 2.5% water added to or with agent, which may comprise about 1.5% pickup (as allowed by the USDA) and about 1% evaporation. However, in other aspects, if frozen patties are being treated, then about 3.5% to about 4% water would be added to or with agent comprising about 1.5% pick-up and about 2% to about 2.5% evaporation. In this manner, depending on how the product will later be processed determines the amount of water that will be added. This is possible because the amount of water that is added can be predicted based on observation. The amount of water that is added can further be calculated based on the downstream processing steps.

In yet another aspect of the present invention, the amounts of water are proportional to the total grinds volumetric or mass flow through the enclosed system, which can be added according to the product and or the evaporation rate. The present invention can provide for a separate decontamination system per stream.

Referring again to FIG. 296, a cross sectional side elevation of an apparatus assembled so as to sanitize boneless meat in an enclosed environment comprising a series of pressure vessels joined together in a substantially gas tight manner is schematically illustrated. A boneless meat compressing and dispensing assembly 12616 is arranged with a horizontally disposed screw 12618 driven by the shaft 12620, mounted in the lower section of vessel 12600. An opening 12622 allows boneless beef to be loaded into vessel 12600 in the direction shown by arrow 12602. Vessel 12600 may be temperature controlled by any suitable means such as by heat exchanging via a suitable medium passed through jacket 12624. Portions of meat 12626 are loaded into vessel 12600 and are then transferred after being compressed through an aperture 12628 and into pressure vessel 12604. Pressure vessel 12604 is suitably constructed as a horizontally disposed cylindrical vessel. Suitably, the pressure within pressure vessel is controlled at any pressure above atmospheric to about 40–50 psig, as ozone can decompose at higher pressure levels. The rate at which meat is continuously transferred through aperture 12628 is controlled at a selected rate and a quantity of water can be continuously provided through any port such as 12630. The quantity of processing aid water and boneless beef can be controlled such that the respective quantities transferred into pressure vessel 12604 are maintained at selected proportions, such as 98.5% meat and 1.5% water. While by regulation, the amount of water that is present in the meat product is controlled at a suitable percentage, the present invention is not thereby limited. The present invention may suitably carry out the desired sanitizing of the meat with any amount of water, though at the present time, the amount of water is about 1.5% of the total meat product.

In this way a precise quantity of water, substantially equal to about 1.5% of the finished ground meat, by weight, can be added and retained in accordance with USDA allowances. It should be understood that any amount other than 1.5% can be added, the particular amount presently being dictated by government regulations. Conventional methods that do not measure the quantity of water that is then added to the ground meat must allow excess water to run off without control and therefore, with other methods, a precise amount of 1.5% cannot be consistently retained, with the grinds, after processing.

The limited amount of water that is added during the practice of the present invention is also contrary to conventional processing which typically can, with the use of the Alcide Sanova process for example, wash the meat product in large quantities of water and then remove the excess water, thereby expending additional energy and needlessly washing away valuable protein from the product. During the transfer of meat pieces into pressure vessel 12604 air or gas is substantially excluded by the action of horizontally disposed screw 12618. A gas such as carbon dioxide can be provided into port 12632 to assist in displacing air from vessel 12600. Pressure vessel 12604 is fitted with an impeller 12634 with longitudinally disposed blades having parallel external and internal edges, whereby the external edges are in close proximity to the inner surface of pressure vessel 12604 that is provided with round cross sectional profile.

One of the ends of a blade is radially displaced from the corresponding end, so that the blades, while turning, create a lifting and forward motion as the impeller is turned inside of the pressure vessel 12604. Impeller 12634 is mounted to bearings that allow rotation about a horizontal axis driven via shaft 12636 by a driving means (not shown) with variable speed adjustment. Impeller 12634 is arranged with a central space 12638 and having a profile that transfers meat portions 12640 there through in the direction of arrow 12642 when rotated. In this way, impeller 12634 agitates the beef to more fully expose the beef to the ozone. It is also contemplated that vibration of the beef in any manner may realize benefits when used in the invention. An ozone generator (not shown) is arranged to generate ozone gas from either atmospheric air or a source of oxygen and under a pressure of approximately 45 psi transfer such ozone gas which can be transferred with measured quantities of processing aid water through ports 12614 and into space 12638 where said ozone gas pressure is held at approximately 45 psi and allowed to contact the surfaces of meat pieces 12640. The rotating action of impeller 12634 elevates meat pieces upwardly and tumbles the meat pieces thereby ensuring that substantially all surfaces of meat pieces contact the ozone gas therein. Meat pieces transferred through aperture 12628 are suitably compressed such that gas cannot escape there through. Ozone gas and/or any other selected gas transferred into space 12638 through ports 12614 is continuously replenished as it is allowed to flow in the direction shown by arrow 12644 toward venting conduit 12612. In this way the residence time of meat portions 12640 in space 12638 can be limited to a specified period of time which is controlled by the rate of transfer through vessel 12604 by impeller 12634. During that transfer the residence time can be arranged to ensure that all surfaces of meat pieces are exposed to said ozone gas and mixed thoroughly with water injected through port 12630. Another meat transfer apparatus 12606 can be arranged to transfer a separate stream of meat pieces into pressure vessel 12606 with impeller 12646 mounted therein. Meat pieces are loaded into vessel 12606 in the direction shown by arrow 12648. A selected gas, with processing water can be provided through port 12650 and/or processing aid water injected through port 12652 as required and in quantities that are approximately 1.5% of the volume of meat transferred into vessel 12608 through aperture 12654 where said meat can be combined with water and compressed so as to exclude any gas or air transferring there through and preventing the escape of any gas from space 12656. Ozone gas is provided at a selected pressure through ports 12658 and 12644 in the direction shown by arrows 12660. A horizontally disposed impeller with blades 12646 is mounted so as to rotate about a horizontally disposed axis and is driven by a variable speed drive attached to shaft 12662. The residence time of meat pieces 12664 is determined by the rate of rotation of impeller 12646 and is transferred through vessel 12608 in the direction shown by arrow 12666 and into depression 12668. Meat pieces are transferred from depression 12668 through conduit 12670 in the direction shown by arrow 12672 and into vessel 12604 at a selected rate of transfer controlled by an elevating screw housed with conduit 12670 and driven by a variable speed drive attached to shaft 12674. In this way two streams of meat pieces are treated with ozone gas and are then subsequently combined together. Meat pieces provided in streams shown by arrow 12602 may be substantially larger than pieces provided in stream shown by arrow 12648. It should be noted that it is typical for the amount of bacteria such as *E. coli* 157:H7 to have greater concentration on the surfaces of smaller pieces of meat than is typically present on the surface of larger pieces of meat. The process described herein can provide for smaller pieces of meat processed through vessel 12608 to be exposed to ozone gas for a longer period of time and as may be required than those larger pieces of meat that are processed through vessel 12604. Both streams of meat are combined in vessel 12604 and transferred there together in the direction shown by arrow 12642. Referring now to vessel 12676 a meat grinder is located in the lower section thereof with a horizontally disposed auger. 12678 rotated by variable speed drive (not shown) attached to shaft 12680 with blade and grinding plate located at 12682. The meat grinding assembly can grind meat pieces 12684 and transfer grinds 12686 directly into vessel 12688, and thereafter the meat can be treated, processed or packaged according to any one aspect of the present invention. Meat transferred there through is compressed in such a manner that gas cannot escape through grinding plate 12682 and said compressed meat thereby provides a plug even though it is being continuously transferred into vessel 12688. Pressure vessel 12610 is attached at one end to grinder vessel 12690 and at the other end to vessel 12604 and in such a way that boneless meat is transferred from vessel 12604 and into horizontally disposed vessel 12610 that can be located in a lower position to vessel 12604 so as to facilitate transfer of boneless meat. Carbon dioxide gas is provided through ports 12692 at a pressure equal to the ozone gas provided through ports 12660 and 12614. The $CO_2$ gas is provided so as to fill space 12694 and 12696. A horizontally disposed impeller with blades 12698 is mounted in vessel 12610 and is rotated by shaft 12700 in such a manner that meat pieces 12702 are transferred through vessel 12610 in the direction shown by arrow 12704 however, gas injected through ports 12692 will flow in the direction of lower pressure shown by arrow 12706 and in doing so can substantially remove ozone gas that has been in contact with said meat pieces during the transfer of said meat pieces through vessel 12604. A vertically disposed conduit 12708 is arranged with pressure regulator valve 12710 in such a manner that will allow gas to pass along conduit 12708 in the direction shown by arrow 12712. In this way gas pressure at 12714 can be regulated to a desired pressure while still allowing the regulated escape of exhaust gases therethrough. The purpose of arranging apparatus shown in FIG. 296 is to provide a means of sanitizing meat pieces by exposure to ozone gas without allowing extended exposure. Ozone gas has a tendency to decompose into oxygen gas but is more effective in sanitizing when held at a pressure of approximately 40 psi. Extended exposure of red meat to ozone gas will result in the formation of metmyoglobin discoloration at the surface of the meat but when ozone gas is used in the manner herein described, the exposure time is limited to an extent that will minimize the extent of metmyoglobin formation.

4.3.6. Embodiment

Referring now to FIG. 297, a further embodiment of a second ozone treatment system is schematically illustrated. The system includes a first ozone contact station 12800, having an ozone injection point 12802. The contact time can be provided to be within several seconds to several minutes. As with the embodiment mentioned above, the contact time can be about 15 seconds to about 30 seconds. However, the contact time can be easily adjusted to be more that 30 seconds depending on the size of the perishable good chunks. The ozone contact station 12800 includes a venting station 12804 with a lower stage pressure regulating station 12806 that suitably maintains the pressure in the ozone contacting station 12800 within a prescribed acceptable limit so as not to cause excessive amounts of decomposition of the ozone. Suitably the pressure within the ozone contact station 12800 can be from slightly above atmospheric pressure to about 50 psig. The venting station 12804 can suitably be connected to an end of the ozone contacting station 12800. The ozone contact station 12800 has a transfer device to move the perishable product from the entrance to the exit, thus allowing exposure of the perishable product to the ozone. The transfer device can suitably be controlled to time the average amount of exposure the perishable good is in contact with the ozone. The ozone treatment system also includes an ozone decomposition station 12808, suitably located downstream of the ozone contact station 12800. Suitably, the ozone is eliminated from the perishable product by destruction of the ozone into oxygen which is then scrubbed free from the perishable product by any suitable scrub gas, such as carbon dioxide or nitrogen, or scrubbing gas mixture with any other gas. The ozone decomposition station 12808 suitably operates on the principle of ozone destruction by increased pressure, therefore, the ozone treatment system also includes an upper stage pressure regulating station 12810 connected to a second venting station 12812, suitably located on an end of the ozone destruction station 12808. The ozone destruction station 12808 is maintained at a relatively higher pressure than the lower stage pressure regulating station and may also be provided with a suitable source of suitable UV light, such as UVC, therein which can also assist in destruction of the ozone and or bacteria that may be present with the meat. Any device that can provide a pressure in the ozone destruction range will serve as the ozone destruction station in the practice of the invention. In one instance, the ozone destruction station can be a pump as herein described, such as the Marlen pump in connection with FIG. 271. In this instance, the resultant oxygen can be scrubbed or washed out by any suitable gas, such as carbon dioxide. In another aspect, the pump can be connected to a suitable vacuum pump to remove the oxygen therefrom However, in other instances, the ozone destruction station includes an upper stage pressure regulating station 12810 can suitably be located downstream of the ozone destruction station 12808 to thereby control the pressure of ozone destruction station 12808. Suitably, a propulsion station 12814 is interposed between the lower pressure ozone contact station 12804 and the higher pressure ozone destruction station 12808 to transfer the perishable good from the ozone contact station 12800 to the ozone destruction and gas scrubbing station 12808. Once the perishable product is cleansed of ozone (or substantially cleansed of ozone), the product is free to be processed and or packaged according to any other aspect of the present invention.

A specific embodiment of an ozone treatment system for perishable products having an ozone contact station with a low pressure regulating station and an ozone destruction and gas scrubbing station having a high pressure regulation station will now be described with reference to meat.

Referring again to FIG. 297, a further embodiment of an ozone treatment apparatus is schematically illustrated. A stream of boneless meat 12816 is provided in the direction shown by arrow 12818 and transferred after compression by auger 12820 into vessel 12800. Vessel 12800 is arranged with horizontally disposed impeller 12822 and supply of ozone gas through ports 12802. Exhaust conduit 12824 is attached to vessel 12800 and a pressure regulating valve 12806 controls pressure of ozone gas in space 12826 at a higher pressure than what is vented at stream 12828. However, in other alternates, it is possible to equip the vessel 12800 with one or more exhaust conduits, similar to the exhaust conduit 12824. These additional conduits (not shown) can be located along the length of the upper vessel wall 12800. Boneless meat pieces are transferred in direction shown by arrow 12818 and into vessel 12814. Auger 12830 transfers boneless meat 12829 through aperture 12835 into vessel 12832. $CO_2$ gas can be provided through port 12836 in the direction shown by arrow 12838. Pressure vessel 12808 is fitted with impeller 12816 which is driven by variable speed drive attached to shaft 12840. Space 12842 is pressurized with a selected gas such as carbon dioxide provided through port and in direction shown by arrow 12844. Exhaust conduit 12812 is fitted with pressure regulator valve 12810 that maintains gas pressure at 12842 at a selected pressure. However, in other alternates of the present invention, it is possible to include one or more exhaust conduits (not shown), similar in operation to exhaust conduit 12812. These additional conduits (not shown) can be located along the length of the upper vessel wall 12808. Meat pieces are transferred through conduit 12846 into vessel 12848 in direction shown by arrow 12818. Meat pieces 12850 are then transferred by auger 12852 through grinding head 12854 and directly into vessel 12856. In this way boneless meat can be processed prior to grinding when the surface area of said boneless meat is less than after grinding. Meat can be treated in vessel 12800 in a continuous process and exposed to ozone gas at the elevated pressure of approximately 44 psi. Meat can then be transferred via transferring vessel 12811 into vessel 12832. Gas pressure in vessel 12832 can be set at a different pressure to that in vessel 12800. For example the gas pressure at 12828 may be 44 psi which is a most suitable pressure for ozone gas when used for sanitizing, however gas pressure at 12850 can be maintained at a substantially higher pressure of for example 80 psi and at which pressure ozone gas will more readily decompose. In this way ozone gas can be used as a sanitizer at the most suitable pressure of 45 psi (and controlled temperature) and the spent ozone gas can be exhausted through conduit 12824. Ozone gas is substantially prevented from entering vessel 120808, however any ozone gas that is transferred into vessel 12808 can be exposed to a higher pressure which will cause it to decompose which can then be exhausted through conduit 12812 more readily and sanitized meat can be transferred for subsequent grinding into vessel 12848 or to any other aspect of processing or packaging meat described herein.

In a further aspect of the present invention, anyone of the vessels 12858, 12800, 12814, 12808 and 12848 and their interconnecting conduits, can be provided with one or more nozzles (not shown) for the introduction of one or more substances. It is known that ozone is a strong oxidizing agent. Therefore, in an effort to minimize or substantially reduce any deleterious oxidizing effect that the ozone may have on the beef product, an antioxidant, such as an organic acid, including the salts and esters of the organic acids, such as citric, acetic, ascorbic, and proprionic acid can be introduced before, after, or concurrently with the introduction of ozone, nitrogen, and carbon dioxide. In one instance, the anti-oxidant agent can be introduced with an amount of water. In one instance, ozone can be introduced into one of the aforementioned vessels, followed by an antioxidant, which is thereafter followed by purging with nitrogen and/or carbon dioxide gas. However, in other aspects, the ozone may be introduced and purged, and thereafter the antioxidant is introduced. In this manner, any oxidizing effect imparted by ozone is significantly reduced.

In yet another aspect of the present invention, in the decontamination process disclosed in association with FIGS. 296 and 297, there are two components of added water. One component is a USDA allowable "pick-up" of about 1.5% when water is used as a "processing aid" in the decontamination process. This is a valuable addition because the added water can be included in the overall product yield, however, all other methods do not measure the amount of water that is added and dump large quantities of water and then simply allow excess water to drip off. Since, per USDA standards, the 1.5% cannot be exceeded, it is impossible according to conventional methods to determine when sufficient water has been allowed to drip off to arrive at 1.5%. According to the invention, the amount of water is measured to arrive at substantially 1.5%, thus eliminating the need to "drip off" any excess water.

The second component of added water is the amount of water associated with compensation for loss due to evaporation and freezer loss, which occurs because of sublimation of ice crystals during freezer storage. In some instance, the amount can be as high as 1.25% or even higher. According to the present invention, the amount of loss caused by evaporation or sublimation can be calculated via a computer and the amount that is predicted to be lost can be added in advance to the enclosed conduit and ground with the meat. There are numerous variables to consider when calculating the second component of water. In the grinding process, the surface area of the grinds is increased by a huge factor, which in some instances can perhaps exceed several hundred fold. Because of the increased surface area, the additional water can then become evenly distributed over the increase surface area. It is important to realize that the amount of processing aid water added cannot exceed the loss, (other than the amount allowed by present law of 1.5%). Providing for better control of processing aid water within the acceptable limits is an advantage of the present invention over previous methods.

4.3.7. Embodiment

Referring to FIG. 298, a further embodiment of the present invention is shown. FIG. 298 is similar to FIG. 296, however, one or more injection ports 12716, can be provided in vessel 12604 or vessel 12608 (ports 12716 not shown). Ports 12716 suitably can carry chlorine dioxide ($ClO_2$). In one instance, the port 12716 can be provided downstream of the ozone injection ports 706, but upstream of the carbon dioxide ports 12692. Furthermore, the ports 12716 can be provided on the upper or lower portion of the vessel 12604. According to the invention chlorine dioxide can be combined with ozone to provide a synergistic decontamination effect, than ozone or chlorine dioxide alone can provide. The reaction of the chlorine dioxide and the ozone advantageously consumes the chlorine dioxide, while providing the decontamination effect. In another aspect, a filter containing manganese dioxide can be provided in the vent exhaust outlet 12714, before or after the regulator valve 12710. In this aspect the manganese dioxide can eliminate any unreacted ozone that is expelled with the carbon dioxide.

4.3.8. Embodiment

Referring to FIG. 299, a further embodiment of the present invention is shown. FIG. 299 is similar to FIG. 297, however, one or more injection ports 12860, can be provided in vessel 12800. Ports 12860 suitably can carry chlorine dioxide, $ClO_2$. In one instance, the port 12860 can be provided downstream of the ozone injection ports 12802, but upstream of the carbon dioxide ports 12836. Furthermore, the ports 12860 can be provided on the upper or lower portion of the vessel 12800. According to the invention chlorine dioxide can be combined with ozone to provide a synergistic decontamination effect, than ozone or chlorine dioxide alone can provide. The reaction of the chlorine dioxide and the ozone advantageously consumes the chlorine dioxide, while providing the decontamination effect. In another aspect, a filter containing manganese dioxide can be provided in the vent exhaust conduit 12812, before or after the regulator valve 12810. In this aspect the manganese dioxide can eliminate any unreacted ozone that is expelled with the carbon dioxide.

4.3.9 Embodiment

In one particular embodiment of the apparatus shown in FIGS. 296, 297, 298, and 299, any suitable refrigeration units may be interfaced with one or more of the vessels to provide a sequential and continual drop in temperature of the beef as it progresses from the pumping station to the ozone contact station, the scrubbing station, and finally the meat grinding station. In one instance, three temperature zones can be established. A first temperature zone, such as while the beef is transferred through the ozone contacting zone, can be in the range of about 30° to 36° F. In this first zone, the processing aid water does not freeze and crystallize prior to it performing the function of a processing aid. A second temperature zone, such as during the grinding, pre-blending, pumping and fat measuring process can be in the range from about 29° to about 38° F. A third temperature zone, such as during the continuous blending and subsequent storage prior to packaging or further use, can be in the range of about 27° to about 30° F. Any temperature zone can be provided in any of the aforementioned vessels, referring to FIG. 1200, for example, pumps 12616 and 12606, ozone contact vessels 12604 and 12608, ozone scrubbing vessel 12610, meat grinder 12690, and storage vessel 12688. In one instance, temperature zone 1 can be reached in ozone contact station 12604. The second temperature zone can be reached in vessel 12610, and the third temperature zone can be reached in vessel 12690. Any temperature zone can be provided in any vessel. However, a preceding temperature zone is suitably at a higher, or warmer, temperature than the one following it. In this manner, the effect of ozone, chlorine dioxide, and any other agent added therein is effectively increased by the stepwise decreasing change in temperature.

4.3.10 Embodiment

Referring now to FIG. 375, one embodiment of a decontamination apparatus 18800 that can be used to sanitize fresh meat products intended for human consumption, such as boneless beef, is shown. A conduit/pressure vessel 18810 is interposed between a supply of boneless beef that is transferred therein, in the direction of the arrow 18806 shown, and into a perforated cylindrical conduit 18816 mounted, with sufficient clearance, on the inside of said conduit/pressure vessel 18810. Perforated conduit 18816 is suitably mounted to variable drive centrifuge. On the downstream end of the conduit/pressure vessel 18810, the end is sealed from ambient air and attached to a second pump that transfers processed boneless beef onto a next step. A series of plough/fins 18818 is mounted to an adjustable mounting bar 18830, horizontally disposed, and adjustable in such a manner that the plough/fins 18818 can be moved to a position close to the inner surface of the perforated conduit 18816, and in such a position that will scrape boneless beef away from the internal surface of the perforated conduit 18816, and in so doing transfer and turn the boneless beef. Injection ports 18824 for ozone and chlorine dioxide are provided, and injection ports 18822 for nitrogen and carbon dioxide are also provided. A centrally located, horizontally disposed conduit 18826 with atomizing spray attachments is enclosed within the pressure vessel 18810. In one aspect conduit 18826 is used to inject sanitizing agents.

Boneless beef is provided at the entry end of perforated conduit 18816, which rotates at an adjustable speed of approximately 100–500 rpm. Ozone gas, chlorine dioxide, with processing aid water, and any other suitable decontamination agent, is injected in such a manner that it is sprayed onto meat held against the internal surface of the rotating perforated conduit 18816. The sanitizing agents (gas, water as processing aid, chemicals, liquids) flow in the direction of arrow 18808. Ploughs/fins 18818 transfer and turn boneless beef toward the exit end of pressure vessel 18810 in the direction of arrow 18812. A pressure regulator valve 18804 in the exhaust vent 18802, regulates the internal gas pressure as required and in the order of about 40 psi in one instance. Exhaust gases 18820 are exhausted there through. Excess liquids 18828 that drain via a draining port 18814 can be sanitized in separate apparatus filtered and processed in any suitable manner, and then either recycled through central conduit, transferred for separate use, or discarded as may be determined. In one aspect, drain liquid can be sanitized, transferred to a waste stream used in the production of pet food or re-cycled via ports 18822 or 18824.

In one aspect, this apparatus allows precisely measured quantities of processing aid water, and sanitizing agents to the boneless beef, which is centrifuged according to a procedure that will result in the removal of a precisely predetermined quantity of excess liquid, and in such a way that when processed boneless beef has transferred completely through the apparatus, it will have gained a precise and measured quantity of processing aid water, and sanitizing agents, such as 1.5% or as otherwise may be specified, or alternatively the weight of boneless beef transferred out of the apparatus averages the same weight as the boneless beef transferred therein, at the entry end of the apparatus.

4.4. Slicing

It is one aspect of the invention to provide for the slicing of any meats for the production of meat patties, for example. Slicing done according to the invention can take place in a substantially oxygen deprived environment. In this manner, the qualities of the beef and beef products are substantially enhanced. Such slicing can suitably take place, after coarse or fine grinding and blending as carried out in the manner described herein; however, the present invention may also be practiced with beef that is substantially unground, unblended or otherwise.

In one aspect of the invention, an enclosed conduit for the slicing of meat, ground or otherwise substantially boneless beef is provided. The aforementioned method and apparatus for processing meats refers not exclusively but mostly to ground meats that are can be pumped via a single or several positive displacement pumps. In many other applications, production of meat food products, that involve slicing of large pieces of beef, is required. It has been determined, by the present inventor, that preventing contact of the freshly cut beef surface with atmospheric air can provide enhancement of storage life. Consumers, in general will only buy red meat and therefore to accommodate the needs of the consumer and the requirements of the meat packer, the present invention is directed at providing an improved process whereby meat is sliced by automatic apparatus, directly into an enclosure that excludes air (and oxygen). Therefore, in one aspect of the invention, an apparatus that can slice primal beef portions directly into an enclosure with an oxygen free gas therein, is provided.

While reference, in the context of slicing, is made to meat patties, and the subsequent treatment of meat patties, it is to be appreciated that the present invention may be practiced utilizing any sliced portion of meat, irrespective of its final use. It is to be appreciated that the present invention of slicing, loading, and cooking can readily be applied to other portioners.

4.4.1. Embodiment

In one aspect of the invention, an apparatus is provided for slicing beef patties or other meat products from a continuous stream of grinds, allowing slicing of individual patties to occur while the stream of grinds is stationary relative to the knife. This can be achieved by moving the slicing mechanism parallel with and at the same speed as the stream of grinds and slicing while in motion followed by rapid return of the slicing mechanism to an original position in readiness for subsequent slicing. However, this can be difficult to control and high production output is generally not possible.

In one aspect of the invention therefore, a device is provided that can halt a stream of grinds that is being fed to a slicing device at the time of slicing. Referring now again to FIG. 282 in conjunction with FIG. 281, the velocity of stream 11408, at the exit point 11428 can be adjusted between a maximum rate of flow that is substantially determined by the speed of rotation of screw 11402, and zero velocity by controlled activation of piston 11414. This may be achieved by activating piston 11414, so that it moves, at a controlled rate, away from the housing 11430 and therefore increasing the available volume within cylinder 11416 that can be filled with grinds transferred by screw 11402 and momentarily at a rate equal to the transfer of grinds through housing 11430. This arrangement can provide a momentary reduction of flow and halting of stream of grinds 11408 at exit point 11428. In order to achieve this, and ensure that there is no movement of said stream of grinds at exit point 11428, the rate of increase in available volume in cylinder 11416 must be equal to the volumetric rate of flow of stream of grinds 11408. Therefore, by activating piston 11414 in a reciprocating manner, grinds can be intermittently accommodated within space 11432, in cylinder 11416 and then immediately expelled therefrom in a continuously repeated cycle. In this way, velocity of stream of grinds 11408, can be intermittently varied between a maximum rate of flow and substantially no rate of flow, by adjusting the flow rate provided by rotation of screw 11402 in concert with the cyclical reciprocating motion of piston 11414. Furthermore, additional piston and cylinder assemblies may be installed to provide larger capacities of volumetric variation in space 11432 and to vary the quantity of grinds extruded during each flow cycle from the exit end of conduit 11422 at 11428. Any quantity of grinds extruded during each piston 11414 cycle can be arranged to be equal to the desired weight of a single beef pattie. This cycle rate may be arranged to exceed 500 cycles per minute and, for example, if it is desired to produce quarter pound beef patties, at this rate of 500 cpm, a total rate of production would be equal to 125 lbs. of patties per minute.

Referring now to FIG. 300, a cross section through an apparatus intended for use in slicing extruded streams of ground meats, as described above is shown. Any suitable cutting blade may be used to slice from a continuously extruded section 11434, such as a high-speed, band blade that is driven by a suitable electric motor. Referring now to FIG. 281 and FIG. 300, a temperature controlled conduit, 11436, with flange 11438, is arranged so that it can be mounted directly to the flanges 11424, of apparatus shown in FIG. 281. An arrow 11440 shows the direction of flow of a stream of grinds 11434 transferred from conduit 11422, via orifice 11428 into conduit 11436. Conduit 11436 may be provided at any suitable length 11442, and can be arranged with temperature controlling conduits 11444 imbedded in the walls of conduit 11436. Any suitable liquid that will remain liquid at a selected temperature may be transferred through conduits 11444 at a flow rate that will ensure temperature control of stream 11434 as may be required. A knife cutting blade 11446 with suitably machined bearing attachment 11448 is shown mounted to a driving shaft 11450. Conduit 11436 is mounted at a convenient angle and adjacent to revolving blade 11446 such that as blade 11446 is rotated, patties can be sliced from stream of grinds 11434 and deposited into stacks of sliced patties as shown at 11452 and 11454. In this way, patties can be produced, stacked and transported to a packaging station via conveyor belting 11456 that is driven intermittently by a drive roller 11458 in a direction shown by arrow 11454.

In one aspect of the invention, to minimize accumulation of fat and/or ice on the internal surfaces of conduit 11422, scrapers (not shown) may be mounted, for example to the end of screw 11402 to scrape internal surfaces thereof. Additionally, internal conduit surfaces may be treated with non-stick surfaces that are resistant to any such build up of fat and/or ice. Furthermore, separate temperature zones may be arranged such that, for example, housing 11430 may be maintained at 29.5° F. and any suitable insulation provided at the connection between conduits 11422 and 11436. In this way, conduit 11436 may be set at a much lower temperature such as 10° F. so as to cause a "crust" freezing of the external surface of stream of grinds 11434 and thus provide an improved condition for slicing by knife 11446. The intermittently varied velocity of stream of grinds 11422 can be directly and correspondingly integrated with each revolution of knife 11446 such that during the knife cutting action of stream 11434, the velocity of stream 11434 is reduced to virtually zero and then as the knife rotates through an arc away from the stream 11434 and toward the next slicing of the subsequent pattie, the velocity of stream 11434 can be accelerated then decelerated so as to be again in a substantially stationary position for subsequent slicing by said knife 11446. Control of stream 11434 flow rate is therefore provided by the reciprocating action of piston 11414.

4.4.2 Embodiment

Referring now to FIGS. 301, 302 and 303, a round cross sectional conduit 12900 is horizontally disposed and mounted with an exit end 12902 directly adjacent and above an end of a conveyor 12904, that is mounted at an elevating angle to the horizontal. The conveyor elevating angle is set such that slices of meat will be urged forward by the action of blade 12906 as it rotates and descends, slicing through the primal so that the sliced and separated portion will fall gently onto the conveyor 12904. Enclosure 12908 can be filled with carbon dioxide gas 12910 or other suitable gas that is held at a suitable temperature and gas pressure above ambient atmospheric pressure and in such a manner to ensure that substantially no air and most importantly, substantially no atmospheric oxygen can enter enclosure 12908. The profile of conduit 12900 may be chosen to suit any particular product which may not be round and for example, a square or rectangular profile may be chosen, however, in this instance, a round profile has been shown. A blade 12906 attached to a shaft 12912 is conveniently mounted at the exit end 12902 of conduit 12900 such that slices 12904 can be cut from the end of primal 12914 after emerging from conduit 12900. Blade 12906 can be arranged to cut a single slice during a single revolution of shaft 12912. Therefore, the intermittent sequencing of firstly driving blade 12906 for a single revolution to cut a single slice, followed by the measured and controlled movement of a primal such as 12914 from the exit end 12902 of conduit 12900 can be arranged to automatically and continuously operate. Slices 12904 can then be carried forward in a continuous or intermittent and controlled action for further processing or packaging, along conveyor 12904 driven in the direction shown by arrow 12916, by roller 12918.

Plugs 12920, 12922 and 12924 are shown in cross section and located on the inside of conduit 12900 between primal beef portions 12914. Primal beef portions 12914 may have been previously processed and allowed to set in a mold, after pre-rigor mortis harvesting from a slaughtered animal, such that the cross sectional dimensions of the molded primal corresponds substantially with the cross section of conduit 12900. This method of molding primal cuts of meat will be described herein below, and while the primal cuts can vary in size, molds can be arranged such that only those dimensions shown by numbers 12926 and 12928 will significantly vary. In this way, primal cuts of meat may be located into the entry end of conduit 12900 and in the direction shown by arrow 12930. After locating a primal 12914, into the entry end of conduit 12900 a plug such as 12920 is then loaded directly behind the primal 12932 followed by another primal and then another plug such that a continuous sequence of primal cuts, each with a plug interposed therebetween. Each plug such as 12920 comprises a profiled "piston" with an iron core 12934 enclosed in a plastics frame 12922. Each iron core 12934 may be magnetized to such an extent that, when a suitably mounted electromagnet is adjacent thereto, a magnetic bond is developed between the iron core 12934 and the electromagnet that is substantially unbreakable by any force that is likely to be applied to either part in this apparatus application. Frame 12922 is arranged with one or more flexible lips 12936 that can sealingly contact the inner surface of conduit 12900, but allow plugs 12920 to slide along the internal surfaces of conduit 12900, flexible lips 12936 can thereby provide a seal around the full perimeter of plug 12920 with conduit 12900 and can therefore act as a piston held captive within the conduit 12900. A series of electromagnetic rings 12938, are mounted to a drive mechanism (not shown) and each electromagnet is "mated" with a single plug such as 12920, located on the inside of conduit 12900. The distance between each plug such as 12920, and as shown in examples 12926 and 12928 can be electronically measured by proximity devices conveniently mounted external to the conduit 12900 and adjacent thereto and in such a manner so as to allow measurement of any distance between any two plugs. In this way, any particular primal cut of beef can be measured and with suitable computer apparatus arranged and connected to any suitable measuring arrangement such as said proximity switches, a selected quantity of slices can be automatically calculated and subsequently sliced as the primal emerges from the exit end of conduit 12900 by knife blade 12906. In one instance, a thin section of sliced meat can be removed from each end of each primal and the balance is divided into a quantity of slices having a desirable thickness. Alternatively, the length of each primal, as shown in examples 12926 and 12928, can be divided into a selected number of slices with a thickness automatically calculated, accordingly. Alternatively, slices of a chosen weight may be calculated by a computer. In some instances, the primal cuts can be automatically and intermittently transferred along conduit 12900 with each forward movement of electromagnets 12938 which carry plugs such as 12920 forward simultaneously. In this way, the thickness of any slice cut by knife 12906 can be determined by the distance of each forward movement of electromagnets 12938. As plugs, such as 12920, are carried forward and emerge from exit end 12902, the operation of blade 12906 can be arranged to allow the automatic removal of each plug and subsequent transfer to the entry or loading end of conduit 12900 in readiness for its next use. Plugs can be sanitized prior to next use as may be required.

Conduit 12900 can be temperature controlled by any suitable method which may be provided by circulating liquid, such as glycol, through conduits provided within or in contact with the walls of conduit 12900, and the internal surface of conduit 12900 may be treated so as to resist "sticking" to anything passed there through. In this way, primal portions of beef may be "crust frozen" during transfer through conduit 12900. One or more conduits, such as 12932, may be provided to connect a vacuum, gas or selected agent source directly to conduit 12900. Blade 12902 is controlled to intermittently slice during a single revolution of shaft 12912, conveyor 12904 is mounted in an enclosure 12908, and adjacent to the exit end of conduit 12900, so as to conveniently carry slices to a further processing or packing station.

4.4.3. Embodiment

FIG. 304 shows a side, cross sectional view of an apparatus arranged to automatically form, select, weigh and load patties (or sliced meat), into trays (such as any tray described herein above). While reference is made to practicing the invention with one of the trays disclosed herein, it is to be realized that the present invention can be practiced with any suitable tray, the ones described herein being merely examples of several embodiment. To this end, some trays made in accordance with the invention can be provided with steep, inwardly angled, tray cavity (internal) walls to facilitate accurate loading of ground meat portions, such as patties. Apparatus is generally enclosed within a space 13000 defined by enclosure 13002. A selected gas can be provided in space 13000 which is substantially free of oxygen. An enclosed silo 13002 with any suitable selected gas contained therein, so as to substantially displace air that would otherwise be present, is mounted directly to a pattie forming machine 13004, such as a Formax 26 and conduit 13006 is connected to a ground meat supply such that ground meat can be transferred into silo 13002 in the direction shown by arrow 13008. A pattie forming tool (plate) 13010 is arranged in a typical Formax 26 configuration and positioned to shuttle into and out of the Formax pattie forming chamber in the directions shown by arrow 13012. Patties 13014 are formed by typical Formax 26 method and ejected from forming tool (plate) 13010 by ejector 13016 and onto conveyor 13018. A horizontally disposed conveyor 13018 is arranged with an automatic length adjusting feature such that roller 13020 can be extended or retracted in the directions shown by arrow 13022 within the limits of the length of the conveyor belt. Conveyor rollers 13024 may be spring loaded and roller 13026 can be fixed so that as the roller 13020 is extended or retracted, any "slack" in the conveyor belt resulting there from will be accommodated and a constant tension in the belt can be maintained. A scale 13028 is mounted in the conveyor assembly 13018 in such a way so as to allow each of the patties 13014 to be weighed individually. A photo electric cell or image reading camera 13030 is located above conveyor 13018 so that patties can be viewed and automatically selected according to color and/or shape as may be required. Patties 13014 can be transferred from conveyor 13018 onto conveyor 13032 and accumulated in groups such as 13034. A scale 13036 is located in conveyor 13032 so as to enable weighing of a group such as 13034. All weights can be recorded and retained for future use as may be required. Conveyor 13032 has an upper, horizontally disposed section, upon which patties can be accumulated in groups such as 13034, and which can be automatically adjusted in length by extending or retracting conveyor roller 13038 in the directions shown by arrow 13040. Two parallel conveyors 13042 and 13044 with continuous supply of trays 13046 and 13048 carried there along, are located below conveyors 13026 and 13050 so that single patties or groups of patties can be transferred and loaded into trays at 13046 and 13048. A further conveyor 13050 is located adjacent to conveyor 13032 and above trays on conveyor 13044. The length of conveyor 13050 is adjustable in similar fashion to conveyors 13018 and 13032 but by extending or retracting conveyor rollers 13052 and 13054 in the horizontally disposed directions indicated by arrow 13056. With conveyors arranged in this configuration patties can be transferred after weighing from conveyor 13018 to conveyor 13032 and there from either into trays at 13046 located on conveyor 13042 or alternatively onto conveyor 13050. Patties can then be transferred from conveyor 13050 into a tray at 13048 or alternatively onto conveyor 13058. A scale is mounted to conveyor 13050 to allow weighing of patties thereon prior to transfer. Conveyor 13058 is mounted adjacent to conveyor 13050 and any rejected pattie, that may be outside specified weight, color or profile specifications, can be transferred thereto. Formax pattie forming machine may apply a paper sheet to the underside of each pattie and if such a pattie is rejected conveyor 13058 is arranged to separate the pattie and paper so that the pattie can be recycled by depositing into receptacle 13060. A screw conveyor 13062 is mounted at the base of receptacle 13060 and arranged to provide transfer of rejected patties via conduit 13064 in the direction shown by arrow 13066 and into silo 13068 thereby allowing the recycling of such rejected patties. Conveyor 13058 with belt 13018 is fitted with vacuum manifolds 13070 in such a way that paper sheets 13072 will be separated from rejected patties that are transferred to receptacle 13074 and when paper sheets 13072 can be transferred into receptacle 13076 for subsequent disposal. In one embodiment, a slicer may be located at the same location as the Formax 26 so that primal portions of meat such as described in association with molded primals may be sliced and wherein slices may be transferred directly onto conveyor 13018 and processed in similar fashion to that described herein for patties. Additionally, while the embodiment described herein details a disclosure associated with the cross section in FIG. 304 and a single stream of patties formed on pattie forming equipment 13004 several streams of product, such as formed patties or meat slices, can be produced in parallel and with corresponding conveyors arranged to selectively view, weigh and load said products.

4.4.4. Embodiment

Referring now to FIG. 305 a side elevation, schematic view of a meat pattie, burger or meat portion conditioning and cooking apparatus constructed according to the present invention, is shown. The apparatus includes longitudinal conduit 13100. A suitable conveyor 13102, which may consist of a continuous chain mesh belt, is conveniently mounted inside the horizontally disposed conduit 13100. Conduit 13100 can be filled with a selected gas 13104 in such a manner so as to substantially exclude oxygen from the conduit 13100. In one aspect, gas 13104 may also be humidified as required. Any suitable heating means, such as a bank of infra-red heaters 13106, is located inside conduit 13100 and immediately above the conveyor 13102. However, heaters 13106 can be located at any other suitable location, such as below or under the conveyor or on the sides thereof. In another aspect, additional conveyors can be provided in any suitable configuration such as at a downstream end of conveyor 13102 and arranged to carry patties under additional heaters after inversion of the patties 13108 so as to provide cooking and/or sterilizing to the underside of patties (inverter not shown). In one aspect, any suitable additive such as flavors, bread crumbs, starch or gum based liquid or powder can be blended into the ground beef prior to being formed into patties and subsequent entry into cooking apparatus conduit 13100 or alternatively suitable additives may be sprayed onto the surface of beef patties 13108 just prior to transfer onto conveyor 13102. When the patties 13108 are partially cooked the gum/starch can congeal and thereby bond the patties together. This will allow stacking and shipping of fresh, but not frozen, patties without need to interleave paper between each patty. When frozen, the paper is not needed. Selected gas 13104 may be pressurized and maintained at a selected temperature and pressure where such temperature and pressure is selected to maximize efficiency of the cooking apparatus and it's rate of production. The gas may also be humidified, to the maximum extent of substantially comprising 100% humidity or to any other suitable humidity, so as to minimize pattie moisture loss during the cooking processing phase. The speed of the conveyor 13108 can be arranged to suit any requirements so as to, for example, provide a "flash" cooking of the surface of the patties so as to apply minimum heat or alternatively slowed so as to allow thorough cooking of the patties. Immediately after cooking, the patties can be transferred into a chilling tunnel (not shown) to ensure rapid chilling as may be required. The chilling tunnel may comprise any suitable $CO_2$ chilling or freezing tunnel or spiral as sold by such companies as BOC Gases. Processed, partially cooked, sanitized or sterilized and chilled patties can then be packaged in any suitable packaging such as stackable trays, as described herein, which can then be over wrapped with any suitable web material. The stackable trays may be formed from any suitable material such as microwavable polypropylene (PP) or "dual ovenable" or thermal ovenable, crystallizable polyethylene terephthalate (CPET). In this manner, the products can be cooked or heated with conventional microwave ovens in the home, or alternatively in heat convection ovens as well.

In one particular embodiment, the apparatus shown in FIG. 305 may be integrated into a ground beef production system such as is shown in FIG. 338 and in such a manner so as to provide a fully automated production system that is enclosed within a conduit from which oxygen is excluded by providing any suitable displacing gas, at an elevated pressure (above atmospheric pressure), such as $CO_2$ or nitrogen. In this way, the eating texture and flavor of the finished and cooked patties can be enhanced. Furthermore, this method of cooking in an enclosed conduit can eliminate the need to freeze the patties prior to delivery to "fast food" customers such as McDonalds and Wendy's. Cooking beef patties in the manner disclosed herein can be arranged such that the surface of the patties are cooked and "browned" to any desirable extent or depth, but would not necessarily provide complete cooking through the patties if so desired. However, the temperature of the patties during the process could be elevated to a temperature such as 160° F. for a suitable period of time so as to ensure that all pathogen, aerobic and anaerobic bacteria that may be present is killed, thus providing a pasteurizing of the processed patties.

4.5. Pre-Rigor Shaping

4.5.1 Embodiment

In one aspect of the present invention, a method and apparatus for shaping meat portions is provided. In one instance, the use of molds is for shaping primals prior to slicing, as disclosed herein below. In this manner, the slices are substantially similar to one another being of approximately the same weight and occupying a substantially the same volume, so as to enable the selection of trays to match the sliced portions.

Referring now to FIG. 306, an apparatus for shaping primal meat portions includes a container 13200 for holding the meat portion and plug 13202 designed to fit within the interior dimensions of the container. Container 13200 and plug 13202 may be manufactured by injection molding a plastics material such as nylon or alternatively a gas permeable and porous material such as a chemically foamed polypropylene or polyester plastic material. Alternatively, the container 13200 and plug 13202 may be manufactured from a stainless steel mesh. The container 13200 includes lugs 13204 and 13206 that are engaged with rails 13208 and 13210. The rails may include, for example, parallel, round, stainless steel bars, suitably mounted to a frame and conveniently spaced apart and horizontally disposed, extending for any convenient and desired length that may have bends and curves allowing for the powered or manual movement of the containers 13200 there along while maintaining engagement between the lugs 13204 and 13206 and horizontal rails 13208 and 13212. The rails may be arranged with an electrically or pneumatically powered driver to move or slide the container along the rails, to another position for further processing such as placing the plug 13214 in position by automatic or mechanical apparatus, after loading the primal. The cross section shown in FIG. 306 provides detail of the container, plug and apparatus through one cross-section only. Other views are not considered necessary since the profile of the container and plugs, across a different section may be similar, differences may only include variations in for example, the dimensions. The mechanism, container and plug may be arranged in any suitable and desired shape and size to suit the requirements for each portion of pre-rigor fresh red meat. Generally, the internal volume of an assembled container 13200 with a corresponding and matching plug 13202 in position, is approximately equal to the volume or displacement of the corresponding fresh red meat primal shown as 13216. The plug 13202 includes an upwardly turned rim 13218 around the periphery of the plug 13202. The plug 13202 can slide inside the opening of the corresponding container 13200 such that rim 13218 remains in contact with the inside surfaces of the container walls 13200. The displacement of fresh red meat primals that have been harvested from different animals will vary. Therefore, in order to accommodate the variation of fresh red meat primals, the internal volume, shown as space 13220, of the assembled container 13200 and plug 13202 can be adjusted to suit the actual displacement of the corresponding fresh red meat primal. The fresh red meat primal 13216 is located in the container 13200 and plug 13202 is located inside the upper portion of the container 13200 such that substantially all air has been excluded from the enclosed cavity between the primal 13216 and the plug 13202 by advancing the plug 13202 in a downward motion. The container 13200 is shown located in close proximity with a press base 13222, with perimeter wall 13224 to accommodate the container 13200 therein. The press base 13222 is mounted onto an elevating shaft 13226 thereby providing a means to elevate the press base 13222 so as to contact and retain the lower portion of the container 13200, and also lower the press base 13222 parallel with the center line, such that the container 13200 will be suspended on the rails 13208 and 13210 and the press base 13222 will not contact or interfere with the container 13200 and allow the container 13200 to slide freely along the length of the rails 13208 and 13210 when the press base 13222 is in a lowered position. An assembly, including an outer wall 13212 with a series of driven, concentrically mounted clamps 13228, 13230 and 13232 about a central clamp 13234, is positioned directly above and aligned with the press base 13222. The wall 13212, and clamps marked 13228, 13234, 13232 and 13230 are independently driven in a reciprocating and vertical direction, parallel with the center line. A concentric slot 13236 is provided around the perimeter of the outermost clamp 13212, such that a vacuum can be applied therein if desired. A side view of an alternative plug 13238 is shown in FIG. 307. Plug 13238 includes a substantially flat base 13240. Walls 13242 are provided around the perimeter of the base 13240, thereby providing a rim 13218.

The plug may be provided in various profiles. An alternative plug 13300 is shown in FIG. 308 with additional details shown in enlarged cross-sectional view of FIGS. 309–310. The plug 13300 includes a "rigidly" flexible, relatively shallow (shallower than the container 13200), "cup" shaped plug, with a flat or suitably profiled face 13302 to meet with the meat, and upwardly extending, flexible walls 13304 with tapering thickness, flaring outwardly and terminating at a rim 13306. The flexible walls can be provided at an angle of about 5 degrees from vertical relative to horizontal face 13302 as shown in FIG. 309. The upwardly extending walls are joined to the plug face 13302 with a suitable radius therebetween as shown. The upper rim 13306 of the plug wall is tapered to provide a thin cross-section at the outer edge of the lip and is flexible. An additional rim 13308 located on the opposite side of recess 13310 is shown, that follows a path around the perimeter of face 13302 thereby providing a recess on the underside of the plug 13300. Slots 13312 are provided through rim to a depth equal to the height of the rim such that the base of each slot is on the same plane and level with face 13302. Slots 13312 allow liquids such as liquid purge and blood to escape therethrough and then between the flexible walls of the plug and the inner surface of the container 13200. A controlled and pre-determined pressure can be applied to the plug 13602 in the direction of arrow 13604 as shown in FIG. 311 so as to cause the liquid purge to be expelled from space 13606 through sides 13608. The pressure is equal to the weight of red meat primal contained therein multiplied by a constant. The constant is determined by the type of meat being processed and could be equal to the weight of the primal, or several times the weight of the primal and is determined by customer quality requirements.

Referring again to FIG. 306, the container 13200 includes a rectangular, round or oval plan profile with a flat base 13244 and substantially vertical walls extending upwardly from the base. Junction of base 13244 with the walls 13244 may be provided by radiused portions. The two lugs 13204 and 13206 are conveniently located, one on each opposing side of the container 13200. The lugs 13204 and 13206 are provided with rounded portions to seat in rails 13208 and 13210. The consistency of container 13200 and plug 13202 is such that it will deform slightly when subjected to pressure but will return to its original shape when the pressure is released. A bevel 13246 is molded to the upper portion of container walls 13244 to provide an easy penetration by the plug 13202 into the matching opening of the corresponding container 13200, however, as the plug 13202 penetrates the container opening, the tapered disposition of the walls provides for intimate contact and sealing between the plug rim 13218 and the inner surface of the container vertical walls. The container 13200 and plug 13202, when assembled together provide an enclosed space that is substantially sealed and isolated from external atmosphere. The space has a volume that can be varied within the limitations of the container 13200, by moving the plug position, relative to the container 13200. However, the intimate contact between the plug rim 13218 and the inside surface of the container walls is maintained in a substantially "airtight" fashion.

Plug 13202 includes a "rigidly" flexible, relatively shallow cup with a flat or profiled base, and flexible walls 13218 (although as shown, walls 13218 have been inwardly flexed by container 13200) with tapering thickness and extending outwardly at an angle of about 5 degrees from vertical. The upwardly and outwardly extending walls 13218 are connected to the plug base with a radius therebetween. The upper rim of plug wall 13218 is tapered and flexible.

The profile and dimensions of the plug 13202 are arranged so as to provide an easy penetration into the matching opening of the corresponding container 13200. However as the plug 13202 penetrates the container opening 13200, the outwardly angled disposition of the walls 13218 provides for intimate contact and sealing between walls 13218 and inner surface of container vertical walls. The container 13200 and plug 13202, when assembled together, provide an enclosed space 13220 that is substantially sealed and isolated from the external atmosphere. Space 13220 has a volume that can be varied within the limitations of the container, by moving the plug position, relative to the container, within the container. In all positions, however, the intimate contact between wall 13218 and the inside surface of the container walls is maintained in a substantially "airtight" fashion.

Containers and matching plugs of different sizes and suitable profiles may be manufactured to suit various sizes of primal portions of fresh red meat, however, in each case the container and corresponding plug are sized to provide a limited but variable internal volume of space shown as 13220. Primal meat portions, of limited varying size and profile can be accommodated within the same containers provided for similar primal portions.

It should be noted that animals used as a source of primal meat portions vary in profile and size but are typically graded prior to slaughter such that the corresponding primal portions can be approximately similar.

This present invention provides for de-boning of carcasses that are still in pre-rigor mortis condition, immediately after animal slaughter and preparation while the temperature of the carcass remains close to normal body temperature. The de-boning of the carcasses at such temperatures is very much easier and provides for much more rapid completion of the de-boning process, thereby substantially reducing costs. Furthermore, pre-rigor mortis disassembly provides the opportunity to control and "mold" the primal meat portion profile such that when the primal portions are chilled, the firm, rigor mortis condition occurs after shaping within the container and plug.

More specifically, according to this present invention, the pre-rigor mortis primal meat portion, having been de-boned, is sprayed, washed or dipped into a solution of one or more of the following: carbonic acid, acetic acid, ascorbic acid, citric acid and any other suitable substance that can be used to inhibit or eliminate bacterial growth on the primal meat portion. Primal meat portion is then placed into the container 13200 of correspondingly suitable dimensions and the plug 13202 is inserted into the open end of the container 13200. The assembled container 13200, primal meat portion and plug 13202 is located with plugs engaged onto the rails 13208 and 13210 and positioned directly and in alignment above the press base 13222. The press base 13222 is elevated so as to closely retain the container 13200. Wall 13212 is lowered so as to engage past the outer surface of the upper portion of the container walls as shown in FIG. 306. Clamp 13228 is then lowered and penetrates opening of the container end with the aid of bevel 13246 engaging the radiused corner of plug 13202 and stretching the container opening outwardly thereby clamping the wall of container 13200 against the inner surface of wall 13212 and providing an airtight seal therebetween. Wall 13212 is attached to an upper plate (not shown) forming a chamber that is isolated from external air. A vacuum source is attached and air is evacuated from between clamping assembly and plug 13202. Progressively, clamp 13234 is lowered so as to compress the plug 13202 against primal, followed by clamp 13232 and 13230. However, clamps 13234, 13232 and 13230 can be activated out of sequence or from the outward clamp 13230 inward or any combination thereof. Clamps 13230, 13232 and 13234 are then in contact with the upper surface of the plug 13202 and all applying suitable pressure. The vacuum source is then disconnected, allowing atmospheric air to apply pressure to the outer surface of the plug 13202. In this manner, substantially all air can be removed from within the container assembly and the meat primal.

In one aspect, the container may include a port 13248 located on the base of the container 13200 and penetrating therethrough. The container assembly is opened by allowing compressed clean gas or clean air through port 13248. The compressed gas can then assist in the removal of the primal when desired or after the primal has been stored in the container for a desired period of time.

The container assembly can then be immersed into clean water, brine or other suitably treated, bacteria free, temperature controlled medium that is temperature controlled by refrigeration or that may be elevated to as much as about 140° F. and held for a suitable period so as to cause death of bacteria that may be present. Following the desired reduction or elevation of the primal temperature, the container assembly can be relocated within a pressure chamber and exposed to an ultra high pressure on the order of about 30,000 psi to about 100,000 psi or more. This procedure can tenderize the primal and also kill bacteria that may be present. Ultra-high pressure equipment may be similar to equipment manufactured by Flow International, Incorporated of Kent, Wash., USA.

Alternatively, sequentially or simultaneously, the container assembly can be attached to an electrical source so as to provide passing a high voltage current through the primal and thereby treat by way of "Ohmic" heating. In this manner, any bacteria that may be present with the primal can be substantially eliminated or killed.

The assembled container can then be removed from the pressure chamber and again immersed in a cooling medium when the temperature of the primal can be reduced to a desired and optimum temperature prior to removal from the container and followed by automatic slicing. In this manner, rigor mortis occurs such that the shape of the primal meat portion after cooling within the container is similar to the inner profile of the container, providing a more efficient shape for slicing with automatic slicing equipment.

4.5.2. Embodiment

In another aspect of the invention, the container 13200 may be arranged and used to process several, smaller, (thinner) fresh primals simultaneously. This can be achieved with the use of partitions or separating plates. The separating plates can be interposed between the smaller fresh primal portions in an arrangement that can include placing a first primal into the container followed by a separating plate, followed by a second primal, followed by a second separating plate, followed by a third primal, followed by a plug. Any quantity of fresh primal portions, that can fit within the container, can be processed in this manner.

FIG. 312 shows an assembly constructed according to the present invention that includes container 13400, a first 13402, second 13404 and third 13406 primal with first 13408 and second 13410 separating plates therebetween. The plug 13412 is shown in position after insertion and all air has been removed from the space between the container 13400 and the plug 13412. The assembly can then be immersed in cooling medium for further processing and chilling.

4.5.3. Embodiment

In yet another embodiment, the container 13200 may be arranged and used to process several primals simultaneously without the use of separating plates. FIG. 313 shows how this may be accomplished. A container 13502 may be loaded with a first 13504 and second 13506 tenderloin. The plug 13508 is shown in position after insertion and substantially all air has been removed from the space between the container 13502 and the plug 13508. The assembly can then be immersed in a cooling medium for further processing and chilling. This process can produce a single tenderloin of uniform profile and cross-sectional shape made from two tenderloins. The tenderloin can then be removed and sliced into slices of equal profile size and weight. Container 13502 may contain any number of suitable apertures 13510 located at the base of the container for draining blood or liquid purge or when required for opening the container 13502 and plug 13508 assembly.

Referring to FIG. 311, in yet a further embodiment, the primal meat portions can be removed from the container 13600, after chilling and rigor mortis, and sliced automatically and without separation of slices. After slicing and while still generally held together in a single item, the sliced primal meat portion can be placed into a preformed gas barrier bag and sealed therein or alternatively placed into a gas barrier packaging tray that has been automatically thermoformed, in-line on a machine such as a Multivac R530 (manufactured by Multivac Sepp Haggenmuller GmbH & Co.). The gas barrier packaging tray can be profiled and shaped so as to be similar and/or identical in internal profile to the container 13600 profile. In this manner, utilization of space and material is maximized. The gas barrier packaging tray can then be located into a vacuum chamber and a substantially gas barrier lid, that may be a skin vacuum package (otherwise known by those skilled in the arts, as SVP), and conveniently heat sealed at flanges around the cavity of the gas barrier packaging tray. A hermetically sealed primal meat portion package can be produced that contains the primal meat portion that has been conveniently sliced according to a customer specification and requirement. The vacuum or SVP packaging process, that can be automatically performed with the use of R530 can rapidly and automatically produce a plurality of the hermetically sealed primal meat portion packages that can be stored in temperature controlled storage conditions. A hermetically sealed primal meat portion package can be further processed by UHP apparatus prior to sale and delivery to customers.

4.5.4. Embodiment

Referring now to FIG. 314, an assembly is arranged to provide a desired internal profile that can be used to contain, and thereby mold, a suitable cut of meat that has been separated by cutting from an animal carcass immediately after slaughter of the animal and prior to rigor mortis of the animal carcass. FIG. 314 shows details of a molding assembly 13700, constructed from any suitable metallic or plastics material, that provides a desired internal space with a suitable profile. Assembly 13700 can be used to contain and thereby shape by molding to the profile therein, any suitably cut meat primal, that has been separated by cutting devices from an animal carcass immediately after slaughter of the animal and prior to rigor mortis of the animal carcass and primal cuts. Assembly 13700 includes a "trough" shaped member 13702 having a longitudinal base 13704 connected with two upwardly extending walls 13702 on either side of base 13704, so as to leave open two sides and the top open so as to resemble a trough. The assembly also includes a mating closure 13706 designed to be placed from above into the trough 13702 so as to resemble a container having two open and opposite ends, also referenced as 13702. Mating closure 13706 includes a shaped plate designed to form the upper surface to the container 13702. Plugs 13708 may be inserted from the open ends on either side of the container 13702. Plugs 13708 are profiled to act as "pistons" in the container conduit 13702 that is arranged by assembly of the components 13702 and 13706.

Plugs 13708 are arranged to sealingly fit, closely within the conduit. The conduit has parallel horizontally disposed walls that provide the conduit along which the plugs can be positioned at any desired location within the conduit and thereby provide a space, between plugs 13708, into which perishable item 13710 (see FIG. 315) can be located. The apparatus is arranged to be stackable and the lower, outer surface of trough member 13702 is profiled to mate with the upper external surface of member 13706 by "nesting" therewith when stacked in a vertically arranged position.

Referring now to FIG. 315, a cross section of the assembly 13700 is shown. A suitable (pre-rigor mortis) primal cut of meat 13710, such as a New York Strip primal, can be placed in container 13702, with plugs 13708 positioned, one at each end of primal, to provide a defined space with primal located therein. Member 13706 can be mated with trough member 13702 and closed so as to contact plugs 13708. Members 13702 and 13706 can be fixed in position relative to each other and plugs 13708 can be moved, by mechanical powered devices and under pressure toward each other so as to compress item 13710 to the extent required that will cause item 13710 to adopt a profile identical to the internal profile of the space defined by members 13702 and 13706 and plugs 13708. Assembly including members 13702 and 13706, and plugs 13708 with item 13710 contained therein can be fixed in place by to a finished configuration and stacked with other similar assemblies, such as on any suitable pallet. Pallet with assemblies stacked thereon, can then be re-located into a temperature controlled chamber. Temperature controlled chamber can be set at any suitable temperature that may be elevated up to not more than about 140° F. for a selected period of time after which the temperature may be gradually reduced to about 29.5° F. Item 13710 will therefore cool and rigor mortis will cause "setting" of the profile of item 13710. Item 13710 can then be removed from molding assembly 13700 and sliced. Slicing can be conducted automatically while located inside an oxygen free chamber and with carbon dioxide or any other suitable gas or blend of gases provided at any suitable pressure, present therein. A plurality of profiles of the containers and plugs that facilitate an adjustable volume feature can be provided in order to provide for all primal shapes and sizes. For example about 80 different containers and plugs would be required to accommodate all of the various shapes of primal meat portions that are typically produced in the disassembly of a single beef cow.

In another aspect, smaller portions of pre-rigor boneless meat, such as beef, can be placed into the container assembly and processed therein in the manner described above that will result in smaller pieces of pre-rigor boneless meat adhering together to form a single piece that can then be sliced into consumer desirable slices. Pre-rigor boneless beef may include portions of fat and muscle tissue that can be placed into the container, prior to processing, in any desired arrangement such that after processing, the single piece of meat will have a similar appearance to a primal such as a New York strip. In this way, less valuable smaller pieces of boneless beef can be used to produced larger and more valuable primal cuts of beef.

4.5.5. Embodiment

Referring now to FIG. 316, a mold 13800 for forming pre-rigor mortis meat is illustrated. Pre-rigor mortis meat is moldable to form any of a variety of desired shapes by placing quantities of harvested pre-rigor meat into any one of a plurality of mold forms. In one actual embodiment shown in FIG. 316, a mold 13800 is shaped in an elongated form. The mold 13800 can be constructed of suitable materials, some of which can be advantageously permeable to ozone or any other suitable gas or substance. The mold 13800 has four walls 13802, 13804, 13806 and 13808. The bottom wall 13806 of the mold 13800 can be configured to be angled or arcuate such as the base shown in FIG. 318. However, any mold can be provided with a bottom wall suitably configured to the shape of any of the trays herein disclosed. A mold so shaped enables slicing of the meat into portions of similar size and weight, which can conform to the finished tray to utilize the space within the tray in the most efficient manner. In this way substantially identical slices of meat can be produced with virtually no trimming requirement. Whenever trimming is required, a loss is incurred since the portions trimmed off can only be used in a product, such as grinds, of lower value than the sliced meat. Substantially similar slices of beef can be sold in packages of "same weight and same price", which is a suitable supermarket strategy as opposed to randomly priced packages that have individual package price determined by random weight due to inconsistent size and weight of each slice of fresh meat contained in a single package. Referring again to FIG. 316, two walls 13804 and 13808 of the four walls form the vertical walls of the mold 13800. The vertical walls 13804 and 13808 can be inclined or reclined to match the configuration of any packaging tray walls. The mold 13800 includes a top wall 13802 connecting the two vertical walls 13804 and 13808 at a upper portion thereof. The mold 13800 also includes a bottom wall 13806 connecting the vertical walls 13804 and 13808 at a lower portion thereof. Thusly formed, the mold 13800 resembles a hollow tube with a cross-section shape shown in FIG. 318. Although an irregular shaped polygon is shown as a profile shape, the shape of the mold can be any suitable shape to resemble a tray's dimensions. The bottom wall 13806 can be shaped to substantially conform to the tray base as described above. The mold 13800 includes openings formed on opposite ends of the mold thereof. A lip 13810 is formed within a short distance inward from a first opening of the mold 13800. A plug 13812 fits within the opening and is constrained to move toward the opening by the lip 13810. A second plug 13814 is inserted in the mold 13800 from the opposite opening. The second plug 13814 can be pressed to form the meat to a shape substantially resembling the mold 13800. A chip 13816 or proximity switch can be embedded within the plugs to determine the distance from the first plug to the second plug. In this manner, the correct size of the meat portions can be determined. Once the pressing operation is completed, the shaped meat 13818 can be sliced automatically or manually to suit the size of the finished trays. In this manner, two dimensions are kept constant which will consistently provide meat portions of constant size and weight that can fit within the trays, while advantageously only varying one dimension, which will most preferably be the length of the molded portion. The shaped meat can contain an area of fat 13820.

In another alternate, the mold is provided with a port for injecting desirable concentrations of gases or for evacuating undesirable constituents, which can include gases or liquids.

A chip 13816 or proximity switch can be embedded within the plugs to determine the distance from the first plug to the second plug. In this manner, the correct size of the meat portions can be determined. Once the pressing operation is completed, the shaped meat 13818 can be sliced automatically or manually to suit the size of the finished trays. In this manner, two dimensions are kept constant which will consistently provide meat portions of constant size and weight that can fit within the trays, while advantageously only varying one dimension, which will often be the length of the molded portion. The shaped meat can contain an area of fat 13820.

In another alternate, the mold is provided with a port for injecting desirable concentrations of gases or for evacuating undesirable constituents, which can include gases or liquids.

4.5.6. Embodiment

In one aspect, for example, fat and muscle tissue contained in a quantity of boneless beef can be separated into a first quantity and a second quantity where the first quantity includes substantially muscle tissue which is then ground or cut into suitably sized pieces and then transferred directly into a vessel containing a suitable oxygen free gas and held at a temperature of 140° F. for a period of time sufficient to substantially kill any bacteria contained therein. The second quantity including substantially fat can be transferred into a second vessel and subjected to ultra high pressure (UHP), exceeding 80,000 psi, so as to substantially kill all bacteria contained therein while maintaining the second quantity of fat at a temperature of not more than 104° F. The first quantity of muscle tissue can be chilled to a temperature below 100° F. and processed by extrusion to provide a first continuous stream of muscle tissue with a desired cross-sectional profile that can be arranged to be similar to the profile of the muscle component of a typical New York strip. The second quantity of fat can be chilled to a temperature below 100° F. and extruded to provide a second stream of fat with a profile similar to the fat component of a New York strip. The first stream of profiled muscle tissue and the second stream of profiled fat can be then be combined into a single stream of muscle tissue and fat and the temperature of the single stream be reduced to about 29.5° F. In this way, a substantially bacteria free, continuous stream of extruded muscle and fat having a cross-sectional profile similar to a New York strip can be produced which can then be sliced into suitable portions prior to retail packaging.

In this way, ground meat (and other meats) can be processed so as to substantially prevent the formation of oxymyoglobin immediately after grinding. The ground meat can then be retail packaged in a low oxygen package such as a master package system as described herein and delivered to the point of sale in a de-oxymyoglobin condition. The package can be removed from the de-oxymyoglobin condition immediately prior to retail display so as to allow generation of the consumer appealing red color or "bloom" for the first time after grinding.

4.6. Continuous Blending

It is one aspect of the present invention to arrange one or more grinders and blenders in a continuous fashion to thereby provide a manner of continuously grinding and blending one or a plurality of beef streams of singular or varying fat content to arrive at a homogenized product from the one or more streams being blended together. Measuring devices are used in order to control the flow rate of grinds through the blenders or mixers.

In another aspect of the invention, animal fat such as beef fat may be ground in any suitable manner such that the ground animal (or vegetable) fat is then cooked and rendered to reduce the amount of fat to leave a residual crispy and flavorful residue. This flavorful residue can be transferred into a third or fourth stream such that a measured quantity of the flavorful residue is blended into fresh, partially cooked or fully cooked beef grinds that is provided in streams of low fat content beef grinds. In this way beef patties can be subsequently manufactured with a low fat content but, nevertheless, having a flavorful and appealing taste that would otherwise only be obtained with a relatively high fat content.

4.6.1. Embodiment

Unlike conventional processing, which does not undergo continuous blending, the method in accordance with the present invention can produce a product having the desired fat to lean ratio in a specified production amount. This is because of an aspect of the invention which provides streams having a high fat and a low fat content, wherein the streams are being continually controlled to have a desired fat content as one or both streams of high or low fat content streams are fed to the continuous blender. Thus, the present invention can achieve a specified production amount, while at the same time having the desired fat to lean content.

FIG. 319 shows a plan view of a system apparatus showing grinding, measuring and blending equipment arranged with two grinding machines 13900 and 13902 that can grind and transfer meat directly into conduits 13904 and 13906 respectively. Boneless meat 13908 and 13910 is loaded into grinders 13900 and 13902, respectively. The fat content of boneless meat 13908 and 13910 is arranged such that the fat content is relatively high in one stream of meat and relatively low in the other stream of meat. Fat analyzing or measuring devices 13912 and 13914, such as Epsilon-GMS 40 measuring equipment is installed so as to continuously measure grind streams in conduits 13904 and 13906, respectively. Any suitable gas such as carbon dioxide, in measured amounts may be injected into conduits 13916 and 13906 immediately downstream from grinders 13900 and 13902. Grinders 13900 and 13902 can be provided with variable speed drive motors such as servo motors and in such a manner so as to provide an adjustable velocity of ground meat produced by each grinder, and transferred through conduits 13904 and 13906. Conduits 13904 and 13906 are connected together at a confluence 13922 and the combined streams are transferred directly into conduit 13924. Referring to FIGS. 288 and 319, conduit 13924 is arranged with a continuous blender 11902 housing an adjustable speed, servo driven screw 11904 therein, such that the combined streams of grinds are transferred directly into and directly out of continuous blender 11902. Continuous blender 11902 can be any continuous blending device herein described. In one aspect, continuous blender 11902 is the blender shown in FIG. 288. Fat measuring devices 13912 and 13914 are arranged to enable adjustment of the velocity of streams in conduits 13904 and 13906 respectively, according to the fat content of each stream and in such a way as to produce a single stream in conduit 13924 having a substantially consistent fat content. The speed of rotation of screw 11904 in FIG. 288 can be varied by adjusting the speed of the driving servo motor so as to provide a variable pumping action to grinds transferred there through. The combined volume or quantity of grinds streams transferred through conduits 13904 and 13906 will be equal to the quantity of grinds transferred through conduit 13924 and blender 11902, however, the servo drive to blender 11902 will be adjusted according to the servo drive speeds of grinders 13918 and 13920 in such a manner that it will compensate for any variation in the combined output of grinds transferred through conduits 13904 and 13906. In this way, the effect of the pumping action of screw 11904 on the velocity and volume of grinds while contained within conduits 13916 and 13906 will be minimized. For example, if the fat content of the grinds stream in conduit 13916 elevates such that it is necessary to reduce the volume transferred there through the combined quantity of grinds transferred from conduits 13916 and 13906 into conduit 13924 will reduce and therefore the pumping action of screw 11904 can be correspondingly reduced so as to ensure that the velocity of the stream in conduit 13916 is not adversely affected. Any selected gas injected into conduits 13916 and 13906 will be provided in precisely measured quantities such that such injection will not affect the velocity of the respective streams. In one instance, a gas such as carbon dioxide that will dissolve into liquids in the stream of grinds is suitably provided. Alternatively no gas at all will be injected and all gases will be substantially excluded from the streams in conduits 13916, 13906 and 13924. In this way, the velocity and volume of grinds transferred through each conduit will be precisely according to the adjusted speed of each servo motor arranged to drive the grinders 13918 and 13920 which shall be substantially equal to the volume of grinds transferred through conduit 13924 by the correspondingly adjusted speed of the servo drive to screw 11904.

4.6.2. Embodiment

In one aspect of the invention, a means of diverting a quantity of grinds is provided. Referring now to FIG. 320, a cross section through a device 13926 is shown. In one aspect, device 13926 is integrated into the equipment as shown in FIG. 319 and is intended to provide a means of compensating for excessive quantities of fat that may be transferred through conduit 13906 from time to time. In the event, that fat measuring device 13914 measures a quantity of grinds, 13928, that contains an unacceptably high ratio of a component such as fat, such quantity of grinds can be temporarily diverted away from the stream transferred through conduit 13904 and stored in conduit 13930. Quantity of grinds 13928 is drawn into conduit 13930 by the withdrawing action of piston 13932 shown by arrow 13934. As grinds 13928 are temporarily removed into conduit 13930 it can be measured by measuring device 13936 and this information can be retained. Grinds can be returned to the mainstream of grinds in conduit 13916 at a suitable time which may be by gradual return of piston 13932 at a controlled rate so as to gradually combine grinds 13928 with grinds 13938. Such devices as shown in FIG. 320 may be integrated into the blending equipment as desired to provide for withdrawal of any identified quantity of grinds that does not meet the required specification and then gradually returned to the mainstream 13938 as required, thereby ultimately providing for improved blending quality of the finished and blended stream of grinds in conduit 13924 downstream from blender 11902.

4.6.3. Embodiment

Referring now to FIG. 321, a plan view of an apparatus for blending grinds according to the present invention is shown. Two streams of beef represented by arrows 14000 and 14002 are transferred into conduits 14004 and 14006, respectively. Suitable pumps, such as variable speed, servo driven, positive displacement pumps 14008 and 14010 are arranged to pump streams of grinds 14000 and 14002 through conduits 14004 and 14006, respectively. Fat measuring devices 14012 and 14014, such as the Epsilon GMS 40, are arranged to continuously measure the streams of grinds 14000 and 14002, downstream from each pump 14008 and 14010, respectively. The velocity of streams 14000 and 14002 are adjusted by adjusting the servo drive to each pump 14008 and 14010, respectively. Conduits 14004 and 14006 are joined at confluence 14016 and a single stream of grinds 14018, having a volume and rate of flow equal to the combined streams 14000 and 14002 is transferred into conduit 14020 at confluence 14016. A suitable sized pump, such as variable speed, servo driven, positive displacement pump is arranged to pump grinds transferred into conduit 14020 at a rate equal to the combined rate of flow of both streams 14000 and 14002.

4.6.4. Embodiment

Referring now to FIG. 322, an assembly of an apparatus used in the practice of the present invention is shown in plan view. One embodiment of the invention shows three streams of boneless meat 14100, 14102 and 14104, being transferred into vessels 14106, 14108 and 14110 respectively. Vessels 14106, 14108 and 14110 are arranged to operate in a manner described in association with FIG. 271. However, alternative meat pumps such as Model Marlen OPTI-Series, available from Marlen Research Corporation of 9202 Barton Street Overland Park, Kans. 66214–1721, can be used. In either case, three streams of boneless beef are provided in conduits 14112, 14114 and 14116, with fat measuring devices 14118, 14120 and 14122, provided thereon. Fat measuring devices are described herein. The velocity of each stream of boneless meat, is varied according to fat content provided by the fat measuring devices 14118, 14120 and 14122. The signal generated by fat measuring devices 14118, 14120 and 14122 are sent to a central processing unit (CPU) which may process the information and send a control signal to one a plurality of variable speed pumps 14124, 14126 and 14128 to control the desired flow rate of streams in conduits 14112, 14114 and 14116. The streams 14100, 14102 and 14104 are transferred into a single conduit 14130 with screw pumping means therein. A fourth measuring device 14132, such as a GMS measuring device, is provided to measure the single stream of boneless beef. The combined streams 14100, 14102 and 14104 of boneless beef are extruded via a die 14134, as a single stream at 14134 having a rectangular cross sectional profile. The single stream is transferred directly into a gas barrier plastic tube of material such as a multi-layer heat sealable flexible web as may be supplied by Curwood, Inc., Wisconsin, which is fabricated from roll 14136 of a continuous web of such packaging material. The extruded section of boneless meat, is transversely cut by knife at 14131, into portions 14138, of approximately 30–60 pounds each. However, it is to be appreciated that portions of any weight can be provided by the present invention. The range described herein being merely illustrative of several embodiments.

In the practice of the invention, the streams of beef 14100, 14102 and 14104 can be provided in a substantially enclosed conduit with any suitable gas provided therein. Similarly, any processing equipment, such as vessels 14106, 14108 and 14110, pumps 14124, 14126 and 14128, measuring devices 14118, 14120, 14122 and 14132, blender 14130, die 14134, packaging 14134 and tube 14136 and any adjoining conduit is substantially kept in a suitable gas environment, such as carbon dioxide, so the beef is continually exposed to the suitable gas, and the exposure of the beef to oxygen is minimized. Plastic tube 14140, is then sealed, and severed, enclosing each 60 pound portion of meat 14142. $CO_2$ gas retained within the sealed package, will then dissolve forming a pack that resembles a vacuum pack. Each 60 pound portion may then be packaged in a carton and transferred into storage, in readiness for shipping for example, from an Australian meat packing plant, to a processor in the USA. In one aspect, the fat content can be provided on an RF tag that is attached to a package containing the 60 pound portion. However, it is possible that portions can be stored individually in cartons, where each carton includes a unique identifying mark, such as a 2-D bar code and the collection of cartons mounted on a single pallet can include the RF tag with the information relating to each of the individual cartons being contained therein. Because the unique identifying marks can be recorded along with the weight of the portion, and any other information, the RF tag can include the whole of the information relating to any and all cartons on a single pallet.

In another aspect of the present invention, the apparatus depicted in FIG. 322, can be implemented with a single stream of beef. Thus, for example, equipment designated as 14106, 14124, 14112, 14118, 14110, 14128, 14116 and 14122 can be eliminated. It is to be appreciated that although this equipment may go unused, it may still be physically present, in the case where it is desired to be used. Alternatively, equipment required to produce only a single stream of beef may be provided. The operation of the equipment therefore proceeds with a single stream of beef 14102, for example. This may be advantageous under certain conditions. For example, it may be advantageous if the amount of fat or the variable that is sought to be controlled is not of particular concern. Measuring and recording the actual fat content however can be undertaken, is so desired. In another example, the stream being provided into a single stream has an substantially unvarying fat content or measured variable and therefore the need for adjusting the fat content is unnecessary.

In one aspect of the invention, the invention provides removes substantially all oxygen (either ambient atmospheric or otherwise) from contact with the beef.

In yet another aspect of the present invention, the single or multiple streams of fresh beef can be sanitized by processing with an additive supplied by a corporation know as Mionics, in an enclosed conduit, directly upstream and immediately prior to the screw pumping means. The Mionics process sanitizes fresh meat by, among other effects, adjusting the pH level of the meat. The Mionics Company is based in Sacramento, Calif.

In a further aspect of the present invention, two or more streams of boneless beef (meat with carbon dioxide gas substantially filling any voids therein) is pumped under a suitable pressure by any pump herein disclosed and measured for fat content, by an AVS x-ray device in each stream and the velocity and quantity (for example mass flow) of each stream is then adjusted according to the fat content by the variable speed pump. In some instances, the mass flow can be adjusted based on variables besides fat content, such as water or protein contained in the beef. The two or more streams are combined, under conditions which do not include grinding, into a single stream. In this manner, the combined stream may be transferred directly into an enclosed vessel, substantially filled with carbon dioxide, or any other suitable gas composition, wherein a sanitizing agent can be applied, with a measure quantity of water. Following this sanitizing step, the combined stream can be either coarse ground or left as is, and then, in a single stream transferred via a profiled conduit and transferred to a further AVS x-ray (or equivalent device) to measure the fat content (or water or protein) and the stream can be divided. In one instance, the profiled extruded stream can be cut into sections of boneless beef, for example weighing about 60 pounds, which are then packaged into any suitable package wherein each package has an RF tag (or equivalent identifying means such as a barcode) attached which contains information including the measured fat and lean content of the section of boneless beef.

In a further aspect, the sections may be frozen or chilled and transferred to another location where the blocks are further arranged and/or processed into streams of beef according to the fat content (or water or protein), which is known by reading the information contained in the RF tag. The streams are then pumped and measured by AVS x-ray means (or equivalent) and combined in any desired manner to arrive at a desired fat content. In some instances, the streams can be combined prior to fine grinding or other further processing.

In yet another aspect of the present invention, the apparatus can suitably be joined to a rotating carousel packaging apparatus as described below. In this manner, a continuous packaging system is provided for the production of beef packages that are substantially kept from exposure to oxygen.

Referring now to FIG. 323, one aspect of a packaging apparatus that can be integrated with the equipment shown in FIG. 322 is shown. In this aspect of the invention, a rotating carousel 14200 is provided. The rotating carousel 14200, includes a plurality of loading assemblies, designated as 14202, 14204, 14206 and 14208, wherein the number of loading assemblies dictates the number of operational stations, wherein a certain loading operation is carried out at each of the operational stations. It should be readily appreciated that any number of loading assemblies can be used to practice the present invention, the number shown being merely illustrative of one embodiment. Referring to FIG. 323, the carousel 14200 includes a centrally disposed header 14210. Header 14210, in turn, is connected to a series of first 14212, 14214, 14216 and 14218 and second 14220, 14222, 14224 and 14226 headers, which are in turn connected to loading assembly loading connectors 14228, 14230, 14232 and 14234. Loading connectors 14228, 14230, 14232 and 14234 are provided with loading apertures 14236, 14238, 14240 and 14242 disposed at a central location, which is interposed between each set of the first and the second headers. Loading assemblies 14202, 14204, 14206 and 14208 are connected to a central frame 14244. Central frame

14244 supports the central header 14210, which together with the loading assemblies rotate as an assembly in the direction of the arrow designated as 14246.

Referring now to FIG. 324, wherein a single loading assembly is shown, each loading assembly includes a frame 14300, suitably sized to hold any container, such as a pouch 14302, therein. The frame 14300 is connected to a rotating carousel 14200 (see FIG. 323) in any suitable fashion. Frame 14300 is constructed from four walls of similar sized dimensions so as to form a box-like container. In one instance, frame 14300, is constructed from four posts, disposed to form the corners of the box. Slats 14304 are then connected to two of the four corner posts for rigidity. A holder for a pallet 14302 can suitably be constructed within the frame 14300, so that the entire frame 14300 and pallet 14306, together rotate as one assembly. Pallet 14306 can hold the weight of a fully loaded pouch 14302. Frame 14300 can have a gate, so as to open thus allowing pallet 14306 and pouch 14302 therein to be removed as a unit. In addition, pallet may be molded with features or otherwise provided with features that allow the stacking of one pallet with pouch atop another. While reference has been made to a particular frame construction, any suitable frame designed to provide support for a container, such as a pouch, can be used to practice the present invention, the particular frame being described herein, being illustrative of one embodiment. In one embodiment, the container is a pouch which can be provided by the Scholle Company of Chicago, Ill. Suitably, the pouch is made to include barrier materials as herein described. Referring still to FIG. 324, the loading assembly includes the loading connector 14308, described in detail below.

Referring now to FIG. 325, one embodiment of a loading connector 14400 is illustrated. A loading connector, such as connector 14400, is used in one instance, to attach a fill spout 14402 to the opening of any suitable container, such as a pouch 14404. Fill spout 144023 can be any conduit which provides a load of processed beef according to the invention. As an example, fill spout 14402 can be connected to the die 14134 in FIG. 322. However, any other supply of beef or beef product can be directed to the fill spout 14402 of FIG. 325. The fill spout 14402 includes a purge conduit 14406. Purge conduit 14406 can be used to expel any undesirable gas from within the interior of conduit 14402 in the manner described below.

A loading connector 14400 includes a fill aperture 14408, which is shown as being attached to the fill spout 14402. Means for attaching the fill spout to the fill aperture can include, but is not limited to any suitable fastener, such as a snap-on connector fitted with a seal to prevent the escape of gasses in between the interior edge of the fill aperture and the exterior diameter of the fill spout. Such a snap connector can be fitted with a groove in either the connector upper member 14410 or the fill spout 14402 and a ring located in either in the interior of the fill aperture 14408 or on the fill spout 14410. In one aspect a valve can be provided on the end of the fill spout 14410 or as an integral part of a fitting hermetically sealed to the pouch. Upper member 14410 perimeter is surrounded by downwardly extending walls 14412 about the periphery of member 14410. Exterior surfaces of walls 14412 may be provided with a lip to more securely attach the opening of pouch 14404. In addition, any other retention means that can be included to steadfastly hold the opening of pouch 14404 to the exterior surface of walls 14412 should be considered as part of the present disclosure. In one particular embodiment, a collar 14414 is provided that can securely clamp the pouch 14404 to the exterior surfaces of the walls 14412, and thus to the loading connector 14400. However, it is to be appreciated that any suitable means for attaching a pouch 14404 to a fill spout 14402 can be used in the practice of the present invention. The means herein disclosed being merely illustrative of several embodiments.

The upper side of member 14410 includes a first 14416 and a second 14418 header connected in a manner so as to provide for communication from either the first or the second header, 14416 and 14418, respectively, into the interior of the pouch 14404. In one aspect, header 14416 can be used to provide any desirable gas in the direction as indicated by arrow 14420, and header 14418 can be use to evacuate any gas from pouch 14404 therefrom in the direction of arrow 14422. In this way, gas can be injected into pouch via 14416 and evacuated via 14408 and thereby ensuring that the pouch is suitably inflated prior to filling while flushing any undesirable gasses from the pouch. A desired gas pressure can also be maintained within the pouch during the loading process, and if so desired a source of vacuum can be connected to the filled pouch so as to evacuate the pouch to a selected vacuum level that removes some or up to all gas from any free voids within the pouch.

Referring still to FIG. 325, the connector assembly 14400 includes a first 14424, and second 14426 clamping bar. Clamping bars 14424 and 14426 are positioned oppositely of connector assembly 14400. In this manner, once pouch 14404 has been attached to connector assembly 14400, clamping bars 14426 and 14424 can be actuated to approach pouch 14404 on opposite sides thereof. The length of clamping bars can be adjusted depending on the width of the mouth opening of the pouch 14404. In this manner, a seal can be produced that extends the width of the pouch opening. Clamping bars 14424 and 14426 can be mounted to a pneumatically or, hydraulically actuated arm to move toward each other in the manner described above. Clamping bars 14424 and 14426 include a heating element 14428 and 14430, respectively. Heating elements 14428 and 14430 are placed on a side of clamping bars 14424 and 14426, such that heating elements 14430 and 14428 will be in touching proximity of the pouch 14404, when clamps are actuated to clamp about the pouch opening. In this manner, pouch 14404 can be hermetically heat sealed by providing any suitable heat sealable material as part of the interior of the pouch 14404.

Referring again to FIG. 323, one embodiment of how the invention may be practiced with the packaging carousel 14200 will now be described. Generally, the number of stations will correspond to the number of loading assemblies. In the presently described apparatus, packaging carousel 14200 is designed to include four stations. At a first station, generally denoted by reference numeral 14202, an empty frame, also referenced by number 14202, sits idle, ready to accept a pallet being loaded from the direction of arrow 14248. In this station, frame 14202 is empty and does not contain a pouch. Carousel 14200 rotates to a second station, generally denoted by reference numeral 14204. In station 14204, an operator 14250 can place a pouch of any suitable size within frame and attach the connector assembly 14230 in any suitable manner to the pouch opening. While the operation of loading pouches is described as a manual operation, it is foreseeable that this operation can be automated so as to eliminate any human activity. As can be seen in FIG. 323, and as more thoroughly discussed above, a connector assembly 14232 is connected via headers 14224 and 14216 to a central header. 14210. Headers 14224 and 14216, as well as header 14210 can include valves positioned at any location to accomplish purging and evacuation of the pouch. However, in other embodiments, the purge header of each loading assembly can be attached to a separate header while the evacuate headers can be attached to an evacuate header. While reference is made to single central header which can be both a purge and an evacuate header, it should be readily apparent that other configurations, including multiple headers and valves can likewise be used to practice the present invention. At the second station 14204, the purge operation, in one embodiment, proceeds in the following manner. While some steps may be indicated as occurring before certain other steps, it is to be appreciated that the steps may proceed in any manner to functionally accomplish purging any spaces in the fill spout 14252 and pouch with any suitable gas. In one embodiment, a valve on purge header 14214 can be closed and a valve on evacuation header 14210 can be opened to introduce any suitable gas into the pouch at any suitable pressure when central header is connected to a source of gas. Once a suitable pressure is reached, the valve on purge header 14222 is closed and the valve on evacuate header 14214 is opened. In one embodiment, the central header 14210 may now be connected to a vacuum source to draw the purge gas from within the pouch and into the central header 14210, if desired. Once a suitable vacuum level or gas pressure is reached the valve on evacuate header can be closed. This sequence may be repeated for any number of cycles until it is deemed that the pouch has been evacuated of substantially all oxygen. However, in another aspect, valve on purge header 14222 can be opened and valve on evacuate conduit 14214 can be opened simultaneously. In this manner, a continuous stream of suitable gas flushes the interior of the pouch. Flushing takes place for a suitable time to adequately reduce the level of oxygen within the interior of pouch to an acceptable level. In this instance, it is apparent that both headers 14222 and 14224 cannot be lined to the central header, and therefore two central headers or more are required. Once it is determined that pouch contains substantially little to no oxygen, valve on conduit 14222 and valve on conduit 14214 are closed. Valve on conduit 14222 is then opened to expand pouch to substantially fill the interior volume of the frame. In this manner, pouch is made ready to accept beef therein.

Once operator 14250 has completed the pouch purging operation, loading assembly is ready to move to a third station generally denoted by numeral 14206. At station 14206, a fill spout 14252 is connected to loading assembly 14232. Fill spout 14252, as well as any headers can include any number of valves to accomplish purging and evacuation of any dead spaces with the fill spout 14252, such as could occur when loading is stopped.

In one embodiment, fill spout 14252 is provided with two valves. First valve 14254 is located a distance from the connector 14232. Second valve (not shown) is provided at the loading connector 14232. Initially both the first and the second valves on fill spout 14252 are closed. One or more purge valves 14244 are provided on the fill spout 14252. In this manner, any dead spaces between the first and the second valves can be purged of undesirable gasses, such as oxygen, and replaced with any suitable gas. Once dead spaces have been purged and flushed with a desirable gas in fill spout 14252, valve 14254 can be opened to allow the introduction of processed beef into the pre-inflated pouch. In some instances, the pouches can contain in excess of 1000 kilograms or greater.

In one aspect of the invention, frame 14206 can be mounted on load cells to continuously measure the amount of beef loaded within pouch, and valve 14254 can be automated to close when a specific quantity is reached. Furthermore, any of the gas purging and evacuating operations may be carried out automatically with the aid of pneumatically actuated valves. In this manner, continuous loading and packaging of processed beef into pouches can be realized.

In one aspect of the invention, the weight can be recorded on any suitable device, such as an RF tag, wherein the RF tag can be attached at any suitable location on the pouch. When the pouch has reached its predetermined load weight, the pouch can be sealed by the clamping bars 14424 and 14426 (shown in FIG. 325), followed by hermetic sealing of the pouch 14404 with heat seal bars 14430 and 14428. When the sealing is completed, carousel 14200 is readied for the fourth station.

Referring again to FIG. 323, at fourth station 14208, connector 14234 can be unclamped from pouch opening. Pouch sits on pallet, and therefore pallet with pouch can be carted away while frame remains with the carousel assembly, ready to begin the cycle anew. Loading assembly now moves to station 14202, ready to receive a pallet. In this manner, a filled pouch and pallet can be carried away simultaneously.

In one aspect of the invention, the packaging carousel 14200 depicted in FIG. 323, can be attached to the system shown in FIG. 322. For example, the fill spout 14402 can be connected downstream of blender 14130. In another aspect of the invention, fill spout 14402 can be connected downstream after measuring device 14132. However, in another alternate embodiment, fill spout 14402 can be located downstream of extruder 14134.

The present invention, thus, can provide for a substantially oxygen free environment to load 500–1000 kg capacity pouches in one aspect. Pouches are supplied by the Scholle Company of Chicago, Ill. Suitable pouches useful in the practice of the present invention include, but are not limited to any corner fin sealed box-like pouches having a square or rectangular cross section, that are supplied by the Scholle Company. However, in one embodiment of the invention, the pouches suitable to use with the present invention can include openings in both the upper and lower sides. In this manner, the upper opening is more suitably configured to be a loading opening and the lower opening is more apt to be a unload opening. Opening can be about 5 to 8 inches. However, it is apparent that other opening dimensions are suitable, the ones given here being merely illustrative of several embodiments. Pouch materials may include any number of suitable barrier materials including, but not limited to, any heavy gauge foil composites, or other equally suitable barrier and non-barrier materials. The barrier materials can be adjusted for any particular application. For example, barrier materials can be selected to achieve any required shelf life that is deemed to be appropriate under particular circumstances.

In another aspect of the present invention, a single sealable or re-sealable opening can be attached directly to the pouch so as to allow the filling of the pouch with emulsified meat or combinations of meat and vegetable matter and/or soups for human or animal consumption. After loading the pouch the sealable opening can be hermetically sealed and the pouch shipped to a customers location where the contents of the pouch can be pumped directly from the pouch via the sealable opening.

In one aspect of the invention, the pouches can be heat sealed by providing a heat sealable material on the interior of the pouch. In this manner, the pouch can be suitably be constructed through the use of fin seals where two adjoining panels are required, for example, at the corners of the pouch. However, it is to be appreciated that other methods of sealing pouches may be used in practicing the present invention.

4.6.5. Embodiment

A method according to the present invention includes grinding boneless beef directly into an enclosed chamber that has been filled with a suitable gas such as $CO_2$ and which substantially excludes oxygen from contacting with said ground beef. Adjusting temperature of said ground beef to a suitable temperature. Processing and mixing ground beef (meat), in a vessel or series of vessels substantially excluding oxygen, so as to blend and adjust the relative quantities of fat and muscle in the finished product to a desired ratio can take place, while maintaining the ground beef at a suitable temperature. The ground beef can then be extruded in a stream of grinds by pumping through an enclosed conduit with an exit end and a selected cross sectional area and profile that is substantially similar to a typical beef pattie, at a velocity that is adjustable while maintaining pumping at a substantially constant rate. The stream of ground beef can be pressurized in a conduit at a selected pressure and compressing any voids such that $CO_2$ gas contained therein dissolves into the stream of ground beef, while continuing to maintain ground beef at a suitable temperature. The velocity of the stream of grinds can be adjusted so as to intermittently slow or stop it's flow as it emerges from the exit end of the enclosing conduit and allow slicing with knife means to provide single beef patties in stacks of a chosen quantity. Intermittent slowing or stopping of flow may exceed 500 cycles per minute. The processed meat is interfaced with a packaging system which packages the fresh meat patties without exposure to air while continuing to maintain at a suitable temperature.

Furthermore, the present invention can also provide for a method of compensating for surge in the blending process. For example, surge can be eliminated by excluding any gas in the meat streams, but ground meat is elastic and can continue flowing at a rate exceeding the pumping velocity after the pump has been slowed or stopped. Alternatively, when the pumping velocity is accelerated, the actual velocity may lag momentarily. The above has an effect on blending accuracy, particularly, when the on-line fat, water & protein measuring device is located upstream from the continuous blender. As the meat streams (two or more) emerge from their respective conduits directly into the blending conduit the fat, water and protein (fat and lean) content of each stream determines the velocity of the respective streams. The fat and lean content is measured upstream therefore there is a set distance (measured) between the point of measuring and the point of transfer from the conduit to the blender. The pumping speed therefore must be adjusted by amount to compensate for this surge. This amount can be determined experimentally for the type of beef and the particular apparatus.

Referring now to FIG. 326, a schematic illustration of system apparatus is shown. In one section of the apparatus, sources of meat 14500, 14502 and 14504 are transferred to meat coarse grinders 14506, 14508 and 14510. A suitable supplier for meat grinders is the Weiler Company, Inc. of Whitewater, Wis. The meat grinders are connected to downstream pre-blending and transfer equipment 14512, 14514 and 14516, which may include screw and/or belt conveyers and pumps as the transfer equipment. The pre-blending and transfer equipment may be supplied by the Weiler Co. and the continuous blending equipment supplied by Case Ready Solutions, LLC of Mercer Island, Wash. The pre-blending equipment is connected to on-line measuring devices 14518, 14520 and 14522, respectively, for measuring the amount of fat to lean meat ratio. Suitable measuring devices for practicing the present invention are herein described. The measuring devices can be supplied by Safeline AVS, Inc. Safeline Business Center, 6005 Benjamin Road, Tampa Fla. or Epsilon Industrial of Austin Tex. The transfer equipment includes positive displacement pumps supplied by the Weiler Company. Downstream from the measuring devices, the meat is transferred to continuous blending equipment 14524 where the meat is blended in a controlled or modified atmosphere, which substantially excludes oxygen. At this point, one or a plurality of meat streams can be fed into the blending equipment to provide for meat grinds of a desired constituency of fat and lean meat, therefore the continuous blending equipment includes a product entry port for one or a plurality of meat streams. The continuous blending equipment is supplied by Case Ready Solutions, LLC. While a continuous blending process is provided for consistency and efficiency, the ground meat can be fed in batches with holding vessels interspersed throughout the process, the meat can then transferred to one or more vessels 14526, 14528, 14530 and 14532 for temporary storage. One vessel 14534 may serve for rejects or off spec product and occasionally grinds may be erroneously produced that do not meet a particular required specification. A fat measuring device 14536, such as the GMS equipment, may be located downstream of the continuous blender and with such an arrangement it would be possible to detect any off spec product immediately. In such an instance the off spec product would be immediately transferred into a silo such as 14534 and held, under a selected gas until a further use for the off spec grinds could be determined. In such a situation an enclosed transfer conduit (not shown) can be installed between silo 14534 and, for example pre-blender 14514 and any off spec material could be gradually blended into a subsequent quantity of specified grinds in such a manner so that the grinds produced are within specification and the off spec material has not been wasted.

Referring again to FIG. 326, continuous blending equipment 14524 can be horizontally disposed and elevated to provide for a gravity feeding arrangement alternately and to either of vessels 14526, 14528, 14530 and 14532. A quantity of any specified blend of fat and lean grinds, sufficient to fill a vessel is produced followed by a quantity of another specified blend of fat and lean grinds, sufficient to fill a second vessel. Vessels can be supplied by Weiler and Company. Blended grinds are transferred from each vessel by suitable conveying and transfer equipment such as positive displacement pumps to meat portioners 14538, 14540, 14542 and 14544, where the meat is extruded and sliced into desired portions by size or weight. Feeding may be continuous or in batches as required. The packaging section of the plant includes a conveyor system 14546, 14548, 14550 and 14552 for moving unfinished webs through stations, where webs are finished into trays and loaded with goods, such as portioned meats. After the goods have been loaded into trays, the trays are sealed by a second web, such as may be provided with the Hayssen model RT1800, designated 14554 and 14556, with the modifications described herein above. Alternatively, trays such as are described herein above, may be loaded with goods and then sealed by a second web, wherein apparatus as disclosed herein below in association with FIG. 148 can be integrated into the system layout. Further packaging may include loading into master containers, depending on the circumstances and palletizing, according to a buyer's specifications. The processing of the ground meat is conducted in a controlled or modified atmosphere having little to no exposure to oxygen. In one aspect, temperature control by injection of carbon dioxide can be adjusted to between about 29° to about 38° F., the pressure is held to less than about 40 psi, in the continuous blending equipment and vessels but the pressure is kept to less than about 10 psi elsewhere throughout the equipment. Suitable gases are described in the specification. The equipment is wholly or semi automated and controlled by a computer 14558, such as equipment supplied by the Wenger Co. The computer can be connected to one or more buyer computers via a communication system, such as the Internet, for automatically receiving and filling orders from buyers, such as supermarkets.

4.6.6. Embodiment

Referring to FIG. 327, one aspect of a process flow diagram for handling off spec product according to the present invention is illustrated. Pre-blenders 14600 and 14602 are fed perishable product by streams 14604 and 14606, continuously or intermittently with coarsely or finely ground product, such as meat. Streams 14604 and 14606 contain two differing levels of fat or other measured variable which is desirable to control. Measuring devices 14608 and 14610 which suitably measure product flowrate and fat or lean muscle content of the streams 14612 and 14614 are located on the exit streams 14612 and 14614 from pre-blenders 14600 and 14602, respectively. Pumps (not shown) may be controlled to adjust the flowrate of product leaving one or both of pre-blenders 14600 or 14602 based on fat or lean tissue content of product leaving pre-blenders 14600 or 14602 or based upon a desired flowrate. Pumps may also be controlled according to the measurements taken by measuring device 14616. In general, control algorithms for controlling a measurable characteristic, such as fat, at 14618 by controlling a controlled variable, such as flowrate, is calculated by knowing the measured variable at 14620 and 14622. The desired measured variable at 14618 will lie in between the range of 14620 and 14622. By then controlling the flowrate of 14620 or 14622, the measured variable at 14618 can be controlled at any desired point between the two extremes. For instance, if the measured fat content at 14616 is higher than the desired content, the flowrate to one or both pre-blenders may be adjusted so that the fat content of stream 14618 leaving continuous blender 14624 is within a suitable limit. Either increasing the flowrate of the low fat stream or decreasing the flowrate of the high fat stream can lower the fat content of stream 14618. Suitably, any number of pumps may be located before or after pre-blenders 14600 and 14602 or continuous blender 14624 to provide for propulsion of product through lines interconnecting equipment. Such pumps may be of conventional design. Product streams 14620 and 14622 undergo continuous blending at 14624 by a suitable blender as described herein. Although not all equipment herein described is designated a blender, it is to be appreciated that any rotating or moving equipment will impart some form of blending to beef. While not the most efficient, any rotating equipment not specifically designated as a blender, in contact with beef is herein also understood to be a blender. The exit stream 14618 of the continuous blender 14624 is fitted with a measuring device 14616 to suitably measure the flowrate and the fat or the lean content of product stream 14618. In general, measuring devices 14608, 14610 and 14616 may include flow measuring and fat/lean tissue content measuring in a single apparatus or it may include two distinct apparatus. Measuring device 14616 can also be used to feedback information that is used in controlling the flowrate of one or both of the feed streams 14620 and 14622 coming from pre-blenders 14600 and 14602, respectively, as a feedback component to a proportional plus reset controller. If it is determined that the product leaving the continuous blender 14624 is not within the tolerance limits of a product specification, a suitable programmable logic controller (PLC) or other logic controller, such as any computer, may automatically divert off-spec product at 14626 to vessel 14628. Product 14618 is diverted to vessel 14628 until product leaving continuous blending 14624 is again within desirable specifications, at which time product 14618 may again be diverted to any number of storage vessels. The addition of an off-spec storage vessel, such as 14628, and a third measuring device 14616, optionally can eliminate the need to have any surge vessels between pre-blenders and continuous blender and thus provides a continuous blending operation. Off-spec product in vessel 14628 may then be pumped to one or both pre-blenders 14600 or 14602 or directly into continuous blender 14624 via a separate line. While two pre-blenders 14600 and 14602 are shown, it should be readily understood that more or less pre-blenders can be used to feed a continuous blender 14624. Suitably, one or more continuous blenders, such as 14624 can also be employed in the present invention. Pre-blenders and continuous blenders are described herein. Any number of storage vessels 14630, 14632, 14634 and 14636 can be provided to store product produced according to any desirable specification, such as fat or lean tissue content. Any number of valves (not shown) can be provided in the lines from measuring device 14616 to any of the storage vessels to automatically divert the product to one of the storage vessels. Alternatively, lining up a storage vessel from the continuous blender may be may accomplished manually. Storage vessels 14630, 14632, 14634 and 14636 may be equipped with load cells or measuring devices to determine when a pre-determined amount of product has been produced. For instance, it is possible that one vessel may be dedicated to a particular customer order, the order being for any number of pounds of product with a specified fat content. When the customer order is filled, any number of valves may automatically divert product to fill a second customer order in a second vessel. Having once filled a particular buyer order, vessels can begin to take product until the product is within the specifications of the new order at which time, valves will be lined up to a vessel that will exclusively contain beef to the second buyer specifications.

4.6.7. Embodiment

Referring now to FIG. 328, a system apparatus for the packaging of meat is illustrated. The system includes three sources of webs 14700, 14702, and 14704, for processing into finished trays. A web treatment assembly includes magazines 14706, 14708 and 14710 containing the webs, gas treatment and sterilizing equipment, and bonding equipment to produce the finished trays from the webs. Under some circumstances, bonding equipment may not be necessary for non-bonded trays which can be produced by using pre-form webs not requiring bonding as herein disclosed. There can be one or a plurality of unfinished web streams, which can produce finished webs of differing sizes as required. In one instance, the equipment 14706, 14708 and 14710 can be supplied by Case Ready Solutions, LLC, with adhesives supplied, in one instance, by Case Ready Solutions. The tray assemblies 14706, 14708 and 14710 are linked to conveyor and transfer equipment which moves individual finished trays along a conveyor 147012, 14714 and 14716, while meat grinding, portioning and loading apparatus 14718, 14720 and 14722 processes the meat stored in vessels 14724, 14726 and 14728 which is then loaded as goods into the finished trays. The webs or trays may be exposed to a source of UVC light or other suitable sanitizing and sterilizing means prior to bonding so that substantially all surface are sterilized prior to loading with goods. The trays can then be weighed and labeled with a bar code containing relevant information at stations 14730, 14732 and 14734. The weighing and labeling equipment can be supplied, in one instance, by Herbert Industrial of Haverhill, Suffolk, UK. The trays with goods are then sealed with any suitable web of lidding material at stations 14736, 14738 and 14740. The finished packages continue to travel on conveyors where the packages can be directed to a stacking apparatus 14742, such as drop loaders, supplied, in one instance, by PMI Cartoning, Inc. At the stacking apparatus 14742, further equipment can produce thermoformed cartons. Thermoforming equipment 14744 can be supplied, in one instance, by Cott Technologies Inc. of La Puente, Calif. The finished packages can then be loaded and stacked into the newly thermoformed cartons. The auto carton equipment can be supplied, in one instance, by PMI Cartoning, Inc. The cartons are then palletized in palletizing equipment 14746 and made ready for shipment to a buyer's designated delivery destination. For the majority of the meat processing, the meat is excluded from substantial contact with oxygen to minimize oxidation. Therefore desirable concentrations of gases are continually being used to pad processing equipment. This equipment and gas can be supplied, in one instance, by the BOC Gases company. Other equipment is developed to remove undesirable gases by using vacuum equipment. Equipment can be supplied, in one instance, by Case Ready Solutions, LLC. While three differing webs for trays may be provided at the loading station, each master container is provided with a manner of identifying an allocated destination. The master containers are palletized to ship where they are needed by the buyer or alternatively may be placed in storage. The computer controller is provided with a set of instructions to manage, in cooperation with the input provided for by an operator interface, the processing and packaging of the meat goods, including information received via the Internet.

4.6.8. Embodiment

Referring now to FIG. 329, a schematic illustration of web treatment and welding equipment is shown. In one embodiment, the equipment includes tray loading magazines 14800 and gas exchange magazines and chambers 14802. A nitrogen gas generator 14804 is provided to pad the chambers 14802 containing the trays and the tray magazines, providing an inert environment to substantially exclude oxygen. The nitrogen generating equipment can be supplied by the BOC company. The trays travel on a delivery conveyor to an adhesive applicator and bonding equipment 14806, where the trays are formed from webs and then bonded to produce the finished trays. Folding and bonding apparatus are described herein. In one aspect, the adhesive applicator and bonding equipment can be supplied by Case Ready Solutions, LLC. Under some circumstances, the trays can be formed without bonding, such as from the pre-form web with tabs on the foldable flaps. The finished webs are then delivered where needed on the meat processing assembly by a delivery conveyor 14808. The equipment assembly for finishing trays is controlled by controller computer 14810. The computer 14810 can be integrated with other sections of the plant to provide for just in time delivery of finished webs, real time control of beef and beef products as required by buyer specifications received via the Internet.

4.6.9. Embodiment

Referring now to FIG. 296, a schematic illustration of an embodiment of a system apparatus according to the present invention comprising an automated system of pre-treating packaging components and perishable goods such as ground meats is shown. The arrangement as shown includes four production lines for the portioning, loading, over-wrapping and assembly of barrier master container packages. Four empty tray conveyors are shown as 14900. Trays are transferred along conveyors 14900 to transverse conveyors 14902, 14904, 14906 and 14908. A continuous mixer 14910 is arranged to deposit selected ground beef into any one of four silos 14912, 14914, 14916 and 14918. Each of silos 14912, 14914, 14916 and 14918 is arranged with a positive displacement pump attached thereto such that ground meat can be pumped via conduits (not shown) from silo 14912 to fine grinder 14920, from silo 14914 to fine grinder 14922, from silo 14916 to fine grinder 14924, and from silo 14918 to fine grinder 14916. A dump silo 14928 is provided such that any quantities of material that are determined to be unsuitable for packaging can be transferred therein. Fine grinders 14920, 14922, 14924 and 14926 are attached respectively to portioning equipment 14930, 14932, 14934 and 14936. Empty trays transferred along conveyors 14900 are loaded with ground meat portions from portioner 14930 at conveyor 14902, from portioner 14932 at conveyor, 14904, from portioner 14934 at conveyor 14906, and from portioner 14926 at conveyor 14908. Conveyors transfer loaded trays from each loading conveyor 14902, 14904, 14906 and 14908 to weighing scales 14940, 14942, 14944 and 14946, respectively. Labels with weight and product information as required, are applied to the bottom of loaded trays, by bottom label applicators 14948, 14950, 14952 and 14954, respectively. Loaded trays are then over wrapped by packaging apparatus 14956, 14957, 14958 and 14960, respectively. Automatic stackers 14962, 14964, 14966 and 14968 stack selected groups of loaded over wrapped trays which are then transferred and automatically loaded by automatic loaders 14970, 14972, 14974 and 14976, into gas barrier containers formed in line on horizontal thermoforming machine 14978. Conveyors transfer trays from the flow packers to the automatic stackers. An automatic carton erection apparatus 14980 is arranged to enclose each barrier master container in a carton, which is then transferred to an exit conveyor 14982. A central control panel 14984 is located conveniently to allow control of the complete system via a computer. In one aspect, the computer is readily configured to the Internet. In this manner, the equipment can be directed in the most cost efficient manner to complete an order according to the buyer specifications. Continuous blender 14910 and silos 14912, 14914, 14916 and 14918 may be located in an adjacent room separated by an insulated wall such that the contents of the silos can be maintained at a selected temperature which maybe 34° F., in one instance.

4.6.10. Embodiment

Referring now to FIG. 331, a plan view of one embodiment of a system apparatus is shown, including ground meat processing, blending equipment and packaging. The equipment shown in FIG. 331 is represented by diagrammatic sketches and is integrated such that ground beef processed by the equipment shown can be transferred directly from grinders 15000, 15002 and 15004 into oxygen free vessels shown as 15008, 15010 and 15012, respectively.

The TABLE set out below provides a list of equipment shown in FIG. 331.

| ID | Item |
|---|---|
| 15000 | Grinder |
| 15002 | Grinder |
| 15004 | Grinder |
| 15006 | Grinder (Fine) |
| 15008 | Vessel + Mix |
| 15010 | Vessel + Mix |
| 15012 | Vessel + Mix |
| 15014 | Vessel/Hopper |
| 15016 | Vessel/Hopper |
| 15018 | Vessel/Hopper |
| 15020 | Positive displ. pump |
| 15022 | Positive displ. pump |
| 15024 | Positive displ. pump |
| 15026 | Positive displ. pump |
| 15028 | Measure fat/lean |
| 15030 | Measure fat/lean |
| 15032 | Measure fat/lean |
| 15034 | Continuous blending |
| 15036 | Control Panel |
| 15038 | Valve (diversion) |
| 15040 | Elevator |
| 15042 | Elevator |
| 15044 | Discharge Ports |
| 15046 | Discharge Ports |
| 15048 | Discharge Port |
| 15050 | Tray Magazine |
| 15052 | Gas Exchange |
| 15054 | Tray Welding/Bonding |
| 15056 | Grinds Portioning machine |
| 15058 | RT 1800 Packaging Machine |
| 15060 | Horizontal Vacuum Packaging |

Boneless beef with a suitable fat/lean composition is loaded into grinders 15000, 15002 and 15004, herein described. Ground beef is produced by grinders 15000, 15002 and 15004 and transferred directly into enclosed vessels 15008, 15010 and 15012, herein described, that are otherwise filled with a suitable gas at a suitable pressure.

Vessels 15008, 15010 and 15012 can be fitted with blending apparatus so as to blend grinds therein. Positive displacement pumps 15020, 15022 and 15024 pump quantities of grinds, in three respectively separate streams from vessels 15008, 15010 and 15012 directly into continuous blender 15034. The quantity of grinds pumped by the positive displacement pumps in the separate streams is controlled and dictated by the measured fat and lean content of each stream of grinds as measured by devices 15020, 15022 and 15024. Fat and lean content of each stream of grinds is measured by measuring devices shown as 15028, 15030 and 15032. However, in other aspects of the invention, one or more streams generating from vessels 15008, 15010 and 15012 are not required to have measuring devices in association therewith. This is because one or more streams emerging from vessels 15008, 15010 and 15012 may be from a supply with known or substantially unvarying composition of fat to lean tissue. In one aspect, one or more of streams can be from livers, for example, when used in connection with providing pet food as described herein. In this instance, the known content of fat or lean or other suitable variable can be accounted for without continuously measuring the content of the stream. This is taken into account when adjusting or controlling streams whose fat or lean tissue content is not known or can vary substantially. Continuous blender 15034 terminates at positive displacement pump 15024 and blended grinds are transferred directly from 15034 into 15024. Pump 15024 can transfer the blended grinds in a single continuous stream into either vessel 15018 or vessel 15016. A measuring device can continuously measure the fat and lean content being provided by continuous blender 15034 and can be programmed to divert a stream of blended beef that is outside of the specifications into a holding vessel, which may be reprocessed further by diverting the out of spec stream to the entrance of the continuous blender 15034.

Grinds can be stored in vessels 15016 and 15018 as may be required and wherein grinds may be maintained at any suitable temperature. The grinds can be diverted into one or more vessels by the diverting valve 15038. The grinding, pumping, measuring and blending apparatus can be arranged so as to produce a single stream of grinds by combining three separate streams into a single stream in continuous blender 15034. The single continuous stream of blended grinds can be produced according to a specification such as 85% lean and 15% fat. Alternatively, single stream of blended grinds can be produced according to any other desired specification such as 90% lean and 10% fat. In this way, two separate quantities of specified grinds can be stored with one in each of vessels 15016 and 15018. For example, a quantity of 85% lean and 15% fat grinds can be stored in vessel 15016 and a quantity of 90% lean and 10% fat grinds can be stored in vessel 15016. Suitable positive displacement pumps can be arranged to transfer specified quantities of grinds from either or both vessels 15016 and 15018 for separate or combined grinding in a fine grinder 15006. Any suitable number of pumps can be arranged to transfer grinds from either of the vessels 15016 and 15018 for further blending and/or grinding and subsequent retail packaging in packaging machine shown as 15058. If required, suitable blending equipment can be provided for blending of any suitable number of additional pairs of streams of grinds, in selected quantities, after pumping from vessels 15016 and 15018 to produce specified quantities of blended grinds that can then be fine ground prior to retail packaging.

In this way, ground meat can be processed and packaged while being contained within a series of vessels and tubes that are filled with ground meat and suitable gas that substantially excludes oxygen and any other undesirable gas and/or material. Therefore, formation of oxymyoglobin on substantially all freshly cut meat surfaces can be inhibited until after packaging and immediately prior to retail display or other desired use.

4.6.11. embodiment

Referring now to FIG. 332, a plan view of another production plant layout is detailed including production and packaging equipment.

In one embodiment, items of equipment in the TABLE below are included.

TABLE 3

| Item # | Production Equipment | | Packaging equipment |
|---|---|---|---|
| 15100 | Grinding machine | 15160 | Conveyor belts |
| 15102 | Grinding machine | 15130, 15132, 15134 | Ground beef portioning machines |
| 15104 | Grinding machine | 15136, 15138, 15140 | Over wrapping packaging machines |
| 15106 | Ground beef processing machine | 15154, 15156, 15158 | Foam tray erecting machines |
| 15108 | Ground beef processing machine | 15124, 15126, 15128 | Chub/vacuum packaging machine |

TABLE 3-continued

| Item # | Production Equipment | Packaging equipment |
|---|---|---|
| 15110 | Ground beef processing machine | |
| 15112 | Ground beef Injector | |
| 15114 | Ground beef Injector | |
| 15116 | Ground beef Injector | |
| 15118 | Multi-tube combining die | |
| 15120 | Electron beam sterilizer or other similar such as X-ray or Gamma ray and/or grinder | |
| 15122 | Ground beef processing machine | |
| 15142 | Gas blower with heat exchanger. | |
| 15144 | Ground beef Injector | |
| 15146 | Vane pump | |
| 15148 | Pump | |
| 15150 | Pump | |
| 15152 | Pump | |

In one aspect, the equipment shown in FIG. 332, and listed above, is arranged to continuously produce and retail package, case ready ground meats. Quantities of specified boneless beef raw materials are processed by grinding machines 15100, 15102 and 15104 to produce grinds that are transferred directly into ground beef processing machines 15106, 15108 and 15110 via corresponding subassemblies 15112, 15114 and 15116. Each grinder processes a quantity of specified boneless beef raw materials each of which may be selected from the following table of raw materials Item 1 through Item 5, but is not so limited to those shown. It is appreciated that any stream of beef containing any percentage of fat tissue may be processed according to the present invention.

TABLE 4

| Item | Muscle Tissue | Fat Tissue |
|---|---|---|
| 1 | 93% | 7% |
| 2 | 90% | 10% |
| 3 | 75% | 25% |
| 4 | 65% | 35% |
| 5 | 50% | 50% |

Equipment shown as vessels 15106, 15108 and 15110 is arranged to process grinds as above described apparatus shown in FIG. 265. Grinds are injected into vessels from the grinders 15100, 15102 and 15104 by subassemblies 15112, 15114 and 15116 which are arranged to operate as the above described apparatus shown in FIG. 276. Conditioned grinds are transferred in a single continuous stream from each vessel, by a pump from vessels into transfer tubes which are then combined at confluence 15118 into a single tube. Confluence 15118 includes a manifold as the above described apparatus shown in FIG. 275.

The fat content of the continuous streams of grinds is continuously measured by measuring devices. The fat content of the grinds can be continuously measured before injection into the vessels 15106, 15108 and 15110 and immediately after transfer from the same vessels and into the transfer tubes. By measuring the fat content and automatically adjusting the flow rate of each stream of grinds, directly and according to the measured fat content, prior to combining the streams of grinds, a combined stream of grinds with consistent fat content can be produced leaving confluence 15118. The combined stream is then transferred via a tube into a single grinder shown as 15120 and blender 15122. An electron beam generator of suitable capacity may be integrated such that the combined stream of grinds passes therethrough prior to injection directly into vessel 15122. Vessel 15122 may be arranged to process grinds as the above described apparatus shown in FIG. 265. A single stream of conditioned grinds is then transferred into a single tube that is divided into any number of separate streams of grinds.

In one instance, for example, the plant includes three packaging systems and a single supply stream of grinds is transferred to each of the packaging systems. One stream can be directed to "chub/vacuum" packaging machine 15160. Apparatus constructed according to the present invention includes three packaging machines 15124, 15126 and 15128, and a single stream of grinds to each of three portioning machines, shown as 15130, 15132 and 15134, respectively. Portions of grinds are then retail packaged by automatic loading into trays which are then over wrapped by packaging machines shown as 15136, 15138 and 15140. While, an embodiment has been described and shown to include three processing trains, any suitable number of processing trains may be used in accordance with the present invention, which may include more or less than the three trains herein described.

The equipment as described herein may be arranged to automatically produce any quantities of coarse or fine grinds according to any specifications. The following TABLE 5 shows the specified muscle and fat tissue content of three types of fine beef grinds that can be produced according to the present invention. However, it is apparent that streams containing any percentage of fat can be made according to the present invention.

TABLE 5

| Item | Muscle Tissue | Fat Tissue |
|---|---|---|
| 1F | 90% | 10% |
| 2F | 75% | 25% |
| 3F | 65% | 35% |

Equipment as described herein may be arranged to grind, measure, condition, blend, process and package specified portions of grinds according to any suitable size by automatically computer controller. The computer controller may continuously provide production information including such data as the total fat and muscle tissue content of each and all streams of grinds during the processing. In this way, a method to improve efficiency and reduce total losses is provided by producing grinds to meet precise specifications according to, for example, the list of fine beef grinds shown above.

4.6.12. Embodiment

Referring now to FIG. 334, another aspect of a production plant layout including ground meat processing and blending equipment and a controlled atmosphere retail packaging plant layout including packaging equipment is shown. The present invention provides for a method of grinding meats directly into an oxygen free vessel or hopper and then blend and process the ground meat as described herein. The present invention also provides a method of saturating the liquids, water and oils in the ground meats with a suitable gas or substance such as carbon dioxide, provided at a suitable pressure, to such a level that when removed from the processing equipment the ground meat will emit a suitable gas such as carbon dioxide.

Items of equipment shown in FIG. 334 that are identified by numbers listed in the following TABLE:

| Item # | FIG. 334 Production Equipment |
|---|---|
| 15206 | Conveyor (with variable speed control) |
| 15208 | Conveyor (with variable speed control) |
| 15210 | Conveyor (with variable speed control) |
| 15218 | Conveyor (with variable speed control) |
| 15220 | Conveyor (with variable speed control) |
| 15222 | Conveyor (with variable speed control) |
| 15234 | Conveyor (with variable speed control) |
| 15236 | Conveyor (with variable speed control) |
| 15230 | Ultra violet sterilization equipment |
| 15232 | Ultra violet sterilization equipment |
| 15238 | Grinding machine |
| 15240 | Grinding machine |
| 15300 | Grinding machine |
| 15304 | Grinding machine |
| 15308 | Grinding machine |
| 15246 | Tube connection |
| 15250 | Tube connection |
| 15248 | Ground beef hopper |
| 15252 | Ground beef hopper |
| 15258 | Ground beef hopper |
| 15264 | Ground beef hopper |
| 15256 | Statiflo blender |
| 15262 | Statiflo blender |
| 15290 | Statiflo blender |
| 15292 | Statiflo blender |
| 15294 | Statiflo blender |
| 15296 | Gas injection ports. |
| 15254 | Positive displacement pump |
| 152152 | Positive displacement pump |
| 15266 | Positive displacement pump |
| 15268 | Positive displacement pump |
| 15270 | Positive displacement pump |
| 15272 | Positive displacement pump |
| 15274 | Positive displacement pump |
| 15276 | Positive displacement pump |
| 15278 | Epsilon GMS-40 |
| 15284 | Epsilon GMS-40 |
| 15280 | Epsilon GMS-40 |
| 15286 | Epsilon GMS-40 |
| 15282 | Epsilon GMS-40 |
| 15288 | Epsilon GMS-40 |
| | Electron beam sterilizer and/or grinder |

The equipment shown in FIG. 334 is listed above and is arranged to automatically and continuously produce selected grades of retail packaged, case ready ground meats. The ground meats may include quantities of muscle and fat tissue such as shown in the following TABLE 7, where item 1F includes ground meat with about 90% muscle tissue and about 10% fat tissue, with a muscle to fat tissue variation within about +/−0.2%. The packaging equipment shown in FIG. 334 can be arranged so that the packaging machine 15200 will produce CAP case ready packages containing ground meats according to a specification equivalent to item 1F. Similarly, packaging machine 15202 can produce CAP case ready packages containing ground meats according to a specification equivalent to item 2F and packaging machine 15204 can produce CAP case ready packages containing ground meats according to a specification equivalent to item 3F in TABLE 7. However, it is apparent that ground meats of any muscle and fat tissue can be produced according to the present invention.

TABLE 7

| Item | Muscle Tissue | Fat Tissue | Muscle/Fat Tissue Variation |
|---|---|---|---|
| 1F | 90% | 10% | +/− 0.2% muscle content |
| 2F | 85% | 15% | +/− 0.2% muscle content |
| 3F | 80% | 20% | +/− 0.2% muscle content |

Referring now to FIG. 334, variable speed conveyors 15206, 15208 and 15210 are arranged in close and parallel proximity such that each conveyor can carry specified quantities of selected boneless beef. In this way conveyor 15206 can be arranged to carry specified quantities of raw material, which may be boneless beef selected from the chart shown below, in a direction indicated by arrow 15212, conveyor 15208 can be arranged to carry specified quantities of selected boneless beef in a direction indicated by arrow 15214 and conveyor 15110 can be arranged to carry specified quantities of selected boneless beef in a direction indicated by arrow 15116. The specified quantities of selected boneless beef can be varied between the conveyors marked 15106, 15108 and 15110 such that 15106 carries selected boneless beef shown as 1X, in TABLE 8, conveyor 15108 carries selected boneless beef shown as 3X and conveyor 15110 also carries the selected boneless beef shown as 3X.

Variable speed conveyors 15118, 15120 and 15122 are arranged in close and parallel proximity such that each conveyor can carry specified quantities of selected boneless beef. In this way, conveyor 15218 can be arranged to carry specified quantities of raw material, which may be boneless beef selected from TABLE 8, in a direction indicated by arrow 15224, conveyor 15220 can be arranged to carry specified quantities of selected boneless beef in a direction indicated by arrow 15226 and conveyor 15222 can be arranged to carry specified quantities of selected boneless beef in a direction indicated by arrow 15228. The specified quantities of selected boneless beef can be varied between the conveyors marked 15218, 15220 and 15222 such that conveyor 15218 carries boneless beef shown as 1X in TABLE 8, conveyor 15220 carries boneless beef shown as 2X and conveyor 15222 carries boneless beef shown as 3X.

TABLE 8

| Item | Muscle Tissue | Fat Tissue | Muscle/Fat Tissue Variation |
|---|---|---|---|
| 1X | 99% | 1% | + 1%/− 3% muscle content |
| 2X | 93% | 7% | +/− 3% muscle content |
| 3X | 75% | 25% | +/− 3% muscle content |

The variable speed conveyors 15206, 15208 and 15210 can be arranged in close and parallel proximity and located inside an ultra violet light (UV) tunnel shown as 15230 in FIG. 334. Tunnel 15230 can be arranged so as to expose any of the selected boneless beef to sufficient UV light so as to substantially sterilize the surfaces of the boneless beef. A suitable device of turning and/or rotating the boneless beef can be provided in the tunnel, so as to ensure that substantially all external surfaces of the boneless beef are exposed to the UV light to ensure the sterilization of the surfaces. Similarly, the variable speed conveyors 15218, 15220 and 15222 can be arranged in close and parallel proximity and located inside an ultra violet light (UV) tunnel shown as 15232 in FIG. 334. Tunnel 15232 can be arranged so as to expose any of the selected boneless beef to sufficient UV light so as to substantially sterilize the surfaces of the boneless beef. A suitable method of turning and/or rotating the boneless beef can be provided in the tunnel, so as to ensure that substantially all external surfaces of the boneless beef are exposed to UV light to ensure sterilization of surfaces.

The variable speed conveyors 15206, 15208, 15210, 15218, 15220 and 15222 can be provided with independent drivers and arranged to pass through a tunnel with a device to independently measure the fat and muscle content of the boneless beef carried on each individual and separate conveyor. Any suitable method of measuring the fat and muscle content of the boneless beef may be integrated with the conveyors 15206, 15208, 15210, 15218, 15220 and 15222 so as to provide a method of separate and continuous measurement of the fat and muscle content of the boneless beef separately carried on each conveyor. In one aspect, the variable speed conveyors 15206, 15208 and 15210 can be arranged to converge and deposit the boneless beef, carried by each independent conveyor onto a conveniently located secondary conveyor shown as 15234. Similarly, the variable speed conveyors 15218, 15220 and 15222 can be arranged to converge and deposit the boneless beef, carried by each independent conveyor onto a conveniently located secondary conveyor shown as 15236. The speed of each conveyor 15206, 15208, 15210, 15218, 15220 and 15222 can be varied in direct relationship to the variation of measured fat and muscle content of the boneless beef carried by each conveyor.

The length of the variable speed conveyors 15206, 15208, 15210, 15218, 15220 and 15222 can be extended so as to allow operators, such as carcass disassembly workers, to deposit the boneless beef raw material thereon immediately after disassembly and separation from an animal carcass source of the boneless beef. Furthermore, the carcass disassembly workers can, for example adjust the fat content of boneless beef that is deposited onto each of the conveyors 15206, 15208, 15210, 15218, 15220 and 15222 according to requirements. More specifically, if it is determined by the fat measuring device that a reduced quantity of fat and an increased relative quantity of muscle (lean) tissue is required on any particular conveyor, this can be accommodated. Conversely, if it is required to deposit an increased relative quantity of muscle tissue onto any particular conveyor, this also, can be accommodated. In this way, the fat and lean content of the boneless beef that is deposited onto each of the individual conveyors can be adjusted to suit requirements which can be determined by the fat content measurement through which each of the conveyors can be arranged to pass. Boneless beef can be deposited onto variable speed conveyors 15206, 15208 and 15210 according to requirements and by varying the speed of each conveyor and therefore the quantity of boneless beef carried and deposited onto conveyor 15234, a combined stream of boneless beef including fat and muscle tissue with a desired and constant relative ratio can be produced and carried on the conveyor 15234. Similarly, with variable speed conveyors 15218, 15220, 15222, boneless beef can be deposited onto each conveyor according to requirements and by varying the speed of each conveyor and therefore the quantity of boneless beef carried and deposited onto conveyor 15236, a combined stream of boneless beef, carried on conveyor 15236 and including fat and muscle tissue with a desired and constant relative ratio, can be produced and carried on the conveyor 15236.

Referring again to FIG. 334 and in particular to conveyor 15234, it can be seen that boneless beef carried on 15234 will be carried and deposited into meat grinder 15238. Similarly, it can be seen that boneless beef carried on conveyor 15236 will be carried and deposited into meat grinder 15240. By adjusting the ratio of fat and muscle content of boneless beef carried on each conveyor 15206, 15208 and 15210 and adjusting the speed and therefore the volume of boneless beef carried on each conveyor, a single stream, indicated as stream 15242, of boneless beef including fat and muscle tissue of a desired ratio can be provided and carried forward on conveyor 15234. Similarly, by adjusting the ratio of fat and muscle content of boneless beef carried on each conveyor 15218, 15220 and 15222 and adjusting the speed and therefore the volume of boneless beef carried on each conveyor 15218, 15220 and 15222, a single stream, indicated as stream 15244, of boneless beef including fat and muscle tissue of a desired ratio can be provided and carried forward on conveyor 15236.

In one instance, boneless beef stream 15242 may include boneless beef with a fat and muscle content of about 95% lean muscle and about 5% fat with a fat content variation of about +/−0.3%. In one instance, boneless beef stream 15244 may include boneless beef with a fat and muscle content of about 80% lean muscle and about 20% fat with a fat content variation of about +/−0.3%. However, it is apparent that streams 15242 and 15244 can be produced that have any amount of fat and lean tissue to suit the particular needs.

Boneless beef stream 15242 is carried forward by conveyor 15234 and deposited into grinder 15238. Conveyor 15234 and grinder 15238 may be enclosed inside a substantially sealed outer covering with a suitable gas such as nitrogen contained therein in such a manner so as to substantially exclude ambient air from presence therein. The boneless beef carried in stream 15242 is ground in the grinder 15238 and transferred through tube 15246 and into hopper 15248. It can also be seen that the boneless beef stream 15244 is carried forward by conveyor 15236 and deposited into grinder 15240. The conveyor 15236 and grinder 15240 may also be enclosed inside a substantially sealed outer covering with a suitable gas such as nitrogen contained therein in such a manner so as to substantially exclude ambient air from presence therein. The boneless beef carried in 15244 is ground in grinder 15240 and transferred through tube 15250 and into hopper 15252.

Stream 15242 of ground beef is then transferred by a pump, such as a positive displacement pump 15254, from hopper 15248 into and through static blending tube 15256 and into hopper 15258. Stream 15244 of ground beef is then transferred by a pump, such as a positive displacement pump 15260, from hopper 15252 into and through static blending tube 15262 and into hopper 15264. In one instance, positive displacement pumps 15254 and 15260 can be fitted with variable speed drivers. Hoppers 15258 and 15264 can be substantially filled with a suitable gas such as carbon dioxide or any other suitable substance, and both hoppers 15258 and 15264 are arranged to have an adequate capacity to accommodate any quantity variations in normal production of boneless beef that may result from any variable requirement.

Hopper 15258 is connected with three positive displacement pumps shown as 15266, 15268 and 15270. Any number of pumps may be provided and connected to hopper 15258. Similarly, hopper 15264 is connected with three positive displacement pumps shown as 15272, 15274 and 15276. Any number of pumps may be provided and connected to hopper 15264. Each of the positive displacement pumps shown as 15266, 15268 and 15270 can be fitted with suitable, independently controlled, variable speed drivers such that any required quantity of ground boneless beef contained in hopper 15258 can be pumped therefrom at a desired velocity, and through a measuring device, such as the Epsilon GMS-40 shown as 15278, 15280 and 15282. Similarly, each of the positive displacement pumps shown as 15272, 15274 and 15276 can be fitted with suitable independently controlled, variable speed drivers such that any required quantity of ground boneless beef contained in hopper 15264 can be pumped therefrom and through a measuring device, such as the Epsilon GMS-40 shown as 15284, 15286 and 15288.

The Epsilon GMS-40-40 Meat Analyzer is a fat measuring device and is commercially available from Epsilon Industrial, 2215 Grand Avenue Parkway, Austin, Tex. 78728. Specifications for the GMS-40 are available from this supplier and information is also available from their web site at www.epsilon-gms.com. While this component is specified herein, other suitable fat measuring devices can be used as an alternate for fat and/or muscle content measurement.

As can be seen in FIG. 334, Epsilon GMS-40 measuring devices shown as 15278 and 15284 are attached directly to junction box 15279, Epsilon GMS-40 measuring devices shown as 15280 and 15286 are attached directly to junction box 15281 and Epsilon GMS-40 measuring devices shown as 15282 and 15288 are attached directly to junction box 15283. A junction box according to the invention is a confluence joining one or more streams. Suitably sized tubes connect pumps directly to corresponding Epsilon measuring devices as shown. The fat content of ground beef that is pumped by pump 15266 through the connecting tube and directly through Epsilon GMS-40 measuring device 15278, is measured by device 15278. The fat content of ground beef that is pumped by pump 15272 through the connecting tube and directly through Epsilon GMS-40 measuring device 15284, is measured by device 15284. The ratio and percentage quantity of fat in each separate stream of ground beef pumped by pumps 15266 and 15272 can therefore be measured and compared and the pumping rate of pumps 15266 and 15272 can be automatically adjusted according to the respective fat content of each stream of ground beef so as to provide a single stream of ground beef, after combining in junction box 15279, with a desired fat content. In this way selected quantities of boneless ground beef can be pumped directly from hopper 15258, containing ground beef from stream 15242 and hopper 15264, containing ground beef from stream 15244, by pumps 15266 and 15272 respectively and through Epsilon GMS-40 measuring devices shown as 15278 and 15284 into junction box 15279. Similarly, selected quantities of boneless ground beef can be pumped directly from hopper 15258, containing ground beef from stream 15242 and hopper 15264, containing ground beef from stream 15244, by pumps 15268 and 15274 respectively and through Epsilon GMS-40 measuring devices shown as 15280 and 15286 into junction box 15281. Selected quantities of boneless ground beef can be pumped directly from hopper 15258, containing ground beef from stream 15242 and hopper 15264, containing ground beef from stream 15244, by pumps 15270 and 15276 respectively and through Epsilon GMS-40 measuring devices shown as 15282 and 15288 into junction box 15283.

Selected quantities of ground meat from stream 15242 and stream 15244 can be combined in junction boxes 15279, 15281 and 15283. By varying the pumping rate of variable speed positive displacement pumps 15266 and 15272, a selected blend of ground beef, with a pre-determined and known ratio of fat to lean muscle tissue, can be pumped into junction box 15279. The fat content of the selected blend of ground beef pumped into junction box 15279 may be, for example, about 10% +/− about 0.3%. Alternatively, the fat content of the selected blend pumped into junction box 15281 may be, for example, about 15% +/−0.3% and the fat content of the selected blend pumped into junction box 15283 may be, for example, about 17% +/− about 0.3%. By processing ground meats in this way, the fat content of any given production quantity of selected ground beef can be controlled within a narrow margin of variation, such as about +/− about 0.3% and the muscle and fat content selected as desired by adjusting the fat content of raw materials that are deposited onto conveyors 15206, 15208, 15210, 15218, 15220 and 15222 accordingly. Furthermore, the energy required to blend the ground beef in the methods described herein is much less than is typically required to produce ground meats using currently common industry practice.

The selected ground beef blend that is pumped into junction box 15279 by way of two streams from pumps 15266 and 15272 is then transferred through blender 15290. The selected ground beef blend that is pumped into junction box 15281 by way of two streams from pumps 15268 and 15274 is then transferred through blender 15292. The selected ground beef blend that is pumped into junction box 15283 by way of two streams from pumps 15270 and 15276 is then transferred through blender shown as 15294.

Blenders 15256, 15262, 15290, 15292 and 15294 are all conveniently arranged with gas injection ports shown as 15296. Gas injection ports 15296 are arranged to provide suitable gas, such as carbon dioxide into blenders in such a way as to ensure that all ground meat that is pumped through the blenders is exposed to gas as desired and to an extent that will, for example, ensure that ground meat is saturated with dissolved suitable gas as required. Blenders 15256, 15262, 15290, 15292 and 15294 may include suitably sized continuous static mixing equipment such as may be supplied by Statiflo International, Macclesfield, Cheshire, UK. Any continuous blender may be integrated and located where indicated in FIG. 334 by blender reference numerals 15256, 15262, 15290, 15292 and 15294 or in any desired configuration that will ensure blending of ground meats as required.

The process described in association with FIG. 334 shows a combination of equipment that is configured to produce a first 15242 and a second 15244 stream of ground meat. Stream 15242 and stream 15244 are provided by measuring the fat content of two pair of three streams of boneless meat where streams 15212, 15214 and 15216 converge into a first stream 15242 and where streams 15224, 15226 and 15228 converge into a second stream 15244.

The fat and muscle (lean) meat content of stream 15242 is determined by the following factors: The total quantity of boneless meat deposited onto the conveyors that include the streams 15212, 15214 and 15216 and the fat and muscle content of the boneless meat. The velocity of the streams 15212, 15214 and 15216.

Correspondingly, the fat and muscle (lean) meat content of stream 15244 is determined by the following factors: The total quantity of boneless meat deposited onto the conveyors that include the streams 15224, 15226 and 15228 and the fat and muscle content of the boneless meat. The velocity of the streams 15224, 15226 and 15228.

The fat and lean content of streams 15242 and 15244 can be determined by adjusting the velocity of streams 15212, 15214, 15216, 15224 15226 and 15228 and the fat content of the boneless meat provided into streams 15212, 15214, 15216, 15224, 15226 and 15228.

Referring now to FIG. 334, streams 15298, 15302 and 15306 are shown to be connected directly to meat grinders 15300, 15304 and 15308. Grinders 15300, 15304 and 15308 are arranged to fine grind the corresponding stream of ground meat and transfer directly into a corresponding portioning apparatus. Grinder 15300 is arranged to fine grind ground meat in stream 15298 and transfer the stream of fine ground meat directly into portioning apparatus 15316. Grinder 15304 is arranged to fine grind ground meat in stream 15302 and transfer the stream of fine ground meat directly into portioning apparatus 15318. Grinder 15308 is arranged to fine grind ground meat in stream 15306 and transfer the stream of fine ground meat directly into portioning apparatus 15320. Any suitable variable speed driver may be integrated into equipment shown in FIG. 334 and may be controlled by a central processing computer.

The fat and muscle (lean) content of the stream of ground meat that is shown as stream 15298 and which is delivered to grinder 15300, is determined by the fat and lean content of a quantity of ground meat from both stream 15242 via pump 15270 and an additional quantity of ground meat from stream 15244 via pump 15276. The fat and muscle (lean) content of the stream of ground meat that is shown as stream 15298 is also determined by the velocity (and quantity of ground meat pumped therethrough) of the ground meat stream pumped into junction box 15283 by pump 15270 and the ground meat stream pumped into junction box 15283 by pump 15276. By adjusting the speed of pumps 15270 and 15276 the fat content of the ground meat in stream 15298 can be selected. The fat content of the ground beef in the stream pumped by pump 15270 is measured by the Epsilon (or other suitable fat measuring devices) fat measuring devices 15282. The fat content of the ground beef in the stream pumped by pump 15276 is measured by the Epsilon (or other suitable devices) fat measuring device 15288. The velocity of pumps 15270 and 15276 can therefore be controlled and set by the fat measurements provided by 15282 and 15288. In this way, a selected fat content can be produced by an automatic controller such as a computer that is connected to all associated pumps and fat measuring devices.

The fat and muscle (lean) content of the stream of ground meat that is shown as stream 15302 and which is delivered to grinder 15304, is determined by the fat and lean content of a quantity of ground meat from both stream 15242 via pump 15268 and an additional quantity of ground meat from stream 15244 via pump 15274. The fat and muscle (lean) content of the stream of ground meat that is shown as stream 15304 is also determined by the velocity (and quantity of ground meat pumped there along) of the ground meat stream pumped into junction box 15281 by pump 15268 and the ground meat stream pumped into junction box 15281 by pump 15274. Adjusting the speed of pumps 15268 and 15274, the fat content of the ground meat in stream 15302 can be selected. The fat content of the ground beef in the stream pumped by pump 15268 is measured by the Epsilon (or other suitable fat measuring devices) fat measuring device 15280. The fat content of the ground beef in the stream pumped by pump 15274 is measured by the Epsilon (or other suitable devices) fat measuring device 15286. The velocity of pumps 15268 and 15274 can therefore be controlled and set by the fat measurements provided by 15280 and 15286. In this way, a selected fat content can be produced by an automatic controller such as a computer that is connected to all associated pumps and fat measuring devices.

The fat and muscle (lean) content of the stream of ground meat that is shown as stream 15306 and which is delivered to grinder 15308, is determined by the fat and lean content of a quantity of ground meat from both stream 15242 via pump 15266 and an additional quantity of ground meat from stream 15244 via pump 15272. The fat and muscle (lean) content of the stream of ground meat that is shown as stream 15306 is also determined by the velocity (and quantity pumped there along) of the ground meat stream pumped into junction box 15279 by pump 15266 and the ground meat stream pumped into junction box 15279 by pump 15272. By adjusting the speed of pumps 15266 and 15272, the fat content of the ground meat in stream 15306 can be selected. The fat content of the ground beef in the stream pumped by pump 15266 is measured by the Epsilon (or other suitable fat measuring devices) fat measuring device 15278. The fat content of the ground beef in the stream pumped by pump 15272 is measured by the Epsilon (or other suitable devices) fat measuring device 15284 The velocity of pumps 15266 and 15272 can therefore be controlled and set by the fat measurements provided by devices 15278 and 15284. Any quantity of ground meat with any selected fat content can be produced by an automatic controller such as a computer that is connected to all associated pumps and fat measuring devices.

Referring now to FIG. 334, a packaging arrangement for packaging of the three streams of ground beef 15298, 15302 and 15306 in a web of material is shown.

Magazines 15322, 15324 and 15326 are provided to hold any number of tray preforms that will become a web with a depression therein to hold portions of fine ground beef from portioning machines 15316, 15318 and 15320. Magazines are more fully described below. From magazines, trays are subjected to treatment with gases to remove any undesirable gases therein in equipment 15328, 15330 and 15332. Suitable gassing equipment is more fully described below. From treatment equipment, trays are directed to tray flap folding and welding in equipment 15334, 15336 and 15338. A suitable tray folding and welding equipment is herein described below. From tray folding and bonding, trays are carried to portioning machines in conveyors 15340, 15342 and 15344, respectively. Trays are loaded with portioned goods at 15316, 15318 and 15320, and carried by conveyors 15350, 15348 and 15346, respectively. Portioning machines are described herein below. Trays with goods loaded therein are next over-wrapped in over wrapping and packaging machines 15200, 15202 and 15204.

The configuration shown in FIG. 334 provides for automatic production of three streams of ground meat each with a selected fat and lean content. A configuration of the required equipment, with any chosen capacity and size to suit any rates of production, can be arranged to produce any suitable number of one or more streams of ground meat, each with a selected fat and lean content, as may be desired.

4.6.13. Embodiment

Referring now to FIG. 335, a system apparatus according to the present invention includes three rectangular components being identified by the reference numeral 15400. The equipment includes three similar components. Each component is arranged to form a horizontally displaced, rectangular or square tube with doors at each end. The tube is conveniently position so that access to the doors at each end of the tube can be accessed for loading of packaging materials into the tube. When the doors are shut, the tube is sealed to provide a fully enclosed container or enclosure in which the EPS or FP trays can be stored. Conveniently located ports are provided into the walls of the tube such that suitable gasses can be introduced as required within the tube thereby displacing substantially all atmospheric air and most particularly atmospheric oxygen there from.

The tube is loaded with quantities of EPS and/or FP trays and the doors are closed to provide a sealed container. Nitrogen, other inert and/or any other suitable gasses are provided into the tube so as to displace substantially all air from the interior of the tube and thereby providing a condition where the gas is in contact with the surface of the EPS and/or FP trays. In one aspect, an ozone generator may be installed and chlorine gas may be provided within the enclosure. Any gasses and most particularly oxygen, that may be present within the cells of the trays can therefore freely diffuse and exchange with the gas in contact with the tray surfaces. With the passage of time, gas contained within the cell structure of the tray walls will therefore be displaced with gas in contact with the outer surface of the trays. Oxygen gas will be substantially removed from the cell structure. Oxygen will gradually accumulate and the level of "free" residual oxygen remaining in the tube can be monitored by automatic gas analysis and maintained at a minimum and desired level. This is achieved by extracting gasses from within the tube at a point near an end of the tube while providing an equal quantity of additional oxygen free gas into the tube at a point near to the opposite end of the tube from the extraction point at the other end of the tube.

Referring again to FIG. 335, equipment designated 15402 is a tray sealing apparatus which is arranged to produce packages, including tray, web and perishable goods contents shown as ground meat. The perishable goods may be portions of beef, pork or any other suitable perishable goods.

Equipment designated 15404, represents an apparatus for producing substantially gas barrier "master containers" from a roll of suitable material 15406. Equipment 15404 may be a Multivac R 530 that has been adapted to suit the production system of the present invention.

Equipment designated 15408 can be provided for (optionally) locating an oxygen absorber into each master container with the retail packages before sealing a barrier lid to the master container. The barrier lid material 15410 includes a roll of the barrier plastics lid material.

Equipment designated 15412 represents a carousel style vacuum packing machine, such as an "Old Rivers" equipment that has 8 vacuum chambers fitted thereto. The carousel style vacuum packing machine 15410, is shown fitted with 8 vacuum chamber assemblies similar to that as shown in FIG. 336 and described herein.

Referring again to FIG. 335 equipment 15416, represents an automatic carton erecting, filling and sealing equipment is shown. A supply of cartons is also shown as 15418.

Equipment designated 15420 represents an automatic carton palletizer, such as model FL 100 manufactured by Columbia Machine, Inc., or Vancouver Wash. The palletizer is arranged to automatically palletize finished cartons of packaged perishable goods with a supply of empty pallets 15422. Finished cartons can be automatically transferred from equipment 15416 to the palletizer 15420.

Equipment 15412 represents apparatus configured to locate tray flange covers prior to loading of the perishable goods into the tray. The flange covers are described in Australian patent application PM8415. Equipment 15424 is a representation of a section of the packaging equipment that is exposed as require to facilitate efficient loading of the perishable goods into the trays. Equipment 15426 is a representation of an apparatus configured to remove tray flange covers and as generally described in Australian patent application PM8415 to the present inventor.

Equipment 15428 represents apparatus configured to receive, grind, condition and process meat and other similar perishable goods. Equipment 15430 is a meat grinder. Equipment 15432 is a pressure vessel to provide for the mixing of a suitable gas with the meat. Equipment 15434 is a secondary meat grinder. Equipment 15436 is a pressure vessel. Equipment 15438 represents a vessel wherein the perishable food items, such as portions of meat, that is to be processed and packaged are located. Equipment 15440 represents apparatus configured to locate tray flange covering members prior to loading of the perishable goods into the tray. Equipment 15424 represents a section of the packaging equipment that is exposed as require to facilitate efficient loading of the perishable goods into the trays. Equipment 15442 is a representation of a roll of plastics lid material intended for sealing to flanges of the trays after perishable goods have been placed therein. Equipment 15444 is a representation of an optional feature and equipment for locating labels onto the underside or, after adjustment, upper side of the retail packages after sealing of lid material to flanges of the trays. Equipment 15404 is a representation of an apparatus for producing substantially gas barrier "master containers" from a roll of suitable material 15406, locating an optional oxygen absorbing material into each master container with the retail packages and sealing a lid to the master container that is unwound from a roll of plastics lid material shown as 15410. Equipment 15412 is a representation of a typical carousel type vacuum packaging machine that has been modified according to the description provided herein, and located adjacent to both packaging equipment items 2 and 3, so as to facilitate easy transfer of finished packages therebetween. Equipment 15446 is one of 8 vacuum chambers mounted to the carousel and as shown in FIG. 335. Equipment 15416 is a representation of an automatic carton erecting, filling and sealing equipment with a supply of cartons 15418. Equipment 15420 is a representation of an automatic palletizer.

Equipment 15448 is a representation of equipment configured to exchange air and more particularly, atmospheric oxygen, contained within the cell structure of foamed polystyrene trays (EPS trays) and foamed polyester trays (FP trays). FIG. 220 shows a cross-sectional side view of half of the arrangement and FIG. 221 shows a cross-section across the full width of the arrangement, through parts of a preferred apparatus and packaging.

Equipment 15400 is a diagrammatic representation of an alternative equipment configured to exchange air and atmospheric oxygen, contained within the cell structure of foamed polystyrene trays (EPS trays) and foamed polyester trays (FP trays).

Referring now to FIG. 336, a closed vacuum chamber 15500 including upper vacuum chamber 15502 and lower vacuum plate 15504, which may be incorporated into equipment 15412 in FIG. 335, is shown. A rack 15500 with trays 15506 containing perishable goods, such as red meat, is shown inside closed vacuum chamber 15500. An evacuation port 15508 in direct communication with a source of vacuum is provided. A switch is attached to the vacuum source so as to provide on/off control. Two continuous and concentric 'O' rings 15510 are located between the edges of upper vacuum chamber 15502 and lower vacuum chamber 15502 and spaced apart providing a space 15512 therebetween. The distance between 'O' rings is arranged such that when multiplied by the length of space 15512 the total projected area between the concentric 'O' rings can be calculated. When a vacuum is applied to port 15508, the closing force created between the upper vacuum chamber 15502 and the lower vacuum chamber 15504 can be determined. Assuming that vacuum can be represented in terms of 80% of atmospheric air pressure, at approximately 14 psi, then the chamber total closing force, in pounds, can be readily calculated. A gas or blend of desired gasses can be provided within the closed vacuum chamber at a pressure above atmospheric pressure which will provide a chamber opening force. However, in this arrangement, the closing force can be arranged to exceed the opening force thereby providing a method of maintaining a pressure with the closed chamber at a level above that of the prevailing atmospheric air pressure while the closed vacuum chamber remains closed due to the closing force provided. A further evacuation port 15514 is provided in the upper vacuum chamber 15502 and a gassing port 15516 is provided also. The upper vacuum chamber 15502 is arranged so that it can be lifted vertically upward and away from the lower vacuum chamber 15504, allowing removal of the rack with trays and another rack with trays can be placed therein such that a continuous production process can be undertaken. The upper vacuum chamber 15502 and the lower vacuum plate 15504 may be arranged with clamping and structural supports so as to allow an increase of gas pressure provided therein to any desired pressure such as 500 psi or more.

In an aspect of the invention described above, perishable goods are located in an EPS (foamed polystyrene) tray with inherent or enhanced gas permeability. A gas permeable web is positioned above the EPS tray. The web has adhesive applied to the region of the web that will come into contact with flanges of the tray so as to provide a seal between web and tray. The web is then sealed to the flanges of the tray. The flange of the tray may be compressed as shown to provide improved structural integrity and strength.

The EPS tray with inherent or enhanced gas permeability can quickly transfer, remove and exchange substantially all oxygen gas from foam cells during "carousel evacuation and gassing process".

The web may be printed on one or both sides with panels that can be seen from the upper side after sealing to the tray. A bar code can be applied to label on the underside of the package. The bar code can include code information such as the specific weight of tray contents, date packaged and type of content goods. Information can be read by a scanner at any time after packaging and converted to consumer readable information that can be printed by, for example, ink jet printers onto the panel prior to retail display.

A device to cause oscillation of gas pressure within the chamber 15500 at a frequency that will cause improved and more rapid exchange of air and oxygen contained within cells of EPS tray with desired gas provided in chamber, can be provided. Furthermore, the oscillation of gas pressure within the chamber 15500, can cause the permeable web to raise and lower and provide a space between the web and upper surface of the goods thereby allowing the gas provided in the chamber to directly contact the tray contents beneath the web. Oscillation can also provide improved contact with the goods and enhanced absorption of the gasses by the goods. The oscillation may be set at a range of gas pressures that are above or below prevailing atmospheric pressure. The gas may include other substances in vapor, atomized or powder form and the composition may be selected and include the most suitable blend of one or more of the following: nitrogen, oxygen, argon, carbon dioxide, hydrogen, krypton, neon, helium, xenon, $O_3$, $F_2$, $H_2$, $O_2$, $KMnO_4$, $HClO$, $ClO_2$, $Br_2$ and $I_2$.

A desirable blend of gasses such as carbon dioxide and ozone can be provided within the closed chambers 15500 with the rack and trays contained therein.

Referring again to FIG. 336, racks 15518 with trays 15506 can be automatically loaded into open vacuum chamber 15500 which is then closed. A vacuum source is then applied to port 15508 to seal the upper chamber 15502 with the lower plate 15504 and a desired gas provided into closed vacuum chamber 15500 after removal of atmospheric air there from. The carousel is rotated, intermittently, in the counterclockwise direction shown in FIG. 335 and stopped such that after each vacuum chamber assembly 15500 has fully traveled around the perimeter of the carousel the rack with trays can be automatically removed from each vacuum chamber 15500 and replaced with another. Therefore a continuous and automatic process of treating trays containing perishable goods with desired gasses can be provided.

4.6.14. Embodiment

Referring now to FIG. 337, a slight modification to a previous equipment plan is shown for producing trays according to the present invention. Equipment includes four tubes 15600, 15602, 15604, and 15606. Each item is arranged to form a horizontally displaced, rectangular or square tube with doors at each end. Each tube is conveniently positioned so that access to doors at each end of tube can be accessed for loading of packaging materials into tube. When the doors are shut, the tube is sealed to provide a fully enclosed container or enclosure in which the EPS or FP trays can be stored. Conveniently located ports are provided into the walls of the tube such that suitable gasses can be introduced as required within the tube thereby displacing substantially all atmospheric air and most particularly atmospheric oxygen there from.

Each tube is loaded with quantities of EPS and/or FP trays and doors are closed to provide a sealed container. Most preferably nitrogen, other inert and/or any other suitable gasses are provided into the tube so as to displace substantially all air from the interior of the tube and thereby providing a condition where gas is in contact with the surface of EPS and/or FP trays. Additionally, an ozone generator may be installed and chlorine gas may be provided within the enclosure. Any gasses and most particularly oxygen, that may be present within the cells of the trays can therefore freely diffuse and exchange with the gas in contact with the tray surfaces. With the passage of time, gas contained within the cell structure of the tray walls will therefore be displaced with gas in contact with the outer surface of the trays. Most importantly oxygen gas will be substantially removed from the cell structure. Oxygen will gradually accumulate and the level of "free" residual oxygen remaining in the tube can be monitored by automatic gas analysis and maintained at a minimum and desired level. This is achieved by extracting gasses from within the tube at a point near an end of the tube while providing an equal quantity of additional oxygen free gas into the tube at a point near to the opposite end of the tube from the extraction point at the other end of the tube.

4.6.15. Embodiment

Referring now to FIG. 338 a plan view of a system apparatus constructed according to the present invention is shown. Two streams of boneless beef 15700 and 15702 are provided by dumping selected quantities of boneless beef into two adjacent "pivot vat dumpers" 15704 and 15706 respectively. Vat dumpers are commonly used in the meat industry and are readily available from manufacturers such as Cozzini, Inc., Chicago, Ill., USA and can be viewed on their web site at www.cozzini.com. Vat dumpers 15704 and

15706 are arranged to elevate pallet quantities of boneless meat and dump into respective hoppers attached to elevators that then separate the boneless beef into respective, continuous, evenly spread, streams of boneless beef. Streams of boneless beef may be sourced from as far away as Australia or New Zealand, and in these instances such boneless beef is generally shipped to the meat processor in a "block" frozen condition with the "blocks" of frozen boneless beef weighing in the order of 40 lbs. each. Typically, a large industrial microwave oven is used to de-frost these blocks of frozen boneless beef as shown as 15702 in FIG. 338. Blocks of boneless beef can be stored prior to use at a freezing temperature of less than 5° F. and then de-frosted by elevating the temperature to approximately 30° F. It is important that when preparing block frozen beef for processing with equipment as herein described in association with FIG. 338, that the boneless beef temperature be increased to above 32° F. and thereby ensure that no frozen water is present with the beef. This is in part necessary since microwave ovens can tend to heat frozen goods such as block frozen beef unevenly so that "hot" and "cold" sections remain in the blocks after removal from the microwave oven.

From the vat dumpers 15704 and 15706, the boneless beef is transferred in conveyors 15708 and 15710, respectively. Conveyors may include elevators which dump the boneless beef in hoppers 15712 and 15714. Hoppers 15712 and 15714 dump the formerly frozen block boneless beef into grinders attached thereto to be ground and transferred directly into pre-blenders 15716 and 15718. Pre-blenders 15716 and 15718 include a rotating member designed to radially or laterally induce homogenization of the boneless beef. In some instances, the pre-blender can include spiral shaped augers with specially fitted screw or a series of paddles attached to a rotating core, designed to blend the boneless beef to provide for a more homogeneously blended product. Liquid and gaseous $CO_2$ can be injected into pre-blenders, as shown in FIG. 286 at ports 11720 and 11728, to lower the temperature evenly with blending and in this way the temperature of the pre-ground and pre-blended boneless beef can be consistently reduced to a substantially consistent temperature of 29.5 to 30° F., which is desirable when, for example, further processing of beef grinds into beef patties is required. Enclosed hoppers with elevators 15708 and 15710 are arranged to elevate boneless beef in two, respective, continuous streams. Each stream may be treated with bactericides such as SANOVA™ as it is transferred by the elevators 15708 and 15710. An apparatus, such as is described in association with FIG. 293 hereinabove, may be inserted where elevators 15708 and 15710 are shown and thus both streams of boneless beef can be rendered substantially bacteria free and at least any quantities of bacteria, such as *E. Coli* 0157:H7, can be substantially reduced and/or eliminated and if the apparatus is operated correctly with adequate quantities of sanitizing agents such as acidified sodium chlorite in conjunction with exposure to sufficient UVC, such bacteria as *E. coli* 0157:H7 can be substantially or completely eliminated. Alternatively, a strategy of detecting the presence of *E. coli* 0157:H7 can be used whereby the boneless beef that is identified as containing any such, or similarly dangerous bacteria can be diverted for use in production of any cooked product where the temperature during the cooking process is elevated and held at least to 160° F. for sufficient time to ensure complete elimination of any such dangerous bacteria.

The continuous streams of boneless beef 15700 and 15702 respectively, are transferred into enclosed pre-grinders 15712 and 15714 which can coarse grind the streams of boneless and transfer each stream into pre-blender pumps 15716 and 15718. Each pre-blender pump 15716 and 15718 are similar and each comprises an enclosed horizontally disposed vessel with horizontal and vertical impellers therein mounted to provide a mixing action as further described below.

Referring again to FIG. 338, fat measuring equipment is located at three locations. Firstly between pre-blender 15716 and continuous blender 15720, secondly between pre-blender 15718 and continuous blender 15720 and thirdly between continuous blender 15720 and elevator 15730. Continuous blender 15720 is an enclosed, jacketed conduit device fitted with fully enclosed mixing screws during operation and excluding light, and is arranged to provide heating, at any suitable temperature or cooling at any suitable temperature, of the grinds that are blended therein and transferred there through. Fat measuring device 15732 located between blender 15720 and elevator 15730 is arranged to check the finished fat content of the combined streams 15700 and 15702 after blending. The combined stream of grinds is transferred into elevator 15730 and from there onto enclosed screw conveyor 15734. The screw conveyor 15734 is mounted directly above four separately but adjacently located silos, all shown as 15736 and an independently operated valve arrangement is located between each silo and screw conveyor 15734 such that any suitable quantity of blended grinds can be transferred directly into any one selected silo for storage therein. The independently operated valves located above each silo can be opened and closed as required so as to isolate the respective silo from the screw conveyor 15734. Each of the four enclosed silos can be arranged to have an independent means of temperature controlling the contents stored therein at any suitable temperature and any selected gas at any suitable pressure can also be provided in the free space within the silos. Grinds may be stored within the silos for any suitable period of time prior to transfer directly to a corresponding pump. Impellers may also be provided in the silos. Each one of four pumps shown as 15738 are connected to each of the four silos 15736, respectively. Each pump 15738 is in turn connected directly to a fine grinder 15740 and each fine grinder is connected directly to portioners 15742. The fine grinders 15740 may be fitted with injection ports to allow any selected gas or blend of gases to be injected directly into the grinding head. Such a gas could be carbon dioxide or any gas excluding oxygen. One or more of the fine grinders 15740 may be connected to pattie forming equipment such as is generally described in association with FIGS. 281, 282, 300, 283, 301, 302, and 303, herein. Alternatively a stream of finely ground beef directed from a fine grinder 15740 can be transferred under pressure directly into the forming section of, for example, a Formax 26. Formax 26, pattie forming machines, are commonly used in the industry and details of this equipment can be obtained on web site http://www.formaxinc.com/html/forming/f26.htm. In this way, a stream of grinds can be injected directly into the Formax 26 pattie forming machine without exposure to ambient atmosphere and held under a selected gas throughout the process. The temperature of the patties formed in this way can be controlled to within +/−0.5° F., if so desired, by injecting gas at any suitable point into the stream of grinds and into an enclosed conduit that contains the stream of grinds and patties after forming through to the next processing stage or packaging. After being so formed, patties can be transferred directly to cooking apparatus as generally described in association with FIG. 395 herein and wherein all equipment is connected together in such a manner so as to provide a continuous path through a conduit with a selected gas provided therein, from the point of boneless beef entry and through to the packaging process at the opposite end to the entry point. In this way, sanitized patties can be automatically produced and stored in a chilled condition without the need to freeze said patties. At each or any stage in the process described herein in association with FIG. 338, the temperature can be elevated or decreased as may be required to enhance production output and product quality.

Continuous blender 15720 is shown in FIG. 338 with only two incoming streams of edible matter such as beef grinds, however any convenient number of incoming streams may be provided such as providing an additional third stream of ingredients that can be injected into the blender entry chamber. The third stream of ingredients may comprise any chosen formulation at a controlled temperature, in the form of a slurry, or other suitable consistency, which may include pre-blended herbs, spices, breadcrumbs and seasonings that can be injected in a continuous stream controlled directly and according to the combined mass flow of all edible matter flowing through the continuous blender, thus ensuring complete consistency and reproducibility.

4.6.16. Embodiment

Referring now to FIG. 339, a system apparatus is shown in plan view used in the practice of the present invention. The equipment shown is arranged to automatically grind, measure, process and retail package any suitable type of ground meat such as boneless beef. Two Cozzini direct pivot vat dumpers shown as 15800 and 15802 are arranged to grind two separate streams of boneless beef 15804 and 15806 respectively, and shown by arrows marked 15808 and 15810. Stream 15804 may comprise boneless beef at a temperature of approximately 30° F. and include a relatively high fat content stream of, for example, 60% lean and 40% fat. Stream 15806 loaded into vat dumper marked 15802 may include boneless beef at a temperature of 30° F. and with a relatively low fat content of 10% and high lean content of 90%. However, it is to be appreciated that streams 15804 and 15806 can include beef at any fat and lean content, that described here being exemplary of one embodiment. Vat dumpers 15800 and 15802 load the respective streams of boneless beef into inclined screw loaders 15812 and 15814 respectively. Boneless beef streams are then loaded respectively onto inclined belt conveyors 15816 and 15818 with metal detectors 15820 and 15822 mounted thereon, and arranged to discard any boneless beef that contains metal therein. Both streams 15804 and 15806 are transferred into pre grinders 15824 and 15826. Pre grinders 15824 and 15826 can be fitted with gas injectors mounted into the grinding heads thereof for injecting any suitable gas therein. Grinders 15824 and 15826 pre grind and transfer ground boneless beef directly into pre blenders with screw pumps 15828 and 15830. Stream 15804 of pre-ground and pre blended boneless beef is pumped directly into a conduit that transfers boneless beef stream 15804 from the pre blender to continuous blender 15832 via fat analyzer 15834. Stream of boneless beef 15806 is transferred directly from pre blender 15830 via a conduit to continuous blender 15832 through fat analyzer 15836. Screw pumps in 15828 and 15830 are controlled in such a manner so as to ensure that the fat content of the combined streams 15804 and 15806 is constantly maintained at a pre selected level such as 23% fat, 77% lean. It is to be appreciated that a beef stream containing any amount of fat and lean content can be produced, that being described here being exemplary of one embodiment. Continuous blender 15832 transfers the combined streams 15804 and 15806 after blending there together, directly into an enclosed conduit that transfers the combined stream through fat analyzer 15838 and into enclosed elevator 15840. Enclosed elevator 1540 elevates and transfers combined stream of boneless beef into an enclosed silo 15842, that is mounted directly to a pump which pumps the stream of boneless beef through a fine grinder 15844. Fine grinder 15844 can be fitted with gas injection ports such that any selected gas at any suitable temperature and pressure can be injected directly into the fine ground stream of boneless beef. The fine ground stream of boneless beef is transferred directly into portioning apparatus 15846. The stream of boneless beef is extruded into a continuous profiled extrusion that is cut into sections or loaves of fine ground boneless beef. Loaves of fine ground boneless beef are transferred directly and automatically loaded into trays. Preformed trays are automatically folded and bonded by a folding and bonding apparatus shown as 15848 and disclosed in detail in association with FIGS. 184–185. An enclosed conveyor 15850, is arranged to deliver folded and bonded trays to ground beef loaf loading device 15852, and is enclosed in a conduit filled with any selected gas such as $CO_2$ or N2, or any combination as chosen. Loaded trays are transferred along conveyor 15850 and directly into over wrapping machine 15854. Over wrapping machine 15854 over wraps loaded trays with a selected material such as pPVC. After over wrapping trays are transferred over check weigher 15856, labeled, and into automatic loading device 15858. A horizontal forming machine 15860 is arranged to form gas barrier pouches. Over wrapped trays are loaded into said barrier pouch by automatic loading device 15858. Horizontal former 15860 and loading device 15858 are enclosed within a gas filled conduit. A plurality of trays, having been loaded and overwrapped, are stacked automatically into barrier pouches, and a barrier web is hermetically sealed to flanges of the pouch, with a selected gas provided therein, and in such a manner as to ensure that the selected gas contained therein, has an oxygen content that does not exceed 500 parts per million, if so desired. Finished, loaded and sealed master pouches are then transferred from horizontal forming machine 15860, via conveyor 15862, to automatic case packer 15864. After optionally loading into a suitable case, the finished sealed case is transferred to an automatic robot palletizer 15866.

5. Information Systems

5.1. Traceability

The equipment arrangements described herein above, may be integrated with suitable electronic devices to carry out certain information sharing functions.

Conventional methods of processing perishable products, such as beef, lose track of the source from where the product originates. One instance of where the prior art cannot track where product comes from is in ground beef processing. Typically, parts from many animals may be used to form a single patty of ground beef. Even in instances where the package contains a single cut of beef from a single animal (source animal), conventional methods have not yet devised a method that can reliably and effectively keep track from where the cut of beef originated, the animal from which is was derived, the animals diet, the conditions to which it was exposed during it's life, or the parentage/ancestry of the source animal. Thus, conventional methods can only date stamp a package and when a recall is issued, at least every package that has that date stamp may have to be recalled, creating enormous amount of waste. Because potentially, thousands of pounds of beef can be processed in any given period, through a contaminated machine, or however long it takes to recognize that contamination has occurred, the losses that can occur as a result of being unable to track a product and/or identifying it's source and/or batch size can add up to very large sums of money.

In one aspect of the invention, information relating to the effects of the goods that, after consumption, may occur to the particular consumer can be collected and stored in a database. Such information can be collected from a large group of consumers over an extended period of time and then such data can be used to evaluate and assess the effects of the consumption. Such effects may be related to the source animal's food, any medication which is fed to the animal or any other additives in animal feed given to, for example, enhance the quality of the beef harvested from the animal. After such an evaluation of data collected in this way and if it is determined that goods derived from any particular animal have had any particular identified effect, whether beneficial or otherwise, adjustments can then be made to the medication, feed, genetics or treatment of other animals used to produce food for human consumption in the future. In this way, significant benefits to mankind can be derived from the data so collected made possible by the present invention.

One aspect of the present invention includes the process of tracing a good harvested from an animal when the animal is slaughtered, dehided, etc., and then chilled prior to disassembly and in a separate aspect, the process of slaughtering, de-hiding, etc., and then disassembling, prior to chilling, molding and then chilling (which can be with a selected decontamination agent applied onto the surface of the primal inside the mold).

In another aspect, the present invention provides a reliable, automated manner of tracing a product harvested from an animal. In one instance, the method can be used to show consumers that the packaged beef has been sourced from a "clean" animal. Furthermore, the present invention is appropriate for use in "clean" source countries such as Australia and New Zealand. The present invention can be practiced by applying an RFID tag or identifier bar code to packages of boneless beef imported to the USA from such reliable countries as Australia and New Zealand. Each retail package could have human readable information and also barcode identifier data stored in a computer that includes all details about the animal, it's parents and its feed etc.

A method for tracing the origin of packaged perishable goods, such as meat, from carcass to packaging is schematically illustrated in FIG. 500 and detailed below. While the following description is made with reference to beef, it should be apparent that the present invention can be practiced with any perishable item that desirably can be traced to a particular origin.

Referring now to FIG. 340, a process for tracing perishable products, such as meat, from its originating source, such as an animal carcass to packaging, is illustrated. In block 15900, the process includes a step for tagging an animal with a radio frequency (RF or RFID) tag facilitating the storage of usable information to be used in the process and system according to the present invention. Any device which can store any information including useable information is a suitable device to be used in the present invention. Useable information is defined herein to mean, information that can be read and processed via a computer, or any other suitable means. In one instance, the animal can be tagged at birth and at the farm or ranch where it was born. In some European countries, an RF ID tag is used. However, the United Kingdom at present uses the passport system. Any and all information, such as farm records are recorded on the tag or in association with a unique identity attached to the tag.

In one embodiment, when the tagged animal is sent to the slaughterhouse, the tag or passport can be scanned for acceptance into lairage (lairage) booking. In this manner, via a computer, a determination can be made whether the animal has been properly tracked and shipped from and to the proper destination or location. At the slaughterhouse, the useable information stored on the tag is transferred to a carrier device, such as a carcass hook assembly, as will be described below. It should be apparent that a hook assembly as used herein is merely one exemplary embodiment of a means for carrying any type of animal carcass or any division of an animal carcass therefrom from one location to the next.

In block 15902, the process includes a grading station for the grading of animal carcasses or any portion thereof. The information that was tagged to the animal continues to be associated therewith and used in connection with grading. The grade given a carcass can come from a vision system, wherein, for example, a digital photograph of each side of the carcass can be recorded in a database and associated with the animal's unique identity, grading can be done manually or by any other suitable means. The grading system assigns an ultimate use or destination for the harvested animal beef based on many factors, such as fat to lean content of the beef, age of the animal, sex of the animal, etc.

The vision system used in one aspect of disassembly and packaging can, from a single digital photograph, calculate the weight, volume, primal size and fat:lean:bone ratio, etc., of a split carcass and, in real time, adjust the disassembly strategy for each animal on a "best fit" basis ensure that the most beneficial disassembly strategy is used for any current supermarket customer purchase orders. A vision system useful in the practice of the present invention, can in some instances also allow a virtual reassembly of all of the final animal parts (even before disassembly with a theoretical strategy) after packaging. In this way the system ensures a best possible disassembly strategy. By virtual reassembly an actual total animal weight is known and this data can be stored in a data base and used as a real time comparison by the vision system for future carcasses and in doing this the vision system accuracy is continually improved. Best fit strategy model is set by a best fit module having computer executable instructions which can be implemented on a computer.

The carcass grade is transferred to the hook assembly that carries the animal carcass or if the carcass has been split into two halves, the same information can be stored in each hook (with track roller) carrying each same animal part. Block 15902 is shown in broken lines to indicate that the grading of animal carcasses can be undertaken at a stage following the tagging stage, block 15900. However, it should be understood, that the grading step can be carried out at any stage of processing prior to the breaking stage, block 15908.

In block 15902, the process includes a chilling station to chill the animal carcass. The chilling process delays the onset of bacterial growth which may contribute to the formation of undesirable contamination or metmyoglobin. Thus, the chilling process has a beneficial aspect in enhancing the preservation of the meat. The product is tracked into the chiller via use of the hook assembly that contains the RF tag(s) and RF scanners are conveniently located adjacent to the track system to enable reading or writing to, the RF tag.

In one embodiment, carcasses of similar grades can be grouped together in the chiller. A computer system capable of executing a set of instructions can process information, for example, a computer can be used to keep track of customer order requirements and match the carcasses that best fit the customer specifications. The best fit analysis can be reported on a computer terminal and this information can be used to determine the destination of the animal carcass and the strategy used in it's processing. In one particular aspect, the carcasses can be decontaminated as described herein above before the carcasses enter the chilling station, block 15902.

In block 15904, a quartering station is provided to further divide the animal carcass halves into quarters. In block 15904, the usable information initially stored on the RF tag in block 15900 is transferred to a hook used in transferring all components of the animal carcass through the quartering section. Thus, the usable information is associated with quarter parts of animals. In some instances, it may be desirable to follow a specific quartering specification, such as selecting and specifying which primals are to be removed from the carcass quarter. For example, it is possible that some boneless meat items, trim or primals are best used for ground meat, and in other instances, depending on the customer specifications, the same primals can be destined to be used for steaks. In one embodiment of the present invention, because customer orders are known, the quartering specification for the carcass quarter is assigned at beginning of processing, but after grading. In this manner, a prediction can be made as to the need for a supply of a particular grade of carcass and thus supply buying can be forecast accordingly. The carcasses best suited to any particular order requirements are then selected, scanned and weighed. The tag is read and written to as required, and the useable information stored in an RF tag associated with a new hook assembly along with the product identity, such as forequarter, hindquarter, etc.

In block 15906, a boning station is provided to debone the quarter portions of animal carcass. In boning the animal, the bones are retained on the present hook whereas the deboned/harvested, substantially boneless beef derived therefrom is suspended from a new hook. The new hook includes an RF tag to which the usable information has been automatically transferred (written to), from the hook which holds the bones. Transfer of information from one RF tag to another can take place in any suitable manner and by automatic means. Prior to the carcass entering the boning system, the boning specification strategy will have been selected. Boning specifications are known to persons of ordinary skill. Each carcass or portion thereof on a hook is associated with a unique RF tag. The RF tag is scanned and the product is weighed as it enters the boning hall. In one aspect, a computer having proper instructions can validate that the correct specification is being used for the carcass being boned. As the carcass moves down the track (meat rail), bones are removed. One suitable process that can be used in the practice of the invention is the Carni system. When the de-boning process is finished the boneless quarter is weighed and this can be written to the RF tag on the corresponding hook.

In block 15908, a breaking station is provided to further subdivide each quarter into its primals or smaller parts. The boneless quarter moves onto the primal breaking station 15908. The RF tag that is attached to the boneless quarter is now scanned. A computer having the proper instructions can determine the manner in which the boneless beef portions/carcass is next to be portioned. A computer terminal displays instructions to the operator on how the boneless beef/product is destined to be broken down. The operator at the selected workstation (selected by automatic computer means corresponding with the carcass grade as identified by the vision system) can remove the boneless carcass from the hook and select the primal or primals that he or she is instructed to do. The operator next places the carcass on the board or carrier plate. The operator can confirm that he has received the proper carcass according to the instructions provided by the computer. The operator can, for instance, provide verification to a computer in any suitable manner which prompts the transfer of information from the RF tag on the hook assembly containing the quarter to the RF tag on the board (which may be molded within the board construction such as in a covered and suitably sealed recess or within the outer surfaces of a molded board), carrier plate or mold or any other suitable container. The computer can receive verifications at which time, the computer will carry out a set of instructions which will direct conveyors to carry the board with carcass to the operator workstations in the desired manner. As used herein "board" will mean any carrying device (including a mold with RF tag attached thereto) capable of transferring beef to subsequent operator workstations. Any number of boards can be arranged to travel on tracks in an automated fashion that connect with operator stations. In this manner, the boards with carcasses can be carried in a manner directed by a computer to an operator station. The automatic transfer of information from carcass hook to board suitably includes the product code and any information relating to how the carcass is to be portioned. During the breaking station, the untrimmed primal can be weighed, and after breaking, the primals can be weighed again, separately. The board travels to one or several destinations where it is stored in queues until it moves into an automatically selected operator workstation. Transferring systems and operator work stations will be described in more detail below. The workstation can have a display screen which tells the operator what trimming specification the beef portion(s) requires and in some instances, may display a picture of the finished product. When the trimming operation is completed by the operator, in one instance, the operator confirms completion and the board can move on to (a) next workstation. The board can travel to as many workstations as the selected specification/strategy requires. In one embodiment, all the primal portion(s) and trimming can be kept on the same board. In this manner, it is apparent that all the beef and products can continue to be tracked. Alternatively, if trim is separated by cutting from the original portion/primal of boneless beef, the trim can be retained on the first board or placed on a second or any subsequent board(s) with a separate RF tag, and along with the transfer of such trim to a subsequent board, the RF tag on the receiving board can be written to or programmed with the information read from the first or removing board, along with other information that may be desired, such as the sum total weight of the trim. Each time a change occurs to the quantity of primal beef and/or trim by removing a part thereof the board with beef thereon is weighed and the weight changes recorded and corresponding data is written to the associated RF tag(s). In this manner, efficiencies can be calculated for a single beef carcass, by for example, "assembling" all of the data associated with a single carcass which may include all of the weights (as measured and recorded during the process disclosed above) of every single piece of primal, boneless beef or trim sourced from the respective carcass (even accounting for moisture loss due to evaporation or purge which can be compensated for in a subsequent process such as during decontamination as per description in disclosures herein). In this way for example, the value of any particular carcass, sourced from any identified supplier, (as identified by the information associated and contained in the source animal's uniquely identifying ear tag) that has been disassembled according to any selected specification/strategy. Such value can be determined by evaluating the total revenue received from the sale of the respective source carcass. Comparisons, for example, between the production cost of the respective animal and resultant carcass and the corresponding sales revenue for the same carcass can then be evaluated and strategies/specifications, source animal genetics and feeding strategy can be adjusted so as to, in the future, improve revenue and subsequent source animal quality, eating qualities, nutritional value to consumers and any other properties, etc.

In one aspect of the invention, beef portions can be destined to be formed into individual beef portions. In this aspect, from block 15908, the beef portions can proceed to block 15912 wherein a tempering station is provided to form a light freezing on the surface of the beef primals/portions and thereby facilitate the improved and more consistently accurate slicing, dicing, jointing, or grinding of meat in block 15916. It is at this point, wherein substantially all processing equipment can be enclosed and provided with a suitable gas, such as carbon dioxide. The equipment can be enclosed and the beef therein exposed constantly to any suitable gas and any decontaminating agent. The enclosed environment can substantially continue until the point of hermetically sealing the beef in a suitable container. In this manner, the onset of undesirable decontamination and/or ultimate premature discoloration due to metmyoglobin formation is considerably retarded. In box 15918, a grading station is provided to grade the individual sliced portions according to any desirable packaging arrangement, that can be based on quality, weight, size, grade, etc. In block 15920, a packaging station is provided to package the individual sliced portions, or any combination of portions in any desirable manner, such as by weight, size, or other desirable packaging arrangement. In block 15922, the finished package is weighed, priced, and labeled at a station to encode or otherwise provide usable information to the consumer on the package. However, in other aspects of the invention, which will be described below, the human readable pricing and labeling details can be optionally finalized at the point of retail. In this manner, the most current information is used in setting the price of the packaged product. One advantage to the use of the present invention, is that the practice of labeling and pricing at the moment of packaging is delayed until shortly before the packages are put on display for retail sale to the consumer, in a supermarket for example. In block 15924, the packages are sent to a dispatch station, wherein the package has been predetermined to ship to a desired destination. In one aspect of the invention, the most efficient packaging for a beef portion can be determined prior to actual retail or wholesale packaging. For instance, packages can be selected for a particular destination based upon several factors, such as the estimated delivery time to the selected destination and the time needed for storage and/or shelf life can be calculated on an associated computer capable of performing these tasks and issuing the proper instructions. If the delivery time is estimated not to exceed a predetermined period of time, less expensive packaging may be selected for the beef portions selected for delivery to that particular destination. For instance, the need for barrier materials may not be indicated, thereby potentially reducing a cost component of the package. Since, in some instances, barrier materials may require more costly processing than with corresponding non-barrier materials, the less expensive non-barrier materials can then be used/selected if suitable. This real time controller for packaging can be implemented on a computer system and use of a communication system, such as the Internet. One advantage to the present invention, is that savings can be realized by using only as much packaging as required for the beef product. In another aspect of this invention, purchase orders received at the point of carcass grading, selection and packaging, from a supermarket, can be entered in "real time" to the production system and current orders can be adjusted immediately prior to any part of the process that has not yet been completed. Initial purchase orders based upon estimated future requirements, from supermarkets, may be issued to the point of production over any given period of time and adjusted according to an established/selected procedure whereby an approximate order for quantities anticipated for delivery in 21 days time; animals can then be selected accordingly and prepared for slaughter as required. As said 21 day period (wherein a new 21 day ordering process can be established every day) progresses, the initial purchase orders are adjusted according to actual sales (versus inventory) as opposed to the initial purchase order estimated retail sales, etc., and in this way a more accurate ordering procedure that accounts for retail fluctuations over the 21 day period is achieved. In this way supermarket losses due to such situations as "out-of-stock's", "excessive stocks" and/or different item requirements can be minimized.

In another aspect of the invention, beef portions can be transferred from the breaking station 15908 to a beef grinding station. In this aspect, beef portions proceed to block 15922, wherein the beef portions have be selected for use in production of ground beef. In block 15922, grinding of the substantially boneless beef takes place in any suitable grinding device herein disclosed. It is at this point, wherein substantially all processing equipment can be enclosed and provided with a suitable gas, such as carbon dioxide. The equipment can be enclosed and the beef therein exposed constantly to any suitable gas and any decontaminating agent. The enclosed environment can substantially continue until the point of hermetically sealing the beef in a container. In this manner, the onset of undesirable decontamination and/or ultimate premature discoloration due to metmyoglobin formation is considerably retarded. In one of several embodiments, any grinding device may be any embodiment of a grinding device that is herein described. In block 15924, a pumping device can follow the grinding step of block 15922. Suitable pumping devices are herein described. In block 15926, a measuring device can be located downstream of pumping device. A measuring device can suitably measure the content of any desirable variable, such as fat content, lean tissue content, water content, etc., to provide feedback signals that adjust the pumping device in block 15924. In this manner, the flow rate of beef through pumping device is controlled to within a selected and desirable level. In one embodiment, two or more streams of beef are provided going to block 15922. A first stream may include a relatively high fat content, whereas a second stream may include a relatively lower fat content. Accordingly, the first and second streams are processed through a grinder, and have a pumping means and a measuring device with the capability to automatically control the flow rate of both streams correspondingly. In block 15928, the first and the second streams are thoroughly mixed or blended to produce a third stream having a substantially uniform fat content as a result of blending a high fat and a low fat stream. In this manner, a third stream containing a fat content ranging anywhere from the fat content of the first stream to the fat content of the second stream can be produced. In some instances, the desired fat content may be at either extreme of the first and the second streams; therefore in that case, the velocity of one of the streams may be reduced or halted completely. Furthermore, a third measuring device may be located at the exit of the continuous blending step, block 15928, to divert any off spec product to a rejects vessel or alternatively to return the rejects to the continuous blender 15928, as a stream apart from the high fat and the low fat content streams. The fat content of this third stream will also be known, the velocity or rate of flow of the first and the second streams may be adjusted to provide a resultant blend in the desired proportions and as required.

In yet another embodiment, it is possible that the first or second stream eliminates need for a measuring device due to the fact that the fat content in the stream is consistently unvarying. This is the case, for instance, when processing only livers in one stream. In this case the fat content of liver is generally consistent and is known and can be assumed to be substantially constant, thus obviating the need for a measuring device. In block 15930, storage capability is provided to be able to store different grades of beef, having, for instance, different fat content specifications. In block 15932, the beef is packaged according to any one of the methods described herein. Beef for packaging can be sourced from storage vessels in block 15930 or alternatively or additionally can be sourced from continuous blending block 15928. In one aspect of the present invention, individual packages containing ground beef are associated with the information that has been stored on RF tags, throughout its processing. This is appropriately addressed below in connection with the system apparatus description.

Referring again to FIG. 271 and FIG. 292, in one aspect of the invention, all items intended for further processing into grinds, and sourced from a single animal carcass, can be identified during processing as described above with all desired information about the source animal information retained in the carrier chip. After disassembly, all those items sourced from the same carcass can be re-assembled together in one or more parallel streams that are then fed directly by conveyor means such as conveyors 15206, 15208, 15210 and 15218, 15220, 15222 (in FIG. 334) and in such a way so as to provide production of grinds with a selected fat content and wherein the source of grinds was substantially the same identifiable, source animal or a minimized number of source animals. In this way, identification of the grinds animal source can be retained and displayed in any suitable form such as by bar code means on the package. In this way, it should be noted that the assembly of the grind items originating from a single animal can be reassembled together, after disassembly, into a continuous stream and blended via a continuous blender, such as 15280 in FIG. 193 or 15832 in FIG. 664400. Prior to such reassembly and continuous blending, the individual and combined weight of all items sourced from the same animal can be measured by suitable weighing equipment and the weight data recorded in the carrier memory chips. The total weight of the re-assembled animal items can then be calculated and this data, in combination with the known grinds density and composition, can be used to maintain such identification of the grinds as it is transferred through the series of connected conduits and continuous blender such that when the grinds portions are loaded into packaging trays, the identification of the source animal(s) can be transferred to the package in a memory chip attached to the package or barcode printed onto the packaging tray such as on the outer surface of the base of the tray and centrally located there upon or in a label form. In this way, the reassembly of animals can be arranged in a continuous process such that all grind animal source items can be reassembled consecutively and in a continuous stream of reassembled animals. In some instances, it may be desirable to allow some leeway for determining the source of grinds in a package, and when it is determined that the grinds from one animal begin or end, the animal before or the animal after can also be included on the package. It should be noted that more than one animal may be reassembled in a grouping but the identification of those reassembled animals can be recorded and also provided with the packaging tray. It may also be desirous to assemble the grind items derived from several animals for blending together and in this case the identification of all the source animals can be attached to the packaging. Furthermore, it should be noted that the assembly of single or multiple source animal grind items arranged consecutively into a continuous stream with no separation between each reassembled single or group of animals will result in combining a quantity of grind items between the reassembled groupings and therefore, the identification of all animals within each quantity of grinds contained in any particular package can be provided in the bar code or RFID memory chip information attached to each package or group of packages. Additionally, information and data relating to any effects that are observed in association with consumption of any such identified food items consumed at restaurants or that are fed to patients at hospitals and prison inmates can be collected and used in any way that may result in improvement of any associated processes or products.

In yet another aspect of the invention, beef portions from the breaking station 15908 can proceed to vacuum packaging. The method according to the invention can provide a step for vacuum packing a primals or any portion or portions of animal carcass thereof following the breaking step, block 15908. Vacuum packing suitably can take place in block 15910. Vacuum packing, block 15910, includes inserting a primal or any portion thereof into any barrier container, such as a barrier pouch, and then processed and substantially hermetically sealed by a vacuum packaging machine. In this aspect, the pouch is substantially evacuated of all air and then the pouch is sealed to enclose the meat portion therein. In this way, pre rigor mortis carcass quarters can be processed at workstations. Such a method can eliminate the need to refrigerate carcasses immediately after slaughter, and the need to "age" the beef in vacuum packs. It should be noted that in most cases, and as will be required in this general method, primal beef would require aging by storing in a refrigerated warehouse, at a suitable temperature, and held for a period of at least 12 days (and often substantially longer), prior to retail packaging. In this instance, the primals would be vacuum packed (by any suitable vacuum packing system such as may be provided by Cryovac) prior to storage.

In one particular aspect of the present invention, the carcass disassembly process will be carried out with the use of equipment known as the Carni System and according to the disassembly (boning) process described in association therewith. Carni System equipment is available from sources such as Carni Systems (Europe) Ltd., Badminton Road Industrial Estate, Yate, Bristol, UK BS37 5NS. Additionally, details are available from the Carni Systems website at www.carnisystems.com. The Carni System process provides a method by which a carcass or parts thereof can be reduced to several boneless components while still suspended above the ground (on a beef hook and roller suspended from the rail) and not in contact with a bench or work-table. In this way, any undesirable contamination with bacteria or other debris can be minimized during the disassembly process and the meat portions, such as the primal pieces, can then be placed directly onto carriers such as trays, boards or into vessels or containers such as are disclosed herein in association with FIGS. 306–318 and FIGS. 344–346. Irrespective of the type or profile of the carrier, the carrier can be arranged with a suitable programmable and readable computer chip, such as an RF tag, attached thereto and wherein the computer chip can be programmed with information describing all of the details of a meat portion or item, and wherein the information is retained in memory by the RFID chip or any other suitable means, for at least the period of time during which the respective item or meat portion is located on or in the carrier. When the item is transferred from one carrier to another, the information stored in the memory chip attached thereto can be automatically transferred to the memory chip attached to the subsequent receiving carrier. When the item is transferred to the packaging process the information recorded and attached to a carrier can be transferred (automatically) to the package and recorded thereon in a barcode form or any other suitable recording medium. After removal of the item from the carrier, the carrier can be automatically washed and sanitized prior to re-use. Any information relating to items previously carried by any particular carrier and recorded on a chip attached thereto can be erased prior to or when information associated with subsequent uses of the carrier is recorded thereon.

5.1.1. Embodiment

In another aspect of the invention, a method and system is provided for associating data throughout the processing of a perishable good, such as an animal carcass from fabrication through packaging. While the following example references the processing of meat, it should be readily apparent that the present invention may be practiced with other perishable good sources wherein useable information is desired to be associated with a packaged product traced from the product's originating source.

Referring now to FIG. 340, a plan view of a system apparatus in a processing factory is shown. In one instance, the process is arranged to de-bone chilled carcass meat and divide the de-boned meat into selected components for further processing. During the halving and quartering process or any division thereof from the carcass, and any entrails that is discarded as byproduct or waste can likewise be associated with the useable information by placing the divisions or entrails in a container having a RF tag that can readily receive and store the useable information read from a hook assembly RF tag. In this manner, no part of the animal carcass is without being associated to the useable information and every portion associated with the animal can be traced to its origin, that also beneficially includes all the useable information concerning the animal. However, in other instances, it is foreseeable that the lesser parts of an animal carcass need not be associated with the useable information. This will depend on the particular needs desired of the system.

The finished products may be retail packaged ground meat, sliced meats or vacuum packed portions of beef, but in all cases the system apparatus is intended to not only provide an efficient method of processing the meat, but also to provide a means of tracing each piece of meat in such a way that useable information attached to the finished retail products, will enable tracing of this product by indicating the animal from which the subject packaged product was originally harvested.

At the start of the process, a farm animal, such as a cow, is tagged with a read/write device. This tag may be attached to the animal immediately or soon after birth. The tag contains useable information, such as place of origin, lineage, date of birth, types of feed, health records, etc. In general, any information desired to be known or used in connection with or about the animal can be stored in the read/write RF ID tag device. The useable information can be used in a system as herein disclosed to manage the processing of beef in a most efficient manner, such that the best fit for a particular beef part is always identified prior to processing/cutting and then most efficiently used.

In one aspect of the system according to the invention, the system includes a tagging station, chilling station, quartering station, boning station, breaking station, and a grinding and packaging station. In another aspect of the system according to the invention, the system includes the aforementioned stations, however, the system further includes a tempering station, slicing station, grading station, packing station, weigh station, label station, and dispatch station.

A tagging station and chilling station have been described above in connection with FIG. 292. Referring now to FIG. 341, a quartering station designed in accordance with the present invention is shown. Quartering station includes one or more operator workstations and a delivery system that can transfer boards with carcasses to any one of the operator stations. In one aspect, a delivery system can include an automated conveyor system being controlled by a central processing unit (CPU). A CPU in this aspect of the invention uses a suitable set of instructions that can process information from one or more modules for performing analysis related to the best use of the product currently in the process. In this manner, the in process beef may be controlled in real time to realize the most substantial benefits form any one particular beef portion. In one aspect, for example, modules for forecasting, inventory in-stock requirements, and sales can communicate between one another to set the specifications for the beef arriving at the quartering station. While reference will be made to examples of modules suitable to use in the present invention, it is to be appreciated that other modules are readily integrated into the system according to the present invention, and it is to be further appreciated that the module examples herein described are optional in the practice of the present invention.

A forecasting module is capable of making projections, which can be amounts, pricing, etc., that is derived from historical data. A forecasting module uses historical data stored in memory to analyze the buying patterns, such as according to the time of year, month, week and the effects of various prevailing weather conditions. A sales forecasting module can also analyze historical buying patterns from certain regions of the countries and even the world. Once these buying patterns are analyzed, the outputs may be combined with outputs from other modules, and together this information can be used to control the destination of carcass portions once they arrive at the quartering station as well as determining how the beef will be packaged. Such a module can be readily implemented on a computer as will be described herein below.

A sales module includes the amounts of graded beef and beef product that has been committed to a particular resource, such as a beef user. In one aspect, a user of beef can place an order, which includes beef specifications and these specifications can be stored in a memory. As beef enters the quartering process, specifications are read from any suitable device that is adapted to carry the beef specifications pertaining to the particular beef portion. A comparison can now be made between the in process stock and the specifications in the sales module. In this manner, the beef portion can now be programmed to be destined for a particular use and is processed accordingly. Such a module can be readily implemented on a computer as will be described herein below.

An in-stock module keeps track of the beef portions in the process, and all the information that pertains to the beef portions in the process, including any new information on how to process the beef portion. In this manner, it can be determined which beef portions have been already allocated to meet certain aspects or requirements of the sales that are contained with the ordering module. Such a module can be readily implemented on a computer as will be described herein below.

Further modules can be integrated with one or more of the modules herein already described. For example, it is possible to have a module that assigns a destination to a particular beef portion that has been selected but has not yet even reached the quartering station. Such a module can be envisioned to contain information of animals that are arriving at the slaughterhouse, booked into lairage, or even that are still on the farm or in a feed lot. In this manner, only the farm animals that are predicted to be in high demand can be sent to the slaughterhouse, thus, this will utilize resources in the most efficient manner and save the animals that are not in such high demand for a time that they can be sold at the most profitable and/or efficient price. Such a module can be readily implemented on a computer as will be described herein below. In one instance, a vision system according to the invention can use, for example, a digital photograph that can then be stored in a database and attached to the unique identification of all subsequent parts of the disassembled animal.

Continuing now with the description of a quartering station in FIG. 341, carcasses that have been divided into quarters, such as quarters 16000 and 16002 are transferred along and suspended from meat rails 16004 and 16006. The carcass quarters 16000 and 16002 are suspended on hooks 16010 and 16012 with rollers and each roller/hook assembly includes a read/write RF tag rigidly affixed thereto. It should be appreciated that a hook assembly is exemplary of one embodiment of a means to carry carcass and carcass divisions from one location to the next. It can be envisioned that means other than hooks can be used to carry or otherwise transfer carcasses. The RF tag attached to the roller and hook assembly 16010 and 16012 from which each quarter 16000 and 16002 is suspended includes useable information that describes the origin and type of carcass quarter suspended from the hook. Furthermore, the useable information contains a grading assignment that will determine the destination of the particular cuts harvested from the animal carcass. This information can be traced from the RF tag that had been attached to the animal at the tagging station and which follows the animal carcass and any divisions derived therefrom. A continuous supply of carcass quarters 16000 is transferred along rail 16004 in the direction of arrow 16016. Skilled operators such as 16018, 16020, 16022 and 16024 are conveniently located between rails 16004 and 16006 and workstations, such as 16028 and 16030. Workstations such as 1028 include a computer terminal (not shown) having a device capable of receiving inputs, such as a keyboard or mouse or other similar device for allowing human operators to interface with the computer. Each skilled operator is identified by an RF tag which has been programmed with information that indicates the skill level of each particular operator. Before each operator can commence work at any workstation, he must firstly identify himself and his particular skill level by sliding his RF identification tag through or adjacent to a corresponding reader which will allow him to commence work at the respective workstation, and will only allow the operator to work according to his skill level as will be described below. Furthermore, prior to entering the factory floor, operators may be dressed according to regulations and follow procedures to wash their hands. This can be monitored by attached RF tags to each wrist and wherein all operators are only allowed entry to the production room/area after inserting their hands into suitably sized conduits in which water and approved suitable sanitizers are sprayed onto the hands. RF tag readers can be positioned inside the conduits and in such a manner that the RF tags attached to each wrist must be held close to the RF tag readers for sufficient time to allow thorough sanitizing of each hand before entry is allowed into the factory area and before any work station will allow any particular operator to commence work. In one aspect, the rails 16004 and 16006 comprise a part of a carcass boning system such as the Carni system. Operators located between the rails and workstations progressively separate the bones and beef that comprises the carcass, in such a manner that the bones and beef are substantially separated into two items, such that the bones remain suspended from the RF tagged hook and the boneless portion of each quarter is transferred to an adjacent hook and roller, which also has an RF tag attached thereto. The useable information from the “first” tag which carries the bones is transferred to the tag attached to the hook from which the boneless quarter now suspends, and is done automatically during the process of separating the bone from the suspended quarter. This may be accomplished by passing the first RF tag that originally carried the quarter including the bones in adjacent proximity to an RF tag reader and the read information (plus additional information as required) is then transferred to an RF tag on the hook assembly that now carries the de-boned quarter. The suspended bones 16010 and 16012 are then transferred away from the workstation, along rail 16032 and rail 16032 in the direction shown by arrows 16032 and 16034, respectively. The bones may then be carried away and discarded.

In one aspect of the invention, a determination is made to assign a grade to the animal carcass and its portions into one or a plurality of grades. Such grading may be carried out at a stage after the animal is killed up to any stage immediately preceding breaking. Grading may suitably be done by visual methods that include a video-imaging device. Such video imaging equipment may comprise the latest available devices that has a capability of recording a digitalized photograph of, for example, a complete side (half) of a beef carcass grading the carcass and evaluating the most profitable strategy for processing the carcass according to historical data available from earlier such photographs and then recording and storing the new digital data in a computer memory. This digitalized data can then be used to automatically calculate a “best fit” for subsequent processing of the carcass into primals and retail packages, the actual amount of fat, lean beef and bone, etc., with the corresponding dimensions of any part of the photographed carcass. Once a carcass is assigned to a grade, processing of the carcass portions and the ultimate utilization of the portions is made in accordance with the grade determination. A grading system according to the invention can be any classification that is based on assigning an order, preference, or ranking to a perishable product for a particular purpose. For instance, a beef carcass or any portion thereof may be assigned to a grading scale that is primarily, but not exclusively, based on fat content, or any other factor determinant of quality. Suitably, other factors that may be used in the grading determination may include the sex of the animal, its age, lineage, etc. The carcass portions, such as primals, are then processed according to a pre-determined set of instructions based on the "best" fit of the grade to the current demands for particular products. "Best fit" methods of processing animal portions, without limitation include any computer executable set of instructions that can be carried out by any computer, with a central processing unit and a memory, said set of, instructions, in one instance, capable of maximizing profitability of the animal portions based on the useable information tagged to the animal in combination with other information relating to market forecast predictions, present in-stock inventory, sales orders, etc.

5.1.2. Embodiment

Referring now to FIG. 342, a three dimensional view of a workstation is shown in schematic detail. Workstations are suitably located along the rails used to convey carrying means, such as the carrier plates or hook assemblies. In one particular embodiment, the workstation has two conveying track assemblies 16200 and 16202 arranged in spaced disposition to one another. In one instance, the first 16200 and the second 16202 track assembly are located one above the other. More than two tracks, such as a vertically arranged three track system may be provided however, in FIG. 342 two tracks are shown, wherein each track assembly includes a first and a second track arranged in spaced disposition to one another so as to provide a means for conveying carrier plates on sides thereof described below. It should be readily apparent that track assemblies are one embodiment of a means to convey the carrying means, such as the carrier plates, to carry the carcass divisions to selected and different operator workstations.

In FIG. 342, tracks 16204 and 16206 form the first track assembly 16200 and are located directly above second track assembly 16202 having tracks 16207 and 16208. Each track assembly includes a pair of horizontally disposed parallel tracks that carry carrier plates 16210 and 16212 there along. The carrier plates 16210 and 16212 are held to the tracks by any suitable means such as gravity and can be propelled by drive means in the conveyors (not shown). Each carrier plate is fitted with an RF tag capable of having information written to it or read therefrom.

In one embodiment, a workstation includes an operator station having a computer system with a touch screen monitor and/or terminal, an input device, such as an RF tag reader, keyboard, mouse, touchscreen, light pen or microphone capable of receiving input signals sent by a human operator. The computer system, generally denoted by reference numeral 16214 may form part of a larger communication network with one or more terminals and server computers that contain computer executable instructions for performing any number of operations that determine the processing of perishable products. Such communication systems are known as intranets, furthermore, the intranet may form a part of a larger information system that is connected via a communications system, such as the Internet. A computer system can include a screen, speaker, printer or other means of conveying instructions desired to be carried out to an operator. In one embodiment, an operator stands in a rectangular area shown by area 16216 in front of computer system 16214. A computer system 16214 also includes an RF tag reader or any other identification means that enables the operator to be identified to the computer system. Once an operator is identified to the system, the system will use the operator information, such as the skill level of the operator, or a specialty in which the operator is especially trained. The system can then adjust or direct the delivery of certain carrier plates containing product that is suited for the operator's skill level or specialty. In one embodiment, a carrier plate elevating assembly is located within each workstation which enables the transfer of carrier plates such as 16218 in the direction shown by arrow 16220, by elevating means 16222. Weighing scales and RF tag readers/writers are conveniently located along selected tracks and in such positions that any carrier plate transferred along any portion of any track assembly, such as 16200 and 16202 can be identified and automatically transferred to any workstation according to the product that is carried on the carrier plate 16224, and the corresponding skill level of any particular operator at any workstation. RF tag readers such as 16226, 16228, 16230, continually monitor carrier plates as they are transferred directly adjacent thereto, such that at all times all product held and carried by the tracks, is known and can be processed by a central processing unit (CPU).

Referring to FIG. 343, a cross sectional view across a vertical plane shows the upper track assembly 16300 and the lower track assembly 16302, with carrier plate 16304, located in the upper track assembly 16300 and carrier plate 16306 in the lower track assembly 16302. RF tag readers are attached to the tracks in such a manner to allow identification of carrier plate tags from above such as 16308 in the upper track, and RF tag reader 16310 below the carrier plate in the upper track. The lower track is shown fitted with an upper RF tag reader 16312 and a lower RF tag reader 16314.

Referring now to FIGS. 344, and 345, a top plan view of a carrier plate and a cross section there through according to the invention is shown in detail. According to the invention, a carrier plate, is a means to carry animal carcasses and any division thereof along a conveying means. The carrier plate includes a device capable of storing information. In FIG. 344, a parallel pair of tracks 16400 and 16402 is shown with carrier plate 16404 held there upon. In one embodiment of a carrier plate, the carrier plate 16404 is substantially square in plan dimensions and is divided into sections. However, other configurations are possible depending on the particular design or needs of the system. The particular square shape of the carrier plate 16404 being merely exemplary of one embodiment of the invention. The carrier plate 16404 can be manufactured from a suitable plastics material such as Ultra High Molecular Weight linear low density polyethylene (commonly referred to as UHMW), a suitable material that is readily available from several sources such as Cadillac Plastics. In one particular instance, the carrier plate 16404 may be suitably sized with a length and width of 3 feet and a thickness of 1.5 inches. However, other dimensions are within the scope of the present invention, the particular dimension being merely exemplary of one embodiment of the invention. The carrier plate 16404 can be machined with cavities therein that will allow insertion of profiled molds 16404 with flange 16408, and mold 16410 with flange 16412 and wherein the molds will also have readable and writable RFID tags embedded therein. A rectangular area 16414 shown by dotted lines is conveniently arranged to allow positioning therein of a portion of boneless meat. A suitably skilled operator can trim such piece of boneless meat according to instructions provided on computer screen 16214 shown in FIG. 342, and divide the piece of boneless meat into portions, which can then be placed in molds 16406 or 16410. Alternatively, a trimmed primal may be placed in such a mold 16406 or 16410 with all other trimmed pieces of meat being placed in the other available mold 16406 or 16410. Each mold 16418 or 16410 is fitted with an RF tag (not shown). FIG. 344 shows RF tag readers 0448 and 06148 being positioned at a suitable location capable of reading RF tags on molds 16406 or 16410, when carrier plate passes adjacent therethrough on track assembly.

In another aspect of the present invention, molds as shown in FIGS. 344–346, and FIGS. 307–318 and described herein above, make suitable molds to be included within the carrier plates.

Referring now to FIG. 345, a cross sectional view along a vertically disposed plane "0—0", in FIG. 344, is shown. Conveyor tracks 16500 and 16502 retain carrier plate 16504 with mold 16506 located therein. Mold 16506 is provided with a profiled cavity 16508, and flange 16510 with RF tag 16512 molded and embedded therein. Carrier plate 16504 is fitted with RF tag 16514 molded therein also. RF tag reader 16516 is located by attachment to a bracket conveniently fixed to the outer frame of track 16502 and in such a manner that information can be transferred between RF tags such as 16512 and RF tag reader 16516, as the carrier plate 16504 passes beneath and adjacent thereto. Similarly RF tag reader 16518 is conveniently located in close proximity to the under surface of carrier plate 16504 and in such a manner that will allow transfer of data to and from RF tag 16514. Such data may also be transferred to and from RF tags embedded in molds as described herein.

Referring again to FIG. 341, it can now be seen that workstations as described in association with FIG. 342, are arranged and connected to a common conveyor assembly 16036. A total of thirteen workstations are shown, and some are numbered 16038, 16040, 16042, 16044, 16030 and 16028. However, any number of workstations can be used, the particular number shown being exemplary of one embodiment. Workstations are suitably arranged to be serviced by conveyors and in such a manner that allows any carrier plate such as 16212 shown in FIG. 342, to be transferred to any workstation according to, for example, the product carried thereon and the skill level of any operator such as shown by numbers 16020, 16018, 16050, 16052, 16054, 16024 and 16022. The identification of each portion of meat derived from quarters delivered along rails 16006 and 16004, is retained by automatic transfer of data between the associated tags that are attached to rollers such as shown in FIG. 292 by numbers 20196 and 20923. Automatic transfer of information is accomplished for example by passing one RF tag in adjacent proximity to a RF tag reader and then transferring the read information via a tag writer to another RF tag such that information can be read and written onto the RF tag desired to contain the information. However, other methods of transferring information between two or more components in the system are also within the scope of the present invention, RF tags being exemplary of one embodiment of the invention. When a carrier plate containing a meat primal arrives at an operator workstation, a RF reader can read information, such as instructions on how to trim or cut or otherwise process the particular product that is being carried on the carrier plate. The instructions can be displayed on a terminal so the operator is provided with the instructions on how to best trim the primal to achieve the best fit, i.e., what is the best use for that primal as determined by a specific set of instructions that are carried out by a computer. For example, when one cut of meat is commanding a higher price rather than any other, then the instructions to the operator can be for the operator to provide for more of the cut of the higher valued meat. It should be apparent that the information being used to determine the best fit of any particular portion can change daily or from hour to hour, furthermore fluctuations in market prices may be almost instantaneous. However, in the practice of the present invention, continual monitoring of the transfer of any portion of meat and the capability to alter its destination at any given moment, the maximum benefit from a cut of meat is realized. Furthermore, such determinations may take into account other factors besides market prices, such as inventory, projected customer orders, current and predicted supply, availability of operators to perform the work, etc. In general, any useable information that can be used by a central processing unit in any set of instructions to realize the maximum benefit can be transferred from RF tag to RF tag or from workstation to workstation and be communicated to a central processing module. Such information is also communicated between the central processing unit and peripheral equipment, such as, but not limited to the workstations, boning stations, packaging stations, grinding and pumping, etc. Before, during or after the operator has performed the required tasks as pertains to any one particular product on a carrier plate, the operator can confirm that the instructions have been carried out by him by signaling to the computer by, using a keyboard, mouse, touch screen, light pen, microphone or other device capable of providing a means for interfacing with the computer.

Referring still to FIG. 341, in one aspect of the invention, after each portion of meat positioned on any given carrier tray has been processed by any qualified, skilled operator, to the required specifications, the carrier plates are transferred to station 16056, where they are redirected toward the grinding and blending equipment generally denoted by the reference numeral 16058 shown on the left hand side of the FIG. 341, or alternatively, in another aspect of the invention, the carrier plates deliver the meat to the tempering, slicing and packaging area generally denoted by the reference numeral 16060 shown on the right side of FIG. 341. In yet another embodiment of the invention, the primal or any portion thereof is transferred to a vacuum packaging section where the portion is inserted into a barrier plastic pouch, such as may be supplied by Sealed Air Corporation (Cryovac division), and then processed in a vacuum packaging machine (such as an Old Rivers carousel type machine supplied by Cryovac) wherein the pouch with meat portion therein is evacuated to substantially remove air and then the pouch is heat sealed to fully enclose the meat portion therein to produce a typical vacuum pack. However, other embodiments of the invention can package the beef into pouches supplied by the Scholle Company of Chicago, as described above. The vacuum packed portion of meat, along with a plurality of such other similar packages can then be stored in a suitable refrigerated store room for a suitable period of time, such as 14 days. The vacuum packed portion of meat can be removed from storage when desired and then further processed by slicing and retail packaging or shipped to any destination. In all cases RF tags, with associated information stored therein, can be attached to the vacuum packages and the information automatically transferred to retail packages of sliced meat derived from the formerly vacuum packaged meat portion. It should be readily apparent that FIG. 341 merely illustrates one embodiment of a system apparatus for practicing the present invention and alternative configurations are also within the scope of the present invention.

In one aspect of the invention, the carrier plates may be directed firstly to the grinding and blending area, for automatic removal of trim, followed by transfer to the slicing and packaging area, but in all cases, after the carrier plates have been unloaded and all processed, boneless meat has been removed there from, the empty carrier plates and molds are automatically transferred for washing and sanitizing, at either station denoted by 16062 or 16064. Removal of trim for subsequent grinding may be achieved with a vacuum conduit system wherein the carrier trays are transferred to a station wherein a vacuum conduit can be located above the carrier and positioned in such a manner that any part or all of the items on the carrier may be selectively or totally removed and transferred through a vacuum conduit that is connected directly to a suitable silo. Trim or other items may be stored in the silo until required for further processing. A suitable pumping system may be attached to the silo(s) so that when trim is required it can be transferred directly and according to required quantities, into the grinding and blending equipment herein described. After cleaning and sanitizing the carrier plates at stations 16062 or 16064, the plates and molds are returned to the central conveyor system 16068, for further use. Any useable information written on either the molds or the carrier plates can be erased (wiped) in preparation for use in recording information associated with the next meat portion that is placed thereon. In other embodiments, the carrier plates with molds are used to carry the beef portions to the tempering section where the now molded beef portions are transferred through a freezing tunnel. The mold with meat therein is retained in the freezing tunnel for sufficient time to freeze only an outer layer of the meat portion and to such an extent that when the portion is removed from the mold it will retain a shape similar to the internal profile of the mold. In this way the portion of meat can be sliced while retaining a regular shape, thereby enabling automatic handling while being sliced into slices with a selected thickness chosen according to the overall size of the portion and in such a way that does not require the portion to be trimmed. In this way the maximum value can be derived from the meat portion since the trim that would otherwise be removed from the portion has a much lower market value than the sliced meat.

Referring now to the equipment shown on the right hand side of the workstation area which is generally denoted by reference numeral 16060, two packaging systems are shown in parallel, the operation of which will be described below after the following description of one embodiment of a mold used to practice the invention.

Referring now to FIG. 346, one embodiment of mold 16600 with flange 16602 and RF tag 16604 embedded within flange is shown. RF tag is embedded at any suitable location which is conveniently orientated to facilitate reading or writing of information from or thereon. Mold 16600 is shown containing primal 16606 with fat layer 16600 and having a mold matching section 16608 which suitably fits within the interior sides of vertical walls of mold and is sealed at the periphery of where mold 16600 meets with matching section 16608. A detail of one embodiment of seal section 16610 is shown in FIG. 347. Mold 16600 is filled with a suitably sized primal 16606, at any workstation shown in FIG. 341, after transfer along conveyor 16036 to station 16056, the mold with primal 16606 is fitted with upper mold section 16608 and transferred into vacuum chamber apparatus 16018 or 16070 shown in FIG. 341, wherein substantially all air is evacuated therefrom.

Referring now to FIG. 347, an enlarged cross sectional view of section 16610, in FIG. 346, is shown. Wall 16700 of a mold is shown in intimate contact with any suitable seal material 16702, which is in turn attached to upper mold section 16704. It can be appreciated that when a vacuum is applied to the assembled mold at a vacuum station, with primal held captive between the upper and lower sections of the mold, substantially all air can be evacuated. A means to press the two mold sections together, within the vacuum chamber, is provided in vacuum chambers 16068 and 16070 of FIG. 341, such that when the assembled primal with mold is removed from the vacuum chamber, substantially no air remains within the mold, and the two halves are held together by atmospheric pressure, and substantially sealed there from by seal 16702, shown in FIG. 347. While one embodiment of a suitable method for preparing a cut of meat such as a primal has been described for tempering and slicing it should be apparent that other means for preparing the primal for the tempering and slicing steps in the process are available. In this aspect of the invention, a mold provides numerous advantages such as being able to control portion size and/or selectively alter dimensions of the portion by, for example, increasing the length and correspondingly decreasing another dimension of the initial portion. In this manner, trays can be used more effectively when sized to the mold and vice versa Referring now to FIG. 341, from vacuum chambers 16068 and 16070, the assembled mold can then be transferred directly into tempering and freezing apparatus 16072 and 16074 by indexing conveyors. In another embodiment, the assembled mold with primal can be transferred along conveyor 16076 into an ultra high pressure apparatus 16078 (such apparatus is available from Flow International, Kent, Wash., USA). The assembled mold with primal can then be pressurized up to, for example, approximately 30,000 psi, and retained for a brief period of time and then released and transferred along conveyor 16018 and into the tempering freezer 16074. Such high pressure treatment can enable tenderizing of boneless beef by exposure to high pressure for a short period of time.

Referring again to FIG. 341, slicing apparatus is shown at 16080 and 16082, following the tempering section. As is known in the art, tempering induces a shallow frozen layer on the exterior of any meat portion to facilitate retention of profile during slicing of the meat portion, such as primals. In some instances, tempering may not be required. Embodiments that do not include a tempering section, however, are also within the scope of the present invention. In one aspect of the invention, before slicing the primal, it is often convenient to offload primals from molds. RF scanners are also distributed in proximity of the grading conveyors, or at the sections having vacuum chambers 16068 and 16070, tempering freezers 16072, 16074, high pressure treatment 16078, and slicing devices 16080 and 16082 and along any length of conveyor connecting one or more of the above so as to facilitate the tracing of the primal portions contained in molds. Any useable information carried on RF tags on molds or carrier plates to this point can be read by scanners at the slicing device, in this manner, information can continue to be associated with the particular beef portion. Up to this point, tracking of beef portions has been accomplished, by in some instances, using a tag on a container which includes the beef portion. This has made for relatively simple tracking of the beef portion by the use of scanners appropriately placed to be able to read the tag on the container as container is moved or indexed on a conveyor, rail, tracks and the like. However, at some point, the beef portion is expected to be removed from the container, for example for slicing or packaging. While the following description describes a process that contemplates removal of beef portions from re-useable containers, in some other instances, it can be envisioned to use single use containers that are loaded with a beef portion and this container can be the container that is packaged with the beef portion therein.

In one aspect of the invention, an indexing conveyor may be used to facilitate the tracking of beef portions with information. As each primal is sequentially offloaded before or after slicing devices 16080 and 16082, the information is read from, for example, the carrier plates/trays and the off-loaded beef portion, now without a container that has an attached RF tag thereto can still be tracked to the read information, for example with the used of some indexing means. As each beef portion is cut, means are provided that can continue to track the beef slice to the information. In one embodiment, a visual scanning means, such as video cameras, can be employed to continue the tracing of the meat products to the original animal. In another embodiment, indexing means may be employed to count and track each beef slice to the information that was written on the RF tag on the mold or carrier plate. In this instance, indexing refers to an ability to sequentially process or organize by individual portions. For example, one embodiment of indexing could be the use of a horizontal conveyor that advances intermittently, by steps and halts periodically to load or offload a beef portion. Alternatively, the indexing conveyor would run continuously and each slice of meat would be tracked and rapidly transferred off the conveyor and into an adjacent bin, by an arm pivoted to one side of the conveyor and allowing a rapid action in a horizontally disposed plane across and in close proximity to the upper surface of the conveyor. The arm can be arranged to remove a single slice per stroke according to a weight that has been measured immediately prior to transfer onto the conveyor. In this manner, it is capable of tracking the information originating in the tagging section. Other embodiments of the invention may use other means for tracking a beef portion and associating useable information to it at the slicing station. For example, in one embodiment, the slicing apparatus can read the RF tag embedded within any mold or carrier plate. Such information can then be stored in a memory device, as the beef portion is reduced to smaller portions, the smaller portions may be sequentially loaded onto the grading conveyors 16016 and 16036 in a grouped fashion. Other beef portions are reduced to smaller portions by slicing devices 16080 and 16082, and likewise sequentially loaded onto grading conveyors 16016 and 16036 in a grouped fashion. In this instance, "Grouped fashion" means that the individual portions from an individual primal are spaced at a predetermined distance from one another. However, the distance separating the groups can be different so as to distinguish one group of portions originating from one primal from another group originating from a second primal. In this manner, any visual device, such as a video camera can keep track of the slices from any one primal or beef portion contained in a mold or on a carrier plate and the useable information that was read from the mold or the carrier plate can be associated with each group and each slice in the group. Any desired useable information can then be printed or otherwise coded onto a finished retail package.

However, in another embodiment, the individual packaging trays contain a unique identifying mark, such as a 2-D bar code or other suitable identifying mark. In one aspect, the 2-D bar code can be printed or otherwise applied on an exterior central portion of the tray base at the point of tray production. The bar code can then be read while still in the production web, and verified to ensure that the unique identification mark is readable and identifies the empty tray according to intention. If any mark does not read correctly, it can be so marked by any suitable means such as an ink jet marking system and then discarded at a later stage and prior to sue. In this manner, trays of all dimensions can be read by a single scanner centrally located. The unique identifying mark can be applied by ink-jet means, however, any suitable method of applying the mark can be used in the practice of the present invention. In one instance, after the mark has been applied on the tray, the mark can be thereafter immediately scanned and compared to what was intended to be printed. This accomplishes, at least, two purposes. First, the reliability of the mark in being capable of being read is tested, and second any trays with defective marks cannot be discarded prior to being used in the practice of the invention. Further, the marks can be stored in a computer memory bank as a way of inventory. The trays are now ready to be sent to a packaging system. Prior to loading, or anytime during or after loading the trays, the unique identifying mark can be scanned and stored in a computer memory bank. In this manner, through the use of computers, it is possible to keep track of the individual trays in the packaging system and to keep track of the beef information that is read from molds and carrier plates and to associate certain or all of the information to each individual tray so that a computer will have stored therein in memory an array of individual trays with certain of the information that pertains to the beef that is contained in the tray. In this manner, the information can be communicated to one or more users, such as distributors and supermarkets, via a communication system, such as the Internet. Such users can use the information in any desired manner. One manner of use for this information is in the real-time control for the production of beef and beef products and the real-time pricing of beef and beef products at the point of sale, such as supermarkets. Thus, contrary to conventional practices, a controlled atmosphere package can be priced immediately prior to placement on the supermarket store shelves. In one instance, the unique identifying marks on trays can be repeated, for instance, on a three month basis, or any suitable period that is deemed to have exhausted all packages from store shelves. In this manner, it is not absolutely essential that every identifying mark is truly unique, in the absolute sense. As intended herein, unique only means sufficiently unique to distinguish from one batch of trays, which may be exhausted in a sufficiently long period of time, such as three months. Since trays can be built to many dimensions, but most if not all trays contain a central lower base, for the sake of efficiency, all trays can have the unique identifying mark printed or otherwise attached on the lower exterior surface of the base at a central location. In this manner, regardless of width or length of tray, a centrally disposed scanner will be able to read the unique identifying mark if placed in a central location of the tray base. An example of such tray is depicted in FIG. 42.

Referring again to FIG. 341, grading conveyors 16016 and 16036 can grade according to any desirable characteristic of the beef portions. In one embodiment, weighing equipment is located at the entry ends to each grading conveyors 16016 and 16036 and positioned so as to enable the weighing of each slice of beef that passes over weigh scale. Grading conveyors 16016 and 16036 can individually grade each beef portion coming from slicing devices 16080 and 16082 and deposit such beef portion into an appropriate container or tray. This is desirable for instance, if finished packages are desired to contain a specified net weight. For example, if the net weight desired in a finished package is one pound (16 ounces), then grading conveyors 16016 and 16036 can identify four beef portions in any weight combination to equal 16 ounces. Alternatively, it may be desirable to only have two portions, in which case, one combination of portions, is to have each weigh approximately 8 ounces. However, it is possible according to the invention to have one portion weigh more than the other, and the grading conveyor can match the right beef portions to one another to fill the requirements. Other specifications can also be used, and these instructions can be transferred to the grading conveyors' control system to arrive at the required specifications. For instance, some specifications may take into consideration, any grading that had been assigned to the beef at one point in the tagging, chilling, quartering, boning, or breaking stations.

In one aspect of the invention, it is apparent that under some circumstances to meet specifications that not all the beef portions being packaged together may come from the same animal, however, it is still desirable to be able to trace the origin of all the beef contained within a single package. This is readily accommodated in the present invention. As mentioned above, through the use of computers, handling large amounts of information becomes a readily simple task, once the proper instructions are provided. In one instance, when trays or any other container for packaging includes RF tags embedded therein, it is capable of storing information pertaining to one or more animals. In another embodiment, when the trays contain unique identifying marks, again it is a readily simple task for a computer to store information from more than one animal and associate such information with a single packaging tray.

Referring again to FIG. 341, grading conveyors 16084 and 16086 are in parallel and close proximity to conveyors 16088 and 16090 respectively. Packaging machines 16092 and 16094 are conveniently located to allow direct transfer of graded and trayed retail sliced meat, for retail packaging thereon. Finished product is now transferred in the direction shown by arrows 16096 and 16098.

In another aspect of the invention, from the breaking section, beef may be destined for production into ground beef. Referring now to the grinding and blending aspect of the invention, generally denoted by reference numeral 16058 in FIG. 341. Two streams of boneless meat coming from the breaking section in the direction of arrow 16100 are provided. Beef streams will flow in the direction shown by arrow 16102, and be transferred directly into pre-grinders 16104 and 16106, numerous embodiments of which are herein provided. It is at this point that the beef may be subject to a substantial oxygen deficient environment up to and including packaging. In one aspect of the invention, any grinding apparatus herein disclose is suitable to use in the practice of the present invention. However, other grinders not herein described are within the scope of the invention, the grinders herein being merely exemplary of several embodiments. After grinding, each stream is then transferred directly into enclosed pre-blender pumps 16108 and 16110. Fat measuring devices 16112 and 16114 measure the fat content in each stream, and adjust the velocity of the streams by adjusting the pumps 16110 and 16112 according to the measured fat content, so as to provide a combined stream in continuous mixer/blender 16116. Blender 16116 produces a more uniform beef stream with a fat content that is in proportion of the two meat streams. It is apparent that in order to control the production of a blended beef stream of particular fat content, it is desirable to have a high fat content stream and a low fat content stream coming into blenders 16106 and 16104. From blender 16116, blended beef can be transferred into enclosed hoppers 16116, 16120 and 16122, for temporary storage therein, or alternatively may be continuously directed through conduits 16124 or 16126, for subsequent processing into patties, meat loaf or ground meat portions, or any device herein described for the treatment of beef.

From vessels 16118, 16120 and 16122, ground beef can be provided to pumps 16128, 16130 and 16132. Pumps 16128, 16130 and 16132 may likewise direct ground beef to any packaging apparatus or any device herein described for the treatment of beef.

As in other aspects of the invention, the beef portions being processed in the equipment generally denoted by reference numeral 16058, can be associated with certain of the information relating to its originating animal carcass or any other useable information that has been stored onto a read/write device on a mold or carrier plate in any previous processing section. It is apparent that under some circumstances, the ground beef stored, for example in vessels 16118, 16120, 16122 will be harvested from different animals. It is also apparent that under some circumstances the beef will leave its container that has an RF tag attached, and so a method of tracking the ground beef so that it can be associated to certain of the information will have to be devised. Therefore, in one aspect of the invention, a method of tracking information that pertains to ground beef can be associated with the tray it is packaged in.

In one aspect, the invention can associate any ground meat to its originating animal carcass or any division therefrom. In any enclosed conduit, having one or more entries and one or more exits, weigh stations can be provided at the entry and exit points. It is not required that an actual weigh scale be provided, but only that the weight of a certain beef quantity is known entering and/or exiting the enclosed conduit. In its most simple form, an enclosed conduit has one entry and one exit and a first and second weigh station. Thus, it becomes relatively easy to know the amount going in, and by keeping track of the amount going out, one can be relatively certain when a specific amount that enters the conduit will be the amount that leaves the conduit. For example, a quantity of 10 pounds of beef enter a conduit from a certain carcass. Next, 10 pounds of beef enter the conduit from a different animal. At the exit of the conduit, when 10 pounds of beef are counted, one can be relatively certain that the next ten pounds will be from the second carcass. When several entries are possible to the conduit, as is illustrated in FIG. 341, each entry has a weigh station 16112 and 16114. It should be apparent that weigh stations 16112 and 16114 may be considered entry points for conduit including blender 16116, but it should be realized that weigh stations 16112 and 16114 can be exit weigh stations for a conduit including grinders 16104 and 16106 and blenders 16110 and 16112. Thus, by linking conduits with weigh stations at entry and exits points at conduits, the beef processed therein can be tracked, conduit by conduit, in one instance.

In circumstances where conduits have multiple entry points where the flowrate of each stream may vary, each entry weigh station tracks beef from one carcass much as would single entry conduits. The exit weigh station also tracks the amount of beef that passes therethrough. In one aspect, computers, programmed with the proper instructions can accurately predict the start and stop of beef from one carcass at two entry stations and keep track of the beef leaving the exit station. This applies to conduits having multiple exit weigh stations, but the instructions are more complicated. In this manner, ground beef can be tracked, from the point it leaves the quartering station and through the grinding, and blending sections and to the packaging section by dividing the conduit into conduit sections, wherein each conduit section includes an entry and an exit weigh station.

Thus, in one aspect, assuming that little to no mass is lost while processing through equipment 16016 and 16014 and downstream equipment, the first weighed amount to enter equipment 16016 and 16014 will be the first amount that also leaves each equipment respectively as measured by equipment 16112 and 16114. Thus, for example, assuming that one pound of primal is first measured entering 16016, then, when one pound has exited equipment 16110 at 16114, this amount is assumed to come from the primal that was first to enter the equipment, and the same information that was associated with the first pound of beef entering 16106 will be the first pound of ground beef exiting from equipment 16104. At the same time, other primals may be weighed but in this instance are loaded in equipment 16104. The information relating to these primals can also be associated with the amounts leaving the equipment 16108 in the order that they were loaded.

Equipment 16116 can have a weighing device at the exit. The ground meat leaving equipment 16116 can be associated to information by keeping track of the amount of ground meat coming from 16050 and the amount of meat coming from 16114. Now, assuming, in one instance, that equipment 16106 operates at twice the speed as 16104, and that primals each weigh one pound, for ease of simplicity, then, the first three pounds leaving equipment 16116 will be associated with information coming from the two primals that went into equipment 16106 (because it operates at twice the speed) and the one primal that went into 16104. Any subsequent primals can likewise be accounted for and the information from primals, which originates from the start of the process can be associated to ground meat leaving equipment 16116. Furthermore, this first in and first out concept of tracking information to ground meat may also be applied to vessels 16118, 16120 and 16122 and to packaging. To ensure an adequate level of confidence that any ground beef is associated to the correct animal or animals from which it came, any amount of additional information can be associated from primals before or after to compensate for any errors in measurement. In this aspect of the invention, it is convenient to utilize a computer system, with a central processing unit and a memory to facilitate the tracking of ground beef through grinding and blending equipment as herein described. Thus, a method and apparatus are provided to associate packaged goods, such as ground meat, to its animal source.

5.1.3. Embodiment

In another aspect, however, trays for placing beef portions may likewise include a read/write device, such as an RF tag embedded therein so that any information can be stored therein. For example, in one embodiment and with reference to FIG. 63, a suitable RF tag may be positioned in cavity at 1628 between the inner tray wall 1630 and the outer flap 1641 and held captive within the cavity. Such RF tags as could be suitable for use with packaging trays can be provided with a pressure sensitive adhesive to allow bonding to an outer surface of a tray such as onto wall 102 as shown in FIG. 4, however, with tray shown in FIG. 63, such pressure sensitive adhesive is not necessary and therefore the RF tag can be manufactured for a lower cost. In this manner, when finished packages leave the packaging area, the useable information is continued to be associated with and tracked to any one or several animals from any one of the prior processing stations, such as tagging, quartering, boning, breaking, etc. Trays with embedded read/write devices, such as RF and RF ID tags can be incorporated into the practice of the present invention.

5.2. Real Time Control for Production and Pricing

The present invention provides an efficient method of processing fresh red meat products at the point of animal slaughter for subsequent case ready packaging and delivery to the consumer via a typical supermarket or retail sale outlet and/or distribution center. The consumer may be located thousands of miles away from the point of slaughter and packaging, which often results in distribution and delivery that can require a period of time exceeding 12 days. Thus, it is desirable to produce and package according to customer specifications and destination in a manner that will provide delivery of a safe product that meets consumer needs. It is also desirable to be able to price the items at the time they are placed on the shelves, because the latest information is desired to be factored into the price, also because supermarkets can have different prices for the same goods, therefore, it is one aspect of the present invention not to fix prices until the item is scanned, all the information is read that is associated with the packaged item and verified through multiple sources, such as the distribution center and even the processing facility. Then, with a pricing module and shelf-life module, the appropriate information can be printed on a label and placed on the item, just before the item goes on the shelf.

Perishable food products produced, in part or otherwise, in the manner described herein may be placed in any suitable tray and over wrapped with any suitable web of material such as pPVC (or PE) and then placed in a master container that may be manufactured from a substantially gas barrier material or partial gas barrier material to provide finished packages. Following this, finished packages may be stored in any suitable storage room maintained at any suitable temperature until required for sale, at which time the finished packages may be removed, labeled and/or marked by any suitable means such as by an inkjet printer and then displayed for sale in a retail outlet such as a supermarket.

Beef and beef products vary in cut, weight, fat content, etc., it is desirable to control the production of beef and beef products in real time according to ordered specifications to efficiently utilize and allocate resources so as to minimize loss and/or waste.

One aspect of the present invention therefore provides a system for controlling the amount and type of beef products in "real time." Without limitation, real time refers to the ability of the present invention to continually update the processing and/or packaging of perishable products to respond to market forces as soon as is practical or in increments that have heretofore not been achievable. In another aspect, real time refers to setting the processing and/or packaging strategies, specifications and schemes after only having received specifications via a communication network, where, the specifications directly affect the processing and packaging. In another aspect, real time refers to process control of packaging using order specifications as the controlling variable. In another aspect, real time refers to the processing or packaging according to specifications only after a trigger has been set that there is a demand for the products. The trigger can be an irrevocable transaction where the buyer is bound to go forward with the transaction.

Meat processing equipment as herein disclosed can be controlled via a communication system linked to the Internet. In this manner, beef processing equipment can be used most effectively and efficiently to produce the beef and beef products that command the highest price, are in greater demand, provide for the efficient allocation of resources and the efficient utilization of raw materials.

As will be better understood from the following description, the present invention is embodied at least in part via the Internet (or a dedicated modem telephone line connection). As is well known by those skilled in the art, the term "Internet" refers to the collection of networks and routers that use the transmission control protocol/Internet protocol ("TCP/IP") or next generation protocols to communicate with one another. A representative section of the Internet 16800 is shown in FIG. 348. A plurality of local area networks ("LANs") 16802 in a wide area network ("WAN") 16804 are interconnected by routers 16806. The routers 16806 are special purpose computers used to interface one LAN or WAN to another. Communication links within the LANs may be twisted wire, coaxial cable, fiber-optic, wireless links or other communication links known to those skilled in the art. While communication links between networks may utilize analog telephone lines, digital lines, fiber-optic, wireless or other communication links known to those skilled in the art. Furthermore, computers, such as remote computers 16808, and other related electronic devices such as telephones, personal digital assistants ("PDAs"), etc., can be remotely connected to either the LANs 16802 or WANs 16804 via a modem (not shown) and a temporary communication link, such as a telephone line or wireless connection (shown as a dotted line). As will be appreciated by those of ordinary skill in the art, the Internet 16800 comprises a vast number of such interconnected networks, computers, and routers and that only a small, representative portion is shown in FIG. 348.

The Internet 16800 has recently seen explosive growth by virtue of its ability to link computers located throughout the world. As the Internet 16800 has grown, so has the Web. As will be readily appreciated by those skilled in the art, the Web is a vast collection of interconnected or "hypertext" documents formatted in the HyperText Markup Language ("HTML") or other markup languages that are electronically stored at Web sites throughout the Internet 16800. In one aspect of the invention, a Web site resides on a server computer, such as the seller server 16906 illustrated in FIGS. 349 and 350 connected to the Internet 16800 that has storage facilities for storing hypertext documents and that runs Web server software for handling requests for those stored hypertext documents. A hypertext document normally includes a number of hyperlinks, usually displayed on a monitor as highlighted portions of text, which link the document to another hypertext document stored at the same Web site or some other Web site located elsewhere on the Internet 16800. Each hyperlink is associated with a Uniform Resource Locator ("URL") that provides the location of the linked document on the Web server connected to the Internet. Thus, whenever a hypertext document is retrieved from any Web server, the document is considered to be retrieved from the Web. As is known to those skilled in the art, a Web server may also include facilities for storing and transmitting application programs, such as application programs written in the JAVA® programming language from Sun Microsystems for execution on a remote computer. Likewise, a Web server may also include facilities for executing scripts and other programs on the Web server itself.

A user, remote or otherwise, may retrieve hypertext documents from the Web via a Web browser application program. In some instances, Web browser applications provide an interface to the Internet. In some instances, this interface can take the form of a graphical user interface or GUI. A Web browser, such as the NETSCAPE NAVIGATOR® browser or the MICROSOFT® Internet Explorer browser, is a software application program for providing a user interface with the Web. Upon request from the buyer via the Web browser, the Web browser accesses and retrieves the desired hypertext document from the appropriate Web server using the URL for the document and a protocol known as hypertext transfer protocol ("HTTP"). HTTP is a higher level protocol than TCP/IP and is designed specifically for the requirements of the Web. It is used on top of TCP/IP to transfer hypertext documents between servers and clients. The Web browser may also retrieve application programs from the Web server, such as JAVA applets. It will be appreciated by those skilled in the art that protocols other than HTTP may be used. For example, a URL might designate the file transfer protocol ("FTP") or Secure HyperText Transfer Protocol ("HTTPS").

In one aspect, the present invention is directed to providing real time control for the production of beef and beef products. As is apparent to one of skill in the art, beef and beef products can be graded by specifications including the amount of weight per package, the cut of beef in a package, the amount of fat content of beef in a package, or any combination thereof, etc. Referring to FIG. 349, one embodiment of the invention provides a specification from the buyer device 16900, 16902 and 16904. In one aspect, buyer device can receive requests from one or more retail locations, such as supermarkets, or buyer devices can be located at the supermarkets themselves. The specification is transmitted via the Internet to the seller device 16906. In one aspect, a seller device 16906 can be a distribution center (DC) which receives and stores specifications from the different buyer devices 16900, 16902 and 16904. In some instances, it can be envisaged that the channels of trade do not require a separate DC, and therefore, the seller device 16906 may reside within the beef processing plant 16908, thus eliminating a distribution center.

One embodiment of a system 16910 of devices to which the seller device 16906 is connected and to which the buyer device 16900, 16902 and 16904 is also connected is shown in more detail in FIG. 349. In addition to the buyer device 16900, 16902 and 16904 and the seller device 16906, the system 16910 includes a weather device 16912 and a transportation device 16914. Although in one embodiment the buyer device 16900, 16902 and 16904 is a personal computer, those of ordinary skill in the art will appreciate that the buyer device 16900, 16902 and 16904 could be a wireless device such as a pager, a cellular telephone, Web-enabled landline telephone, PDA or any other type of buyer device 16900, 16902 and 16904 capable of communicating with the seller device 16906. Moreover, those of ordinary skill in the art will recognize that other devices may be interconnected to operate in accordance with the present invention.

In one embodiment of the invention, the seller device 16906 generates Web pages containing product information that can be viewed by the buyers using standard Web browsers. In another embodiment, the seller device 16906 creates a network presence, in which the seller device 16906 sends a customized data stream containing beef and beef product specification information over the network to the beef processing center 16908. In this manner, the instant, or shortly thereafter, that buyers input specifications of the beef and beef products that are needed, the specifications are routed to the seller server 16906, which in turn can route instructions that adjust and control the production of beef and beef products in the beef processing center 16908. In this manner, the efficient allocation and utilization of resources is observed in real time. The buyer device 16900, 16902 and 16904 runs a proprietary program that produces a user interface configured to allow the buyer to view product information, select products, and order products all using the same interface.

FIG. 350 depicts several of the components of a seller device 16906 used in the practice of the present invention. Those of ordinary skill in the art will appreciate that the seller device 16906 includes many more components than those shown in FIG. 350. However, it is not necessary that all of these generally conventional components be shown in order to disclose an illustrative embodiment for practicing the present invention. As shown in FIG. 350, the seller device 16906 of FIG. 344 is connected to the Internet or other communications network via a network interface unit 17000. Those of ordinary skill in the art will appreciate that the network interface unit 17000 includes the necessary circuitry for connecting the seller device 16906 to the Internet, and is constructed for use with the TCP/IP protocol.

The seller device 16906 also includes a central processing unit ("CPU") 17002, a display 17004, and mass memory 17006, connected via a bus. The memory 17006 generally comprises RAM, ROM, and some form of persistent mass storage device, such as a hard disk drive, tape drive, optical drive (such as CD-ROM or DVD-ROM), floppy disk drive, or combination thereof. The memory 17006 stores an operating system 17008 for controlling the operation of the seller device 16906. It will be appreciated that the operating system may be formed by any one of several operating systems well known to those of ordinary skill in the art, such as UNIX®. MAC OS® or MICROSOFT® WINDOWS NT®. In addition, memory 17006 stores Web server software 17010, as well as databases 17012, containing information on buyers, beef processing centers, products, levels of inventory, weather and transportation information respectively. The database may contain historical sales data, traffic, weather, or road information to enable the determination of an estimated delivery time to a buyer's designated destination. Such historical information, when used in this manner can provide a means of more accurate prediction of actual sales of fresh meat products, for example ground beef and beef patties are most frequently purchased and consumed by consumers at barbecues, more frequently and in larger quantities during the hot summer week end and holiday periods, when compared to colder periods when barbecues are a less appropriate and popular recreational event. A GPS locating device may be fixed to transport vehicles and the duration period of specific delivery routes recorded according to time of day and year wherein such recorded information can be automatically accessed to more accurately schedule future truck deliveries. Said GPS locator may also be adapted to transfer real time information to and from the traveling vehicle such as prevailing ambient weather conditions and the refrigerated truck internal temperature and general performances of the truck driver. Referring to FIG. 349, the seller device 16906 receives purchase orders via the Internet 16918, with a central processing unit receiving the order and processing the order to determine which variables or parameters to manipulate in the meat processing plant 16908 to fulfill the buyer specifications. The seller device 16906 may vary the rate of production of processing equipment or, for example, adjust the content of fat in proportion to lean tissue by controlling valves, pumps or direct a slicing or cutting machining to cut a predetermined amount of product in differing sizes or shapes to conform to the buyer specifications of size and weight, which may in turn, be adjusted according to any historical and/or current weather information.

In one aspect of the invention, the seller device 16906 can also be provided with instructions to obtain weather or highway and road information from other devices 16912 and 16914 connected to the Internet 16918 to compute an estimated delivery time at the buyer's designated destination. In this manner, the seller device 16906 can provide instructions to the beef processing unit 16908 on the type of packaging materials and the manner of packaging to use. In another aspect, the seller device 16906 includes programmable instructions to direct certain events to occur when the estimated delivery time to the buyer's specified destination are in excess of the allowable amount of time that meat can remain in a finished package without undergoing significant deterioration such as oxidation that may render the retail package unsalable or reduce its value. In one instance, meat correctly packaged in a controlled atmosphere environment of carbon dioxide according to the present invention can endure for about 3–9 days after exposure to ambient atmospheric gas at 29–32° F., without undergoing, for example, significant discoloration or rancidity/oxidation. If however, the estimated time of delivery will exceed this recommended amount, the seller computer 16906 can direct that the buyer's order be packaged in a gas barrier master container containing a substantially oxygen free gas. Packaging in a master container can extend the shelf-life of finished packages for about an additional 4–6 weeks, or more. However, if the estimated amount of time necessary to deliver the buyer's order to the designated delivery destination is less than the amount of time before sufficient discoloration or rancidity/oxidation sets in, then the buyer's order does not need to be packaged in a low oxygen gas barrier master container, thus reducing the average cost per pound of meat product because average packaging costs can be reduced. In this manner, the efficient allocation of resources is preserved. In some instances, wherein the finished retail packs are destined for immediate delivery to supermarket located near to the point of package production, the outer barrier pack may be eliminated altogether.

The packaged meat is delivered to the buyer through conventional channels, such as by refrigerated truck 16916, rail, or ship to the buyer's designated destination. Again the choice of delivery method bears on the cost of the product, and thus only the most efficient method can be selected to deliver the product to the buyer. Again, the most efficient utilization of resources is taking place in real time.

FIG. 351 depicts several of the key components of a buyer device 16900, 16902 and 16904 of FIG. 349 used by a buyer to order beef and beef products via the Internet in accordance with the present invention. The buyer devices are used to place an order specifying one or more specifications, such as quantity of meat, cut of meat, fat content, lean meat content, weight, size, or any other of a plurality of specifications which is useful for quantifying meat products. Buyer devices may be located at supermarkets, supermarket head quarters, or regional centers where all sales data and information is collected directly from the checkout bar-code reading apparatus located at each supermarket. A person of ordinary skill in the art will readily appreciate that one or more computers can be used by a buyer at a remote location to enter purchase orders via the Internet. Buyer devices can also include hand held remote controlling devices. The information gathered at the point of retail by buyer devices can be gathered and sent to a remote or local regional buying center having another buyer device. The regional buying center can communicate with the seller device to place an order via the Internet. Furthermore, the seller device can have access to the historical data gathered by buyer computers as well. Those of ordinary skill in the art will appreciate that the buyer device 16900, 16902 and 16904 includes many more components than those shown in FIG. 351. However, it is not necessary that all of these generally conventional components be shown in order to disclose an illustrative embodiment for practicing the present invention. As shown in FIG. 351, the buyer device 16900, 16902 and 16904 includes a network interface unit 17100 for connecting to a LAN 16802 or WAN 16804. (See FIG. 348.) As will be appreciated by those of ordinary skill in the art, the network interface unit 17100 includes the necessary circuitry for such a connection, and is also constructed for use with the TCP/IP protocol, the particular network configuration of the LAN 16802 or WAN 16804 (see FIG. 348) it is connecting to, and a particular type of coupling medium. Alternatively, the buyer device 16900, 16902 and 16904 may also be equipped with a modem for connecting to the Internet through a point to point protocol ("PPP") connection or a serial line Internet protocol ("SLIP") connection as known to those skilled in the art.

The buyer device 16900, 16902 and 16904 also includes a central processing unit 17102, a display 17104 and a memory 17106 connected via a bus. The memory 17106 generally comprises random access memory ("RAM"), and read-only memory ("ROM") and a persistent mass storage device such as a hard disk drive. The memory 17106 stores an operating system 17108 for controlling the operation of the buyer device 16900, 16902 and 16904. The memory 17106 also includes a Web browser 17110, such as the NETSCAPE NAVIGATOR® browser or the MICROSOFT® Internet Explorer browser, for accessing the Web. Web browser 17110 may also store a JAVA virtual machine used to execute JAVA "applets" as known to those skilled in the art. It will be appreciated that these components may be stored on a computer-readable medium and loaded into memory 17106 of the consumer device 16900, 16902 and 16904 using a drive mechanism associated with the computer-readable medium, such as a floppy or a CD-ROM/DVD-ROM drive.

FIG. 352 depicts several of the key components of a weather device 16912 of FIG. 349 used to implement the present invention. Those of ordinary skill in the art will appreciate that the weather device 16912 includes many more components than those shown in FIG. 352. However, it is not necessary that all of these generally conventional components be shown in order to disclose an illustrative embodiment for practicing the present invention. As shown in FIG. 352, the weather device 16912 includes a network interface unit 17200 for connecting to a LAN 16802 or WAN 16804 of FIG. 348. As will be appreciated by those of ordinary skill in the art, the network interface unit 17200 includes the necessary circuitry for such a connection, and is also constructed for use with the TCP/IP protocol, the particular network configuration of the LAN 16802 or WAN 16804 (see FIG. 348) it is connecting to, and a particular type of coupling medium. Alternatively, the weather device 16912 may also be equipped with a modem for connecting to the Internet through a PPP connection or a SLIP connection as known to those skilled in the art.

The weather device 16912 also includes a central processing unit 17202, a display 17204 and a memory 17206 connected via a bus. The memory 17206 generally comprises RAM, and ROM and a persistent mass storage device such as a hard disk drive. The memory 17206 stores an operating system 17208 for controlling the operation of the weather device 16912. The memory 17206 also includes a Web server program and a weather service program 17210 and a weather database 17212. It will be appreciated that these components may be stored on a computer-readable medium and loaded into memory 17206 of the weather device 16912 using a drive mechanism associated with the computer-readable medium, such as a floppy or a CD-ROM/DVD-ROM drive.

FIG. 353 depicts several of the key components of a transportation device 16914 of FIG. 349 used to implement the present invention. Those of ordinary skill in the art will appreciate that the transportation device 16914 includes many more components than those shown in FIG. 353. However, it is not necessary that all of these generally conventional components be shown in order to disclose an illustrative embodiment for practicing the present invention. As shown in FIG. 353, the transportation device 16914 includes a network interface unit 17300 for connecting to a LAN 16802 or WAN 16804 of FIG. 348. As will be appreciated by those of ordinary skill in the art, the network interface unit 17300 includes the necessary circuitry for such a connection, and is also constructed for use with the TCP/IP protocol, the particular network configuration of the LAN 16802 or WAN 16804 (see FIG. 348) it is connecting to, and a particular type of coupling medium. Alternatively, the transportation device 16914 may also be equipped with a modem for connecting to the Internet through a PPP connection or a SLIP connection as known to those skilled in the art.

The transportation device 16914 also includes a central processing unit 17302, a display 17304 and a memory 17306 connected via a bus. The memory 17306 generally comprises RAM, and ROM and a persistent mass storage device such as a hard disk drive. The memory 17306 stores an operating system 17308 for controlling the operation of the transportation server 16914. The memory 17306 also includes a Web server program and a transportation service program 17308 and a transportation database 17310. In one aspect, this the transportation database could one that is established from the users own historical information/data. It will be appreciated that these components may be stored on a computer-readable medium and loaded into memory 17306 of the transportation server 16914 using a drive mechanism associated with the computer-readable medium, such as a floppy or a CD-ROM/DVD-ROM drive.

One method carried out by seller the device 16918 of FIG. 349 is illustrated in FIG. 354. The method includes an event for receiving buyer specifications 17400. The seller computer will then execute a set of programmable instructions designed to carry out the buyer's order in event 17402. The seller computer may for instance issue instructions that result in accelerating a pump and conveyor to increase the rate of production, or open a valve to mix any number of differing meat streams of differing fat content to arrive at the buyer's specification for fat content. Other instructions can direct a cutting machine, molding or slicing equipment, web selection, sealing station, weigh station, counter, collating or order consolidation/assembly direct from the packaging line or from packages held in storage, followed by palletizing to meet the buyer's order. Further, the seller device will determine whether it will be necessary to package the finished trays in a barrier master container, which can involve calculating an estimated time of arrival to the buyer's designated destination 17404, or estimated time of arrival at the point of sale to a consumer, after delivery to a distribution center. The seller computer can receive any desirable parameter and necessary information to carry out the instructions either from a database of previous buyer data or the seller computer may gather the information from the Internet from other devices 16912 and 16914 (see FIG. 349). The seller device may use weather information 17406 or transportation information such as road or highway conditions 17408. The seller device contains instructions to package a buyer's order in a master container 17410, when it is determined that an unacceptable level of deterioration will occur to the packaged meat if it is not packaged in a master container. The seller device will then instruct the packaging system to package, palletize and ship the product to the buyer 17412 in a master container. Once again, providing for the efficient utilization of resources.

In one aspect, the seller device can also have access to the buyer historical data to use in computing the quantity or type of meat which is purchased by buyers and provide product in advance.

In another alternate embodiment of the invention, the buyer can be invoiced from the measuring devices located upstream of the vessels. For example, the measuring devices located after the grinding heads can be used to invoice the buyer, while the meat is still held in storage in the vessels. In this manner the product can be specifically tailored to an individual buyer's specifications.

5.2.1. Embodiment

Referring now to FIG. 355, a schematic illustration of a system for real time pricing controls is illustrated. The meat processing equipment resides within a meat processing plant 17500. The meat processing equipment can be the processing and storage equipment described herein above or any of the equipment, which can reside within a meat processing plant 17500, as described in this disclosure. In this instance, the packaging equipment may be similar to that described herein in association with FIG. 148 but with a weighing station located at the exit end thereof and in such a manner so as to weigh and record the individual weight of each package after packaging by transfer of packages across the weighing station. A barcode reader and/or printer is also provided adjacent to the weighing station so that the weight of each individual package can be measured and stored in a suitable memory bank wherein each weight is identified by the barcode mark that is applied to each tray, prior to packaging, and suitably prior to the tray being supplied to the packaging system.

In one aspect, the meat processing plant 17500 is connected to a communication system, such as the Internet 17502, via a seller device. A person of ordinary skill in the art will appreciate that seller computer 17504 can include a plurality of computers connected within a LAN environment. Furthermore, the seller device 17504 can be connected to one or a plurality of operator terminals having a monitor, user interface and input devices, as required.

Any suitable tray, herein disclosed, is provided in meat processing plant 17500, in readiness for loading with meat product. In each case, the weight of the meat product loaded into the trays may vary slightly but generally will be within a specified range such as 1.8 lbs. to 2.2 lbs. such that a specific retail sale price (e.g., $2.00) can be maintained while adjustments are made (in real time) to the actual weight content of the finished package accordingly. However, the particular weight of the perishable good is not intended to limit the invention, but is provided as an example of one embodiment. In one aspect, the trays may be marked with a unique identification marking prior to use on the packaging machine. Such a marking may be applied to the base of the tray, centrally disposed and on the outer surface thereof, at the point of tray production such as an ink jet means located downstream from a thermoforming machine used to produce such trays. Such a marking may comprise a series of numbers, letters or a bar code. The bar code may be one dimensional, such as a UPC code, or it may be a two dimensional bar code such as a data matrix, as developed by International Data Matrix, or alternatively a PDF 417 high capacity two dimensional bar code, as developed by Symbol Technologies Inc. Information about the PDF 417 bar code marking system can be obtained from website www.pdf417.com. In some instances, a two dimensional barcode as supplied by Symbol can be also attached to the master container as well as to each individual tray. In this instance, the 2D bar code could completely eliminate the need for any RF ID tag in the packaging, which may be desirable depending on the applications. In some instances, a 2D bar code can store over 2000 characters. In some instances, the tray marking will be provided on an exterior portion of the center tray base as described above, regardless of tray dimensions. In this manner, all manner of trays can be universally read by a universal scanner.

In any event, the mark applied to each tray shall be a unique marking to that tray, unique meaning within a given period of time. More particularly, a period of, for example twelve weeks, may be specified and during this twelve week period, all trays marked in accordance with this present disclosure, will have a unique marking. Similar markings may again be used during subsequent twelve week periods thereafter. The period of twelve weeks, would be adjusted to ensure that the shelf life of any product processed and marked in this manner, would be less than the specified period of twelve weeks. In this way, it is assured that all markings for individual trays in use during any given period, are unique to the marked tray. However, in other aspects, the markings may be unique in the absolute sense, the time period described herein being merely exemplary of one embodiment.

The markings applied to each tray may be in the form of an ink jet printed image applied onto the tray by ink jet equipment such as manufactured and supplied by Weber (www.webermarking.com) Model ML128 Ink Jet Coder. The marking on each tray may be located on the underside of the tray cavity on a flat surface that has been thermoformed to provide a recess with a protruding ridge around the perimeter of the flat surface. Trays may also be printed with the unique marking by equipment integrated with the packaging and weighing equipment, however, in some instances, trays will have been marked prior to delivery to processing plant 17500. Trays may be printed with unique markings at the point of tray production and immediately after the thermoforming process while the trays are still attached to the continuous web of plastics material from which they are thermoformed. In this way, several ink jet coders may be positioned across the width of the web and in such a way to allow the precise and efficient printing of each unique mark onto the trays.

Referring again to processing plant 17500, wherein trays are loaded with perishable product and stretch sealed on equipment as generally described in association with FIG. 148, and immediately transferred in a continuous stream onto and across a weighing station. Adjacent to the weighing station, a unique marking reader such as a bar code scanner Model LS6804, as supplied by Symbol Technologies Inc., reads the unique tray marking and the weight of the tray is recorded and stored in association with the unique marking, in a computer data bank. All information associated with the tray, the product contained therein, its weight, date of packing, origin and any other desirable information associated therewith, can be attached to the tray's unique marking, and stored in a computer data storage bank, for instance in the processing location's 17500 computer. In one aspect, the computer can be communicating via a communication system to other computers at strategic locations, such as processing locations 17500, seller locations 17504, transportation locations 17506, weather locations 17508, buyer locations 17510, distribution locations 17512, and supermarket locations 17514, 17516 and 17518, wherein said locations may make use of the information in any desired manner. Trays are continually weighed in a continuous stream, and the unique marking on each tray is recorded and stored in a computer data memory bank, in association with all of the information specific to each tray. A grouping of, for example, twelve trays are collated and loaded into a barrier container similar to that shown and described in association with FIG. 240. In one aspect, human readable labels may optionally be applied at this time, and in some instances, applied at a later time, such as immediately prior to placing the individual packages for retail sale. (A blank label format, as generally described in association with FIGS. 75 and 140, may also be printed onto the web, prior to sealing the web to the tray.) An RF ID tag such as shown herein in FIG. 360, and supplied by OMRON of Kyoto, Japan can be programmed and applied to each barrier container, and information associated with each tray contained within the barrier container recorded therein. It should be noted that when applying the RF ID tag to the master barrier container it is most preferable to do so such that the RF ID tag is vertically disposed so as to allow for improved reading by a RF ID tag reader. In this manner, the information of every tray in the master container travels with the master container. The RF ID tag may be a V720-Series tag and may be located within the barrier container, and arranged to reside in a vertically disposed position to allow most effective reading when, for example, the container and others are placed into and RF ID tag portal reading device, such as the OMRON V720-HS51. A portal device may be located at any strategic location, such as processing locations 17500, buyer locations 17510, seller locations 17504, distribution locations 17512, supermarket locations 17514, 17516 and 17518, for reading each RF ID tag from every master container that is packaged. The information is stored in a suitable computer memory bank. The computer may suitably be communicating to other computers at strategic locations, such as processing locations 17500, buyer locations 17510, seller locations 17504, distribution locations 17512, supermarket locations 17514, 17516 and 17518, via any suitable communication system, which in one instance can be the Internet. All locations mentioned above are in communication with each other and can readily share any type of data and information, in one instance, via the Internet, as depicted in FIG. 355. In addition to reading information from the RF ID tags and/or the unique identifying tray mark, each location may receive information of any nature from every other location.

Each barrier container with individual trays therein, can be loaded into a carton, or alternatively a crate, and stacked onto a pallet. It should be noted that an RF ID tag may alternatively be attached to the crate, which is returned for reuse after sanitizing. Alternatively, the tag applied to each barrier container may be removed at a later stage after use in the distribution process, and returned for recycling and multiple use. In this way, retail packaged goods, loaded in trays, can be delivered from processing location 17500 directly to supermarket locations 17514, 17516 and 17518, on truck 17520, along route 17522, or alternatively can be delivered to distribution center location 17512, along route 17524, for subsequent distribution to supermarkets and other retail outlets, on truck 17526. Any suitable distribution transport means may be used, such as rail or air transport methods, wherein trays are contained in a barrier case, each with a unique marking that is recorded in an RF ID tag, in association with all information required, and attached thereto.

In one aspect of the invention, the ready availability of information related to beef, makes real time pricing practical. In one aspect, real time refers to the ability to price beef, or any other suitable perishable goods, as near to the retail sale event as practical. It should be noted that supply and demand for meat products varies, and pricing is adjusted daily. However, time taken to deliver such retail products from a processing facility 17500, can take as long as 6–10 days, or even longer, during which time the value of the meat products will have changed many times, making pricing at the processing facility impractical, or at least, made with less than most current up to date information. Thus, at best, conventional methods of pricing are a projection of several days into the future of what conditions will be like then. It should also be noted that price for similar meat products varies according to the location of the retail supermarket outlets, but accommodating for these variations at a central processing plant, is logistically impossible, or at best, exceedingly difficult. It can therefore be advantageous to provide a means of adjusting the actual sale price for each product, immediately prior to retail display, which would invariably occur, in one instance, at least 7 days after packing at processing plant 17500. This is made practical by the practice of the present invention.

In one aspect of the present invention, a label may be applied to each tray prior to loading into the mater container and wherein the label comprises a heat sensitive paper laminated to a circuit connected to an RFID tag. This circuit can be arranged to apply heat to the heat sensitive paper causing human readable letters or numbers to appear on the external surface thereof. The circuit can be activated by appropriate instructions transferred to the RFID tag while the barrier case, which may be palletized with other barrier cases, is transferred into a portal designed for such purpose. In this way, trays contained in a barrier container can be labeled with human readable information while still located inside the barrier case and prior to removal there from.

In one aspect, practice of the invention includes a means of tracking each individual tray, means of tracking beef, means of tracking containers of trays, means of reading information on each tray and containers of trays, and means of storing the information of trays and containers, where the means for reading and storing information are at a retail store, such as a supermarket, and at a processing center. Alternatively, a means for reading and storing information can also be located at a distribution center.

Referring again to the data recording, in association with each unique tray marking, at the processing location 17500, the associated data is recorded in a database, and all such data is transferred to, in addition to recording on RF ID tag, seller device 17504. This data can then be adjusted to include any markup that is appropriate for addition, by the processing plant 17500, and then the data is transferred by either modem directly to buyer device 17510, or to the Internet 17502. In any case, the data is transferred to the buyer device and the Distribution Center 17512. The data associated with each package can be manipulated as required, and then transferred to each supermarket location and each supermarket computer such as 17528, 17530 and 17532. A device, such as a computer located at any suitable location, includes a pricing module. Pricing module according to the present invention include any set of instructions that is executed on a computer to measure the most advantageous, pricing strategy. Pricing module can use any set of instructions based on one or several variables, or can even include the use of sophisticated pricing models. There is virtually no limit to the set of instructions that can be provided to a computer to carry out the pricing module. In one instance, pricing module can receive inputs from any suitable source of information that affects the price of beef, such as location, supply, demand, etc. The outputs from the pricing module are routed to a supermarket, where the output is converted to a pricing label. The output from the pricing module may also be communicated to any other device at any location communicating with the supermarket device or the generator of the pricing module outputs.

In addition to the pricing module, a shelf-life module which calculates the estimated viable shelf-life of a packaged perishable product can be located at any suitable location. The shelf-life module can receive inputs from any suitable source, including a temperature tag located on a master container package that indicates the temperature history of the package. The shelf-life module can use any set of instructions to determine the estimated shelf life of the packaged tray. The outputs from the shelf-life module are routed to a supermarket device, which ultimately takes the output and prints a date on a label which is then applied to each individual tray package prior to placing the packaged tray on a shelf. The output from the shelf-life module can be communicated to any device communicating with the supermarket device or the generator of the shelf-life module outputs.

Pallet loads of cartons or crates containing master containers are delivered ultimately, according to demand, to each supermarket 17514, 17516 and 17518. At each supermarket, portal readers such as OMRON V720-HS51, can be installed and thereby provide a method of automatically identifying the deliveries by reading the RF ID tags attached to each master container, and store the associated information in a log of inventory, and also on the supermarket computer 17528, 17530 and 17532. Packages can be removed from the master container, as required, at the supermarket 17514, 17516 and 17518, immediately prior to retail display, and human readable information can be applied to each tray by means of a label printed with information sourced from the RF ID tag, and/or the supermarket computer, so as to display pricing and "use by" (shelf life) dates, according to the supermarket management requirements. It should be noted that information detailing the specific details of the tray contents, is identified by the unique marking on each tray, and is available via modem, the Internet or the RF ID tag. Apparatus, such as a mobile cart, is provided at each supermarket retail outlet that comprises, in one instance, a short conveyor with a barcode reading device located there upon and interfaced with a printer (printer could be an ink jet printer or a label printer) and is also capable of communication, by a modem telephone line directly to the Internet 17502 or buyers device 17510 and an RFID tag reader. This equipment can read the unique identification mark on each tray and compare this with the various sources of information in the data banks at all locations, including processing location 17500, buyer location 17510, distribution location 17512 and even other supermarket locations 17514, 17516 and 17518, and then print human readable information, adjusted according to the pricing module and shelf life module outputs, to the tray immediately prior to retail display. By comparing information gotten with the local reader at the supermarket location and the information available from other locations via the communication network, comparisons in information can be made and errors in pricing and shelf life can be virtually eliminated.

5.2.2. Embodiment

One aspect of the present invention is a real time pricing controller, inventory and management system for beef packaged in accordance with the present invention. Referring now to FIG. 356, system apparatus at a supermarket location 17514, 17516 and 17518, to provide such features are illustrated.

In one embodiment of the invention, master containers 17600 with RF ID tags attached thereon are offloaded from refrigerated trucks dispatched from a distribution center and are carried (for example by a forklift truck 17602) through a portal 17604 in the direction of arrow 17606. In one embodiment, temperature sensing devices located on the master containers are capable of detecting a rise in temperature, such as when refrigerated container doors open, signifying that the containers have been removed from a refrigerated environment, and this can be communicated to interested personnel via the communication system, including a global positioning system. In one instance, GPS can track the containers, and accordingly routines will be established that will make it possible to determine when a container has left a refrigerated environment, where it is located, and how long it has been outside refrigeration and the appropriate action can be called to the attention of supermarket attendants. In one aspect, the amount of time that containers remain in a non-refrigerated environment can be tracked and appropriate action can be taken to remedy the condition, such that the containers are not exposed to high temperatures for more than what is considered suitable. In some instances, call to action can be implemented by having suitable alarms in the loading area of supermarkets. In some instances, it is desirable that the first action to be taken is reading of master container RF ID tags by portal 17604. In this manner, if master containers are not removed to a refrigerated room within a suitable period after the master containers have left a refrigerated environment, an alarm can be sounded to alert operators working in this area to such a fact. In other instances, the RF ID tags can be equipped with a temperature sensor, which will be described herein below, to provide a record of the temperature to which master containers, and thus, packaged trays are exposed. In still other instances, it is possible to read RF ID tags at a distribution center or other distributing facility, and record any and all such information that has the time at which the master container packages left a refrigerated environment. Such information can be transmitted to any and all destination supermarkets, such that supermarkets will become aware of the time that master containers have been removed from a refrigerated environment and thus will be able to make accommodations to prevent spoilage of the packaged perishables. Such accommodations can include for the provision of refrigerated trucks and containers, or an expedited material handling system at the receiving station to keep the packaged perishables within the maximum allotted time away from refrigeration. In still other aspects of the present invention, satellite tracking and position capabilities, such as global positioning system (GPS), can readily be incorporated to the delivery systems herein disclosed. Any suitable transmitter located on trucks, containers, pallets, and even master containers or individual trays may be tracked world wide and such tracking will lead to more efficient routing and distribution of the packaged perishables, in addition to alarming those responsible of providing for adequate refrigeration at the appropriate time. For example refrigerated trucks, and non-refrigerated trucks can be tracked using GPS, such tracks are known to have estimated time of arrival. However, should the tracking system detect that the delivery truck has experienced a breakdown, or is behind schedule, appropriate action can be taken, such as summoning help to repair any break in the equipment. In other aspects, the GPS tracking device can be mounted onto the refrigerated shipping containers. In this manner, appropriate action can be taken if the tracking system detects a problem with the refrigerated container and immediate help can be summoned.

Referring again to FIG. 356, portal 17604 is a device provided by Omron, wherein RF ID tags on master container 17600 can be read and any information stored therein can be downloaded into one or more storage banks on a computer memory via communications cable 17608 attached to portal 17604 and such information can be communicated to any desirable location, within the supermarket and outside the supermarket where such information is processed. Individual master containers 17600 pass into a suitable refrigerated space 17610 that is divided from a non-refrigerated receiving area by wall 17612 and divided from the perhaps mildly air conditioned store floor area by wall 17614. Refrigerated space 17610 is refrigerated by one or more refrigeration units 17616 at any suitable temperature. Once master containers sense a change in temperature, certain of the systems may act accordingly and deactivate to indicate that the timer counting down the allotted time that master containers can withstand in a non-refrigerated environment has been reset.

Master containers 17600 are loaded in the direction of arrows 17618, 17620 and 17622 onto suitably inclined racks 17624, 17626 and 17628, respectively, either manually or through mechanical means from pallets. In this manner a first in/first out process is enforced. A suitable rack system constructed according to the present invention can include a first 17618, second 17620, and third 17622 rack assemblies including a first and second rails separated by roller assemblies (not shown). First and second rails are suitably inclined to guide master containers from a relatively higher loading location to a relatively lower unloading location, so that any master containers 17600 loaded therein can be directed towards lower end of the incline rack system 17624. Inclined rails are provided with chocks 17630 so as to prevent the dropping of any master containers 17632 on the lower ends thereof. In one aspect of the invention, each rail 17624, 17626 and 17628 can include a scanner 17634, 17636 and 17638 provided so as to scan the RF ID tag on each individual master container 614 as it passes there through. Scanners 17634, 17636 and 17638 are connected to the supermarket's computer system via a connector 17640. In this manner, any information can be immediately processed and any warning signals that the master container has been located in an improper location, such that lights 17642, 17644 and 17646 will immediately bring attention to the error, or alarm can be activated. Information pertaining to every individual tray contained within the master container can be logged into the supermarket's computer system, and made available to any other computer outside the supermarket over a communication system. In this manner, the information can be processed along with other variables to determine the pricing strategy.

In one aspect of the invention, a computer screen 17648 is provided so that any information which an operator is required to carry out is described. In some instances, for example, once the product on the supermarket shelves has been or will be very nearly depleted a call to place additional product on the shelves will be logged. The instructions are communicated to operators in the refrigerated store area and operator can simply follow the directions on computer terminal 17648 to unload any master container from the rack system 17624. In one aspect of the invention, alarming systems can be place to direct the operator from which rack to retrieve the requested items. In one instance, lights 17632, positioned at the lower end of unloading location can light to indicate the proper unloading location. Once master container 17632 is opened, either the master containers or the individual packages can be scanned, at which time, a set of instructions is set in motion which will determine the most current pricing strategy for the particular item. The pricing label can then be printed and the individual trays can be labeled and sent in the direction of the store floor indicated by arrow 17650. In one aspect of the invention, a portable cart 17652, for example, with a printer and scanner thereon can be used to price and label any individual package contained within master containers 17632 loaded in the racks.

It is to be appreciated that while a system apparatus as detailed in the drawing and described above is merely illustrative of one embodiment used to carry out the present invention, one aspect being the real time control of retail pricing.

5.2.3. Embodiment

Referring now to FIG. 357, certain of the aspects of the present invention are being graphically represented for ease of understanding.

In one aspect of the invention, reference numerals 17700–17728 represent one-dimensional arrays including any desired information therein. Such arrays are graphical representations of individual trays being associated with information pertaining to the contained item. In one aspect of the invention, arrays 17700–17728 are representative of the unique tray marking designations as stored in a computer memory data bank. One-dimensional arrays 17700–17728 representing each individual package containing information such as weight, date of packaging, and any other information relating or associated with the origin of the beef contained therein is stored in the array. Such arrays are keyed to the unique individual markings on the trays.

In one aspect of the invention, arrays 17700–17728 can be grouped into a two-dimensional array represented by reference numeral 17730. One-dimensional arrays 17710–17718 can be assembled in a two-dimensional array represented by reference numeral 17732. One-dimensional arrays 17720–17728 can be assembled in a two-dimensional array represented by reference numeral 17734. This is intended to be a graphical depiction of individual trays being loaded within a master container, and wherein all the information is grouped by master container. The information can be stored in a computer memory keyed to the individual master container. Any information that is stored can be communicated via a communications system, such as the Internet. In one aspect of the invention, RFID tags can be used, such as on a master container to store information from each individual tray thereon. Arrays 17730–17734 represent individual master container packs containing any desired number of individual packages therein. In this manner, all the information pertaining to any individual package can be read using any scanners, portals or other reading devices to ascertain the contents of each individual package contained within each master container.

In one aspect of the invention, the information contained in arrays 17730–17734 can be read when one scans an RFID tag on a master container and stored in any computer memory data bank at any location, such as a processing center, a distribution center, a buyer center, or a retail center, such as a super market. In one instance, information is shared between all these units, and at the most practical moment, decisions, such as pricing and/or shelf life, can be adjusted and/or updated prior to opening the master container pack and labeling and pricing each individual tray package, based on the information contained in one-dimensional arrays 17700–17728.

5.2.4. Embodiment

Referring now to FIG. 358, certain of the aspects of the present invention are being graphically represented for ease of understanding. In this instance, of a method according to the present invention is illustrated. In Block 17800, a tray with a unique marking is provided. In Block 17802, a scanner, or any other suitable reading device, reads the tray marking from the tray. In Block 17804, a one dimension array with the unique tray marking as the key is created and stored. In Block 17806, beef is loaded in the tray and weighed. In Block 17808, any information associated with the beef, such as source animal(s), weight, fat content, date of packaging, etc., is stored in fields as a one-dimensional array, for example, and stored in a computer memory data bank. In Block 17810, the tray is loaded in a master container. In Block 17812, the one-dimensional array with fields is stored with other one-dimensional arrays, representing other individual trays, in the two-dimensional array, for example, with the master container as the key.

In this manner, the two-dimensional arrays can be communicated between any of the aforementioned units, such information to be used, in one aspect, in the real-time pricing of the goods, prior to placing the goods on the retail shelves.

While one example of a real-time controller is described for the use of retail pricing immediately before placing the goods on sale, other real-time controllers can be used, for example, in the control of processing and packaging equipment, etc., to effect the most economical use of materials and equipment, the description provided herein being merely exemplary of one particular embodiment.

5.2.5. Embodiment

In another aspect of the present invention, a device or plurality of devices capable of measuring and recording oxygen content and temperature can be provided on a container to measure and record oxygen content and the temperature to which the master containers and individual package(s) are exposed. In one instance, these measurements are appropriately used as inputs to either one or both of the pricing module and the shelf-life module described above. A temperature recording device in accordance with the present invention can be any suitable device which will record the approximate maximum temperature by having a member that will undergo a chemical or physical change or otherwise undergo some modification that is correlated to temperature, so that the temperature measurement is saved to the device, i.e., meaning that once the maximum temperature is realized, the device member will not further undergo substantial changes that will erase the maximum temperature reading. Thus, the surrounding temperature causes or effects a substantially irreversible change in the member. Once a temperature is recorded, the recorded temperature can record higher but not lower temperatures. In this manner, the approximate maximum temperature to which a master container is exposed during its shipping route including from the time the device is placed within the container to the time that the temperature is read, can be determined. Any suitable temperature measurement device can be located on a lidding material in either the interior of the master container or its exterior. It is to be appreciated that there may be other devices that accomplish this purpose, the device herein described being merely an example of one embodiment.

In one embodiment of the temperature sensing device, the device includes a member that includes means that produce and hold a particular color which changes according to temperature. Once a color change has been recorded, any visual inspection means, such as a video camera can determine the approximate maximum temperature by recognizing the color of the device member and assigning the color to a predetermined temperature. In this manner, any temperature recording device associated with a package can maintain a record of the temperature so as to provide a temperature history for the container, maintaining a record from the instance of packaging through any further handling of the package up to the point of sale. It is to be appreciated that any temperature recorded using this method may only be an approximate reading of the maximum temperature. In one instance, the temperature can be read, and this temperature can either be recorded on a tag that goes with the master container or the individual package. Also, the temperature, can be compared with any other information that goes with the tag, and thereafter if corrections or any additions need to be made, new information can be written or otherwise recorded on a tag.

In other aspects of the invention, it is desirable to provide for the circulation or otherwise achieve a representative sampling of the gases contained within any container. Therefore, one aspect of the invention is to provide for convection of gases within the container to provide mixing of the gases therein. The convection currents can occur naturally and are powered by any temperature gradients between the packages and the surrounding environment, such as in any refrigerated storage room, for example.

In another aspect of the invention, a device capable of measuring oxygen content in the interior of a container is provided to record the oxygen content before the container is opened. In one aspect, the container can be a master container having a barrier lidding material attached thereto. An oxygen analyzer device according to the present invention can be any suitable device having a member which will record the oxygen content of the interior of a master container by undergoing any physical or chemical change or otherwise undergo some modification that is correlated to oxygen content, so that the oxygen content can be measured by measuring the change in the member before opening the master container. Thus, the oxygen in the interior of the container causes or effects a change in the member.

Most if not all metals form a metal oxide layer on any surface exposed to oxygen. According to one aspect of the invention, a tag having a metal member can be located within an interior of a container. The metal can be iron, platinum or titanium. It is to be appreciated that other metals may be suitable as well, the ones given here being only illustrative of several embodiments. Therefore, any oxygen that is present or evolved in the interior of the container will have a tendency to oxidize the surface of the metal member. In this manner, the amount of metal oxide on a surface of a metal member, is correlated to the amount of oxygen within the interior of the container. The amount of oxidation, measured by its resistivity, resistance or conductivity to electrical current, can provide a measure of the oxygen content of the interior contents of the container. It is to be appreciated that any oxygen content measurement that is recorded using this method is only an approximate reading of the oxygen content of the package. In one instance, the oxygen content can be read, and this content can either be recorded on a tag that goes with the master container or the individual package. Also, the oxygen content, can be compared with any other information that goes with the tag, and thereafter if corrections or any additions need to be made, new information can be written or otherwise recorded on a tag.

In one aspect of a method according to the present invention, the gas composition and maximum temperature can be read at a retail outlet, such as at a supermarket, before the packages are offered for retail sale. In one instance, a suitable scanner would supply power by induction to the temperature and oxygen recording devices. In this manner, the information read from the temperature or oxygen tags relating to maximum temperature and oxygen content can be used to provide the individual packages with a calculated shelf life, which can be recorded on a computer and tracked or additionally or alternatively, the shelf life date can be stamped or printed on the package along with the pricing information described above. However, the information can be used in other methods to control the offering for sale of the packages in any desired manner. For example, if the oxygen content read from any container is unacceptable, the packages contained therein may be rejected prior to placing the packages for sale. In some instances, a scanner device which is being used to read other information from an RF ID tag associated with the container can be used to provide the tag with a source of power for the gas analysis via induction.

In a further aspect of the invention, any barcode or RF ID tag containing information can be provided on any master container or individual retail package. Such information can be any of the useable information as herein described. In one instance, the information that is coded on the barcode or RF ID tag can be supplemented and/or changed after reading the information from the temperature or oxygen analyzer tags to be more reflective of the conditions sustained by the container. In one instance, the barcode or RF ID tag information is read by a scanner, however, this information is supplemented by the further information that is read from the temperature or oxygen tags and the new information can be stored on any read/write device, such as an RF tag, computer memory or a new barcode label that can be printed and placed on the package with the revised information. A method and system apparatus for practicing this aspect of the invention has been described above. In this manner the original information that is coded on any RF tag or barcode is supplemented with information, such as maximum temperature and oxygen content, that is gathered at the point of retail sale to more accurately reflect the conditions sustained by the container, and thus, more accurately price and/or label the items. In another aspect, a human readable label can be printed that carries with it the most recent temperature and oxygen content information or the information read form the tags can be used to provide a label with the expected shelf life of the package using a predetermined set of instructions. By having a scanner capable of supplementing the barcode data with data from a maximum temperature tag or gas analyzer tag, a cost savings is realized by reducing the number of data storage/RF tags that are required. Thus, one advantage to the present invention is to allow more funding of intelligent barrier containers, thus providing RF tags with greater capability in the future.

In further embodiments, methods are herein provided to adjust the shelf life according to the temperature history and gas composition read from any information storage device, such as a maximum temperature or oxygen analyzer tag. Such methods, for instance, may include carrying out a set of instructions by appropriate systems using computers having a central processing unit, and a memory, etc. For example, in some methods, limits may be imposed on the allowable temperature to which a container containing packages is exposed. Thus, a package's exposure to temperatures outside of limits will be recorded onto a tag which is then useful in determining available shelf life remaining for the packages. In some instances, the temperature to which a package is exposed may have been so high that no available shelf life remains and the package is rejected without ever placing the package on sale. In addition to temperature, another variable which may be considered to determine shelf life or rejection is the composition and content of gases within the container containing the packages. In this manner, if the level of oxygen measured at the interior of the container exceeds the acceptable limits, the packages are rejected automatically by a computer and these may be discarded or otherwise processed for other than human consumption. These methods may be implemented on any suitable system that uses a computer having a central processing unit, and memory to carry out specific sets of instructions.

5.2.6. Embodiment

One aspect of the invention is to provide unique markings and/or otherwise allow for the tracking of individual trays through the use of computer readable devices, used in the real time control methods, accordingly the following description meets this aspect of the invention. However, it is to be understood that the devices herein described do not limit the invention. To the contrary, unique markings may be achieve by including bar coding on the individual trays, such as a 2-D bar code, however, a 1-D barcode is also suitable to practice the present invention. The following discussion is made with reference to one embodiment of a packaging tray; however, as is readily apparent any of the trays disclosed herein may modified to be used in the invention. Referring now to FIG. 359, FIG. 360 and FIG. 361, a sealed tray 17900, sealed to lid 19902, is shown in FIG. 359, with a cross section through 361—361 shown in FIG. 361. FIG. 360 shows a plan view of a memory chip 17904, attached to an antenna 17906. The memory chip and antenna shown in FIG. 359 is essentially a thin two-dimensional item as typically manufactured by Omron Part No. V720-D52P01. However, it is to be understood that other memory chips of like performance are also suitable in the present invention. The Omron memory chip may be a "read only" chip or have readable and writable capability. A readable and writable memory chip would be used in the application where information can be recorded by the memory chip (writable) and subsequently read (readable). The dimensions of the memory chip with antenna may be approximately three inches long by two inches wide and of negligible thickness, or smaller. However, any other dimensions are suitable depending on the tray configuration.

One aspect of the present invention is directed to a memory chip as shown in FIG. 360 attached to a retail package such as shown in FIG. 359 to provide a package where the package itself has a readable and writable memory that will allow the storing of information associated with the retail package such as the origin of the package contents, its weight, age and cost, without the need for a human readable label or bar code that would otherwise be necessary to retain and store such information about the package and its contents. FIG. 361 shows a cross section through packaging tray 17900 with lid 17902, hermetically sealed together around a peripheral flange at 17908, with product such as fresh beef 17910 and a selected gas 17912 sealed therein. A recess

17914 is formed in the base of tray 17916 so that an opening is provided facing downward and a memory chip 17904 with antenna 17906 is located therein and a cover 17918 is sealed around the perimeter of cavity 17914 at 17920 and 17922, so as to retain the memory chip and antenna within the cavity in a water and moisture tight manner that will ensure the memory chip and antenna remains substantially dry. In this way, a memory chip as shown in FIG. 360 can be attached to a packaging tray in a protected condition. The tray 17900 can be manufactured from any suitable material such as polypropylene, or alternatively polystyrene which may have a gas barrier laminated thereto, but wherein the composite material does not inhibit the passage of radio frequency (RF) waves there through. Similarly, the lidding material 17902 may also be manufactured from a transparent plastics material such as biaxially orientated polyester with a gas barrier material laminated thereto, but wherein the composite material construction does not inhibit the passage of RF waves there through. In this way, information can be recorded by memory chip 17904 and retained with the package for subsequent reading. Information such as the weight of product 17910 and price and date, can be read at a point in time subsequent to assembly of the complete package and then printed onto a surface of the package in a human readable form, and according to a pricing formula that prevails immediately prior to the printing of the human readable information. In this way, any fluctuations in pricing that may occur subsequent to the time of package assembly, and prior to retail display, can be accommodated at the time of printing the human readable information.

Referring now to FIG. 362, FIG. 363 and FIG. 364, a tray 18000 with flaps 18002 and 18004 is shown with cavity 18006, and a memory chip housing 18008, formed into flap 18004. A cross section through 363—363 is shown in FIG. 363, and cross section 364—364 is shown in FIG. 364. Memory chip and antenna 18010 is held captive between flap 18004 and tray wall 18012. A hermetic seal around the perimeter of the memory chip enclosure is provided at 18014 and 18016. FIG. 364 shows a cross section through 364—364 of FIG. 363. Tray wall 18010 is sealed to flap 18018 at a path around the perimeter of memory chip and antenna 18020 at 18018 and 18004. The path can take any contour of the chip. The material, such as polypropylene, used in manufacturing the tray and tray wall is, in some instances, a material that will readily allow the transfer of RF waves there through. Memory chip and antenna as shown in FIG. 360 may be laminated between two sheets of material such as PVC prior to the attachment to any suitable tray packaging, and at any suitable surface of the tray, walls or base, by any suitable bonding means such as a suitable adhesive applied at the point of packaging assembly, or alternatively, a pressure sensitive adhesive having been previously applied to the laminated memory chip and antenna.

Referring to FIG. 363, a packaging tray is provided with a base 18022 and walls 18012, connected together at 18024. A flap 18004, that is hinged at 18026, is bonded to tray wall 18012 at several points such as 18028, 18030 and 18032. The tray as shown in FIG. 363 may be thermoformed from any suitable material such as polypropylene, and wherein the thickness of the tray wall and base, and flap, are adjusted so as to allow a more rapid permeation means of gas into tray cavity 18034 from the outside when a lidding material has been hermetically sealed to flange 18036 that follows a path around a perimeter of cavity 18034. Tray cavity 18034 is enclosed and filled with a selected gas such as carbon dioxide. The fully assembled tray with contents such as fresh beef, contained therein is placed in a gas barrier master container (not shown). As has been described in detail herein, the assembled tray can be removed from the oxygen free atmosphere within a gas barrier master container, immediately prior to retail display, thereby allowing atmospheric oxygen to permeate through the packaging and contact the surface of the fresh red meat contained therein, and thereby causing generation of red oxymyoglobin. The transfer of atmospheric oxygen gas through the packaging materials occurs as rapidly as possible, and therefore the packaging materials may be as thin as possible to enhance this gas permeation. However, by reducing the gauge or thickness of the packaging materials, the finished package may become structurally too weak to withstand the normal conditions of distribution. Therefore, the present invention provides a method of selectively reducing the thickness of sections of the tray packaging material, to allow improved permeation, while also providing a packaging tray that can withstand the normal conditions of distribution. In FIG. 363, the tray section at 18036 can be formed with a reduced thickness when compared with other sections of the tray base, tray wall and flaps. However, the thin section 18024, generally located where the tray wall 18012 meets the tray base 18022 and extending for a short distance along the wall and base is then covered by flap 18004, which has been formed with a heavier gauge cross section, and sealed by bonding to tray cavity, base and walls at 18028, 18030 and 18032. Thus, flap 18004 forms a reinforcing structure means for the thin section 18024. Aperture 18038 is provided to allow rapid ingress of atmospheric air into cavity 18040 and subsequent permeation through tray cavity, through section 18024. While one example of a thin section and reinforcing section formed on a tray has been described, other sections of the tray wall and/or base, may be formed as required with thinner cross section to allow less in the way of materials of construction, while maintaining heavier gauge sections at other portions of the tray, and in such a manner so as to ensure that the packaging tray structure will withstand the normal conditions of distribution.

6. Pet Food

One aspect of the present invention relates to methods and apparatus for the production of pet foods.

6.1. Embodiment

The pet food bowls can be made of any suitable material herein disclosed and by any suitable method herein disclosed. The pet food bowl of the present invention can suitably be made to have a wider base than the trays being used for human comestibles. In one instance, the pet food bowl can have a narrowing form from the base to an opening at the top of the pet food bowl. Without limitation, the pet food bowl can be made to have two opposite lower sides of the base that are parallel to one another and two radiused portions connecting the ends of the sides, so as to form a somewhat elliptical bowl base.

6.2. embodiment

Pet food made according to the present invention can be made by the apparatus disclosed herein. However, unlike the product intended for human consumption, the pet food is made from different parts of the animal. Presently, "blood and bone meal" is manufactured from animal parts including intestines and other internal organs that are surplus to human requirements and derived from domesticated animals such as cattle and pigs that have been slaughtered to provide food for human consumption. "Blood and bones" can be any leftover parts from meat processing that are generally considered undesirable for human consumption. Traditionally, blood and bones has been turned into fertilizer. However, the conventional process of treating the blood and bones expends more on resources to convert the blood and bones into fertilizer than what is realized as gross income. The conventional use of "blood and bones" is, typically, a money losing proposition. Contrary to conventional thinking, the present inventor has discovered that the "blood and bones" can be turned into pet food at a realizable profit by using the apparatus described herein. One of the problems encountered previously is a means for cleaning and removing the intestinal contents from the leftover portions of beef processing. By using the methods disclosed herein, the intestines can be suitably cleansed of contents. This has the advantage of producing pet food from heretofore discarded animal parts.

In another aspect of the present invention, a method of processing the byproducts of meat processing, i.e., the intestines, organs, etc., into pet food includes the steps of washing out the remains of intestines or organs suitably with ozonated water followed by chlorinated water, and then suitably washing with water. The sequence of steps may be repeated as necessary to remove the intestinal contents. In one aspect, a method uses an attachment device that is clamped to an end of an intestine and the device can be connected to a hose. The hose can carry ozonated water to the intestine which has the effect of sanitizing as well as removing the contents. A station can be provided that will control the addition of the ozone (and chlorine dioxide) to the water, and a controller will control the pressure or flow that is metered through the intestine. This can be followed with a water rinse without ozone. This sequence of steps can be repeated as necessary to produce a suitably sanitized and clean pet food precursor material. To remove the remaining water, the station can be provided with an air supply that can suitably remove most of the excess water from the inside of the intestine. While the specific example of this aspect of the invention has been described with reference to intestines, it can also be realized with other leftover parts of animals that can be turned into pet food, such as any organ.

In a further aspect of the present invention, the methods disclosed herein can be utilized to produce disposable pet food packages. The packages can suitably be packaged as "case ready" packages containing food for pets. This has the advantage that the pet food can come in its bowl, which can then be discarded without the need for washing, as is required periodically with re-usable pet food bowls. The pet food can be packaged in different sized bowls for different sized pets. The pet food can also be packaged for the distinct animal, such as for dogs and cats. But, the invention is not limited to domesticated animals, as feed for any other animal may be prepared in the manner disclosed herein. Furthermore, the pet food can also be fortified with different additives, such as vitamins or minerals which will be suitable for animals that have deficiencies in these components. In other instances the pet food provides a suitable dose of a medicated product for a particular ailment. In another aspect, the present invention can also package single serving portions or multiple portions, such as when an animal is left for days at a time.

In another aspect of the invention, an apparatus is provided that can be used in the aforementioned method to provide for a pet food product made from the leftover products of meat processing. This apparatus can suitably be supplied from the Wenger Company. The conventional use of this apparatus is presently being used to manufacture a form of corn paste. However, with suitable modifications, the apparatus can be made to grind or otherwise process the leftover animal parts into a suitable pet food product, that can then be packaged in accordance with the invention.

6.3. Embodiment

Returning to FIG. 334, in another aspect of the present invention, the apparatus shown therein may be used to process and package food for consumption by pets.

During the process of harvesting human edible items such as beef muscle from the source cattle (animal), the animal is slaughtered and disassembled. A large percentage of the whole animal, such as the animal's entrails, hide and bones, is not used for human consumption. Much of this discarded matter is processed, by rendering into fertilizer, and other low value items or alternatively those organs that are selected for further processing into pet food are frozen in blocks and shipped to other locations for further processing into pet food. One aspect of the present invention is directed at a method of processing some of these items, at the point of animal slaughter, such that they can be used for more profitable business such as, in one instance, the production of food for pets (i.e., dogs and cats) and wherein the process does not require the inefficient use of energy that would otherwise be required in freezing the organs as described above. In order to make efficient use of the animal's entrails, after removal from the carcass, they can be divided into groups of like items derived from a multiplicity of similar animals. For example, all small intestines, hearts, lungs, liver can all be separated into isolated quantities and then fed via separate streams along conveyors such as 15206, 15208, 15210, 15218, 15220 and 15222, shown in FIG. 334. In FIG. 334, a total of six conveyors are shown, with two sets of three conveyors, converging into two streams at 15234 and 15236. The items may be transferred from the "hot" kill line (the point of animal disassembly, immediately after slaughter) via a pneumatic conduit or vacuum system wherein receiving openings, connected to a vessel maintained at a lower air pressure, are conveniently located along the animal disassembly line so that operators can place the animal parts therein. All conveyors, or vacuum transfer conduits, can be provided with variable speed drive motors or mechanisms that facilitate combining of the six source items, according to a predetermined formulation, that provides for specific quantities of each of the items ultimately combined together according to the formulation. In one aspect, other items such as vitamins and minerals, in controlled quantities, can also be added to the streams thereby providing a suitably nutritious and low cost food source for pet animals. By transferring said animal parts, which are still substantially at normal animal body temperature, directly from "hot" kill floor to the processing equipment, much energy can be saved that would otherwise be required for chilling or freezing of the animal parts. Furthermore, these animal parts are substantially bacteria free at the point of disassembly and be transferring same via an enclosed conduit cross contamination can be minimized. Equipment as shown in FIGS. 334, 338, and 339, can also be used to process such food items for pets.

Referring now to FIG. 339, and in particular the ground meat portioning apparatus 15846, may be replaced with a Wenger TX85 extruder that can cook the blended pet food item prior to packaging. The Wenger TX85 extruder is arranged to cook, sterilize and extrude a continuous tube casing from a processed corn source, and wherein the tube can be continuously filled with a filling such as the pet food herein described. The filled, continuous tube is then cut into bite size portions which can then be chilled and packaged, into a tray such as the tray shown in association with FIG.

368, but wherein the tray cavity 34017 is profiled so as to provide a shape similar to a pet food bowl. In this manner, a sterilized food can then be packaged in an aseptic condition for sale to pet owners where refrigeration of the pet food after production is not essential, and making the pet food bowl disposable. In one aspect, the pet food bowl can be manufactured from an edible or biodegradable material.

This production of foods for pets can, for example, also be undertaken with the use of the equipment as specified in association with FIGS. 332, 338, 339, wherein more than one stream of ingredient is combined with at least one other stream of ingredient, blended together and then extruded by apparatus such as the Wenger TX85, prior to packaging in an aseptic condition in packages that can include tray containers that comprise disposable pet food bowls.

6.4. Embodiment

In the processing of animals for human consumption, a quantity of animal parts are diverted for freezing or to low-value uses, such as fertilizer. It is desirable to produce methods to enable more valuable uses for the trimmings and entrails generated as a byproduct of beef production. The present invention aims to fulfill those needs. Therefore, in one aspect of the invention, a method and apparatus is disclosed for the utilization of entrails to produce a high-end value product, such as pet foods. In one aspect of the invention, a pet food product is produced under reduced oxygen conditions. In another aspect of the invention, aseptic packaging processing is used to'produce a pet food product of high moisture content. Therefore extending the shelf life of such products without the need for additional refrigeration.

One embodiment of a reduced oxygen environment system for the conversion of beef entrails into pet food is depicted in FIG. 365. While the following description is made with reference to entrails, it is to be appreciated that any other parts of the animal, such as surplus fat trim and those parts that are more suited for human consumption, can be used in the practice of the present invention as well.

In one aspect, system apparatus includes grinders, blenders, measuring devices, pumps, washers, etc., wherein the equipment can be subjected to a substantially oxygen-free environment, such as mostly carbon dioxide. In further aspects of the present invention, additional agents may be added such as any decontaminating agents mentioned above.

Referring now to FIG. 365, a plurality of animal entrail streams are depicted as reference numerals 18100-18106. Each stream is dedicated to a specific entrail type from a multiplicity of animals. It is to be appreciated that any number of streams may be utilized, the number of streams shown here being merely exemplary of one embodiment. In one aspect of the invention, a first and a second stream are provided, one being a relatively high-fat content stream and the second being a relatively low-fat content stream. In this embodiment, the streams depicted with reference numerals 18100, 18102 and 18104 can be either the high-fat content stream or the low-fat content stream, whereas streams depicted with reference numerals 18106, 18108 and 18110 can form the opposite, such as the high-fat content stream or the low-fat content stream. As is shown, each of the respective streams 18100, 18102, 18104, 18106, 18108 and 18110 is directed respectively into a grinder unit, wherein the grinder units are depicted by reference numerals 18112, 18114, 18116, 18118, 18120 and 18122, respectively. [It should be noted that emulsifying equipment, such as is supplied by Cozzini, may be used in place of any grinders described in this disclosure, which is not limited to the processing of pet food.] Each of the respective grinders includes at least one port for the introduction of a suitable gas depicted by arrow with the reference numeral 18124. Suitable grinders and gases for use in this aspect of the invention have been described hereinabove.

In one aspect of the invention, a stream specifically dedicated to the washing of intestinal content from intestines is provided downstream of a grinder. Referring now to FIG. 365, stream 18100 can include any amount of intestines which have not been cleaned of intestinal content. Stream 18100 containing intestines and intestinal content is directed to grinder 18112, wherein a suitable gas, such as carbon dioxide in the concentrations provided hereinabove is introduced. From the grinder 18112, the grinder contents are transferred to a two-stage cleaning apparatus, wherein the first stage is depicted as reference numeral 18126 and the second stage 18128 is downstream of the first stage 18126. Transfer of grinder contents from grinder 18112 to first stage washer 18126 is provided by a transfer device 18130 which may be a conveyer, an elevator, or a pump, as herein described. While reference is made to a two-stage washer system, it is to be appreciated that any number of stages may be utilized in the present invention, the two-stage washing system depicted being merely exemplary of one embodiment of the present invention. First stage 18126 includes an inlet port 18134. Gas inlet port 18134 provides for the introduction of a decontaminating agent, such as ozone, into the first stage washer 18126. Washer 18126 includes a means for agitating the contents to provide for intimate mixing of the ground contents with the decontamination agent, such as ozone. A more thorough description of the interior of an ozone contacting station is provided hereinabove. First stage washer 18132 includes a second port 18134. Gas port 18134 can provide for the introduction of a second decontamination agent, such as chlorine dioxide ($ClO_2$). According to the present invention, ozone and $ClO_2$ have been found to provide a synergistic sanitizing effect on products. In addition to the benefits realized by the synergistic effects, $ClO_2$ reduces or breaks down ozone, thus providing for less ozone emissions into the ambient atmosphere. While this description is made with reference to ozone and $ClO_2$, it is to be appreciated that any other suitable decontamination agents herein provided can be used in practicing the present invention; ozone and $ClO_2$ being merely exemplary of one embodiment of the invention. The agitator means (not shown) provided in first stage washer 18132 transfers the ground contents in a direction of arrow 18138. First stage washer 18132 includes a joining conduit to a second stage washer 18140. Second stage washer 18140 is similar in operation to first stage washer 18132, and therefore its operation will not be fully described. Second stage washer 18140 includes an agitator (not shown) which transfers the product in the direction of arrow 18138. Second stage washer 18140 similarly includes a first gas port 18134 for the introduction of a first decontaminating agent, such as ozone, and a second gas port 18136 for the introduction of a second decontamination agent, such as $ClO_2$. In one aspect of the invention, the $ClO_2$ is introduced into the first stage washer 18132 and the second stage washer 18140 downstream of the introduction of the first decontamination agent. Any unused decontamination agents may be vented. However, other aspects can provide for the re-circulation and or elimination of any gaseous products of decontamination. In one aspect of the invention, the vented decontamination agents may be collected and recycled into first gas port 18134 and second gas port 18136 as herein described.

Second stage washer 18140 includes an outlet connected to a transferring device 18142, such as a pump herein described above, for transferring the disinfected and cleansed ground intestines.

Referring again to FIG. 365, the system herein disclosed includes a first preblender 18144 and a second preblender 18146, wherein each preblender 18144 and 18146 is dedicated to either having a high-fat content stream or a low fact content stream. While reference is made to two preblenders 18144 and 18146, it is to be appreciated that any number of preblenders may be used in practicing the present invention. The two preblenders 18144 and, 18146 being merely exemplary of one embodiment of the invention.

In one embodiment, preblender 18144 includes means for joining a plurality of ground streams. In this embodiment, preblender 18144 is fed streams 18102 and 18104, after having been ground in grinders 18114 and 18116, respectively, and pumped by pumps 18148 and 18150, respectively. Stream 18102 is transferred in conduit 18152 in the direction of arrow 18138 to feed into preblender 18144. Stream 18104 is pumped by transfer device 18150, transferred in conduit 18154 to feed preblender 18144. Streams 18100, 18102 and 18104 enter preblender 18144 as separate streams, or alternatively can be joined at a confluence prior to entering preblender 18144. In any event, streams 18100, 18102 and 18104 are mixed in preblender 18144 to homogenize the streams into a single stream having a substantially uniform fat content. Conduits downstream from pumps 18142, 18148 and 18150 may include fat-measuring devices or the like to control the speed of punning devices, and therefore the flow rate of each respective stream 18100, 18102 and 18104 to the preblender in order to achieve a consistent outlet stream from preblender 34.

Similarly, preblender 18146 is fed by streams 18106, 18108 and 18110. Each of streams 18106, 18108 and 18110 is ground in grinders 18118, 18120 and 18122, respectively, and then transferred by pumps 18158, 18160 and 18162 in respective conduits 18164, 18166 and 18168 in the direction of arrow 18138 that feed into preblender 18156. Similarly, conduits 18164, 18166 and 18168 can include a measuring device to control the speed of pumps 18158, 18160 and 18162 and thus control the flow rate of streams 18106, 18108 and 18110 into the preblender 18146. Streams 18106, 18108 and 18110 can be introduced separately into preblender 18146.

Preblenders 18144 and 18146 are similar in operation, and can include any of the blenders herein described. Preblenders 18144 and 18146 have an outlet which feeds into measuring devices 18170 and 18172, respectively. Measuring devices 18170 and 18172 can measure any desirable variable that is suitable for measurement 18170 such as fat, lean, water or the like. The measurements taken by measuring instruments 18170 and 18172 provide feedback control to any one or a number of pumps such as 18142, 18148, 18150, 18158, 18160, and 18162, for example. Alternatively, the measurements taken by measuring instruments 18170 and 18172 may be used additionally for other purposes. For example, measuring instruments 18170 and 18172 may control any one or a number of valves to shut off streams if the measurement measured after the preblender 18144 and 15146 is outside of any tolerance limits set by a controller. While two measuring instruments 18170 and 18172 are shown, it is readily appreciated that any number of measuring instruments may be used, measuring instruments 18170 and 18172 being merely exemplary of one embodiment of the present invention.

In one aspect of the invention the combined final stream, having a selected and accurately measured fat content according to a customers purchase order, may be emulsified and pumped, under aseptic conditions into a high gas barrier bulk bag such as supplied by Scholle of Chicago, and hermetically sealed therein, for subsequent storage and sale to other pet food manufacturers.

In one aspect of the invention, streams 18156 and 18174 having measuring instruments 18170 and 18172 respectively, are joined at a second blender 18176 to homogenize a high-fat content stream with a low-fat content stream in blender 18176. Blender 18176 is similar in operation to any of the blenders herein described above. In one aspect, blender 18176 functions as a means to uniformly mix a first and second stream of products, wherein one stream is a high-fat content stream and the second stream is a low-fat content stream to arrive at a homogenized stream of substantially uniform fat content in the proportions of the first and second streams. Blender 18176 is suitably a twin screw-driven blending device as herein described above. In one aspect of blender 18176, the blender 18176 is provided with a jacket suitably surrounding the blender 18176 to provide for steam or hot water temperature control. In one aspect of the invention, steam or hot water is provided in excess of greater than 160° F. for a suitable length of time to kill any bacteria. However, temperatures of greater than 200° F. are also suitable. Based on the size of blender 18176, the temperature or time can be adjusted by experiment.

It is to be appreciated that grinders, pumps, first stage washer and second stage washer, preblenders 18144 and 18146, measuring instruments 18170 and 18172 and second blender 18176 form part of an enclosed conduit wherein any suitable gas has been introduced to substantially eliminate oxygen and other contaminants therefrom. In one aspect of the invention, this provides a means for extending the shelf life of beef and beef-type products and produces an aseptic product.

Referring again to FIG. 365, an extruder device 18178 is provided. Device 18178 is manufactured by the Wenger Company, and is of the model number as indicated above. Extruder device 18178 is known to produce a type of corn paste. However, extruder device 18178 has not been contemplated for use in the manner described herein. Namely, extruder device 18178 provides the corn paste which can be, in one aspect, used as a casing for the ground (an/or emulsified) and uniformly blended product of streams 18100–18110. In the present invention, the extruder device 18180 can be used in a continuous manner. It is also not known to enclose, or otherwise provide, a reduced oxygen environment within the interior of extruder device 18178. The product produced by extruder device 18178 is directed to a die 18180 of suitable dimensions. The die 18180 works in conjunction with the ground and blended (and optionally cooked) stream leaving the second pre-blender 18176. Die 18180 produces a tube of corn paste which is filled with the product leaving second preblender 18176.

Referring momentarily to FIGS. 366 and 367, the product produced by the system herein disclosed is shown. The product produced according to the present invention includes a center section 18200 containing ground and homogenized beef and beef product with an exterior casing 18202. Casing 18202, in one aspect, can be produced by producing two longitudinal flat sheets, wherein the edges of the first and the second sheet have been pinched together so as to provide a hollow tube of circular configuration. Tube 18202, with interior 18202 can be pinched off longitudinally at two ends thereof 18204 to produce a bite-sized pet food morsel. Unlike conventional products, a product produced according to the present invention can include an amount of moisture. However, because of the aseptic conditions under which it is produced, the product made according to the present invention does not require additional refrigeration. In addition, one aspect of the product produced according to the invention is the reduced oxygen environment under which it is produced. In another aspect of the present invention, the product made according to the process herein described takes low value beef entrails and produces a high value product (high in protein and fat).

Returning to FIG. 365 product produced in die 18182 is transferred along a conveyor 18182 which feeds into a refrigeration device 18184. Refrigeration device 18184 is a combination of a mechanically-based and gas-based refrigeration unit. Suitable refrigeration devices for use in practicing the present invention are provided by the Frigoscandia Company of Helsingborg, Sweden. Chiller 18170 and 18172 can be a spiral chiller. Spiral chillers, which are known in the art, however, are not operated under reduced oxygen environments as the present invention. Therefore in one aspect, the chiller 18184 is provided with one or a plurality of ports 18186 and 18188 for the introduction of any suitable gas depicted by arrows 18190 and 18192. Suitable gases include but are not limited to nitrogen or carbon dioxide or any combination thereof in any proportions herein described above. Chiller 18184 may bring the temperature of the pet food morsels down to a temperature of about 160° F. to about 50° F. Chiller 18184 includes an outlet 18144 to transfer the chilled pet food morsels in the direction of arrow 18196.

In one aspect of the invention, a dividing wall 18198 can be provided to separate the system herein described above from the packaging section. In one aspect, the equipment shown as being part of FIG. 365 is provided within a room wherein substantially all oxygen has been removed therefrom. Alternatively, the wall 18198 can be eliminated. In one aspect, if wall 18198 is eliminated, the beef product is substantially enclosed within a continuous and gas-padded environment to substantially eliminate contact of the product with oxygen or ordinarily contaminated ambient air.

Referring now to FIG. 339, the packaging system shown therein and described above can be modified to accept pet food morsel products produced by the equipment shown in FIG. 365.

Packaging of the pet food morsels can be carried out in any of the disclosed packaging system and apparatus hereinabove described with the following modifications. In one aspect, the pet food morsels can be packaged in any one of the disclosed trays. In one aspect, a tray of suitable size will provide a single serving meal for a pet. In another aspect, the trays can be adjusted according to size for small, medium or large pets with the appropriate amount of pet food morsels corresponding to the pet size included within. It should be appreciated that streams 18100–18110, can be adjusted to make pet food morsels suit different pet diets, such as low fat, high fat, adult pets, obese pets, vitamin or mineral-enriched diets as well can be provided by the inclusion of the appropriate vitamin or mineral supplements into one or more of streams 18100–18110 during any point in the process described above.

6.5. Embodiment

Referring now to FIG. 368, a suitable tray for containing pet food morsels 18300 is illustrated. In one aspect, the tray includes a flap 18302 which is suitably folded and bonded to the underside of the tray base. In some instances, the thermoformable tray material will not make a suitable barrier to prevent the diffusion or migration of oxygen or any undesirable gases within the interior of the tray package. Therefore, the thermoformable tray material can be supplemented with an additional layer of barrier material 18304. Barrier material 18304 can be, in some instances, thermoformed in a manner similar to thermoforming of tray materials. Thermoforming of tray or barrier materials can suitably take place in a reduced oxygen environment as disclosed hereinabove. In another aspect, barrier material 18304 can be a flexible material which is applied to the tray interior. In this aspect of the invention, the tray is suitably provided with apertures 18306, which in some instances can be located at the juncture of a tray wall with the tray base as depicted in FIG. 368. Once a suitable supplemental barrier material 18304 is applied to a tray, the entire assembly can be transferred to a vacuum chamber wherein a vacuum is applied to the tray and material. In this matter, vacuum is applied at the aperture 18306 which causes the barrier material 18306 to expand along the walls, base and any other portion of tray that is in contact with the barrier material. In this manner, the barrier is applied in adjacent and touching proximity to the tray material. The vacuum applied at the tray induces a vacuum in the interior of the tray but within the tray material and the barrier material 18304 through the aperture 18306. In one aspect, the barrier material is a composite formed from a first layer of nylon, a second layer of ethylene vinyl alcohol copolymer adjacent to the nylon layer. A third layer of polyethylene is applied on the ethylene vinyl alcohol. Alternatively, barriers 18304 can be formed from polyvinylidene as a substitute for ethylene vinyl alcohol. It should be readily appreciated that other suitable barrier materials can be used in the practice of the present invention, the two mentioned here being merely illustrative examples.

Referring again to FIG. 368, flap 18302 is folded to lie adjacent to the tray and in such a manner as to provide a flap horizontal ledge on the upper portion of tray. A seal 18308 is applied between the flange of the barrier material 18304 and the flap 18302 at the upper horizontal ledge. A lidding material 18310 can next be applied to seal the tray upper surface. Lidding material 18310 is bonded to barrier material 18304 at seal 18184. However, in other alternates, the lidding material 18310 can be bonded directly to the tray flange.

Referring now to FIG. 339, one embodiment of a packaging system for pet foods is provided. In this aspect of the invention, the outlet 18194 from chiller 18184 (see FIG. 365) is arranged to deposit pet food morsels in trays provided by tray folding and bonding station 15848. Conveyor 15850 carries trays through a tray filling station. From the tray filling station filled trays are over-wrapped with any suitable over-wrapping material. From over-wrapping station 15854, trays are, carried to station 15858 where trays are stacked in barrier master containers and optionally can be partially evacuated so as to cause the barrier material to contact an outer surface each tray stacked therein thereby holding all contained trays together in an easily handled "block" form. From master container station 15858, master containers are stored in cartons in a carton erection and filling station 15864, and palletized in palletizing station 15866.

6.6. Embodiment

Referring now to FIG. 369, an alternative storage container for pet food morsels (or any other suitable product) is illustrated. In this aspect of the invention, a cardboard container 18400 is provided, a pouch 18402 having suitable barrier properties is provided within the container 18400. Cardboard container may be provided by the Huhtamaki Company. Container 18400 has a flange about the upper periphery of the container opening. A first hermetic seal 18404 is provided between the container flange and the edge of the barrier pouch 18402 completely around the periphery of the container 18400. A second hermetic seal 18406 is at the pouch flange to bond barrier pouch edge to a lidding material 18408. In this manner, lidding material 18408 hermetically seals the container 18400 opening. Pouch 18402 can be evacuated with an apparatus as is shown in FIGS. 246–248 herein described above. In one embodiment of the barrier pouch, the barrier material is a composite including a first inner layer of nylon, a second middle layer of ethyl vinyl alcohol (EVOH), and a third outer layer of polyethylene. In another embodiment, the EVOH layer may be substituted with polyvinylidene chloride. In another embodiment pouch 18402 includes a first layer of nylon, followed by a second layer of aluminum foil, and a third layer of polyethylene. The lidding material for a pet food container can include layer of amorphous polyethylene terephthalate (APET), a layer of EVOH, adjacent the APET, and a third layer of APET, adjacent to the EVOH.

Referring again to FIG. 339, when a barrier pouch is desired to be used as the packaging medium, the tray forming and bonding station 15848 or the tray overwrapping station 15859 is optional. In this aspect, the outlet 18194, from chiller 18184 (see FIG. 365), can be provided to an apparatus as is shown in FIG. 246 to fill the barrier pouch. The barrier pouch can then undergo evacuation and flushing with any desirable gas, such as carbon dioxide. Equipment 15860 can be suitably modified to accommodate this aspect of the invention. Barrier pouch is next loaded in cardboard containers. The cardboard container may be assembled by "wrapping" around the sealed barrier pouch and bonded with any suitable adhesive such as a pressure sensitive adhesive, together. Such cardboard container assembling equipment is readily available from PMI, Elk Grove Village, Ill., USA.

6.7. Embodiment

Referring now to FIGS. 370–371, an alternate packaging container for pet food morsels is provided using an alternate pouch. In this aspect, box container 18500 includes an exterior cardboard container 18500. Container 18500 is added for rigidity. Referring now to FIG. 371, a cross section through container 18500 is shown. Adjacent and interior to the exterior cardboard member 18500 is a layer of barrier foil 18502. Barrier foil 18502 is optional in the present embodiment and may be added only if desired. Adjacent and interior to the layer of foil 18502 is a pouch 18504. However, if foil 18502 is omitted, pouch 18504 will lie adjacent to cardboard box 18500. Pouch may be any suitable size, but in one aspect, can be sized to contain pet food morsels for 3 to 7 days. Suitable pouches are supplied by the Scholle Company. Pouch 18504 can be bonded to the interior of box 18500, or if barrier foil 18502 is added, pouch will be bonded to barrier foil 18502. Pouch 18504 is bonded to foil 18502 and/or to box 18500 with any suitable adhesive, but in one instance, a pressure sensitive adhesive is used. Pouch 18504 can be inflated with any suitable gas after loading with pet food to expand pouch 18504 to the sides, and top and bottom of box 18500 and be bonded thereto. In one embodiment of box container 18500, box container 18500 includes an opening (not shown) disposed on the top side of container box. Opening may be covered with a cardboard flap, where the flap is hinged to a side of the opening. Flap may be pre-cut in a circular pattern, so consumer of box can initially tear flap open, exposing pouch 18504. In this embodiment, pouch 18504 includes a resealable opening that is accessible via the opening in the top side of box container 18500. In one instance, pouch opening can protrude through the box opening. In this manner, pet food morsels can be taken out of pouch 18504 and the pouch opening can be re-sealed to lock in freshness. However, it should be appreciated that initially pouch 18504 can be hermetically sealed at the processing facility and consumer will tear the hermetic seal of the pouch, and thereafter use the resoluble opening after each serving.

In this alternate embodiment of the pouch, the apparatus disclosed herein above and shown in FIG. 339 can suitably be used in filling the pouches with pet food morsels as described above.

While the preferred embodiment of the invention has been illustrated and described, it will be appreciated that various changes can be made therein without departing from the spirit and scope of the invention.

The invention claimed is:

1. A method for storing and shipping edible food comprising:

(a) placing food in a plurality of packages and wrapping each package with a permeable material, wherein a first package comprises a depression wherein food is deposited and permeable material is placed over the depression and makes contact with the food;

(b) stacking packages, wherein a second package is stacked directly on top of the first package without the underside of the second package contacting the permeable material in contact with the food within the first package;

(c) introducing gas into the first and second packages to replace air from the first and the second packages;

(d) placing the first and the second packages in a container;

(e) introducing the same or different gas into the container; and (f) closing the container so as to prevent gas from escaping, wherein the first package has first and second sidewalls disposed opposite to each other around the depression, wherein the first and second sidewalls define a first and second crest, respectively, at the upper portions thereof, wherein the second package has third and fourth sidewalls disposed opposite to each other around the depression, wherein the third and fourth sidewalls comprise first and second flaps hinged at a periphery of the depression, whereupon folding the first and second flaps down defines a first and second concave indentation at or near to the base so that the first and second concave indentations of the second package rest on top of the first and second crests, respectively, of the first package.

2. The method of claim 1, further comprising:

stacking said first and second packages in said container so as to transfer the weight of the second package to walls on opposite sides of the first package.

3. The method of claim 1, wherein each package includes a recess portion and a leg portion so that the leg portion of one package contacts the recess portion of the next lower package in a stack.

4. The method of claim 1, wherein the package comprises:

an upper flange and an aperture therein, wherein the permeable material is sealed to said flange while leaving said aperture open.

5. The method of claim 1, further comprising: associating an *E. coli* detector with each package.

6. The method of claim 1, further comprising:
associating an RFID tag with said container; and
applying information to said RFID tag specific to at least one of the packages in the container.

7. The method of claim 1, further comprising:
placing said container in a cardboard carton.

8. The method of claim 1, further comprising:
associating an RFID tag with said container; and
applying information to said RFID tag specific to the food in each of said packages.

9. The method of claim 1, wherein said gas for the first and second packages or the container comprises carbon monoxide.

10. The method of claim 1, wherein the lateral movement of one package relative to another is inhibited.

11. The method of claim 1, wherein the second package comprises a base having a profile that provides clearance between the first and second package.

12. A method for packaging food to minimize the formation of metmyoglobin on the surfaces of the food, comprising:
(a) placing food in a tray and wrapping the tray with a gas permeable material, wherein the tray comprises a depression formed from a tray base and any number of sidewalls, wherein the food is deposited within the depression and the material is placed over the depression and contacts the food at a location; and
(b) stacking a second tray directly on top of the first tray without the underside of the second tray contacting the material at the location at which the material is in contact with the food of the first tray so as to allow oxygen to diffuse across the material that is in contact with the food and minimize the oxygen surrounding the food that may cause metmyoglobin formation wherein the first tray has first and second sidewalls disposed opposite to each other around the depression, wherein the first and second sidewalls define a first and second crest, respectively, at the upper portions thereof, wherein the second tray has third and fourth sidewalls disposed opposite to each other around the depression, wherein the third and fourth sidewalls comprise first and second flaps hinged at a periphery of the depression, whereupon folding the first and second flaps down defines a first and second concave indentation at or near to the base so that the first. and second concave indentations of the second tray rest on top of the first and second crests, respectively, of the first tray.

13. The method of claim 12, wherein the second tray comprises a base having a profile that provides clearance between the first and second trays.

14. The method of claim 12, wherein the first and second crests define a first radius and the first and second indentations define a second radius that is smaller than the first radius.

15. The method of claim 12, wherein the food comprises meat.

16. A method for packaging and stacking trays to minimize the deleterious effects of oxygen on food, comprising:
(a) overwrapping a first tray containing food therein with an oxygen permeable material so that the material contacts the food and holds the food to the tray;
(b) placing a second tray directly on top of the first tray without the underside of the second tray touching the portions of the material that hold the food to the first tray;
(c) placing the first and second trays in a container wherein the oxygen content is lower in the container as compared to the first tray to allow oxygen to pass through the permeable material that is touching the food into the container having the lower oxygen content wherein the first tray has first and second sidewalls disposed opposite to each other around the depression, wherein the first and second sidewalls define a first and second crest, respectively, at the upper portions thereof, wherein the second tray has third and fourth sidewalls disposed opposite to each other around the depression, wherein the third and fourth sidewalls comprise first and second flaps hinged at a periphery of the depression, whereupon folding the first and second flaps down defines a first and second concave indentation at or near to the base so that the first and second concave indentations of the second tray rest on top of the first and second crests, respectively, of the first tray.

17. The method of claim 16, further comprising, after placing the first and second packages in the container, lowering the oxygen content of the container by evacuation and delivering a gas low in oxygen to the interior of the container.

18. The method of claim 16, wherein the food comprises meat.

* * * * *

UNITED STATES PATENT AND TRADEMARK OFFICE

CERTIFICATE OF CORRECTION

PATENT NO. : 7,205,016 B2
APPLICATION NO. : 10/385158
DATED : April 17, 2007
INVENTOR(S) : A.J.M. Garwood It is certified that error appears in the above-identified patent and that said Letters Patent is hereby corrected as shown below:

| COLUMN | LINE | ERROR |
|---|---|---|
| Title Page, Item (60) Pg. 1, col. 1 | Related U.S. Application | "Mar. 13, 1998, now abandoned, said application No. PCT/US01/45146, said application No. 09/550,399." should read --Mar. 13, 1998, now abandoned.-- |
| 309 (Claim 12, | 47 line 27) | "first." should read --first-- |

Signed and Sealed this

Twenty-fourth Day of July, 2007

JON W. DUDAS

*Director of the United States Patent and Trademark Office*